United States Patent [19]

White et al.

[11] Patent Number: 5,603,031
[45] Date of Patent: Feb. 11, 1997

[54] SYSTEM AND METHOD FOR DISTRIBUTED COMPUTATION BASED UPON THE MOVEMENT, EXECUTION, AND INTERACTION OF PROCESSES IN A NETWORK

[75] Inventors: James E. White, San Carlos; Christopher S. Helgeson; Douglas A. Steedman, both of Mountain View, all of Calif.

[73] Assignee: General Magic, Inc., Sunnyvale, Calif.

[21] Appl. No.: 90,521

[22] Filed: Jul. 8, 1993

[51] Int. Cl.$^6$ .................................................. G06F 13/00
[52] U.S. Cl. ................................................................ 395/683
[58] Field of Search ........................................ 395/650, 700

[56] References Cited

U.S. PATENT DOCUMENTS

| | | | |
|---|---|---|---|
| 4,575,797 | 3/1986 | Gruner et al. | |
| 5,079,695 | 1/1992 | Dysart et al. | 395/700 |
| 5,093,914 | 3/1992 | Coplien et al. | 395/700 |
| 5,129,083 | 7/1992 | Cutler et al. | |
| 5,206,951 | 4/1993 | Khoyi et al. | 395/650 |
| 5,261,080 | 11/1993 | Khoyi et al. | 395/500 |
| 5,303,375 | 4/1994 | Collins et al. | 395/650 |
| 5,307,490 | 4/1994 | Davidson et al. | 395/650 |
| 5,327,559 | 7/1994 | Priven et al. | 395/700 |
| 5,339,430 | 8/1994 | Lundin et al. | 395/700 |
| 5,377,350 | 12/1994 | Skinner | 395/600 |
| 5,379,426 | 1/1995 | Foss et al. | 395/650 |
| 5,396,630 | 3/1995 | Banda et al. | 395/700 |
| 5,414,852 | 5/1995 | Kramer et al. | 395/700 |
| 5,421,013 | 5/1995 | Smith | 395/650 |
| 5,421,015 | 5/1995 | Khoyi et al. | 395/650 |
| 5,446,842 | 8/1995 | Schaeffer et al. | 395/200.01 |
| 5,446,901 | 8/1995 | Quicki et al. | 395/700 |
| 5,452,433 | 9/1995 | Nihart et al. | 395/500 |

FOREIGN PATENT DOCUMENTS

| | | |
|---|---|---|
| 0495319 | 7/1992 | European Pat. Off. |
| 0546809 | 6/1993 | European Pat. Off. |
| WO91/10191 | 7/1991 | WIPO ................ G06F 9/44 |

OTHER PUBLICATIONS

S. Gibbs, "Class Management for Software Communities", Communications Of The Association For Computing Machinery, vol. 33, No. 9, 1 Sep. 1990, pp. 90–103, XP 000162393.

(List continued on next page.)

*Primary Examiner*—Kevin A. Kriess
*Attorney, Agent, or Firm*—Skjerven, Morrill, MacPherson, Franklin & Friel; Forrest E. Gunnison

[57] ABSTRACT

A distributed computing environment in which agent processes direct their own movement through a computer network. Place processes provide a computing context within which agent processes are interpreted. An agent process controls its movement from one place process to another within the network by using a ticket. An agent process which moves from one place process to another transports definitions of classes of which objects included in the agent process are members. An agent process which moves from one place process to a second place process avoids unnecessary transportation of objects included in the agent process by substituting equivalent objects which are found in the second place process. An agent process sends clones of the agent process to several place processes simultaneously. If two clones travel along paths which are coextensive for an initial portion thereof, a single clone is transported along the initial portion of the paths and other clones are formed from the single clone, thereby avoiding transferring redundant information along communications media. Two agent processes, which occupy a single place process, interact by exchanging references to one another. The single place process ensures that neither agent process receives a reference to the other agent process without simultaneously giving to the other agent process a reference to the former agent process. Unauthorized or inadvertent excessive use of network resources by an agent process, or a place process, is prevented by associating with each process a permit which defines various capabilities and resource allowances of the process.

165 Claims, 106 Drawing Sheets

Microfiche Appendix Included
(15 Microfiche, 1241 Pages)

OTHER PUBLICATIONS

K. Nielsen, et al., "Inter–Processor Communication and ADA in Distributed Real–Time Systems", Computer Communications, vol. 13, No. 8, 1 Oct. 1990, pp. 451–459, XP 000161020.

W. Gentleman, et al., "Administrators and Multiprocessor Rendezvous Mechanisms", Software Practice & Experience, vol. 22, No. 1. Jan. 1992 Chichester GB.

G. Welling, et al. "An Architecture of a Threaded Many–to–Many Remote Procedure Call", Proceedings Of The International Conference On Distributed Compution Systems, Yokohama, Jun. 9–12, 1992 No. Conf. 12, 9 Jun. 1992, Institute Of Electrical And Electronics Engineers, pp. 504–511, XP 000341046.

U. Ramachandran, et al. "An Implementation of Distributed Shared Memory", Software Practice & Experience, vol. 21, No. 5, 1 May 1991, pp. 443–464, XP 000297178.

H. Bruggemann, "Rights in an Object–Oriented Environment", Database Security V. Status And Prospects Results Of The IFIP WG 11.3 Workshop, 4 Nov. 1991, Shepherdstown, USA.

M. Rottman and D. Thompson, "The Amcad Real–Time Multiprocessor Operating System", Proceedings of the IEEE 1989 National Aerospace and Electronics Conference NAECON 1989, pp. 1813–1818, (1989).

A. Corradi, L. Leonardi and M. Zannini, "Distributed Environments Based on Objects: Upgrading Smalltalk Toward Distribution", Ninth Annual International Phoenix Conference On Computers And Communications, 21–23 Mar. 1990 Conference Proceedings, IEEE Computer Society, pp. 332–339, (1990).

J. Padget, R. Bradford and J. Fitch, "Concurrent Object–Oriented Programming in LISP", Computer Journal, vol. 34, No. 4, Aug. 1991, pp. 311–319, (1991).

L. Gunaseelan and R. LeBlanc, Jr., "Distributed Eiffel: A Language for Programming Multi–Granular Distributed Objects on the Clouds Operating System", Proceedings Of the 1992 International Conference on Computer Languages, IEEE Computer Society, pp. 331–340 (1992).

K. Ogata, S. Kurihara, M. Inari and N. Doi, "The Design and Implementation of HoME", ACM Sigplan '92 Conference On Programming Language Design And Implementation, San Francisco, CA 17–19 Jun. 1992, ACM Sigplan Notices, vol. 27, No. 7, pp. 44–54, (Jul. 1992).

James W. Stamos and David K. Gifford, "Remote Evaluation", ACM Transctions on Programming Languages and Systems, vol. 12, No. 4, Oct. 1990, pp. 537–565.

James W. Stamos and David K. Gifford, "Implementing Remote Evaluation", IEEE Transactions on Software Engineering, vol. 16, No. 7, Jul. 1990, pp. 710–722.

Wolfson, C. Daniel; Voorhees, Ellen M.; and Flatley, Maura M., "Intelligent Routers", 9th International Conference on Distributed Computing Systems, pp. 371–376 (1989).

Tsichritzis, D.; Fiume, E.; Gibbs, S.; and Nierstrasz, O., "KNOs: KNowledge Acquisition, Dissemination, and Manipulation Objects", ACM Transactions on Office Information Systems, vol. 5, No. 1, pp. 96–112 (Jan., 1987).

Casais, Eduardo, "An Object Oriented System Implementing KNOs", Proceedings of the Conference on Office Information Systems, vol. 9, Nos 2–3, pp. 284–290 (1988).

Kahn, Robert E., and Cerf, Vinton G., "The Digital Library Project: vol. 1: The World of Knowbots"; Corporation of National Research Initiatives (Draft) (1988).

Borenstein, Nathaniel S., "Secure and Portable Active Messaging: A New Platform for Distributed Applications and Cooperative Work," was to be submitted to Communications of the ACM for publication (date unknown).

Curtis, Pavel, "LambdaMOO Programmer's Manual", retrieved as /lambda/moo/gamma/ProgrammersManual.texinfo from the Internet network (Aug. 1991).

Hutchinson, Norman C.; Raj, Rajendra K.; Black, Andrew P.; Levy, Henry M.; and Jul, Eric, "The Emerald Programming Language Report", Technical Report 87–10–07, Department of Computer Science, University of Washington (Oct. 1987).

Jul, Eric; Levy, Henry; Hutchinson, Norman; and Black, Andrew, "Fine–Grained Mobility in the Emerald System", ACM Transactions on Computer Systems, vol. 6, No. 1, pp. 109–133 (Feb. 1988).

Rashid, Richard F., and Robertson, George G., "Accent: A Communication Oriented Network Operating System Kernel", ACM document number 0–89791–062–1–12/81–0064, pp. 64–75 (1981).

Butterfield, David A., and Popek, Gerald J., "Network Tasking in the Locus Distributed Unix System", Locus Computing Corporation, Santa Monica, California, pp. 62–71 (date unknown).

Douglis, Fred, "Process Migration in the Sprite Operating System", Report No. UCB/CSD 87/343, Computer Science Division (EECS), University of California, Berkeley (Feb. 1987).

Powell, Michael L., and Miller, Burton P., "Process Migration in DEMOS/MP", ACM document number 0–89791–115–6/83/010/0110 pp. 110–119 (1983).

Theimer, Marvin M.; Lantz, Keith A.; and Cheriton, David R., "Preemptable Remote Execution Facilities for the V–System", ACM document number 0–89791–174–1–12/85–0002 pp. 2–12 (1985).

Borenstein, Nathaniel S., "Computational Mail as Network Infrastructure for Computer–Supported Cooperative Work, "CSCW 92 Proceedings, pp. 67–74 (Nov., 1992).

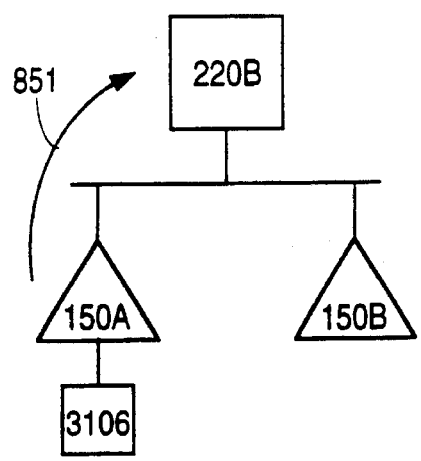
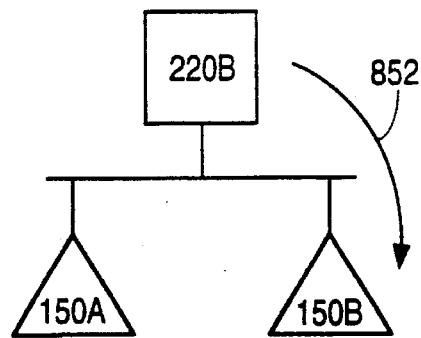
FIG. 8B　　　　　FIG. 8C
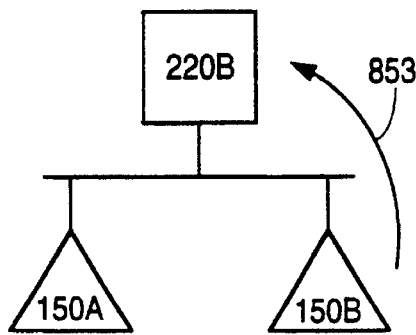
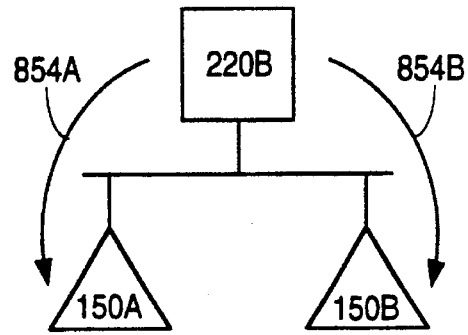
FIG. 8D　　　　　FIG. 8E
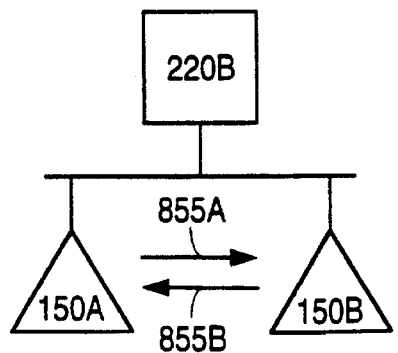
FIG. 8F

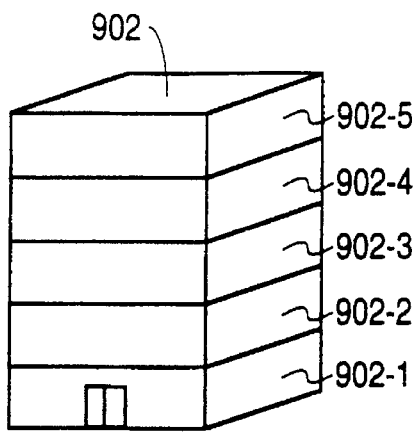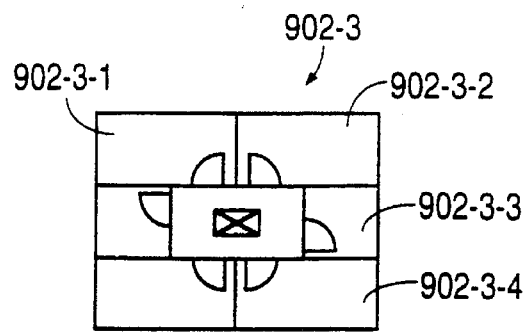
FIG. 9A
FIG. 9B
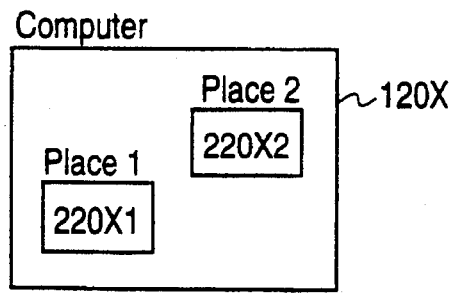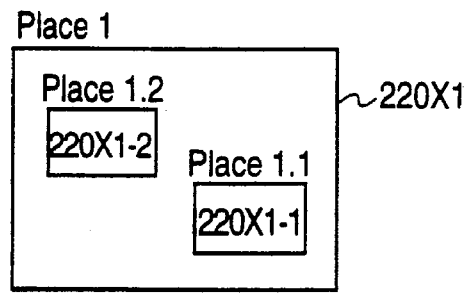
FIG. 9C
FIG. 9D
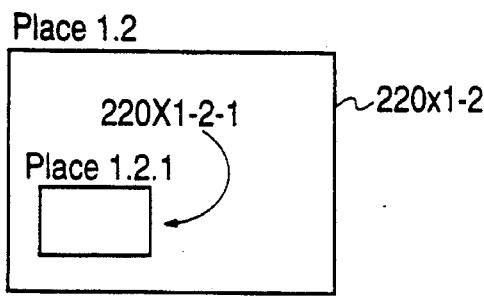
FIG. 9E

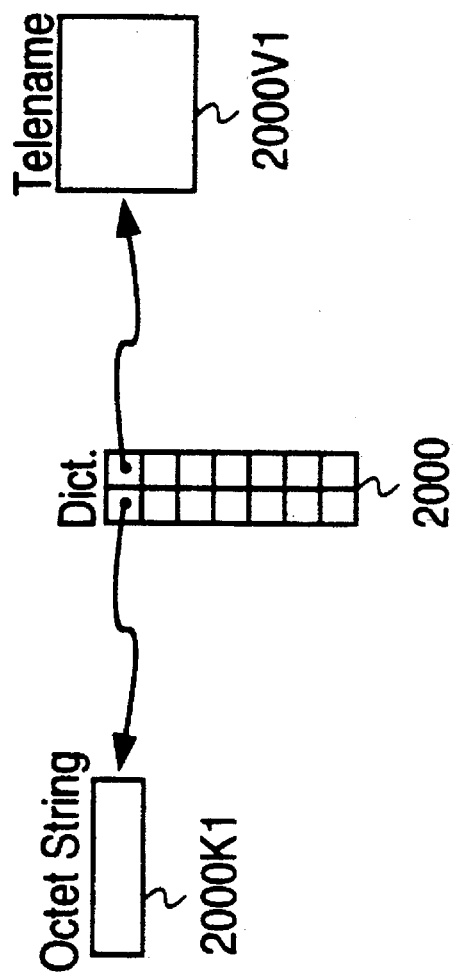

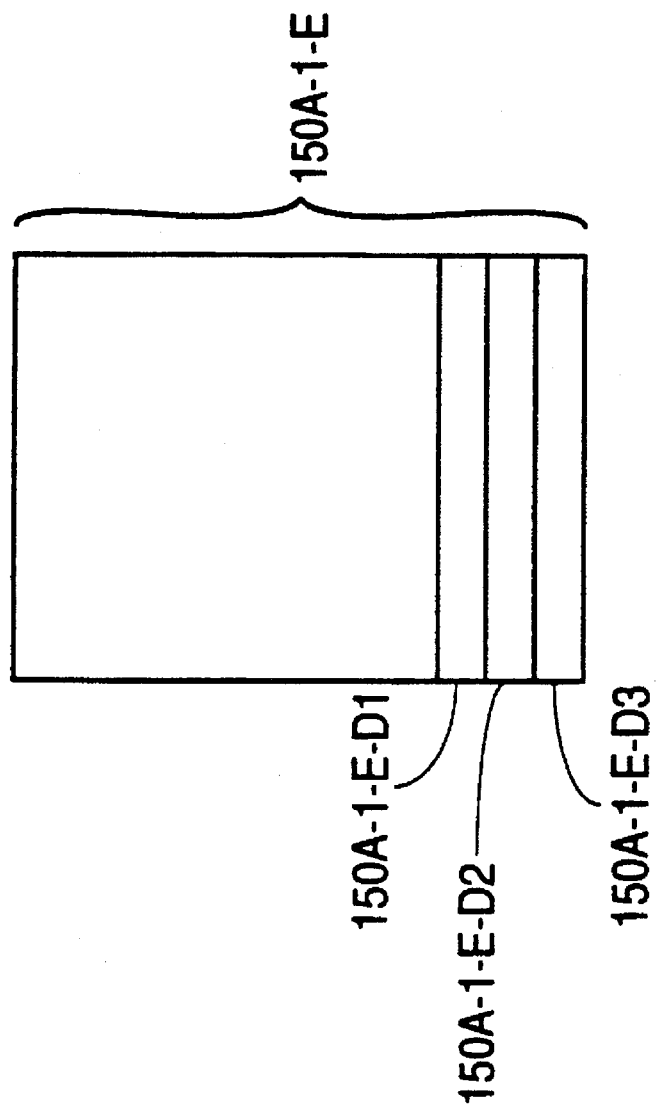

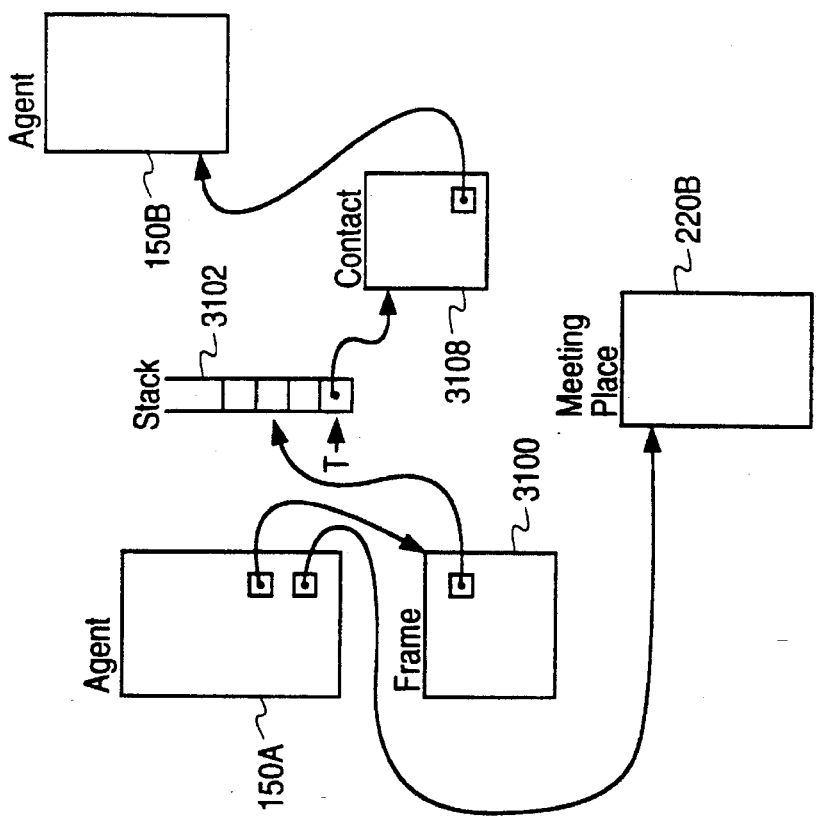
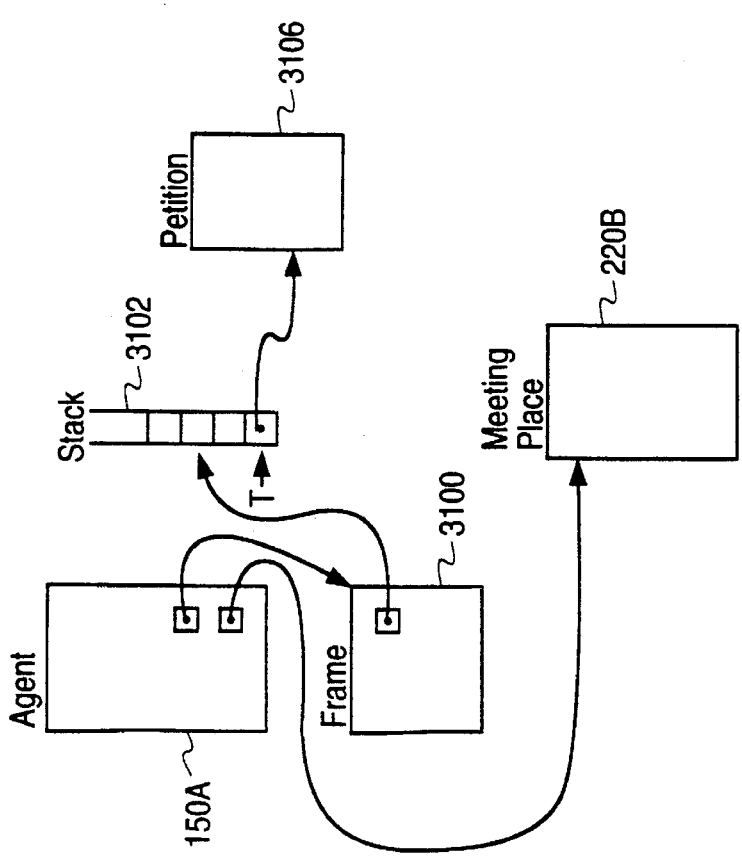
FIG. 31B
FIG. 31A

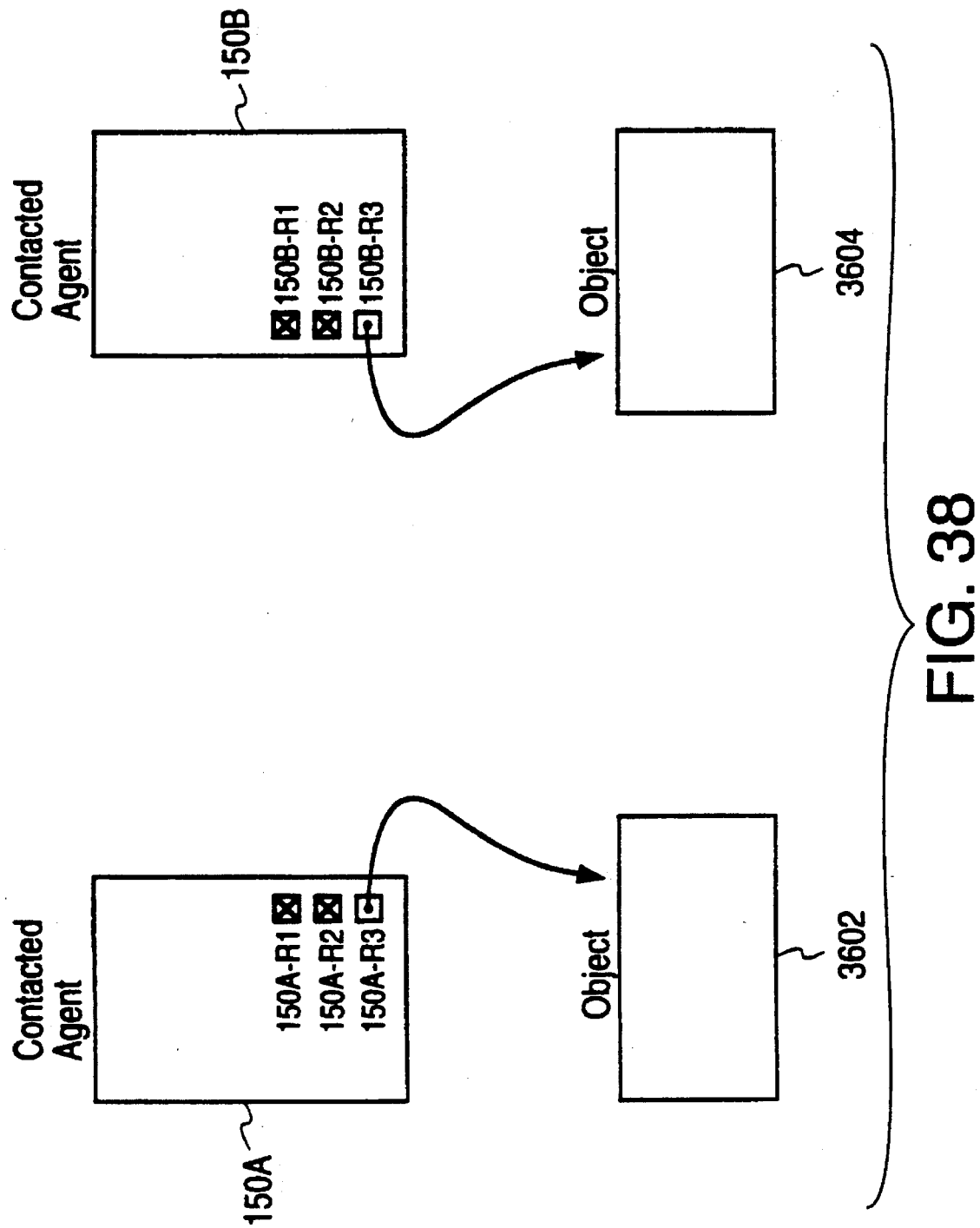

SYSTEM AND METHOD FOR DISTRIBUTED COMPUTATION BASED UPON THE MOVEMENT, EXECUTION, AND INTERACTION OF PROCESSES IN A NETWORK

CROSS REFERENCE TO MICROFICHE APPENDIX

Appendix E, which is a part of this disclosure, is a microfiche appendix consisting of one (1) sheet of microfiche having a total of five (5) frames. Microfiche Appendix E describes the interchange of objects during the movement of a process through a network in one embodiment of the present invention, which is described more completely below.

Appendix F, which is a part of this disclosure, is a microfiche appendix consisting of one (1) sheet of microfiche having a total of 51 frames. Microfiche Appendix F describes the transfer of data between computer systems interconnected via a network in one embodiment of the present invention.

Appendix G, which is a part of this disclosure, is a microfiche appendix consisting of 13 sheets of microfiche having a total of 1,185 frames. Microfiche Appendix G is a list of computer programs and related data in one embodiment of the present invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to a distributed computing environment and in particular, to an improved distributed computing environment wherein processes are created in an object oriented environment and direct their own movement throughout a computer network.

BACKGROUND OF THE INVENTION

Many different computing systems are available today, but most of these systems are built around fundamental components such as those illustrated in FIG. 1. Typically, a computer system 20 includes a central processing unit 10 (CPU), which is connected through an input bus 11 to an input module 12 and through an output bus 13 to an output module 14. CPU 10 is also connected through data buses 15, 16 to a memory unit 17.

CPU 10 provides control and computing functions. Input and output modules 12, 14 are used to communicate between the computer user and CPU 10. Input module 12 supplies information to CPU 10. Typical input devices are a keyboard and a mouse. Output module 14 displays information from central processing unit 10. Typical output modules include video display monitors, printers, plotters and other visual display means. Input unit 12 and output unit 14 are frequently referred to as input/output (I/O) units.

Memory unit 17 typically contains two general types of information, instructions and data. A computer program is a sequence of instructions that are executed by the computer to perform a specific function. Data in memory unit 17 are processed by CPU 10 in response to the instructions from a computer program which is executing in CPU 10. An executing computer program is called a computer process.

Memory unit 17 typically includes mass memory 17A, sometimes called secondary memory, and main memory 17B. Main memory 17B is usually used to store at least a portion of a program currently being executed by CPU 10 and data required by the program. Mass memory 17A, e.g. magnetic disk or tape, is used to store programs, data, or portions of either programs or data which are not needed immediately by CPU 10 or which cannot be accommodated in main memory 17B because of size limitations of main memory 17B.

The operating system of a computer is a computer process which coordinates operation of CPU 10, I/O devices 12, 14 and 17A and main memory 17B and which provides an interface between user applications (defined below) and computer hardware. As is used herein, the term computer hardware refers to the physical components of the computer system. As an operating system is necessary for the orderly operation of a computer system, the operating system is loaded into main memory 17B and executed during power up of the computer system (a process called "booting") and remains in main memory 17B and in execution until the computer system is ultimately deactivated.

A user application generally refers to a computer process which executes in addition to, and is generally considered distinct from, the operating system. A user application begins at some point in time as source code, i.e., computer instructions in a form intelligible to human beings. This source code is translated or "compiled" into object code, which is a form intelligible to computer system 20, particularly CPU 10. Several object code modules may be linked to form a single executable image, which is in a form which can be processed by CPU 10 of computer system 20. The program is executed by copying the executable image into main memory 17B and instructing CPU 10 to carry out the instructions, one by one, of the executable image. As stated above, a computer program in such state of execution is called a process.

The instructions executed by a process executing within computer system 20 generally manipulate the resources of computer system 20. For example, instructions can manipulate data stored in mass memory 17A, accept data from input module 12 or display data on output module 14. Some processes, which are designed to execute on a first computer system, are configured to issue computer instructions which manipulate resources of a second computer system.

It is well-known in the art of computer communications to connect two or more computer systems such that data can be transferred between two or more computer systems. Two or more computer systems so connected are collectively called a "network". In such a network, each computer system treats each other computer system as an I/O device to which data can be sent and from which data can be received.

A first process executing on a first computer system can issue instructions to a second process executing on a second computer system. The second process then manipulates the resources of the second computer system in accordance with the instructions received from the first process. The second process is called a "server" process because the second process provides a service to the first process, which is called a "client" process. The service provided is the manipulation of resources of the second computer system.

Many computer communication systems implement what is called "remote procedure calling". In remote procedure calling, a client process, which is executing on a first computer system and which seeks to manipulate data on a second computer system, requests action through a server process, which is executing on the second computer system and which manipulates data in response to requests from the client process. The server process performs any of an inevitably finite list of operations on behalf of the client process. Often it is the case that the precise function requested by the client process is not among the particular operations performed by the server process. To perform a function for which no server process operation is defined requires several requests to and responses from the server process that require substantial use of communications media which in turn involves considerable expense and time.

Logic flow diagram 200 (FIG. 2A) illustrates an example of remote procedure calling. Logic flow diagram 200 is described in the context of computer systems 20A and 20B (FIG. 2B), which are interconnected through network 256. Suppose a client process 252 on computer system 20A is to delete all files on computer system 20B whose names match a given pattern, e.g., file names ending in ".TMP", and which have not been modified in at least 30 days. Client process 252 sends to server process 254 which is executing on computer system 20B a request to list all files in step 21 (FIG. 2A). Arrow 260 (FIG. 2B) represents that request. Processing transfers from step 21 (FIG. 2A) to step 22 in which client process 252 (FIG. 2B) receives the list from server process 254, as shown as arrow 262. Steps 21 and 22 (FIG. 2A) involve two transfers across network communications media.

Double rectangles in FIGS. 2A and 3A indicate information transfer across network 256 (FIG. 2B). Whereas execution of an instruction within either computer 20A or computer 20B takes between several nanoseconds to several microseconds, transfer of information across network 256 generally takes seconds or minutes depending on the configuration of network 256 and on the amount of information. In some networks, transfer of a large amount of data can take an hour or more.

Processing transfers from step 22 (FIG. 2A) to for each filename step 23. For each filename step 23 and next steps 23a, 23b and 23c define a loop within which each filename of the list of filenames is processed by the client process. For each filename of the list, processing transfers from for each filename step 23 to a test step 24 in which client process 252 (FIG. 2B) compares the filename to a pattern. If the filename does not match the pattern, processing transfers from test step 24 (FIG. 2A) through next step 23a to for each filename step 23 and the next filename is processed.

Conversely, if the filename matches the pattern, processing transfers from test step 24 to step 25. In step 25, client process 252 (FIG. 2B) sends to server process 254 an instruction to provide the date that the particular file was last modified as shown by arrow 264. Processing transfers from step 25 (FIG. 2A) to step 26 in which client process 252 (FIG. 2B) receives from server process 254 the date requested as represented by arrow 266. Steps 25 and 26 (FIG. 2A) involve two more transfers across network communications media for each such matching filename.

Processing transfers from step 26 to a second test step 27 in which client process 252 (FIG. 2B) compares the date received with the current date less 30 days. If the date indicates that the file has been modified within the preceding 30 days, processing transfers from second test step 27 (FIG. 2A) through next step 23b to for each filename test step 23 in which the next filename is processed. Conversely, if the date indicates that the file has not been modified within the preceding 30 days, processing transfers from second test step 27 to step 28.

In step 28, client process 252 (FIG. 2B) sends to server process 254 an instruction directing server process 254 to delete the file from computer system 20B as represented by arrow 268. Processing transfers from step 28 to step 29 (FIG. 2A), in which client process 252 (FIG. 2B) receives from server process 254 acknowledgement of the deletion as represented by arrow 270. Thus, steps 28 and 29 (FIG. 2A) involve two further transfers across network 256 (FIG. 2B) for each file to be deleted.

Processing transfers from step 29 through next step 23C to for each filename step 23. If all filenames in the list have been processed, processing transfers from for each filename step 23 to terminal step 20b in which processing terminates. Thus, processing according to logic flow diagram 200 (FIG. 2A) requires a multitude of information transfers across network 256. Such heavy use of network communications media is both costly and time consuming.

An alternative approach to remote procedure calling is "remote programming". In remote programming, a process, which is called a "client process" and which executes on a first computer system, sends to a server process executing on the second computer system a list of instructions. The instructions are then carried out by the server process effectuating the goal of the client process. The instructions which the server process is designed to carry out must have some degree of generality; i.e., the instructions must provide some degree of decision-making capabilities.

Logic flow diagram 300 (FIG. 3A) illustrates an example of remote programming. To effectuate the example given above with respect to FIGS. 2A and 2B in a remote programming environment, client process 352 (FIG. 3B) in step 31 (FIG. 3A) builds a program whose instructions are represented by logic flow diagram 31-P. Logic flow diagram 31-P is described below.

Processing transfers from step 31 to step 32, in which the program is transferred to computer 30B (FIG. 3B) through network 356 as represented by arrow 358. Processing transfers from step 32 to step 33 (FIG. 3A) in which the program is executed within computer 30B. During execution, the program is process 352A (FIG. 3B) within computer 30B. The instructions of program 352A are executed according to logic flow diagram 300.

In step 31-B (FIG. 3A), a list of filenames is created. Processing transfers from step 31-B to for each filename step 31-C. For each filename step 31-C and next steps 31-H, 31-I, and 31-J form a loop within which each filename in the list of filenames is processed. For each filename, processing transfers from for each filename step 31-C to test step 31-D in which the filename is compared to a pattern. If the filename does not match the pattern, processing transfers from test step 31-D through next step 31-H to for each step 31-C. Conversely, if the filename matches the pattern, processing transfers from test step 31-D to step 31-E.

In step 31-E, process 352A retrieves the date of last modification of the file having the filename. Processing transfers from step 31-E to a second test step 31-F in which the date is compared to the current date less 30 days. The date of last modification of the file is retrieved from server process 354 (FIG. 3B). If the date of last modification is more recent than the date of 30 days prior, processing transfers from second test step 31-F (FIG. 3A) through next step 31-I to for each filename step 31-C. Conversely, if the date of last modification is prior to the date of 30 days prior, processing transfers from second test step 31-F to step 31-G. In step 31-G, the file is deleted by issuing an appropriate instruction to server process 354 (FIG. 3B). Processing transfers from step 31-G (FIG. 3A) through next step 31-J to for each filename step 31-C. If all filenames in the list have been processed, processing transfers from for each filename step 31-C to terminal step 31-K in which process 352A terminates. As indicated by arrows 360 (FIG. 3B), all interaction between process 352A and server process 354 transpired entirely within computer 30B without use of network 356.

After successful completion of the program, processing transfers from step 33 to step 34 (FIG. 3A) in which server process 354 (FIG. 3B) reports to client process 352 that the program completed successfully as represented by arrow 362. Note that this remote programming procedure involves only two uses of network communications media: a first to send the program or list of instructions to server process 354 as represented by arrow 358 and a second to receive from server process 354 notification of successful completion of the program as represented by arrow 362. Note also that client process 352 was able to request of server process 354 an operation not explicitly provided by, and perhaps not even anticipated by the developers of, server process 354.

However, remote programming encounters the same inefficiencies of remote procedure calling when a computer process seeks to coordinate manipulation of data on two or more computer systems. For example, a process on computer X may seek to delete all files on computer system Y or computer system Z which have the same name, date of last modification and size as any file on computer X. Since server process 354 described above with respect to FIGS. 3A and 3B is capable of directly manipulating resources on the computer system on which the server process is executing, i.e. computer system Y, the server process is unable to coordinate data management spanning more than one computer system without producing the inefficiencies discussed above in conjunction with remote process calling.

An improvement over remote programming is described by C. Daniel Wolfson, et al., "Intelligent Routers", *9th International Conference on Distributed Computing Systems* at pp. 371–375 (1989). Wolfson et al. disclosed a system wherein a process could move from one computer system to another within a network. The process directed its own movement through the network by issuing an instruction whose execution caused the process to be moved. The instruction specified to which computer system the process was to be moved.

However, the solution in the form disclosed in Wolfson et al. was of limited functionality. Processes were required to be configured to comport with the specific requirements of the computer system to which the respective processes moved. Processes were not able to communicate with one another; processes instead directly stored or directly retrieved data from the mass memory of the computer system within which the respective processes were executing. One process could only interact with another process only if both processes knew the precise location within mass memory where messages were to be stored and/or retrieved.

The system disclosed by Wolfson et al. did not provide any security. Thus, to the extent that the Wolfson et al. system allowed one process to interact with another process, a malicious process could interfere with the execution of a second process. In addition, the set of instructions provided to processes of the system disclosed by Wolfson et al. was very limited; only character string data and numerical data representing real numbers were provided for.

Another system similar to that disclosed by Wolfson et al. was that described by D. Tsichritzis et al., "KNOs: KNowledge Acquisition, Dissemination, and Manipulation Objects", *ACM Trans. on Office Information Systems*, vol. 5, no. 1, pp. 96–112 (1987). The system described by Tsichritzis et al. added to the system described by Wolfson et al. the generality of object-oriented programming.

Object-oriented programming organizes data and instructions into "objects" in which data represent the "state" of an object and instructions are grouped into tasks or "operations" that the object can "perform". Object-oriented programming represents a very useful conceptual framework in which problems solved by a computer may be more easily reduced to a series of computer instructions.

Objects created in an object-oriented environment are grouped into classes. Objects of a class have states of the same structure and perform the same operations. The system disclosed by Tsichritzis et al. did not provide for the mobility of class definitions; therefore, objects of a given class created within the environment described by Tsichritzis et al. could only travel to those computer systems for which the given class was defined. Additionally, objects in the environment described by Tsichritzis et al. were represented in a form that required that the computer systems of the network, within which objects could travel, were homogeneous.

The system taught by Tsichritzis et al. further described an instruction by which a first process, i.e., a "head" process, could create copies of itself. The copies were called "limbs". Tsichritzis et al. taught that limbs could be sent to remote computer systems at the direction of the head process. However, the limbs were not active; the computer instructions of a limb were executed only at the direction of the head process. Directing the activity of a limb process positioned in a remote computer system required that the head process issue commands to the limbs across network communications media, involving considerable time and expense in large networks.

Further inefficiencies were found in the system taught by Tsichritzis et al. when a small computer, e.g., a personal computer, was connected to a large network through a large computer, e.g., a mainframe computer. For example, to send many limbs to various computers of the network, the small computer was required to send many identical limbs between the small computer and the large computer. As limbs, which are copies of the head process, could be quite large, inefficiencies in such a system could have been quite substantial.

Tsichritzis et al. taught a system wherein a first process communicated with a second process by giving to the second process a reference to the first process. A reference is data which identifies an object and which grants access to the object identified. As the second process contained a reference to the first process, the second process could request that the first process execute specific computer instructions which were contained within the first process. However, as the first process provided the second process with a reference to the first process without simultaneously obtaining a reference to the second process, the second process had access to the first process and the first process did not have reciprocal access to the second process. Such a system permitted a "malicious" process, i.e., a process designed by a malicious programmer or inadvertently designed to harm other processes, to gain access to a second process without granting reciprocal access.

Thus, in spite of the achievements of Wolfson et al. and Tsichristzis et al., neither discloses a system in which new classes of objects and processes can be created and can be transported to and processed by computer systems within the network which do not contain class definitions for the new classes. Neither does either Wolfson et al. or Tsichristzis et al. disclose a mechanism for implementing a complex and hierarchical security scheme. Furthermore, neither Wolfson et al. nor Tsichristzis et al. disclose computer processes which can interact with one another but which cannot gain access to other processes without granting reciprocal access.

Furthermore, neither Wolfson et al. nor Tsichristzis et al. disclose computer processes which can travel to several computer systems simultaneously by creating several autonomous clones of a process and transporting the clones to respective computer systems. The limbs taught by Tsichristzis et al. are not autonomous as the computer process controls the actions of limbs at remote computer systems. Furthermore, neither Wolfson et al. nor Tsichristzis et al. disclose efficient transportation of the clones to the respective computer systems in which transportation of redundant information across network communication media is minimized.

SUMMARY OF THE INVENTION

According to the principles of this invention, a set of interpreted, object-oriented computer instructions is used to create novel computer processes that are executed in a distributed computer system. A particular process that utilizes the set of computer instructions is activated by an engine that is executing within the distributed computer system. The engine interprets and effectuates the instructions of the particular process within the distributed computer system.

Each engine in the distributed computer system interprets the instructions that define a process uniformly. In other words, the instructions which comprise a process and which are interpreted by a first engine do not depend on the particular configuration of the computer system within which the first engine is executing. The instructions, therefore, can be moved to and interpreted by a second engine, even if the first and second engines are executing within two separate computer systems whose operating systems and hardware are otherwise generally incompatible. The interpreted instructions are implemented by using interfaces to communication, storage, computing and other subsystems of the computer system within which the engine is executing. These interfaces, which collectively form part of one embodiment of the present invention, are described in Appendix C, which is a part of this disclosure and is incorporated in its entirety herein by reference.

Two or more engines are interconnected to form a network. The network is a universe within which computer processes of this invention travel. In one embodiment, the network encompasses computer systems that would normally be considered clients of, and not part of, other networks. For example, one embodiment of the network of this invention encompasses the workstations which are connected by the network. The term "workstation" is used herein to describe a computer system which is used for purposes other than the transportation of information to other computer systems. The engines of this invention are interconnected so that engines are capable of moving computer processes among themselves.

To transport a particular computer process, the computer process is suspended and the execution state of the computer process is preserved. The instructions of the computer process, the preserved execution state, and objects owned by the computer process are packaged, or "encoded", to generate a string of data that is configured so that the string of data can be transported by all standard means of communication used to form a network. In one embodiment, the string of data is transported between engines as specified by the protocol described in Appendix D, which is a part of this disclosure and is incorporated herein in its entirety by reference.

Once transported to a destination computer system of the network, the string of data is decoded to generate a computer process within the destination computer system. The decoded computer process includes those objects encoded as described above and has the preserved execution state. The destination computer system resumes execution of the computer process. The instructions of the computer process are executed by the destination computer system to perform complex operations, including defining, creating and manipulating data objects and interacting with other computer processes executed by the destination computer system. As computer processes are uniformly interpretted throughout the network and are encoded and decoded for transport between computer systems, the computer processes of this invention provide a new level of functionality and versatility in intercomputer communication.

In one embodiment, two classes built into the set of computer instructions of this invention are an agent class and a place class. Instructions formed using the agent class are interpreted by an engine to form an "agent process", sometimes referred to herein simply as "an agent". An agent is an active object in that an engine initiates execution of an agent upon creation of the agent. The agent class provides instructions which enable an agent to (i) examine and modify itself, (ii) transport itself from a first place process, which is described more completely below, in the network to a second place process in the network, and (iii) interact with other agents found at the second place process. The first and second place processes can execute within two separate computer systems of the network. Thus, an agent can travel from a first computer system to a second computer system.

An agent can contain information which is carried with the agent from the first place process to the second place process. Additionally, the extensibility, generality and functionality of the set of computer instructions discussed more completely below provide tremendous flexibility and control in determining, according to the instructions which comprise an agent, how and to what destination the agent, and the information contained therein, travels.

The power of agents is counterbalanced by "permits". A permit limits the particular capabilities of a particular agent on particular occasions. The permit of an agent specifies which of several of the operations defined for the agent class can or cannot be performed by the agent. The permit further limits the amount of processing resources the agent can consume and the time at which the agent expires. Additionally, the permit specifies the priority of execution of the agent relative to other agents.

Instructions formed using the place class are interpreted by an engine to form a "place process", sometimes referred to herein simply as "a place". A place is also an active object, and the place class provides instructions which enable a place to examine and modify itself and to serve as a venue for agents and a context in which agents can interact. Agents each occupy a respective single place. Additionally, each place can occupy a single other place.

Places provide a degree of privacy and security for agents. For example, an agent, which is configured to avoid contact with other agents, can occupy a place which is not generally known to other agents, or which denies ingress to other agents. Conversely, an agent, which is configured to provide services publicly to a large number of agents, can occupy a place which is widely known to other agents and which grants ingress to other agents.

Agents cannot interact at a distance; i.e., no two agents can interact unless both occupy the same place. To interact with a second agent occupying a second place, a first agent, which occupies a first place, issues a command causing the first agent to be transported to the second place as discussed below with respect to the "go" operation. While both the first and second agents occupy the second place, the first agent can interact with the second agent.

Thus, the processes of this invention are a novel implementation of "remote programming," and not the more familiar "remote procedure calling" paradigm. Remote programming improves upon remote procedure calling by (i) enabling processes to interact without communicating across network communications media and (ii) improving the performance of the interactions between processes by eliminating communication across network communications media which often has high-latency.

The movement of an agent process, from a first place process in a first computer system to a second place process either in the first computer system or in a second computer system is called a trip. The agent initiates the trip by using a "go" operation, which is defined in the agent class. The agent controls the movement either through the network or within the computer system by creating and submitting, as an argument to the "go" operation, a ticket which defines the trip. In one embodiment, the ticket specifies the place to which the agent is to travel, the "way" by which the agent is to travel, the amount of time in which the trip must be completed, and an indication of the urgency of the trip, i.e., the priority of the trip relative to other trips by other agents that may be concurrently scheduled.

The ticket can identify the destination place by specifying the address, name, class or any combination of the address, name and class of a place to which the agent is to travel. The destination of the trip is any place of the specified address, name and/or class which grants the agent ingress within the time permitted by the ticket.

In the "go" operation, the agent is moved from a first place to a second place as follows: (i) the agent is suspended and the execution state of the first agent is preserved; (ii) the agent is represented in a standardized form, i.e., an octet string, which includes representation of the agent's preserved execution state; (iii) the standardized form is transported from the first place to the second place, potentially involving the transfer of the standard form from a first computer to a second computer; (iv) the agent at the second place is formed from the standardized form, including the execution state represented in the standardized form; and (v) interpretation of the agent is resumed, the agent initially having the execution state represented in the standardized form.

As mentioned above, the set of computer instructions of the present invention is object-oriented. Therefore, all objects formed according to the present invention are organized into classes. All classes in the present invention are represented by data objects which can be moved along with an agent. Thus, classes, which are not defined within a place, can nevertheless be used by an agent travelling to the place simply by the agent defining the classes and transporting the corresponding class objects to the place.

Every object in one embodiment of the present invention is owned by a process, i.e., either an agent or a place. When an agent travels from a first place to a second place, all objects owned by the agent are effectively moved to the second place along with the agent. However, as discussed below, objects which are equivalent to objects already occupying the second place are not transported in one embodiment of the present invention. In addition to the objects owned by the agent, all class objects defining classes of which those objects are members are moved along with the agent to the second place. A class object is an object constructed in accordance with the set of computer instructions described below and in Appendix A which represents a class of objects.

Thus, if an object owned by an agent travelling to a second place is a member of a class not defined in the second place, the object can still travel with the agent as the agent also carries to the second place class objects defining the classes of which the object is a member. In the prior art, a process which travelled from a first computer to a second computer could only process data objects which belonged to classes defined on the second computer. Class definitions were not typically transported with migrating processes in the prior art. As new classes can be formed within a first place and members of those new classes are free to travel to other places for which those new classes are not defined, the present invention provides agents a level of extensibility, mobility and generality not found in the prior art.

In the present invention, many classes of objects are defined at multiple places and therefore do not need to be moved to such places. Class objects and any other objects, which are likely to be found at many places are made interchangeable in one embodiment of the present invention.

Interchangeable objects each have a digest. An interchangeable object, which is owned by an agent that is travelling from a first place to a second place, does not travel with the agent. Rather, the digest of the interchangeable object is moved with the agent to the second place. When the agent arrives at the second place, interchangeable objects in the computer system which contains the second place are examined to determine whether any of the interchangeable objects has a digest equal to the digest transported with the agent. If such an interchangeable object is found in the computer system which contains the second place, the interchangeable object is substituted for the interchangeable object, which was left behind at the first place.

If, however, no such interchangeable object is found at the second place, the interchangeable object left behind at the first place is moved to the second place. In this way, the movement of objects across network communications media is avoided when equivalent objects are present at the destination place. In particular, as class objects are interchangeable, an agent travelling to a second place causes the movement to the second place of only those class objects defining classes which are not defined within the second place. Avoiding unnecessary movement of class objects through the network makes practical the movement of objects owned by an agent to places which contain no definition of one or more classes to which those objects belong.

In one embodiment of the present invention, classes are identified by citations. In a computer network having many computer systems supplied by different vendors, various versions of the disclosed instruction set can be implemented on various computer systems to which and from which agent processes can travel. A citation is an object which is used to identify classes or objects which are forward- or backward-compatible with one another. Therefore, an instruction requiring use of an object of a first class, or the first class itself, can use an object of a second class, or the second class itself, depending on the particular requirements of the instruction, if the second class is backward-compatible with the first class.

An agent, occupying a first place, is also capable of creating one or more clones of the agent and moving each clone to a respective place. A clone is an agent process which is the result of duplicating an existing agent process. An agent initiates and controls the creation of one or more clones, and the movement of each clone to a respective place process by performance of operation "send." The agent specifies the number of clones to be created and defines the corresponding trips by creating one or more tickets which are supplied as arguments to operation "send". Each ticket defines a trip to be taken by a respective clone of the agent. The number of tickets supplied by the agent defines the number of clones created.

Once a clone of the agent is moved to a second place, the clone initially has the execution state of the agent at the time the clone was created. Thus, when the clone arrives at a second place, the clone continues to execute so as to simulate the movement of the agent to the second place as described above with respect to operation "go."

In the prior art, a first process, i.e., a head process, created limb processes which had the same interface, i.e., could generally perform the same operations, as the head process. Limb processes did not act except as directed by the head process and could move to remote computer systems only at the direction of the head process.

In the present invention, however, a clone is autonomous and is not controlled by the agent which created the clone. For example, the clone can be configured to ignore all attempts by the agent to arrange a meeting, which is discussed below, whereby the agent and the clone can interact. The agent must attempt to interact with a clone of the agent in the same way the agent attempts to interact with any other agent, as discussed below. As the clone is autonomous, the clone occupying the second place can travel to a third place by performance of operation "go" without being so instructed by the agent and even without the consent of the agent.

As limb processes of the prior art were not active and acted only at the direction of a head process, the head process and a remote limb process necessarily interacted across network communications media. The paradigm of this prior art system is therefore more closely related to remote procedure calling. In contrast, clones of agents formed in accordance with the present invention are active and autonomous and embody all of the instructions which form the agent. Therefore, no interaction is required (in fact, no interaction is allowed) across network communications media. Therefore, the paradigm of the present invention is more closely related to remote programming. The present invention therefore represents a significant increase in generality over the prior art.

Increases in efficiency in one embodiment of the present invention are realized in performance of operation "send" by deferring cloning of an agent as long as possible. For example, a first clone and a second clone are to be sent to a first place and a second place, respectively. Suppose that the agent is executing within a first computer system, that the first place is executing within a second computer system, and that the second place is executing within a third computer system. Suppose further that in travelling to the first and second places, the first and second clones must travel through an engine executing on a fourth computer system. In such a case, a single clone is formed and transported to the engine executing within the fourth computer system. Thus, only a single clone is created within the engine interpreting the original agent thereby saving space within that engine and only a single clone is transported across network communications media to the fourth computer system thereby saving time in transporting clones to the fourth computer system. The engine executing within the fourth computer system forms from the single clone the first and second clones and transports the first and second clones to the first and second places, respectively.

As an agent can own objects which account for a substantial majority of the size of the agent, e.g., a rasterized graphical image such as a facsimile transmission or digitized sound, avoiding sending several copies of such large objects, each copy owned by a respective clone, to a single engine saves substantial time and expense.

A first agent, occupying a place, can initiate a meeting between the first agent and a second agent occupying the place. During such a meeting, the first agent can transfer to and receive from the second agent data in the form of objects, and the second agent process can transfer to and receive from the first agent data in the form of objects.

The present invention represents a significant improvement over a prior art system which teaches the posting of messages on a virtual bulletin board by a first process. The messages are then "read" by the intended recipient process. In the prior art system, a first process gives to a second process a reference to the first process by posting the reference on the virtual bulletin board. However, since there is no mechanism for simultaneous exchange of references, the second process has access to the first process before giving to the first process a reference to the second process. Thus, there is no mechanism to prevent "malicious" processes from gaining access to other processes without granting to the other processes access to themselves.

The present invention represents an improved method of establishing contact between two processes such that a first process cannot obtain access to a second process without simultaneously granting to the second process access to the first process.

In one embodiment of the present invention, two agents can interact only if both agents occupy the same place and the place is a meeting place. A meeting place is a place that is a member of a class of meeting places, which is a subclass of the class of places. A first agent directs that a meeting be arranged between the first agent and a second agent by issuing an instruction directing the meeting place to arrange the meeting. The issued instruction is called operation "meet", and the first agent's issuance of the instruction is called "requesting a meeting".

The first agent supplies, as an argument to the instruction, a petition defining the meeting. The petition defines the meeting by specifying the second agent as the petitioned agent. The second agent is specified by specifying the name and/or the class of the second agent. The petition further defines the meeting by specifying the amount of time in which the meeting must be arranged or abandoned.

In arranging the meeting, the meeting place supplies to the second agent the name and class of the first agent and indicates that the first agent has issued an instruction requesting a meeting with the second agent. The second agent examines the name and class of the first agent and responds to the meeting place either accepting or rejecting the meeting with the first agent.

If the meeting is rejected, the first agent is informed that the second agent is not available. If the meeting is accepted, the meeting place gives to the second agent a reference to the first agent and gives to the first agent a reference to the second agent. With a reference to the second agent, the first agent (i) can direct the second agent to perform operations; (ii) can supply to the second agent objects as arguments; and (iii) can receive from the second agent objects as results. As the second agent has a reference to the first agent, the second agent has similar capabilities with respect to the first agent.

Either the first or the second agent can terminate the meeting between the two by issuing an appropriate command. The meeting place, in performing an operation "part" in response to the issued command, voids any references to the second agent contained within the first agent and voids any references to the first agent contained within the second agent, thereby terminating interaction between the two agents.

The present invention represents a significant improvement over the prior art as a first agent cannot gain access to a second agent unless the second agent agrees or without granting to the second agent access to the first agent. Additionally, since two agents cannot interact unless both occupy the same meeting place, intermediate levels of security are available to agents. For example, an agent can protect itself from other agents by occupying a meeting place whose location is not widely known by other agents. Inversely, an agent, which is designed to be highly visible, may occupy a well-known meeting place. No such mechanism is available in the prior art.

BRIEF DESCRIPTION OF THE DRAWINGS

FIGS. 8A–8F illustrate interaction between two agent processes by using operation "meet".

FIGS. 9A–9E illustrate the interrelations of place processes formed in accordance with one aspect of the present invention.

FIG. 20A shows a dictionary formed according to one embodiment of the present invention.

FIG. 30B shows the structure of an encoded clone of an agent process formed in accordance with an aspect of the present invention.

FIGS. 31A and 31B show the state of a process immediately preceding and following, respectively, performance of operation "meet".

FIG. 38 shows the state of the agent processes shown in FIG. 36 immediately following performance of operation "part".

GLOSSARY OF TERMS

Figure 1:
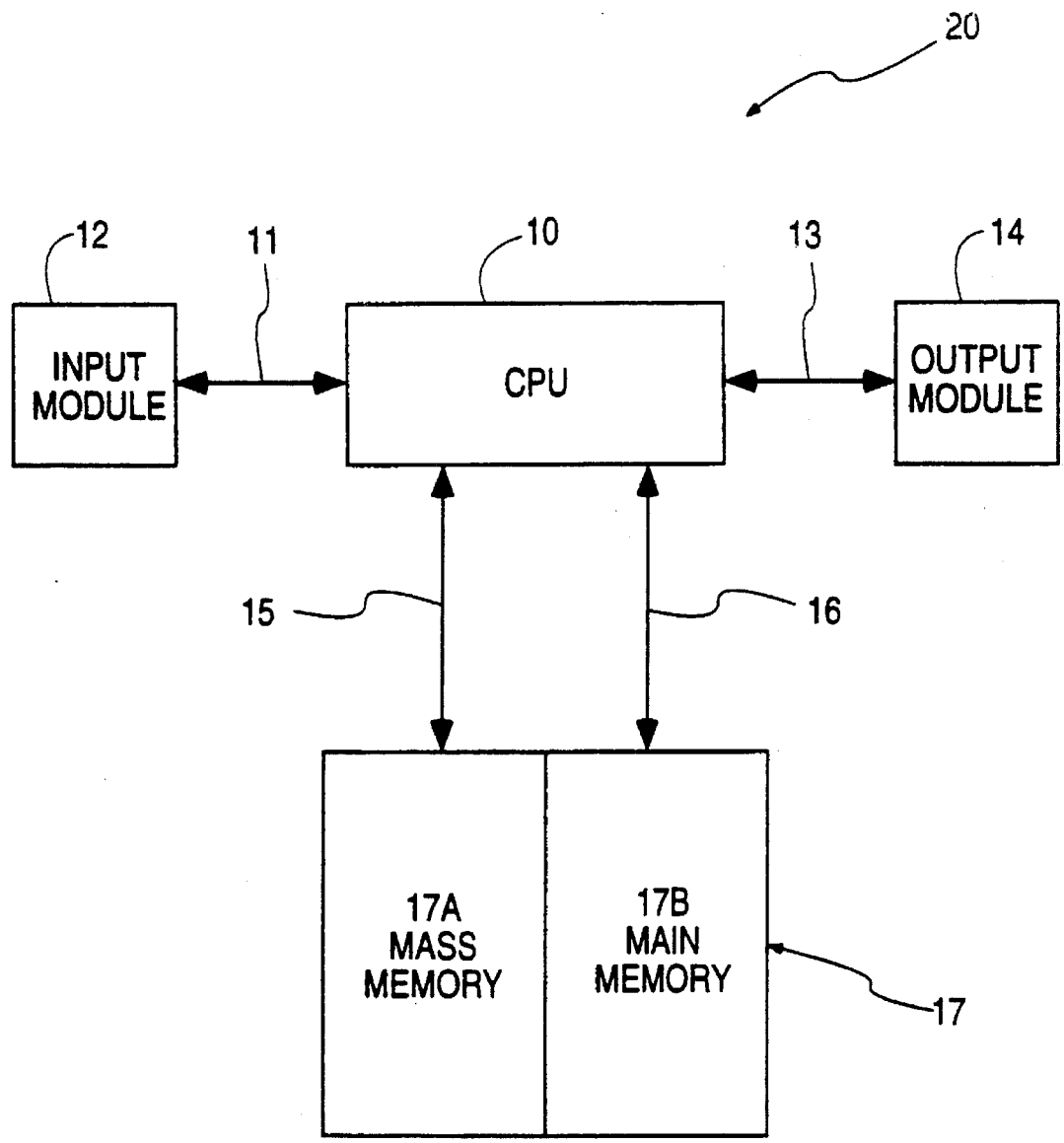
FIG. 1 shows the structure of computer systems of the prior art.
Figure 2A:
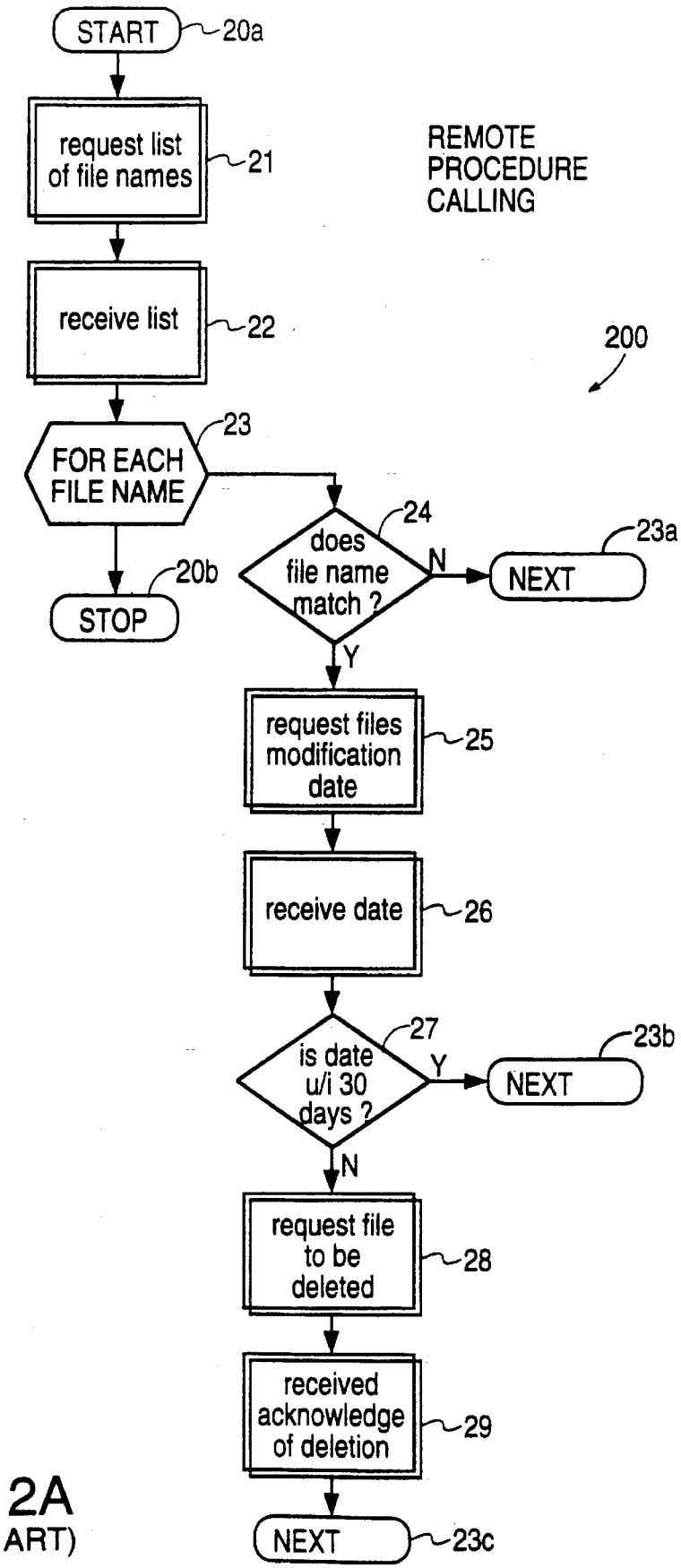
FIG. 2A is a logic flow diagram of a prior art method using remote procedure calling.
Figure 2B:
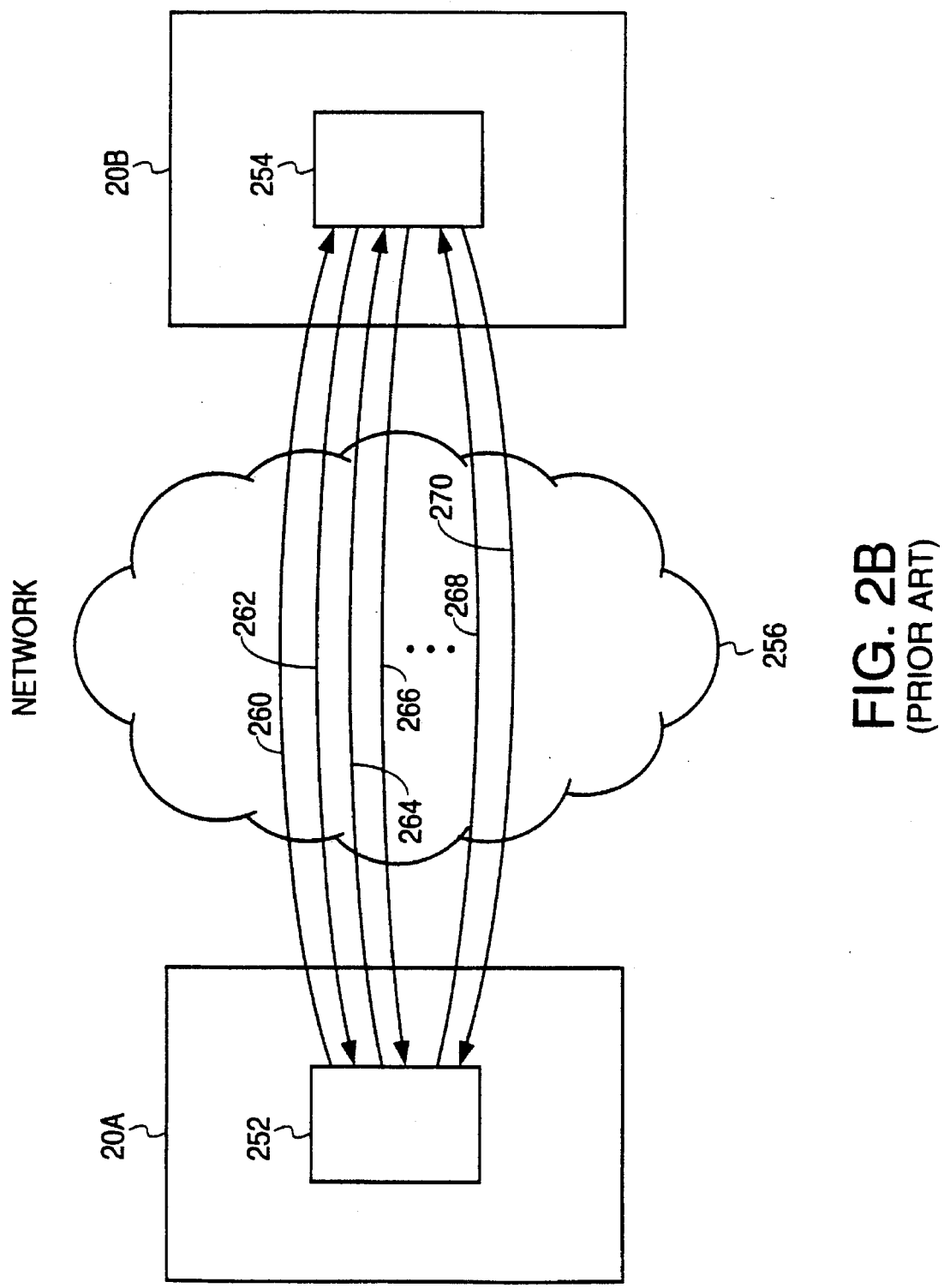
FIG. 2B shows a prior art network implementing remote procedure calling.
Figure 3A:
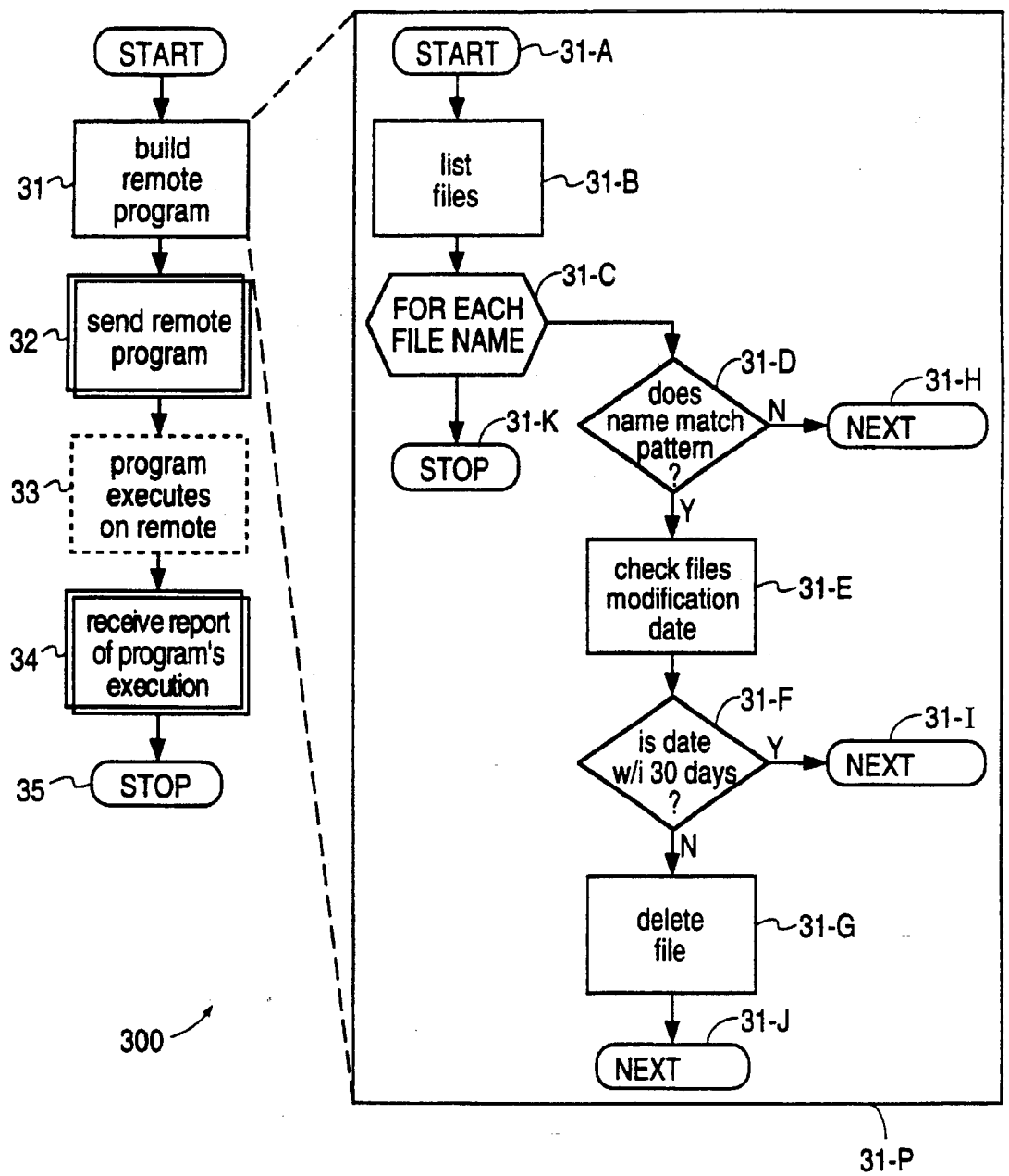
FIG. 3A is a logic flow diagram of a prior art method using remote programming.
Figure 3B:
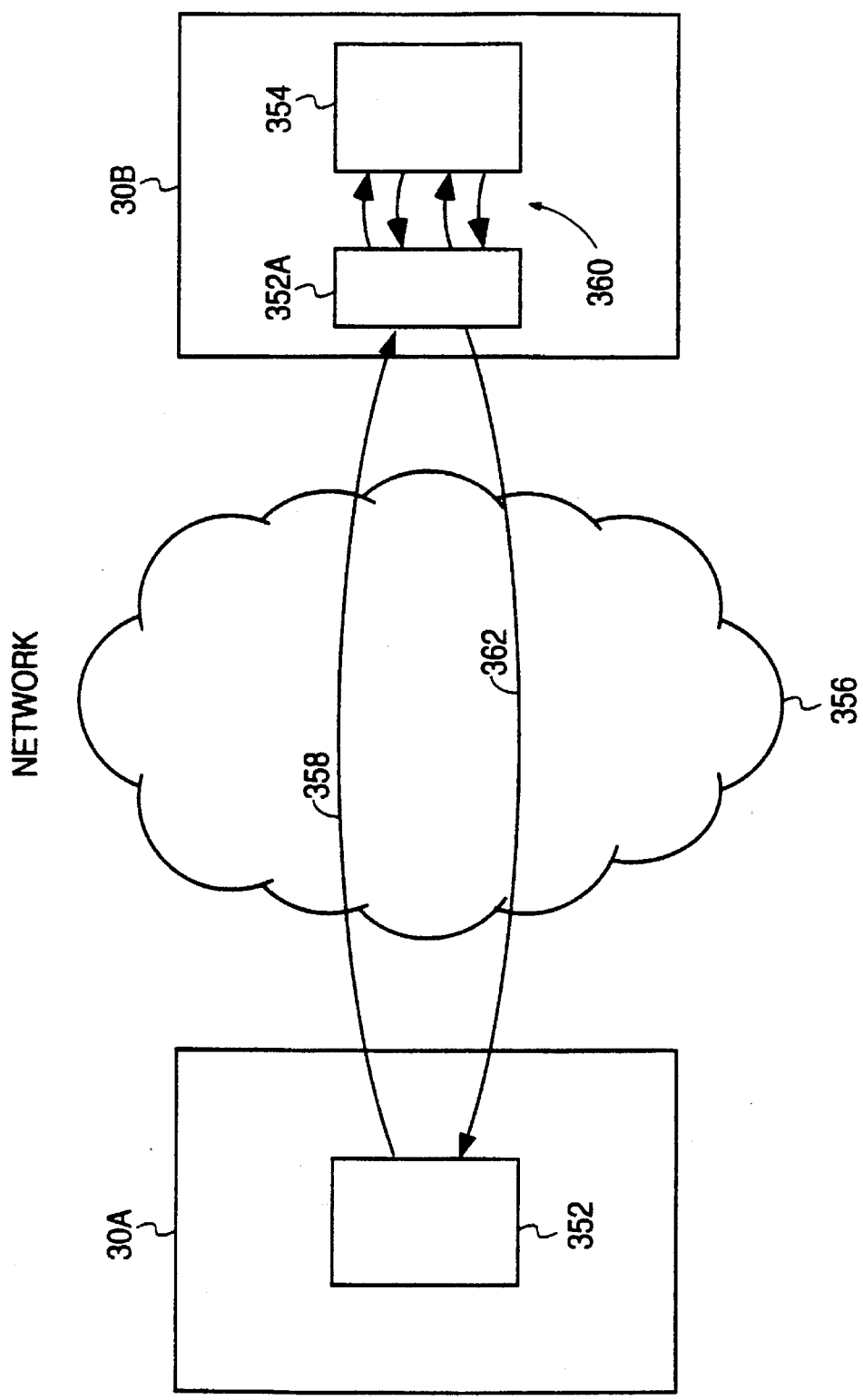
FIG. 3B shows a prior art network implementing remote programming.

"Abstract Class": A class which is abstract has no instances. An abstract class can have subclasses, and an abstract class can define features, methods, and properties which are inherited by the subclasses of the abstract class.

"Agent": An agent is a process which occupies a place and which is mobile, i.e. can move from a first place to a second place.

"Arguments": An argument is an object "consumed" by performance of an operation as input data. In other words, an argument is an object transferred from the requester to the responder immediately prior to performance of the operation by the responder at the request of the requester.

"Attribute": An attribute is a feature which either retrieves or sets information regarding the internal state of an object. Usually the information pertains to the object itself, but sometimes the information pertains to the reference by which the object is identified in invoking the attribute. An attribute is a pair of operations in which one sets, and the other retrieves, information regarding the internal state of the responder.

"Authority": An authority is an entity which owns and controls various resources in the network. An example of an authority is a user of the network. Authorities are created administratively and cannot be created programmatically, i.e., cannot be created at the request of a process.

"Class": A class defines (i) zero or more properties, which define the internal states of the members of the class, (ii) zero or more methods, which define the internal behavior of the members of the class, and (iii) zero or more features, which define the external behavior of the members of the class.

"Concrete Class": A class which is concrete can have instances.

"Engine Place": Every engine contains exactly one engine place which represents the engine itself.

"Engine": An engine is a machine in a computer system which manages objects, primarily processes, and executes instructions. An engine is typically a computer process executing within a computer system in addition to an operating system and various user applications. One or more engines can be executing within each computer system of a network. Each engine processes at least one place.

"Exception": An exception is an object "thrown" by performance of a feature if the feature fails to be performed completely and successfully. An exception, as the term is used herein, is alternatively a condition which causes such an object to be thrown. The responder is said to "throw" an exception, rather than "produce" an exception, because an exception arises from the failure of an operation and is therefore distinct from a result which is produced by a successful operation. The distinction between producing a result and throwing an exception is described in more detail below and in Appendix A which is hereby incorporated herein in its entirety by reference.

"Feature": A feature is a task that an object can be directed to perform. The task is carried out by a method, which includes a set of computer instructions. Performance of a feature is accomplished by execution of the computer instructions of the feature's method. A feature is associated with a specific class of objects, and performance of a feature can vary with the specific internal state of the object performing the feature. Features are conceptually divided into the two categories: (i) attributes and (ii) operations.

"Frame": A frame is an object which records the dynamic state of a method implementing a feature during performance of the feature. A frame is used by an engine to maintain information regarding a method which the engine is executing, including information identifying the object performing the feature implemented by the method and the particular instruction that is currently executing.

"Identifier": An identifier is an object which can reference a second object. The "text" of an identifier is a string which distinguishes the identifier from other identifiers within a particular scope. The various scopes of identifiers are discussed in greater detail in Appendix A.

"Implementation": An implementation is a set of computer steps performed in performance of a particular feature. An "implementation object" is an object defining the various implementations of the various features of a class.

"Instance": An object is an instance of a class if the object is a member of that class and is not a member of any subclass of that class.

"Interface": An interface defines a particular attribute or the particular arguments consumed and the result produced by performance of a particular operation. An "interface object" is an object defining the various interfaces of the various features of a class.

"Member": An object is a member of the class of which the object is an instance and any superclasses of that class.

"Method": A method is a set of computer instructions whose execution constitutes performance of a particular feature. A "method object" is an object defining a method. A method has a dynamic state during performance of the method, i.e., execution of the instructions of the method. The dynamic state of a method is represented by a frame.

"Network": All engine places, the computer systems in which the engine places execute and communications apparatus connecting those computer systems collectively form a network.

"Object": An object is an element in a computing environment within a computer system. An object has an internal state defined by zero or more properties, an internal behavior defined by zero or more methods, and an external behavior defined by zero or more features.

"Operation": An operation is a feature for which an interface and implementation is defined.

"Place": A place is a process which is a locale for zero or more processes. A place can occupy a second place. The first-mentioned place is a subplace of the second place, and the second place is a superplace of the first place.

"Primitive": A primitive is an object that can be used in the formation of a procedure or a method, and that therefore can serve as an instruction.

"Process": A process is an object which constitutes an autonomous computation. A process is autonomous because a process performs a method without being requested to do so by another object. A process commences performance of a central method upon creation of the process, and the process is destroyed upon completion of the central method. Every object is owned by exactly one process. Every process is owned by itself. As used herein, the term "computer process" refers to a series of instructions carried out by a computer system, which is a more general and well-known definition.

"Property": A property is an object which represents a part of the internal state of a second object.

"Reference": A reference is a data structure which identifies a particular object. An object, in being directed to perform a feature, is identified by a reference to the object supplied by the requester of the feature. References are either protected or unprotected. An object cannot be altered or modified using a protected reference to identify the object.

"Region": A region is one or more engine places within a network which are controlled by a single authority. A region is generally distinguished by the close coordination and management of computer systems which support the engine places of the region. The transportation of agents within a region is therefore generally quicker and less expensive than transportation of agents between regions. A region can be, for example, a local area network which is connected to a wide area network.

"Requester": A requester is an object which directs another object, i.e. the responder, to perform a feature. The requester supplies zero or more objects as input data to the responder of the feature requested and receives zero or one object as output data from the responder of the feature. Directing an object to perform a feature is alternatively called "requesting" the object to perform the feature.

"Responder": A responder is an object performing a feature at the direction of another object, i.e. the requester. The responder receives zero or more objects as input data and supplies zero or one object as output data in performing the feature. A responder is alternatively called a "responding" object.

"Result": A result is an object "produced" by performance of an operation as output data. In other words, a result is an object transferred from the responder to the requester immediately following performance of an operation by the responder at the request of the requester.

"Subclass": A subclass inherits methods, properties, and/or feature definitions from one or more classes. A subclass can define one or more properties, methods, and/or features which are not inherited from any other class and can reimplement a feature which is inherited from another class by defining a new implementation of the feature.

"Superclass": The classes from which a subclass inherits properties, methods, and/or features are superclasses of the subclass.

"Virtual Place": Every place which is not an engine place is a virtual place.

DETAILED DESCRIPTION OF A PREFERRED EMBODIMENT

According to the principles of this invention, a novel set of computer processes are used to route a particular computer process to a selected computer system contained in a plurality of interconnected computer systems and to execute the particular computer process on the selected computer system. The computer processes of this invention are defined, in one embodiment, in terms of object-oriented computer processes. The computer processes of this invention include (i) an instruction set that defines the various operations in the process and (ii) an engine that interprets the instruction set and controls operation of a central processing unit (CPU) in performance of the computer processes.

As explained more completely below, the particular computer process directs its own movement, i.e., transportation, through the computer network by executing an instruction which identifies a destination computer system within the network and directs that the particular computer process be transported there. While executing within the destination computer system, the particular computer process may have access to information which is not available elsewhere in the network. The particular computer process can access that information and use that information to determine to which other computer systems to travel. As explained more completely below, the present invention provides computer processes with a level of mobility, extensibility and generality not found in the prior art.

In remote programming paradigms typically found in the prior art, a computer process does not direct its own movement, but is sent from a source computer system to execute within a destination computer system. If the computer process cannot direct its own movement throughout the network, the computer process cannot select further destination computer systems to which to travel on the basis of information obtained by the computer process at the destination computer system. Thus, such a computer process must return to the source computer system with the information obtained before being sent to a second destination computer system. As computer processes of the present invention can direct their own movement through the network, computer processes of the present invention represent a substantial extension of the traditional remote programming paradigm.

Existing remote programming systems, which provide processes which direct their own movement through a computer network, lack generality and extensibility. Such systems lack generality in that such systems (i) are limited to homogeneous computer networks or (ii) require that a travelling process in a heterogeneous network contain instructions which conform specifically to whichever computer system is executing the process, i.e. computer systems to which the travelling process travels. In the present invention, a process travels within a heterogeneous computer network and the execution of the instructions of the process is independent of which particular computer system within which the process executes, i.e., to which the process travels. As discussed below in greater detail, the computer instructions disclosed below are implemented uniformly by each of the computer systems of a heterogeneous network. Thus, a process formed in accordance with the present invention can travel to any computer system within a heterogeneous computer network and execute there without any specific information regarding the nature of the computer system.

Remote programming systems of the prior art typically lack extensibility in that a process cannot create a class of data objects and utilize data objects of that class within computer systems to which the process subsequently travels. Many computer processes formed today are "object-oriented". As defined above in the Glossary of Terms, an object has (i) an internal state defined by a number of properties, (ii) an internal behavior defined by a number of methods, and (iii) an external behavior defined by a number of features. The properties, methods, and features of a group of objects with like properties, methods, and features are defined by a class. In prior art systems, a process which defines a class cannot use objects of the class while executing in computer systems to which the process subsequently travels. Transportation of class definitions with travelling processes is not feasible or practical in prior art systems because class definitions are not standardized; class definitions are generally very large and complex; and a single process generally uses objects of many classes.

Class definitions are not "standardized" in that prior art systems are typically based on existing programming languages which are not designed with mobile processes in mind. Therefore, class definitions in a process formed using one of these existing programming languages typically rely on information specific to the computer system within which the process is created, such as the specific memory addresses of portions of the class definitions. Reliance on such information, which is specific to a particular computer system, makes class definitions of prior art systems very difficult to transport to remote computer systems.

In the present invention, classes are represented by class objects which are part of the disclosed computer instruction set. A process formed in accordance with the present invention includes class objects when travelling from one computer system to another. Thus, a process can define a class of object in a first computer system, travel to a second computer system, and utilize objects of the class within the second computer system. Unnecessary delay and expense in transporting all classes utilized by a travelling process are eliminated by transporting only those classes which are not defined within the computer system to which the process travels.

Additionally, the present invention provides efficiencies not found in the prior art in transporting several clones of a process to several destination computer systems simultaneously. As discussed more completely below, substantial efficiencies are realized by deferring creation of one or more clones of the process so long as the travel path of one clone coincides with the travel path of another clone. Clones, and this aspect of the present invention, are discussed further below.

In remote programming systems, two processes share information by a first process giving a second process access to the first process. The first process gives the second process access to the first process without simultaneously obtaining access to the second process. In such a situation, the second process is free to interfere with the execution of the first process without compromising the security of the second process. In the present invention, a first process obtains access to a second process and simultaneously gives to the second process access to the first process through the cooperation and coordination of a third process. Further security is provided as the second process either accepts or rejects such an exchange with the first process according to the configuration of the second process. The third process ensures that (i) the second process agrees to such an exchange and that (ii) each process gains access to the other process simultaneously such that neither process can interfere with the execution of the other process without affording a similar opportunity to the other process.

A novel computer process of this invention is an agent process. An agent process is a computer process formed of the computer instructions disclosed below in Appendix A, which is a part of this disclosure and which is incorporated herein by reference in its entirety. Agent processes are each interpreted by another novel computer process of this invention, i.e., an engine, and thereby effectuates the computer instructions disclosed below and in Appendix A. The term "interpreted" is used herein as it is understood in the art; a computer instruction in a series of computer instructions is read and executed by an engine before the next computer instruction in the series is read.

Interpreting, rather than compiling, instructions of the disclosed instruction set provides greater generality. A first agent can travel from a first computer system to a second computer system and meet with a second agent there which gives to the first agent a procedure. The first agent can then perform the procedure which the first agent was not originally designed to perform.

Yet another novel computer process of this invention is a place process. Place processes are dispersed throughout a computer network. Each agent process "occupies" a respective place process; i.e., a place process is part of the internal state of an agent process and therefore provides a context within which the agent process executes. Each agent process can initiate and control the agent process's transportation from a first place process to a second place process. "Agent" and "place" as used herein are shorthand terms for "agent process" and "place process", respectively.

Figure 4A:
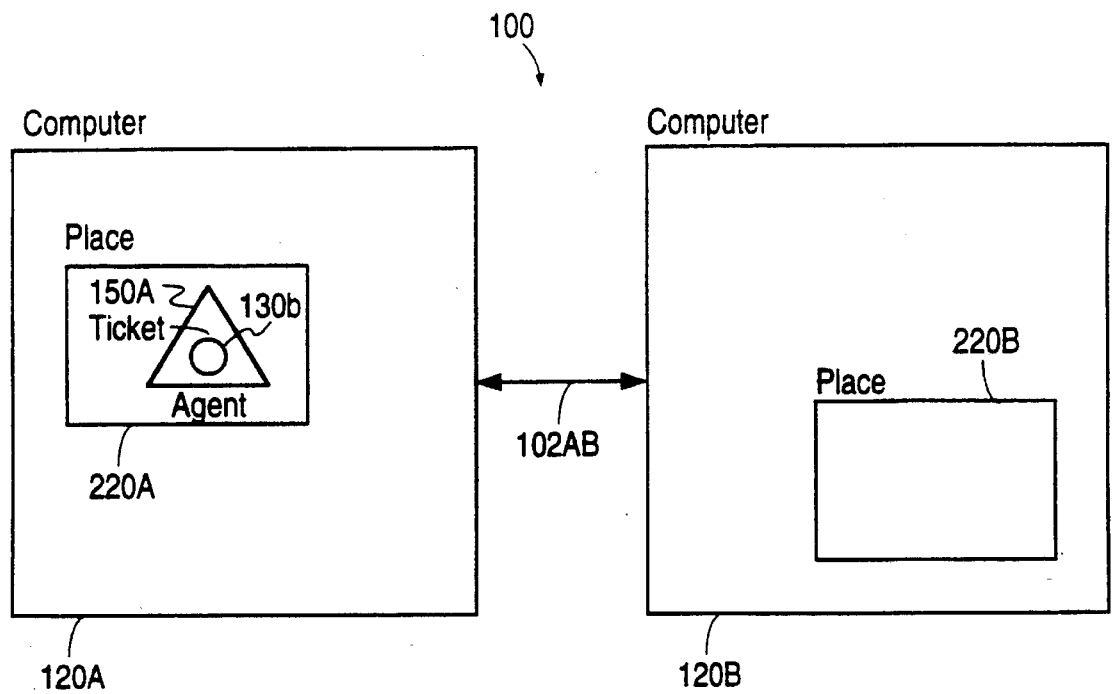
FIGS. 4A and 4B show the movement of an agent process through a network constructed in accordance with the present invention.

FIG. 4A shows computer network 100 which includes computer systems 120A and 120B which are connected by communications link 102AB. Computer system 120A is executing place 220A and agent 150A. Agent 150A occupies place 220A as shown in FIG. 4A. Computer system 120B is executing place 220B. Hereinafter, the statement that an agent or place occupies a particular place should be interpreted as including a statement that the agent or place is executing within the computer system which contains the particular place.

Agent 150A issues an instruction to computer system 120A. In response to the instruction, agent 150A is transported to a place, e.g. place 220B, specified in the instruction. The instruction is called operation "go", and the issuance of the instruction by agent 150A is called herein performance of operation "go" by agent 150A.

Figure 4B:
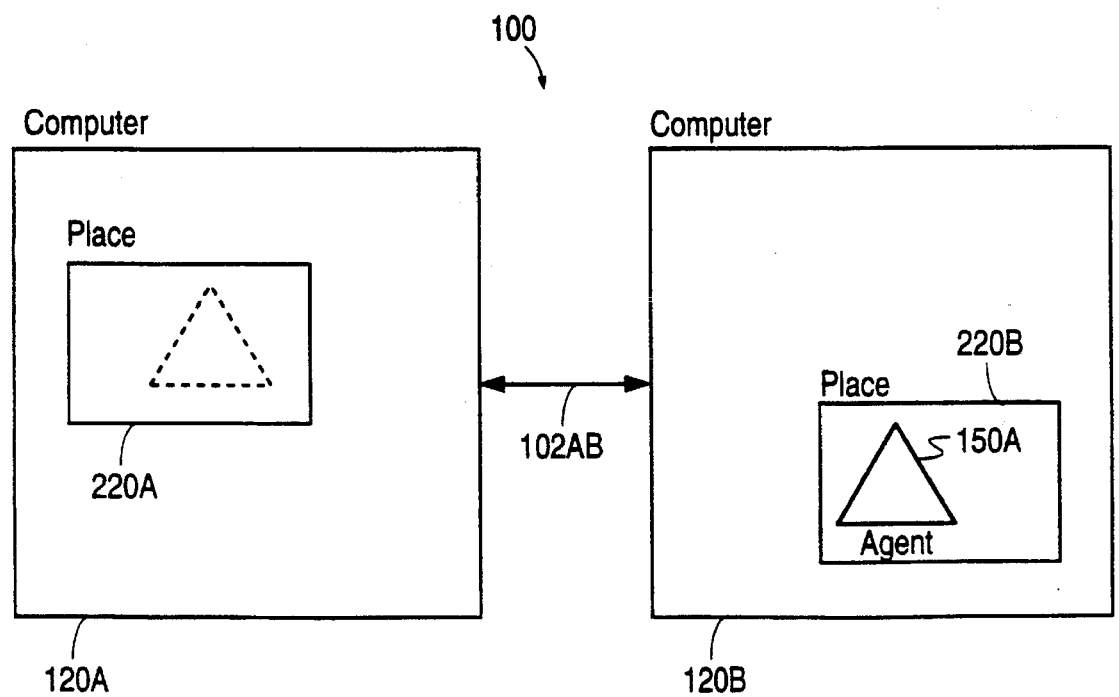

Upon performance of operation "go" by agent 150A, (i) execution of agent 150A is suspended; (ii) agent 150A is encoded into a standardized form which preserves the execution state of agent 150A; (iii) the standardized form of agent 150A is transported to computer system 120B; (iv) agent 150A, including the preserved execution state, is decoded from the standardized form; and (v) execution of agent 150A is resumed within computer system 120B. After performance of operation "go" by agent 150A, agent 150A no longer occupies place 220A and is no longer executing within computer system 120A; instead, agent 150A occupies place 220B and is executing within computer system 120B (FIG. 4B). By enabling an agent to travel to a remote computer system in the midst of the agent's execution, the agent is free to travel to data which the agent is configured to access.

A standardized form is a form to which agents are encoded for the transportation of the agent from one computer system to another. The standardized form preserves the execution state of the encoded agent such that the agent can be decoded at the destination computer system and execution of the agent can resume by executing the instruction of the agent which sequentially follows operation "go". Each computer system of the network of the present invention can maintain an agent in whatever form is convenient for carrying out the computer instructions included in the agent. However, in transporting an agent from one computer system to another, each computer system of the network must use the standardized form of an agent during transportation much the same way that two people must agree to the vocabulary and syntax of a single language to communicate. The nature of the standardized form is discussed in greater detail in Appendices B, C, D, E and F, which are part of this disclosure and which are incorporated in their entirety herein by reference.

As an agent can direct its own movement, i.e., transportation, through the network, means must be provided for specifying a number of parameters of a trip from a first computer system to a second computer system. A first parameter of a trip is the place to which the agent is transported, i.e., the destination of the trip. In one embodiment, a trip destination can be specified by name, by class, or by address. An address can be, for example, a location within a local area network.

Frequently, two or more pathways exist between a first computer system and a second computer system. One pathway may be quick but expensive and another may be time consuming but inexpensive. In such a case, no single pathway is always preferred in the transportation of an agent. Therefore, a second parameter of a trip is the "way" and the "means" for travel of an agent.

In addition, errors in configuring an agent for a trip to a nearby computer system can cause the agent to be inadvertently transported to distant computer systems at considerable expense to the creator of the agent. Therefore, an important parameter of a trip is the amount of time or resources that can be expended in transporting the agent before the trip is aborted.

Yet another important consideration in controlling the transportation of agents throughout a network is security. For example, if all agents travelling to a particular computer system are granted ingress, the particular computer system may become overburdened with many processes requiring substantial processing, and throughput of the particular computer system can suffer. Therefore, another parameter of a trip is the amount of resources the agent requires at the destination place. Thus, the agent can be denied ingress to the place if the resources required by the agent are more than the place is able or willing to provide.

In one embodiment, a ticket 1306 (FIG. 4A) controls the transportation of agent 150A and specifies place 220B as the destination place. As shown in FIG. 4A, agent 150A contains ticket 1306. Ticket 1306 defines the trip taken by agent 150A from place 220A to place 220B. In one embodiment, ticket 1306 specifies (i) the destination place of the trip, (ii) the "way" or pathway and "means" agent 150A is to take to the destination place, (iii) the maximum amount of time within which the trip must be completed before the trip is aborted and (iv) the amount of resources agent 150A asks to use at the destination place. By specifying the amount of resources agent 150A is permitted to use at place 220B, place 220B can determine whether agent 150A requires more resources than place 220B is configured to provide. In such a situation, place 220B can deny ingress to agent 150A. Thus, using a ticket as described more completely below, an agent can completely define a pending trip between a first place and a second place.

As discussed above, the prior art process known to the inventors cannot manipulate objects of a class defined only in a previously occupied computer system. In other words, if a prior art process defines a class of objects and thereafter travels to a destination computer system, the process cannot manipulate objects of the class unless the destination computer system contains a definition of the identical class or the process defines the same class again within the destination computer system. As described in greater detail below, agents of the present invention, which travel from one place to another, transport definitions of classes which are not defined within the destination place. Thus, agents of the present invention can define a class within a first computer system, travel to a second computer system and manipulate objects of the class while executing within the second computer system. Agents of the present invention therefore represent a significant improvement over the known prior art processes.

What is also generally lacking in the prior art is a means to implement a complex, multi-level security system in a computer network in which computer processes are mobile. One type of security which is afforded by the present invention, and which is not suggested by the prior art, is the security afforded by places. As discussed in greater detail below, places, by granting or denying ingress to various agents, provide various levels of security and several places can be configured to provide multi-level, hierarchical security.

Figure 5A:
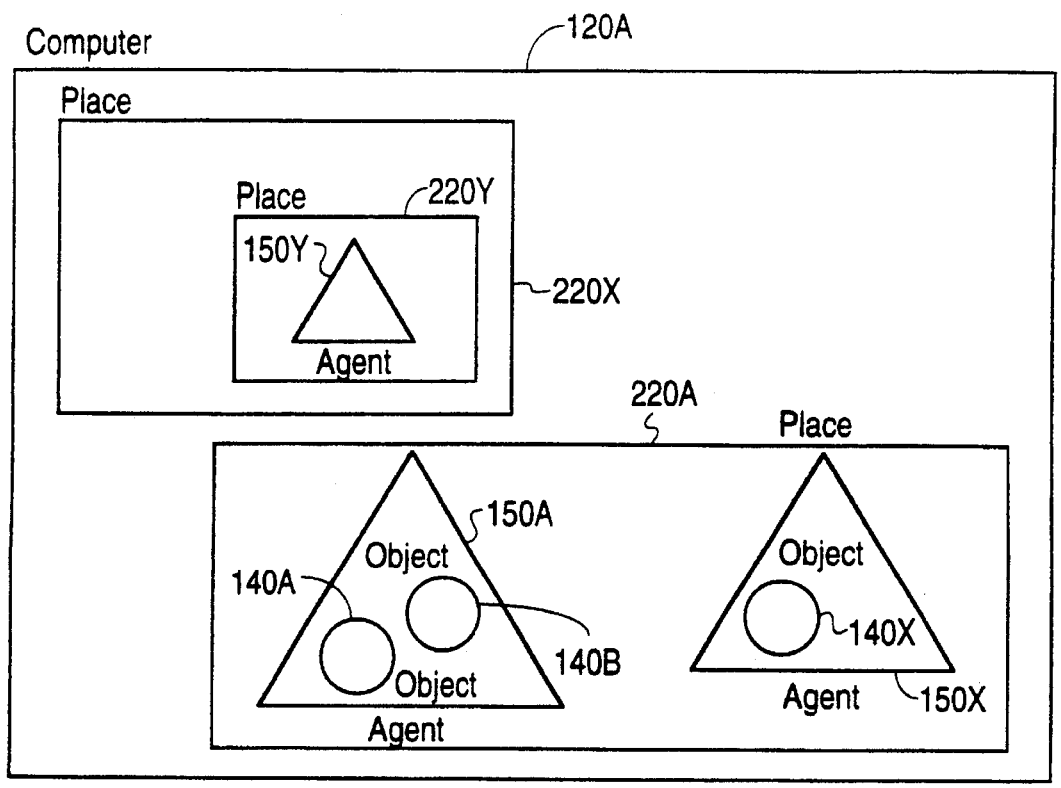
FIGS. 5A and 5B show processes, formed in accordance with the principles of the present invention, executing within a computer system.
Figure 5B:
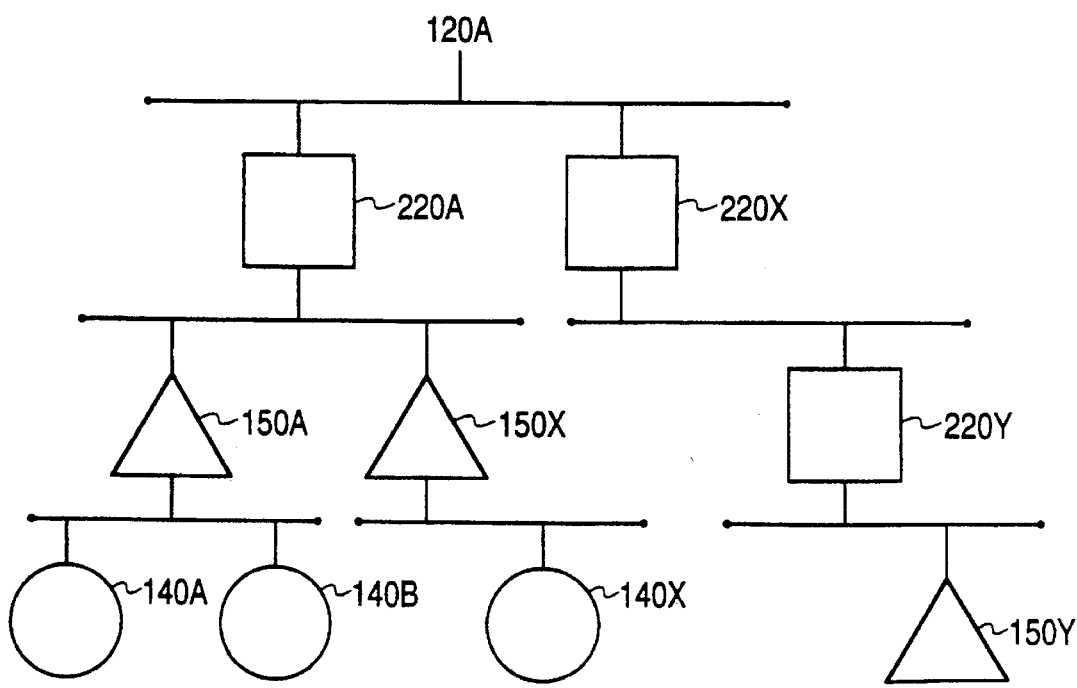
Figure 5C:
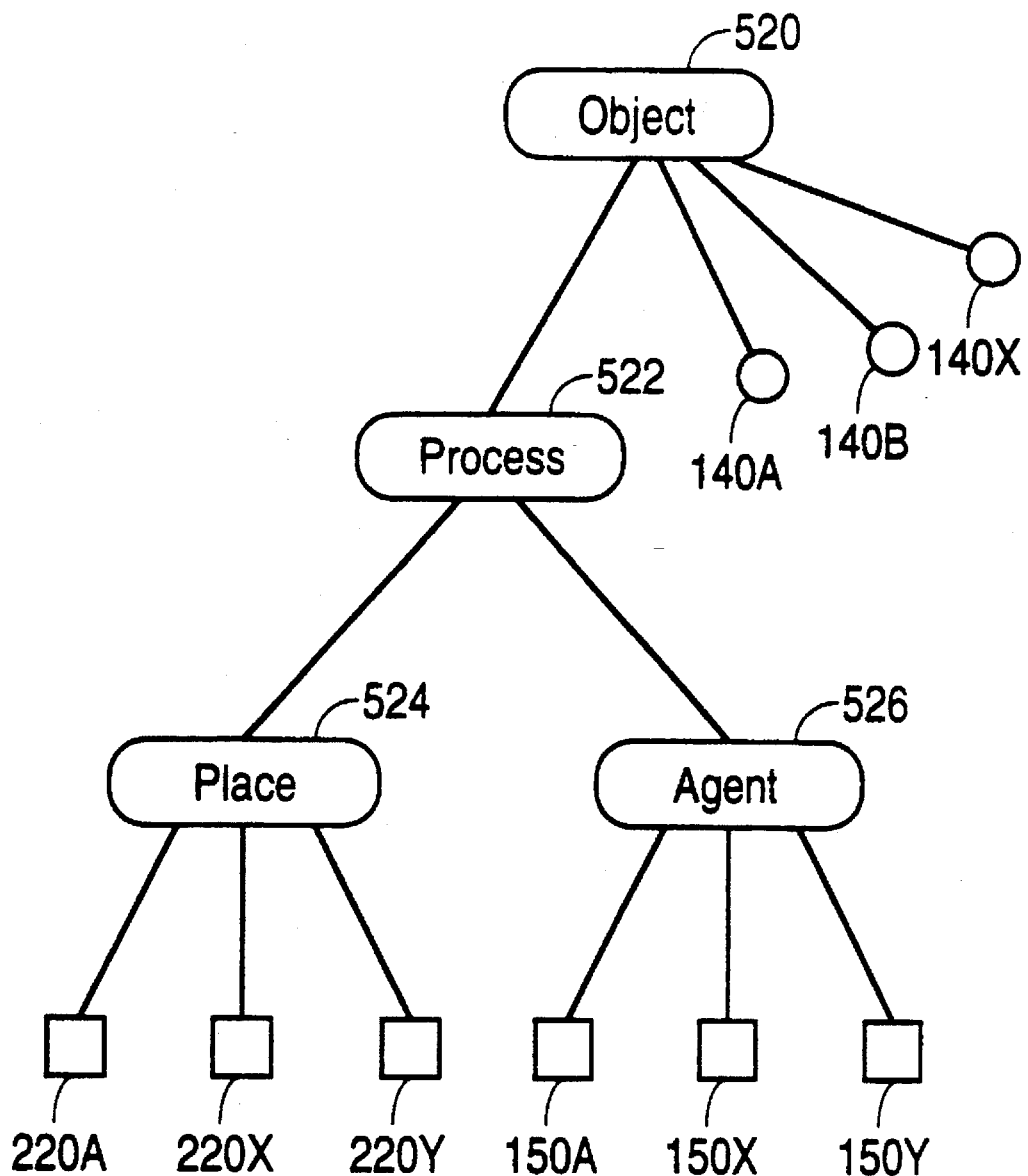
FIG. 5C shows a portion of a class hierarchy graph in accordance with one embodiment of the present invention.

To assist in the understanding and visualization of the various aspects and embodiments of the present invention, various representational and relational conventions are used in the drawings. Representational and relational conventions used herein are represented in FIGS. 5A, 5B and 5C. Computer system 120A (FIG. 5A) is executing place 220A, place 220X, place 220Y, agent 150A, agent 150X and agent 150Y. Computer system 120A also contains objects 140A, 140B and 140X in a memory, e.g., mass memory or main memory (neither shown), of computer system 120A. Agent 150A and 150X occupy place 220A; place 220Y occupies place 220X; and agent 150Y occupies place 220Y. Agent 150A owns objects 140A and 140B, and agent 150X owns object 140X. The relationships of occupancy and ownership are discussed in greater detail below. Briefly, occupancy of places provides various levels and types of security, and ownership determines which objects travel with an agent which performs operation "go".

FIG. 5B is an alternative and equivalent representation of the various relationships represented in, and described above with respect to, FIG. 5A. While FIG. 5A accurately represents, e.g., that agent 150X occupies place 220A and contains object 140X, the form of FIG. 5A is less suitable for representing more complex relationships. Therefore, the tree structure of FIG. 5B is used in the drawings to represent more complex relationships in illustrating the various computer instructions of various embodiments of the present invention.

The tree structure of FIG. 5B should not be confused with the class hierarchy tree which is shown in part in FIG. 5C. FIG. 5C represents the class relationships of various items represented in FIGS. 5A and 5B. Objects 140A, 140B and 140X are members of class "Object" which is represented by class object 520. Membership in a class is discussed in greater detail in the Glossary of Terms above and is represented by a dashed line between the class and the object which is a member of the class. Class object 522 represents class "Process", which is a subclass of class "Object". Places 220X, 220Y and 220A are members of class "Place", which is a subclass of class "Process" and is represented by class object 524. Agents 150A, 150X and 150Y are members of class "Agent", which is a subclass of class "Process" and is represented by class object 526. Thus, places 220X, 220Y and 220A and agents 150A, 150X and 150Y are all members of class "Process" and are therefore computer processes. Objects 140A, 140B and 140X are not members of class "Process" and are therefore not computer processes.

Figure 6A:
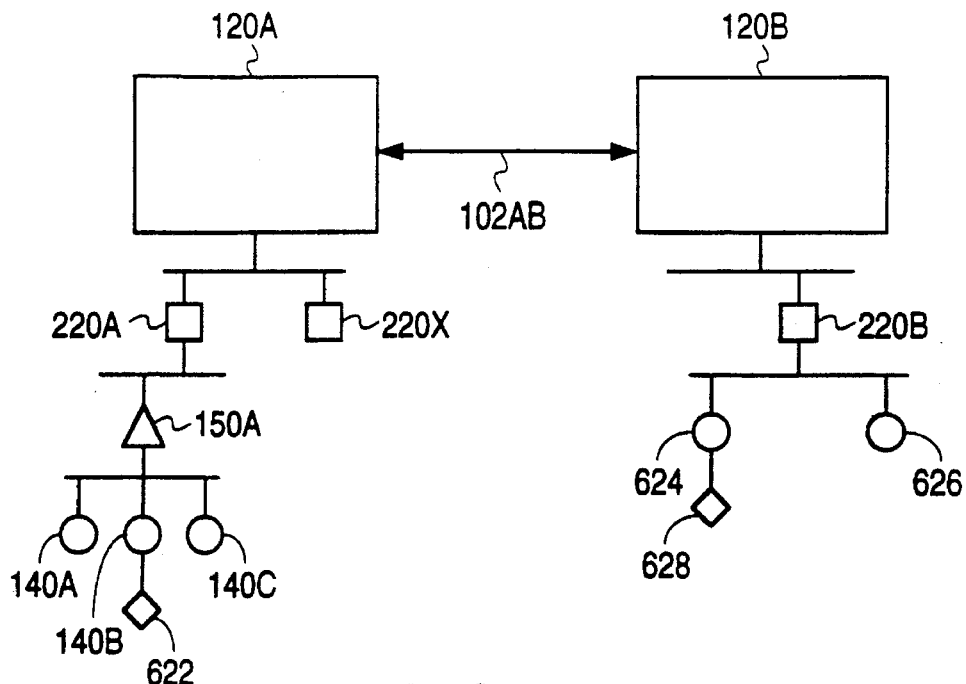
FIGS. 6A–6C show the movement of an agent process through a network formed in accordance with the present invention.

When an agent is transported from place to place, objects owned by the agent are transported with the agent from place to place. However, transporting an object can consume considerable resources if the object is large. In general, time in transporting an agent containing objects from a first place executing within a first computer system to a second place executing within a second computer system is substantially reduced by eliminating transportation of objects already at the second place. This is easily demonstrated by considering a simple example. Agent 150A (FIG. 6A) is executing within computer system 120A and occupies place 220A which is also executing within computer system 120A. Agent 150A owns objects 140A, 140B and 140C. In this embodiment, object 140B has digest 622. Digest 622 indicates that object 140B is interchangeable and that any object having a digest equal to digest 622 can be substituted for object 140B.

Place 220B owns, and therefore contains, objects 624 and 626. Object 624 has digest 628. A process "contains" all the objects owned by the process and the classes of which the process and the objects owned by the process are members.

Figure 6B:
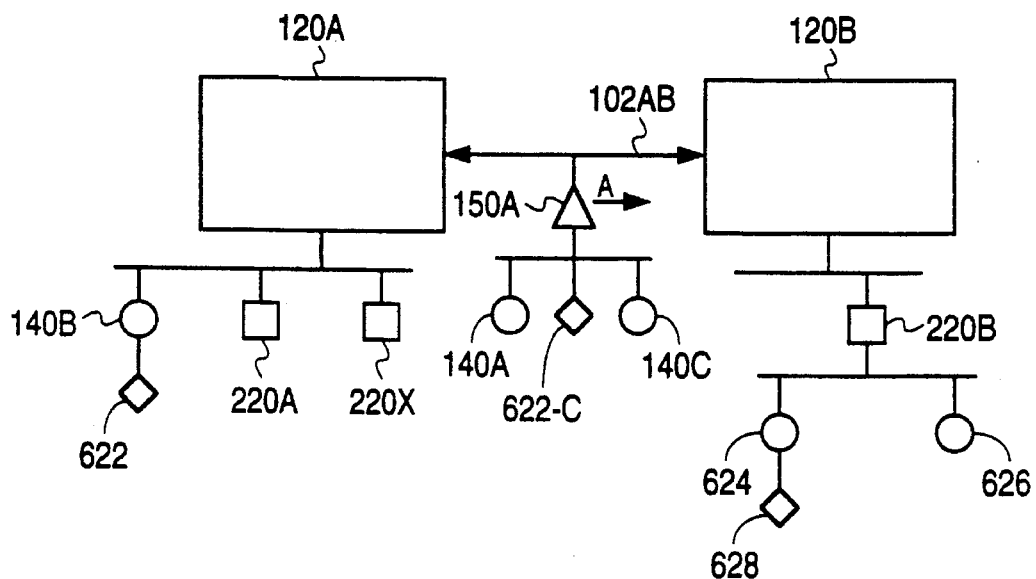

In performance of operation "go", as indicated above, agent 150A and all objects contained by agent 150A are represented in a standardized form. However, object 140B is not included in the standardized form of agent 150A. Instead, a copy of digest 622, i.e., digest 622-C (FIG. 6B), is included in the standardized form of agent 150A. Agent 150A, objects 140A and 140C, and digest 622-C are transported over communications link 102AB, in the direction of arrow A, to computer system 120B. Object 140B is held within computer system 120A at least until it is determined that an equivalent interchangeable object is found within computer system 120B.

Figure 6C:
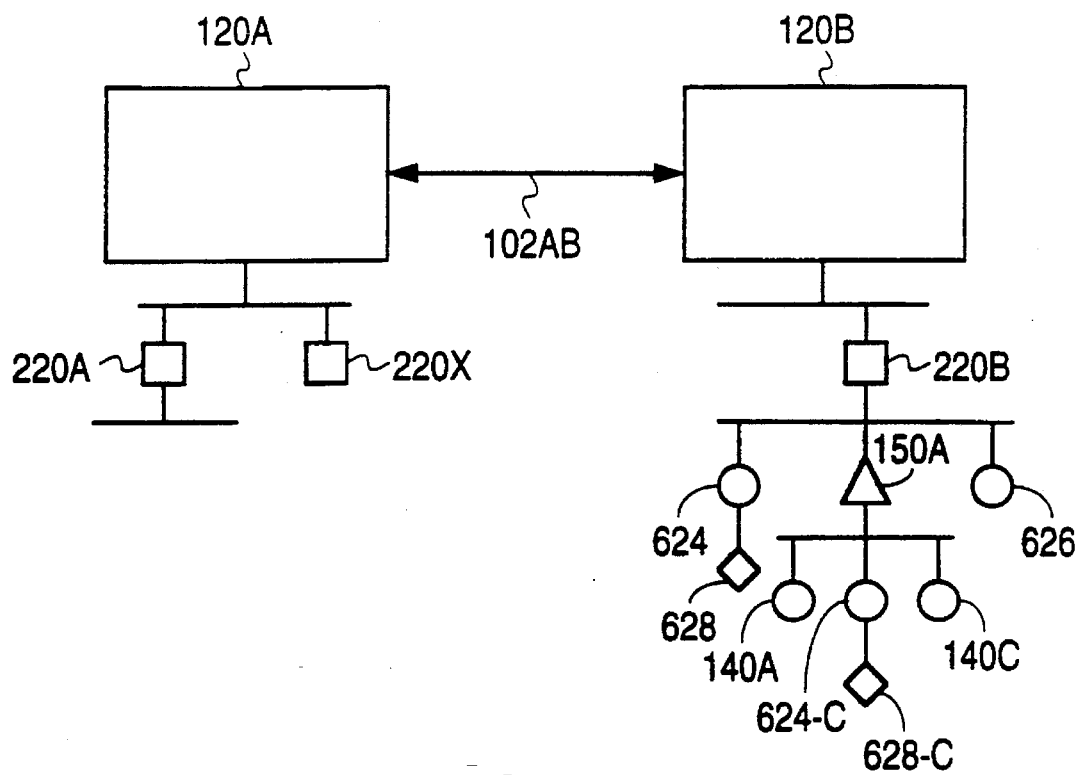

At computer system 120B (FIG. 6C), agent 150A, objects 140A and 140C, and digest 622-C are decoded. In decoding agent 150A, computer system 120B recognizes digest 622-C and determines whether an object with an equivalent digest occupies place 220B. Object 624 occupying place 220B has digest 628 which is equal to digest 622, and is therefore equal to digest 622-C. Since digest 628 is equal to digest 622, objects 140B and 624 are interchangeable. Therefore, in decoding agent 150A, a copy, e.g., object 624-C, is made of object 624 and substituted within agent 150A for interchangeable object 140B. Agent 150A therefore owns object 624-C, which is a copy of object 624, in lieu of object 140B. Thus, transportation of object 140B to place 220B is obviated. Since an equivalent interchangeable object is found within computer system 120B, object 140B can be deleted from computer system 120A. Of course, there are situations in which an equivalent interchanged object is not found on computer system 120B. In such a situation, object 140B (FIG. 6B) is retrieved from computer 120A as described more completely below.

An agent, occupying a first place, is capable of creating one or more clone processes of the agent and transporting each clone process to a respective place. Thus, in effect, an agent is capable of traveling to and occupying several places simultaneously. Of course, it is not a single agent that travels simultaneously but rather the clones of the agent.

To travel to and occupy several places simultaneously, an agent issues an instruction which creates multiple clones of the agent and causes each clone to travel to a respective place. Each clone is an agent, and, at the time of a clone's creation, the clone is identical to the original agent, and therefore includes an execution state identical to that of the original agent.

For example, agent 150A, which occupies place 220A in computer 120A (FIG. 7A), issues an instruction to computer system 120A which creates clones of agent 150A and transports the clones to occupy one or more places, e.g., place 220B in computer system 120B and place 220C in computer system 120C, which are specified in the instruction issued. The instruction is called operation "send", and the issuance of the instruction by agent 150A is called herein performance of operation "send" by agent 150A. Performance of operation "send" by agent 150A as represented in FIGS. 7A, 7B, 7C and 7D is controlled, in this embodiment, by two tickets (not shown) within agent 150A. The two tickets control the transportation of respective clones and specify places 220B and 220C as the places to which respective clones of agent 150A are to be transported.

Agents 150A-1 and 150A-2 (FIG. 7B) are clones formed from agent 150A, and are identical to agent 150A except that agents 150A-1 and 150A-2 do not occupy place 220A. As described above, even the execution states of agents 150A-1 and 150A-2 are initially identical to the execution state of agent 150A. Agents 150A-1 and 150A-2 travel along intercomputer communications link 120ABC (FIG. 7C), as described in greater detail below, to respective places 220B and 220C.

After performance of operation "send" by agent 150A (FIG. 7D), agent 150A continues to occupy place 220A. Agent 150A-1 occupies place 220B, and agent 150A-2 occupies place 220C.

Figure 7A:
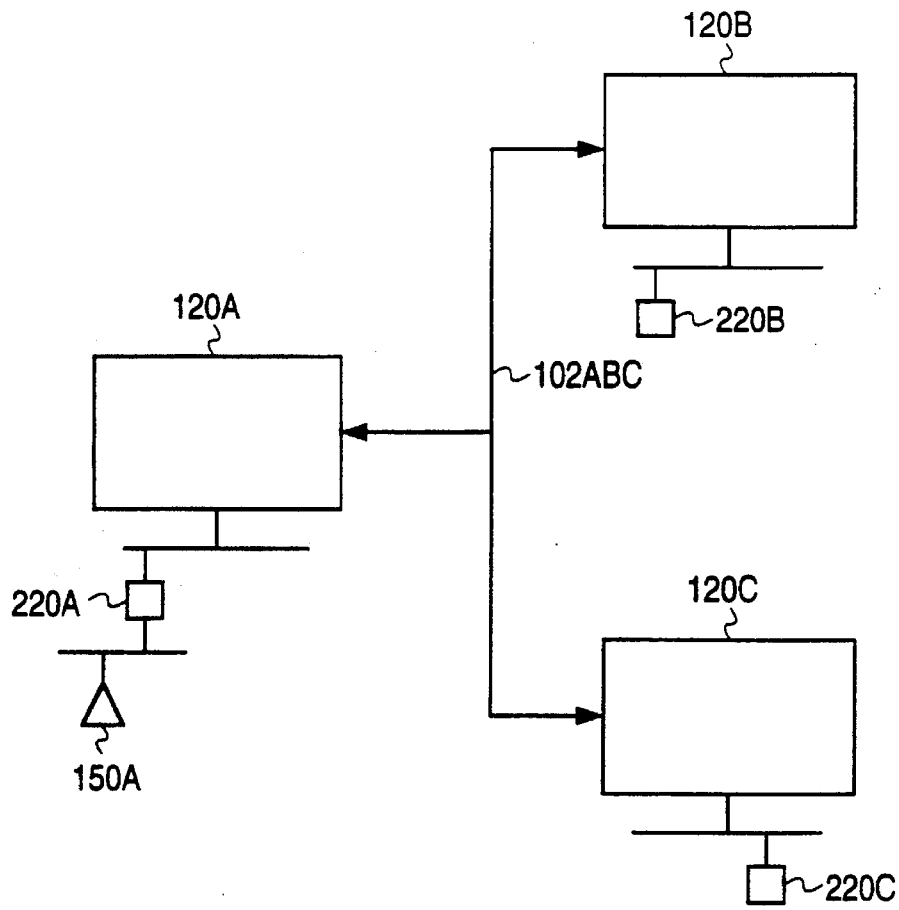
FIGS. 7A–7E show the movement of clones of an agent process through a network formed in accordance with an aspect of the present invention.
Figure 7B:
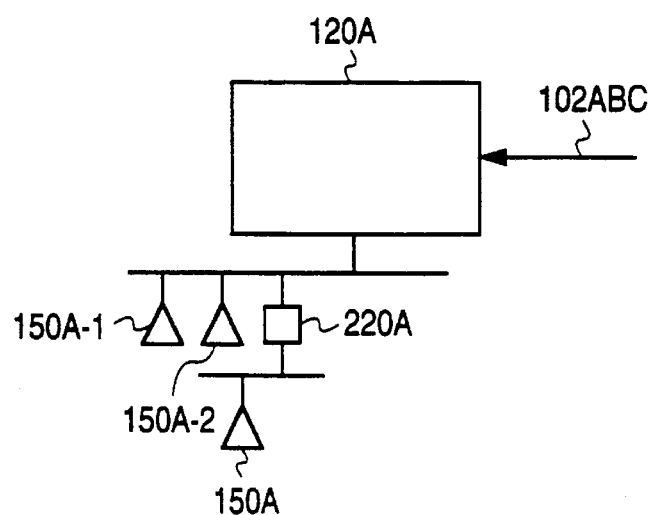
Figure 7C:
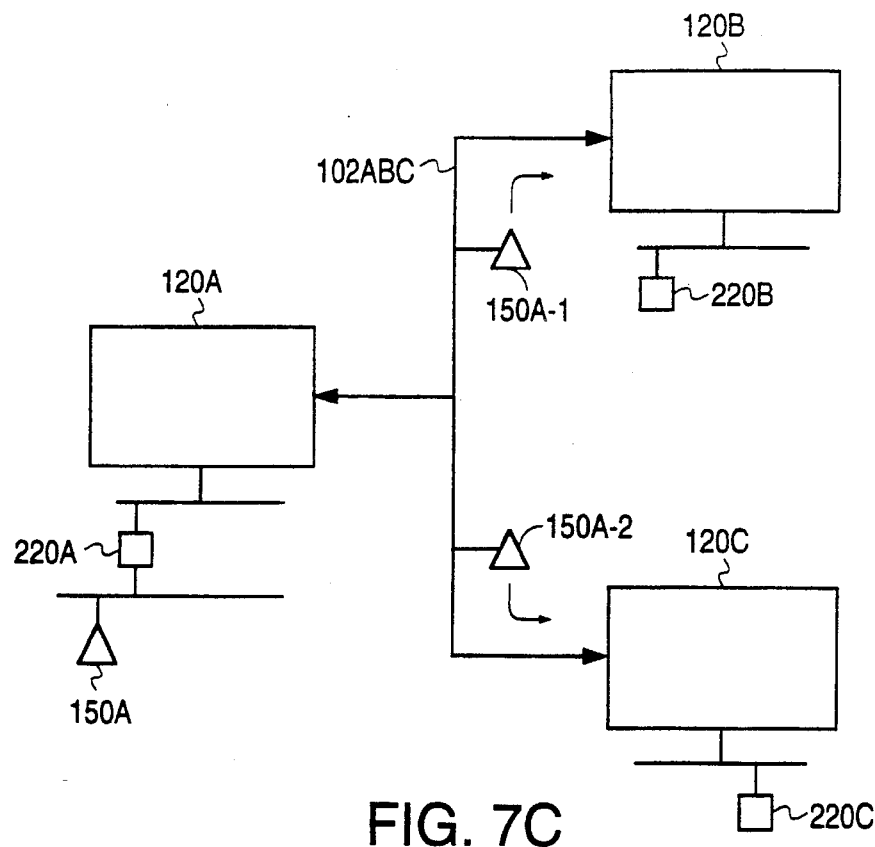
Figure 7D:
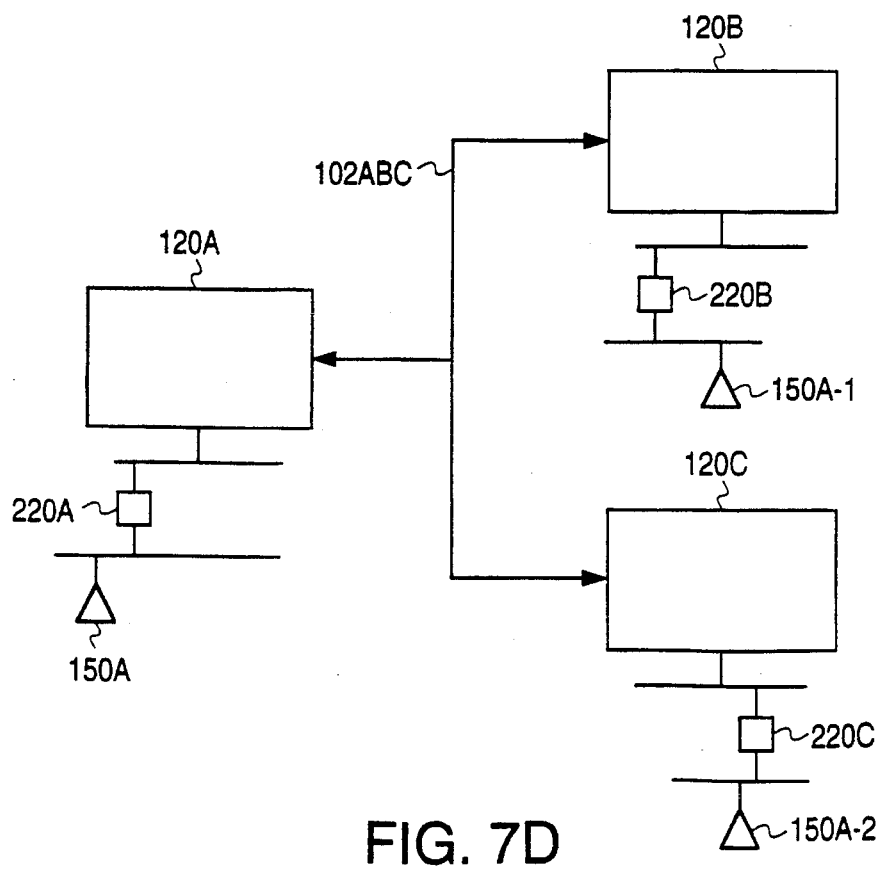
Figure 7E:
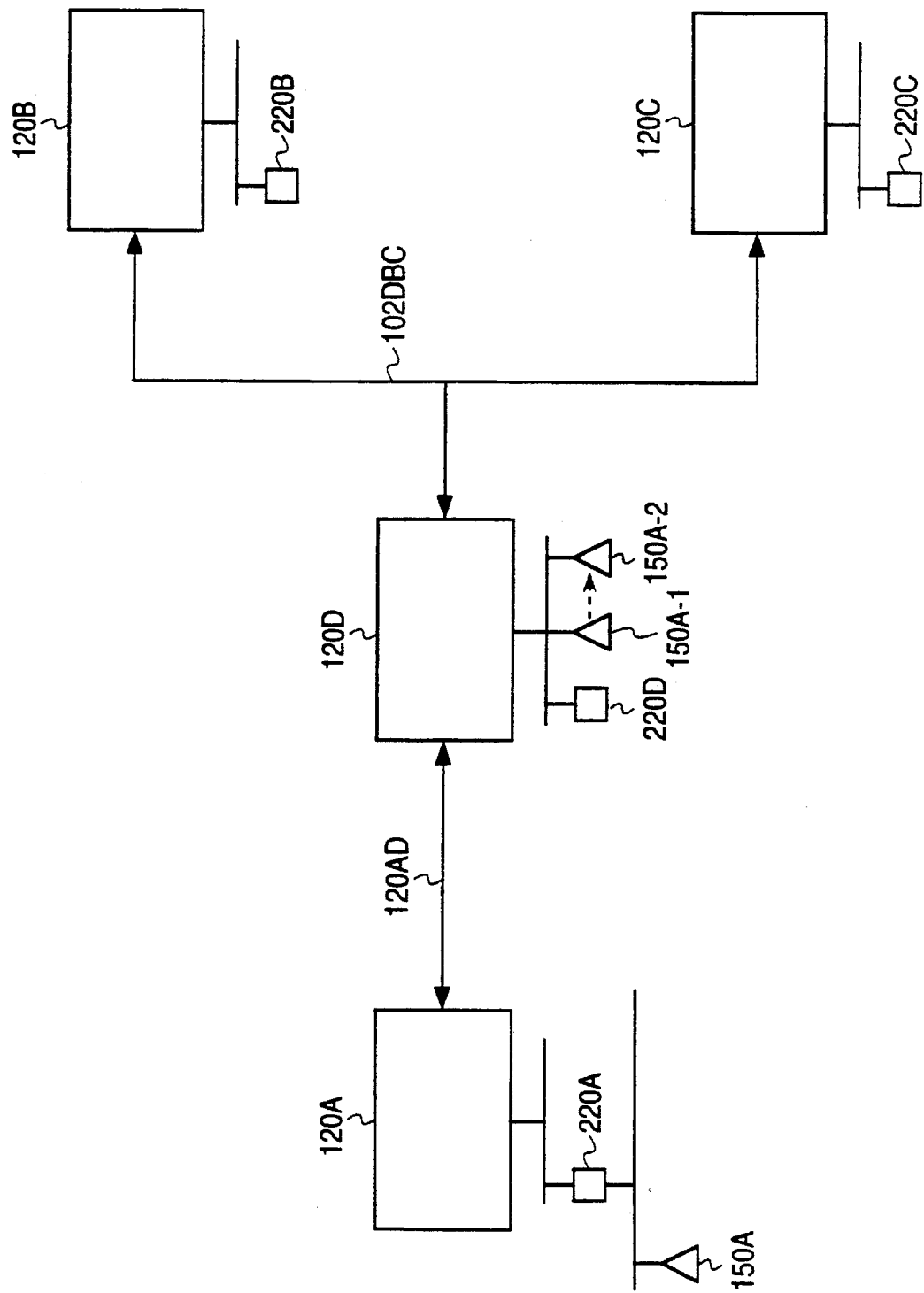

Space in computer system 120A and time in transporting clones of agent 150A are saved by deferring complete cloning of an agent 150A so long as the travel path of one clone coincides with the travel path of another clone, i.e., at least two clones have some initial portion of their journey that is coextensive. For example, in FIG. 7E, both clones of agent 150A must pass through computer system 120D to reach respective destination places 220B and 220C. Therefore, only a single clone of agent 150A, namely, agent 150A-1, is transported to computer system 120D. A second clone of agent 150A, namely, agent 150A-2, is formed in computer system 120D from agent 150A-1. Agents 150A-1 and 150A-2 are then transported to respective destination places 220B and 220C. Thus, only a single clone of agent 150A is formed in computer system 120A and only a single clone is transported to computer system 120D saving space in computer system 120A and time in transporting agents 150A-1 and 150A-2 to their respective destinations.

Two agents exchange information by participating in a meeting between the two agents. In such a meeting, each agent is provided with a reference to the other agent. As discussed below, a first agent, which possesses a reference to a second agent, (i) can direct the second agent to take specific actions in accordance with instructions contained with the second agent and (ii) can transfer data to and receive data from the second agent. In one aspect of the present invention, an agent is prevented from interfering with other agents by requiring that no agent be given a reference to a second agent unless the second agent is given a reference to the first-mentioned agent. In that way, no agent can gain access to a second agent without granting reciprocal access.

A first agent, occupying a place, can initiate a meeting with a second agent occupying that place. During such a meeting, the first agent can transfer objects to and receive objects from the second agent, and the second agent can transfer objects to and receive objects from the first agent.

Figure 8A:
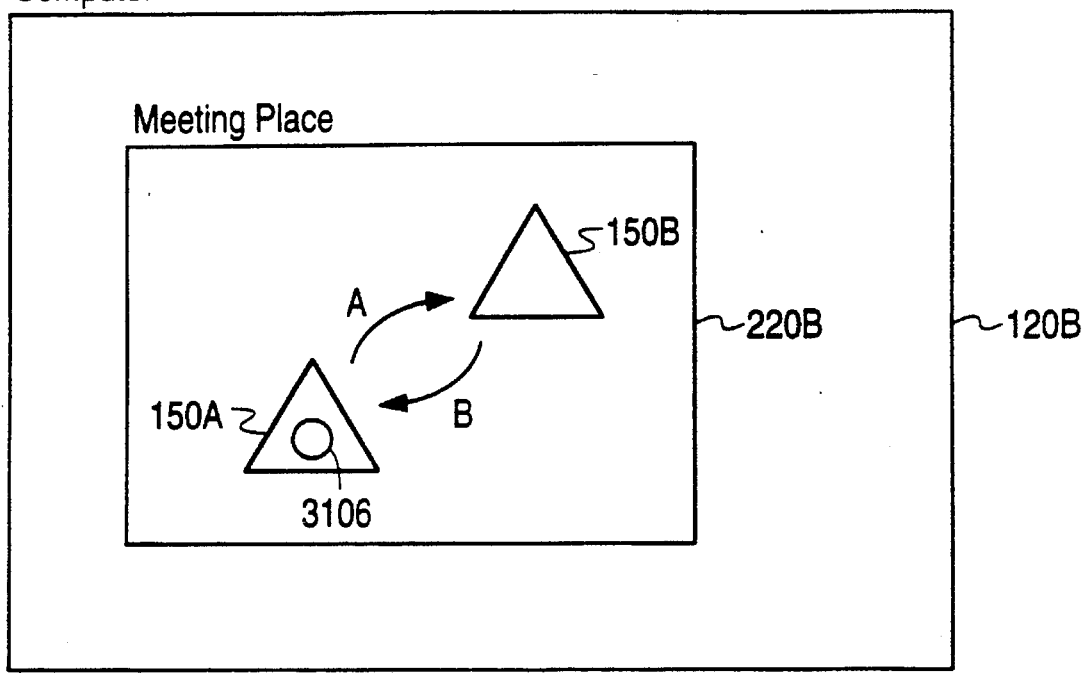

A subclass of class "Place" (FIG. 5C) is class "Meeting Place" (not shown). In the illustrative example of FIGS. 8A–8F, place 220B is a member of class "Meeting Place" and is therefore a meeting place. Therefore, place 220B is sometimes referred to herein as "meeting place 220B". Meeting place 220B (FIG. 8A), which is executing in computer system 120B, provides a means for agents 150A and 150B, which occupy meeting place 220B, to communicate and share information in a meeting as indicated by arrows A and B. Petition 3106 within agent 150A defines and controls the meeting between agents 150A and 150B.

A meeting between agent 150A and 150B is arranged as illustrated by FIGS. 8B–8F. Agent 150A (FIG. 8B) issues a first computer instruction, represented by arrow 851, directing meeting place 220B to arrange a meeting between agents 150A and 150B. The first instruction includes petition 3106, which controls the meeting, and which specifies that agent 150A wants to meet with agent 150B. On behalf of meeting place 220B (FIG. 8C), the engine issues a second computer instruction, represented by arrow 852, which notifies agent 150B that agent 150A has issued the first computer instruction, and which causes execution of a number of computer instructions within agent 150B to determine whether a meeting between agents 150A and 150B is acceptable.

Upon determination that the meeting between agents 150A and 150B is acceptable (FIG. 8D), agent 150B issues a reply, represented by arrow 853, to the second computer instruction, directing the engine, on behalf of meeting place 220B, to proceed in arranging the meeting between agents 150A and 150B. On behalf of meeting place 220B (FIG. 8E), the engine conveys to agent 150A a reference to agent 150B, the conveyance being represented by arrow 854A, and conveys to agent 150B a reference to agent 150A, the conveyance being represented by arrow 854B. Agent 150A (FIG. 8F) interacts with agent 150B using the reference to agent 150B, the reference being represented by arrow 855A, and agent 150B interacts with agent 150A using the reference to agent 150A, the reference being represented by arrow 855B.

Two agents cannot participate in a meeting together unless the two agents occupy the same place. A hierarchy of places provides users of the present invention a mechanism to provide varying levels and types of access and security to various agents. The benefit of various levels and types of access and security is demonstrated by the illustrative example of FIGS. 9A–9E.

FIG. 9A shows a building 902 having floors 902-1, 902-2, 902-3, 902-4 and 902-5. Floor 902-3 is a place within the place of building 902 and is therefore a subplace of building 902. FIG. 9B shows floor 902-3 having rooms 902-3-1, 902-3-2, 902-3-3, and 902-3-4. Room 902-3-2 is a place within the place of floor 902-3 and is therefore a subplace of floor 902-3.

The organization of building 902 lends itself to hierarchical security. For example, building 902 can be restricted to allow only people of a first level of security, e.g., military personnel, to enter. Floor 902-3 can be further restricted to allow only people of a second (higher) level of security, e.g., naval personnel, to enter. Room 902-3-2 can be still further restricted to allow only people of a third (still higher) level of security, e.g., naval officers, to enter. Floor 902-4 can be restricted independently of floor 902-3, e.g., to allow only air force personnel to enter.

The engine in computer system 120X (FIG. 9C) is executing places 220X1 and 220X2. Place 220X1 can represent, for example, building 902. Places 220X1-1 and 220X1-2, which represent, for example, floors 902-4 and 902-3, occupy place 220X1 (FIG. 9D) and are therefore subplaces of place 220X1. Conversely, place 220X1 is a superplace of places 220X1-1 and 220X1-2. Place 220X1-2-1, which represents, for example, room 902-3-1, occupies place 220X1-2 (FIG. 9E). Place 220X1-2-1 is therefore a subplace of place 220X1-2, and place 220X1-2 is a superplace of place 220X1-2-1.

In one embodiment of the present invention, two agents can only meet "face-to-face", i.e., when both agents occupy the same place. As used herein, an agent "occupies" one place only and does not simultaneously occupy subplaces or superplaces of the place. For example, an agent occupying place 220X1-2 does not simultaneously occupy place 220X1 or place 220X1-2-1. Just as a first person in building 902 (FIG. 9A) cannot communicate face-to-face with a second person on floor 902-3 unless the first person is also on floor 902-3, an agent occupying place 220X1 (FIG. 9D) cannot communicate with an agent occupying place 220X1-2. As a first person on floor 902-3 (FIG. 9B) cannot communicate face-to-face with a second person in room 902-3-2 unless the first person is also in room 902-3-2, an agent occupying place 220X1-2 (FIG. 9E) cannot communicate with an agent occupying place 220X1-2-1.

Such a place hierarchy enables a user of the present invention to restrict access to place 220X1, to further restrict access to place 220X1-2 and to restrict access to place 220X1-2-1 further still. Additionally, the security hierarchy implemented is not necessarily directly related to the place hierarchy implemented. For example, access to place 220X1-2 can be more restrictive than access to a subplace of place 220X1-2, such as place 220X1-2-1. The restriction of access to a place is described in greater detail below. Thus, the place hierarchy enables a user of the present invention to construct sophisticated security hierarchies in which various agents are given various levels of access to other agents which occupy certain places, subplaces of those places, and subplaces of those subplaces.

To describe further details of the novel processes described above, a better understanding of the structure of the computer systems described above is required. In the embodiment shown in FIG. 10, three computer systems are connected to form a computer network 100. Computer system 120A includes CPU 110A, network communications hardware 104A, and memory 117A. Input and output modules corresponding to input module 12 and output module 14 of FIG. 1 are omitted for clarity. Additionally, mass memory 17A and main memory 17B of FIG. 1 are combined to form memory 117A. Network communications hardware 104A can be any device which enables CPU 110A to propagate signals across and to receive and interpret signals from the network.

Within memory 117A are a number of computer processes operating concurrently within CPU 110A. Network manager 130A is a computer process which coordinates data transmission between the various computer systems of the computer network. Operating system 131A is a computer process which coordinates the operation of the various components and resources of computer system 120A. For example, operating system 131A coordinates the use of components CPU 110A, memory 117A and I/O modules (not shown in FIG. 10, see FIG. 1). Engine 132A is a computer process which interprets computer instructions of an object-oriented computer instruction set of this invention and processes information in the form of objects defined in that object-oriented computer instruction set. For example, engine 132A effectuates concurrent execution of place 220A (FIG. 4A) and agent 150A, both of which are processes constructed of the object-oriented computer instruction set of the present invention. Engine 132A is not shown in FIG. 4A.

In addition to these processes operating within memory 117A (FIG. 10) of computer system 120A, there are typically one or more processes which are user applications, e.g. user application 133A. User application 133A can request of engine 132A the creation of and/or manipulation of objects defined within the object-oriented instruction set interpreted by engine 132A.

Computer systems 120B and 120C are configured similarly to computer system 120A. However, while the general structure of computer systems 120A, 120B and 120C are similar, computer systems 120A, 120B and 120C can be otherwise heterogeneous.

The computer systems of computer network 100 are connected such that an agent process can be transported from one computer system to another. Computer systems 120A, 120B and 120C are connected to form a computer network by coupling the respective network communications hardware 104A, 104B and 104C by means of communications links 102AB, 102BC and 102AC. Communications links 102AB, 102BC and 102AC can be any means by which data can be conveyed from one network communications hardware, e.g., network communications hardware 104A to another, e.g., network communications hardware 104B. For example, network communications link 102AB can be the public switched telephone network, in which case network communications hardware 104A and 104B are modems and network managers 130A and 130B are capable of issuing commands to network communications hardware 104A and 104B, respectively, to establish and utilize communications via communications link 102AB i.e., the public switched telephone network.

Figure 10:
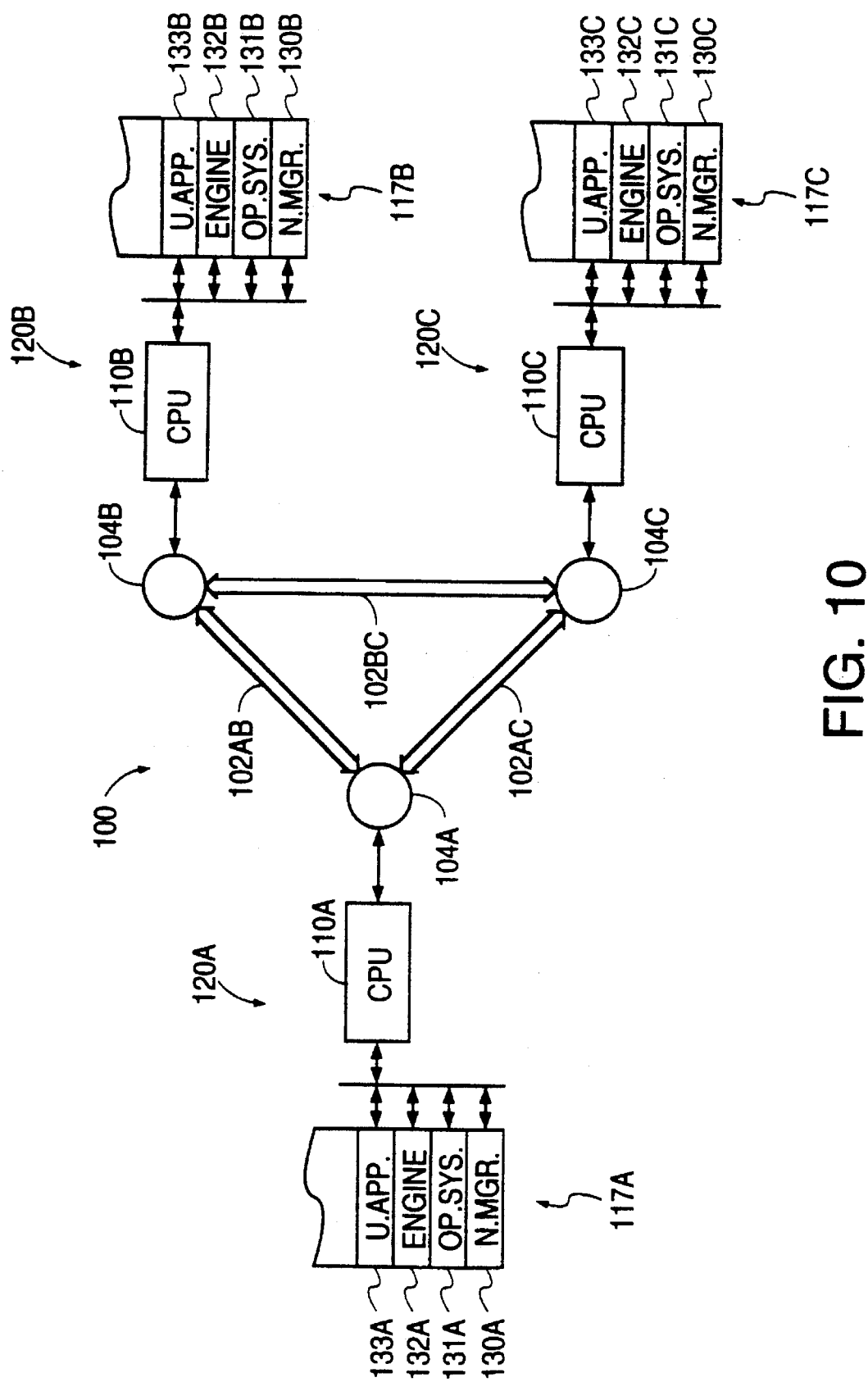
FIG. 10 shows the structure of a computer network formed in accordance with the principles of the present invention.
Figure 11A:
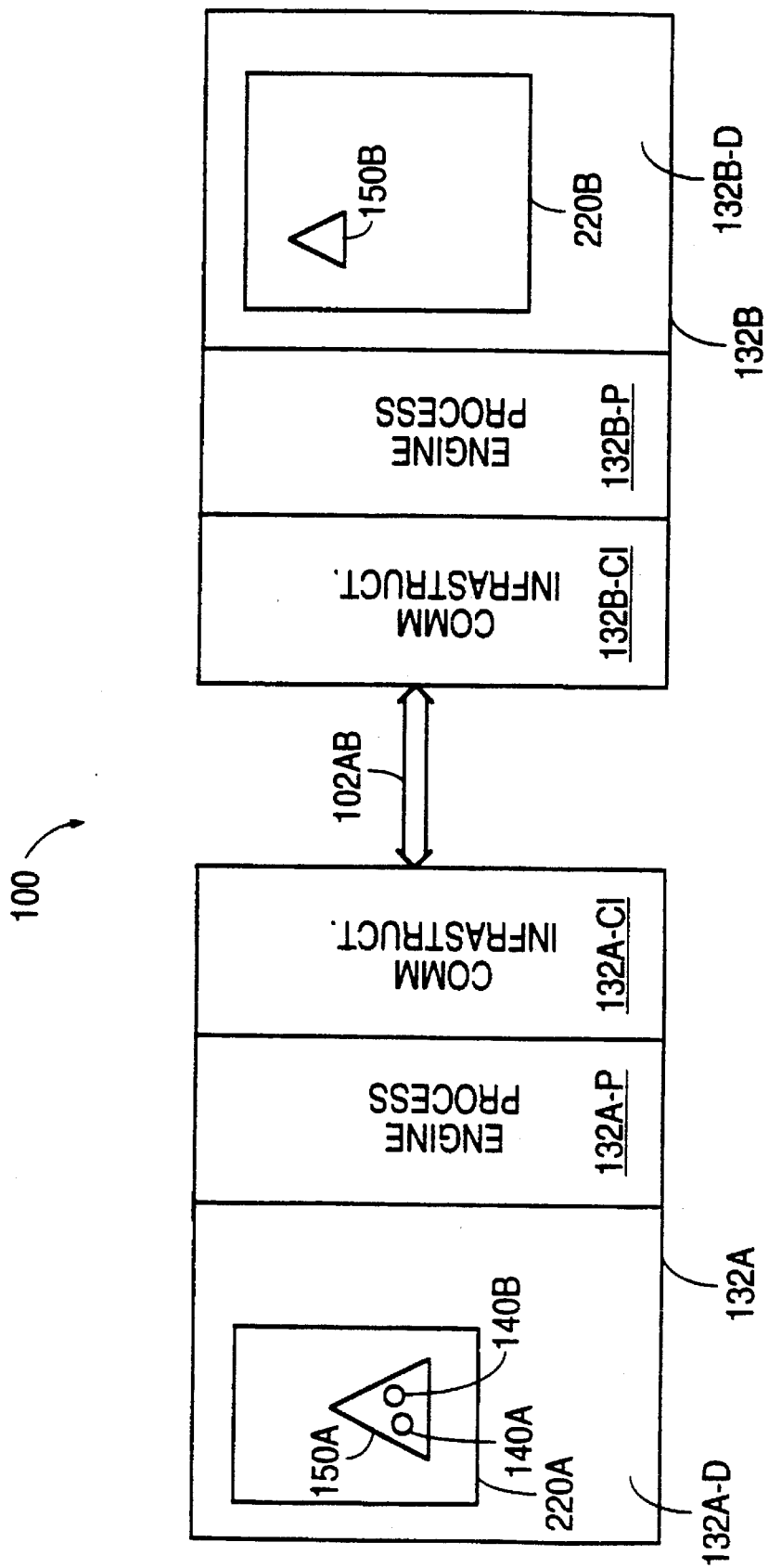
FIGS. 11A and 11B show alternative representations of the network shown in FIG. 10.

Objects constructed of the object-oriented computer instruction set are executed by an engine, e.g., engine 132A (FIG. 11A). Engine 132A has a communication infrastructure 132A-CI, a program portion 132A-P, and a data portion 132A-D. Data representing the state of the various objects executed by engine 132A, e.g., object 140A, are stored in data portion 132A-D of engine 132A. Data portion 132A-D of engine 132A is memory space within memory 117A (FIG. 10) reserved as work space for engine 132A and is generally inaccessible from the perspective of other processes on computer system 120A, e.g. operating system 131A and user application 133A.

As discussed above, an engine effectuates execution of processes and objects. Program portion 132A-P (FIG. 11A) of engine 132A includes computer instructions which effectuate execution of the objects represented in data portion 132A-D. The computer instructions which are combined to form program portion 132A-P can be of a known computer language. For example, the computer software attached as Microfiche Appendix G is a program portion of an engine constructed in accordance with the principles of the present invention and is constructed in accordance with the C++ programming language.

Communication infrastructure 132A-CI of engine 132A includes computer instructions which transport data between engines dispersed throughout network 100. The computer software attached as Microfiche Appendix H, which is a part of this disclosure and is herein incorporated by reference in its entirety, is a communication infrastructure of an engine constructed in accordance with the principles of this invention. Many aspects of the communication infrastructure of an engine are described in greater detail in Appendix D, which is a part of this disclosure and which is incorporated herein by reference in its entirety.

Figure 11B:
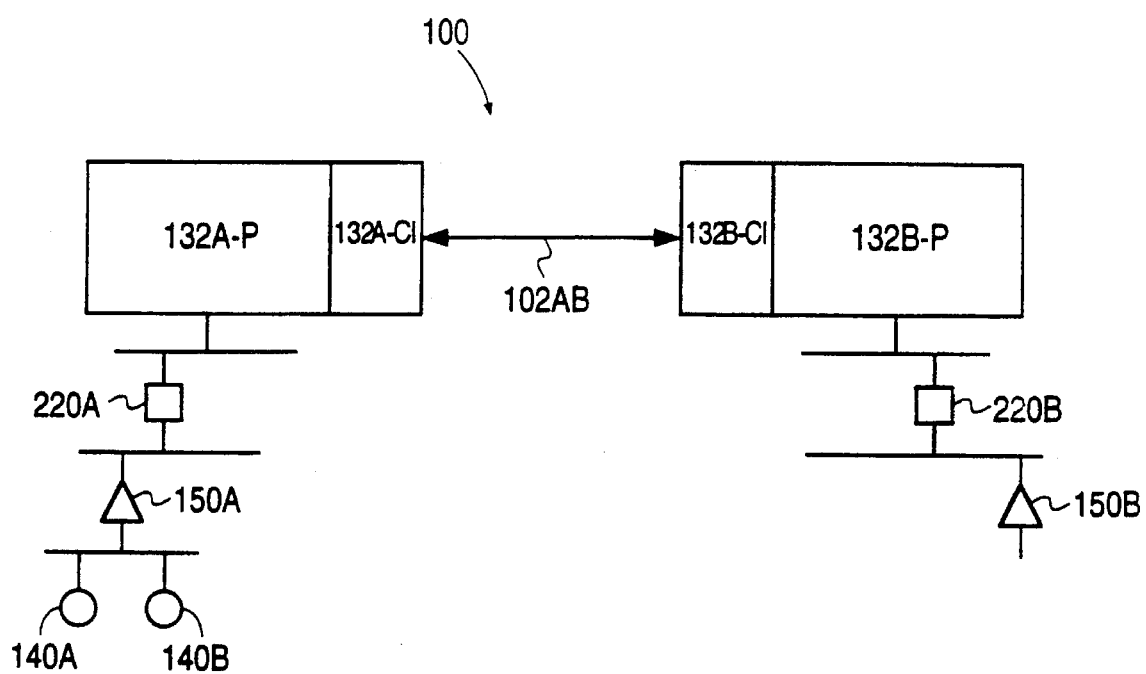

FIG. 11B is an alternative and equivalent representation of the computer network of FIG. 11A.

As indicated by FIG. 11A, engine 132B of computer system 120B is configured in a manner that is directly analogous to the configuration of engine 132A.

Objects within the Network

As explained more completely below, places 220A and 220B (FIG. 4A), agent 150A, ticket 1306, etc. are defined using "objects" according to the principles of this invention. As stated above, objects, which are formed according to the computer instruction set interpreted by engines 132A and 132B and which are interpreted by engine 132A, are stored in data portion 132A-D (FIG. 11A). For example, object 140A in data portion 132A-D is formed according to the computer instruction set interpreted by engines 132A and 132B and is interpreted by engine 132A.

Brief Overview of the Computer Instruction Set of the Present Invention

Each of the novel processes of this invention, and the features needed to define and support the processes, are defined by a set of computer instructions that are interpreted by an engine of this invention. The computer instructions of the present invention are object-oriented. Therefore, data in the present invention, e.g., data which represent agent 150A, are organized into objects, each of which has an internal state and an external behavior. An object's properties define the object's internal state and the object's features define the object's external behavior (see Glossary of Terms above). Each object is an instance of a respective one of a number of classes.

According to the principles of this invention, all classes defined in the computer instruction set, except for mix-in classes which are described below, are subclasses of a class "Object", which is described more completely in Appendix A. Thus, each class that is described herein and which is not a mix-in class inherits the features and properties of class "Object".

In one embodiment, limited multiple inheritance is implemented using mix-in classes. "Mix-ins" or "mix-in classes" are classes which are not subclasses of class "Object". Examples of mix-in classes, which are described below and in Appendix A, include mix-in classes "Executed", "Named" and "Referenced". A non-mix-in class, alternatively called a "flavor" or a "flavor class", can be the immediate subclass of at most one flavor, but can be the immediate subclass of zero or more mix-in classes. A mix-in class can be the immediate subclass of no class or of another mix-in class. Unless otherwise stated, a class is a flavor. No cycles in class hierarchy are permitted; i.e., no class is permitted to be both a subclass and a superclass of another class.

The use of mix-in classes allows features and properties to be defined once and used across a broad variety of classes. For example, mix-in class "Ordered" defines operations for determining the relative order of two objects. Flavor classes "Association", "Citation", "List", "Identifier", "Pattern", "Permit", "Bit", "Boolean", "Character", "Number", "Octet" and "Time" inherit from mix-in class "Ordered". Thus, associations, citations, lists, identifiers, patterns, permits, bits, booleans, characters, numbers, octets and times have an order relative to other members of the same class. For example, in the case of numbers, the number two is "after" the number one and is "before" the number three.

The principal class of objects in the present invention is the class of processes. As described above, processes are either (i) places which are occupied by other processes, or (ii) agents which can (a) transport themselves from a first place, terminating occupancy of the first place, to occupy a second place and (b) interact with other agents occupying the same place.

Agent 150A (FIG. 11A) is a process formed in accordance with the computer instruction set of the present invention whose execution is carried out by engine 132A. Agent 150A can (i) examine and modify itself, (ii) transport itself from a first place in network 100 (FIG. 10) to a second place, and (iii) interact with other agents which occupy the second place.

Herein, a process is described as performing an operation that consumes arguments and produces zero or one result. However, a process, in and of itself, is an object that includes a collection of instructions, which are selected from the instructions described more completely below, and which is interpreted by an engine, e.g., engine 132A which is executing in CPU 110A. The performance of an operation by a process, or any other object of the disclosed instruction set, is in actuality the selection of and interpreting of a particular group of the instructions included in the process or object. Interpreting the instructions of a process by an engine is herein alternatively called "interpreting the process". Thus, when agent 150A performs an operation, agent 150A provides instructions to engine 132A which in turn interprets the instructions and directs CPU 110A to carry out appropriate tasks effectuating performance of the operation by agent 150A. The interaction between a process and an engine is described more completely below.

An important aspect of the present invention is that the set of computer instructions described more completely below is implemented uniformly by the respective computer systems of network 100 (FIG. 10). Computer systems 120A, 120B and 120C can use completely different and incompatible data structures, memory configurations, CPUs and operating systems. But, since an agent is capable of transporting itself to and from any of computer systems 120A, 120B and 120C, it is important that each computer system implement the set of computer instructions of the present invention in a standardized fashion. As long as the computer instructions are uniformly implemented, computer systems 120A, 120B and 120C can be otherwise incompatible. Therefore, agents can travel freely among the computer systems of a heterogeneous, as well as a homogeneous, computer network.

Typically, prior art systems either required that processes travel only within homogeneous networks or that processes be specifically designed to execute computer instructions which were compatible with the computer system within which the process was executing. In the latter case, processes were configured for the particular system requirements of the computer system on which execution of the process began and for the particular system requirements of any computer systems to which the process was intended to travel. Thus, as the computer instructions of an agent of the present invention can execute on any computer system of a heterogeneous network, the present invention represents a substantial improvement over the prior art.

Agents

As discussed above, the behavior of an agent is dependent in part on the internal state of the agent. Therefore, prior to considering the external behavior of an agent in a network, several aspects of the internal state of an agent are briefly discussed. Each agent is a member of class "Agent".

It should be noted that no agents are instances of class "Agent," as class "Agent" is abstract. Class "Agent" is abstract as no implementation for operation "live" is defined or inherited by class "Agent". As discussed below and in Appendix A in greater detail, operation "live" defines the steps that are performed by a process, i.e., an agent or a place, upon creation of the process. These steps are collectively called the "central procedure" of the process. A central procedure for either agents or places is not provided as users of the present invention design and provide central procedures for agents and places to suit the particular needs of each user. Thus, users of the present invention create concrete subclasses of class "Agent" and therein provide implementations for operation "live".

Class "Agent" is a subclass of class "Process". (See FIG. 5.) Class "Process" is a subclass of class "Object" and also inherits from mix-in class "Named". Class "Object" inherits from mix-in class "Referenced". An agent possesses the following attributes: (i) attributes "class" and "size" inherited from superclass "Object"; (ii) attribute "isProtected" inherited from mix-in class "Referenced"; (iii) attribute "name" inherited from mix-in class "Named"; and (iv) attributes "brand", "permit" and "privateClasses" inherited from superclass "Process". Class "Agent" defines no attributes. Each of the above-mentioned attributes and classes is discussed in more detail in Appendix A.

Diagram 1270 (FIG. 12) illustrates the class relations of the classes of which agent 150A is a member. Agent 150A is a member of class "Agent" as agent 150A is shown to be contained within domain 1272 which represents class "Agent". Since class "Agent" is abstract, agent 150A is also a member of one or more subclasses (not shown) of class "Agent".

Domain 1272 is completely contained within domain 1274 which represents class "Process". Agent 150A therefore inherits attributes "brand", "permit" and "privateClasses", which are defined by class "Process". Additionally, all members of class "Agent" are also members of class "Process". Thus, as described above, class "Agent" is a subclass of class "Process".

Domain 1274 is completely contained within domain 1276 which represents class "Object". Agent 150A therefore inherits attributes "class" and "size" which are defined by class "Object". Additionally, all members of class "Process", including members of class "Agent", are also members of class "Object". Thus, as described above, class "Process" is a subclass of class "Object".

Domain 1274 representing class "Process" is contained within domain 1278, which represents class "Named". Connection 1278A shows that domain 1274 is contained within domain 1278 while accurately representing that domain 1276, representing class "Object", is not contained within domain 1278 and that domain 1278 is not contained within domain 1276. Class "Named", represented by domain 1278, is a mix-in class. As domain 1274 is contained within domain 1278, agent 150A is contained within domain 1278 and is therefore a member of mix-in class "Named". Mix-in class "Named" defines attribute "name" which is included in agent 150A.

Domain 1280 which represents mix-in class "Referenced" contains domain 1276, which represents class "Object", as indicated by connection 1280A. As domain 1276 is contained within domain 1280, agent 150A is contained within domain 1280 and is therefore a member of mix-in class "Referenced". Mix-in class "Referenced" defines attribute "isProtected" which is included in agent 150A.

As every flavor of the disclosed embodiment of the present invention is a subclass of class "Object", every flavor is also a subclass of mix-in class "Referenced". Thus, it is not necessary to separate the features of class "Referenced" from the features of class "Object". However, the features of mix-in class "Referenced" are separated from the features of class "Object" to aid conceptualization and understanding of the present invention.

As discussed above in the Glossary of Terms, objects are identified within the disclosed computer instruction set by references. As discussed in greater detail below, in directing an object to perform an operation, the object is identified by a reference. Features defined by mix-in class "Referenced" operate on the reference which identifies the object. For example, attribute "isProtected" determines whether the reference to the object, and not the object itself, is protected. Features defined by class "Object" operate on the object identified by the reference. For example, attribute "class" determines of which class the object is an instance.

Figure 12:
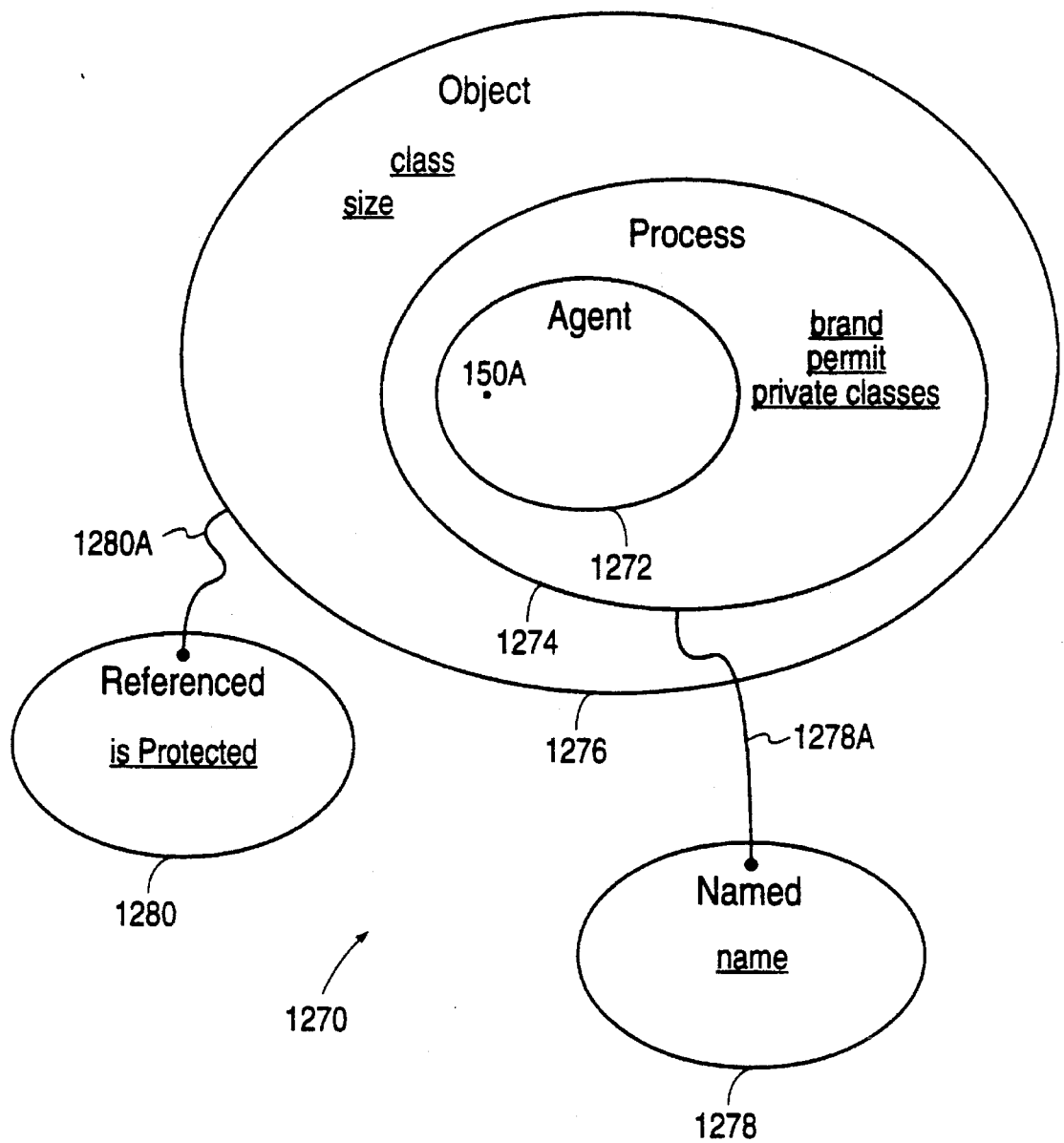
FIG. 12 is a diagram illustrating the class relationships of an agent process in one embodiment of the present invention.

It should be noted that no attribute is defined which provides information regarding the place occupied by agent 150A (FIG. 12). However, the place occupied by agent 150A is maintained as a property of agent 150A. Agent 150A can determine which place agent 150A occupies by execution of the "here" selector. The execution of selectors, and in particular the "here" selector, is discussed in greater detail in Appendix A. The property which is the place occupied by agent 150A is defined by class "Process". Thus, any process, i.e., either a place or an agent, includes a property which is the place occupied by the process.

While the only class disclosed herein and in Appendix A which is an immediate subclass of mix-in class "Named" is class "Process", subclasses of mix-in class "Named", which are not subclasses of class "Process", are defined by users of the present invention using the instructions disclosed herein and in Appendix A. Therefore, class "Named" is a mix-in class.

Agents as Processes

Associated with every process, both agents and places, is a central procedure which defines the primary behavior of the process as discussed above. The central procedure of a process is the method which implements an operation "live" as performed by the process. An engine initiates processing of a process by causing the process to perform operation "live", thereby causing execution of the process's central procedure. The provision of a method for an operation is discussed in greater detail below. When a process completes performance of operation "live", either successfully or otherwise, the process is terminated. The termination of a process is discussed in section 2.4.11 of Appendix A and that discussion is incorporated herein by reference.

Mobility of Agents: Operation "Go"

Figure 15A:
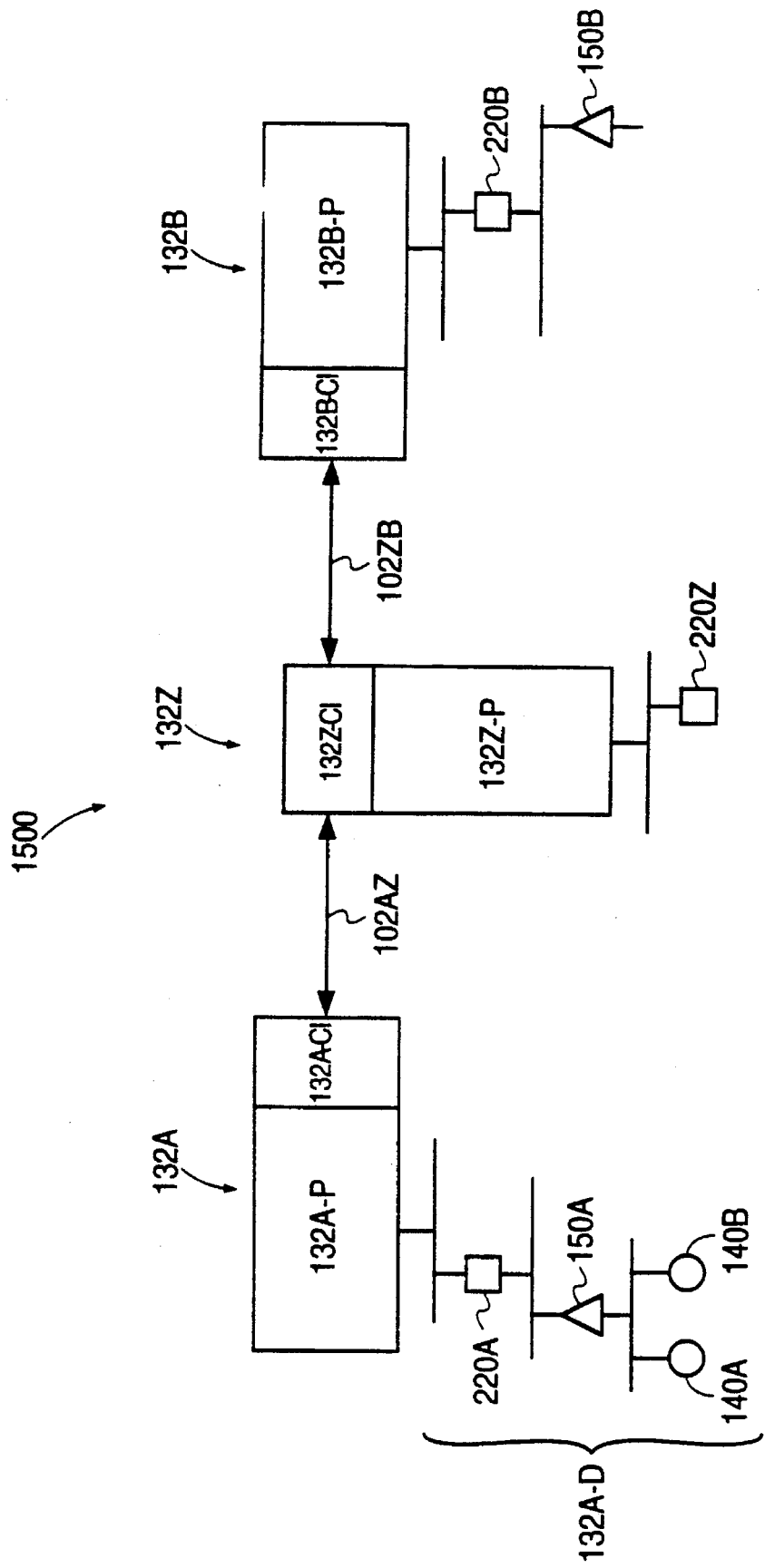
FIGS. 15A–15E show the structure of a network formed in accordance with the present invention and illustrate the movement of an agent process through the network.

As discussed above, an agent travels from one place to another by performance of operation "go". Operation "go" is discussed in the context of the illustrative example of FIGS. 15A–15E. To travel from place 220A to place 220B, agent 150A (FIG. 15A) performs operation "go". FIG. 15A shows the state of network 1500 prior to performance of operation "go" by agent 150A.

Agent 150A owns objects 140A and 140B and occupies place 220A in engine 132A. Thus, agent 150A and place 220A are processes which are simultaneously interpreted by engine 132A. In other words, place 220A and agent 150A are simultaneously performing operation "live". Engine 132B interprets place 220B and agent 150B. Agent 150B occupies place 220B.

Communication infrastructure 132A-CI of engine 132A is connected to communication infrastructure 132Z-CI of engine 132Z by communications link 102AZ. Engine 132Z interprets place 220Z. Communication infrastructure 132Z-CI is also connected to communication infrastructure 132B-CI of engine 132B by communications link 102ZB. While in this embodiment only three computer systems are illustrated in network 1500, the number of computer systems in network 1500 is an arbitrary number, Hence, the computer systems illustrated in FIG. 15A are illustrative of the principles of the invention and are not intended to limit the invention to the particular network illustrated.

Performance of operation "go" by agent 150A, in this embodiment, requires transportation of agent 150A from engine 132A through engine 132Z to engine 132B. Hence, operation "go" requires action on the part of engine 132A, i.e., the source engine, engine 132Z, i.e. the transit engine, and engine 132B, i.e., the destination engine.

Operation "Go" as Performed by the Engine Processing the Source Place

Figure 13B:
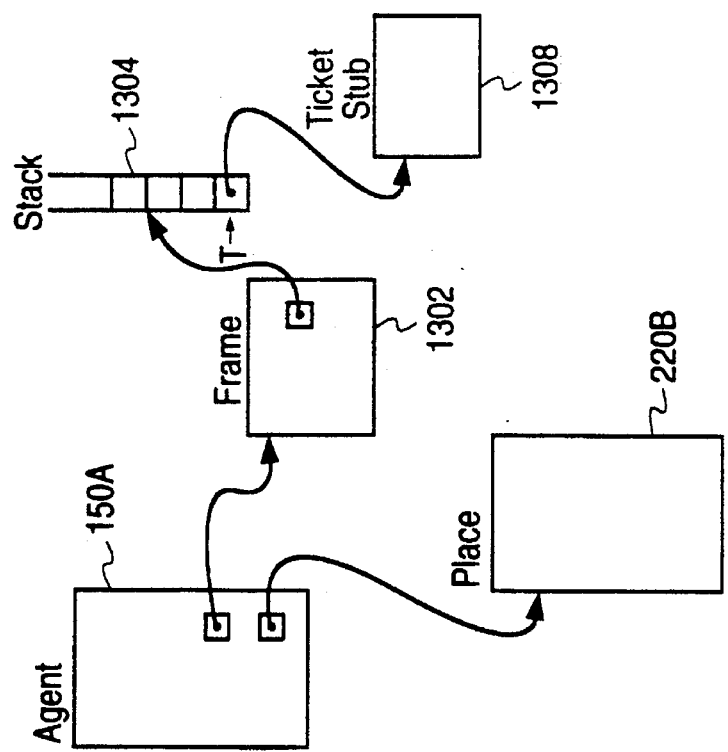
FIGS. 13A and 13B illustrate the state of an agent process formed in accordance with the present invention immediately before and after, respectively, movement of the agent process within a computer network of the present invention by performance of operation "go".
Figure 13A:
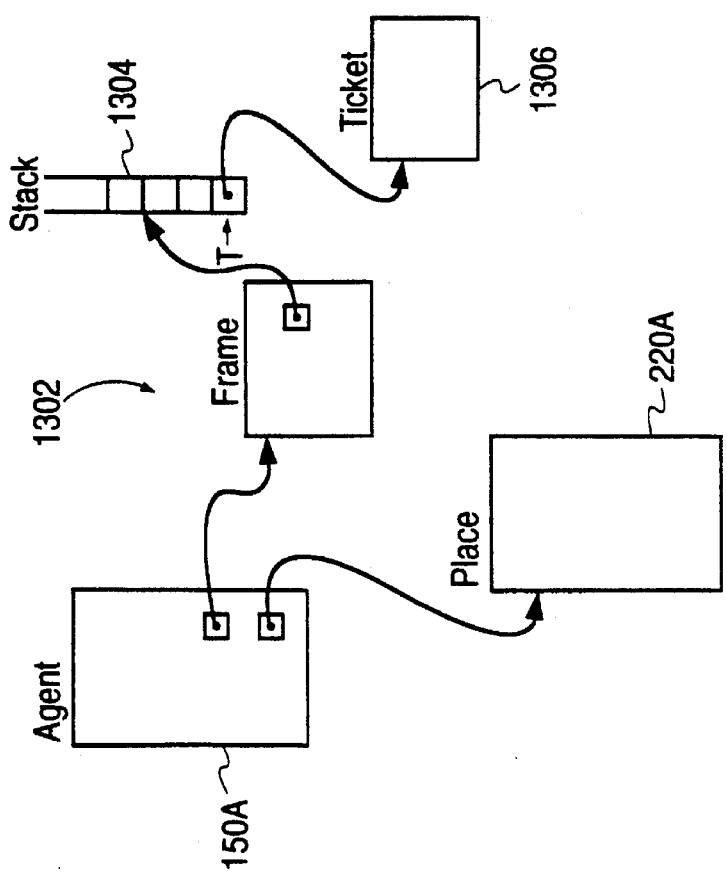

FIG. 13A shows a portion of the internal state, including a portion of the execution state, of agent 150A immediately prior to performance of operation "go" by agent 150A. The execution state of a process is described in greater detail below. Stack 1304 is a part of the execution state of agent 150A. Stack 1304 contains, at top "T", ticket 1306. Ticket 1306 is described more completely below. Arguments consumed by performance of operation "go" are popped from stack 1304 and stack 1304 is therefore the "current stack" in the context of operation "go". Place 220A is a property of agent 150A, indicating that agent 150A occupies place 220A.

FIG. 13B shows a portion of the internal state, including a portion of the execution state, of agent 150A immediately following performance of operation "go" by agent 150A. FIG. 13B is described in greater detail below.

Logic flow diagram 1400 (FIG. 14A) illustrates operation "go" as carried out by engine 132A (FIG. 15A). Engine 132A is the source engine as agent 150A is executing within engine 132A when performance of operation "go" is initiated. The steps of logic flow diagram 1400 (FIG. 14A) are discussed in the context of the trip from place 220A (FIG. 15A) to place 220B taken by agent 150A.

Figure 14A:
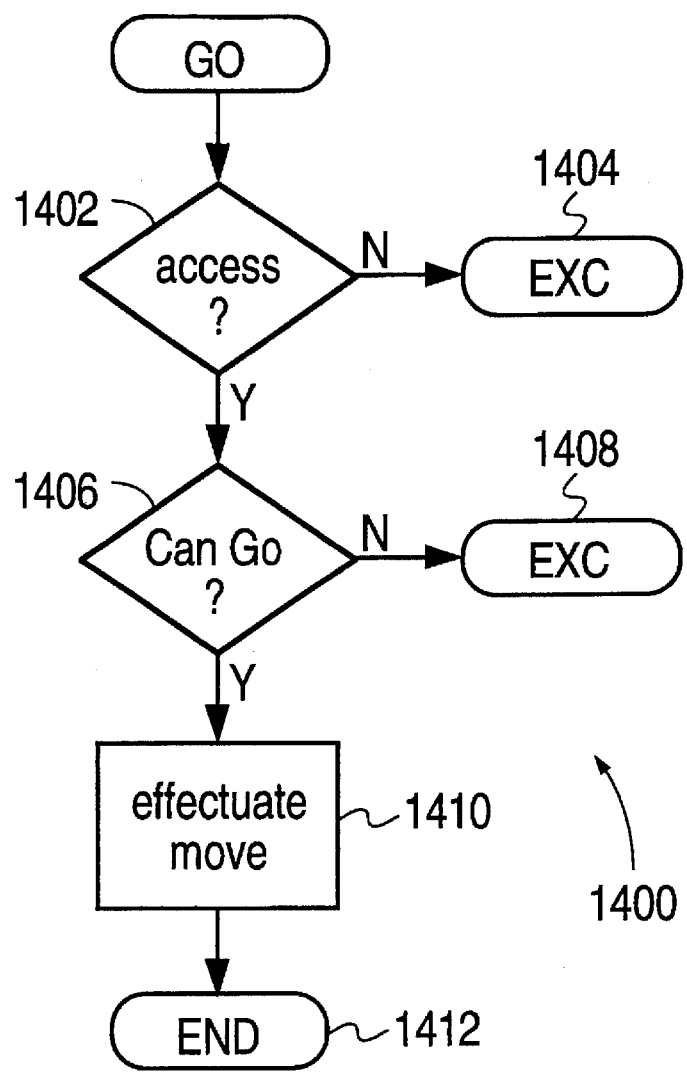
FIGS. 14A–14G are logic flow diagrams which illustrate the steps taken to move an agent process through a network in accordance with the present invention by performance of operation "go".

In performance of operation "go" by agent 150A, engine 132A (FIG. 15A) determines whether agent 150A is the agent requesting performance of operation "go" in an access test step 1402 (FIG. 14A). If operation "go" is requested by an object other than agent 150A (FIG. 15A), processing transfers from access test step 1402 (FIG. 14A) to terminal step 1404 in which an exception of class "Process Not Current" is thrown causing operation "go" to fail. If, however, operation "go" is requested by agent 150A (FIG. 15A), processing transfers from access test step 1402 (FIG. 14A) to a "canGo" test step 1406.

Figure 16:
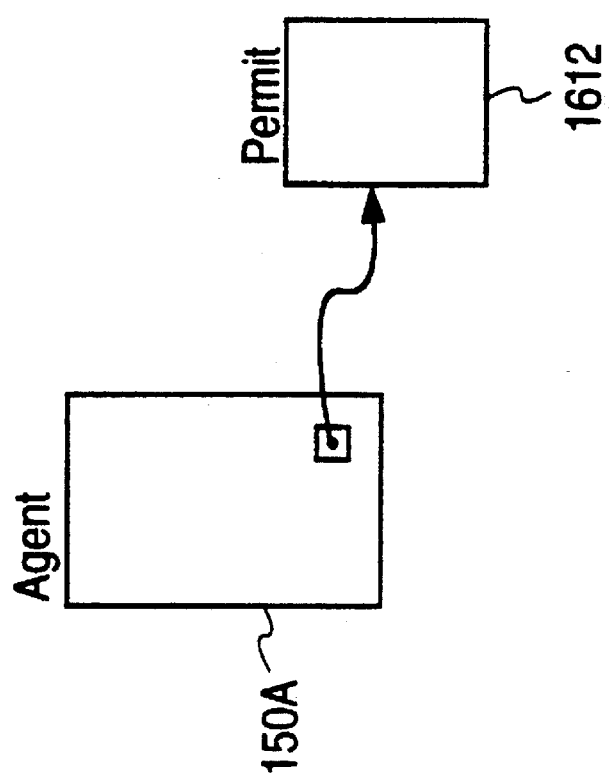
FIG. 16 shows the structure of an agent process including a permit.

In "canGo" test step 1406, engine 132A (FIG. 15A) determines whether agent 150A is permitted to perform operation "go". In "canGo" test step 1406, engine 132A (FIG. 15A), queries attribute "permit" of agent 150A. Attribute "permit" as discussed above, is one of a plurality of attributes of agent 150A. The various attributes of agent 150A are described in greater detail in Appendix A in conjunction with class "Process". The query of attribute "permit" of agent 150A produces property "permit" of agent 150A. Specifically, permit 1612 (FIG. 16) is property "permit" of agent 150A and is therefore produced by querying attribute "permit" of agent 150A. In this embodiment, property "permit" is one of a number of properties of agent 150A.

Figure 17:
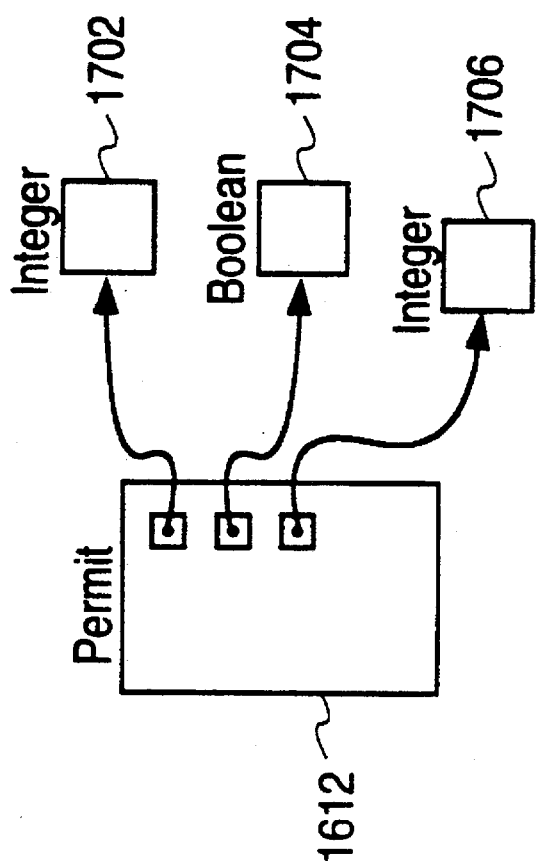
FIG. 17 shows the structure of the permit of FIG. 16.

Permit 1612 (FIG. 17) includes, among several properties which are described in greater detail in Appendix A, properties "charges", "canGo", and "age" which are integer 1702, boolean 1704, and integer 1706, respectively. A boolean is an object having one of only two possible values: "true" or "false". In "canGo" test step 1406 (FIG. 14A), engine 132A (FIG. 15A) queries attribute "canGo" of permit 1612 (FIG. 17), thereby producing boolean 1704 which is property "canGo" of permit 1612, and compares boolean 1704 to "true".

If boolean 1704 has a value of "false", processing transfers from "canGo" test step 1406 (FIG. 14A) to terminal step 1408. Agent 150A is not permitted to travel by performance of operation "go" and the operation fails and throws an exception that is a member of class "Permit Violated" in terminal step 1408. Exceptions and their classification are described more completely in Appendix A.

Otherwise, if boolean 1704 (FIG. 17) has a value of "true", processing transfers from "canGo" test step 1406 (FIG. 14A) to an effectuate move step 1410. Effectuate move step 1410 is described in greater detail below in conjunction with FIG. 14B. Processing transfers from effectuate move step 1410 (FIG. 14A) to terminal step 1412 in which operation "go", to the extent engine 132A is involved, completes successfully.

Figure 14B:
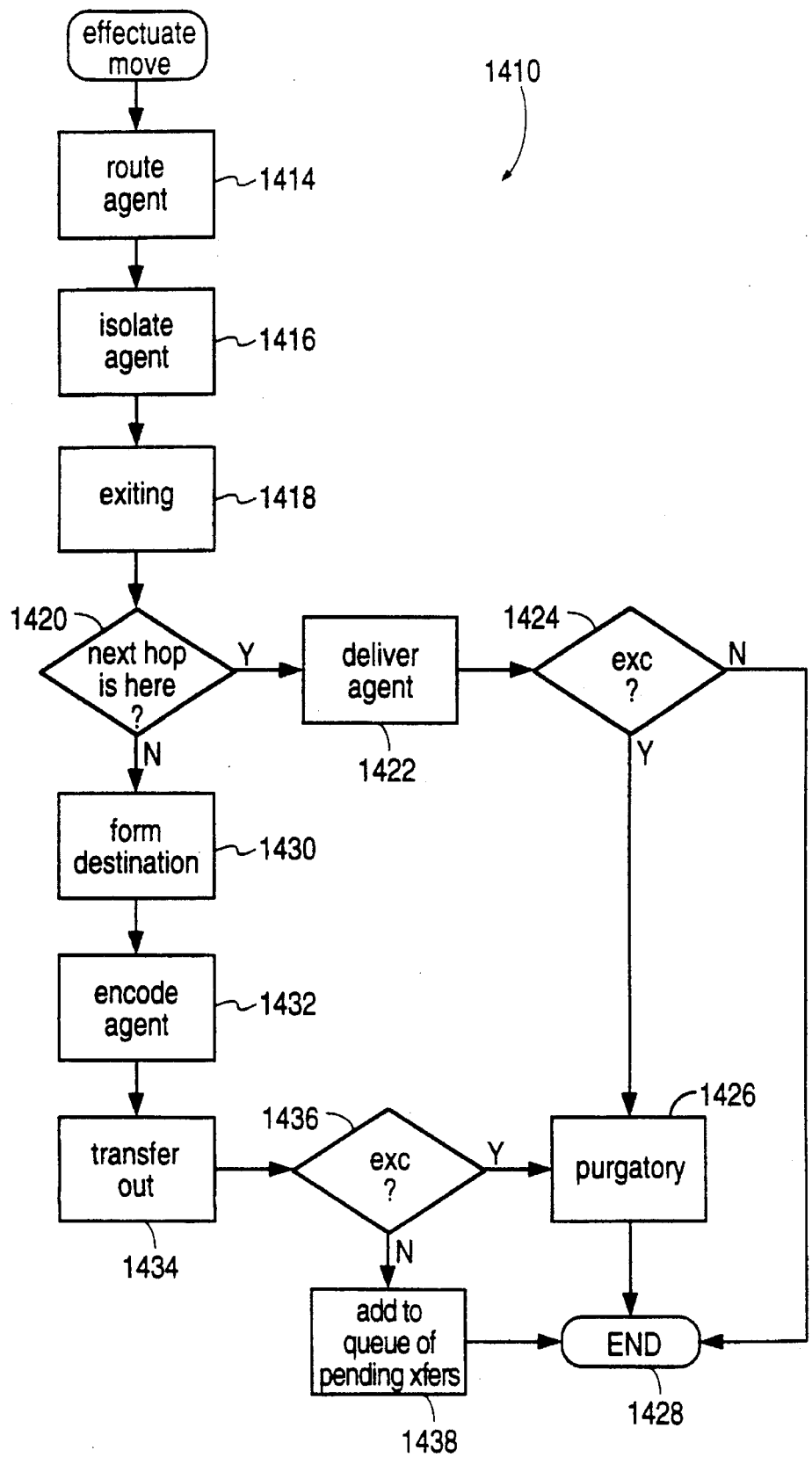

Effectuate move step 1410, which is performed by engine 132A (FIG. 15A) as described above, is represented by logic flow diagram 1410 (FIG. 14B). In the first step of logic flow diagram 1410, i.e., route agent step 1414, engine 132A (FIG. 15A) selects an engine to use in transporting agent 150A to the trip destination, i.e., a "transfer destination". As used herein, the transfer destination is the next engine used in the trip and should not be confused with the "trip destination". Ticket 1306 (FIG. 13A) defines a place as the destination of a trip; therefore, the "trip destination" is a place. In the course of the trip defined by ticket 1306 (FIG. 13A), agent 150A (FIG. 15A) is transferred from one engine to another. Therefore, a "transfer destination" is an engine. In general, a trip can require several transfers of an agent before the agent reaches an engine which contains a trip destination.

In step 1414 (FIG. 14B), a way object, i.e., a member of class "Way", which defines a transfer destination is produced. The transfer destination can be, for example, (i) the engine which currently contains agent 150A, i.e., engine 132A, in which case agent 150A is not transferred, (ii) another engine in the region which contains engine 132A, or (iii) an engine in another region. In either of possibilities (ii) or (iii), agent 150A is transferred to the transfer destination as described below.

The term "region" is defined above in the Glossary of Terms. The grouping of engines into regions is significant in the routing of an agent as each engine typically contains more detailed information regarding other engines within the same region than engines of other regions. This is true because engines of a single region are configured by a single person or organization, which is therefore called the "provider" of the region. Therefore, each engine of a region can be given detailed information regarding other engines of the region as all such engines are provided by a single provider.

The grouping of engines into regions is helpful in routing agents in large and complex networks. When an agent travels between regions, it is not imperative that the source engine contain any information regarding the transfer destination engine. It is sufficient that the source engine can determine to which region the agent is traveling and can transfer the agent to an engine in that region. Once transferred to an engine in the region containing the place that is the trip destination, the agent can be more easily routed to an engine containing that place.

Logic flow diagram 1414 (FIG. 14C) shows the steps carried out in route agent step 1414 (FIG. 14B) and is discussed below in greater detail.

Processing transfers from route agent step 1414 to an isolate agent step 1416 where agent 150A (FIG. 15A) is isolated. Isolation of a process is described in greater detail in Appendix A and that discussion is incorporated herein by reference. Briefly, agent 150A is isolated (i) by voiding all references within agent 150A to other processes, and to objects owned by other processes, and (ii) by voiding within all other processes references to agent 150A and to objects owned by agent 150A. Processing transfers from isolate agent step 1416 (FIG. 14B) to exiting step 1418.

In exiting step 1418, place 220A (FIG. 15A) notes the departure of agent 150A by performing operation "exiting" at the request of engine 132A. Operation "exiting" is described below in greater detail. Processing transfers from exiting step 1418 to a next hop is here test step 1420.

In next hop is here test step 1420, engine 132A (FIG. 15A) compares the transfer destination determined in route agent step 1414 (FIG. 14B) to the current engine, i.e., engine 132A (FIG. 15A). If the transfer destination is the current engine, i.e., engine 132A, processing transfers from next hop is here test step 1420 (FIG. 14B) to deliver agent step 1422. In the illustrative example of FIGS. 15A–15E, agent 150A is transferred to engine 132Z, as discussed below; thus, the transfer destination is not the current engine, i.e., engine 132A, and processing does not transfer to deliver agent step 1422 (FIG. 14B). However, deliver agent step 1422 and the steps which follow are described for completeness.

In deliver agent step 1422, agent 150A (FIG. 15A) is delivered to a place within engine 132A which satisfies ticket 1306 (FIG. 13A). Deliver agent step 1422 (FIG. 14B) is represented by logic flow diagram 1422 (FIG. 14E) and is discussed in greater detail below. Processing transfers from deliver agent step 1422 (FIG. 14B) to a first exception test step 1424 in which engine 132A (FIG. 15A) determines whether delivery of agent 150A threw an exception. If no exception is thrown in deliver agent step 1422 (FIG. 14B), processing transfers from first exception test step 1424 to terminal step 1428. Terminal step 1428 completes move step 1410 and so processing transfers to terminal step 1412 (FIG. 14A) which is described above.

Figure 14C:
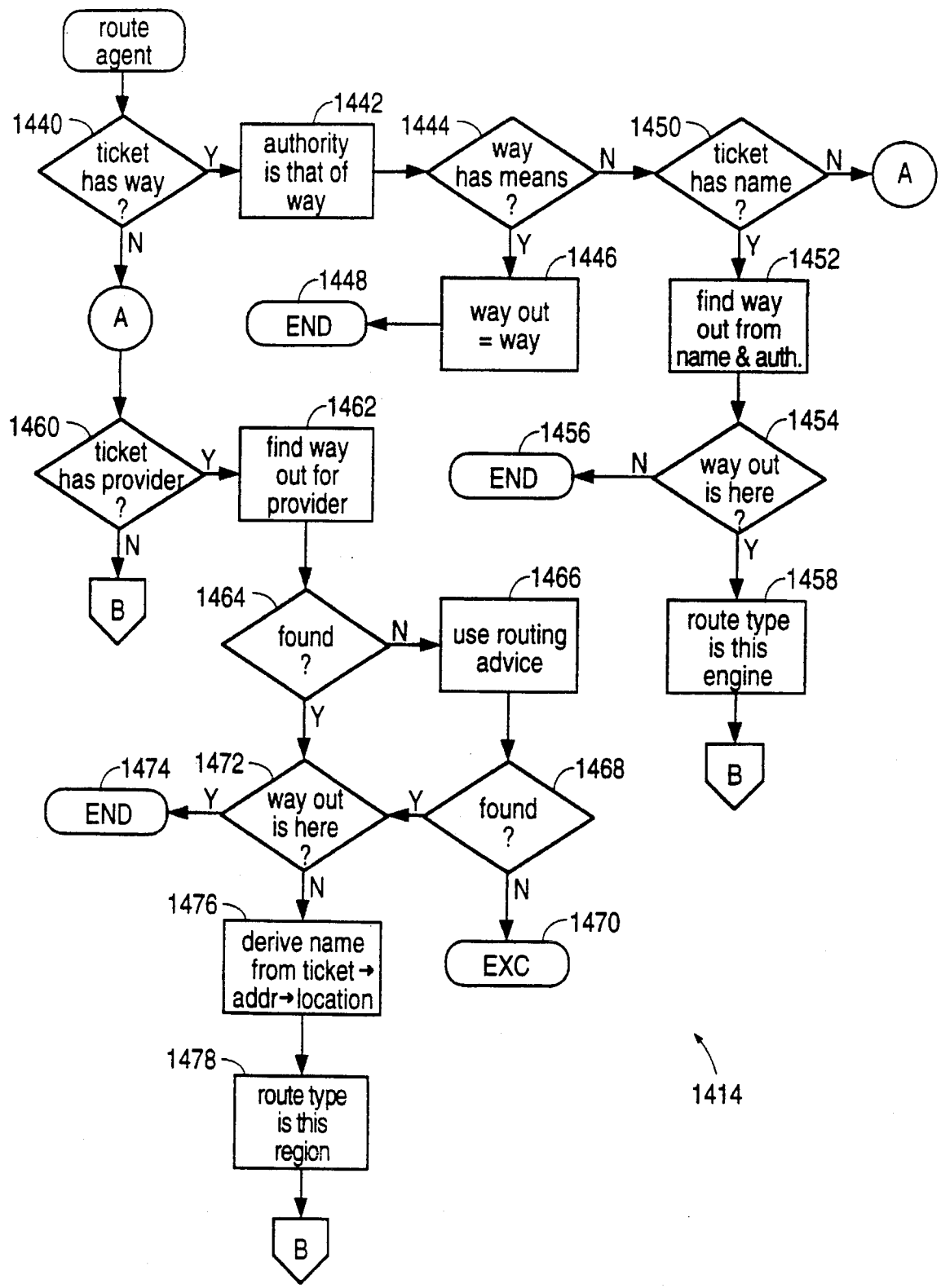
Figure 14D:
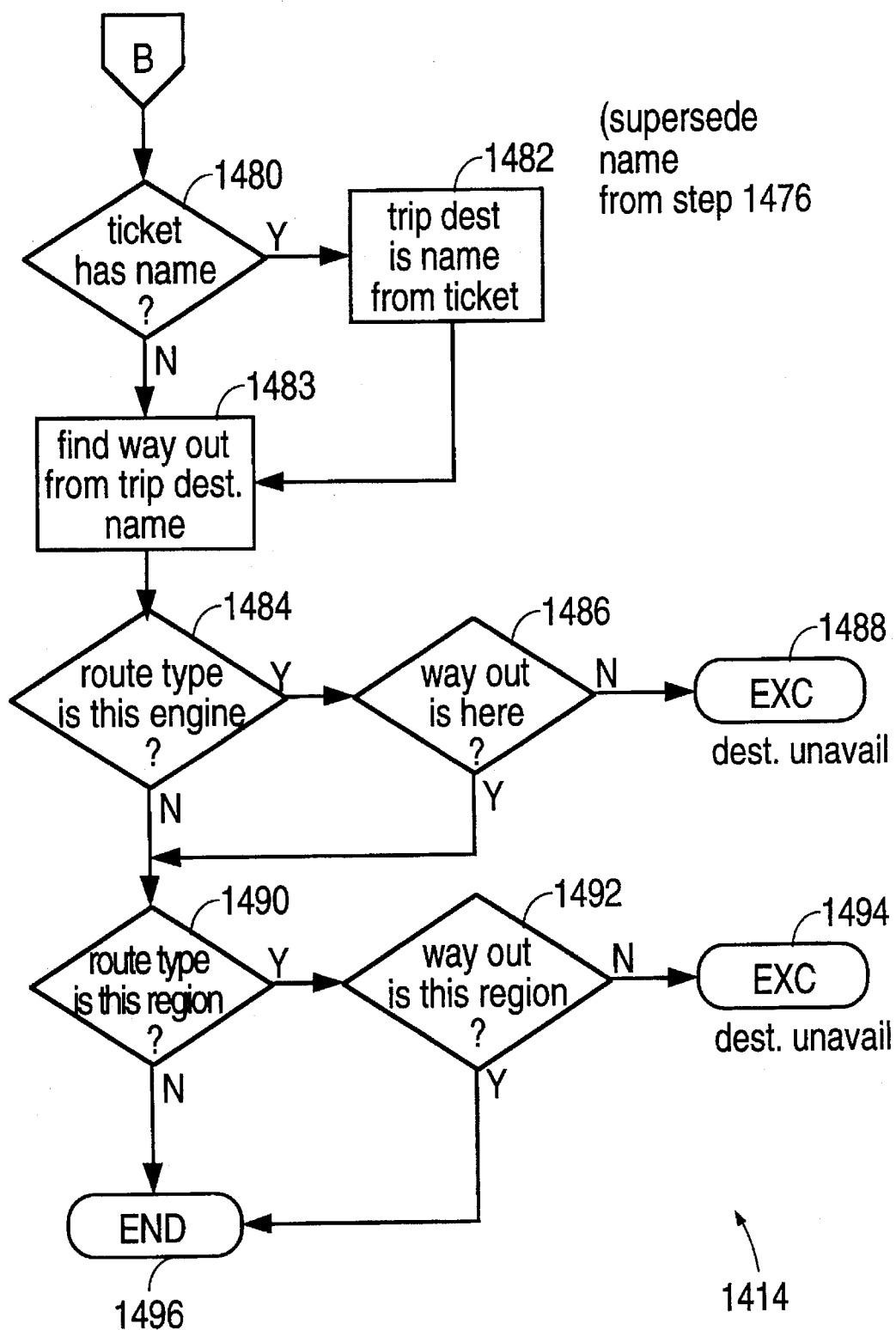
Figure 14E:
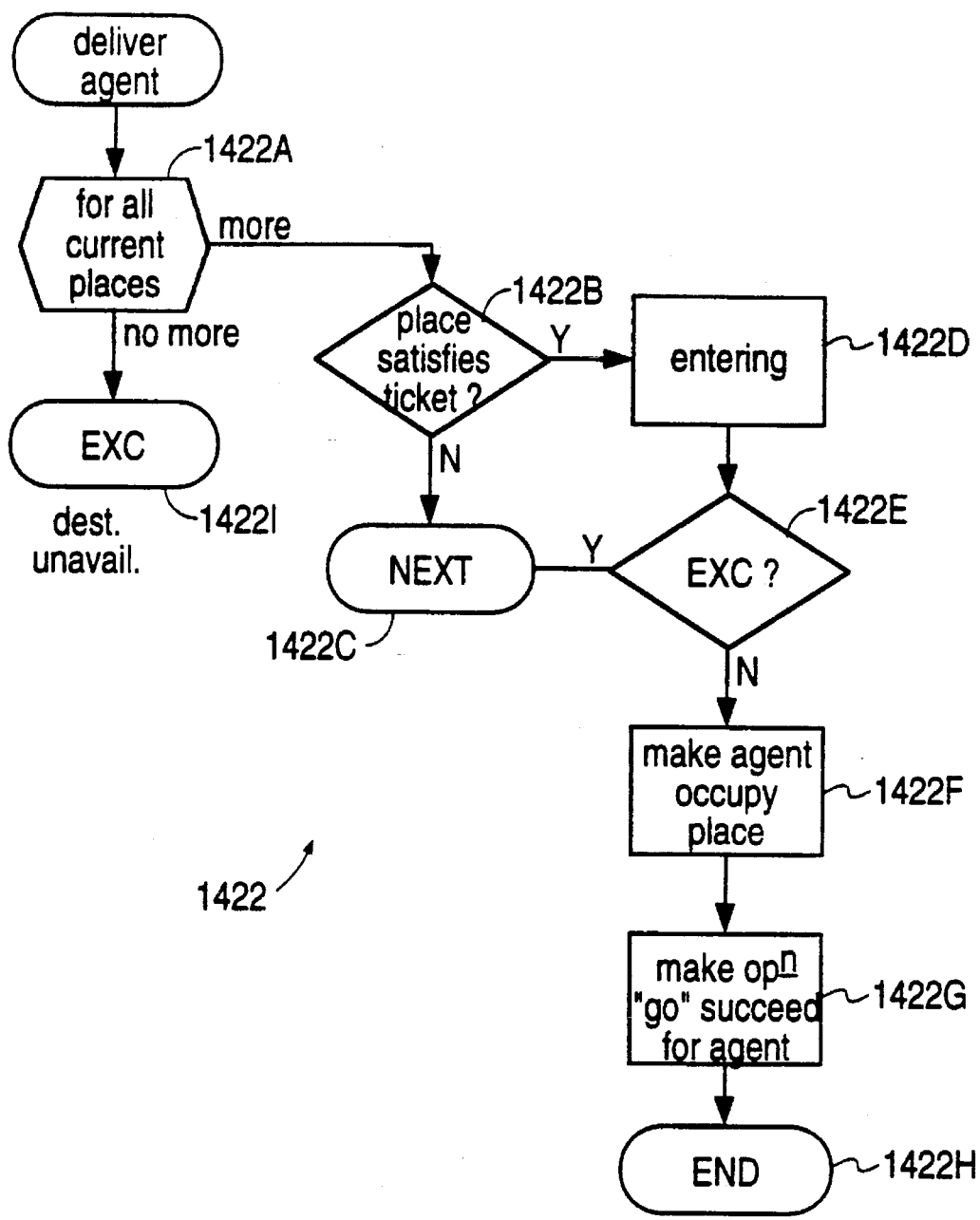

If, on the other hand, an exception is thrown in deliver agent step 1422 (FIG. 14B), processing transfers from first exception test step 1424 to step 1426 in which agent 150A is delivered to purgatory according to logic flow diagram 1422 (FIG. 14E). Purgatory is a place within each engine and which never denies ingress to a process. In entering purgatory, the local permit of agent 150A can be severely restricted. For example, property "canGo" of the local permit is set to "true" and properties "canCharge", "canCreate", "canDeny", "canGrant", "canRestart", "canSend" and "canTerminate" are set to "false". Properties "charges" and "age" are set just large enough that agent 150A can detect and analyze the exception that sent agent 150A to purgatory, and can travel to another place by performance of operation "go". The various properties of a permit are described in greater detail in Appendix A.

Processing transfers from step 1426 to terminal step 1428 and so effectuate move step 1410 (FIG. 14A), completes successfully, as described above.

As discussed above, if the transfer destination determined in route agent step 1414 (FIG. 14B) is the current engine, i.e., engine 132A, processing transfers from next hop is here test step 1420 (FIG. 14B) to deliver agent step 1422. Conversely, if the transfer destination is not the current engine, processing transfers from next hop is here test step 1420 to a form destination step 1430. In form destination step 1430, a destination object which specifies the transfer destination is formed. Processing transfers from form destination step 1430 to encode agent step 1432.

Figure 15B:
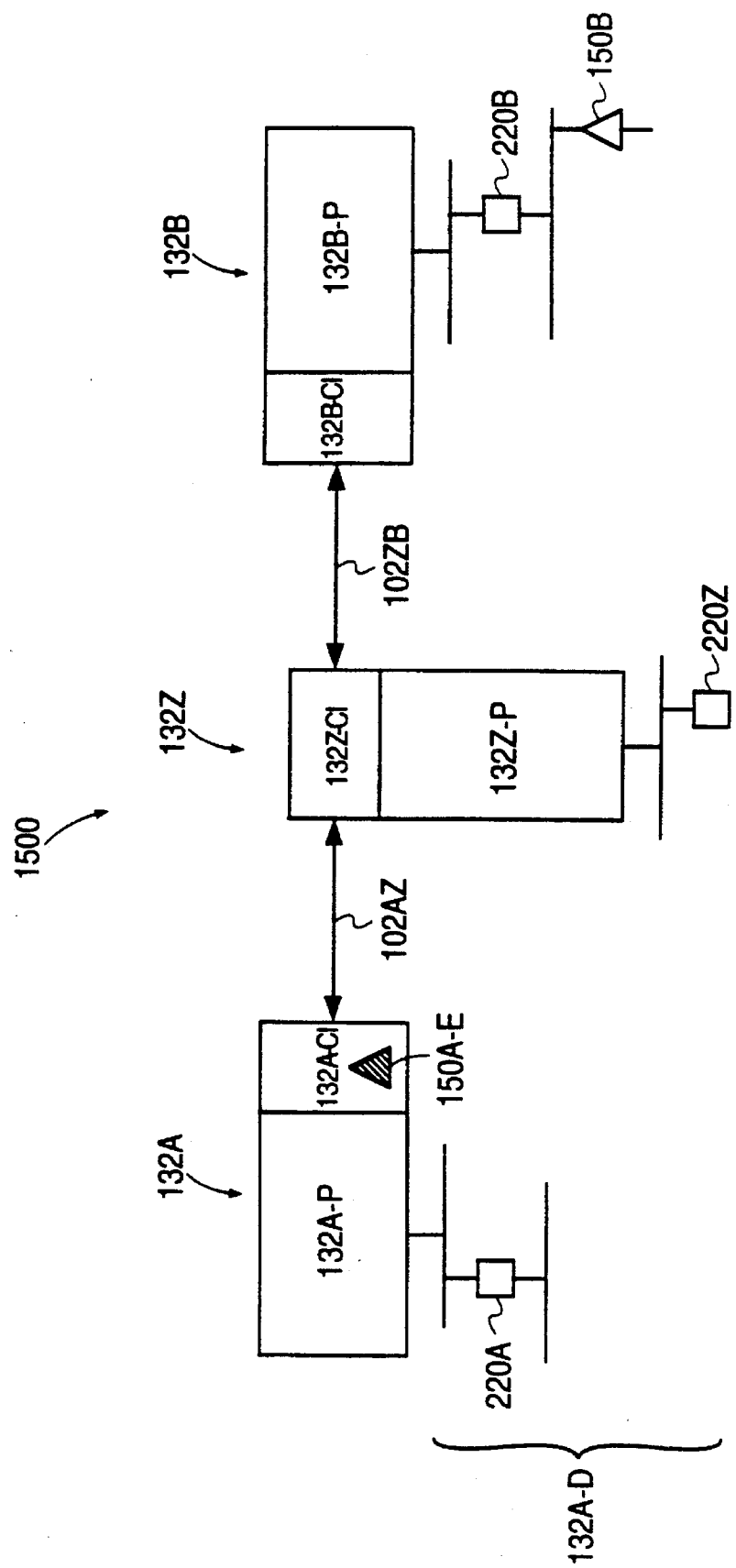
Figure 21:
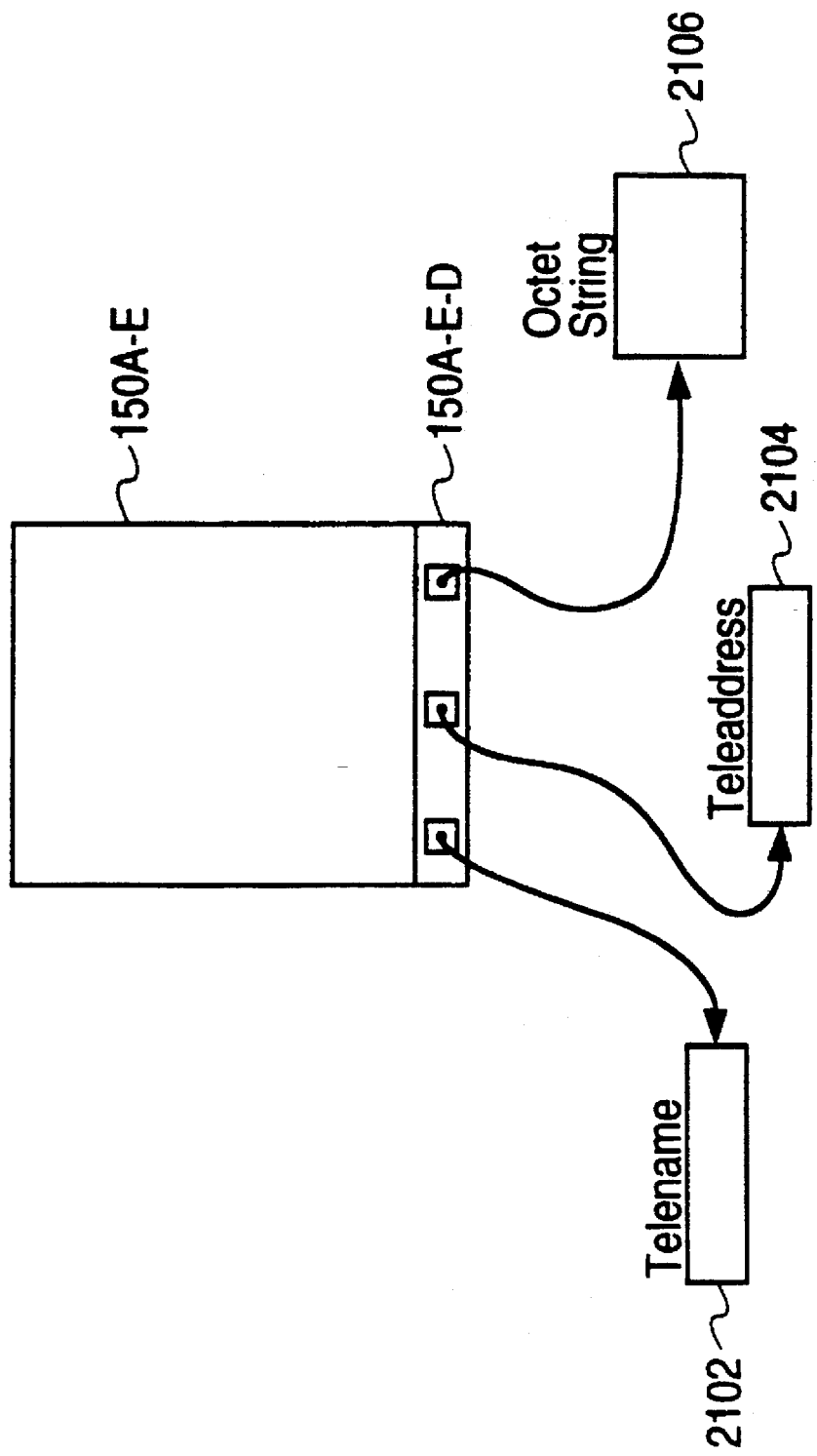
FIG. 21 shows the structure of an encoded agent in accordance with one embodiment of the present invention.

In encode agent step 1432, engine 132A (FIG. 15A) encodes agent 150A according to the encoding rules of the Telescript Encoding Rules, included as Appendix B, which is a part of this disclosure and which is incorporated herein by reference in its entirety. Encoding agent 150A results in (i) agent 150A, (ii) all objects owned by agent 150A including objects 140A and 140B and (iii) the classes of which agent 150A and all objects owned by agent 150A are members being represented in encoded agent 150A-E (FIG. 15B) in a standardized binary form. The destination object formed in form destination step 1430 (FIG. 14B), i.e., destination object 150A-E-D (FIG. 21), is included in encoded agent 150A-E and is discussed in greater detail below. As shown in FIG. 15B, encoded agent 150A-E is stored in communication infrastructure 132A-CI of engine 132A. Agent 150A (FIG. 15A) is retained by engine 132A until the transfer of encoded agent 150A-E is complete as described below in greater detail.

Processing transfers from encode agent step 1432 to transfer out step 1434. In transfer out step 1434, engine 132A (FIG. 15B) initiates transfer of encoded agent 150A-E according to the destination object formed in form destination step 1430 (FIG. 14B). In this example, the destination object specifies engine 132Z (FIG. 15B) as the transfer destination of encoded agent 150A-E. Encoded agent 150A-E is transferred as ordinary binary data from communications infrastructure 132A-CI, across communications link 102AZ, to communications infrastructure 132Z-CI of engine 132Z. The transportation of data between communications infrastructures 132A-CI and 132Z-CI is described in greater detail in Appendices C and F, which are a part of this disclosure and incorporated herein in their entirety by reference. As discussed above, the transfer of encoded agent 150A-E is initiated in transfer agent out step 1434. Processing according to logic flow diagram 1410 (FIG. 14B) by program portion 132A-P of engine 132A proceeds while the transfer of encoded agent 150A-E between communications infrastructures 132A-CI and 132Z-CI continues.

Processing transfers from transfer out step 1434 to a second exception test step 1436 in which engine 132A determines whether transfer out step 1434 threw an exception, i.e., whether initiation of the transfer of encoded agent 150A-E failed. If transfer out step 1434 fails, processing transfers from second exception test step 1426 in which agent 150A is delivered to purgatory as described above. Conversely, if transfer out step 1434 succeeds, processing transfers from second exception test step 1436 to step 1438.

In step 1438, engine 132A (FIG. 15B) adds agent 150A to a list of pending transfers. Agent 132A is retained in the list of pending transfers during the transfer of agent 150A. When the transfer is complete, agent 150A is removed from the list of pending transfers and discarded by engine 132A. If the permit of agent 150A expires while agent 150A is still on the list of pending transfers, i.e., if the actual age of agent 150A reaches property "age" of the effective permit of agent 150A, the transfer of encoded agent 150A-E is aborted; agent 150A is removed from the list of pending transfers; and agent 150A throws an exception of class "Permit Expired", thereby failing to perform operation "go" successfully. The "effective permit" of a process is described in greater detail in Appendix A. Processing transfers from step 1438 to terminal step 1428 in which logic flow diagram 1410 (FIG. 14B), and therefore effectuate move step 1410 (FIG. 14A), completes.

As described above, in route agent step 1414, engine 132A (FIG. 15A) determines the transfer destination for agent 150A. Logic flow diagram 1414 (FIG. 14C) shows the steps carried out in route agent step 1414 (FIG. 14B).

The following discussion of logic flow diagram 1414 (FIGS. 14C and 14D) considers circumstances beyond the scope of the illustrative example of FIGS. 15A–15E. Logic flow diagram 1414 (FIGS. 14C and 14D) is therefore described independently of the illustrative example of FIGS. 15A–15E. To provide a framework for discussion, however, logic flow diagram 1414 (FIGS. 14C and 14D) is described in the context of agent 150A (FIG. 15A) performing operation "go" to effectuate a trip which originates in place 220A within engine 132A. The discussion of logic flow diagram 1414 (FIGS. 14C and 14D) is not limited to (i) a trip in which agent 150A is transferred to an engine other than engine 132A (FIG. 15A) or (ii) a network in which engines 132A, 132Z and 132B are of the same region. Furthermore, the following discussion does not limit ticket 1306 (FIG. 13A), which defines the trip taken by agent 150A (FIG. 15A), to either including or excluding specification of a way, a means, a telename, or a provider. Ticket 1306 (FIG. 13A), in the context of logic flow diagram 1414 (FIGS. 14C and 14D), can define a trip (i) to a place within engine 132A (FIG. 15A), (ii) to a place within an engine in the same region as engine 132A, or (iii) to a place within an engine in a region different than the region which contains engine 132A.

Figure 18A:
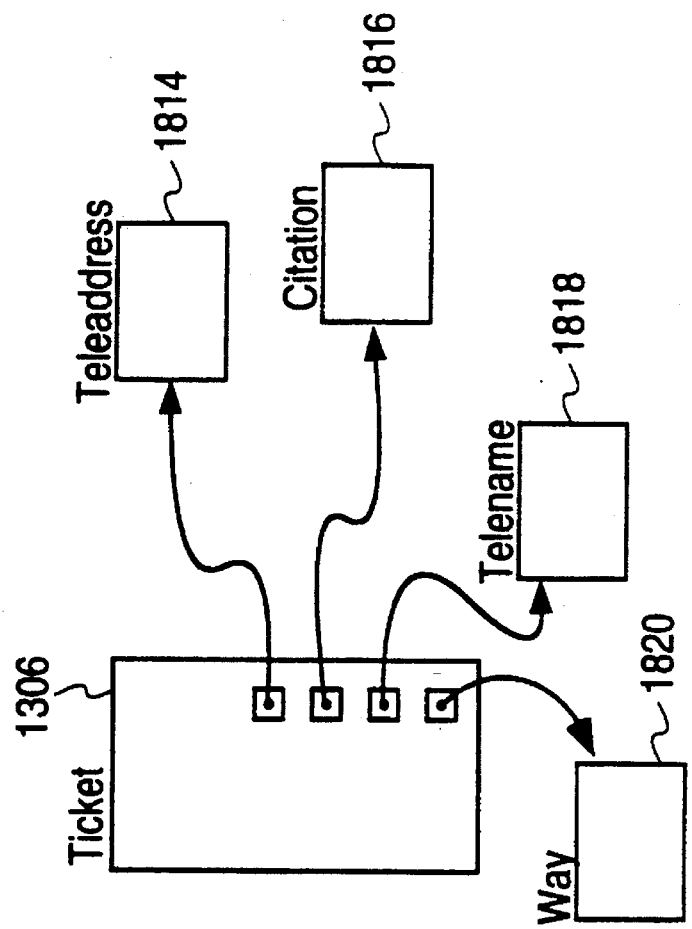
FIG. 18A shows the structure of the ticket of FIG. 13A including a teleaddress, a citation, a telename, and a way.

Recall that for operation "go", ticket 1306, which is consumed as an argument to operation "go", specifies the destination and other characteristics of the trip. In logic flow diagram 1414, engine 132A (FIG. 15A) in test step 1440 queries attribute "way" of ticket 1306 (FIGS. 13 and 18A), thereby producing property "way" of ticket 1306. Property "way" of ticket 1306 is way 1820 (FIG. 18A). Property "way" of ticket 1306 is optional and can therefore alternatively be a nil (not shown).

If property "way" of ticket 1306 is a nil, processing transfers from test step 1440 to a ticket has provider test step 1460 which is described below in greater detail. Conversely, if property "way" of ticket 1306 is a way, i.e., is not a nil, processing transfers from test step 1440 to step 1442 in which engine 132A (FIG. 15A) queries attribute "name" of way 1820 (FIG. 18A), thereby producing the telename that is property "name" of way 1820. Also in step 1442 (FIG. 14C), engine 132A (FIG. 15A) produces and copies property "authority" of that telename. The resulting "authority", which is represented by an octet string as described in Appendix A, is used to determine the transfer destination, as described below.

Figure 18B:
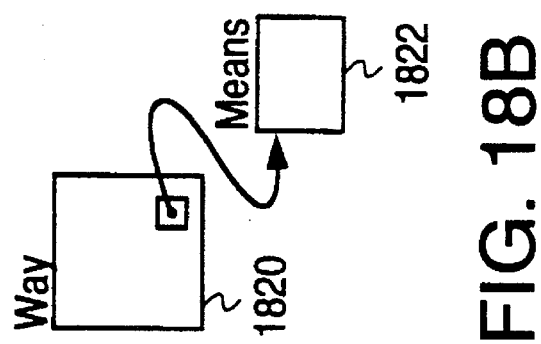
FIG. 18B shows the structure of the way of FIG. 18A.
Figure 19:
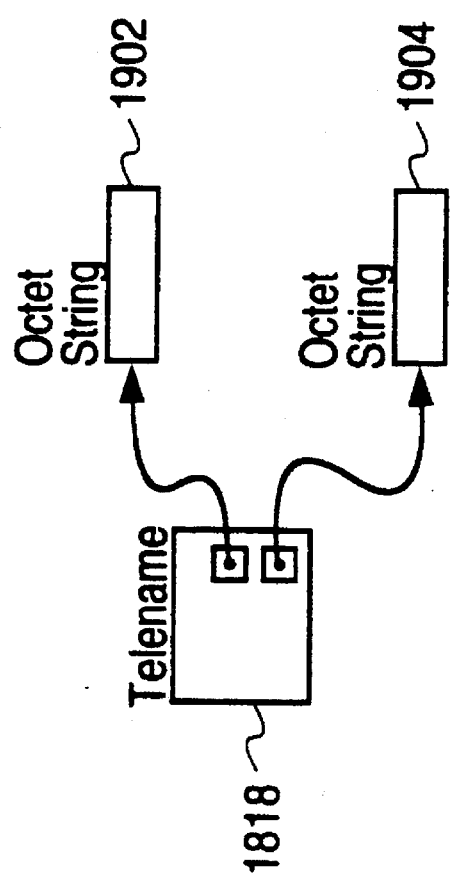
FIG. 19 shows the structure of the telename of FIG. 18A.

Processing transfers from step 1442 to a way has means test step 1444 (FIG. 14C) in which attribute "means" of way 1820 (FIG. 18B) is queried, thereby producing property "means" of way 1820, which is means object 1822. Property "means" is optional and can therefore alternatively be a nil (not shown).

A means object, i.e., a member of class "Means", is an object which specifies an engine by specifying (i) an inter-computer communications medium and (ii) transfer instructions to reach a specific engine via that medium. For example, a means object can specify the public switched telephone network (PSTN) and specify modem instructions which include the telephone number of a specific modem through which to transfer the agent to a destination engine. As a means object contains all information needed to route agent 150A to a destination engine, other properties of ticket 1306 are ignored if ticket 1306 contains a means object.

Therefore, if property "means" of way 1820 is not nil, i.e., is means object 1822 (FIG. 18B), processing transfers from way has means test step 1444 (FIG. 14C) to step 1446. In step 1446, way 1820 is designated as the way which defines the transfer destination. It should be noted that means object 1822 defines the engine that is the destination of the first hop, i.e., the first transfer of agent 150A (FIG. 15A), and not the destination of the trip defined by ticket 1306 (FIG. 18A), which is necessarily a place rather than an engine. Processing transfers from step 1446 to terminal step 1448 in which the processing of logic flow diagram 1414, i.e., route agent step 1414 (FIG. 14B), completes successfully.

Conversely, if property "means" of way 1820 (FIG. 18B) is nil, way 1820 contains no means object and processing transfers from way has means test step 1444 (FIG. 14C) to a ticket has name test step 1450. In ticket has name test step 1450, engine 132A (FIG. 15A) produces property "destinationName" of ticket 1306 (FIG. 18A), which is telename 1818, and compares telename 1818 to a nil. As property "destinationName" of ticket 1306 is optional, property "destinationName" of ticket 1306 can be a nil (not shown).

If property "destinationName" of ticket 1306 is a nil, processing transfers from ticket has name test step 1450 to ticket has provider test step 1460, which is described below. Conversely, if property "destinationName" of ticket 1306 is telename 1818, processing transfers from ticket has name test step 1450 to step 1452. In step 1452, engine 132A (FIG. 15A) produces a way object which defines a transfer path for agent 150A to the transfer destination. Engine 132A consults a finder, which is described in greater detail below, to produce a way object to a region associated with the authority produced and copied in step 1442 (FIG. 14C) above, and a place within that authority whose name is equal to telename 1818 (FIG. 18A). The production of such a way object by use of a finder is described in greater detail below.

Processing transfers from step 1452 to a way out is here test step 1454 in which engine 132A (FIG. 15A) determines whether the way object produced in step 1452 (FIG. 14C) defines a transfer to engine 132A (FIG. 15A). If the produced way object does not define a transfer to engine 132A, processing transfers from way out is here test step 1454 to terminal step 1456 in which the processing of logic flow diagram 1414, i.e., route agent step 1414 (FIG. 14B), completes successfully.

Conversely, if the produced way object defines a transfer to engine 132A (FIG. 15A), processing transfers from way out is here test step 1454 to step 1458 in which engine 132A sets a flag indicating that agent 150A is to be transferred to engine 132A. Processing transfers from step 1458 to a second ticket has name test step 1480 which is described below in greater detail.

As discussed above, if property "way" of ticket 1306 is nil, processing transfers from ticket has way test step 1440 to ticket has provider test step 1460. In ticket has provider test step 1460, engine 132A produces property "destinationAddress" of ticket 1306, which is a teleaddress 1814 (FIG. 18A), and produces property "provider" of teleaddress 1814. If either property "destinationAddress" of ticket 1306, or property "provider" of teleaddress 1814, is a nil, processing transfers from ticket has provider test step 1460 to second ticket has name test step 1480, which is described below in greater detail. Conversely, if property "destinationAddress" of ticket 1306 (FIG. 18A) and property "provider" of the teleaddress 1814 are not nil, ticket 1306 specifies a region which contains the trip destination and processing transfers from ticket has provider test step 1460 to step 1462.

In step 1462, engine 132A (FIG. 15A) consults a finder, as described below in greater detail, to produce a way object which defines a transfer to an engine of a region denoted by property "provider" of property "destinationAddress" of ticket 1306. Processing transfers from step 1462 (FIG. 14C) to a first found test step 1464 in which engine 132A (FIG. 15A) determines whether a way object is successfully produced in step 1462. If a way object is produced in step 1462, processing transfers from first found test step 1464 to a second way out is here test step 1472, which is described in greater detail below. Conversely, if no way object is produced in step 1462, processing transfers from first found test step to step 1466.

In step 1466, engine 132A (FIG. 15A) consults a finder, as described below in greater detail, to produce a way object which defines a transfer to a region denoted by an item of property "routingAdvice" of the teleaddress that is property "destinationAddress" of ticket 1306. The properties of a teleaddress, and properties "provider" and "routingAdvice" in particular, are described in greater detail in Appendix A, and that discussion is incorporated herein by reference. Briefly, the items of property "routingAdvice" of a teleaddress denote providers of zero or more regions which are believed by the creator of the teleaddress to be capable of transferring agent 150A to the trip destination defined by ticket 1306 (FIG. 18A). Processing transfers from step 1466 (FIG. 14C) to a second found test step 1468 in which engine 132A (FIG. 15A) determines whether a way object is successfully produced in step 1466. If no way object is produced in step 1466, processing transfers from second found test step 1468 to terminal step 1470 in which an exception of class "Destination Unavailable" is thrown. Conversely, if a way object is produced in step 1466, processing transfers from second found test step 1468 to second way out is here test step 1472.

In second way out is here test step 1472, engine 132A (FIG. 15A) determines whether the way object produced in either step 1462 or step 1466 (FIG. 14C) defines a transfer to engine 132A (FIG. 15A). If the produced way object does not define a transfer to engine 132A, processing transfers from second way out is here test step 1472 to terminal step 1474 in which the processing of logic flow diagram 1414, i.e., route agent step 1414 (FIG. 14B), completes successfully.

Conversely, if the produced way object defines a transfer to engine 132A (FIG. 15A), processing transfers from second way out is here test step 1472 to step 1476 in which engine 132A (FIG. 15A) derives a telename, which identifies the destination of the trip defined by ticket 1306, from property "location" of the teleaddress that is property "destinationAddress" of ticket 1306.

Engine 132A can derive the telename in any way which is convenient and efficient. For example, engine 132A can use a table such as dictionary 2000 (FIG. 20A) whose keys are octet strings, e.g., octet string 2000K1, and whose values are telenames, e.g., telename 2000V1. For example, if property "location" of teleaddress 1814 (FIG. 18A) equals octet string 2000K1 (FIG. 20A), telename 2000V1 is produced by engine 132A as the telename that specifies a place that is the destination of the trip defined by ticket 1306 (FIG. 18A).

Addresses are assigned to locations within a region according to an addressing scheme designed and implemented by the designer and implementer of the engines of the region. The disclosed instruction set does not prescribe a particular addressing scheme. Each region is free to implement the most efficient and convenient addressing scheme for that particular region. Thus, as each sovereign state in the physical world designs and implements its own addressing scheme in providing a postal service, each region is free to implement a unique addressing scheme for that region. Of course, the addressing schemes used within two or more regions need not be unique.

In implementing an addressing scheme, engines of a region assign teleaddresses to locations which include one or more places. In assigning a teleaddress, an engine produces and stores a telename which specifies one or more of the places within the location specified by the teleaddress. In other words, an engine, which assigns teleaddresses, maintains information which links teleaddresses to telenames of places to which respective teleaddresses are assigned. In this way, an engine, e.g., engine 132A (FIG. 15A), can produce a telename of a place having a specified teleaddress. The particular mechanism by which such a telename is stored and produced is left up to the person or organization which designs and implements the engines of a given region.

Processing transfers from step 1476 to step 1478 in which engine 132A (FIG. 15A) sets a flag indicating that agent 150A is to be transferred to an engine within the region which contains engine 132A. Processing transfers from step 1478 (FIG. 14C) to second ticket has name test step 1480 (FIG. 14D). Processing also transfers to second ticket has name test step 1480 from step 1458 (FIG. 14C) and from ticket has provider test step 1460, both of which are described above in greater detail.

In second ticket has name test step 1480 (FIG. 14D), engine 132A (FIG. 15A) determines whether property "destinationName" of ticket 1306 (FIG. 18A), is a nil or telename 1818. If property "destinationName" of ticket 1306 is telename 1818, processing transfers from second ticket has name test step 1480 (FIG. 14D) to step 1482 in which engine 132A (FIG. 15A) produces a copy of telename 1818 (FIG. 18A) and the copy supersedes the telename derived in step 1476 (FIG. 14C) as the telename of the transfer destination. Processing transfers from step 1482 (FIG. 14D) to step 1483. Additionally, if property "destinationName" of ticket 1306 is a nil, processing transfers from second ticket has name test step 1480 directly to step 1483.

In step 1483, engine 132A (FIG. 15A) consults a finder, as described below in greater detail, to produce a way object which defines a transfer to a place denoted by the telename produced in either step 1476 (FIG. 14C) or step 1482 (FIG. 14D) as described above. Processing transfers from step 1483 to test step 1484 in which engine 132A (FIG. 15A) determines whether step 1458 (FIG. 14C) sets the flag which indicates that the destination of the transfer is engine 132A (FIG. 15A). If the flag is not set, processing transfers from test step 1484 to test step 1490 which is described below. Conversely, if the flag is set, the transfer of agent 150A (FIG. 15A) should be to a place within engine 132A and processing transfers from test step 1484 (FIG. 14D) to a third way out is here test step 1486.

In third way out is here test step 1486, engine 132A (FIG. 15A) determines whether the way object produced in step 1483 (FIG. 14D) defines a transfer to engine 132A (FIG. 15A). If the produced way object does not define a transfer to engine 132A, processing transfers from third way out is here test step 1486 (FIG. 14D) to terminal step 1488 in which an exception of class "Destination Unavailable" is thrown and processing according to logic flow diagram 1414 (FIGS. 14C and 14D), i.e., route agent step 1414 (FIG. 14B), completes. Conversely, if the produced way object defines a transfer to a place within engine 132A (FIG. 15A), processing transfers from test step 1486 (FIG. 14D) to test step 1490.

In test step 1490, engine 132A (FIG. 15A) determines whether step 1478 (FIG. 14C) sets the flag which indicates that the destination of the transfer is the region which includes engine 132A (FIG. 15A). If this flag is not set, processing transfers from test step 1490 to terminal step 1496 in which processing according to logic flow diagram 1414 (FIGS. 14C and 14D), i.e., route agent step 1414 (FIG. 14B), completes successfully. Conversely, if the flag is set, the transfer of agent 150A (FIG. 15A) should be to a place within the region which includes engine 132A and processing transfers from test step 1490 (FIG. 14D) to way out is this region test step 1492. In way out is this region test step 1492, engine 132A (FIG. 15A) determines whether the way object produced in step 1483 (FIG. 14D) defines a transfer to a place within the region which includes engine 132A (FIG. 15A). If the produced way object does not define a transfer to a place within the region which includes engine 132A, processing transfers from way out is this region test step 1492 (FIG. 14D) to terminal step 1494 in which an exception of class "Destination Unavailable" is thrown and processing according to logic flow diagram 1414 (FIGS. 14C and 14D), i.e., route agent step 1414 (FIG. 14B), completes.

As discussed above with respect to steps 1452, 1462, 1466 and 1483 (FIG. 14C), engine 132A (FIG. 132A) uses a finder to route agent 150A in a transfer toward a destination of the trip defined by ticket 1306 (FIG. 13A). A finder is used to determine the transfer destination for an agent. For example, ticket 1306 (FIG. 13A) defines place 220B (FIG. 15A) within engine 132B as a destination of the trip. However, to reach engine 132B, agent 150A must first be transferred to engine 132Z, which is therefore the transfer destination. Finder 2050 (FIG. 20B) is used to produce a telename of an engine that is a transfer destination toward a place, which is identified by a second telename. In one embodiment, the produced telename identifies an engine by identifying the engine place processed by the engine. The second telename can identify a specific place or an authority, thereby specifying all places of the identified authority. Telenames are described in greater detail in Appendix A.

In the context of step 1452 (FIG. 14C), the second telename is telename 1818 (FIG. 18A), which is property "destinationName" of ticket 1306. If finder 2050 (FIG. 20B) contains no information regarding telename 1818, the second telename, in the context of step 1452 (FIG. 14C), is a telename which identifies the authority produced and copied in step 1442 as described above. In the context of step 1462, the second telename identifies the authority specified in property "provider" of teleaddress 1814 (FIG. 18A) of ticket 1306. In the context of step 1466 (FIG. 14C), the second telename identifies the authority specified in an item of the list that is property "routingAdvice" of telename 1814 (FIG. 18A) of ticket 1306. In the context of step 1483 (FIG. 14D), the second telename is either telename 1818 (FIG. 18A) of ticket 1306, if property "destinationName" of ticket 1306 is not nil, or the telename produced in step 1476 (FIG. 14C), otherwise. Finder 2050 (FIG. 20B) is described below in the context of step 1483 (FIG. 14D) in which the second telename is telename 1818 (FIG. 18A) of ticket 1306.

In each of steps 1452 (FIG. 14C), 1462, 1466, and 1483 (FIG. 14D), the telename produced by use of finder 2050 (FIG. 20B) is used to form a way object which defines a transfer to the engine identified by the produced telename.

Figure 20B:
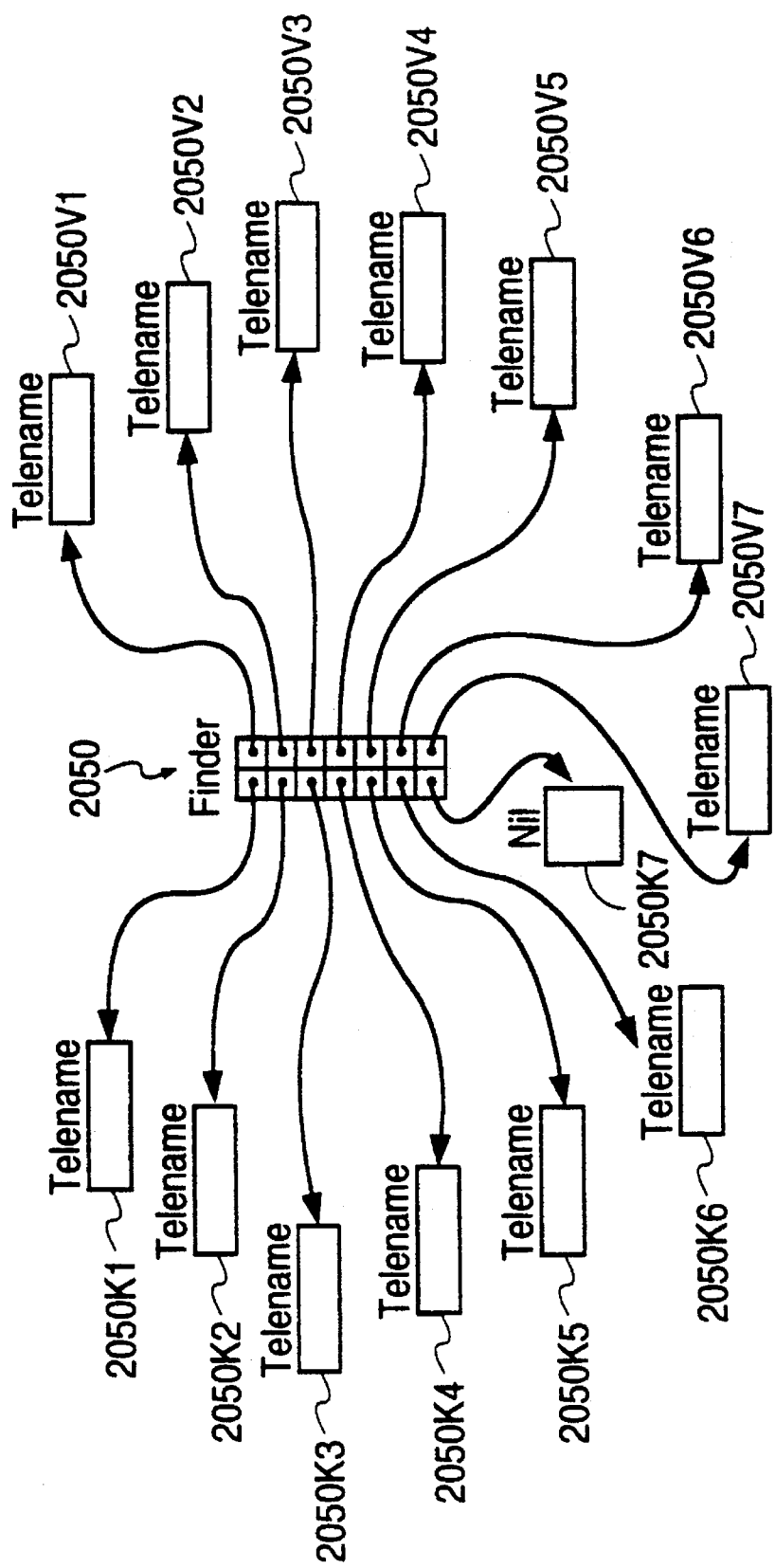
FIG. 20B shows the structure of a finder constructed according to one embodiment of the present invention.

Engine 132A determines to which engine to transfer agent 150A, i.e., the "transfer destination", by use of a finder 2050 (FIG. 20B). Finder 2050 can be any data structure which allows engine 132A to determine, from a trip destination, a transfer destination that moves agent 150A toward the trip destination. In one embodiment, finder 2050 is a dictionary whose keys are telenames and whose values are also telenames. The keys, e.g., telenames 2050K1–2050K6, specify authorities. The values, e.g., telenames 2050V1–2050V6, identify engines through which places identified by each respective corresponding authority can be reached. If telename 2050K1 (FIG. 20B) of finder 2050 has the same authority as that of telename 1818, telename 2050V1 identifies engine 132Z as the transfer destination.

In one embodiment of the present invention, the keys of finder 2050 include a nil 2050K7, which is associated with a telename 2050V7. Telename 2050V7 identifies an engine which contains information regarding a substantial portion of network 1500 (FIG. 15A) and networks to which network 1500 can be connected, either directly or indirectly. The engine which is identified by telename 2050V7 is therefore more likely to have success in routing agent 150A toward a trip destination which satisfies ticket 1306 (FIG. 18A). If no telename which is a key of finder 2050 (FIG. 20B) is of the same authority as telename 1818, telename 2050V7 (FIG. 20B), which is associated with nil 2050K7, identifies the transfer destination. The following example is illustrative.

Suppose, for example, that engine 132A is executing within a small personal computer system and therefore interprets places of only one authority. Suppose further that engine 132Z (FIG. 15A) is executing within a large, multi-user, mainframe computer system which interprets places of many separate authorities and to which many agents of many different authorities travel. The finder of engine 132A would, in such a case, be very small and provide little information regarding the transportation of agents to places of particular authorities. However, the finder of engine 132Z is likely to be much more extensive and comprehensive, and therefore much more likely to provide information regarding the routing of a particular agent to places of particular authorities. In such a case, the finder of engine 132A associates with a nil a telename which identifies engine 132Z as the transfer destination when the finder of engine 132A contains no information regarding the authority of the trip destination place.

If no transfer destination is successfully determined from consulting finder 2050 (FIG. 20B), an engine can implement any of the following or other policies according to the implementation chosen by the provider of the engine. If ticket 1306 (FIG. 18A) contains citation 1816, engine 132A (FIG. 15A) can (i) produce a telename to the current place of agent 150A and attempt to find a place of the cited class in the steps described below, (ii) throw an exception and produce no telename, thereby rejecting ticket 1306 (FIG. 18A) as vague, or (iii) produce a telename of a place which is designated as a destination of vaguely specified trips. Similarly, if ticket 1306 includes no citation, engine 132A (FIG. 15A) can (i) throw an exception and produce no telename, thereby rejecting ticket 1306 (FIG. 18A) as vague, or (ii) produce a telename of a place which is designated as a destination of vaguely specified trips.

In the example of FIGS. 15A–15E, engine 132A (FIG. 15A) consults finder 2050 (FIG. 20A) and determines that, to reach place 220B (FIG. 15A) of engine 132B, agent 150A is to be transferred to engine 132Z. Therefore, the engine place of engine 132Z is the transfer destination of agent 150A and a way object, which defines a transfer of agent 150A to engine 132Z, is produced.

Thus, processing according to logic flow diagram 1414 (FIGS. 14C and 14D) produces a way object which defines a transfer of agent 150A (FIG. 15A) to move agent 150A toward the destination of the trip defined by ticket 1306.

As discussed above in the context of logic flow diagram 1410 (FIG. 14B), agent 150A (FIG. 15A) is delivered to a place in deliver agent step 1422 (FIG. 14B). It is reiterated that, in the illustrative example of FIGS. 15A–15E, agent 150A is not delivered to any place within engine 132A. However, for completeness, the delivery of agent 150A to a place within engine 132A is discussed. Agent 150A (FIG. 15A) is delivered to a place within engine 132A when that place is defined by ticket 1306 (FIG. 13A) as the trip destination. Delivering an agent to a place involves (i) selecting a particular place to deliver the agent, (ii) making the agent an occupant of that place, and (iii) causing operation "go" to succeed for that agent. Deliver agent step 1422 is represented by logic flow diagram 1422 (FIG. 14E).

Processing according to logic flow diagram 1422 (FIG. 14E) begins with for all current places step 1422A. For all current places step 1422A and next step 1422C define a processing loop in which each of the places currently processed by the current engine, i.e., engine 132A (FIG. 15A), is processed according to steps 1422B, 1422D, and 1422E (FIG. 14E). In the context of the following discussion of logic flow diagram 1422, the "subject place" is the place which is processed in a particular iteration of the loop defined by for all current places step 1422A and next step 1422C. For each iteration of the loop, i.e., for each current place of engine 132A (FIG. 15A), processing transfers from for all current places step 1422A to a place satisfies ticket test step 1422B.

In place satisfies ticket test step 1422B, the current engine determines whether the subject place satisfies ticket 1306.

If the subject place does not satisfy ticket 1306, either (i) processing transfers from place satisfies ticket test step 1422B (FIG. 14E) through next step 1422C to for all current places step 1422A in which another iteration of the loop is begun, or (ii) processing transfers to terminal step 1422I, which is described below. Conversely, if the subject place satisfies ticket 1306, processing transfers from place satisfies ticket test step 1422B to entering step 1422D.

As described below in greater detail, a place grants ingress to a process, e.g. an agent, by successfully performing operation "entering" and denies ingress to a process by throwing an exception during performance of operation "entering". Performance of operation "entering" is discussed in greater detail below.

Processing transfers from entering step 1422D (FIG. 14E) to exception test step 1422E in which the current engine determines whether performance of operation "entering" by the subject place threw and exception. If performance of operation "entering" by the subject place threw an exception, thereby denying agent 150A ingress to the subject place, processing transfers from entering step 1422E through next step 1422C to for all current places step 1422A in which another iteration of the loop defined by for all current place step 1422A and next step 1422C is begun or processing transfers to terminal step 1422J, which is described below.

If, on the other hand, operation "entering" is performed successfully by the subject place, the subject place thereby granting to agent 150A (FIG. 15A) ingress to the subject place, processing transfers from exception test step 1422E (FIG. 14E) to step 1422F. In step 1422F, agent 150A (FIG. 15A) is made an occupant of the subject place. Furthermore, a property of agent 150A is set to indicate that agent 150A is an occupant of the subject place.

Processing transfers from step 1422F to step 1422G in which operation "go" as performed by agent 150A succeeds. As discussed above, agent 150A is not delivered to a place in engine 132A in the example of FIGS. 15A–15E. Therefore, operation "go" for agent 150A does not succeed until agent 150A (FIG. 15A) is delivered to place 220B in engine 132B (FIG. 15E) as discussed below. Processing transfers from step 1422G (FIG. 14E) to terminal step 1422H in which processing according to logic flow diagram 1422, and therefore deliver agent step 1422 (FIG. 14B), completes successfully.

If all places which are current in engine 132A (FIG. 15) are processed according to the loop defined by for all current places step 1422A (FIG. 14E) and next step 1422C and terminal step 1422H is not reached, i.e., if no place that is current in engine 132A (FIG. 15A) satisfies ticket 1306 and grants agent 150A occupancy via successful performance of operation "entering", processing transfers from for all current place step 1422A (FIG. 14E) to terminal step 1422I. In terminal step 1422I, an exception of class "Destination Unavailable" is thrown and logic flow diagram 1422, and therefore deliver agent step 1422 (FIG. 14B), completes. Thus, deliver agent step 1422 delivers agent 150A (FIG. 15A) to a place identified by ticket 1306 (FIG. 13A) as the destination of a trip or throws an exception of class "Destination Unavailable".

As discussed above, in the example of FIGS. 15A–15E, engine 132Z is the transfer destination. Agent 150A is therefore encoded to form encoded agent 150A-E (FIG. 15B) in step 1432 (FIG. 14B) which is then transferred to engine 132Z (FIG. 15C) in transfer out step 1434 (FIG. 14B).

Operation "Go" from the Perspective of an Intermediate Engine

As described above, transfer of encoded agent 150A-E (FIG. 15B) from communication infrastructure 132A-CI, across communications link 102AZ, to communication infrastructure 132Z-CI (FIG. 15C) is initiated in transfer out step 1434 (FIG. 14B). Appended to encoded agent 150A-E (FIG. 21) is destination 150A-E-D, which includes properties "name", "address" and "data" which are telename 2102, teleaddress 2104 and octet string 2106, respectively. Telename 2102 and teleaddress 2104 define the transfer destination of encoded agent 150A-E. The transfer destination as defined by destination 150A-E-D (FIG. 21) can be either engine 132Z (FIG. 15B) or engine 132B. In one embodiment of the present invention, destination 150A-E-D (FIG. 21), which is formed in form destination step 1430 (FIG. 14B), defines engine 132Z (FIG. 15B) as the transfer destination of encoded agent 150A-E. In that case, communications infrastructure 132A-CI transfers encoded agent 150A-E directly to communications infrastructure 132Z-CI of engine 132Z. In another embodiment of the present invention, destination 150A-E-D (FIG. 21) defines engine 132B (FIG. 15B) as the transfer destination of encoded agent 150A-E. In the latter case, communications infrastructure 132A-CI contains information and logic which causes communications infrastructure 132A-CI to transfer encoded agent 150A-E, which is destined for engine 132B according to destination 150A-E-D (FIG. 21), to communications infrastructure 132Z-CI (FIG. 15B) or engine 132Z.

Figure 14F:
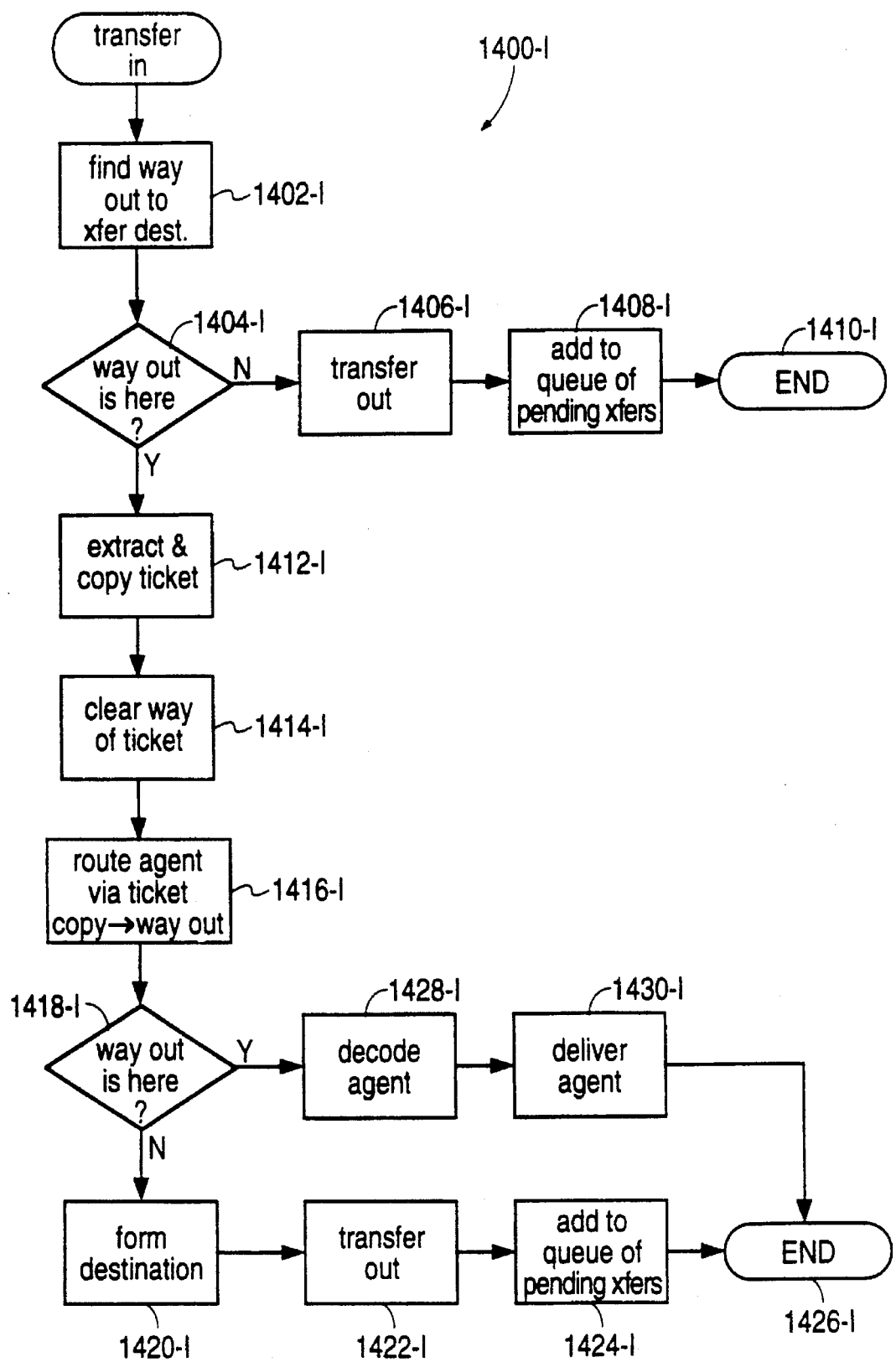

In either embodiment described above, when engine 132Z (FIG. 15C) receives encoded agent 150A-E, engine 132Z performs a system operation determined in route agent step 1414 "transferIn" which is shown as logic flow diagram 1400-I (FIG. 14F). Engine 132Z (FIG. 15C) begins performance of system operation "transferIn" by producing a way object which defines a transfer to destination 150A-E-D (FIG. 21) in step 1402-I (FIG. 14F). Engine 132Z produces a way object in step 1402-I (FIG. 14F) by consulting a finder within engine 132Z (FIG. 15C) as described above with respect to finder 2050 (FIG. 20B).

Figure 15C:
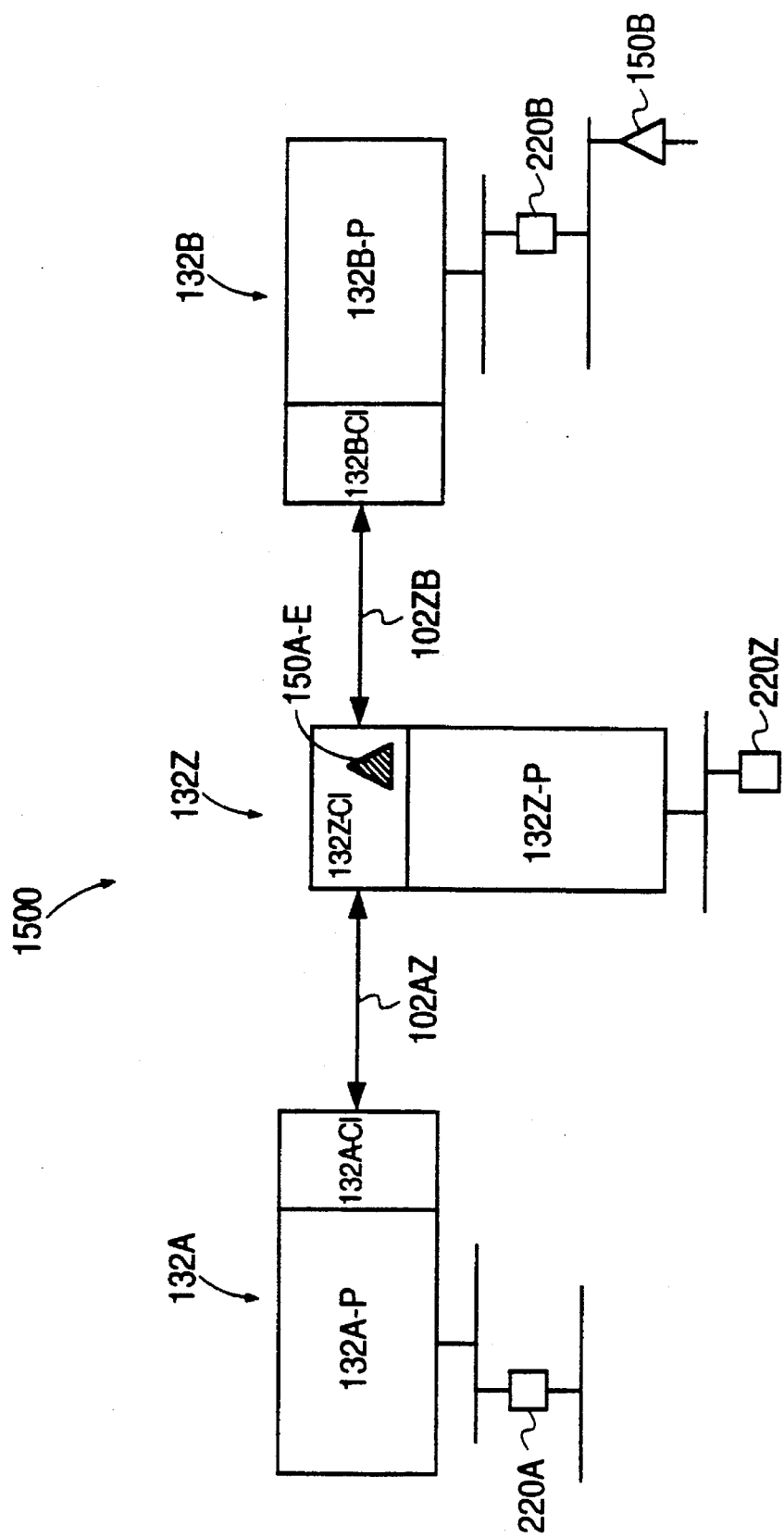

Processing transfers from step 1402-I (FIG. 14F) to a fourth way out is here test step 1404-I in which engine 132Z (FIG. 15C) determines whether the way object produced in step 1402-I (FIG. 14F) defines a transfer to engine 132Z (FIG. 15C). If the produced way object does not specify engine 132Z (FIG. 15C) as the transfer destination, i.e., if destination 150A-E-D (FIG. 21) defines engine 132B (FIG. 15B) as the transfer destination, processing transfers from fourth way out is here test step 1404-I (FIG. 14Fs) to a second transfer out step 1406-I. In second transfer out step 1406-I, engine 132Z (FIG. 15C) initiates transfer of encoded agent 150A-E according to destination 150A-E-D (FIG. 21) in a manner directly analogous to that described above with respect to transfer out step 1434 (FIG. 14B).

Processing transfers from second transfer out step 1406-I to step 1408-I. In step 1408-I, engine 132Z (FIG. 15C) adds encoded agent 150A-E to a list of pending transfers as described above with respect to step 1438 (FIG. 14B). Processing transfers from step 1408-I (FIG. 14F) to terminal step 1410-I in which system operation "transferIn" completes successfully.

Thus, if the way object produced in step 1402-I defines a transfer to engine 132B (FIG. 15C), encoded agent 150A-E is transferred according to the produced way object. If, on the other hand, the produced way object defines a transfer to engine 132Z, processing transfers from fourth way out is here test step 1404-I (FIG. 14F) to step 1412-I. In step 1412-I, engine 132Z (FIG. 15C) extracts from encoded agent 150A-E ticket 1306 (FIGS. 13A and 18A) and forms a copy of ticket 1306. Processing transfers from step 1412-I to step 1414-I in which property "way" of the ticket copy is cleared, i.e., set to a nil. Processing transfers from step 1414-I to a second route agent step 1416-I in which engine 132Z produces a way object defining a transfer of encoded agent 150A-E. The process performed in step 1416-1 is identical to the process represented by logic flow diagram 1414 (FIGS. 14C and 14D). In the context of second route agent step 1416-I, ticket 1306 used in the above discussion of logic flow diagram 1414 is replaced by the ticket copy made in step 1412-I, and the logic flow diagram is processed as described above using the ticket copy. Upon completion of step 1416-I, processing transfers to a fifth way out is here test step 1418-I.

In fifth way out is here test step 1418-I, engine 132Z (FIG. 15C) determines whether the way object produced in step 1416-I (FIG. 14F) defines a transfer to engine 132Z (FIG. 15C). If the produced way object defines a transfer to engine 132Z, processing transfers from fifth way out is here test step 1418-I (FIG. 14F) to a decode agent step 1428-I which is described below in greater detail. Conversely, if the produced way object does not define a transfer to engine 132Z (FIG. 15C), processing transfers from fifth way out is here test step 1418-I (FIG. 14F) to a second form destination step 1420-I. In the example of FIGS. 15A–15F, ticket 1306 (FIG. 13A), which is extracted from encoded agent 150A-E and copied, defines a trip to place 220B of engine 132B (FIG. 15C). Therefore, processing transfers to second form destination step 1420-I.

In form destination step 1420-I, engine 132Z (FIG. 15C) forms, i.e., supersedes, destination 150A-E-D (FIG. 21) in a manner that is directly analogous to that described above with respect to form destination step 1430 (FIG. 14B). Processing transfers from second form destination step 1420-I (FIG. 14F) to a third transfer out step 1422-I. In third transfer out step 1422-I, encoded agent 150A-E (FIG. 15C) is transferred according to destination 150A-E-D (FIG. 21) as described above with respect to second transfer out step 1406-I (FIG. 14F).

Processing transfers from third transfer out step 1422-I to step 1424-I. In step 1424-I, engine 132Z (FIG. 15C) adds encoded agent 150A-E to a list of pending transfers as described above with respect to step 1438 (FIG. 14B). Processing transfers from step 1424-I (FIG. 14F) to terminal step 1426-I in which system operation "transferIn" completes successfully. In the example of FIGS. 15A–15F, encoded agent 150A-E is transferred from engine 132Z to engine 132B (FIG. 15D) in a manner that is directly analogous to the transfer of encoded agent 150A-E from engine 132A to engine 132Z as described above.

Operation "Go" from the Perspective of the Destination Engine

Figure 15D:
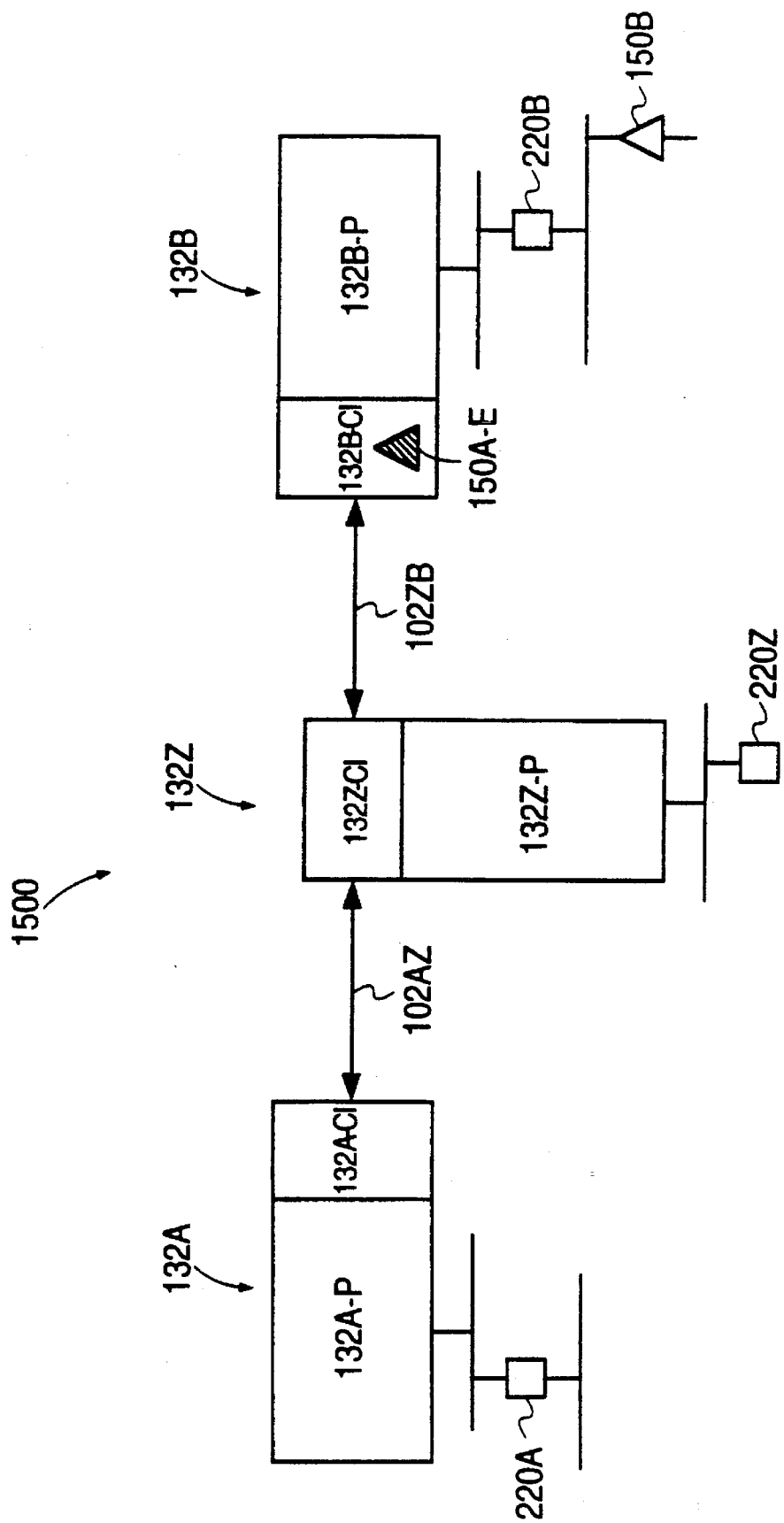

When engine 132B receives encoded agent 150A-E in communication infrastructure 132A-CI (FIG. 15D), engine 132B performs system operation "transferIn" in a manner similar to that described above with respect to engine 132Z. Engine 132B produces a way object defining a transfer according to destination 150A-E-D (FIG. 21) in step 1402-I (FIG. 14F) and determines whether the produced way object defines a transfer to engine 132B (FIG. 15D) in fourth way out is here test step 1404-I (FIG. 14F). Since engine 132B (FIG. 15D) processes place 220B which is the destination of the trip defined by ticket 1306 (FIG. 13A), the produced way object defines a transfer to engine 132B (FIG. 15D). Therefore, processing by engine 132B transfers from fourth way out is here test step 1404-I (FIG. 14F) to step 1412-I.

In steps 1412-I, 1414-I and 1416-I, engine 132B extracts and copies ticket 1306 (FIG. 13A) from encoded agent 150A-E, clears property "way" of the ticket copy, and routes encoded agent 150A-E according to logic flow diagram 1414 (FIGS. 14C and 14D) except now the ticket copy is used for ticket 1306 in the above description. In fifth way out is here test step 1418-I (FIG. 14F), engine 132B (FIG. 15D) determines whether the way object produced in second route agent step 1416-I (FIG. 14F) defines a transfer to engine 132B (FIG. 15D). Since engine 132B (FIG. 15D) processes place 220B, the produced way object defines a transfer to engine 132B (FIG. 15D). Therefore, processing by engine 132B transfers from fifth way out is here test step 1418-I (FIG. 14F) to decode agent step 1428-I.

Figure 15E:
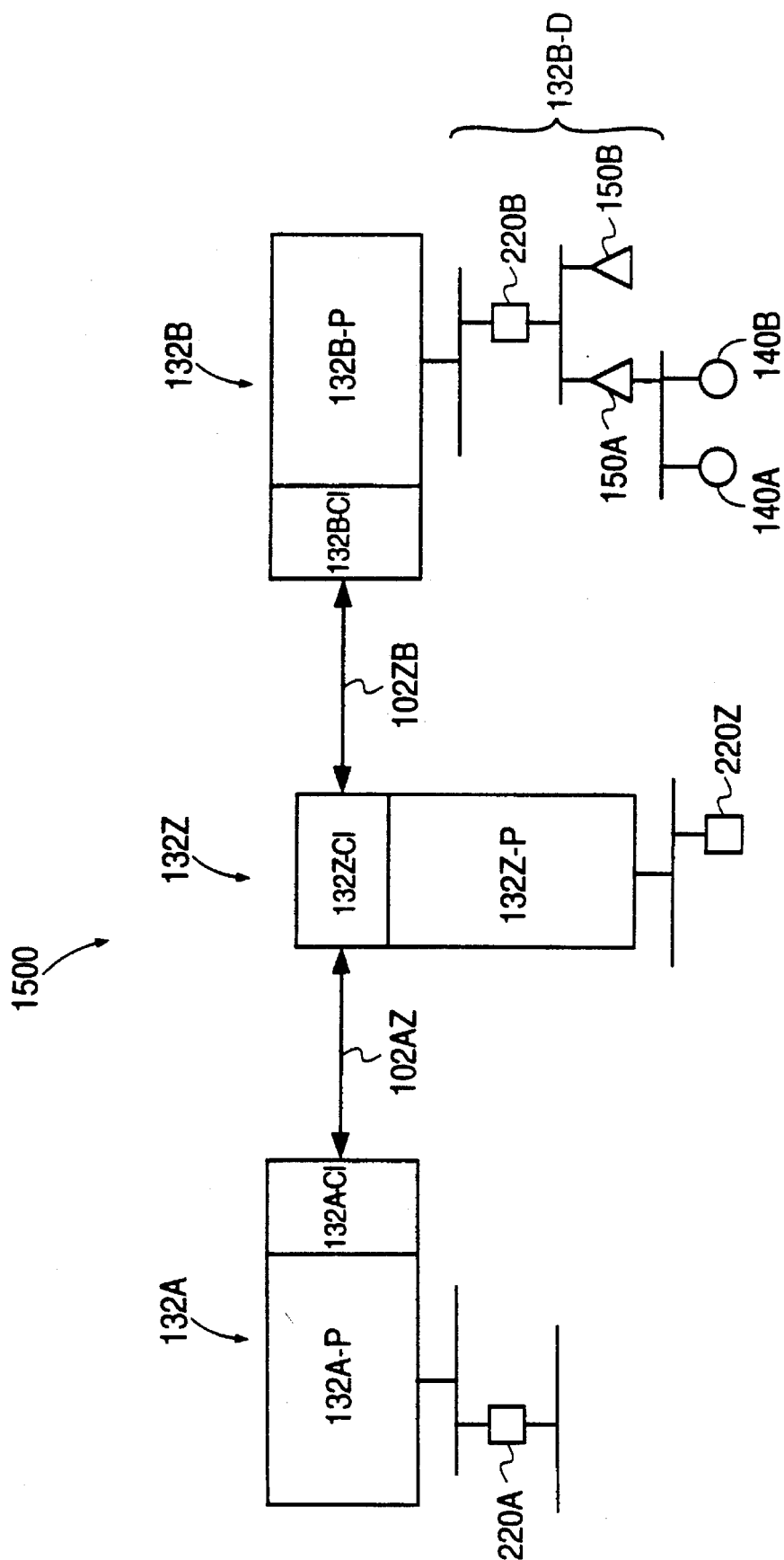

In decode agent step 1428-I, engine 132B decodes agent 150A from encoded agent 150A-E (FIG. 15D) in communication infrastructure 132B-CI by reverse application of the encoding rules described in Appendix B and stores agent 150A in data portion 132B-D (FIG. 15E). As network 1500 can be heterogeneous, the form of agent 150A within engine 132A (FIG. 15A) may be inconvenient for representing agent 150A within engine 132B (FIG. 15E). As long as the standardized form of encoded agent 150A-E is used to transfer agent 150A between engines 132A and 132B, engine 132B can represent agent 150A in whatever form is most convenient for engine 132B when not transferring agent 150A.

Processing by engine 132B transfers from decode agent step 1428-I (FIG. 14F) to deliver agent step 1430-I. In deliver agent step 1430-I, agent 150A is delivered according to logic flow diagram 1422 (FIG. 14E) as described above with respect to deliver agent step 1422 (FIG. 14B). In the context of deliver agent step 1430I, the ticket is now the actual ticket 1306 (FIG. 13A) and not the postulated ticket. In deliver agent step 1430-I (FIG. 14F), agent 150A (FIG. 15E) is granted occupancy in place 220B and operation "go" as performed by agent 150A completes successfully.

Processing transfers from deliver agent step 1430-I (FIG. 14F) to terminal step 1426-I in which processing according to logic flow diagram 1400-I (FIG. 14F), i.e., performance of system operation "transferIn", by engine 32B completes successfully.

Figure 14G:
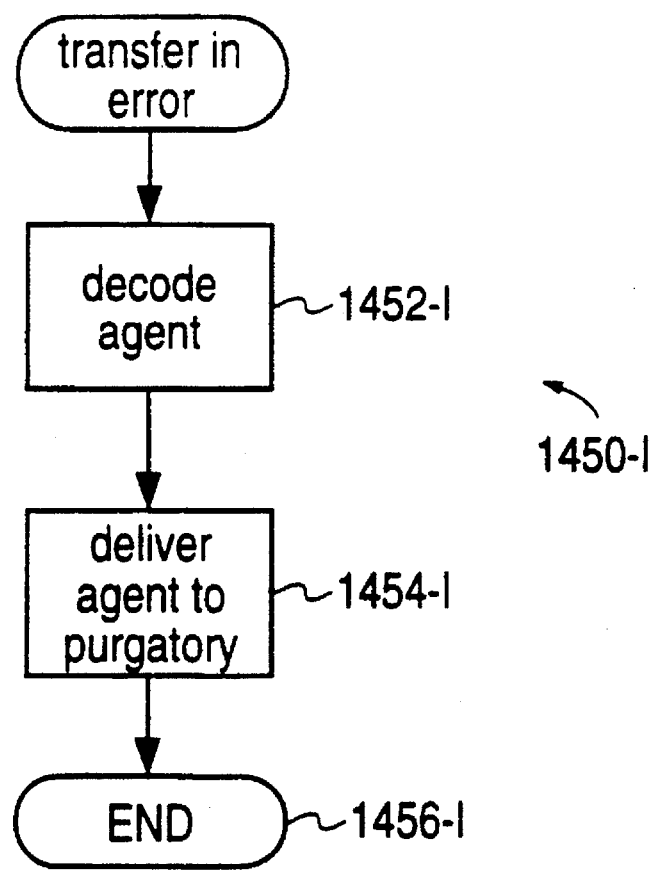

Any exception thrown in the course of performing the steps of logic flow diagram 1400-I (FIG. 14F) causes performance of the steps of logic flow diagram 1450-I (FIG. 14G). Agent 150A is decoded from encoded agent 50A-E (FIG. 15D) in step 1452-I (FIG. 14F). Since agent 150A arrived in engine 132B (FIG. 15D), agent 150A is not retained in a list of pending transfers as described above with respect to engine 132A. Therefore, it is necessary to decode agent 150A to continue execution of agent 150A. Processing transfers from step 1452-I (FIG. 14G) to deliver agent step 1454-I in which agent 150A is delivered to purgatory as described above with respect to step 1426 (FIG. 14B). Processing transfers from deliver agent step 1454-I (FIG. 14G) to terminal step 1456-I in which processing according to logic flow diagram 1450-I completes. Agent 150A, which occupies purgatory as a result of deliver agent step 1454-I, throws the exception which caused performance of logic flow diagram 1450-I, thereby causing operation "go" as performed by agent 150A to fail.

Thus, agent 150A (FIGS. 15A–15E), by performance of operation "go", directs movement, i.e., transportation, of agent 150A, and objects owned by agent 150A such as objects 140A and 140B, through network 1500. After performance of operation "go", interpretation of agent 150A continues with the instruction within agent 150A which immediately follows operation "go".

FIG. 13B shows a portion of the execution state and of the internal state of agent 150A immediately following performance of operation "go" by agent 150A. At the top of stack 1304 is ticket stub 1308 which is the result produced by performance of operation "go". Place 220B is the property of agent 150A identifying the place occupied by agent 150A, thereby indicating that agent 150A occupies place 220B.

Ingress and Egress: Operations "Entering" and "Exiting"

As discussed above, place 220B grants or denies ingress to agent 150A by performance of operation "entering". The embodiment disclosed above with respect to logic flow diagram 1400 (FIGS. 14A and 14B) transports encoded agent 150A-E (FIGS. 15A–15E) to engine 132B before requesting that place 220B perform operation "entering". In another embodiment of the present invention, place 220B is directed to perform operation "entering" before agent 150A is transported across communications link 102AZ, through communication infrastructure 132Z-CI, across communications link 102ZB to engine 132B. By performing operation "entering", place 220B either grants or denies agent 150A permission to occupy place 220B. However, it is anticipated that the present invention will be used in wide-area networks with high latency.

The term "latency" is used herein as it is used in the art to denote the amount of time between the time information is first sent by the sender of the information and the time information is first received by the receiver of the information. In networks with high latency, even short messages can require substantial amounts of time to reach a destination. In such a case, requesting that place 220B (FIG. 15A) perform operation "entering" and awaiting a result involves sending a request across communications link 102AZ, through communication infrastructure 132Z-CI, across communications link 102ZB and through engine 132B to place 220B to perform operation "entering" and awaiting receipt of the result produced by operation "entering" by the reverse path. Doing so before transporting agent 150A to engine 132B postpones the transportation of agent 150A to engine 132B by an amount of time approximately equal to twice the latency between engines 132A and 132B. Therefore, to substantially improve the performance of the present invention, performance of operation "entering" by place 220B is postponed until agent 150A is transported to engine 132B.

While operation "entering" is described in the context of agent 150A (FIG. 15E) entering place 220B as a consequence of operation "go", operation "entering" is also performed as a consequence of a process, either an agent or a place, entering place 220B as a consequence of the process's creation within place 220B. The creation of a process is discussed in greater detail in Appendix A.

Figure 22B:
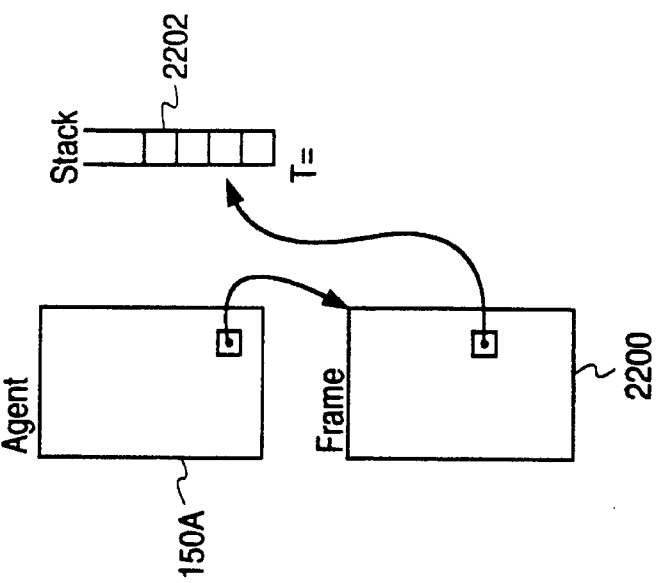
FIGS. 22A and 22B show the state of an agent process immediately prior to and following, respectively, performance of operation "entering".
Figure 22A:
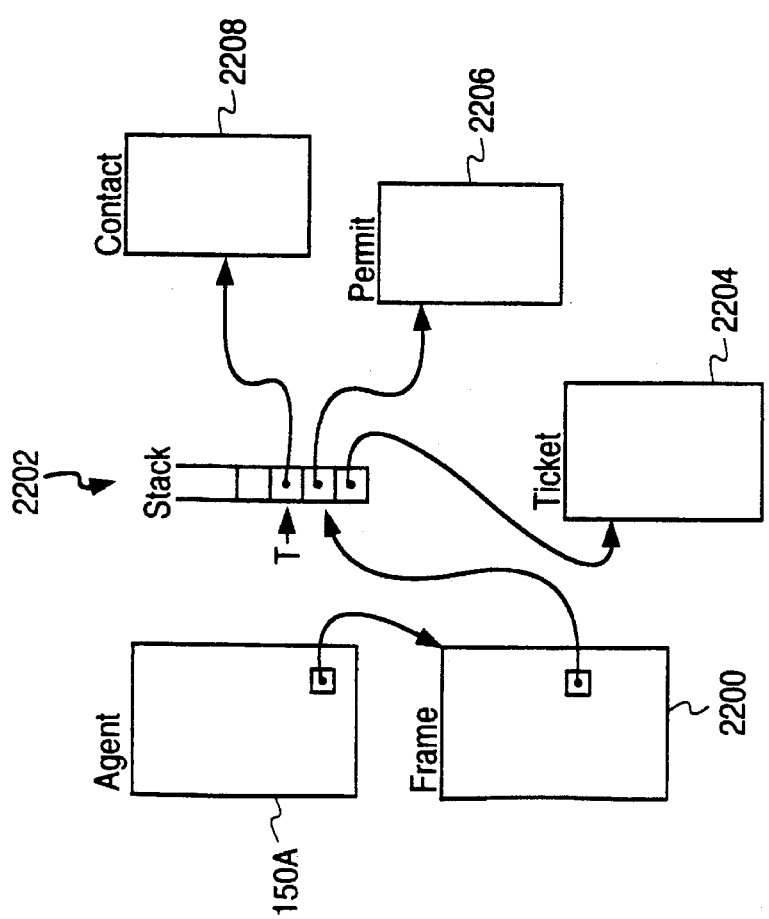

FIG. 22A gives the execution state of agent 150A immediately prior to performance of operation "entering". The execution state of a process, e.g., agent 150A, is described in greater detail below. Operation "entering" is performed at the request of engine 132B, and the performance of "entering" is recorded in the execution state of agent 150A (FIG. 15E). The permit of either agent 150A or place 220B, preferably place 220B, may be debited by performance of operation "entering".

Frame 2200 is part of the execution state of agent 150A and records the dynamic state of operation "entering" as performed by place 220B. Frame 2200 includes stack 2202 which is the current stack. Stack 2202 contains, from top to bottom, contact 2208, permit 2206 and ticket 2204.

Contact 2208 identifies agent 150A as the process attempting to enter place 220B. As discussed below in greater detail and in Appendix A, a contact has, among its properties, a property "subjectName" and a property "subject". Property "subject" of contact 2208, which is ordinarily a reference to agent 150A, is nil in operation "entering" so that place 220B is not given a reference to agent 150A before place 220B grants ingress to agent 150A. Property "subjectName" of contact 2208 is a telename which identifies agent 150A as the agent requesting ingress to place 220B.

Permit 2206 is the proposed local permit of the agent attempting to "enter" place 220B. Permit 2206 is passed "byProtectedRef" and therefore cannot be altered by performance of operation "entering". The passing of arguments and results, and in particular passing by protected reference, i.e., "byProtectedRef", is described below in greater detail. An agent's local permit defines the capabilities of the agent while at a given place. For example, agent 150A can limit itself to a subset of the capabilities and allowances of its native permit while at place 220B by supplying to place 220B permit 2206 which defines the subset of capabilities and allowances.

Ticket 2204 is passed "byProtectedRef" and is equal to ticket 1306 used to travel to responding place 220B and informs responding place 220B that agent 150A is attempting to enter from another place. If ticket 2204 is a nil, a process is attempting to enter responding place 220B by the process's creation within responding place 220B.

The method by which a place determines whether to admit a process, i.e., the method implementing operation "entering", as defined by class "Place" always throws an exception that is a member of class "Occupancy Denied", thereby denying the process ingress to the responding place. However, users of the present invention define subclasses of class "Place" which grant entrance to processes under specific circumstances. Such is a practical necessity for agents to travel from one place to another.

As the implementation of operation "entering", as performed by a place, is defined by the particular method provided by or inherited by the class of which the place is an instance, each place can implement operation "entering" differently from other places in the network. Logic flow diagram 2260 (FIG. 22C) serves as an illustrative example of an implementation of operation "entering" and therefore of the steps taken by place 220B in performance of operation "entering" in entering step 1448 (FIG. 14B).

Figure 22C:
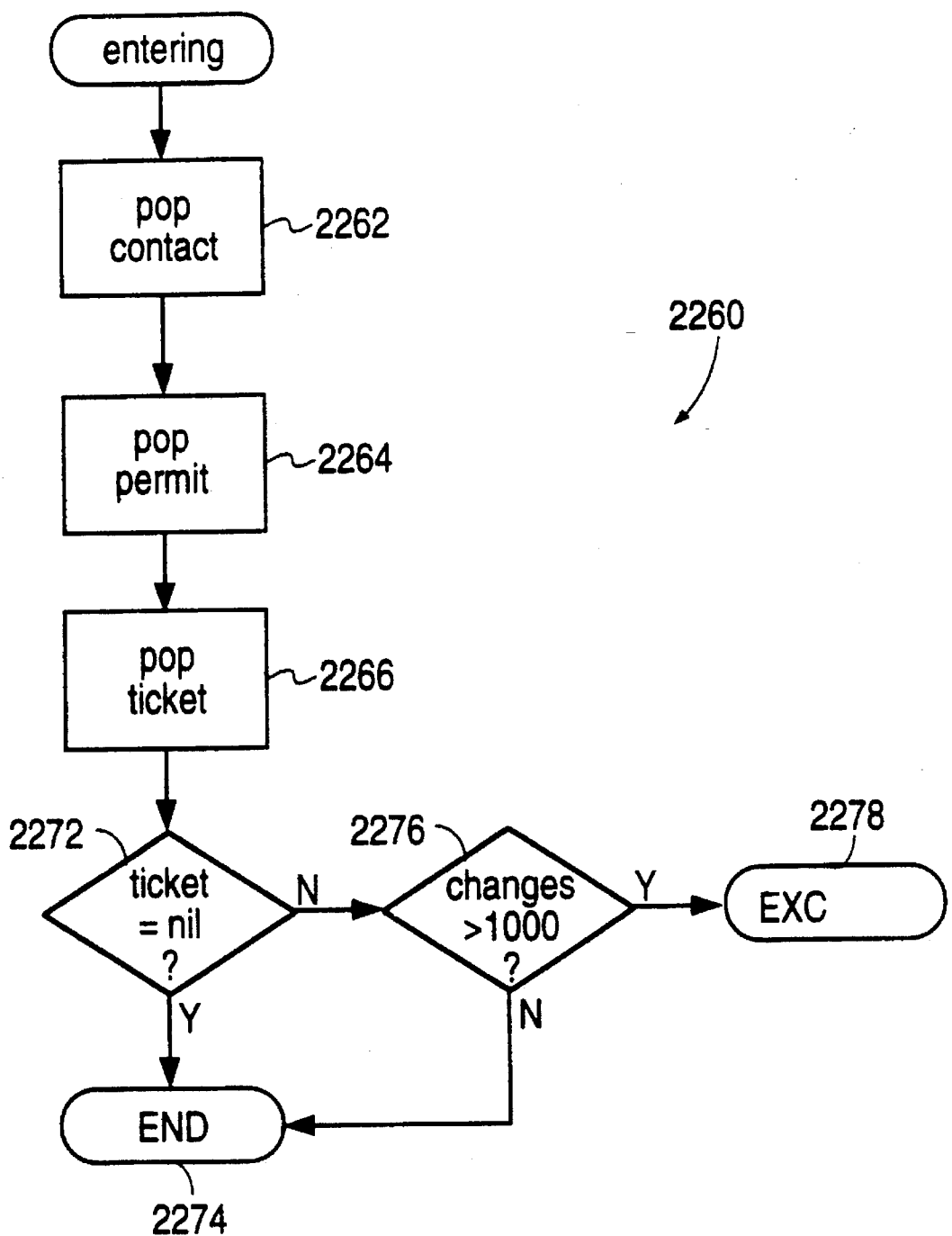
FIG. 22C is a logic flow diagram illustrating the steps taken in performance of operation "entering" in accordance with one embodiment of the present invention.

Contact 2208, permit 2206 and ticket 2204 are popped from stack 2202 in steps 2262, 2264 and 2266, respectively (FIG. 22C). Processing then transfers to ticket test step 2272 in which ticket 2204 is compared to a nil. If ticket 2204 is a nil, agent 150A is being created locally and processing transfers to terminal step 2274 where operation "entering" completes successfully. However, it is apparent in view of the foregoing and the following that a place can be defined such that operation "entering" fails under certain circumstances so as to prevent the creation of a process within the place.

If ticket 2204 is not nil, processing transfers from ticket test step 2272 to allowance test step 2276. In allowance test step 2276, property "charges" of permit 2206 is produced by querying attribute "charges" of permit 2206 and property "charges" of permit 2206 is compared to 1000. If property "charges" of permit 2206 is greater than 1000, processing transfers from allowance test step 2276 to terminal step 2278 where an exception of class "Occupancy Denied" is thrown, denying the agent ingress into the responding place. If property "charges" of permit 2206 is less than or equal to 1000, processing transfers from allowance test step 2276 to terminal step 2274 where operation "entering" terminates successfully, granting the agent ingress into the responding place. The exact number 1000 as a maximum permissible charges allowance in the example of FIG. 22C is chosen arbitrarily for purposes of illustration.

The method of logic flow diagram 2260 is illustrative of an appropriate implementation of operation "entering" for places processed by an engine operating within a personal computer system with limited resources. As discussed above and in Appendix A, property "charges" of a permit is an allowance of processing. Thus, according to logic flow diagram 2260, agents, which indicate by a large charges allowance in their proposed local permits a need for large amounts of computation and resources, are denied ingress. Thus, the owner of a small personal computer system can restrict her personal computer system to processes created locally and to relatively inexpensive visits by agents created elsewhere.

Immediately following performance of operation "entering" by place 220B (FIG. 22B), stack 2202 is empty as operation "entering" produces no result.

As discussed above, a place notes the departure, i.e., the termination of occupancy, of a process by performance of operation "exiting". In the context of logic flow diagram 1400 (FIGS. 14A and 14B), place 220A is performing operation "exiting" as a result of an agent, i.e., agent 150A, leaving place 220A as a consequence of operation "go". Operation "exiting" is also performed by place 220A when a process, either an agent or a place, no longer occupies place 220A as a consequence of the process's destruction. The destruction of a process is described in greater detail in Appendix A. The interface of operation "exiting" as defined by class "Place" is shown by FIGS. 23A and 23B.

As operation "exiting" is performed at the request of engine 132A (FIG. 15A), frame 2300 (FIG. 23A), which records the dynamic state of operation "exiting", is neither part of the execution state of place 220A (FIG. 15A) nor part of the execution state of agent 150A. In fact, at the time at which place 220A is performing operation "exiting", agent 150A no longer occupies place 220A. Engine 132A creates a new execution state as part of an "engine process". An engine process is a process created by an engine for the purpose of carrying out a performance of operation "exiting" or of operation "parting". Operation "parting" is discussed below and in Appendix A.

Figures 23A, 23B:
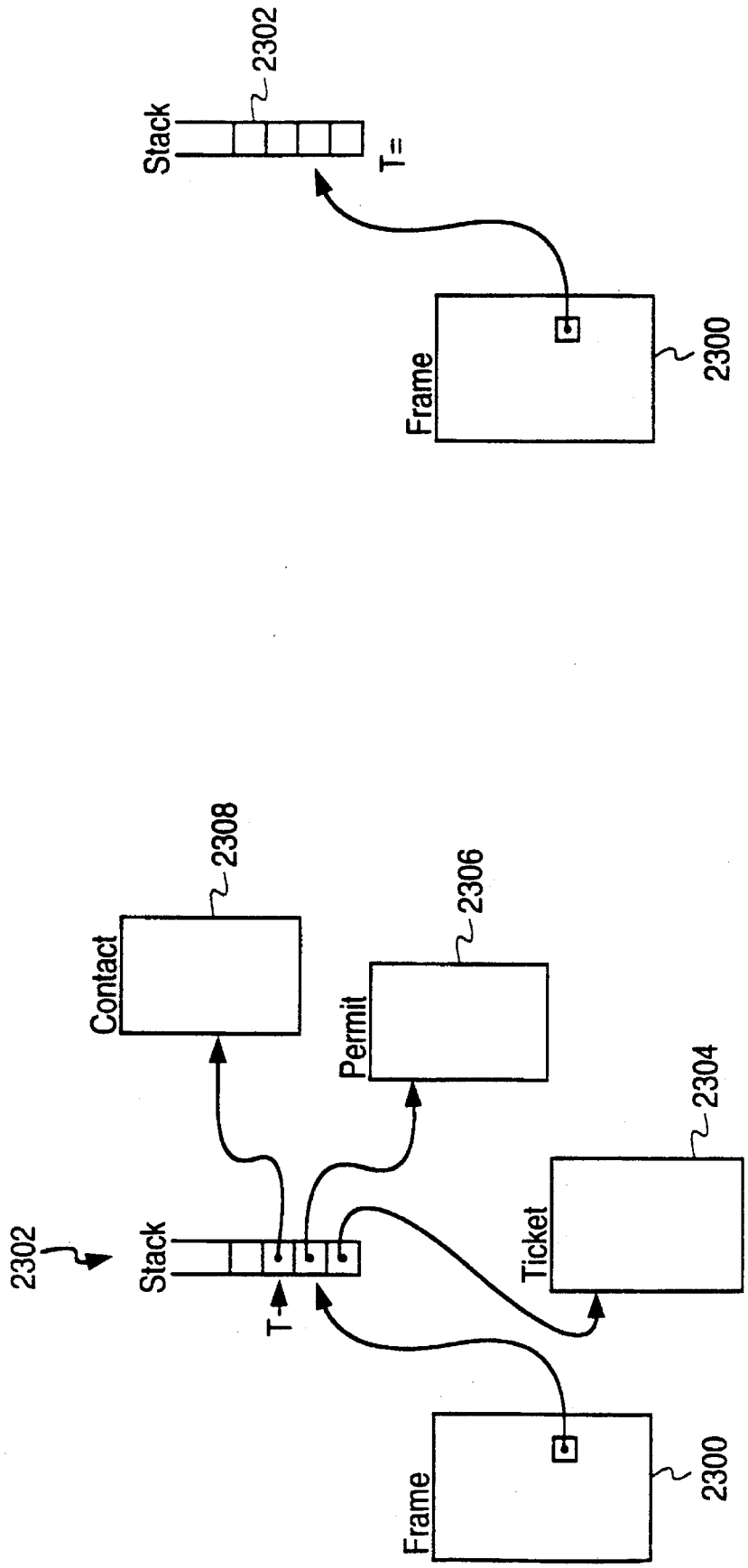
FIGS. 23A and 23B show a portion of the state of a process immediately preceding and following, respectively, performance of operation "exiting".

FIG. 23A illustrates frame 2300 immediately prior to performance of operation "exiting". Frame 2300 includes stack 2302, which is the current stack. Stack 2302 contains as the arguments of operation "exiting", from top to bottom, contact 2308, permit 2306 and ticket 2304.

Contact 2308 identifies agent 150A (FIG. 15A) as the process exiting place 220A. As discussed below in greater detail and in Appendix A, a contact has, among its properties, a property "subjectName" and a property "subject". Property "subjectName" of contact 2308 (FIG. 23A) identifies agent 150A (FIG. 15A); property "subject" of contact 2308 (FIG. 23A), which is ordinarily a reference to agent 150A (FIG. 15A), is voided in operation "exiting" so that place 220A is not left with a reference to exiting agent 150A.

Permit 2306 (FIG. 23A) is the current local permit of the process exiting responding place 220A (FIG. 15A), i.e. of agent 150A. A process's local permit defines the capabilities of the process while occupying a given place. Local permits are discussed in greater detail in Appendix A. Permit 2306 (FIG. 23A) is passed "byProtectedRef" and therefore cannot be altered by place 220A (FIG. 15A) in performing operation "exiting".

The local permit of the exiting process, i.e., permit 2306 (FIG. 23A), is used by the engine interpreting responding place 220A (FIG. 15A) to determine the type and amount of resources used by the exiting process during occupancy of place 220A so that the authority of the exiting process can be billed for use made of place 220A and resources contained therein. The type and amount of resources used are determined by comparison between permit 2306 (FIG. 23A) and the permit consumed as an argument in operation "entering" when granting ingress to the exiting process. Operation "entering" is discussed in greater detail above and in Appendix A.

For example, place 220A (FIG. 15A) in performing operation "entering", can store the proposed local permit, e.g., permit 2206 (FIG. 22A), for later comparison with permit 2306 (FIG. 23A), which is consumed in performance of operation "exiting". As described below and in Appendix A, a contact, e.g., contact 2308, has a property "subjectNotes". In one embodiment, place 220A stores, within property "subjectNotes" of contact 2208 (FIG. 22A), permit 2206 in performing operation "entering". In performing operation "exiting", place 220A (FIG. 15A) determines the amount of resources consumed by agent 150A while occupying place 220A by comparing permit 2206 (FIG. 22A), which is stored within property "subjectNotes" of contact 2208, with permit 2308 (FIG. 23A), which is consumed in performance of operation "exiting".

Ticket 2304 (FIG. 23A) is passed "byProtectedRef" and is equal to ticket 1306 (FIG. 13A) which is used by agent 150A (FIG. 15A) to specify the destination of the trip and informs responding place 220A that agent 150A is leaving responding place 220A as a consequence of performing operation "go". If ticket 2304 (FIG. 23A) is a nil, agent 150A (FIG. 15A) is exiting responding place 220A as a consequence of the destruction of agent 150A.

Frame 2300 (FIG. 23B) is shown immediately following performance of operation "exiting" by place 220A (FIG. 15A). Stack 2302 (FIG. 23A) is empty as operation "exiting" produces no result. As frame 2300 (FIG. 23B) is not part of the execution state of either place 220A (FIG. 15A) or agent 150A, but is instead part of the execution state of an engine process, any exception thrown by performance of operation "exiting" is not experienced by, and therefore has no effect upon, either place 220A or agent 150A. In performing operation "exiting", place 220A notes the departure of agent 150A and objects 140A and 140B, which are owned by agent 150A.

Object Interchange

The time required to transport an agent from one place to another is substantially reduced by limiting transportation of objects contained by the agent to only those objects that are not likely to have an equivalent object at the destination place. Limiting transportation of such objects is particularly important as agent 150A, in traveling from engine 132A to engine 132Z, includes class objects representing the classes of which agent 150A and objects owned by agent 150A are members. As class objects are typically quite large and as the classes of which an agent and the objects owned by the agent are members are typically quite numerous, transporting all such class objects is impractical. Thus, it is preferred that, in transporting agent 150A from engine 132A to engine 132B (FIG. 15A), only class objects representing classes, which are not represented by class objects in engine 132B, are transported with agent 150A to engine 132B.

Objects, that are likely to have equivalent objects at most places within network 1500 (FIGS. 15A–15E), are members of mix-in class "Interchanged" and therefore include a property "digest". Members of mix-in class "Interchanged" are called "interchanged objects". The object which is property "digest" of an interchanged object is alternatively called "the digest" of the interchanged object.

An interchanged object is one that an engine, e.g. engine 132A or 132B (FIG. 15A), deems equivalent to any other instance of the interchanged object's class whose digest is equal to the digest of the interchanged object. A digest is any object suited to the purpose of distinguishing a first interchanged object from all others. For example, a mathematical hash of a canonical binary representation of the interchanged object is suitable for many classes of interchanged objects. Class objects, i.e., objects of class "Class", define built-in classes as well as user-defined classes, as described more completely below and in Appendix A, and do not vary from engine to engine within computer network 1500. Class objects are therefore interchanged objects.

Figure 24A:
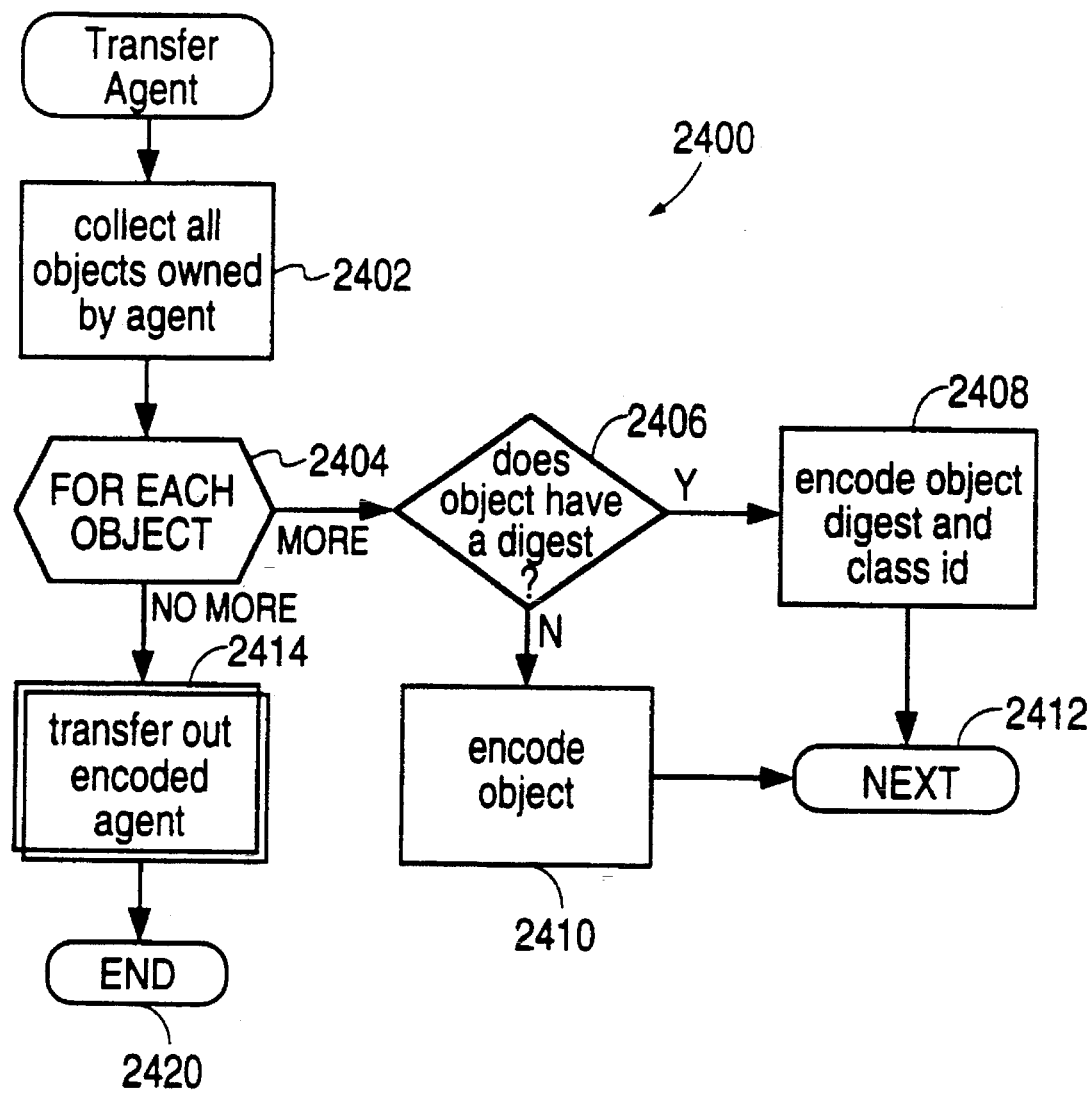
FIGS. 24A–24C are logic flow diagrams illustrating the steps taken in transporting an agent process through a network in accordance with an aspect of the present invention.
Figure 24B:
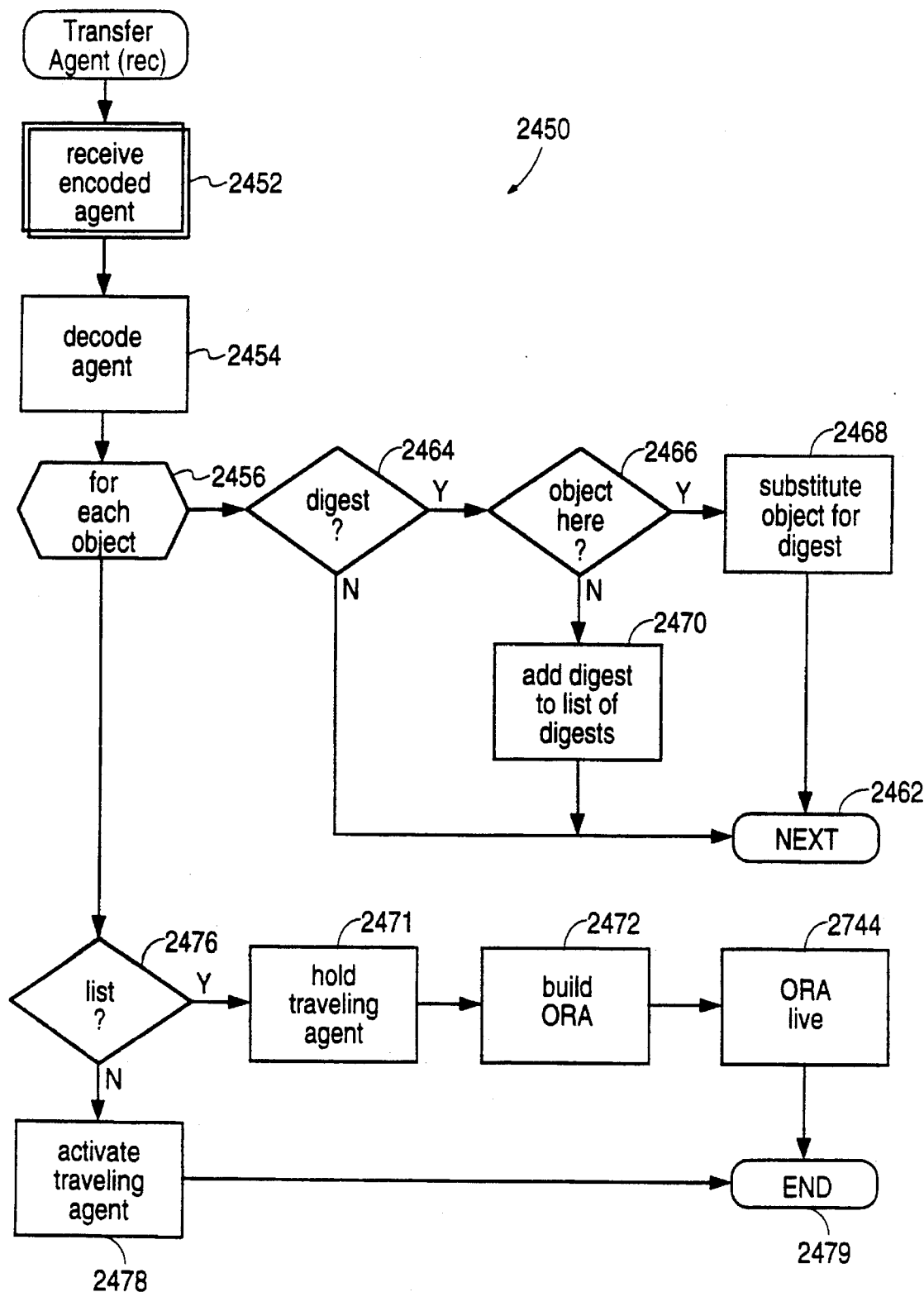

The use of digests to reduce the amount of data transferred, and therefore to reduce the time required to transport an agent and the objects contained by that agent from one place to another, is illustrated by logic flow diagrams 2400 and 2450 (FIGS. 24A and 24B).

Logic flow diagram 2400 (FIG. 24A) represents the process of transporting agent 150A (FIG. 15A) and the objects contained by agent 150A from a source engine 132A to a destination engine 132B when interchanged objects are considered. An agent "contains" all objects owned by the agent as well as every class of which the agent is a member and every class of which any object owned by the agent is a member. As described above, agent 150A and all objects contained by agent 150A are packaged into a shipping box, encoded and transported to engine 132B. In packaging agent 150A and objects contained therein, source engine 132A collects all objects contained by agent 150A in step 2402 (FIG. 24A). Processing transfers from step 2402 to for each object step 2404 which, with next step 1412, defines a loop wherein each object collected in step 2402 is considered. Processing transfers from for each object step 2404 to digest test step 2406 in which the class membership of each object contained by agent 150A is checked to determine whether each object has a digest.

As discussed above and in greater detail in Appendices A and E, members of mix-in class "Interchanged" can include a digest. Therefore, if an object has a digest, the object is an interchanged object. If an interchanged object does not have a digest, i.e., if attribute "digest" of the interchanged object is a nil, the interchanged object is not interchanged but is instead treated as a non-interchanged object.

If an object has no digest, even if the object is an interchanged object, processing transfers from digest test step 2406 to step 2410 in which the object is encoded according to the encoding rules of Appendix B and included in the shipping box. Otherwise, if the object has a digest, processing transfers from digest test step 2406 to step 2408 in which the digest of the object and a citation of the class of which the object is an instance are encoded according to the encoding rules of Appendix B and included in a parts box which is in turn included in the shipping box.

Processing transfers from step 2408 or step 2410 to next step 2412 in which processing is transferred to for each object step 2404. Engine 132A repeats the process of steps 2406, 2408 and 2410 for each object contained by agent 150A in a loop defined by for each object step 2404 and next 2412. If all objects collected in step 2402 have been processed according to the loop of for each object step 2404 and next object step 2412, processing transfers from for each object step 2404 to a transfer out encoded agent step 2414.

In transfer out encoded agent step 2414, the shipping box is encoded and is transported by source engine 132A to destination engine 132B, as described above. Thus, the encoded agent which is transported to destination engine 132B includes all objects contained by the agent which have no digests and the digests of all objects contained by the agent which are interchangeable and which have digests. Transfer out encode agent step 2414 is represented in double boxes to indicate interaction between engines across the network. Such an exchange of binary data between engines is discussed above and in Appendices C and F.

Logic flow diagram 2450 (FIG. 24B), illustrates the transfer of encoded agent 150A from the perspective of destination engine 132B. Destination engine 132B receives the encoded agent as binary data from source engine 132A in transfer in encoded agent step 2452. As described above in the context of FIGS. 15A–15E, the encoded agent can pass through one or more intermediate engines, e.g., engine 132Z, enroute from engine 132A to engine 132B.

Processing transfers from transfer in encoded agent step 2452 to step 2454 in which the encoded agent is decoded, thereby reconstructing the shipping box whose contents are the agent objects contained by the agent. Each of the objects, which do not have digests and which are contained by the agent, and the digests of the interchanged objects contained by the agent which have digests, are processed by destination engine 132B according to the loop formed by for each object step 2456 and next step 2462. Each iteration of the loop processes one of the objects decoded in step 2454.

Processing transfers from for each object step 2454 to digest test step 2464. In digest test step 2464, destination engine 132B determines whether an object is a digest. If the object is not a digest, processing transfers from digest test step 2464 directly to next object step 2462. Conversely, if the object is a digest, processing transfers from digest test step 2464 to test step 2466 and the object is called "the subject digest". In test step 2466, destination engine 132B determines whether the subject digest is equivalent to a digest of an interchanged object which is present in engine 132B. The method by which such a determination is made is discussed in more detail below.

If an interchanged object having an equivalent digest is found in step 2466, processing transfers from test step 2466 to substitute step 2468. In substitute step 2468, the interchanged object is substituted for the subject digest by replacing all references within the objects decoded in step 2454 to the interchanged object represented by the subject digest with references to the found interchanged object. Processing transfers from substitute step 2468 to next object step 2462.

If, on the other hand, no interchanged object having an equivalent digest is found in test step 2466, processing transfers from test step 2466 to step 2470. In step 2470, the subject digest is added to a list of digests. A new list is created if no such list exists. Processing transfers from step 2470 to next step 2462.

From next step 2462, processing transfers to for each object step 2456. If all objects decoded in step 2454 have been processed according to the loop of for each object step 2456 and next step 2462, processing transfers from for each object step 2456 to a list test step 2476, which is described below.

An engine searches for equivalent interchangeable objects in step 2466 as follows. Each engine contains one or more places which can exchange equivalent interchangeable objects. Each such place includes a "repository" of interchangeable objects which are present within the place. Dictionary 2490 (FIG. 24D) is the repository of place 220B (FIG. 15D). The keys of dictionary 2490 (FIG. 24D) are classes, i.e., classes 2490K1, 2490K2, 2490K3 and 2490K4. Associated with each class is a dictionary; for example, associated with classes 2490K1–2490K4 are dictionaries 2490A, 2490B, 2490C and 2490D, respectively.

Each of dictionaries 2490A–2490D have the same general organization; dictionary 2490A is illustrative. The keys of dictionary 2490A are digests, i.e., digests 2490AK1, 2490AK2 and 2490AK3. Associated with each digest is an interchanged object whose digest is the associated digest; for example, associated with digests 2490AK1–2490AK3 are interchanged objects 2490AV1, 2490AV2 and 2490AV3, respectively.

An interchanged object is retrieved from dictionary 2490 in two steps. As discussed above, both a digest and a citation of a class are used within a parts box to represent an interchanged object. In the first step, a citation is used to retrieve the dictionary of dictionaries 2490A–2490D which is associated with the class referenced by the citation. For example, if the citation references class 2490K1, dictionary 2490A is retrieved.

In the second step, the retrieved dictionary is searched for an association between a digest equivalent to the digest which is included in the parts box and an interchanged object. If an association is found, the interchanged object is retrieved. If no association is found, the place contains no interchanged object which is equivalent to the interchanged object represented by the citation and digest in the parts box. Thus, a repository such as dictionary 2490 (FIG. 24D) is used to determine whether a place contains an equivalent interchanged object and to retrieve such an object.

As described above, processing transfers from for each object step 2456 to list test step 2476. In list test step 2476, the destination engine, e.g. engine 132B, determines whether a list of digests was created in step 2470 and, if so, whether the list is empty. If the list of digests does not exist or is empty, processing transfers from list test step 2476 to activate traveling agent step 2478 in which engine 132B activates traveling agent 150A by scheduling agent 150A for execution. Processing transfers from activate traveling agent step 2478 to terminal step 2479 in which the transfer of agent 150A, as carried out by engine 132B, completes successfully.

If, on the other hand, a list was created in step 2470 and the list contains at least one digest, an equivalent object for at least one interchanged object is not found within destination engine 132B and processing transfers from list test step 2476 to hold traveling agent step 2471. In hold traveling agent step 2471, traveling agent 150A is held in a suspended state in a holding queue within engine 132B. Processing transfers from hold traveling agent step 2471 to step 2472.

Figure 24C:
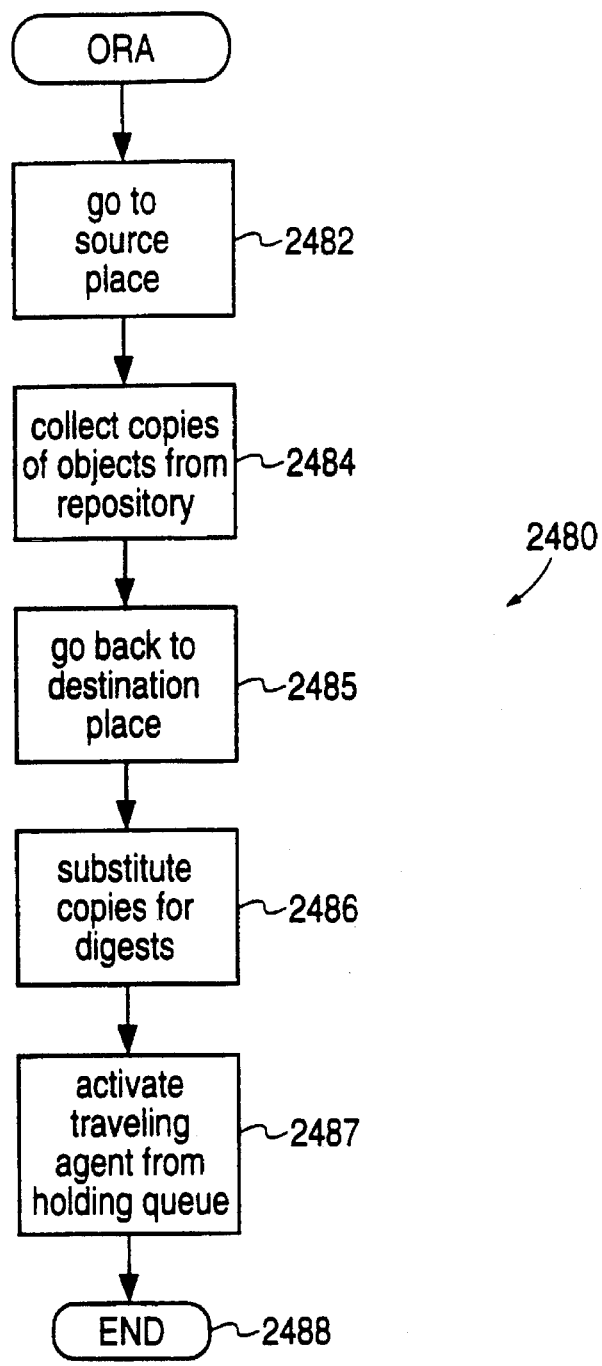
Figure 24D:
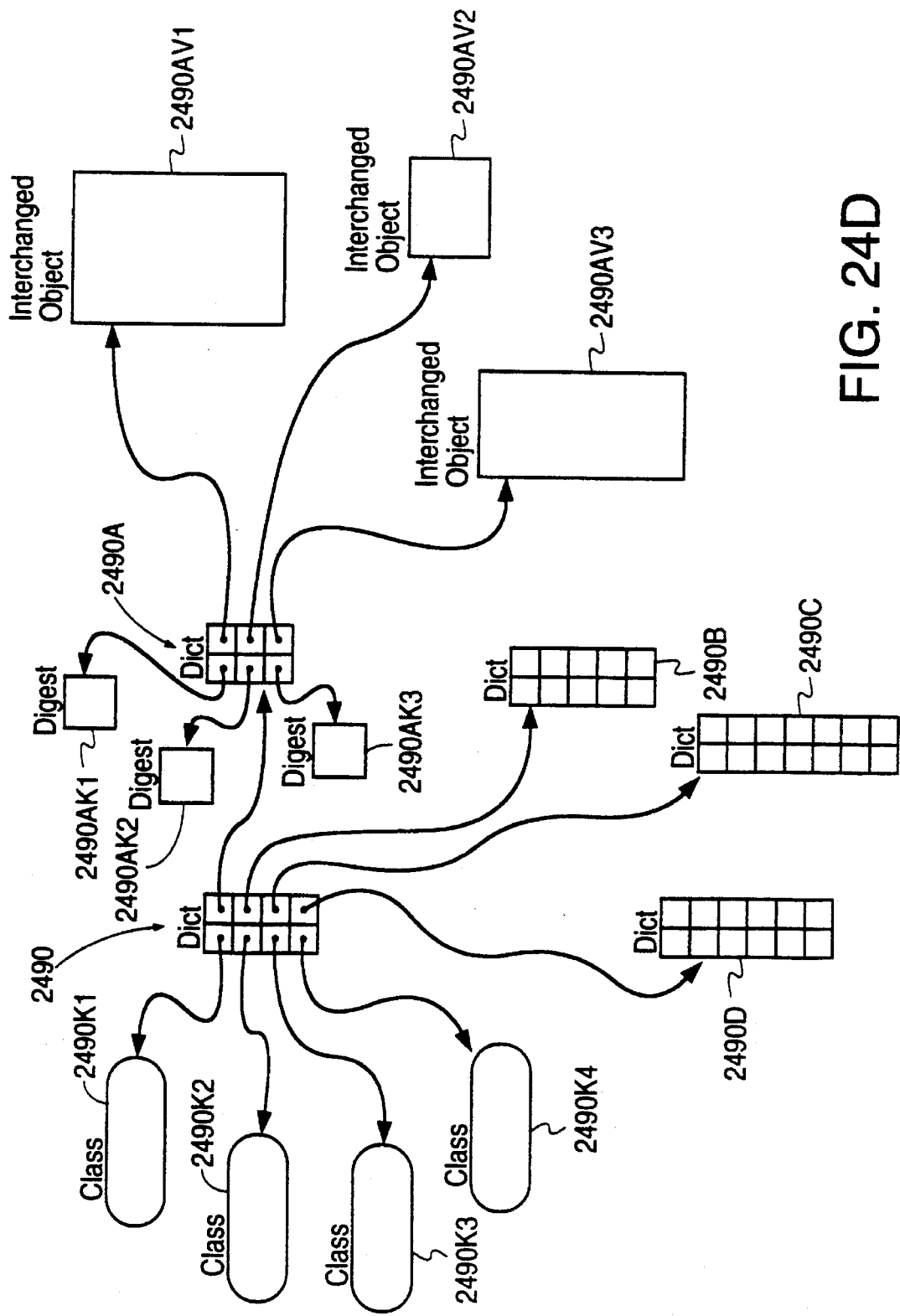
FIG. 24D shows the structure of a repository of interchanged objects which is used in the steps shown in FIGS. 24A–24C.

In step 2472, the destination engine, e.g. engine 132B, creates an object retrieval agent, i.e., an "ORA". The ORA retrieves interchanged objects from the source engine, e.g., engine 132A according to logic flow diagram 2480 (FIG. 24C). Processing transfers from step 2472 to step 2474 in which the ORA is directed to perform operation "live", thereby initiating interpretation of the ORA. As discussed below in greater detail, the central activity of the ORA is shown by logic flow diagram 2480 (FIG. 24C). Processing transfers from step 2474 to terminal step 2479 in which the transfer of agent 150A, as carried out by engine 132B, completes successfully. It should be noted that traveling agent 150A is not activated and is in the form of a shipping box. Agent 150A is reconstituted from the shipping box and reactivated by the ORA as described below.

Logic flow diagram 2480 (FIG. 24C) illustrates the central procedure of the ORA. In step 2482, the ORA travels to the source engine, e.g., engine 132A, by performance of operation "go". Processing transfers from 2482 to step 2484 in which the ORA collects from an interchanged object repository, such as dictionary 2490 (FIG. 24D), within engine 132A a copy of each object having a digest that is equivalent to a digest contained in the list of digests. Processing transfers from step 2484 to step 2485.

In step 2485, the ORA travels back to the destination engine, e.g., engine 132B, by performance of operation "go". The ORA carries to the destination engine copies of those objects whose digests are contained in the list of digests, namely, those objects for which there are no equivalent objects within the destination engine. Processing transfers from step 2485 to step 2486. In step 2486, the ORA substitutes the objects collected for the digests within agent 150A as described above. Processing transfers from step 2486 to activate traveling agent step 2487, in which agent 150A is reconstituted from the shipping box and activated as described above. The reconstitution of an agent and the objects contained by the agent from a shipping box is described in greater detail in Appendix D. Processing transfers from step 2487 to terminal step 2488 in which the central procedure of the ORA is successfully completed.

Thus, efficiency is achieved by transporting across network communications media only those interchanged objects which are not equivalent to interchanged objects within the destination engine.

Operation "Send"

Figure 25:
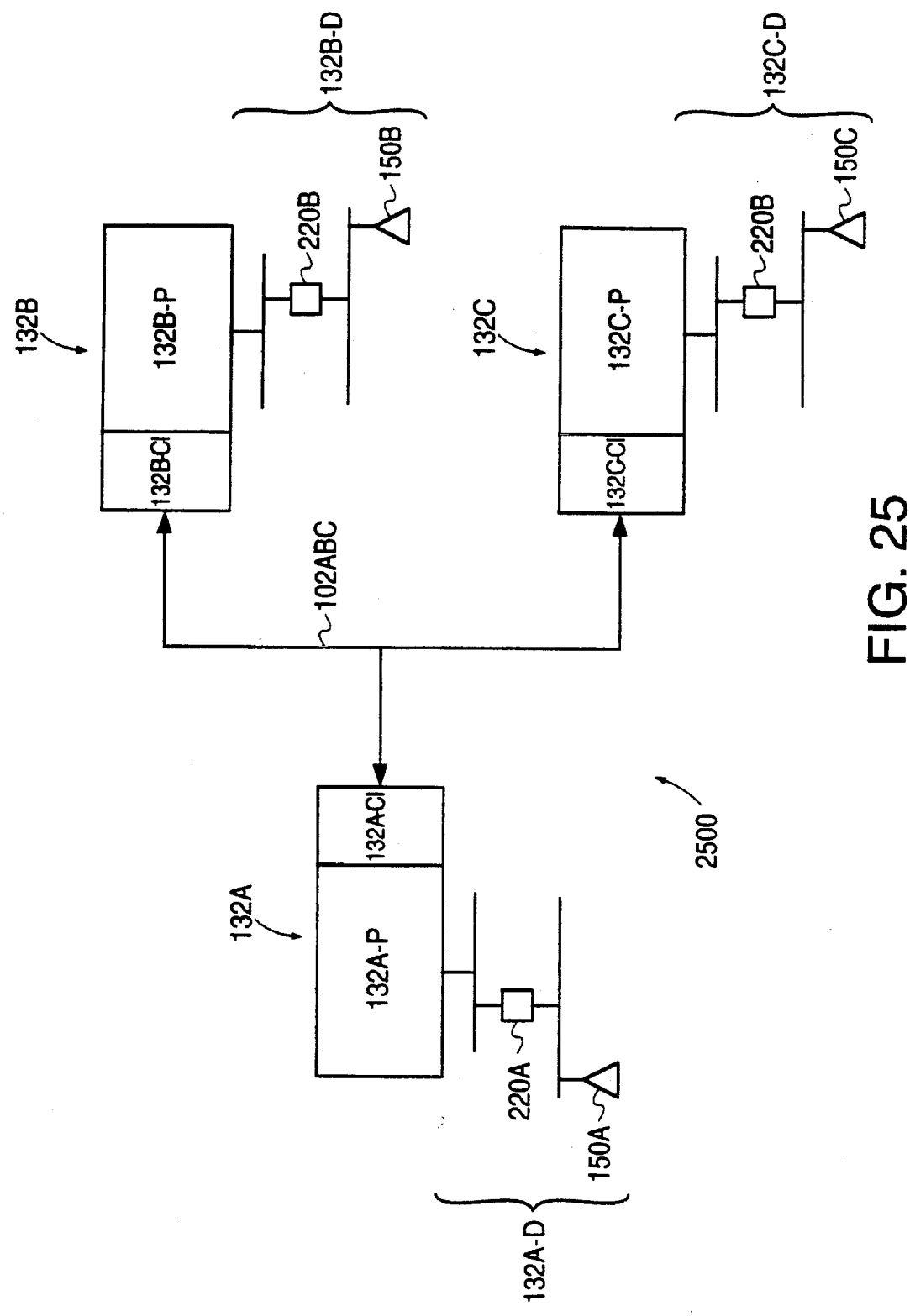
FIG. 25 shows a computer network formed in accordance with the principles of the present invention.

An agent is capable of traveling to several places simultaneously by performing operation "send". FIG. 25 shows the state of network 2500 prior to performance of operation "send" by agent 150A. In the example of FIG. 25, agent 150A in data portion 132A-D of engine 132A is configured to transport a clone of itself to place 220B in data portion 132B-D of engine 132B and a clone of itself to place 220C in data portion 132C-D of engine 132C simultaneously. In other words, agent 150A is performing operation "send", supplying as the argument to operation "send" a list of two tickets specifying places 220B and 220C as destination places for clones of agent 150A. A clone of agent 150A is a copy of agent 150A which is made by replicating agent 150A, including the execution state of agent 150A, to form the copy and which is made "active" by assigning a new name and identifier to the copy and scheduling the copy for execution by an engine. Clones are described in greater detail in Appendix A.

Figure 26A:
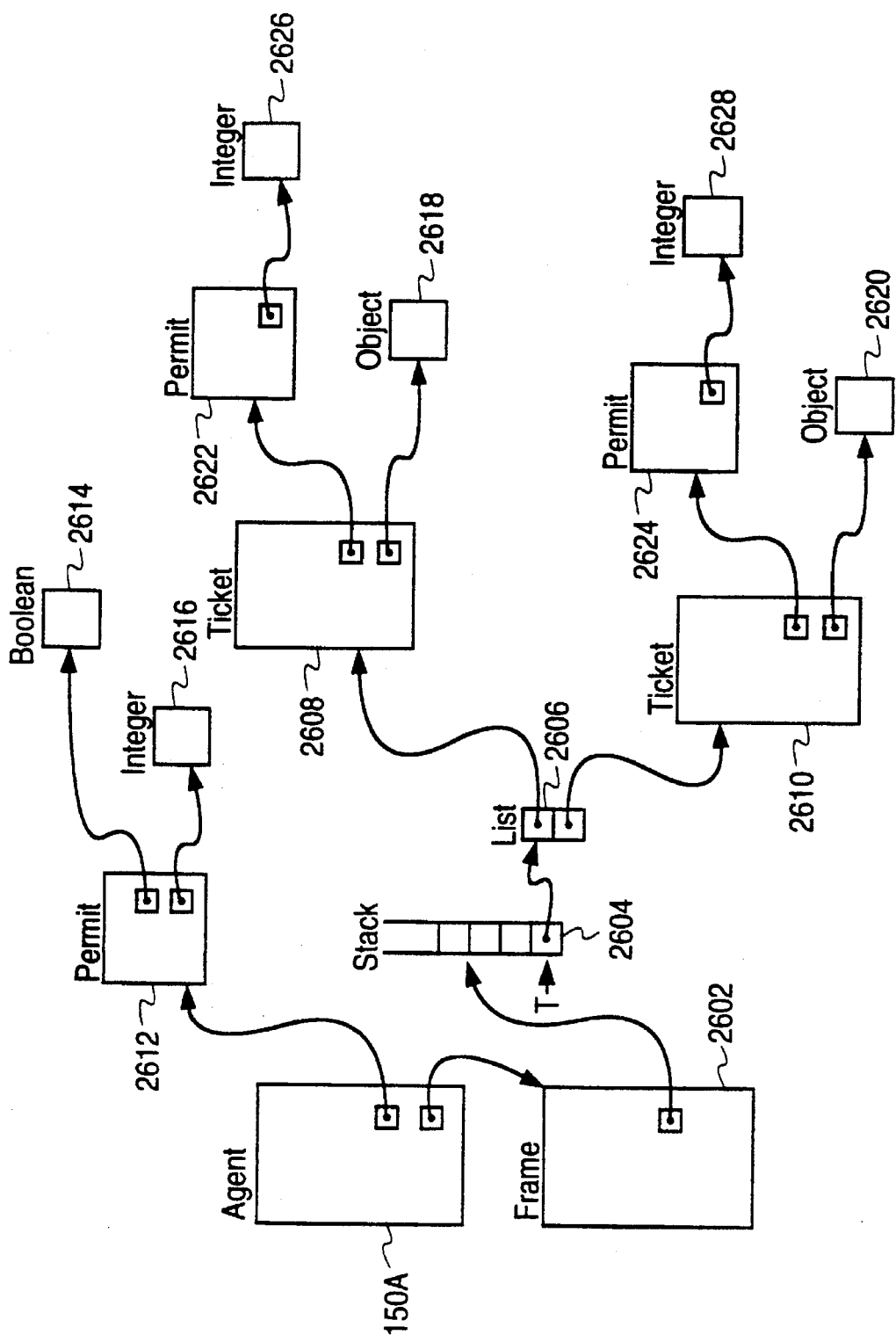
FIGS. 26A and 26B show a portion of the state of an agent process immediately prior to and following, respectively, performance of operation "send".
Figure 26C:
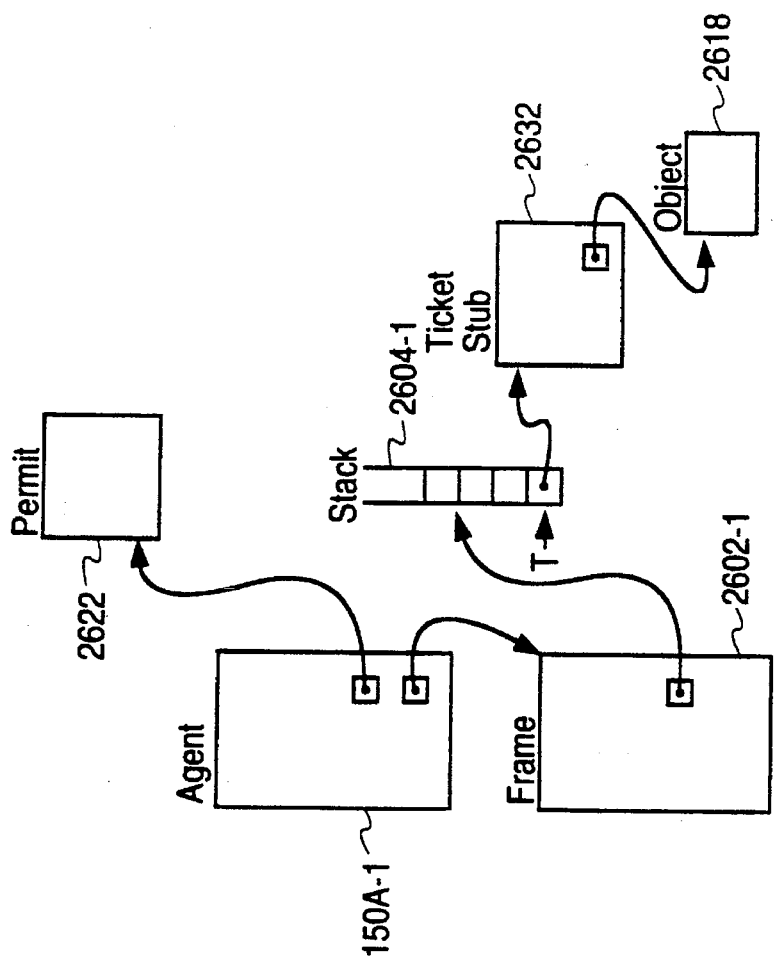
FIG. 26C shows the state of a clone of the agent process immediately following performance of operation "send".
Figure 26B:
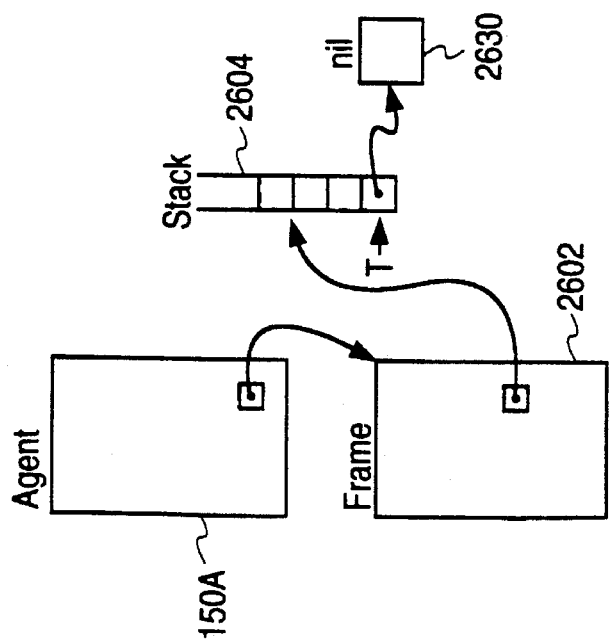

The interface of operation "send" is illustrated by FIGS. 26A, 26B and 26C. FIG. 26A illustrates frame 2602, which records the dynamic state of operation "send" as performed by agent 150A and which is a part of the execution state of agent 150A, immediately prior to performance of operation "send". The execution state of a process, including an agent, is described in greater detail below and in Appendices A and B.

Included in frame 2602 is stack 2604. Stack 2604 is the stack from which arguments are popped and to which a result is pushed during performance of operation "send". Stack 2604 is therefore the "current stack" in the context of operation "send". The "current stack" is defined and explained more completely below and in Appendices A and B.

At the top of stack 2604 as indicated by letter "T", is list 2606 whose items are tickets 2608 and 2610. Tickets 2608 and 2610 of list 2606 each define a trip to be taken by a corresponding clone of agent 150A.

Objects 2618 and 2620 are property "travelNotes" of tickets 2608 and 2610, respectively. Objects 2618 and 2620 provide a mechanism by which respective clones created by performance of operation "send" can be distinguished. For example, in forming tickets 2608 and 2610, agent 150A can store within objects 2618 and 2620 strings whose respective texts are "Able" and "Baker". In such a case, the clone of agent 150A corresponding to ticket 2608 retrieves the string "Able" from property "travelNotes" of ticket 2608. Similarly, the clone of agent 150A corresponding to ticket 2610 retrieves the string "Baker" from property "travelNotes" of ticket 2610.

The particular implementation by which the respective clones are distinguished is ultimately up to the user of the present invention. The following is another example. Stored within object 2618 is an integer whose value is one, thereby representing the position of corresponding ticket 2608 within list 2606. Similarly, stored within object 2620 is an integer whose value is two, thereby representing the position of corresponding ticket 2610 within list 2606.

Permits 2622 and 2624 are properties "destinationPermit" of tickets 2608 and 2610, respectively. Integers 2626 and 2628 are properties "charges" of permits 2622 and 2624, respectively.

Permit 2612 is property "permit" of agent 150A and therefore represents a part of the internal state of agent 150A. As described above and in Appendix A, permit 2612 limits the execution of agent 150A. Boolean 2614 is property "canSend" of permit 2612. If the value of boolean 2614 is "false", operation "send" fails and throws an exception of class "Permit Violated". Property "charges" of permit 2612 is integer 2616. As discussed in greater detail in Appendix A, integer 2616 represents the processing allowance of agent 150A.

Figure 27B:
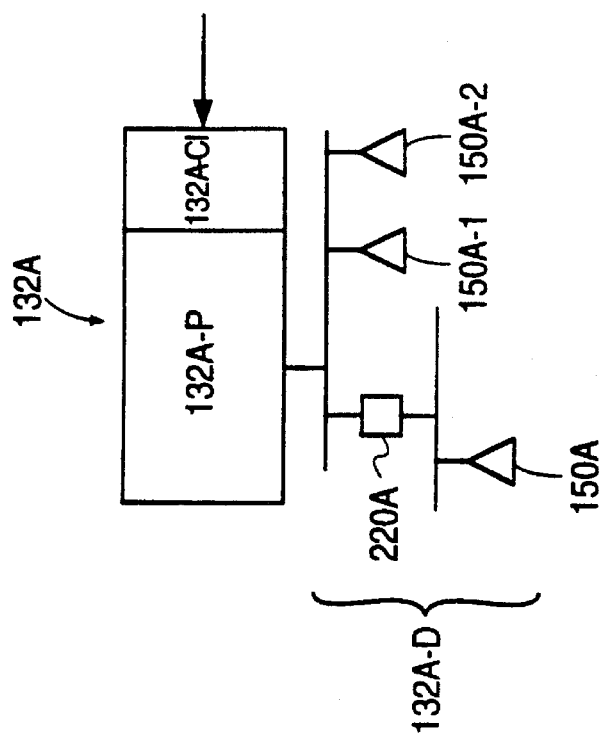
FIGS. 27A and 27B show the state of a engine process before and after, respectively, formation of clones of an agent process in performance of operation "send".
Figure 27A:
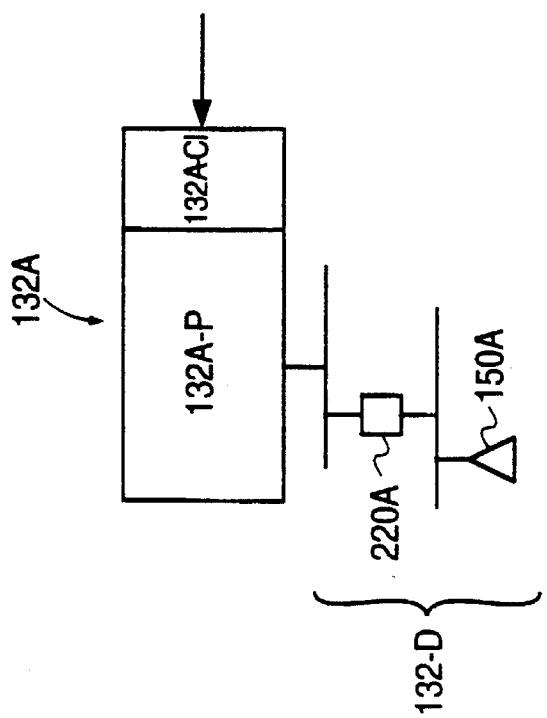

In the example of FIG. 25, agent 150A, whose current location is place 220A, is configured to transport respective clones of agent 150A to places 220B and 220C. As agent 150A sends a clone of itself to each destination place defined by a ticket in list 2606 (FIG. 26A), performance of operation "send" eventually creates as many clones of agent 150A as there are tickets in list 2606. FIGS. 27A and 27B illustrate a simple embodiment of operation "send" wherein engine 132A (FIG. 27A) creates within data portion 132A-D a number of clones of agent 150A equal to the number of tickets in list 2606 (FIG. 26A). In this example, list 2606 (FIG. 26A) contains two tickets, i.e., tickets 2608 and 2610. Therefore, engine 132A creates two clones, agent 150A-1 and agent 150A-2, of agent 150A (FIG. 27B). A more efficient embodiment, in which cloning of the responding agent is deferred, is described below.

In forming the clones of agent 150A, permits 2622 and 2624 are made property "permit" of the clones created. In other words, permit 2622 is property "permit" of agent 150A-1 and permit 2624 is property "permit" of agent 150A-2. In creating agents 150A-1 and 150A-2, the allowances of permits 2622 and 2624 are subtracted from the corresponding allowances of permit 2612 of agent 150A, i.e., the agent that is being cloned. In other words, the value of integers 2626 and 2628 are subtracted from integer 2616, which is the charges allowance of agent 150A, i.e., property "charges" of the permit of agent 150A, upon creation of agents 150A-1 and 150A-2. If integer 2616 is not greater than or equal to the sum of integers 2626 and 2628, operation "send" fails and throws an exception of class "Permit Violated" since the charges allowance of agent 150A is less than the sum of the charges allowances of the clones created from agent 150A.

Thus, the permits which are part of the tickets supplied as arguments to operation "send" form the native permits of the clones created in performance of operation "send". As tickets 2608 and 2610 define trips to be taken by respective clones of agent 150A, permits 2622 and 2624 are property "permit" of tickets 2608 and 2610, respective, and are therefore also the local permits of respective clones of responding agent 150A.

In a second embodiment of the present invention, operation "send" consumes, as an argument in addition to list 2606, an integer (not shown). In creating clones of responding agent 150A, respective native permits are formed as described above with the exception that property "charges" of each native permit is initially equal to the integer consumed.

A third embodiment of the present invention is the same as the second embodiment described above with the exception that a list of integers is consumed in lieu of a single integer. Additionally, property "charges" of each native permit, which is derived from property "permit" of a ticket within list 2606 (FIG. 26A), is initially equal to the integer at a position within the consumed list of integers that is equal to the position within list 2606 of the ticket from which the native permit is derived. For example, property "charges" of the native permit of the clone corresponding to ticket 2608 at position one within list 2606 is initially equal to the integer at position one in the consumed list of integers (not shown). Similarly, property "charges" of the native permit of the clone corresponding to ticket 2610 at position two within list 2606 is initially equal to the integer at position two in the consumed list of integers.

In a fourth embodiment of the present invention, operation "send" consumes, as an argument in addition to list 2606, a permit (not shown). In creating clones of responding agent 150A, each respective native permit is a copy of the consumed permit.

A fifth embodiment of the present invention is the same as the fourth embodiment described above with the exception that a list of permits is consumed in lieu of a single permit. Additionally, each native permit of a respective clone corresponding to a ticket within list 2606 (FIG. 26A) is initially equal to the permit at a position within the consumed list of permits that is equal to the position within list 2606 of the ticket to which the clone corresponds. For example, the native permit of the clone corresponding to ticket 2608 at position one within list 2606 is initially equal to the permit at position one in the consumed list of permits (not shown). Similarly, the native permit of the clone corresponding to ticket 2610 at position two within list 2606 is initially equal to the permit at position two in the consumed list of permits.

In each of the described embodiments, property "charges" of permit 2612, which is the permit of responding agent 150A, is reduced by the total of respective properties "charges" of the native permits of the clones of agent 150A created in performance of operation "send".

Each clone of agent 150A is transported to a place identified by the corresponding ticket as a destination place. For example, ticket 2608 identifies place 220B as the destination for agent 150A-1, and ticket 2610 identifies place 220C as the destination for agent 150A-2. Each clone travels to its respective destination place through the cooperation of the source engine 132A with a corresponding destination engine, e.g., either engine 132B or engine 132C. The transportation of an agent clone, e.g. either agent 150A-1 or agent 150A-2, from one place to another in performing operation "send" is as described above in detail in conjunction with operation "go".

If, in performance of operation "send", agent 150A successfully creates agents 150A-1 and 150A-2, performance of operation "send" by agent 150A succeeds even if the transportation of any or all of the agent clones fails. If a trip of an agent clone fails, the trip exception is thrown by the agent clone, not the agent which originally performed operation "send".

A portion of the execution state of agent 150A immediately following performance of operation "send" by agent 150A is shown in FIG. 26B. Stack 2604, which is the current stack as described above, contains a nil object 2630. A nil object is produced as a result for the original agent, thereby distinguishing the original agent from agent clones created in performance of operation "send".

FIG. 26C shows a portion of the execution state of agent 150A-1 after performance of operation "send" by agent 150A. The execution state of agent 150A-2 after performance of operation "send" by agent 150A is directly analogous to the execution state of agent 150A-1 as described immediately below.

Permit 2622 is property "permit" of agent 150A-1. Stack 2604-1 is a copy of stack 2604 produced in the creation of agent 150A-1. Stack 2604-1 is the current stack of agent 150A-1. At the top of stack 2604-1 is ticket stub 2632. Ticket stub 2632 is the result produced by operation "send" for an agent clone created by performance of operation "send". Ticket stub 2632 is derived from ticket 2608.

Ticket stub 2632 is a member of a class "Ticket Stub". Ticket stub 2632 has, among other properties, properties "way" and "travelNotes". Ticket 2608 is a member of a class "Ticket". Class "Ticket" is a subclass of class "Ticket Stub"; therefore, ticket 2608 has, among other properties, properties "way" and "travelNotes", definitions of which are inherited from superclass "Ticket Stub". Ticket stub 2632 is derived from ticket 2608 such that properties "way" and "travelNotes" of ticket stub 2632 are equal to properties "way" and "travelNotes", respectively, of ticket 2608. As discussed above, property "travelNotes" of ticket 2608 (FIG. 26A) can be used to distinguish agent 150A-1 from agent 150A-2. Similarly, the current stack (not shown) of agent 150A-2 contains a ticket stub (not shown) whose property "travel Notes" is object 2620.

Figure 28:
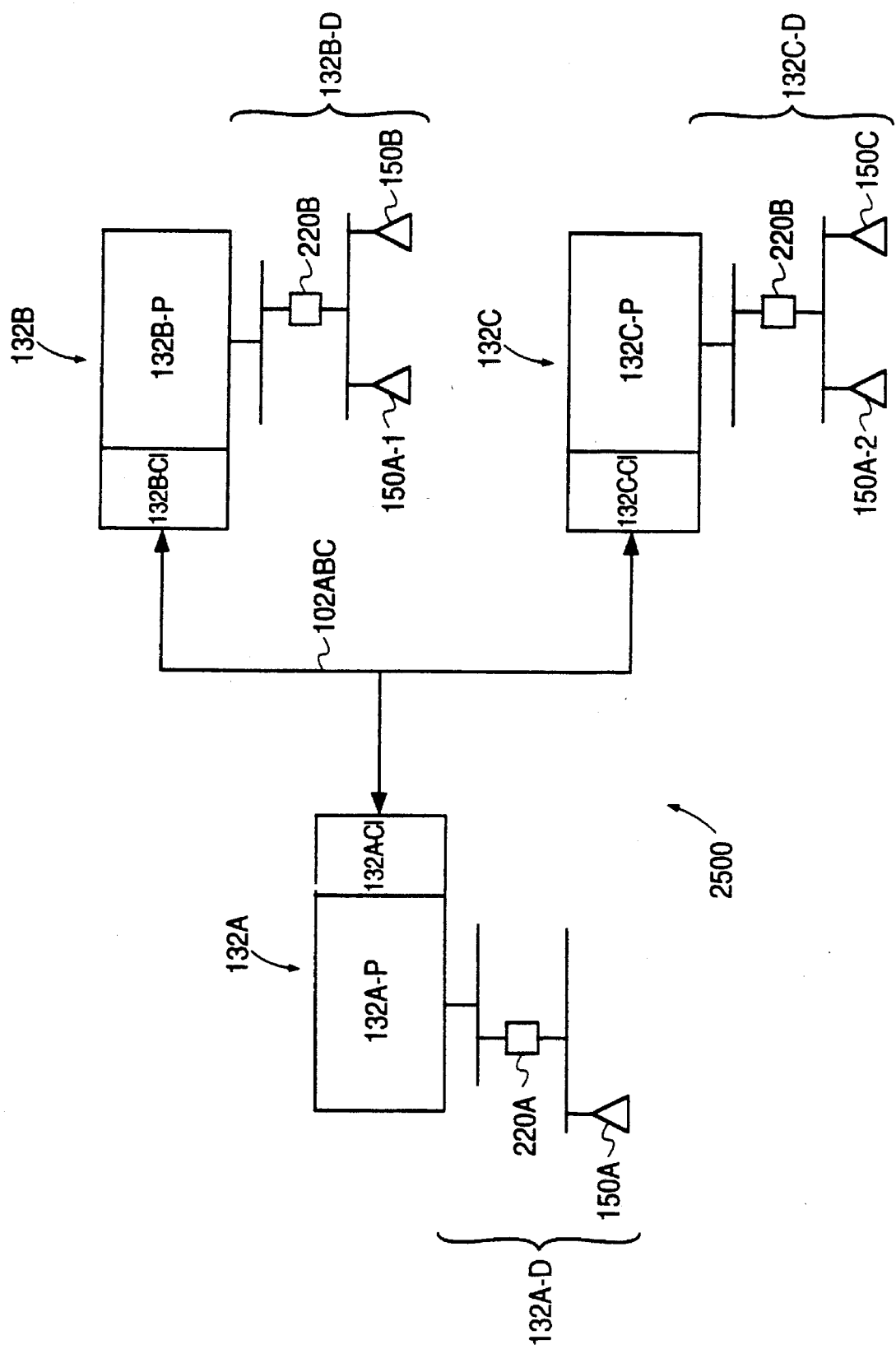
FIG. 28 shows the computer network of FIG. 25 in which clones of the agent process have travelled to respective computer systems of the computer network in performance of operation "send".

FIG. 28 shows computer network 2500 after operation "send" has been performed by agent 150A. Agent 150A remains in data portion 132A-D of computer process engine 132A. Agent 150A-1 occupies place 220B in data portion 132B-D of engine 132B. Similarly, agent 150A-2 occupies place 220C executing in data portion 132C-D of engine 132C.

The access of operation "send" is "private" permitting only the responder to request the operation. As discussed in greater detail below and in Appendix A, each feature of the present invention has an access which specifies under what conditions the feature can be requested. As the access of operation "send" is private, only agent 150A can initiate performance of operation "send" by agent 150A. Even engine 132A cannot initiate performance of operation "send" by agent 150A.

Deferred Cloning

Substantial savings in the amount of time required to perform operation "send" and in space occupied by clones of an agent created during performance of operation "send" are realized by "deferred cloning". Deferred cloning occurs when the engine carrying out performance of operation "send" determines that two or more clones of the same agent are to be transferred to a single destination engine. In such a case, a single clone is transferred to the destination engine and additional clones are derived from the single clone at the destination engine. FIGS. 29A–29D are illustrative.

Agent 150A (FIG. 29A) occupies place 220A in engine 132A. Engine 132A is a computer process executing within computer system 110A (not shown). Agent 150A is performing operation "send", supplying as the argument to the operation a list of three tickets (not shown) specifying places 220B, 220C and 220D as destination places for clones of agent 150A. Engine 132A is in communication with engine 132E across communications link 102AE. Communications link 102AE is as described above with respect to communications link 102AZ (FIG. 15A) in conjunction with operation "go". In addition to engine 132A, engine 132E is in communication with engines 132B and 132F across communications link 102EBF. Additionally, engine 132F is in communication with engines 132C and 132D across communications link 102FCD. Places 220B, 220C and 220D are processes interpreted by engines 132B, 132C and 132D, respectively. Thus, for clones of agent 150A to reach places 220B, 220C and 220D, each clone must first be transferred to engine 132E.

Created within engine 132A is a single clone, i.e., agent 150A-1, of agent 150A. The execution state of agent 150A-1 includes a send frame 2902 as agent 150A-1 is performing operation "send". The execution state of an agent is discussed in greater detail below and in Appendix A. Send frames are discussed in greater detail in Appendix B. Send frame 2902 (FIG. 30A) includes list of tickets 2904 which includes tickets 2904B, 2904C and 2904D which in turn specify places 220B, 220C and 220D, respectively, as destination places. Agent 150A-1 (FIG. 29A), the single clone of agent 150A, therefore represents three separate agent clones which are to travel to places 220B, 220C and 220D, respectively.

Figure 29A:
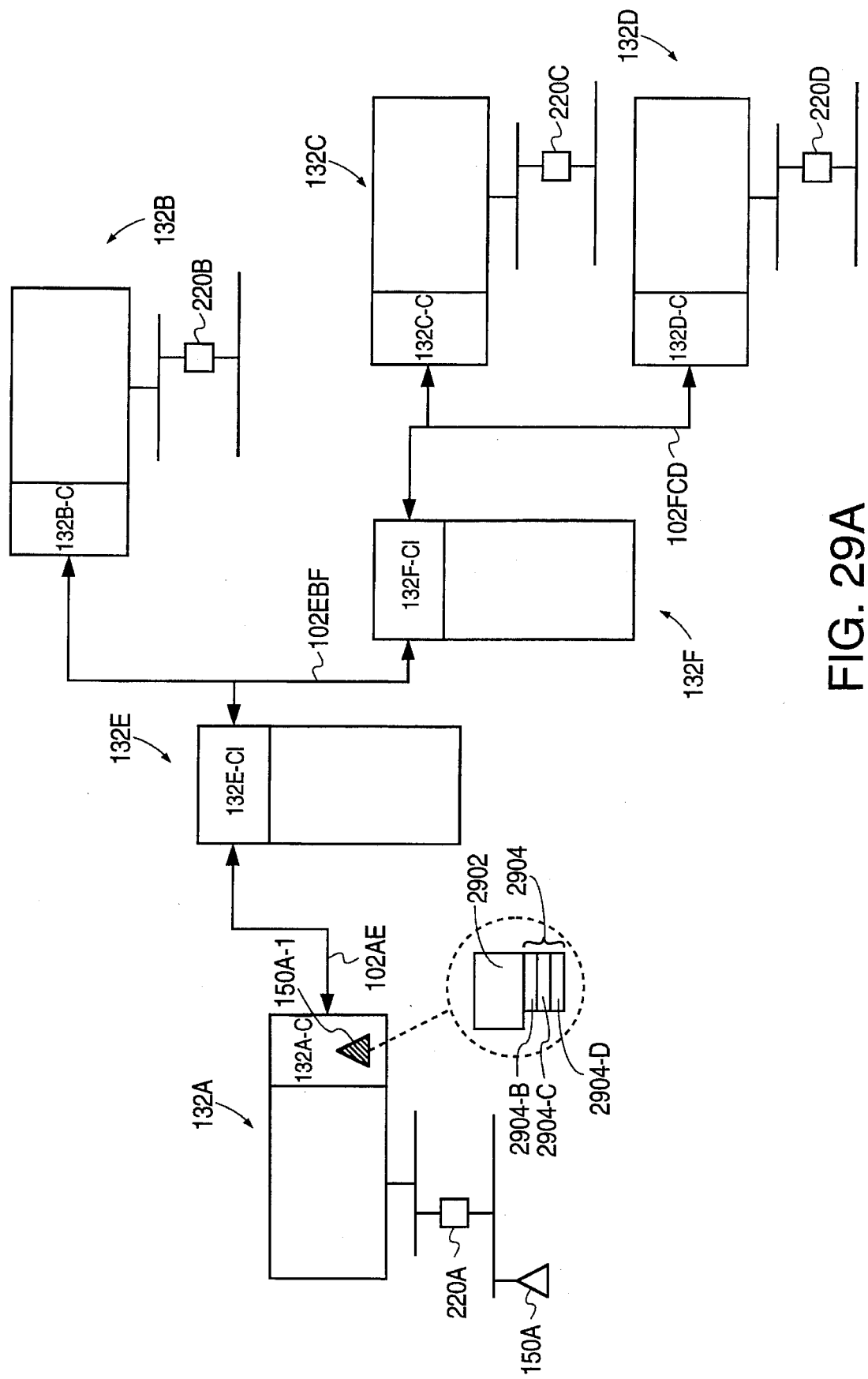
FIGS. 29A–29E show a computer network through which clones of an agent process travel according to another aspect of the present invention referred to as "deferred cloning".
Figure 29B:
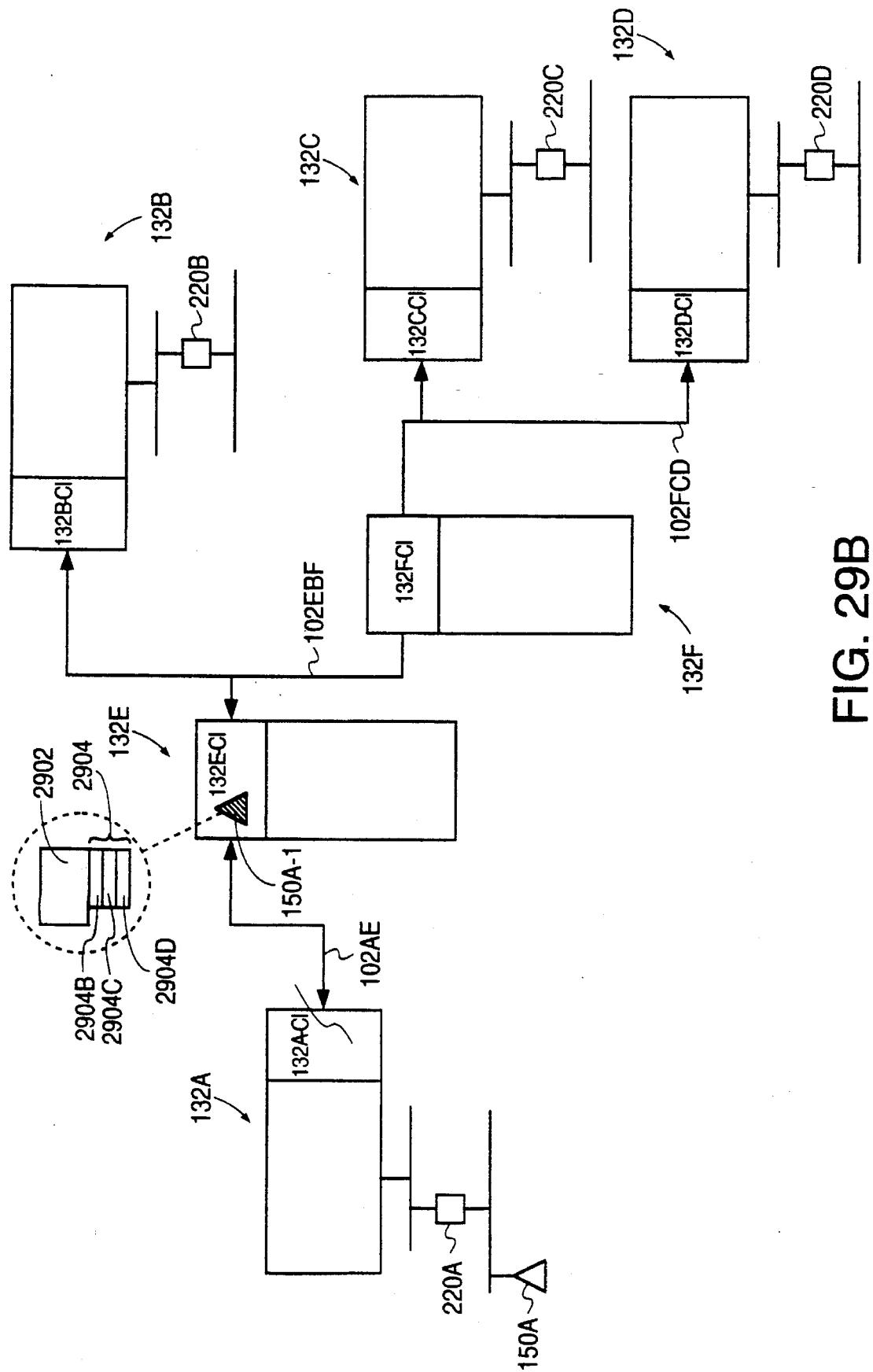
Figure 29C:
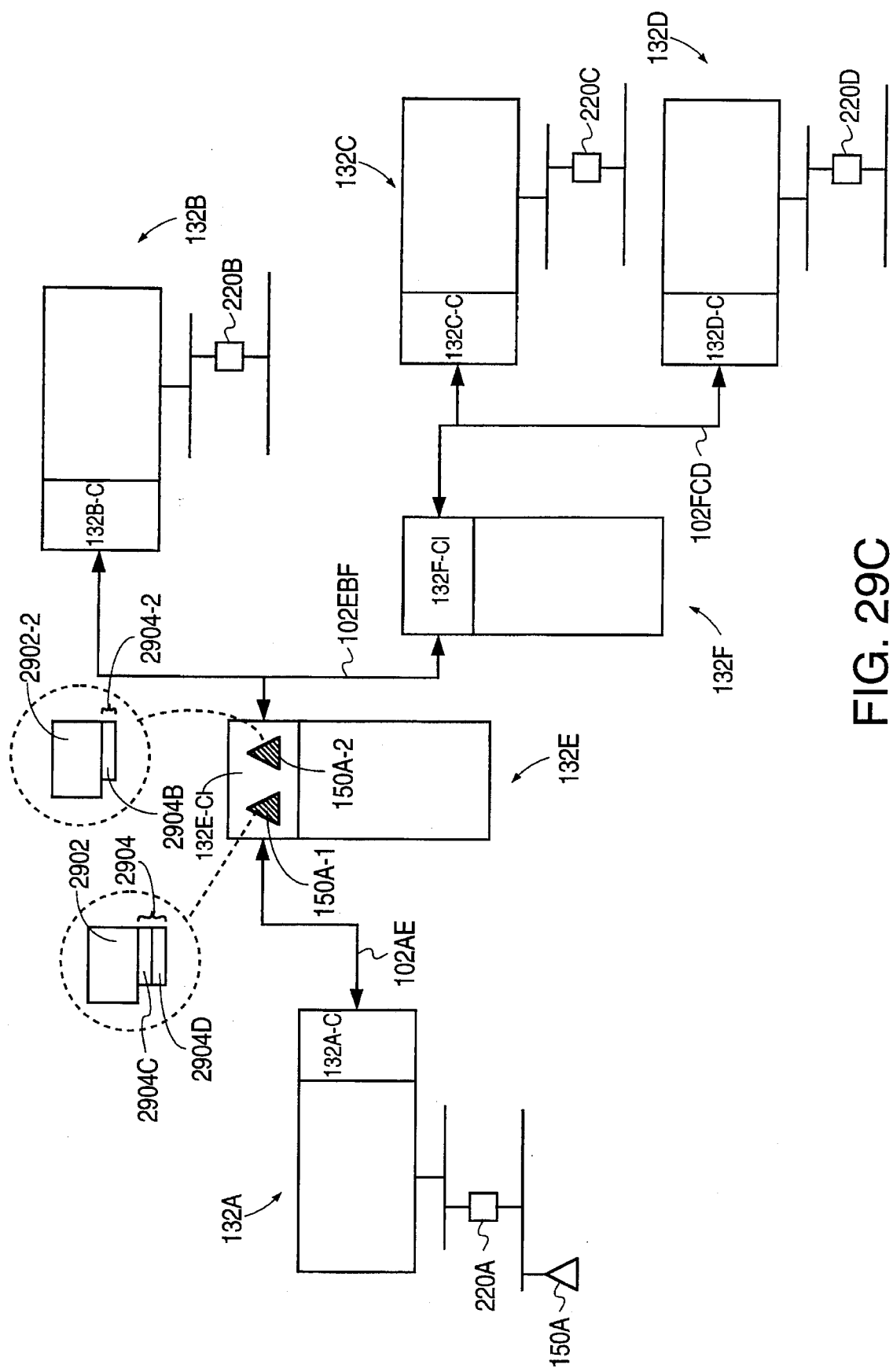
Figure 30A:
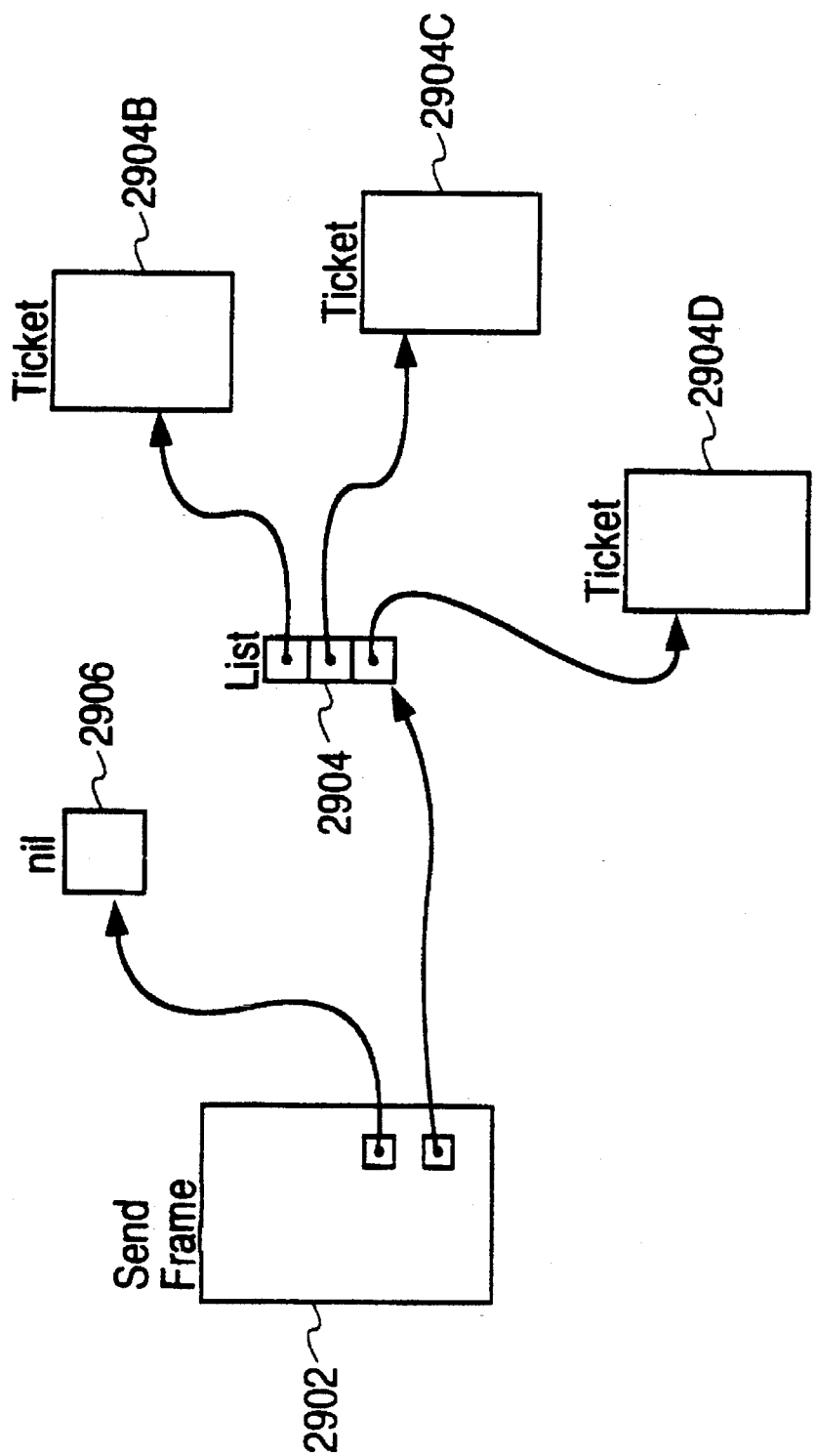
FIG. 30A shows the structure of a send frame including a nil and a list of tickets.

Encoded agent 150A-1-E (FIG. 30B) is the result of encoding agent 150A-1 (FIG. 29A) according to the encoding rules of Appendix B. Included in encoded agent 150A-1-E (FIG. 30B) are destinations 150A-1-E-D1, 150A-1-E-D2, and 150A-1-E-D3 which define respective transfer destinations of the three clones of agent 150A (FIG. 29A). As all three clones of agent 150A are transferred to engine 132E, destinations 150A-1-E-D1, 150A-1-E-D2, and 150A-1-E-D3 (FIG. 30B) all define engine 132E as the transfer destination of a respective clone of agent 150A (FIG. 29A). Engine 132A determines that destinations 150A-1-E-D1, 150A-1-E-D2, and 150A-1-E-D3 (FIG. 30B) each define engine 132E as a transfer destination and transfers a single clone of agent 150A (FIG. 29A), i.e., encoded agent 150A-1-E (FIG. 30B) to engine 132E (FIG. 29B). Thus, rather than transporting three separate clones from engine 132A to engine 132E, a single clone is transported to engine 132E reducing proportionally the amount of space within engine 132A occupied by clones of agent 150A and the amount of time required to transport clones to engine 132E.

Agent 150A-1 is encoded and transferred to engine 132E (FIG. 29B) as discussed above in conjunction with operation "go". Engine 132E retrieves list 2904 of send frame 2902 of agent 150A-1. As the structure of an encoded agent is standardized as described in Appendix B, an engine, e.g., engine 132E, can retrieve list 2904 without decoding encoded agent 150A-1. Engine 132E determines that one clone corresponding to ticket 2904B of send frame 2902 is to be transported to engine 132B and that two clones corresponding to tickets 2904C and 2904D are to be transported through engine 132F to engines 132C and 132D, respectively. Therefore, a second clone, agent 150A-2 (FIG. 29C), is created from agent 150A-1 by engine 132E. As agent 150A-1 is encoded, agent 150A-2, which is a copy of agent 150A-1, is encoded as well. Agent 150A-2 includes send frame 2902-2, and send frame 2902-2 in turn includes list of tickets 2904-2. List of tickets 2904-2 includes a single ticket 2904B which is removed from list of tickets 2904 of send frame 2902 of agent 150A-1.

Figure 29D:
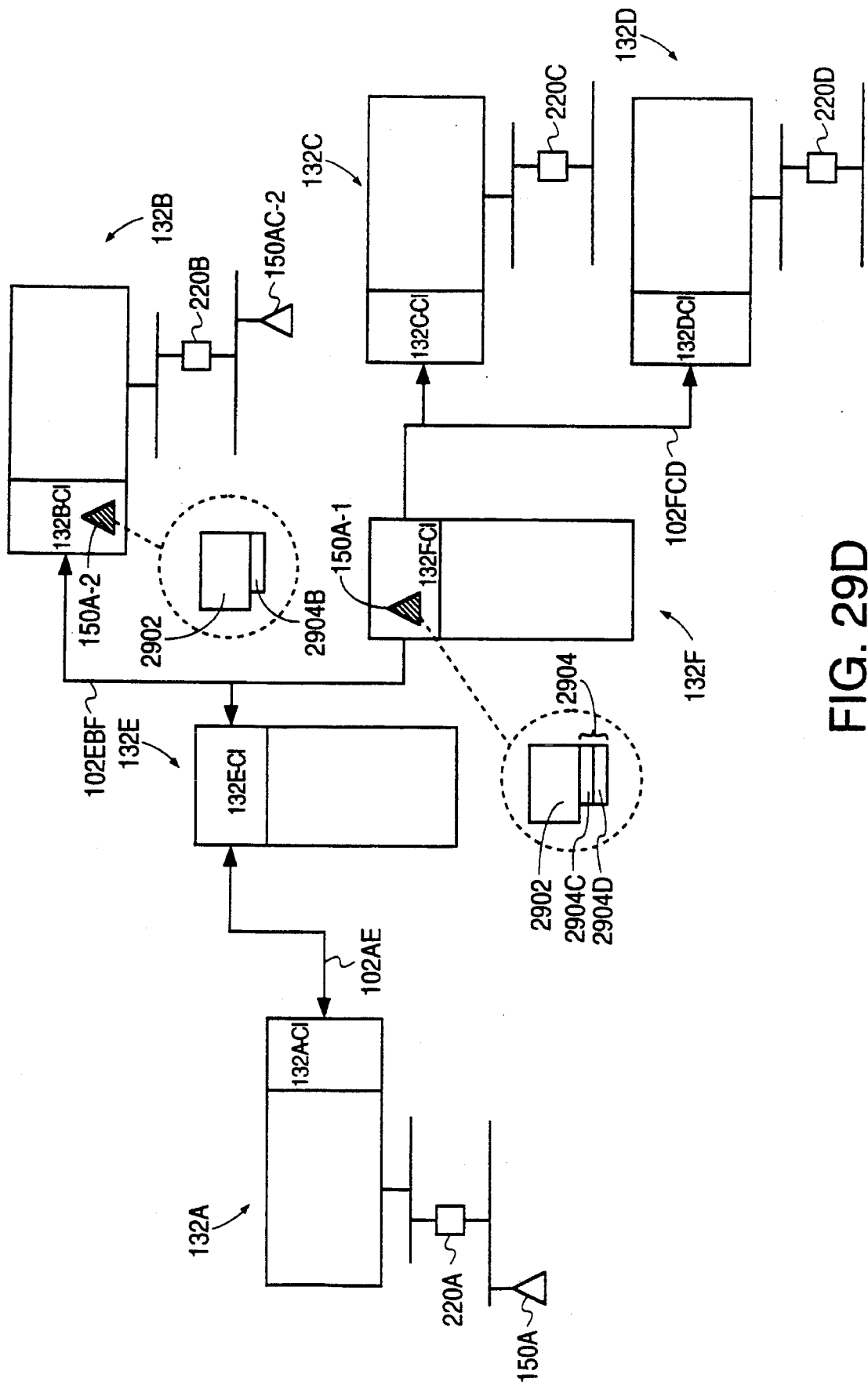

Agent 150A-2 is transferred to engine 132B, and agent 150A-1 is transferred to engine 132F (FIG. 29D). As ticket 2904B specifies place 220B as the destination of a trip and ticket 2904B is the only ticket in send frame 2902-2, place 220B is the destination of agent 150A-2 and no further clones of agent 150A are created from agent 150A-2. Agent 150A-2 is decoded by engine 132B. Agent 150A-2 is granted occupancy to place 220B by performance of operation "entering" by place 220B as described above, and performance of operation "send" for agent 150A-2 is completed. Send frame 2902B is therefore removed from the execution state of agent 150A-2 as discussed below in the context of the execution model.

Agent 150A-1 is transferred to engine 132F. Included in send frame 2902, which is part of the execution state of agent 150A-1, is list of tickets 2904 which in turn includes tickets 2904C and 2904D. Thus, agent 150A-1 represents two clones of agent 150A which are traveling to places 220C and 220D, respectively. Therefore, by transferring a single clone, i.e. agent 150A-1, from engine 132E to engine 132F, substantial savings are realized in storage space in engine 132E and in time required to transport data between engine 132E and engine 132F as described above.

Figure 29E:
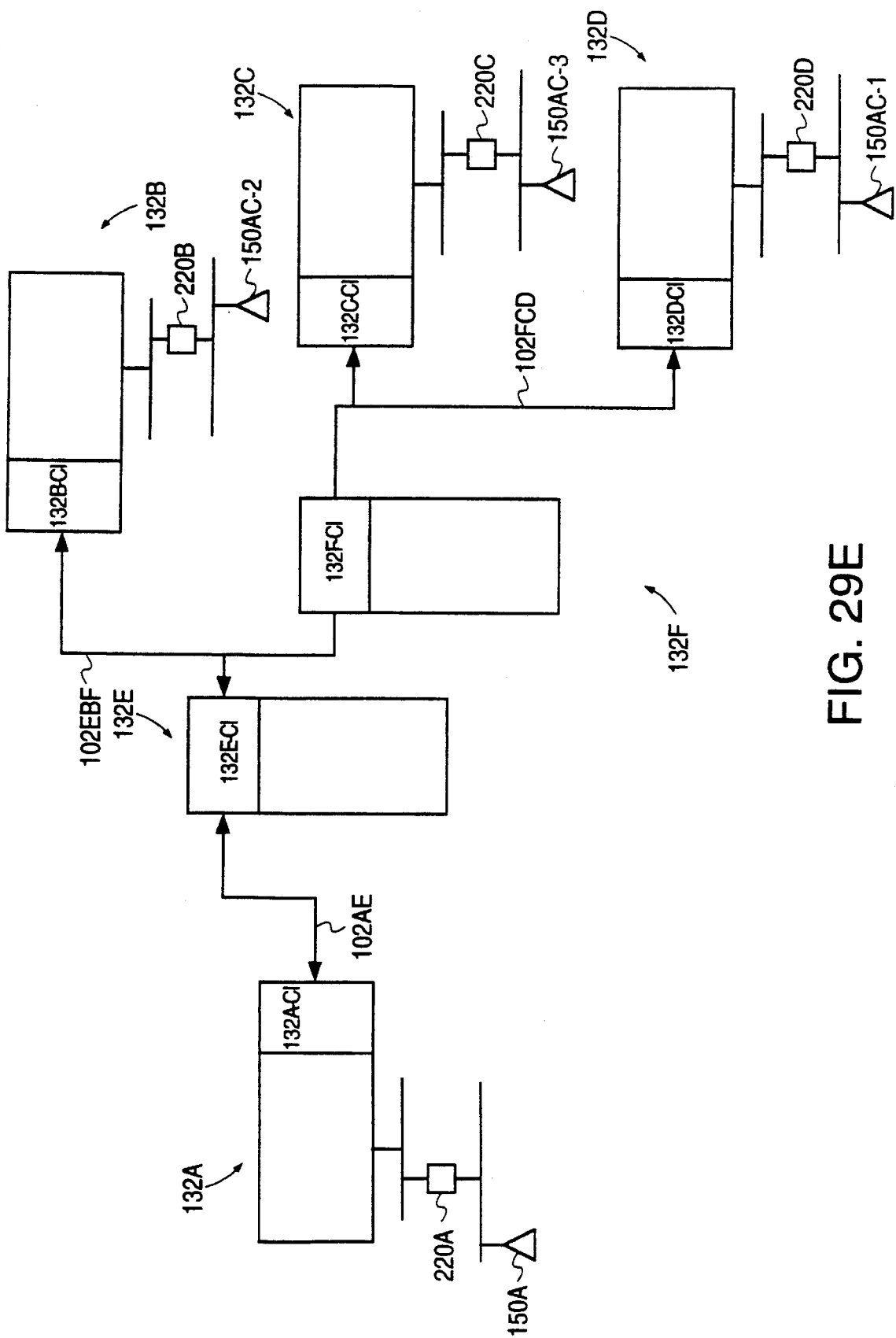

In the manner described above, in engine 132F (i) a third clone of agent 150A, i.e., agent 150A-3, is formed from agent 150A-1, and (ii) a send frame (not shown) is included in agent 150A-3 which includes ticket 2904C. As agent 150A-1, from which agent 150A-3 is copied, is encoded, agent 150A-3 is encoded as well. Ticket 2904C is removed from send frame 2902 of agent 150A-1. Agent 150A-3 is transferred to engine 132C, and agent 150A-1 is transferred to engine 132D (FIG. 29E).

Engine 132C includes place 220C which is the trip destination of agent 150A-3 as defined by ticket 2904C, and engine 132D includes place 220D which is the trip destination of agent 150A-1 as defined by ticket 2904D. In the manner described above, (i) engine 132C decodes agent 150A-3 and agent 150A-3 is granted occupancy of place 220C by performance of operation "entering" and (ii) engine 132D decodes agent 150A-1 and agent 150A-1 is granted occupancy of place 220D by performance of operation "entering". Since send frame 2902 (not shown) contains only a single ticket which specifies place 220D as the destination, operation "send" completes for agent 150A-1. Similarly, as agent 150A-3 includes a send frame specifying a single place, namely, place 220C which is the place occupied by agent 150A-3, as the destination of a trip, operation "send" completes for agent 150A-3 as well.

Each of agents 150A-1, 150A-2 and 150A-3 completes performance of operation "send" having an execution state which includes a send frame which includes a single ticket which defines the trip taken by the respective agent clone. The respective single ticket is used as described above to derive a ticket stub which is produced as the result of the respective agent's performance of operation "send".

Thus, substantial amounts of computer storage space and time are saved in performance of operation "send" by deferring cloning as long as possible in the transportation of the several clones to respective destination places.

The structure of send frame 2902 during transport of agent 150A-1 is shown in FIG. 30. Class "Send Frame" defines property "tickets". Property "tickets" of send frame 2902 is list 2904 whose items are tickets 2904B, 2904C and 2904D. Tickets 2904B, 2904C and 2904D define respective trips to be taken by respective clones of responding agent 150A.

As discussed above, performance of operation "send" by agent 150A creates one or more agent clones, each agent clone representing one or more clones of agent 150A. If forming each agent clone, e.g. agent 150A-1 (FIG. 29A), a copy of send frame 2902 is included in the agent clone. Property "tickets" of the send frame copy is modified so as to include only those tickets corresponding to the clones represented by the agent clone. For example, agent 150A-2 (FIG. 29C) includes send frame 2902-2 which in turn includes ticket 2904B and agent 150A-1 includes send frame 2902 which in turn includes tickets 2904C and 2904D. Therefore, agent 150A-2 represents a single clone of agent 150A which is traveling to the place specified by ticket 2904B, namely, place 220B. Similarly, agent 150A-1 represents two clones of agent 150A which are traveling to places specified by tickets 2904C and 2904D, namely, places 220C and 220D, respectively.

Once each clone has reached its respective destination, property "tickets" of send frame 2902 (FIG. 30) is a list of exactly one ticket. For example, agents 150A-1, 150A-2 and 150A-3 (FIG. 29E) include send frames 2902, 2902-2 and 2902-3, respectively, which each include a single ticket, namely, respective tickets 2904D, 2904B and 2904C. Thus, each send frame contains the single ticket defining the trip taken by the corresponding agent clone. The single ticket is used as described above to form a ticket stub which is produced as a result by performance of operation "send" by each respective agent clone.

Thus, substantial savings are realized in computer storage space and data transportation time by deferring cloning of an agent performing operation "send" as long as two or more agent clones are taking trips which are coextensive in part. As described above in the context of operation "go", if an exception is thrown during performance of operation "go" by an agent, the agent can be placed in purgatory. Similarly, if an exception is thrown during performance of operation "send" by an agent clone, the agent clone can be placed in purgatory. Additionally, if transportation of multiple clones of an agent which are represented by a single encoded agent, e.g. agent 150A-1 (FIG. 29B), fails, each clone represented by the encoded agent is decoded, activated, and placed in purgatory as described above.

Interaction Between Agents: Operation "Meet"

Two agents, which occupy the same place, are capable of interacting with one another by one agent requesting that the other perform an operation, or set or query an attribute. Information is exchanged between the two agents through the arguments and result of the operation requested or through the attribute which is set or queried. For example, agent 150A and 150B occupy place 220B which is executing within engine 132B (FIG. 15E). Therefore, agent 150A and agent 150B are capable of interacting by (i) agent 150A requesting that agent 150B perform a feature or by (ii) agent 150B requesting that agent 150A perform a feature.

Agent 150A is capable of requesting that agent 150B perform a feature only if agent 150A contains a reference to agent 150B. Similarly, agent 150B is capable of requesting that agent 150A perform a feature only if agent 150B contains a reference to agent 150A. Agent 150A obtains a reference to agent 150B by requesting performance of operation "meet" by a meeting place of which agents 150A and 150B are occupants. To this point, place 220B has only been described as a place occupied by agents 150A and 150B. For purposes of the following discussion, place 220B is a meeting place, i.e., a member of class "Meeting Place". Meeting places are discussed in more detail in Appendix A.

FIGS. 31A and 31B illustrate the interface of operation "meet". Frame 3100 is part of the execution state of agent 150A. Frame 3100 records the state of the performance of operation "meet" by meeting place 220B. Meeting place 220B is identified within the execution state of agent 150A as the responder of operation "meet".

Frame 3100 includes stack 3102, which is the current stack. Immediately prior to performance of operation "meet" (FIG. 31A), stack 3102 contains, at its top, petition 3106. Petition 3106 is an argument consumed by performance of operation "meet". Petitions, i.e. members of class "Petition", are discussed more completely below and in Appendix A.

Logic flow diagram 3200 (FIG. 32) shows the implementation of operation "meet" as performed by meeting place 220B. Engine 132B (FIG. 15E), in carrying out operation "meet" as performed by meeting place 220B, determines the petitioned agent by parsing petition 3106 (FIG. 31A). Petition 3106 specifies a petitioned agent by name, by class or by both. A petitioned agent is an agent specified by a petition as the agent with which an agent requesting a meeting is configured to meet.

Figure 32:
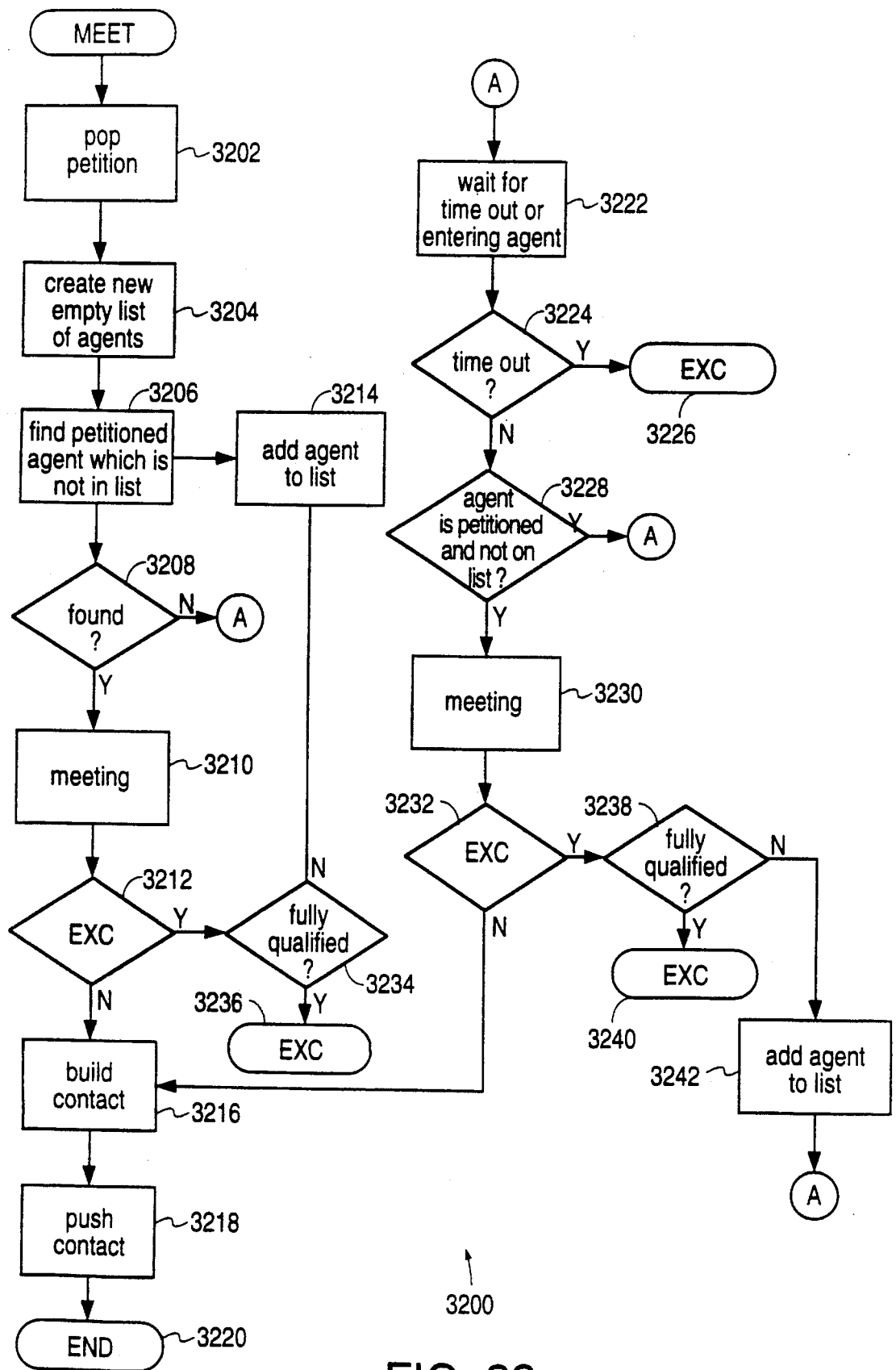
FIG. 32 shows a logic flow diagram of the steps taken in performance of operation "meet".

Engine 132B pops petition 3106 from the current stack in a pop petition step 3202 (FIG. 32). Processing transfers from pop petition step 3202 to a step 3204. In step 3204, engine 132B creates a new, empty list of telenames. The telenames of the list created in step 3204 are telenames of petitioned agents which have rejected a meeting with the requesting agent. The list is initially empty as initially no petitioned agent has rejected a meeting with the requesting agent.

Processing transfers from step 3204 to a find petitioned agent step 3206 in which the engine carrying out performance of operation "meet", e.g., engine 132B (FIG. 15E), finds a petitioned agent, i.e., an agent which satisfies petition 3106 (FIG. 31A), whose telename is not an item of the list of telenames created in step 3204 (FIG. 32). An agent satisfies petition 3106 (FIG. 31A) as follows.

As described in greater detail in Appendix A, petition 3106 includes a property "agentName" and a property "agentClass" (neither shown). Both properties "agentName" and "agentClass" are optional and can therefore each be a nil. If property "agentName" of petition 3106 is a telename and property "agentClass" is nil, a petitioned agent is an agent whose telename is specified by the telename that is property "agentName" of petition 3106. If property "agentClass" is a citation and property "agentName" is nil, a petitioned agent is an agent which is a member of a class specified by the citation that is property "agentClass" of petition 3106. If neither property is nil, a petitioned agent is an agent which satisfies both criteria. If both properties are nil, an exception of class "Meeting Invalid" is thrown, causing operation "meet" to fail.

Processing transfers from find petitioned agent step 3206 to test step 3208 in which engine 132B determines whether a petitioned agent is found in find petition agent step 3206. If no petitioned agent is found in find petitioned agent step 3206, processing transfers from test step 3208 to a wait step 3222 which is described below. Conversely, if a petitioned agent is found in find petitioned agent step 3206, processing transfers from test step 3208 to a meeting step 3210.

In meeting step 3210, the petitioned agent is requested to perform operation "meeting" by engine 132B which is interpreting meeting place 220B. In performing operation "meeting", the petitioned agent agrees or refuses to participate in a meeting with agent 150A. Operation "meeting" is discussed further below and in Appendix A.

After performance of operation "meeting" by the petitioned agent, processing transfers from meeting step 3210 to test step 3212. In test step 3212, engine 132B determines whether operation "meeting" completed successfully, indicating that the petitioned agent agrees to the meeting. If the petitioned agent refuses the meeting, i.e., processing transfers from test step 3212 to a first fully qualified test step 3234, which is described below. Conversely, if the petitioned agent agrees to the meeting, i.e., if operation "meeting" completed successfully, processing transfers from test step 3212 to a build contact step 3216.

In build contact step 3216, a contact 3108 (FIG. 31B), whose subject is the petitioned agent, is created. Processing transfers from build contact step 3216 (FIG. 32) to a push contact step 3218 in which contact 3108 (FIG. 31B) is pushed on to stack 3102, thereby producing contact 3108 as a result. Processing transfers from push contact step 3218 to terminal step 3220 in which operation "meet" completes successfully.

However, as discussed above, if the petitioned agent throws an exception in performance of operation "meeting", thereby refusing to meet with agent 150A, processing transfers from test step 3212 to first fully qualified test step 3234. In first fully qualified test step 3234, engine 132B determines whether petition 3106 (FIG. 31A) is fully qualified. Petition 3106 is fully qualified if the telename that is property "agentName" of petition 3106 is fully qualified. A telename includes both a property "authority" and a property "identity". Telenames are described more completely in Appendix A. Property "identity" of a telename is optional, i.e., can be a nil. If property "identity" of a telename is nil, the telename is partially qualified and denotes all named objects of the authority that is property "authority" of the telename. On the other hand, if property "identity" of a telename is not nil, the telename is fully qualified and denotes exactly zero or one named object.

In first fully qualified test step 3234 (FIG. 32), engine 132B determines whether petition 3106 (FIG. 31A) is fully qualified. If petition 3106 (FIG. 31A) is fully qualified, processing transfers from first fully qualified test step 3234 to terminal step 3236 in which an exception of class "Meeting Denied" is thrown, causing operation "meet" to fail. Thus, if petition 3106 (FIG. 31A) is fully qualified and the one agent which satisfies petition 3106 rejects the meeting, operation "meet" fails. On the other hand, if petition 3106 is not fully qualified, processing transfers from first fully qualified test step 3234 to an add agent to list step 3214.

In add agent to list step 3214, the petitioned agent found in find petitioned agent step 3206 is added to the list of telenames created in step 3204. Processing transfers from add agent to list step 3214 to find petitioned agent step 3206.

As discussed above, if no petitioned agent is found in find petitioned agent step 3206, processing transfers from test step 3208 to wait step 3222. In wait step 3222, interpretation of agent 150A is suspended until petition 3106 (FIG. 31A) expires or until an agent enters meeting place 220B, i.e., until meeting place 220B successfully performs operation "entering". As described more completely in Appendix A, petition 3106 includes a property "maximumWait" which defines a maximum amount of time that can elapse from the start of performance of operation "meet" before operation "meet" must conclude, either successfully or otherwise. Petition 3106 expires when the amount of time specified in property "maximumWait" has passed since the start of performance of operation "wait".

When petition 3106 expires or when an agent enters meeting place 220B, interpretation of agent 150A resumes and processing transfers from wait step 3222 (FIG. 32) to a timeout test step 3224. In timeout test step 3224, engine 132B (FIG. 15E) determines whether resumption of interpretation of agent 150A (FIG. 31A) results from expiration of petition 3106. If interpretation of agent 150A is resumed as a result of the expiration of petition 3106 (FIG. 31A), processing transfers from timeout test step 3224 (FIG. 32) to terminal step 3226 in which an exception of class "Petition Expired" is thrown, causing operation "meet" to fail.

On the other hand, if interpretation of agent 150A (FIG. 31A) is resumed as a result of an agent entering place 220B, processing transfers from timeout step 3224 to test step 3228. In test step 3228, engine 132B (FIG. 15E) determines whether the entering agent (not shown) is petitioned, i.e., satisfies petition 3106 (FIG. 31A), and is not on the list of telenames created in step 3204 (FIG. 32). If the entering agent does not satisfy petition 3106 (FIG. 31A) or if the telename of the entering agent is an item of the list of telenames created in step 3204 (FIG. 32), processing transfers from test step 3228 to wait step 3222.

If, on the other hand, the entering agent satisfies petition 3106 (FIG. 31A) and the telename of the entering agent is not an item of the list of telenames created in step 3204 (FIG. 32), processing transfers from test step 3228 to a second meeting step 3230. In second meeting step 3230, the entering agent is directed to perform operation "meeting". Processing transfers from second meeting step 3230 to test step 3232 in which engine 132B (FIG. 15E) determines whether performance of operation "meeting" by the entering agent succeeded, the entering agent thereby accepting a meeting with agent 150A, or failed, the entering agent thereby rejecting a meeting with agent 150A.

If performance of operation "meeting" by the entering agent succeeds, processing transfers from test step 3232 to build contact step 3216. As described above, in build contact step 3216 and the steps that follow, a contact to the petitioned, i.e., entering, agent is built, the contact is pushed on to the current stack, and operation "meet" completes successfully. If, on the other hand, performance of operation "meeting" by the entering agent throws an exception, processing transfers from test step 3232 to a second fully qualified test step 3238.

In second fully qualified test step 3238, engine 132B (FIG. 15E) determines whether petition 3106 (FIG. 31A) is fully qualified. If petition 3106 is fully qualified, processing transfers from second fully qualified test step 3238 (FIG. 32) to terminal step 3240 in which an exception of class "Meeting Denied" is thrown, causing operation "meet" as performed by meeting place 220B to fail.

Conversely, if petition 3106 (FIG. 31A) is not fully qualified, processing transfers from second fully qualified test step 3238 to a second add agent to list step 3242. In second add agent to list step 3242, the telename of the petitioned, i.e., entering, agent is added to the list of telenames created in step 3204. Processing transfers from second add agent to list step 3242 to wait step 3222 which is described above.

Thus, a meeting is arranged between agent 150A and a petitioned agent (i) which is of the name and class specified by petition 3106, (ii) which occupies the responding meeting place, and (iii) which agrees to the meeting within the maximum time period specified in petition 3106. The last condition permits a first agent to request a meeting with a second agent which does not occupy the meeting place occupied by the first agent but which is expected to arrive at the meeting place within a certain amount of time.

Immediately following performance of operation "meet" (FIG. 31B), stack 3102 contains, at its top, contact 3108, as described above. Contact 3108 includes a property "subject" which is a reference to agent 150B (FIG. 15E). Property "subject" of contact 3108 (FIG. 31B) is produced by querying attribute "subject" of contact 3108. Attribute "subject" of a contact is described in greater detail in Appendix A. Thus, agent 150A obtains a reference to agent 150B (FIG. 15E) and is therefore capable of requesting that agent 150B perform features.

As discussed below in the context of operation "meeting", agent 150B consumes, as an argument in performance of operation "meeting", a contact which identifies agent 150A as the agent requesting a meeting. After performance of operation "meet" by meeting place 220B, the contact consumed by agent 150B includes a property "subject" which is a reference to agent 150A. Thus, agent 150B obtains a reference to agent 150A and is capable of requesting that agent 150A perform features.

Figure 33:
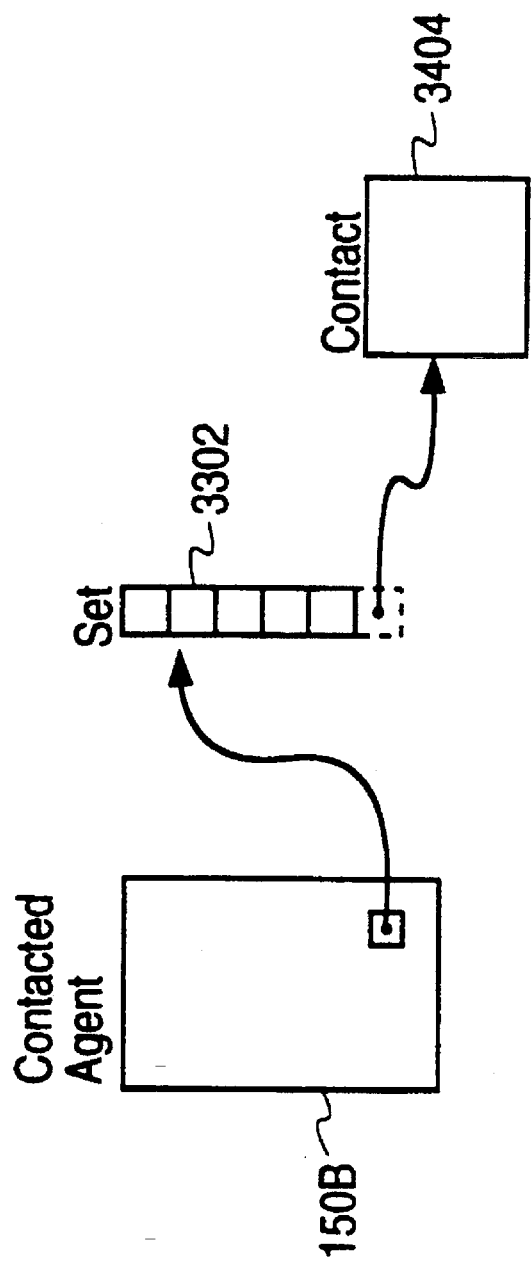
FIG. 33 shows a portion of the state of an agent process including a set of contacts.

An agent, which is contacted, is a member of a class which inherits from mix-in class "Contacted". As described more fully in Appendix A below, mix-in class "Contacted" defines attribute "contacts" which provides access to property "contacts". Property "contacts" is a set of contacts. Agent 150B (FIG. 33) is a contacted agent and therefore includes property "contacts", which is set 3302. After performance of operation "meet" by meeting place 220B as described above, contact 3404, which is the contact consumed in performance of operation "meeting" by agent 150B, is added to set 3302 by engine 132B.

Consent of the Petitioned Agent: Operation "Meeting"

As discussed above, a petitioned agent agrees or refuses to meet with an agent requesting a meeting by performance of operation "meeting" by the petitioned agent. Operation "meeting" is not defined or inherited by class "Agent". Instead, operation "meeting" is defined by mix-in class "Petitioned". Class "Agent" is not a subclass of mix-in class "Petitioned", but subclasses of class "Agent", which are subsequently defined by users of the present invention, can be subclasses of mix-in class "Petitioned". Thus, only agents which are members of such user-defined subclasses can perform operation "meeting" and can therefore participate in meetings with other agents.

Figure 34B:
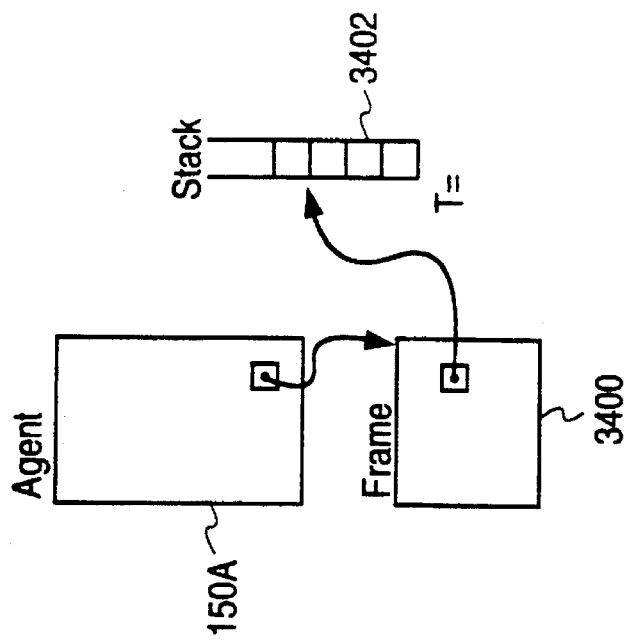
FIGS. 34A and 34B show the state of a process immediately preceding and following, respectively, performance of operation "meeting".
Figure 34A:
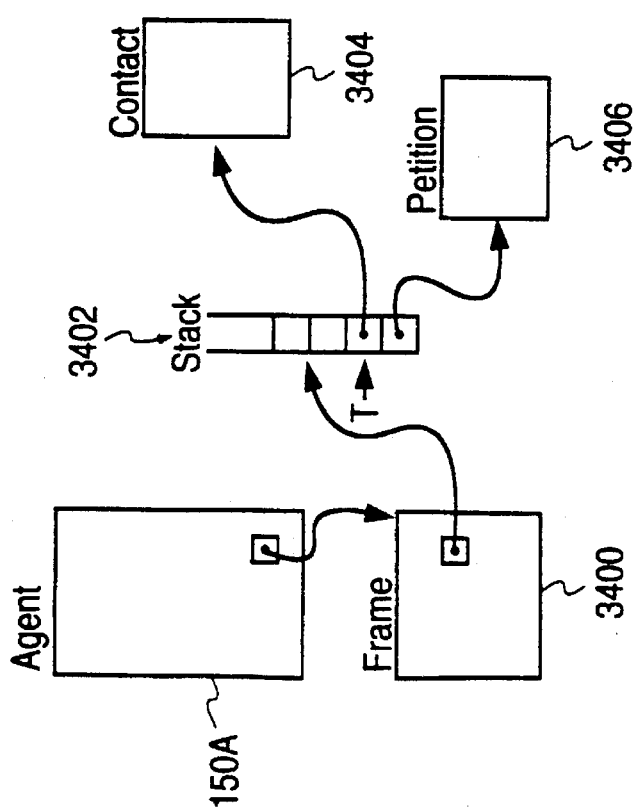

FIG. 34A shows the execution state of agent 150A immediately prior to performance of operation "meeting" by agent 150B. Frame 3400 is a part of the execution state of agent 150A and records the dynamic state of operation "meeting" as performed by agent 150B. Operation "meeting" is requested by engine 132B; the performance of "meeting" is recorded in the execution state of agent 150A. The permit of either agent 150A or agent 150B, perferably agent 150B, may be debited by performance of operation "meeting". Agent 150B (FIG. 15E) is identified within engine 132B as the responder of operation "meeting".

Stack 3402 is property "stack" of frame 3400 and is the current stack. Immediately prior to performance of operation "meeting", stack 3402 contains, from top to bottom, contact 3404 and petition 3406.

Contact 3404 identifies agent 150A as the agent requesting a meeting. Property "subjectName" (not shown) of contact 3404 is a telename which is equivalent to the telename of agent 150A, thereby identifying agent 150A as the requesting agent. Property "subjectClass" (not shown) of contact 3404 is a citation identifying the class of which agent 150A is an instance. Property "subject" (not shown) of contact 3404, which is normally a reference to agent 150A, is made nil by engine 132B. Thus, agent 150B, by consuming contact 3404 in performance of operation "meeting", has all the information necessary to properly identify agent 150A as the agent requesting the meeting, but has no reference to agent 150A and therefore has no way to interact with agent 150A. In this way, neither agent can interact with the other until both have agreed to the meeting.

Petition 3406 is a copy of petition 3106 (FIG. 31A) supplied by agent 150A (FIG. 15E) in requesting the meeting, as this argument is passed "byCopy". Passing an argument "byCopy" is discussed in greater detail below and in Appendix A.

Agent 150B agrees to the meeting defined by petition 3406 (FIG. 34A) with the agent identified by contact 3404 by performing operation "meeting" successfully. The meeting is refused by throwing an exception, thereby causing operation "meeting" to fail. The method for operation "meeting", as defined by mix-in class "Petitioned", never succeeds and always throws an exception of class "Meeting Denied". However, subsequently defined subclasses of class "Agent", which inherit from mix-in class "Petitioned" can redefine the implementation of operation "meeting" so as to succeed under certain circumstances.

Figure 35:
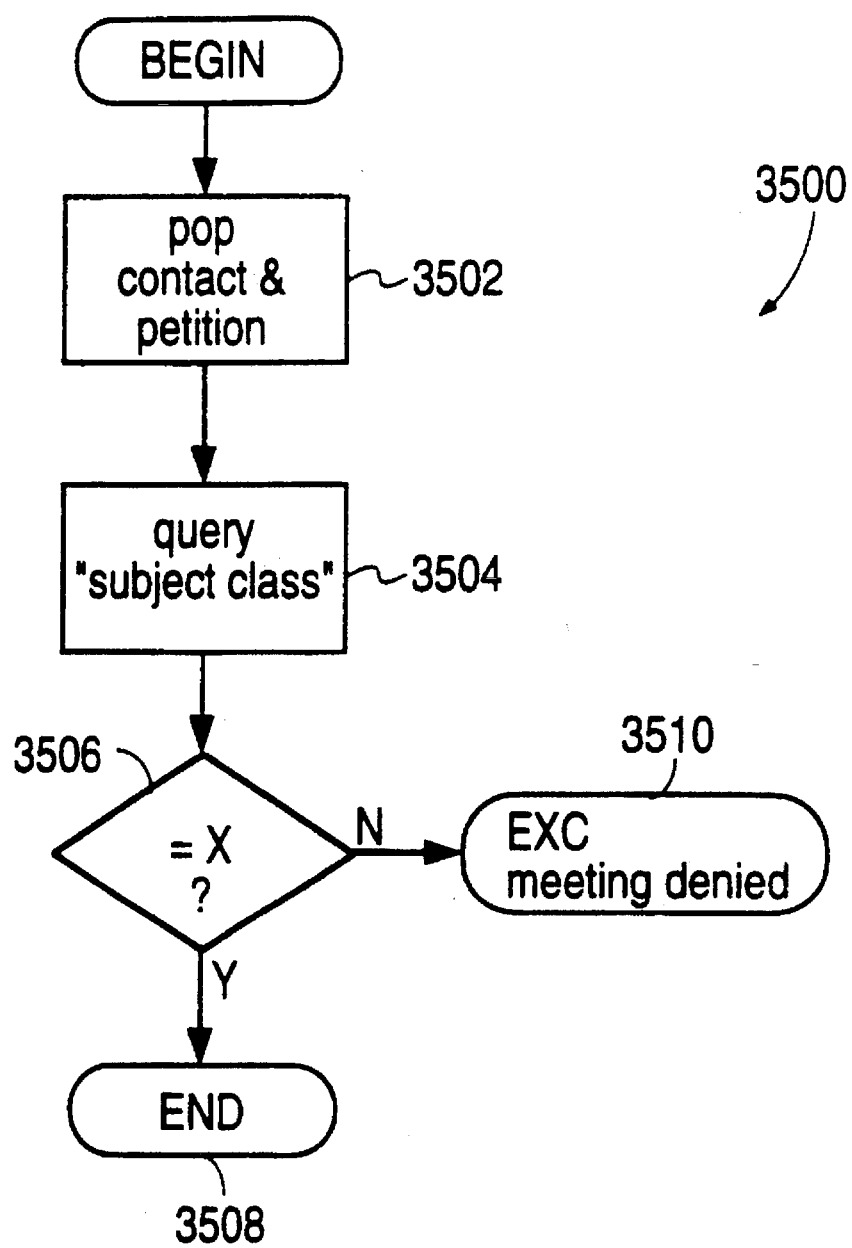
FIG. 35 is a logic flow diagram illustrating the steps taken in performance of operation "meeting" in accordance with one embodiment of the present invention.

Since agents are anticipated to serve a wide variety of needs and to perform a wide variety of services, the number of subclasses of class "Agent" and the variations of methods for operation "meeting" are quite large. For example, logic flow diagram 3500 (FIG. 35) shows one such method for operation "meeting". In step 3502, contact 3404 (FIG. 34A) and petition 3406 are popped from stack 3402. Processing transfers from step 3502 (FIG. 35) to step 3504 in which attribute "subjectClass" of contact 3404 (FIG. 34A) is queried, thereby producing property "subjectClass" of contact 3404. Processing transfers from step 3504 (FIG. 35) to a test step 3506, in which property "subjectClass" of contact 3404 (FIG. 34A) is compared to the citation of a specific class. If property "subjectClass" of contact 3404 is equal to the citation, processing transfers from test step 3506 (FIG. 35) to terminal step 3508. In terminal step 3508, operation "meeting" completes successfully and the meeting is thereby agreed to. Otherwise, if property "subjectClass" of contact 3404 (FIG. 34) is not equal to the citation, processing transfers from test step 3506 (FIG. 35) to terminal step 3510 in which an exception of class "Meeting Denied" is thrown causing operation "meeting" to fail, thereby rejecting a meeting with the agent identified by contact 3404 (FIG. 34A).

As discussed above, contact 3404, which identifies agent 150A and is supplied to agent 150B (FIG. 15E) as an argument in requesting performance of operation "meeting", contains no reference to agent 150A. Instead, property "subject" of contact 3404 (FIG. 34A) is nil. Once a meeting is successfully arranged by performance of operation "meet" by meeting place 220B (FIG. 15E) as described above, engine 132B modifies property "subject" of contact 3404 (FIG. 34A) to be a reference to agent 150A.

Thus, the full generality and data processing capabilities of the computer instruction set described in Appendix A can be used to apply sophisticated logic, processing substantial amounts of data, to determine with which agents and under what circumstances specific agents are configured to agree to a meeting.

FIG. 34B shows the state of frame 3400 immediately following performance of operation "meeting" by agent 150B (FIG. 15E). Stack 3402 (FIG. 34B) is empty as operation "meeting" produces no result. The access of operation "meeting" is "system"; only an engine is capable of requesting operation "meeting". It should be noted that operation "meeting" defined by mix-in class "Petitioned" is distinct and separate from operation "meet" defined by class "Meeting Place" which is discussed above and in Appendix A.

Terminating Interaction Between Agents: Operation "Part"

Figure 36:
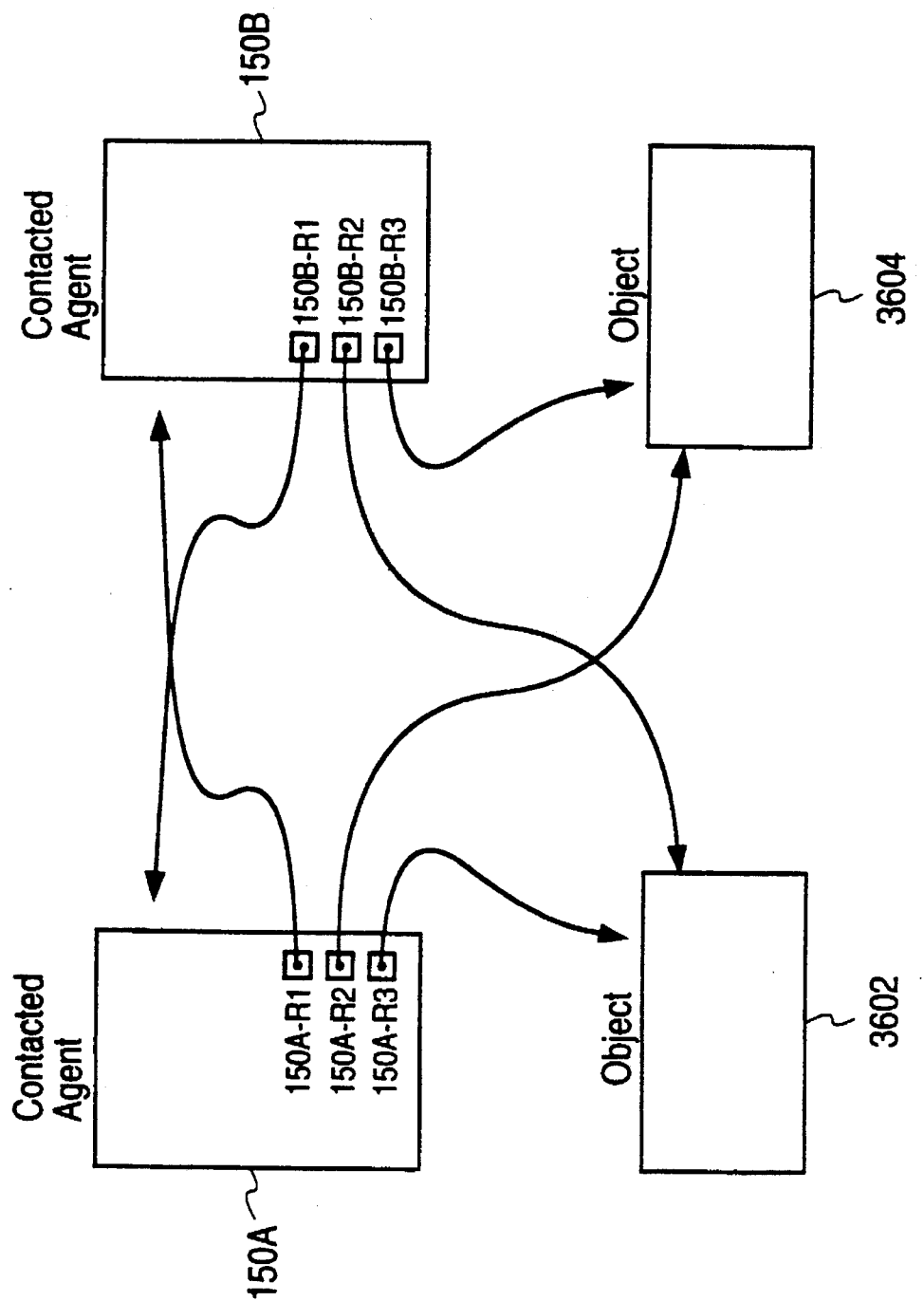
FIG. 36 shows the state of two agent processes which are interacting in accordance with an aspect of the present invention.

As described above, two agents exchange references to each other and to objects owned by either agent during the course of a meeting between the two agents. Terminating interaction between the agents requires ensuring that neither agent contains a reference to the other agent or references to objects owned by the other agent. Either agent participating in a meeting between two agents occupying a meeting place can terminate the meeting by requesting performance of operation "part" by the meeting place. Agents 150A and 150B which occupy meeting place 220B and which are interpreted by engine 132B (FIG. 15E), are shown in FIG. 36. Agent 150A has obtained reference 150A-R1 to agent 150B, and agent 150B has obtained reference 150B-R1 to agent 150A, by the successful performance of operation "meet" by meeting place 220B. Object 3602 is owned by agent 150A. Similarly, object 3604 is owned by agent 150B. FIG. 36 shows the state of agents 150A and 150B after agents 150A and 150B have interacted and exchanged references to objects 3602 and 3604. By giving to agent 150B a reference to object 3602, agent 150A grants agent 150B access to object 3602. Such access by references 150B-R1 and 150B-R2 enables agent 150B to issue instructions to engine 132B which cause agent 150A and object 3602, respectively, to take action in accordance with the instructions issued. Similarly, agent 150B gives to agent 150A reference 150A-R2 to object 3604, thereby granting to agent 150A similar access to object 3604.

Agent 150A contains references 150A-R1, 150A-R2 and 150A-R3 to agent 150B, object 3604, and object 3602, respectively. References 150A-R1, 150A-R2 and 150A-R3 are (i) contained either within a stack or within a list of variables (neither shown) of a frame (also not shown) which is part of the execution state of agent 150A or (ii) stored as a property, or as a component of a property, of agent 150A. The execution state of an agent is discussed in detail below. Agent 150B similarly contains references 150B-R1, 150B-R2 and 150B-R3 to agent 150A, object 3602, and object 3604, respectively. By giving to agent 150A reference 150A-R2 to object 3604, agent 150B allows agent 150A (i) to request that object 3604 perform an operation or (ii) to copy a portion or all of object 3604.

Figure 37B:
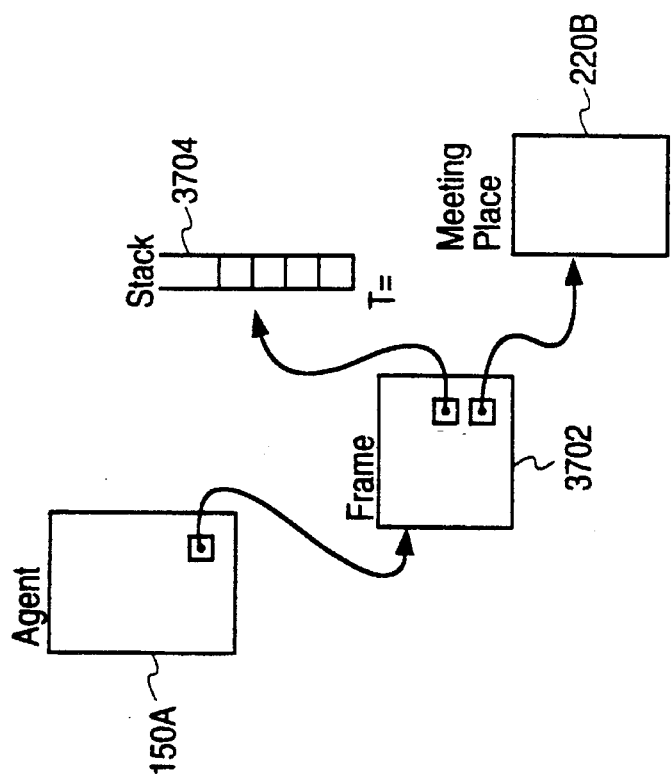
FIGS. 37A and 37B show a portion of the state of an agent process immediately preceding and following, respectively, performance of operation "part".
Figure 37A:
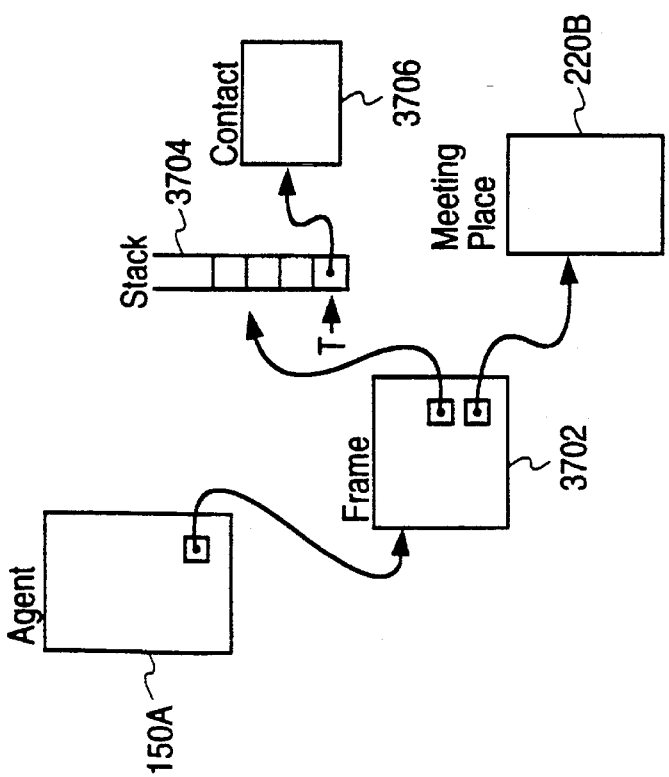

Either agent 150A or agent 150B is capable of terminating the interaction between agents 150A and 150B by requesting that meeting place 220B perform operation "part". For illustration purposes, agent 150A is the agent which requests that meeting place 220B perform operation "part". FIGS. 37A and 37B illustrate the state of agent 150A immediately prior to and following, respectively, performance of operation "part" by meeting place 220B. Frame 3702 is a part of the execution state of agent 150A and records the state of operation "part" as performed by meeting place 220B. Meeting place 220B is property "responder" of frame 3702 and is therefore the responder of operation "part". Stack 3704 is property "stack" of frame 3702, which is also part of the execution state of agent 150A, and is the current stack.

At the top of stack 3704 is contact 3706. Contact 3706 identifies agent 150B as the agent from which agent 150A is to part. Engine 132B (FIG. 15E), in carrying out performance of operation "part" on behalf of meeting place 220B, directs agent 150B to perform operation "parting". Agent 150B consumes as the sole argument a contact identifying agent 150A as the agent with whom agent 150B is parting. Property "subject" of the contact, which is usually a reference to agent 150A is voided by engine 132B prior to requesting operation "parting" so that agent 150B is not left with a reference to agent 150A after the meeting is terminated.

In performing operation "parting", agent 150B produces no result. The dynamic state of performance of operation "parting" is not part of the execution state of either agent 150B (FIG. 15E) or agent 150A, but is instead part of the execution state of an engine process. Any exception thrown by performance of operation "parting" is not experienced by, and therefore has no effect upon, either agent 150B or agent 150A. In performing operation "parting", agent 150B is notified that agent 150A has terminated the meeting between agents 150A and 150B. If agent 150B is a contacted agent, the item of property "contacts" of agent 150A that is the contact referencing agent 150A is removed from property "contacts" of agent 150B. The access of operation "parting" is "system"; therefore, only engine 132B can request that agent 150B perform operation "parting".

FIG. 37B illustrates the state of agent 150A immediately following performance of operation "part" by meeting place 220B. Stack 3704 is empty as operation "part" produces no result.

Terminating a meeting between agents 150A and 150B voids all references in agent 150A to agent 150B and all objects owned by agent 150B. For example, in FIG. 38, reference 150A-R1 that previously identified agent 150B and reference 150A-R2 that previously identified object 3604 are voided. Similarly, reference 150B-R1 that previously referenced agent 150A and reference 150B-R2 that previously referenced object 3602 are voided within agent 150B as well. Thus, agents 150A and 150B are no longer capable of exchanging information. If agents 150A and 150B are contacted agents, a contact identifying agent 150A is removed from property "contacts" of agent 150B, and a contact identifying agent 150B is removed from property "contacts" of agent 150A.

Applicability of the Present Invention to Large, Wide-Area Networks

Thus far, a communications system is disclosed in which agent 150A (FIG. 15A) transports itself, or a clone of itself, to meeting place 220B, which is occupied by agent 150B, by performance of operation "go" or operation "send", respectively. Agent 150A then requests performance of operation "meet" by meeting place 220B to arrange a meeting between agent 150A and agent 150B. During the meeting, agents 150A and 150B are capable of exchanging information as described in greater detail below.

While the foregoing discussion pertains to a very simple use of the present invention, much more general uses can be made of the present invention. Through application of the set of computer instructions described herein and in Appendix A, an agent is capable of applying sophisticated and complex logic to determine to what places to transport itself and with which other agents and places to meet and exchange information.

Additionally, the present invention is not limited to networks of two or three computer systems, as described herein, and as previously stated, the present invention is not limited to homogenous networks. The set of computer instructions described herein and in Appendix A can be used to create and position places throughout a large area network such that agents can be created which travel throughout the large area network. As the disclosed instruction set can be implemented in heterogenous networks, the wide area network can include a wide variety of computer systems including large, mainframe computers; local area networks; and small personal computers through which an agent in the wide area network can travel.

Furthermore, while a meeting is defined as an interaction between two agents, an agent is capable of participating in any number of meetings simultaneously and is therefore capable of interacting with a multitude of agents simultaneously, as long as those agents occupy the same meeting place occupied by the first-mentioned agent.

Interaction between Agents: Introduction to the Execution Model

During a meeting between agent 150A and agent 150B, agent 150A (FIG. 15E) interacts with agent 150B by issuing an instruction directing agent 150B to perform a feature. The following describes the mechanism by which performance of a feature is requested; this mechanism is discussed in greater detail below and in Appendix A.

An execution state is associated with each process. As discussed above in the Glossary of Terms, each method has a dynamic state during performance of the method. The execution state of a process includes one or more frames, each frame recording the dynamic state of a method which is part of the execution state of the process. Within each frame is a stack on to which arguments are pushed prior to requesting operations, and from which results are popped after performance of operations. The stack of the current frame is the current stack. The current frame is the frame which contains the computer instruction whose execution is currently being carried out by an engine.

Prior to requesting an operation, the requester pushes on to the current stack references to zero or more objects which are thereby supplied as arguments for the operation. The requester then pushes on to the current stack a reference to the responder. The responder is the object which is directed by the requester to perform the requested operation. Finally, the requestor requests the execution of an identifier which identifies the requested operation.

In carrying out performance of the requested operation, an engine pops an object from the top of the current stack, and the object is made the responder of the operation. A method implementing the operation is found within the classes of which the responder is a member and performed. In one embodiment, performance of the method (i) forms a new stack, (ii) pops the arguments of the operation from the current stack and pushes them on to the new stack, (iii) makes the new stack current, (iv) pops arguments from the new current stack, (v) pushes a result, if one is produced by the operation, on to the new current stack, and (vi) pops the result, if any, from the new current stack and pushes the result, if any, on to the previously current stack. The execution of operations, and features in general, is discussed in greater detail below and in Appendix A.

The following example illustrates the mechanism by which operations are requested. As discussed above, during the course of a meeting, agent 150A interacts with agent 150B by directing agent 150B to perform an operation. Agent 150A grants agent 150B access to objects contained within agent 150A by supplying those objects as arguments to the operation requested. Agent 150B grants agent 150A access to an object contained within agent 150B by producing that object as a result of the requested operation.

FIGS. 39A–39F illustrate an example of agent 150A (FIG. 15E, not shown in FIGS. 39A–39F) interacting with and passing information to agent 150B.

Figures 39A, 39B, 39C, 39D:
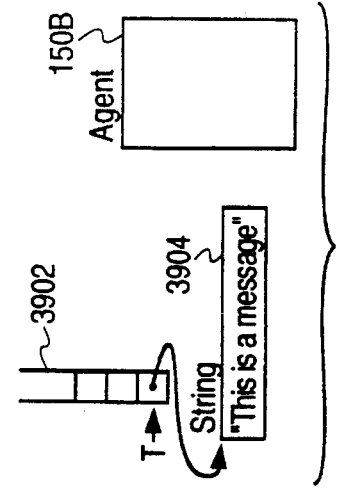
FIGS. 39A–39F show a portion of the state of a first agent process during interaction with a second agent process in accordance with the present invention.

FIG. 39A shows empty stack 3902. Stack 3902 is the current stack of the execution state of agent 150A (not shown). While FIG. 39A shows stack 3902 as being empty, such need not be the case. However, no objects on stack 3902 in FIG. 39A are affected by this example. String 3904 whose text is "this is a message" is pushed on to stack 3902 (FIG. 39B). A reference to agent 150B is pushed on to stack 3902 (FIG. 39C).

Agent 150A next executes an identifier whose text is "store" and which references an operation "store". In execution of the identifier, an object, i.e. agent 150B, is popped from stack 3902 and the object is directed to perform operation "store" (FIG. 39D). In this example, operation "store" is defined for a class of which agent 150B is a member and whose method is represented by logic flow diagram 4000 (FIG. 40).

Figure 40:
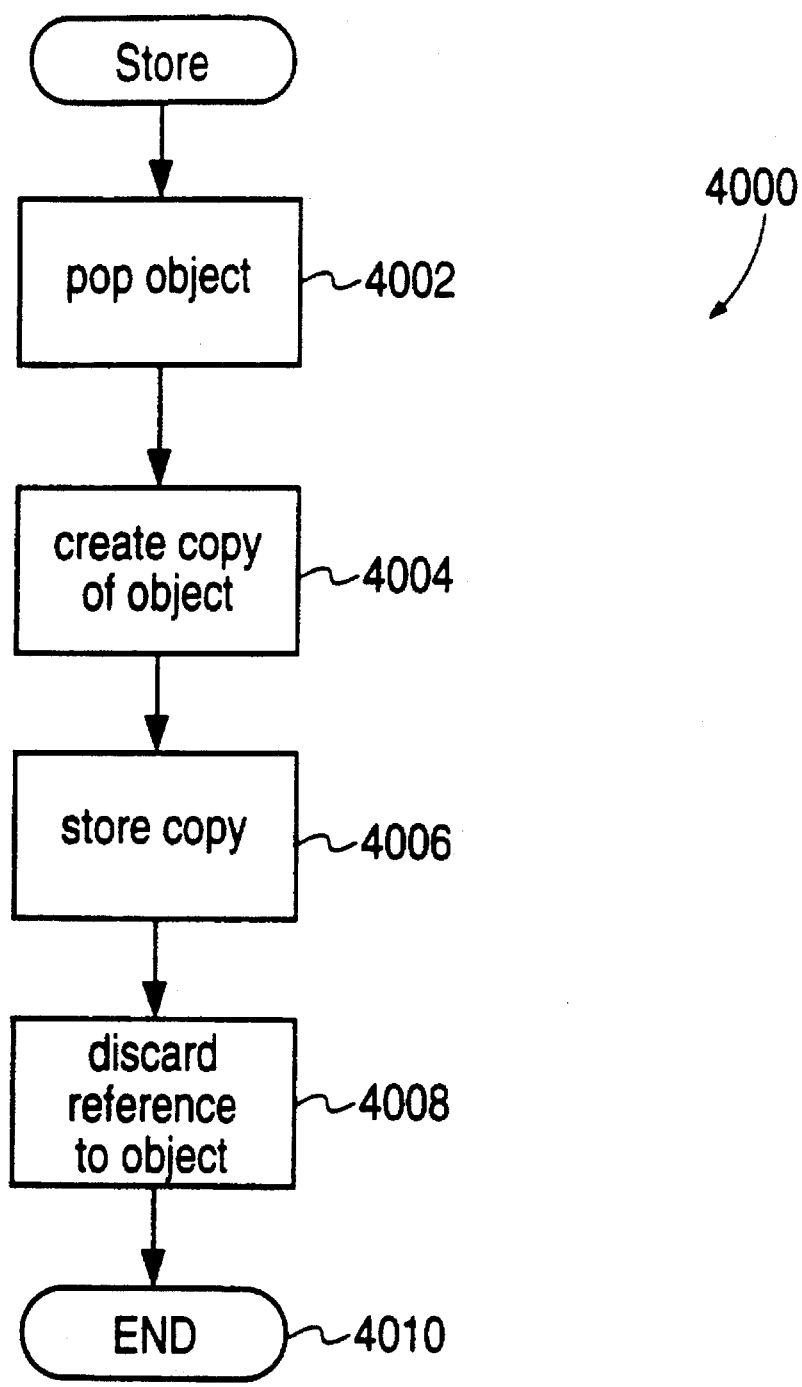
FIG. 40 is a logic flow diagram illustrating steps taken by the second agent process during the interaction shown in FIGS. 39A–39F according to one embodiment of the present invention.

In performing operation "store", agent 150B pops string 3904 from stack 3902 in step 4002 (FIG. 40). Although agent 150B is described as performing operation "store", the frame (not shown) which records the dynamic state of agent 150B's performance of operation "store" is part of the execution state of agent 150A (not shown). The charges allowance, i.e., property "charges", of the permit of agent 150A is therefore debited for processing resulting from performance of operation "store" by agent 150B. Agent 150B is the object performing operation "store" since (i) the execution state of agent 150A (not shown) identifies agent 150B as the responder and since (ii) the method of operation "store" is provided by a class of which agent 150B is a member and (iii) the internal state of agent 150B provides a context within which operation "store" is performed.

Figure 39E:
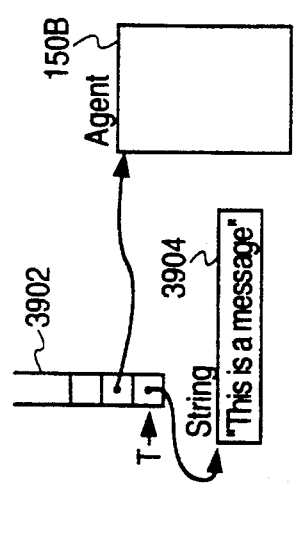
Figure 39F:
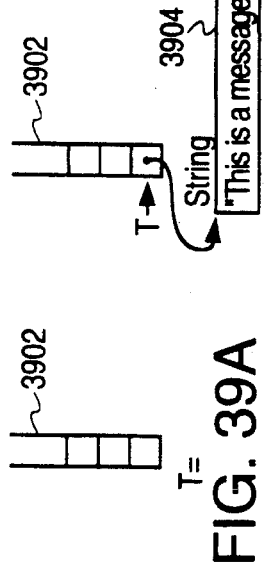

Processing transfers from step 4002 to step 4004 in which string 3904-C, which is a copy of string 3904, is created, resulting in the state shown in FIG. 39E. Strings 3904 and 3904-C are contained within frame 3906 which is part of the execution state of agent 150A and which records the dynamic state of operation "store" as performed by agent 150B. Processing transfers from step 4004 to step 4006 (FIG. 40) where agent 150B stores string 3904-C. Processing transfers from step 4006 to step 4008 in which agent 150B discards string 3904, which was popped from stack 3902. Processing transfers from step 4008 to terminal step 4010 in which operation "store" completes successfully. Step 4008 results in the state represented by FIG. 39F. Thus, agent 150A has successfully transferred information to agent 150B.

In this manner, agent 150A interacts with agent 150B by agent 150A requesting agent 150B to perform an operation, and agent 150A conveys to agent 150B objects as arguments to or results from operations requested or performed, respectively. While agent 150B is described as performing an operation at the request of agent 150A, it is reiterated here that performance of a feature by an object is, in actuality, performance of the feature by an engine in the context of that object defined by that object's internal state and class. The behavior of a particular feature can vary depending on the internal state of the object performing the feature, where the internal state of the object is defined in part by the object's properties.

Agent 150B can similarly transfer an object to agent 150A by pushing the object on to stack 3902, e.g., after step 4008 and before terminal step 4010. The object is popped from stack 4010 as a result of operation "store" by agent 150A. Furthermore, since agent 150B contains a reference to agent 150A, as discussed above with respect to operation "meet", agent 150B is similarly capable of directing agent 150A to perform an operation and of supplying to agent 150A objects as arguments to the operation.

Portability of the Computer Instruction Set of the Present Invention

A number of aspects of the present invention permit processes a great deal of mobility and versatility. First, the computer instruction set of the present invention is homogeneously implemented in a homogeneous or heterogenous network. Second, classes are objects of the computer instruction set so that classes can travel throughout the network with mobile processes. And third, the computer instruction set is interpreted.

Homogeneity of the Computer Instruction Set

As discussed above, an agent, which includes data and computer instructions, is capable of traveling from one computer system to another and of executing on whichever computer system the agent may be found. Furthermore, the network throughout which agents are capable of traveling can be either homogeneous or heterogeneous. In view of the mobility of agents, it is not always possible to determine exactly which computer system of the network executes each of the computer instructions forming the procedural portion of an agent. It is therefore important that each computer system of the network, throughout which agents can travel, supports the same computer instruction set.

Classes Represented as Objects in the Disclosed Computer Instruction Set

An agent executing within a first computer system is capable of creating new classes of objects which did not previously exist. The agent can then travel to an engine which is executing within a second computer system and interpretation of the agent, involving processing of members of the newly created class, continues within the second computer system. In such a case, the engine executing within the second computer system has never before encountered the newly created class or any members of that class. Therefore, classes are made objects of the disclosed instruction set so that classes are capable of traveling with agents from one computer system to another.

Class Structure

Several objects combine to define and represent a class: a class object, an identifier, and a class definition. Class objects, identifiers and class definitions are members of the respective classes "Class", "Identifier" and "Class Definition". Class objects, i.e., members of class "Class", are objects which represent a set of objects whose features have the same interface and implementation. The set of objects are the "instances" of the class. Class "Class" and class objects are discussed in greater detail below and in Appendix A.

Identifiers, i.e., members of class "Identifier", are used within an interface object or an implementation object to reference a class. It should be noted that identifiers reference other types of objects as well. Interface objects and implementation objects are discussed below in greater detail. A first identifier referencing a first class within a first interface object or implementation object is distinct from identifiers referencing all other classes within the first interface object or implementation object. However, a second interface object or implementation object can use an identifier equivalent to the first identifier to reference a second class.

An interface object and an implementation object together define a number of features, i.e., operations and attributes. The distinction between an attribute, in which case an object is directed to provide or alter a portion of the object's internal state, and an operation, in which case an object is directed to perform a number of computer instructions, serves primarily to aid in conceptualization of the present invention. Conceptually, an attribute is a special case of an operation. For example, querying an attribute of an object directs the object to perform computer instructions which cause the object to provide information regarding the internal state of the object.

It is reiterated here that performance of a feature by an object is, in actuality, performance of the feature by an engine in the context of that object defined by that object's internal state and class. The behavior of a particular feature can vary depending on the internal state of the object performing the feature, where the internal state of the object is defined in part by the object's properties.

A single identifier can simultaneously identify two separate features, each feature defined by a different class. For example, operation "add" is defined by class "Number" differently than by class "Dictionary". In selecting an interface and implementation, the engine carrying out performance of a feature selects the feature definition and associated method object appropriate for the class of object performing the feature. In other words, the feature definition is retrieved from the classes of which the responder is a member. A concrete class defining a feature defines both the feature's interface and the feature's implementation. An abstract class which defines a feature defines the feature's interface and can define the feature's implementation.

The "interface" of a feature defines the arguments consumed in performance of the feature as well as the result produced, if any. Additionally, the exceptions which can be produced by a feature are defined by the feature's interface. The interfaces of the features defined by a class are collectively represented and defined by an interface object, i.e., a member of class "Interface", which is property "interface" of a class definition object. Class "Interface" is discussed below in more detail.

A feature's implementation is defined by the feature's "method." A feature's method defines actions to be taken, i.e. computer instructions to be executed, in performance of the feature. A method object, a member of class "Method", is generally a sequence of instructions whose execution constitutes performance of the feature. The implementations of the features defined or inherited by a class are collectively represented and defined by an implementation object, i.e., a member of class "Implementation", which is property "implementation" of a class definition object. Class "Implementation" is discussed below in more detail.

Feature definitions are inherited from a class's superclasses. In other words, if a feature is defined for a particular class, that feature is also defined for that class's subclasses. However, a subclass is capable of redefining the implementation of the feature, superseding the implementation inherited from the superclass. However if the feature is "sealed" by a superclass of the subclass for which the feature is defined, the subclass cannot redefine the implementation inherited from the superclass.

The features defined by a class are defined by the class's class definition, a member of class "Class Definition". The class itself is represented by a class object, a member of class "Class". The class is referenced by an identifier, a member of class "Identifier".

A class is created by first creating a class definition, the structure of which is discussed in Appendix A. The class definition is directed to perform operation "makeClasses" to create an associated class object. The syntax and behavior of operation "makeClasses" is discussed in more detail in Appendix A. The particular form and structure or the formed class object is not essential so long as (i) the information contained within the class definition object is preserved and (ii) citation 4108 (FIG. 41A), interface object 4110, and implementation object 4112 can be derived from the class object. Condition (ii) is necessary for the encoding of a class object as described in Appendix B.

The engine carrying out performance of operation "makeClasses" on behalf of class definition 4100 (FIG. 41A), in one embodiment, forms class object 4102 (FIG. 41B) by replicating in class object 4102 the properties of class definition 4100. After performance of operation "make-Classes", class definition 4100 is discarded. The properties of class definition 4100 are discussed in greater detail below. As the properties of class definition 4100 are replicated in class object 4102, class object 4102 contains all of the information contained in class definition object 4100 and can derive the properties of class definition object 4100.

In another embodiment, processing efficiencies of compiled computer processes are realized by replicating information in citation 4108, interface object 4110 and implementation object 4112 to form citation structure 4108C (FIG. 41C), interface structure 4110C and implementation structure 4112C, respectively, within class object 4104. Computer processes which are formed of computer instructions which are compiled, rather than interpreted, are generally more efficient, i.e., perform a given task within a fewer number of CPU clock cycles, than computer processes whose instructions are interpreted. As discussed above, computer instructions are initially in human-intelligible source code. Before a computer instruction can be executed by a computer, the instruction must be translated into a computer-intelligible object code or machine code. As interpreted computer processes require such translation for each computer instruction executed, and as compiled computer processes do not require such translation during execution of a compiled computer process, compiled computer processes can be substantially more efficient than interpreted computer processes.

Figure 41A:
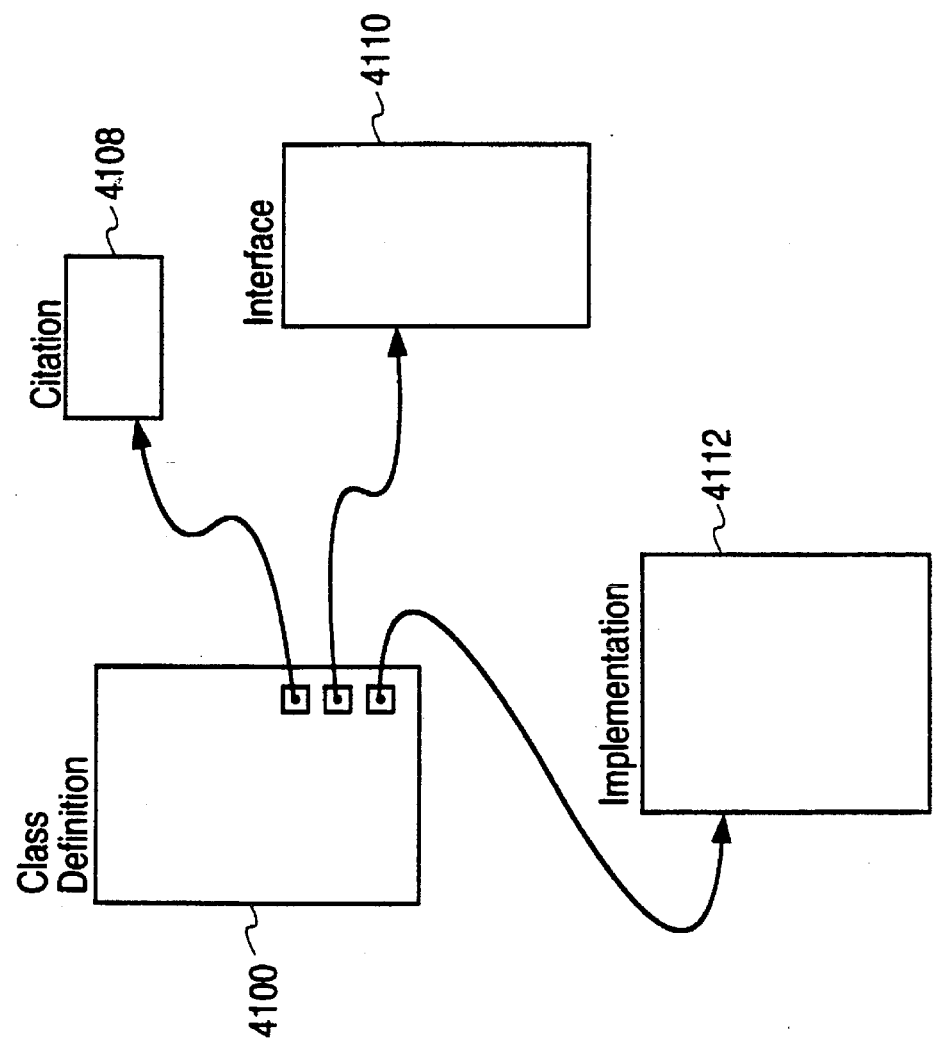
FIG. 41A shows the structure of a class definition in accordance with one aspect of the present invention.
Figure 41B:
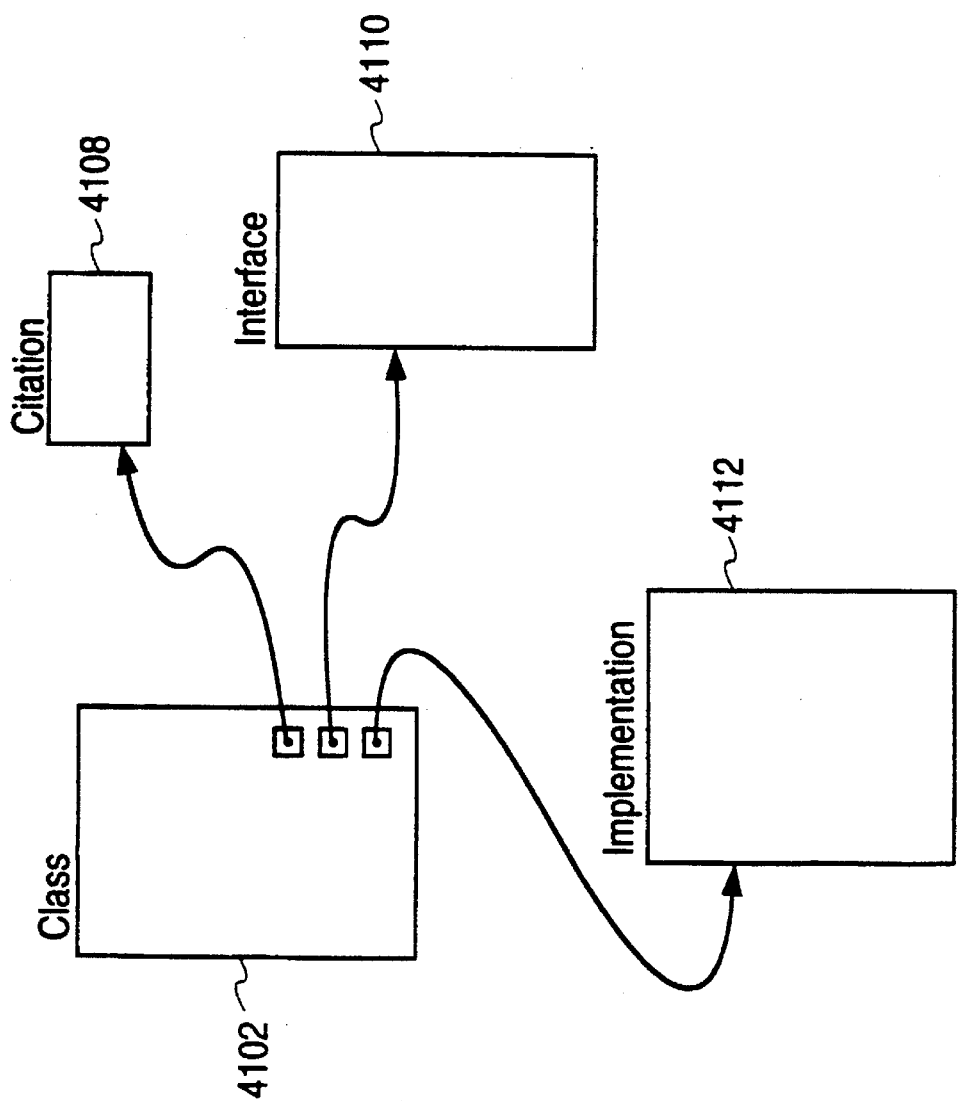
FIG. 41B shows the structure of a class object formed in accordance with one embodiment of the present invention.
Figure 41C:
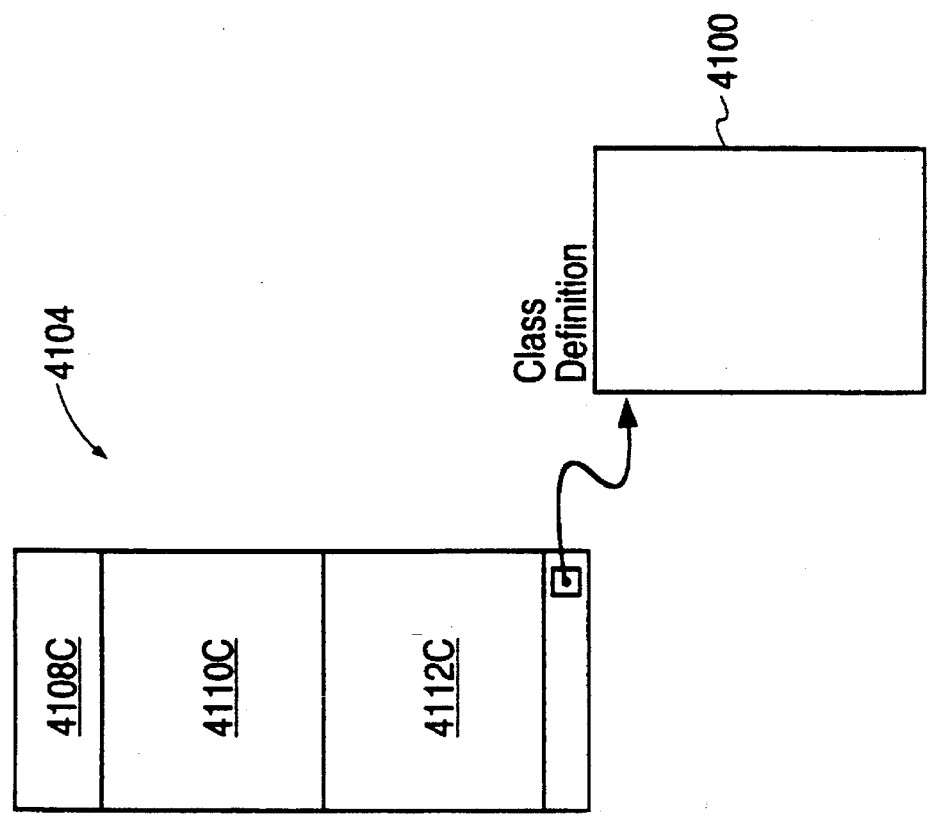
FIG. 41C shows the structure of a class object formed in accordance with a second embodiment of the present invention.

Citation structure 4108C, interface structure 4110C and implementation structure 4112C are objects which are analogous to citation 4108, interface object 4110 and implementation object 4112 and which are formed of compiled computer instructions such the computer instructions which collectively form the C++ programming language. By replicating the structures of citation 4108, interface object 4110, and implementation object 4112 (FIG. 41A) in class object 4104 (FIG. 41C) as citation structure 4108C, interface structure 4110C, and implementation structure 4112C, respectively, information regarding the class represented by class object 4104 can be retrieved substantially more efficiently than by retrieving the information from citation 4108, interface object 4110 and implementation object 4112 of class object 4102 (FIG. 41B). The information contained within citation structure 4108C (FIG. 41C), interface structure 4110C, and implementation structure 4112C is substantially equivalent to the information contained within the corresponding properties of class definition 4100 (FIG. 41A).

As the information contained within a class object is substantially equivalent to the information contained within the class definition from which the class object is derived, discussion of the structure of a class definition also describes the nature of the information contained within a class object.

Class Definition Objects

The features defined by a class are defined in the class definition object which defines the class. The structure of class definition object 4100 is shown in FIG. 41A. Class definition object 4100 includes properties "citation", "interface" and "implementation". Citation 4108 is property "citation" of class definition object 4100 and identifies the class defined by class definition object 4100 and further identifies the authority, title and edition of the class. The structure of a citation is discussed in greater detail below and in Appendix A.

Interface object 4110 and implementation object 4112 are, respectively, properties "interface" and "implementation" of class definition object 4100. Interface object 4110 defines the interfaces of the features defined by class definition object 4100, and implementation object 4112 defines the implementations of the features defined by class definition object 4100.

Interface objects

Figure 42:
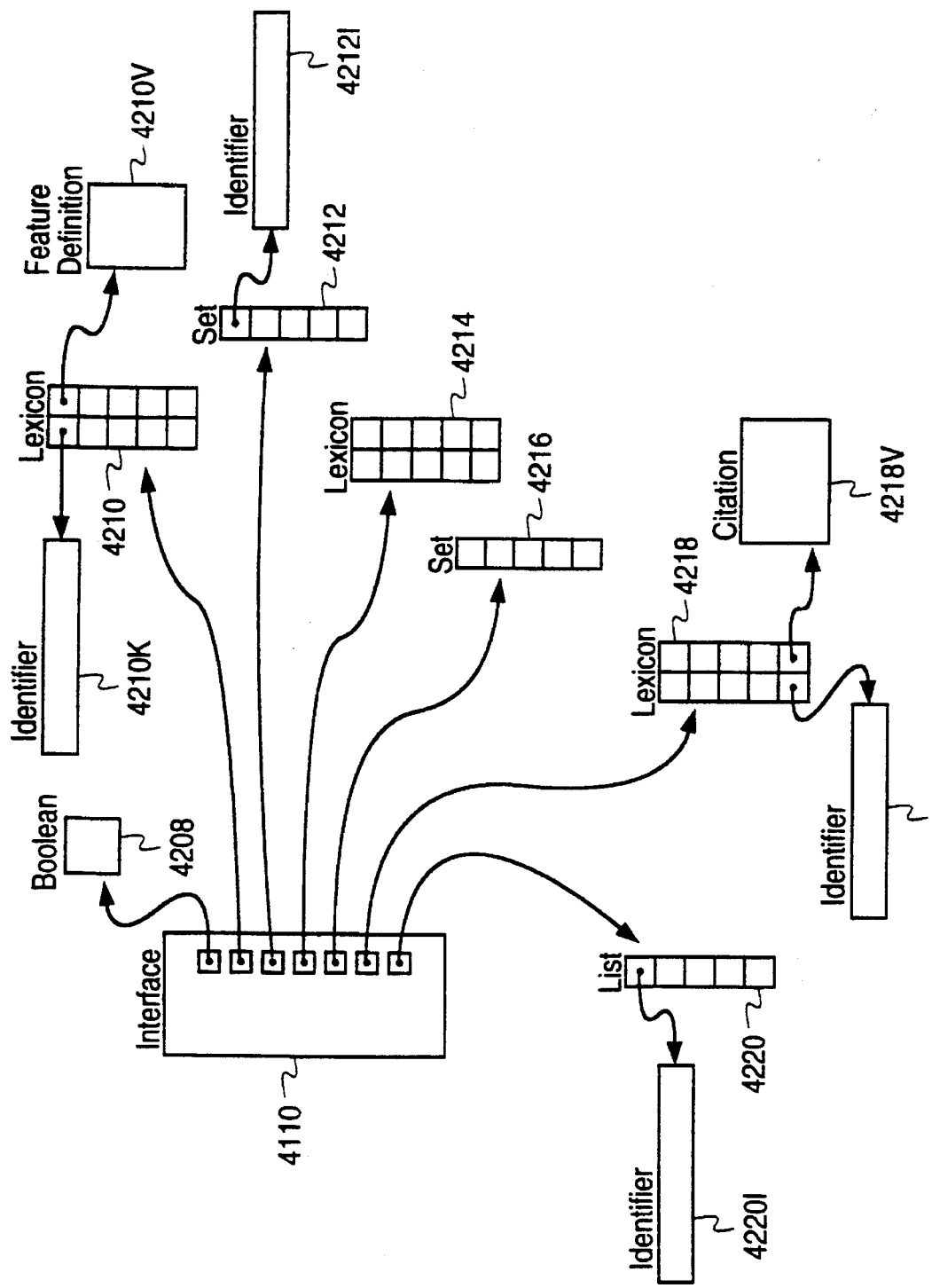
FIG. 42 shows the structure of an interface object formed in accordance with the present invention.

The structure of interface object 4110 is shown in FIG. 42. The properties of interface object 4110 include properties "isAbstract", "classFeatures", "sealedClassFeatures", "instanceFeatures", "sealedInstanceFeatures", "vocabulary" and "superclasses".

Boolean 4208 is property "isAbstract" of interface object 4110. If boolean 4208 is "true", the class, whose interface is interface object 4110, is abstract. The class is concrete otherwise.

Lexicon 4210 is property "classFeatures" of interface object 4110. Lexicon 4210 is a lexicon of the definitions of the "class features" of the class. The class features of a class are the features for which the class itself, i.e., the class represented by class definition object 4100 (FIG. 41A), is the responder. The keys of lexicon 4210 (FIG. 42), e.g., identifier 4210K, are identifiers which reference the class features. The values of lexicon 4210, e.g., feature definition 4210V, are feature definitions defining the class features. Feature definitions are discussed below in more detail.

Set 4212 is property "sealedClassFeatures" of interface object 4110. Set 4212 is a set of identifiers, e.g., identifier 4212I, which reference the class features which are sealed. Sealed features are features that subclasses are prevented from adapting. If a feature is not sealed, a subclass of the class represented by class definition object 4100 (FIG. 41A) can adapt the feature by redefining the feature's implementation.

Lexicon 4214 (FIG. 42) is property "instanceFeatures" of interface object 4110. Lexicon 4214 is a lexicon of the definitions of the "instance features" of the class. The instance features of a class are features for which members of the class are the responder. The keys of lexicon 4214 (FIG. 42) (no key or value of lexicon 4214 is shown) are identifiers referencing the instance features, and the values of lexicon 4214 are feature definitions defining the instance features.

Set 4216 is property "sealedInstanceFeatures" of interface object 4110. Set 4216 is a set of identifiers (not shown) which reference the instance features which are sealed.

Lexicon 4218 is property "vocabulary" of interface object 4110. Lexicon 4218 associates identifiers of user-defined classes which are referenced in interface object 4110 with citations of those classes. The keys of lexicon 4218 are identifiers, e.g., identifier 4218K, and the values of lexicon 4218 are corresponding citations, e.g., citation 4218V. Citations are discussed in greater detail below and in Appendix A. Property "vocabulary" of interface object 4110, i.e., lexicon 4218, is "the vocabulary" of interface object 4110 and of the class defined by class definition object 4100 (FIG. 41A).

List 4220 (FIG. 42) is property "superclasses" of interface object 4110. List 4220 is a list of identifiers, e.g., identifier 4220I, which reference classes. The classes referenced by identifiers of list 4220 are immediate interface superclasses of the class defined by class definition object 4100 (FIG. 41A). All but the last item of list 4220 (FIG. 42) must identify mix-in classes, and the last item of list 4220 must identify a flavor. The importance of the last item of list 4220 identifying a flavor is discussed below in more detail in conjunction with the selection of a method object in performing a feature and in conjunction with object initialization.

Feature Definitions

Figure 43:
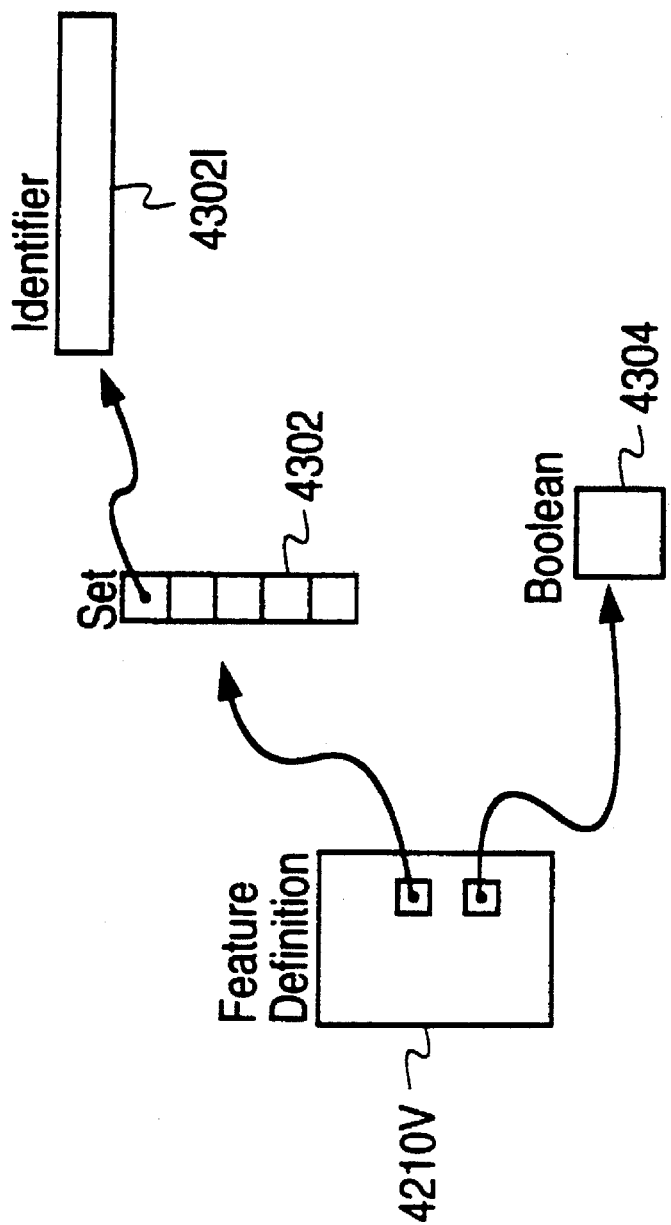
FIG. 43 shows the structure of a feature definition including a set, an identifier, and a boolean.

A feature definition, i.e., a member of class "Feature", is an object which defines the interface of a particular feature. The properties of feature definition 4210V (FIG. 43) include properties "exceptions" and "isPublic". Class "Feature" is abstract; therefore, feature definition 4210V is a member, not an instance, of class "Feature" and is either an operation definition or an attribute definition, both of which are described below and in Appendix A. Set 4302 is property "exceptions" of feature definition 4210V. Set 4302 is a set of identifiers, e.g., identifier 4302I, which each reference a class of which exceptions thrown by the feature defined are members. When the feature defined by feature definition 4210V throws an exception, the exception is verified to be a member of one of the classes referenced by an identifier of set 4302. If the exception is not a member of a class referenced by an identifier of set 4302, a member of class "Unexpected Exception" is thrown in place of the exception. Otherwise, the exception is thrown.

Boolean 4304 is property "isPublic" of feature definition 4210V. Boolean 4304 indicates whether the feature defined by feature definition 4210V is a public feature or a private feature, i.e. whether the access of the feature defined is "public" or "private". Each feature has an associated "access" which determines which objects and under what circumstances each feature can be properly requested. The access of each feature of this invention is disclosed in Appendices A and B.

If boolean 4304 is "true", the feature is public. A feature whose access is public can be requested by any object. If boolean 4304 is "false", the feature is private. A feature whose access is private can only be requested by the responder, i.e., an object can only request the feature of itself. System features, i.e., features whose access is "system", are all predefined and therefore are not defined by feature definitions. Predefined features are implemented within an engine and therefore are not represented by objects such as feature definitions. One implementation of an engine of one embodiment of the present invention, which implements the disclosed predefined features, is disclosed in the software of Microfiche Appendix G which is incorporated herein in its entirety by reference.

Attribute Definitions

Figure 44:
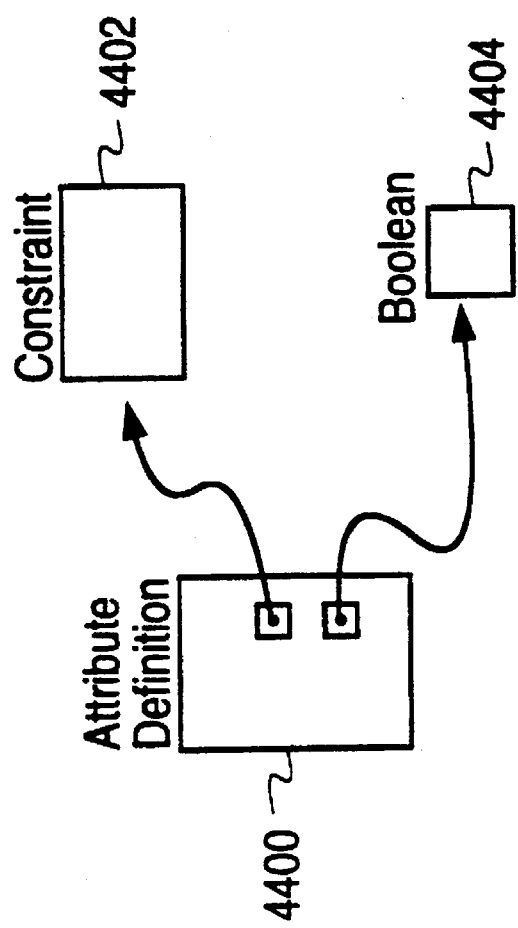
FIG. 44 shows the structure of an attribute definition including a constraint and a boolean.

A feature definition that defines an attribute is an attribute definition, i.e., a member of class "Attribute". Therefore, class "Attribute" is a subclass of class "Feature". As an attribute definition is a feature definition, an attribute definition inherits the properties defined or inherited by class "Feature" as described above. In addition, attribute definition 4400 (FIG. 44) includes properties "constraint" and "isSet".

Constraint 4402 is property "constraint" of attribute definition 4400. Constraint 4402 constrains objects representing the attribute defined by attribute definition 4400. As discussed below in greater detail, a constraint places restrictions on an object and can restrict (i) the class of which the object is a member, (ii) whether the object must be an instance of the class, (iii) whether the object can be a nil and (iv) how the object is passed between a feature's requester and responder.

Boolean 4404 is property "isSet" of attribute definition 4400. Boolean 4404 indicates whether the attribute defined by attribute definition 4400 can be set as well as queried. If boolean 4404 is "true", attribute definition 4400 defines an attribute which can be set. Otherwise, the attribute defined by attribute definition 4400 can only be queried.

Operation Definitions

As discussed above, a feature is either an attribute or an operation. Therefore, a second subclass of class "Feature" is class "Operation". An operation definition, i.e., a member of class "Operation", defines the interface of an operation.

Figure 45:
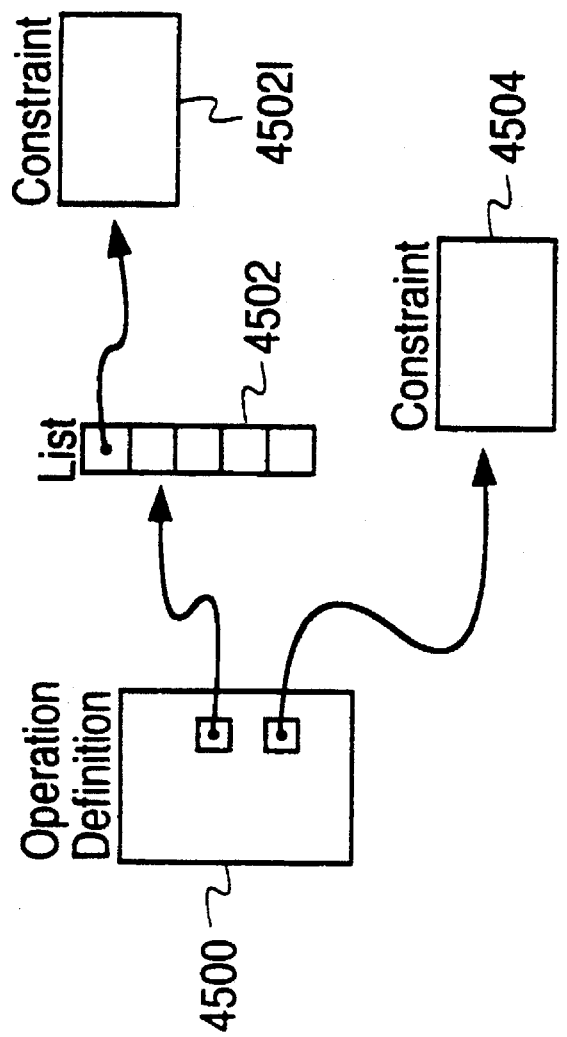
FIG. 45 shows the structure of an operation definition including a constraint and a list, which in turn includes a constraint.

FIG. 45 shows the structure of operation definition 4500. As an operation definition is a feature definition, operation definition 4500 includes the properties defined or inherited by class "Feature" as described above. In addition, operation definition includes properties "arguments" and "result".

List 4502 is property "arguments" of operation definition 4500. Property "arguments" of an operation definition is optional, i.e., property "arguments" of an operation definition can be a nil rather than a list. If property "arguments" is a nil, the operation defined by operation definition 4500 consumes a variable number of arguments. The performance of an operation whose arguments are variable in number is described in Appendix A. Conversely, if property "arguments" is list 4502, the number of arguments consumed by the operation defined by operation definition 4500 consumes a fixed number of arguments, the number being equal to the length of list 4502. If property "arguments" is an empty list, the operation consumes no arguments. The items of list 4502, e.g., constraint 4502I, are constraints which constrain the arguments of the operation defined by operation definition 4500. As discussed below with respect to FIG. 46, a constraint constrains an object's class and passage.

Constraint 4504 is property "result" of operation definition 4500. Constraint 4504 constrains the result of the operation defined by operation definition 4500. Property "result" of an operation definition is also optional. If property "result" is a nil rather than constraint 4504, then the operation defined by operation definition 4500 produces no result.

Constraints

Figure 46:
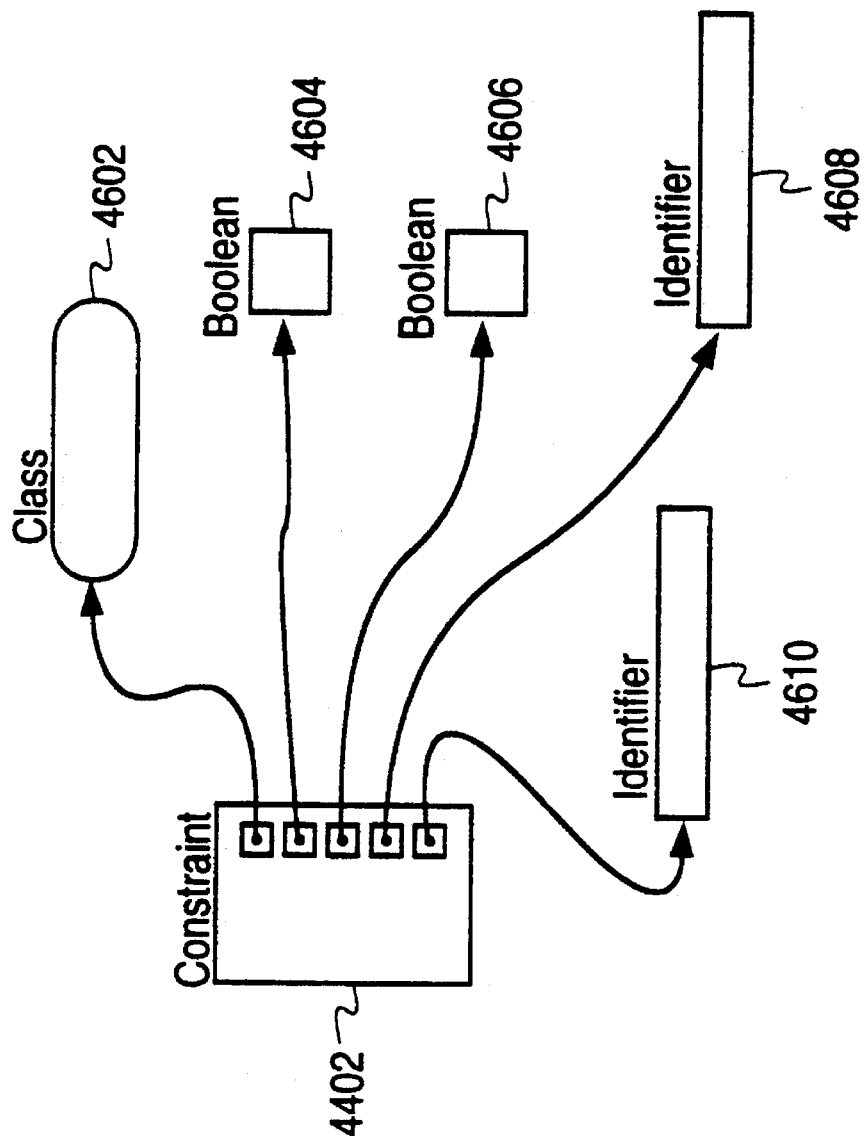
FIG. 46 shows the structure of a constraint.

As discussed above, a constraint restricts the class and passage of an object. The structure of constraint 4402 is shown in FIG. 46. The properties of constraint 4402 include properties "classId", "ofClass", "isInstance", "isOptional", and "passage".

Properties "ofClass" and "classId" are alternative ways for specifying the class of which the constrained object must be a member. Class object 4602 is property "ofClass" of constraint 4402. Class object 4602 represents the class of which an object upon which constraint 4402 is imposed must be a member. Property "ofClass" is optional and, therefore, can be a nil. If property "ofClass" is nil, the class of which the object must be a member is referenced by identifier 4610 which is property "classId" of constraint 4402.

Property "ofClass" is a class object and therefore can only be a class which exists at the time constraint 4402 is created. However, requiring that a property of a constraint is a class which exists prevents users of the present invention from defining multiple interdependent classes. For example, a constraint in a feature definition of a first class can refer to a second class and a second constraint in a second feature definition in the second class can refer to the first class. Providing property "classId" of constraint 4402 as an alternative to property "ofClass" enables users to define multiple interdependent classes simultaneously.

Boolean 4604 is property "isInstance" of constraint 4402. Boolean 4604 indicates whether an object upon which constraint 4402 is imposed must be an instance of the class represented by class object 4602. If boolean 4604 is "true", the constrained object must be an instance of the class. Otherwise, the constrained object's membership in the class is sufficient to satisfy constraint 4402.

Boolean 4606 is property "isOptional" of constraint 4402. Boolean 4606 indicates whether a nil object satisfies constraint 4402, properties "ofClass" and "classId" notwithstanding. If boolean 4606 is "true", a nil object satisfies constraint 4402. As illustrated in numerous examples herein, a nil object can be placed on a stack in lieu of an omitted optional argument or result of a feature.

Identifier 4610 is property "passage" of constraint 4402. Identifier 4610 indicates in what manner an object on which constraint 4402 is imposed is passed as a parameter, i.e., as an argument or result. Identifier 4610 has four possible values: "byRef", "byUnprotectedRef", "byProtectedRef" and "byCopy". Setting identifier 4610 to a value other than one of these four throws an exception that is a member of class "Passage Invalid".

In passing a reference to an argument between the requestor of a feature and the responder of the feature, an engine takes a source reference to the argument from the requestor and provides a destination reference to the responder. In passing a reference to a result, the source reference is taken from the responder and a destination reference is provided to the requestor.

If the parameter is passed "byRef", the source reference and the destination reference are the same. If the parameter is passed "byUnprotectedRef", an exception of class "Reference Protected" is thrown if the source reference is a protected reference; otherwise, the destination reference is the source reference. If the parameter is passed "byProtectedRef", the destination reference is a protected reference to the object referenced by the source reference. If the parameter is passed "byCopy", the destination reference is an unprotected reference to a copy of the object referenced by the source reference. Passage of parameters is discussed further in Appendix A.

Thus, constraint 4402 (FIG. 44) restricts the class and passage of an object.

Implementation Object

As discussed above, implementation object 4112 (FIG. 41A) defines the class implementation of the class defined by class definition object 4100. A class implementation defines the following: (i) zero or more properties of the members of the class defined; (ii) the respective implementations of the various class features and (iii) instance features defined by a class; (iv) methods for setting attributes defined for the class; (v) methods for converting objects from the class defined to a second class; (vi) methods for converting objects from a second class to the class defined; (vii) definitions of identifiers used to define classes; and (viii) the implementation superclasses of the class defined.

List 4702 (FIG. 47) is property "properties" of implementation object 4112. List 4702 defines the properties that implementation object 4112 implements. The items of lexicon 4702, e.g., identifier 4702I, are identifiers of the properties defined by implementation object 4702.

Lexicon 4704 (FIG. 47) is property "classMethods" of implementation object 4112. Lexicon 4704 provides methods for the class features of the class represented by class definition object 4100 (FIG. 41A). The keys of lexicon 4704, e.g., identifier 4704K (FIG. 47), are identifiers of the class features, and the values of lexicon 4704, e.g., method object 4704V, are method objects which define the implementation of the class features.

A method object, i.e., a member of class "Method", is an object which defines the method of a feature. The method of a feature is the particular series of steps taken by an engine, and therefore the computer system within which the engine is executing, in carrying out performance of the feature. A method is defined in terms of the disclosed instruction set as the instruction set is amended by any user-defined classes or features. Method objects are discussed in greater detail below and in Appendix A.

Lexicon 4706 is property "instanceMethods" of implementation object 4112. Lexicon 4706 associates identifiers of instance features with corresponding method objects, which in turn define the implementation of the instance features. The structure of lexicon 4706 is similar to the structure of lexicon 4704 and that discussion is incorporated herein by reference.

Lexicon 4707 is property "setMethods" of implementation object 4112. Lexicon 4707 associates identifiers, which identify respective attributes, with method objects. Each of the method objects of lexicon 4707 implements the attribute of the corresponding identifier when executed in the presence of a "set" modifier. In other words, each method object of lexicon 4707 defines the implementation of the setting of a corresponding attribute. The execution of an attribute in the presence of a "set" modifier is discussed in Appendix A.

Figure 47:
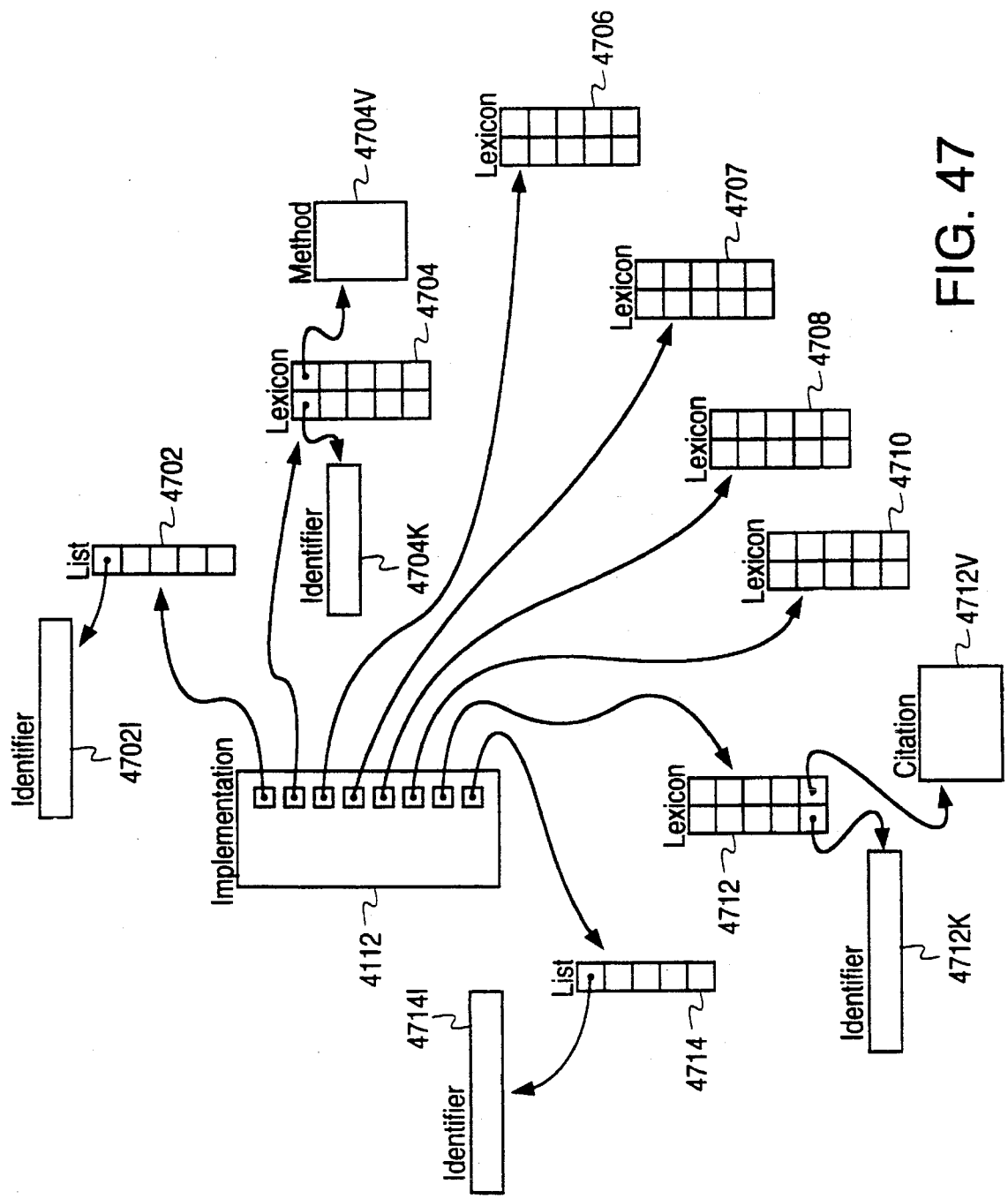
FIG. 47 shows the structure of an implementation object which includes two lists and six lexicons.

Lexicon 4708 is property "fromMethods" of implementation object 4112. Lexicon 4708 associates identifiers with method objects. Each identifier references a class and is associated with a method object which provides the implementation of the conversion from the referenced class to the class defined by class definition object 4100 (FIG. 41A), i.e., the class whose implementation is implementation object 4112 (FIG. 47).

Lexicon 4710 is property "toMethods" of implementation object 4112. Lexicon 4710 associates identifiers with method objects. Each identifier references a class and is associated with a method object which provides the implementation of the conversion to the referenced class from the class defined by class definition object 4100 (FIG. 41A), i.e., the class whose implementation is implementation object 4112 (FIG. 47). The structure of lexicons 4707, 4708 and 4710 is similar to the structure of lexicon 4704 and that discussion is incorporated herein by reference.

Lexicon 4712 is property "vocabulary" of implementation object 4112. Lexicon 4712 defines the identifiers used by implementation object 4112 to identify classes. The keys of lexicon 4712, e.g., identifier 4712K, are identifiers used within implementation object 4112 to identify specific user-defined classes. The values of lexicon 4712, e.g., citation 4712V, are corresponding citations which identify the class identified by the associated identifier. Lexicon 4712 provides a translation between an identifier used to identify a user-defined class within implementation object 4112 and a citation used to identify the class throughout the network. Citations are discussed in greater detail below and in Appendix A.

List 4714 is property "superclasses" of implementation object 4112. The items of list 4714, e.g., identifier 4714I, are identifiers which identify the implementation superclasses of the class defined by class definition 4100 (FIG. 41A). List 4714 (FIG. 47), i.e. property "superclasses" of implementation object 4112, can contain identifiers of classes which are not items of list 4220, i.e. property "superclasses" of interface object 4110. For example, a first class may benefit from the ability to use features of a second class in implementing features of the first class. However, in designing such a class, it is not always preferred that the features of the second class are themselves inherited by the first class. In such cases, the second class is made an implementation superclass but not an interface superclass of the first class.

Thus, implementation object 4112 defines, for the class defined by class definition object 4100 (FIG. 41A), (a)

properties of the members of the class defined, (b) the class and instance feature methods, (c) methods for setting attributes, (d) methods for conversion to and from the class defined, (e) identifiers used to identify classes, and (f) implementation superclasses.

Method Objects

Figure 48:
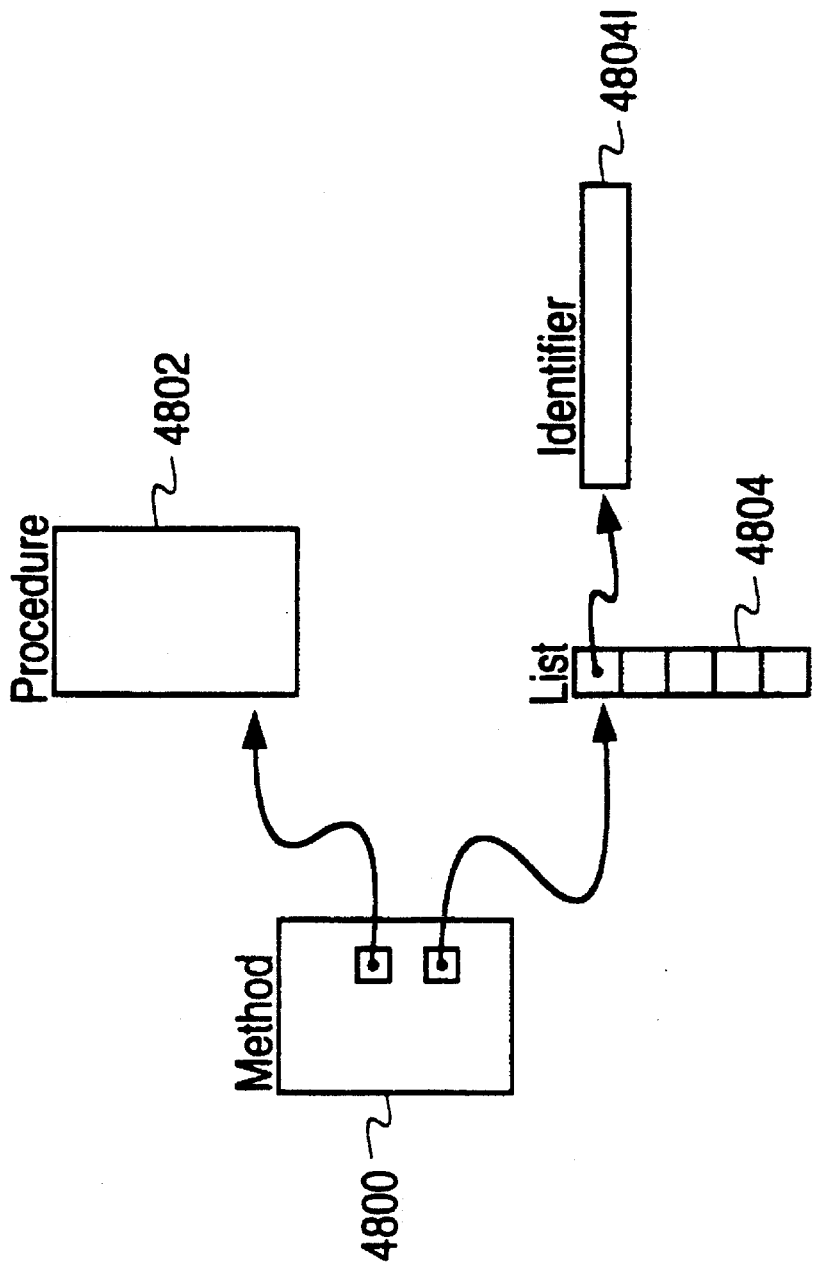
FIG. 48 shows the structure of a method which includes a procedure and a list, which in turn includes an identifier.

As discussed above, a method object defines the computer instructions executed in performance of a feature or a conversion. FIG. 48 shows the structure of method object 4800. Properties of method object 4800 include properties "procedure" and "variables". Procedure 4802 is property "procedure" of method object 4800. Performance of procedure 4802 constitutes performance of the feature or a conversion implemented by method object 4800. Procedures are discussed in more detail below.

List 4804 is property "variables" of method object 4800. List 4804 defines the variables that are used by procedure 4802. The items of list 4804, e.g., identifier 4804I, are identifiers which reference the variables defined for method object 4800. Associated objects which represent the values of the variables of a method are stored in a list as property "variables" of a user-defined frame during performance of the method. Frames are discussed in greater detail below and in Appendix A.

Procedure

Figure 49:
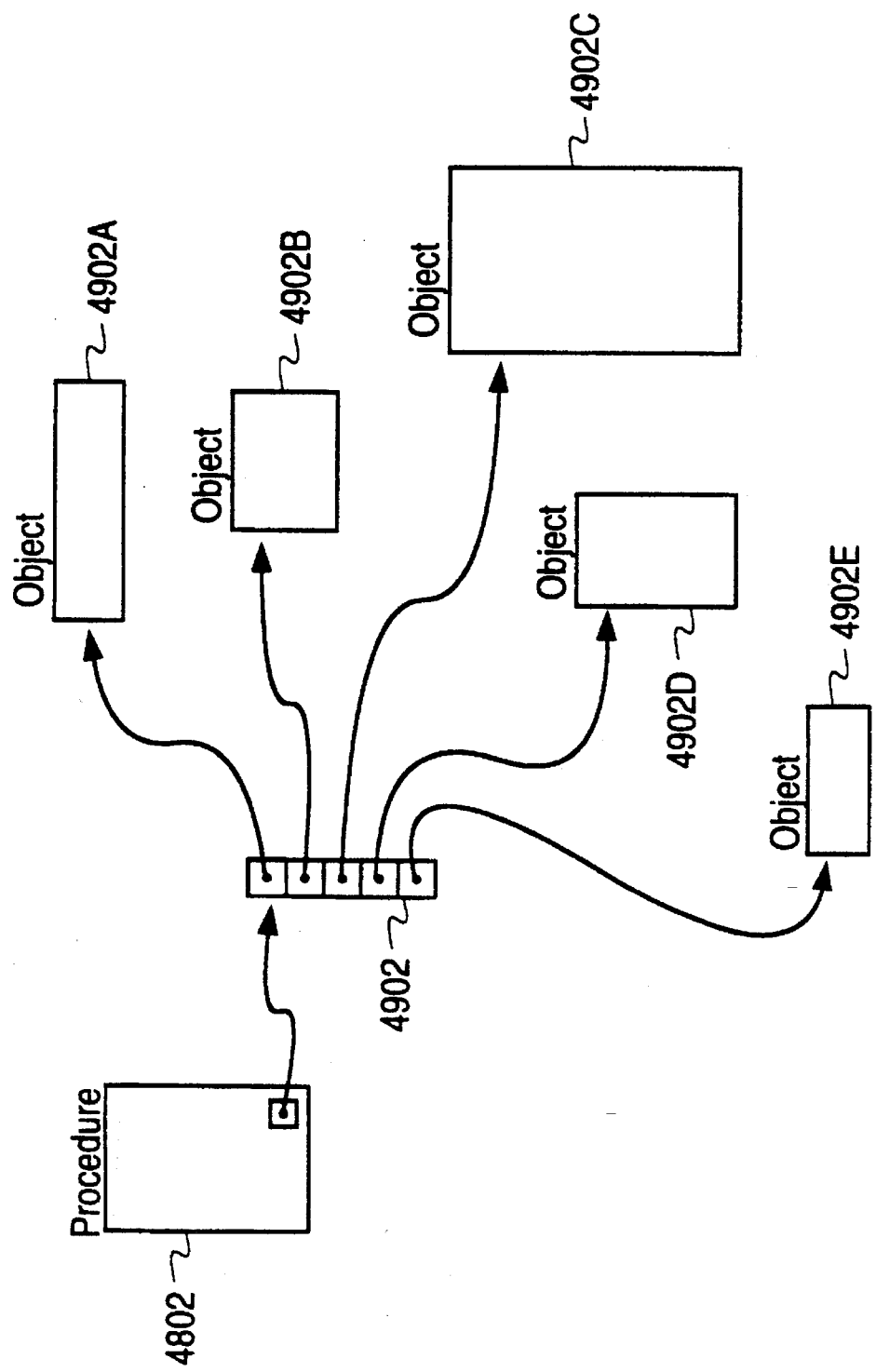
FIG. 49 shows the structure of the procedure of FIG. 48.

The structure of procedure 4802 is shown in FIG. 49. Procedure 4802 includes list 4902 of objects 4902A–4902E. List 4902 is not a member of class "List", but is instead an integral part of procedure 4802. In other words, list 4902 is not a property or item of procedure 4802 and no feature is provided which permits list 4902 to be treated as a member of class "List". In one embodiment of the present invention, class "Procedure" is an implementation subclass of class "List" but is not an interface subclass of class "List". Therefore, the features that are defined by class "List" are not inherited by class "Procedure" but the methods defined by class "List" can be used by a procedure to create and access list 4902.

Objects 4902A–4902E are executed objects, i.e., members of mix-in class "Executed". Procedure 4802 is performed by executing objects 4902A–4902E sequentially, i.e., in the order of object 4902A, object 4902B, object 4902C, object 4902D and object 4902E. During execution of procedure 4802, a predefined frame records and maintains the dynamic state of a performance of procedure 4802, including which of objects 4902A–4902E is executing. Predefined frames are discussed below and in detail in Appendix B.

Citation

A citation is an object which identifies a series of objects each of which is backward- or forward-compatible with the others. A citation further identifies a particular object in the series and the process, or the authority of the process, that created the particular object. As discussed briefly above, classes are cited objects. Therefore, citations are used to identify series of classes which are backward- and forward-compatible with one another. Backward- and forward-compatibility are discussed in greater detail below and in Appendix A.

It should be noted that objects whose citations identify the objects as forward- or backward compatible with one another are not necessarily forward- or backward-compatible. For example, two class definition objects which are identified by their respective citations as compatible are merely intended to be compatible.

Citation 5000 (FIG. 50) is a member of class "Citation". The properties of citation 5000 include properties "title", "majorEdition", "minorEdition" and "author". Property "title" of citation 5000 is identifier 5008. Identifier 5008 is therefore the title of citation 5000. The title of a citation references the series that the citation represents. The title of a citation is interpreted relative to the citation's authority. In other words, two citations of different authorities can use equivalent titles. The two citations are distinguished from one another by the different authorities. The authority of a citation is identified by property "author" which is discussed below.

Figure 51:
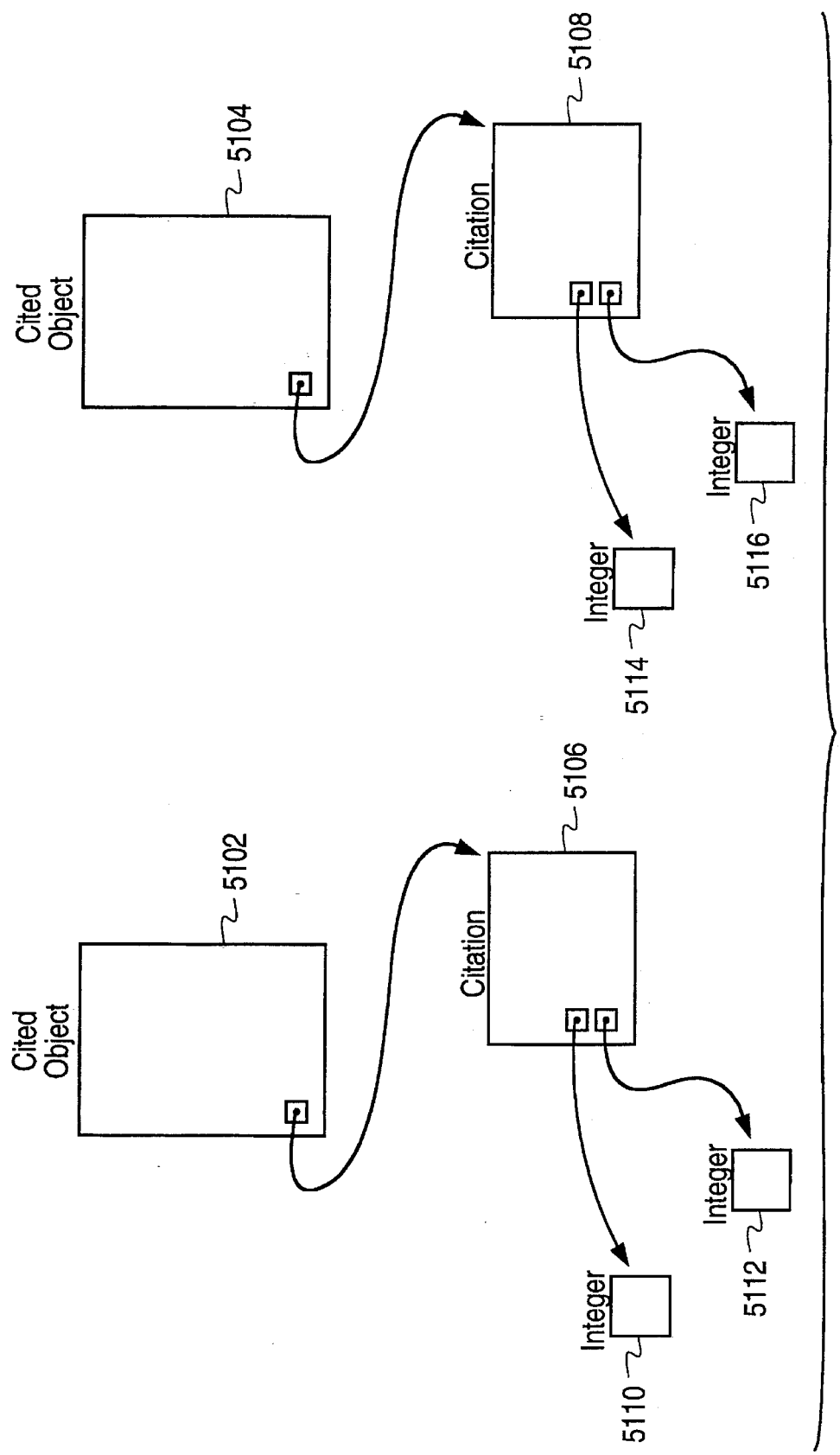
FIG. 51 shows the structures of two cited objects, each of which includes a respective citation.

Properties "majorEdition" and "minorEdition" are integers 5004 and 5006, respectively. Integers 5004 and 5006 are therefore the major and minor editions, respectively, of citation 5000. The relation between two objects in a series is determined by the relative major and minor editions of the objects. For example, objects 5102 and 5104 (FIG. 51) are cited by citations 5106 and 5108, respectively. Integers 5110 and 5112 represent the major and minor editions, respectively, of citation 5106. Integers 5114 and 5116 represent the major and minor editions, respectively, of citation 5108.

If integer 5110, the major edition of citation 5106, is greater than integer 5114, the major edition of citation 5108, then object 5102 was created subsequent to the creation of object 5104 and is backward-compatible with object 5104. If object 5102 is backward-compatible with object 5104, object 5104 is forward-compatible with object 5102. Conversely, if integer 5110 is less than integer 5114, object 5104 was created subsequent to the creation of object 5102 and is backward-compatible with object 5102.

If integers 5110 and 5114 are equal, the relative values of integers 5112 ad 5116, respectively representing the minor editions of objects 5102 and 5104, determine the relation between objects 5102 and 5104. For example, if integer 5112 is greater than integer 5116, object 5102 was created subsequent to the creation of object 5104 and is backward-compatible with object 5104. Conversely, if integer 5112 is less than integer 5116, object 5104 was created subsequent to the creation of object 5102 and is backward-compatible with object 5102.

Figure 50:
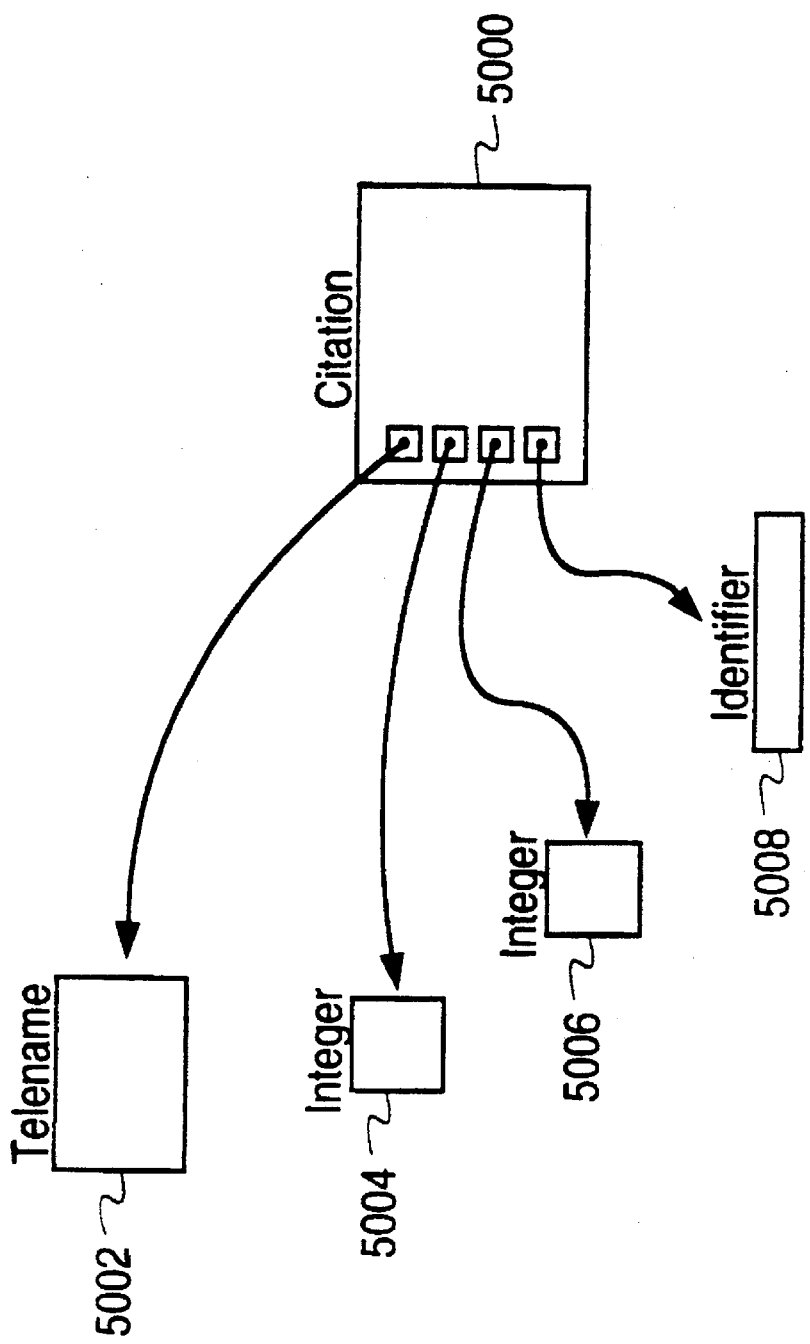
FIG. 50 shows the structure of a citation which includes a telename, two integers, and an identifier.

Property "author" is telename 5002 (FIG. 50). Telename 5002 is therefore the author of citation 5000. Telename 5002 is the name of the process creating the object identified by citation 5000. All objects of a single series are created by processes of a single authority.

While a more precise definition of "forward-" and "backward-compatibility" is given in Appendix A, the following example illustrates the meaning and utility of such concepts. As defined in Appendix A, a member of class "Integer", i.e., an integer, can perform a number of arithmetic operations, including "add", "subtract", "multiply" and "divide". Property "citation" of class "Integer" is a first citation identifying class "Integer". In implementing the set of computer instructions described herein and in defining new classes and new features in using the set of computer instructions described herein, a plethora of features are designed in reliance of members of class "Integer" comporting with the description of class "Integer" as described in Appendix A.

Suppose in a subsequent version of the set of computer instructions described herein that a second class "Integer" is defined to provide an operation "randomize" to generate random numbers. The former class "Integer" is called the first class "Integer". Property "citation" of the second class "Integer" is a second citation. Suppose further that there are no other differences between the first class "Integer" and the second class "Integer" and that any feature requested of a member of the first class "Integer" is satisfied by a member of the second class "Integer". Thus, the features which are designed in reliance of integers comporting with the description of the first class "Integer", function properly given integers of the second class "Integer". The second class "Integer" is therefore backward-compatible with the first class "Integer". Conversely, the first class "Integer" is forward-compatible with the second class "Integer".

Property "title" of both the first and the second citations is equal and references either class "Integer". However, the major and minor editions of the first and second citations reflect the forward- and backward-compatibility relation between the first and second classes "Integer". Permitting backward- and forward-compatible objects to co-exist within the network permits objects created by earlier versions of the set of computer instructions described herein to travel to and operate within engines implementing a later version of the set of computer instructions described herein. It is clear from the foregoing that a class is both forward- and backward-compatible with itself. While the illustrative example above demonstrates forward- and backward-compatibility in the context of a predefined class, user-defined classes are typically changed more frequently than predefined classes. Therefore, providing for forward- and backward-compatibility among classes is particularly important in the context of user-defined classes.

Thus, classes are made part of the disclosed instruction set and are therefore portable and can travel with an agent from a first computer system to a second computer system.

Interpreted Instruction Set

As discussed above, three aspects of the present invention make computer processes particularly mobile and general. The first is that the computer instruction set of the present invention is implemented homogeneously in a homogeneous or heterogeneous network. Secondly, classes are objects of the disclosed computer instruction set so that the instruction set is both extensible and mobile. That is, classes, which are not defined on remote computer systems, are transported with mobile computer processes to such remote computer systems. The following discussion concerns the third aspect making the computer instruction set particularly general and mobile; the computer instructions of the disclosed computer instruction set are interpreted.

Most computer processes are first written in a human-readable source code which is then compiled into object code and linked into machine code, which is entirely unintelligible to human beings. The primary advantage of translating the source code into machine code is that the translation need occur only once as the machine code can be executed by a computer system's CPU any number of times without recompilation of the source code. However, two computer systems of a heterogeneous network can have incompatible CPUs which do not both execute identical machine code instructions. It is therefore preferred that agents, traveling from a first computer system to a second computer system, be represented in a standardized instruction set that is not specific to either the first or the second computer system.

Since the advantages of one-time compilation of source code are eliminated by the heterogeneity of the network, the disclosed computer instruction set is interpreted. The term "interpreted" is used herein as it is understood in the art; a computer instruction in a series of computer instructions is read, translated into machine code, and executed by an engine before the next computer instruction in the series is read.

Interpreting, rather than compiling, instructions of the disclosed instruction set provides greater generality. A first agent can travel from a first computer system to a second computer system and meet with a second agent there which gives to the first agent a procedure. The first agent can then perform the procedure which the first agent was not originally designed to perform.

The following discusses the interpretation of the disclosed computer instructions. The discussion focuses on procedures and execution of items of procedures, the items being individual computer instructions.

Execution of a Procedure

Figure 52A:
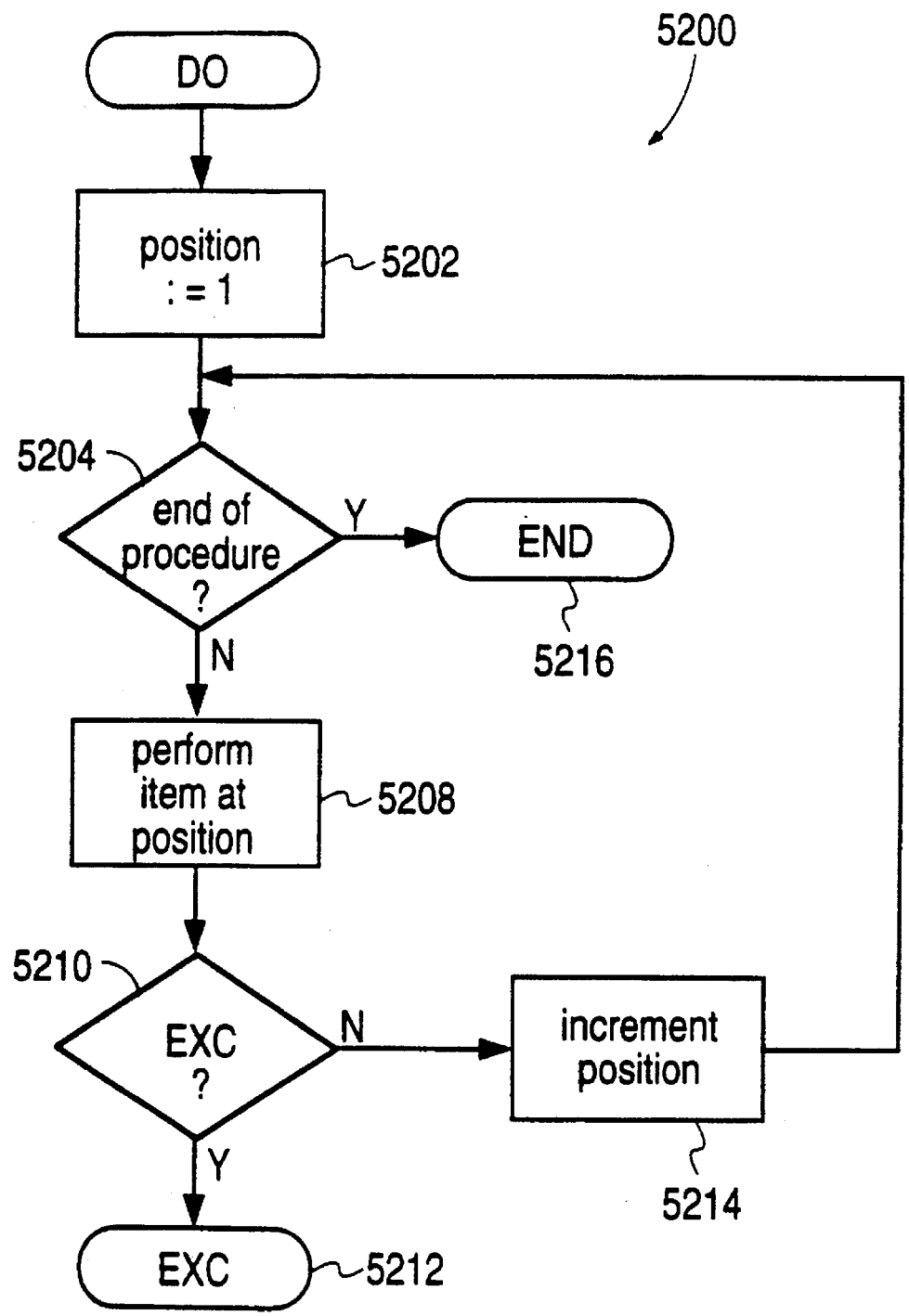
FIG. 52A is a logic flow diagram illustrating the steps taken in performance of operation "do".
Figure 52B:
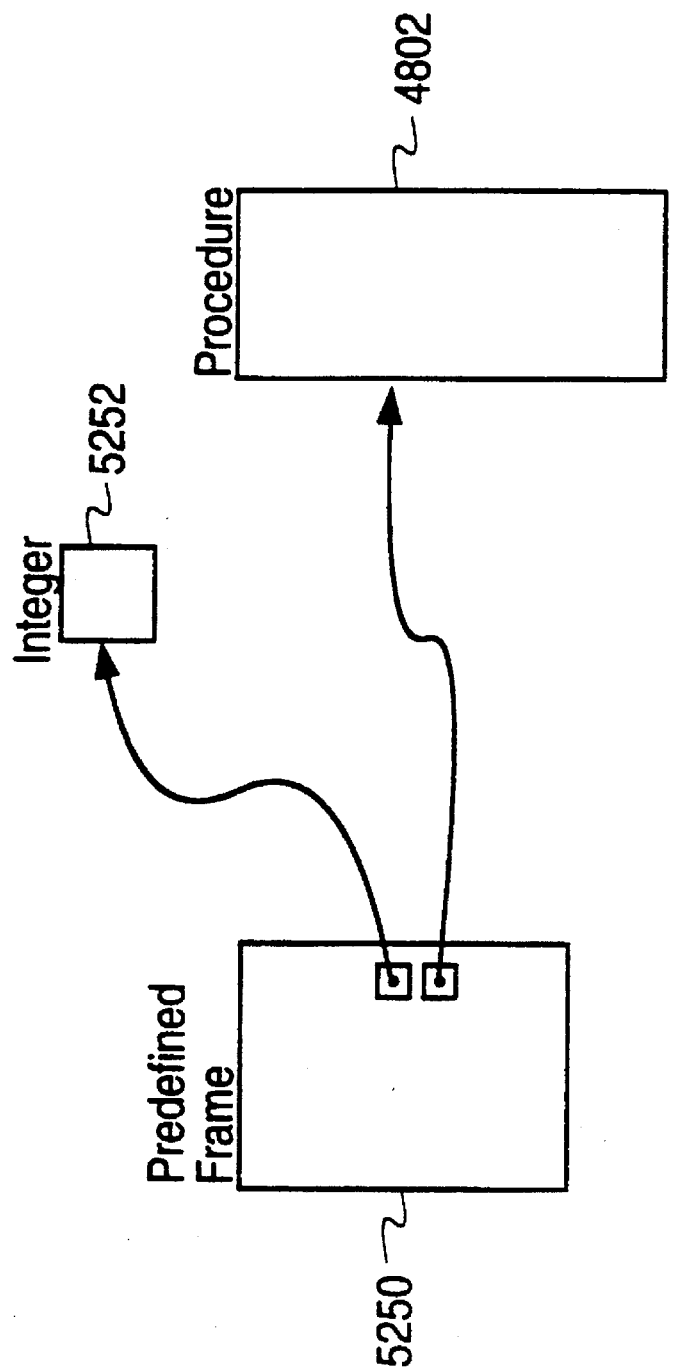
FIG. 52B shows the structure of a predefined frame which includes an integer and a procedure.

A procedure is performed by issuing an instruction requesting that the procedure perform operation "do". Other operations which cause performance of a procedure are discussed below and in Appendix A. Performance of operation "do" as defined for class "Procedure" is shown by logic flow diagram 5200 (FIG. 52A) and is represented by a predefined frame 5250 (FIG. 52B). Predefined frame 5250 includes properties "position" and "procedure", which are, respectively, integer 5252 and procedure 4802. Predefined frames are discussed in greater detail in Appendix B. Predefined frame 5250 records the dynamic state of operation "do" as performed by procedure 4802 (FIG. 49).

In step 5202 (FIG. 52A), integer 5252 is set to a value of one. Integer 5252 identifies the position, within procedure 4802, of the item whose execution was most recently begun. Processing transfers from step 5202 (FIG. 52A) to end of procedure test step 5204 in which integer 5252 (FIG. 52B) is compared to the length of procedure 4802. If integer 5252 is less than or equal to the length of procedure 4802, processing transfers from end of procedure test step 5204 (FIG. 52A) to step 5208. In step 5208, the item, whose position within procedure 4802 (FIG. 52B) is integer 5252 is performed. The performance of an executed object is discussed below in more detail and in Appendix A.

Once an item of procedure 4802 is performed, processing transfers from step 5208 (FIG. 52A) to exception test step 5210. In exception test step 5210, the engine interpreting procedure 4802 (FIG. 52B) determines whether performance of the item succeeded or threw an exception. If an exception is thrown, processing transfers from exception test step 5210 (FIG. 52A) to terminal step 5212 in which operation "do" fails and the performance of procedure 4802 (FIG. 52B) completes.

If no exception is thrown by performance of the item at the position within procedure 4802 indicated by integer 5252 in step 5208 (FIG. 52A), processing transfers from exception test step 5210 to step 5214 in which integer 5252 (FIG. 52B) is incremented. Processing transfers from step 5214 (FIG. 52A) to end of procedure test step 5204 in which property "position" of predefined frame 5250 (FIG. 52B), i.e., integer 5252, is compared to the length of responding procedure 4802 as described above.

If integer 5252 (FIG. 52B) is greater than the length of procedure 4802, processing transfers from end of procedure test step 5204 (FIG. 52A) to terminal step 5216 in which operation "do" completes successfully.

Thus, performance of operation "do" by procedure 4802 (FIGS. 49 and 52B) results in the execution of each of the items of procedure 4802 in the order described above.

Execution Model

As discussed above, the primary function of an engine, e.g., engine 132B (FIG. 15A), is the performance of procedures, i.e., the execution of the items of procedures. The execution model of the disclosed embodiment of the present invention is the process by which items of procedures are executed. Discussion of the execution model of the disclosed embodiment is divided into six sections. First, the structure and organization of frames is discussed. Frames are objects which record the dynamic state of a method implementing a feature or a conversion. Second, the execution of identifiers is discussed. The execution of an identifier which references a feature causes the feature referenced to be performed. Third, the process by which a method object implementing a feature or a conversion is selected from the class hierarchy is discussed. The structure of class objects, from which a method object is retrieved, is described above. Fourth, the escalation of a feature is discussed. Fifth, the execution of modifiers is discussed. And sixth, the execution of selectors is discussed.

Frames

A frame is an object which records the dynamic state of a method implementing a feature or a conversion during the feature's or conversion's execution. The execution state of a process, i.e., an agent or a place, is recorded in one or more frames. For example, the execution state of process 5300 (FIG. 53) is shown. When a process is created, the process is asked to perform operation "live". Created within process 5300 is a property "frames" which is stack 5302 which in turn represents the execution thread of process 5300. Stack 5302 contains the frames which collectively form the execution state of process 5300. When process 5300 is first asked to perform operation "live", the sole item on stack 5302 is user-defined frame 5304 which records the dynamic state of operation "live".

Figure 54:
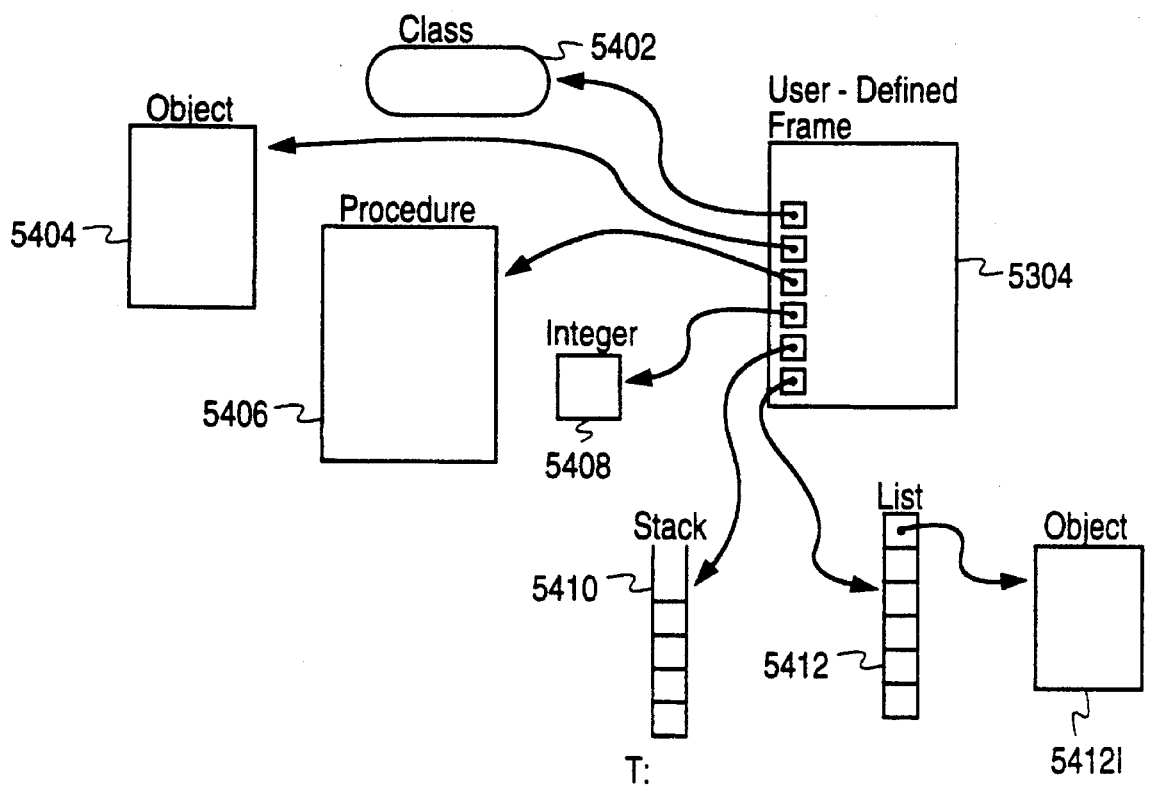
FIG. 54 shows the state of the user frame of FIG. 53.

Since predefined classes "Process", "Agent" and "Place" are abstract, processes of the disclosed embodiment of the present invention are instances of user defined classes. Predefined abstract classes "Process", "Agent" and "Place" do not define an implementation for operation "live". Therefore, frame 5304 recording the dynamic state of the method of operation "live" is necessarily a user-defined frame. A user-defined frame is a frame which records the dynamic state of an operation with a user-defined implementation during execution of the operation. The structure of user-defined frame 5304 is shown in FIG. 54.

The properties of user-defined frame 5304 (FIG. 54) include properties "class", "responder", "procedure", "position", "stack" and "variables". Class object 5402 is property "class" of user-defined frame 5304, which is a property inherited from superclass "Object". Class object 5402 represents the class of which user-defined frame 5304 is an instance and therefore represents class "User-defined Frame" or a subclass thereof.

Figure 53:
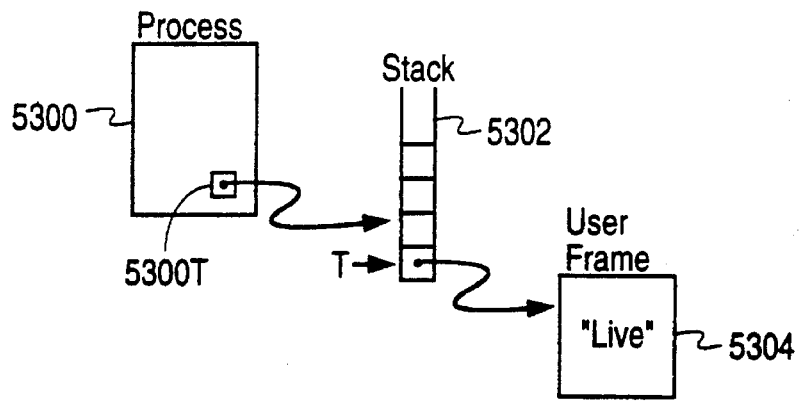
FIG. 53 shows the execution state of a process which includes a stack, which in turn includes a user frame.

Object 5404 is property "responder" of user-defined frame 5304. Object 5404 is the responder of the feature or conversion whose dynamic state user-defined frame 5304 records. In the context of FIG. 53, object 5404 is process 5300 as process 5300 is the responder of operation "live".

Procedure 5406 (FIG. 54) is property "procedure" of user-defined frame 5304, which is a property inherited from superclass "Procedure Frame". Procedure 5406 is property "procedure" of the method object whose dynamic state user-defined frame 5304 records. For example, if user-defined frame 5304 records the dynamic state of method object 4800 (FIG. 48), procedures 4802 and 5406 are the same procedure.

Integer 5408 is property "position" of user-defined frame 5304 inherited from superclass "Procedure Frame". Integer 5408 identifies the position within procedure 5406 of the item of procedure 5406 which is currently being executed. For example, if the second item of procedure 5406 is the item of procedure 5406 whose execution has begun and has not yet finished, the value of integer 5408 is two.

User-defined frame 5304 includes two additional properties, namely, properties "stack" and "variables". Stack 5410 is property "stack" of user-defined frame 5304 and is the stack of user-defined frame 5304. At the beginning of execution of procedure 5406, stack 5410 contains the arguments consumed by performance of the feature or conversion whose dynamic state is recorded by user-defined frame 5304. After execution of procedure 5406, stack 5410 contains the result, if any, produced by performance of the feature or conversion.

List 5412 is property "variables" of user-defined frame 5304. The items of list 5412, e.g. object 5412I, are the variables of the frame. Variables record the dynamic state of user-defined frame 5304 as procedure 5406 is performed. Variables which are items of list 5412 (FIG. 54) are referenced by like-positioned items of property "variables" of the method object whose dynamic state is recorded by user-defined frame 5304. For example, if user-defined frame 5304 records the dynamic state of method object 4800 (FIG. 48), identifier 4804I which is at position one within list 4804 references object 5412I (FIG. 54) which is at position one within list 5412.

Thus, user-defined frame 5304 records the dynamic state of a user-defined feature or conversion by recording (i) the responder of the feature or conversion, (ii) the procedure implementing the feature or conversion, (iii) the position within the procedure of the currently executing instruction, (iv) the stack containing the arguments or result of the feature or conversion and (v) the variables which record the dynamic state of user-defined frame 5304.

Execution of Executed Objects

As discussed above, the performance of a procedure is the sequential execution of the items of the procedure. In general, the execution of an executed object, i.e., an object which inherits from mix-in class "Executed", results in a reference to the object being pushed on to the stack, e.g., stack 5410, of the frame representing the execution state of the procedure. However, the execution of identifiers, modifiers and selectors are exceptions to this general rule.

Identifiers

Figure 55C:
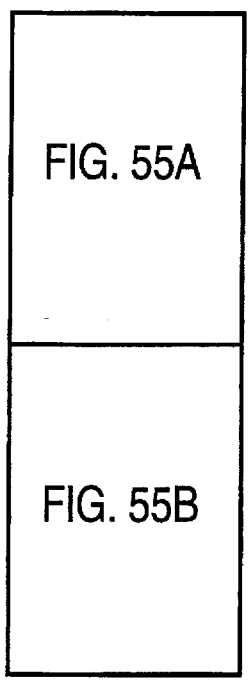
FIGS. 55A and 55B combine as shown in FIG. 55C to form a single logic flow diagram illustrating the steps taken in performance of a user-defined operation.

Unless executed in the presence of a modifier indicating otherwise, an executed identifier is presumed to reference a feature and therefore invokes an operation or queries an attribute. Execution of an identifier within a first procedure causes the feature referenced by the identifier to be performed, thereby causing the performance of a second procedure. The second procedure is the procedure of the method object which implements the operation or attribute referenced by the identifier. The execution of an identifier which references a feature is shown by logic flow diagram 5500 (FIG. 55).

Figure 56A:
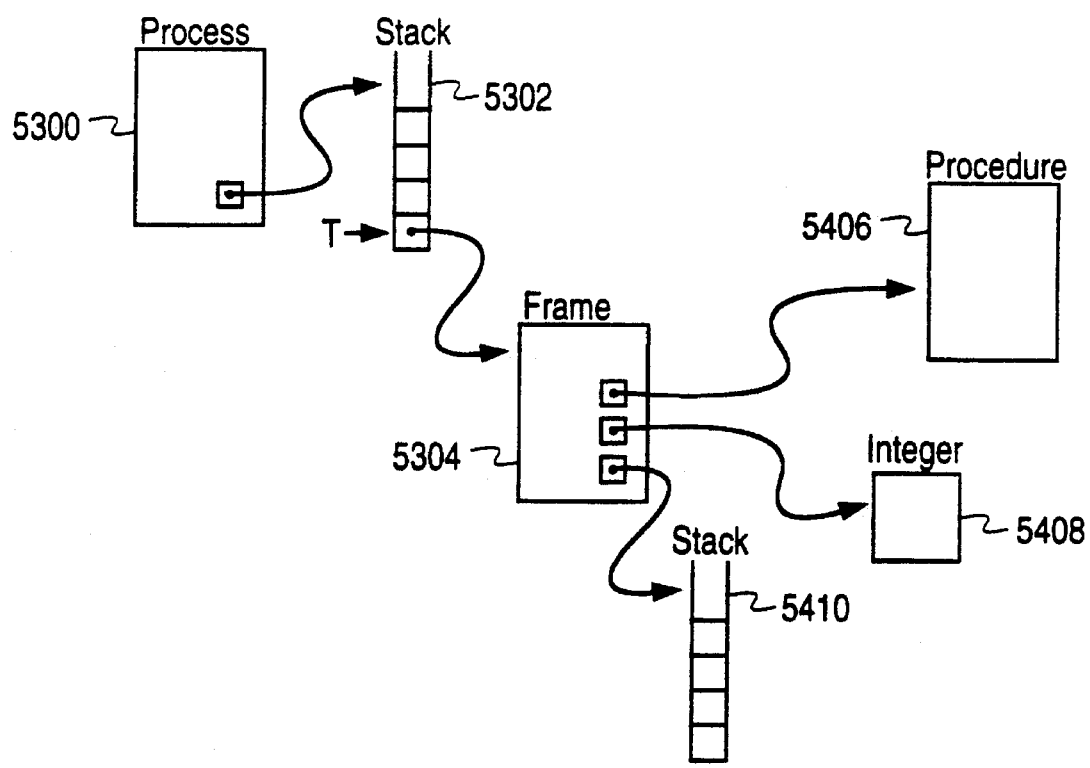
FIG. 56A shows the execution state of a process which includes a stack, which in turn includes a frame.
Figure 56B:
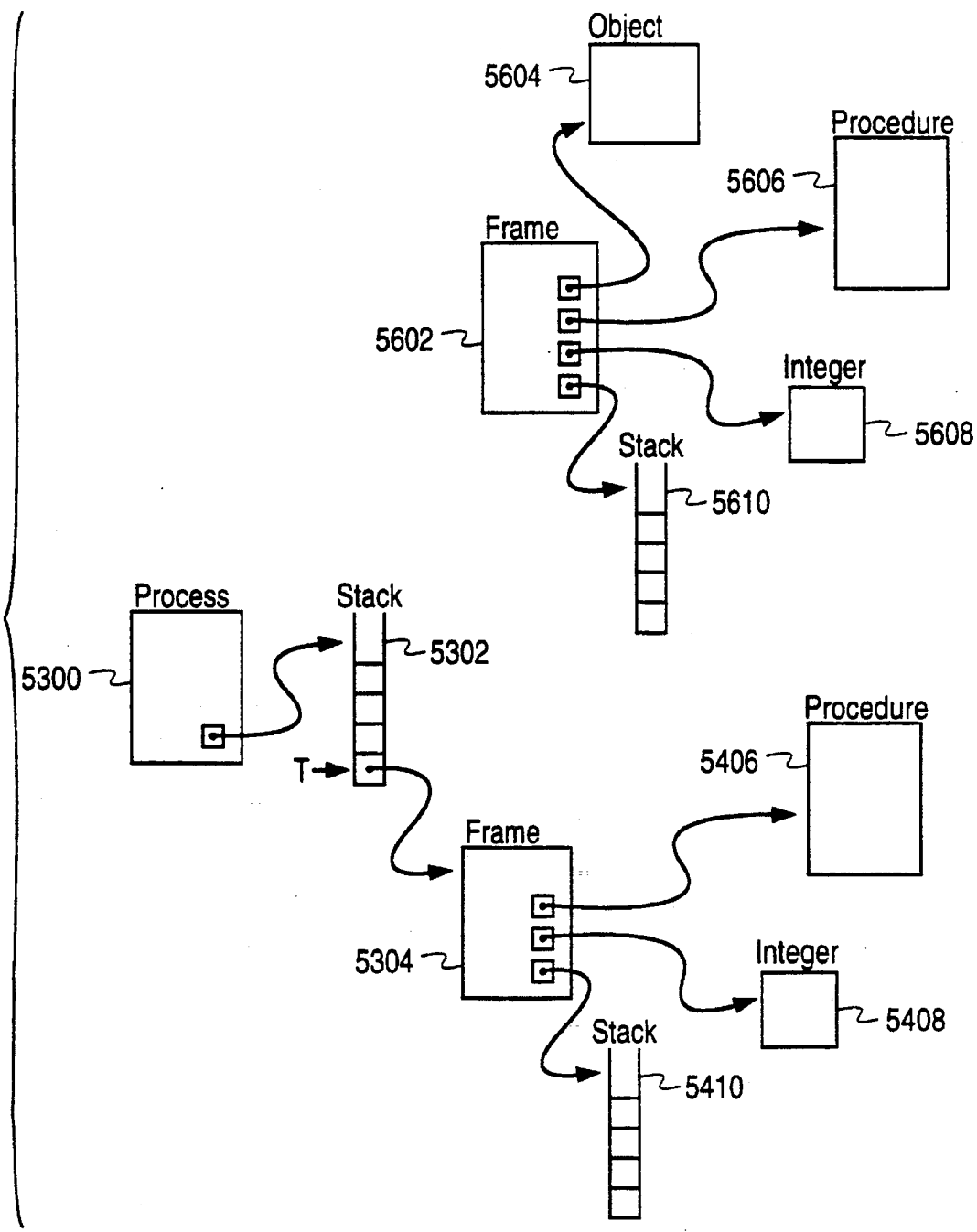
FIG. 56B shows the execution state of the process of FIG. 56A and a second frame.
Figure 56C:
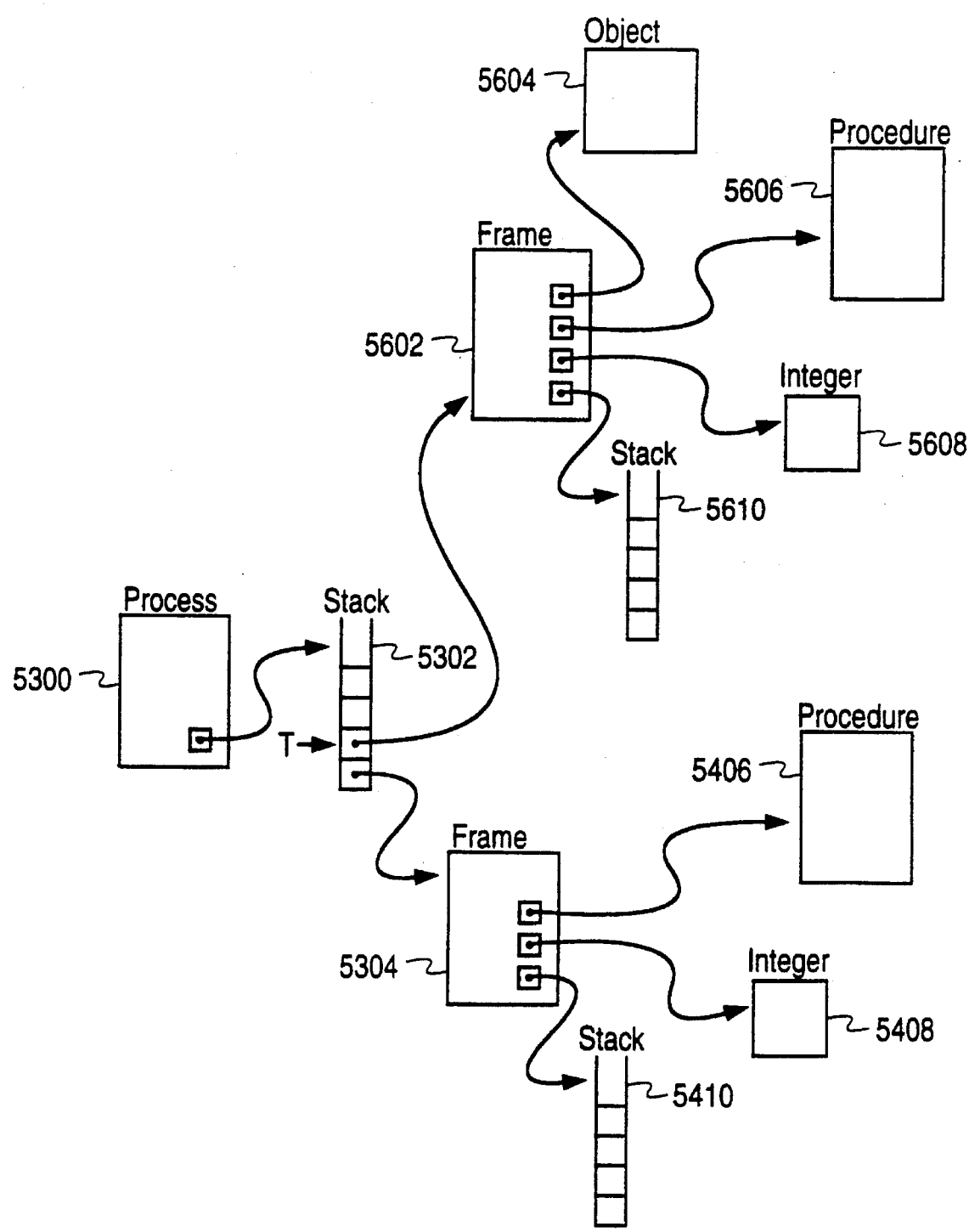
FIG. 56C shows the execution state of the process of FIGS. 56A and 56B, including the stack, which in turn includes the first-mentioned frame and the second frame.

Logic flow diagram 5500 is discussed in the context of FIGS. 56A–56C. Stack 5302 (FIG. 56A) is the execution thread, i.e., property "frames", of process 5300. User-defined frame 5304 is the current frame. The current frame is the frame containing the procedure, i.e., procedure 5406, whose items are currently being executed by an engine. In other words, the next executed object, which an engine executes in the interpretation of process 5300, is retrieved from the procedure of user-defined frame 5304.

Procedure 5406 is property "procedure" of user-defined frame 5304. Integer 5408 is property "position" of user-defined frame 5304 and indicates the position within procedure 5406 of the item whose execution was most recently begun by the engine processing process 5300.

The execution of an identifier occurs when the item of procedure 5406 at the position indicated by integer 5408 is an identifier. In this example, the identifier references an operation. The operation referenced by the identifier is sometimes called "the subject operation" in the context of FIGS. 56A–56C and 55. The execution of the identifier is shown by logic flow diagram 5500 (FIG. 55).

The requester's stack, i.e. stack 5410, is produced by querying attribute "stack" of user-defined frame 5304 in step 5502. Since performance of procedure 5405 (FIG. 56A) of user-defined frame 5304 is requesting execution of the identifier at the position within procedure 5406 indicated by integer 5408, property "responder" of user-defined frame 5304, which is the current frame, is the requester of the operation referenced by the identifier. In the context of FIG. 56A, the responder is process 5300. Stack 5410 is therefore the "requester's stack".

Processing transfers from step 5502 (FIG. 55) to a stack empty test step 5504. At the time the identifier is executed, the object at the top of stack 5410 is the responder of the subject operation. In stack empty test step 5504, the engine interpreting process 5300 determines whether stack 5410 is empty. If stack 5410 is determined to be empty, processing transfers from stack empty test step 5504 to terminal step 5506 in which an exception of the class "Responder Missing" is thrown and the subject operation fails. Otherwise, if stack 5410 is not empty, processing transfers from stack empty test to step 5508 in which the object (not shown) at the top of stack 5410 is popped from stack 5410. The object popped from stack 5410 is the intended responder of the subject operation of the executing identifier and is sometimes referred to as "the responding object" in the context of FIGS. 56A–56C and 55.

It should be noted that the subject operation is user-defined and therefore represented by a user-defined frame. Features which are predefined are represented directly in an engine. In other words, the instructions which form a predefined operation are included in the instructions which form the computer process that is an engine. If the executed identifier references a predefined operation, the instructions which define the operation within the engine are located and performed. One implementation of an engine of one embodiment of the present invention, including instructions which define the predefined operations described herein and in Appendix A, is disclosed in the software of Microfiche Appendix G which is incorporated herein in its entirety by reference.

Processing transfers from 5508 to step 5510. In step 5510, the operation definition defining the subject operation is retrieved. The selection of the operation definition and the associated method object is discussed below in detail. Processing transfers from step 5510 to access test step 5512. In access test step 5512, the access of the subject operation is verified. Property "isPublic", e.g., boolean 4404 (FIG. 44), is retrieved from the operation definition. If the access of the subject operation is not "public", i.e., if property "isPublic" is "false", and the responding object is not property "responder" (not shown) of user-defined frame 5304, processing transfers from access test step 5512 to terminal step 5514.

In terminal step 5514, an exception of class "Feature Unavailable" is thrown and the subject operation fails. Otherwise, if property "isPublic" is "true" or the responding object is property "responder" of user-defined frame 5304, the access of the subject operation is acceptable and processing transfers from access test step 5512 to number of arguments test step 5516.

In number of arguments test step 5516, property "arguments" of the operation definition is produced by querying attribute "arguments" of the operation definition. The number of items in the list of property "arguments" is compared to the number of objects on stack 5410. If property "arguments" defines a number of arguments that is greater than the number of objects present on stack 5410, processing transfers from number of arguments test step 5516 to terminal step 5518. In terminal step 5518, an exception of class "Argument Missing" is thrown, causing the subject operation to fail.

It should be noted that any exception thrown by execution of the identifier which references the subject operation, e.g., in either terminal step 5506 or terminal step 5514, causes the subject operation to fail, throwing the same exception.

If stack 5410 contains at least as many objects as there are arguments as indicated by property "arguments" of the operation definition retrieved in step 5510, processing transfers from number of arguments test step 5516 to classes of arguments test step 5520. In classes of arguments test step 5520, the engine interpreting process 5300 determines whether each object on stack 5410 in the position of an argument satisfies the corresponding constraint within the list that is property "arguments" of the operation definition retrieved in step 5510. For example, constraint 4502I of list 4502 (FIG. 45), which is property "arguments" of operation definition 4500, corresponds to the object at the top of stack 5410. The structure of a constraint is discussed in greater detail above and in Appendix A.

As discussed above in greater detail, a constraint restricts an object by specifying (i) a class of which the object must be a member, (ii) whether the object must also be an instance of the class specified, and (iii) whether a nil satisfies the constraint irrespective of the class specified. Each object on stack 5410 which corresponds to a constraint is examined to determine whether the object satisfies the constraint in classes of arguments test step 5520. If any of the objects on stack 5410 does not satisfy the corresponding constraint of property "arguments" of the operation definition, processing transfers from classes of arguments test step 5520 to terminal step 5522 in which an exception of class "Argument Invalid" is thrown.

Conversely, if each of the objects on stack 5410 satisfies the corresponding constraint, processing transfers from class of arguments test step 5520 to step 5524. In step 5524, the method object defining the implementation of the subject operation in the context of the responding object is selected. The method object is selected from the classes of which the responding object is a member as discussed in greater detail below.

Processing transfers from step 5524 to step 5526 in which a new user-defined frame 5602 (FIG. 56B) is created. Responding object 5604 is made property "responder" of new user-defined frame 5602. Property "procedure" of the method object selected in step 5524 is procedure 5606 and is made property "procedure" of new user-defined frame 5602. Property "position" of user-defined frame 5602 is initialized to be an integer 5608 whose value is zero. And property "stack" is initialized to an empty stack 5610.

Once new user-defined frame 5602 is created, processing transfers from step 5526 to step 5528 in which objects are moved from stack 5410 of user-defined frame 5304 to stack 5610 of user-defined frame 5602. Objects are moved from stack 5410 to stack 5610 such that the order of objects is preserved. In other words, the topmost argument on stack 5410 is at the top of stack 5610, and the bottommost argument on stack 5410 is at the bottom of stack 5610. Each object is moved according to property "passage" of the corresponding constraint of property "arguments" of the retrieved operation definition.

If property "passage" is "byRef", the reference to the object is popped from stack 5410 and is pushed on to stack 5610. Thus, procedure 5606 of new user-defined frame 5602 has the same access to the argument as does procedure 5406 of requesting user-defined frame 5304.

If property "passage" is "byProtectedRef", the reference to the object is popped from stack 5410, is made a protected reference, and is pushed on to stack 5610. Thus, procedure 5606 of new user-defined frame 5602 cannot alter the argument and the argument is therefore "readonly".

If property "passage" is "byUnprotectedRef", whether the reference to the argument on stack 5410 of requesting user-defined frame 5304 is protected is determined. Such a determination is made by querying attribute "isProtected" which is described more completely in Appendix A. If the reference is protected, an exception of class "Reference Protected" is thrown. Otherwise, the reference is popped from stack 5410 and is pushed on to stack 5610. Thus, procedure 5606 of new user-defined frame 5602 is provided access to alter the argument passed by unprotected reference.

If property "passage" is "byCopy", a copy is made of the object found on stack 5410 and an unprotected reference to the copy is pushed on to stack 5610 of new user-defined frame 5602. Thus, procedure 5606 is given unrestricted access to a copy of the argument, which is passed by copy, but has no access to the argument itself.

Thus, new user-defined frame 5602 is complete and represents the dynamic state of the subject operation immediately preceding performance of the subject operation. Processing transfers from step 5528 (FIG. 55) to step 5530 in which new user-defined frame 5602 is included in the execution state of process 5300 by being pushed on to stack 5302 (FIG. 56C). Thus, stack 5410 and the method object whose property "procedure" is procedure 5406 are no longer the current stack and current method, respectively. Stack 5610 is the current stack and the method object whose property "procedure" is procedure 5606 is the current method. Processing transfers from step 5530 (FIG. 55) to step 5532. In step 5532, procedure 5606 (FIG. 56C) of user-defined frame 5602 is performed.

As performance of procedure 5406 executes an identifier which invokes performance of the subject operation and the creation of user-defined frame 5602, performance of procedure 5606 of user-defined frame 5602 can execute identifiers which invoke further operations thereby creating further frames which are subsequently pushed on to stack 5302 and whose procedures are subsequently performed. Thus, the execution state of process 5300 is represented by one or more frames on stack 5302, which is property "frames" of process 5300 representing a thread of execution.

After performance of procedure 5606, user-defined frame 5602 represents the dynamic state of the subject operation immediately following performance of the operation. Stack 5610 of user-defined frame 5602 contains the result, if any, produced by performance of the subject operation. Processing transfers from step 5532 (FIG. 55) to step 5534 in which property "result" of the operation definition defining the subject operation is produced by querying attribute "result" of the operation definition. Processing transfers from step 5534 to result test step 5536, in which the membership of property "result" in class "Constraint" is determined. In other words, property "result" is verified to be a constraint and not a nil. If property "result" is a constraint and not a nil, the subject operation produces a result and processing transfers from result test step 5536 to a stack empty test step 5538.

In stack empty test step 5538, the engine interpreting process 5300 (FIG. 56C) determines whether an object is present on stack 5610. If stack 5610 is empty, processing transfers from stack empty test step 5538 (FIG. 55) to terminal step 5540. In terminal step 5540, an exception of class "Result Missing" is thrown. If stack 5610 (FIG. 56C) contains an object, processing transfers from stack empty test step 5538 (FIG. 55) to class of result test step 5542. In class of result test step 5542, the engine interpreting process 5300 (FIG. 56C) determines whether the object on stack 5610 satisfies the constraint that is property "result" of the operation definition. If the object does not satisfy the constraint, processing transfers from class of result test step 5542 (FIG. 55) to terminal step 5544. In terminal step 5544, an exception of class "Result Invalid" is thrown. If the object satisfies the constraint, processing transfers from class of result test step 5542 to step 5546.

In step 5546, the object is moved from stack 5610 (FIG. 56C) of user-defined frame 5602 to stack 5410 of user-defined frame 5304 according to property "passage" of the operation definition as described above. Processing transfers from step 5546 (FIG. 55B) to step 5548.

If, in result test step 5536, property "result" is nil, processing transfers directly to step 5548. In step 5548, new user-defined frame 5602 is popped from stack 5302 (FIG. 56B) and discarded (FIG. 56A). Thus, stack 5410 and the method object whose property "procedure" is procedure 5406 are again the current stack and the current method, respectively. Processing transfers from step 5548 (FIG. 55B) to step 5550 in which execution of procedure 5406 is continued by incrementing integer 5408 and executing the item of procedure 5406 at the position indicated by integer 5408. Thus, execution of an identifier which references an operation causes performance of the operation.

Operation Definition and Method Selection

Figure 55A:
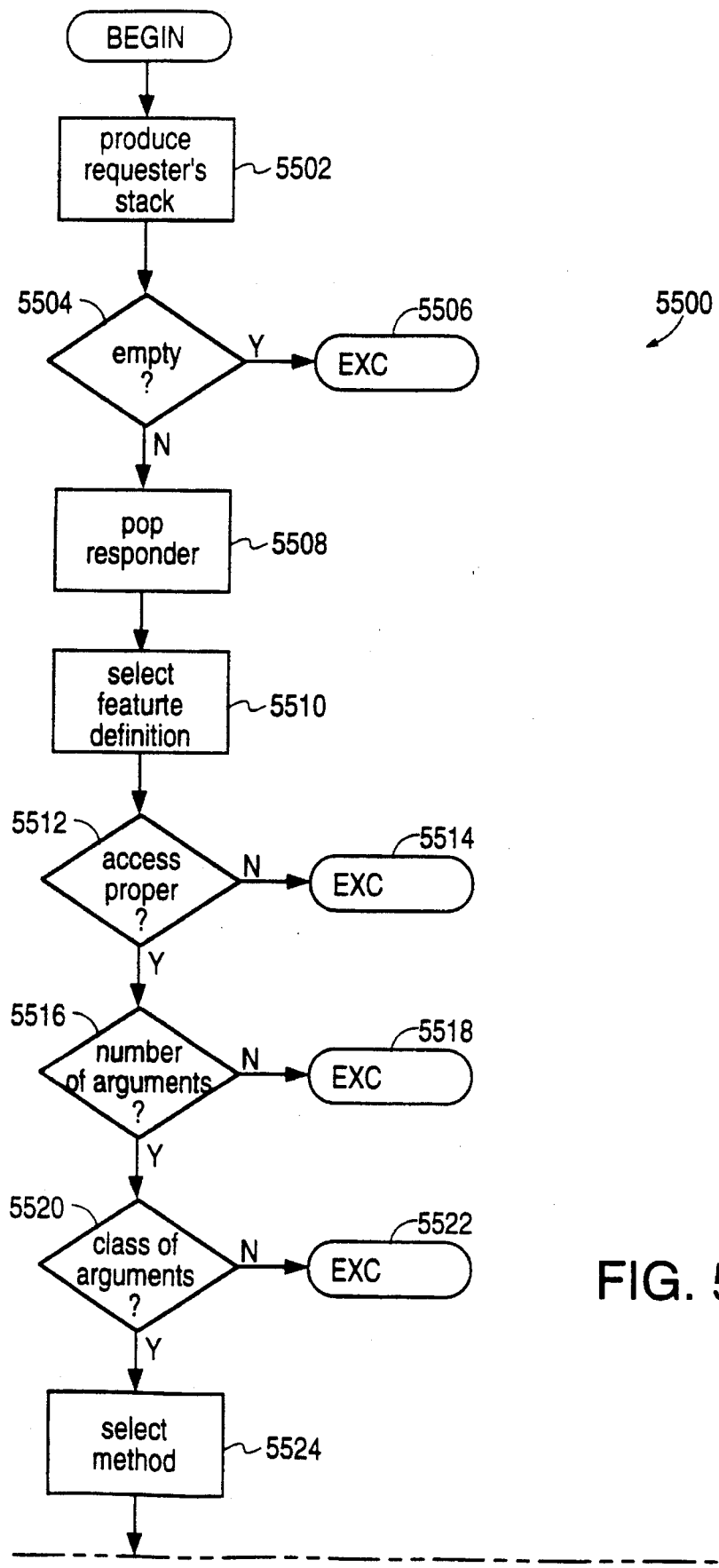
Figure 55B:
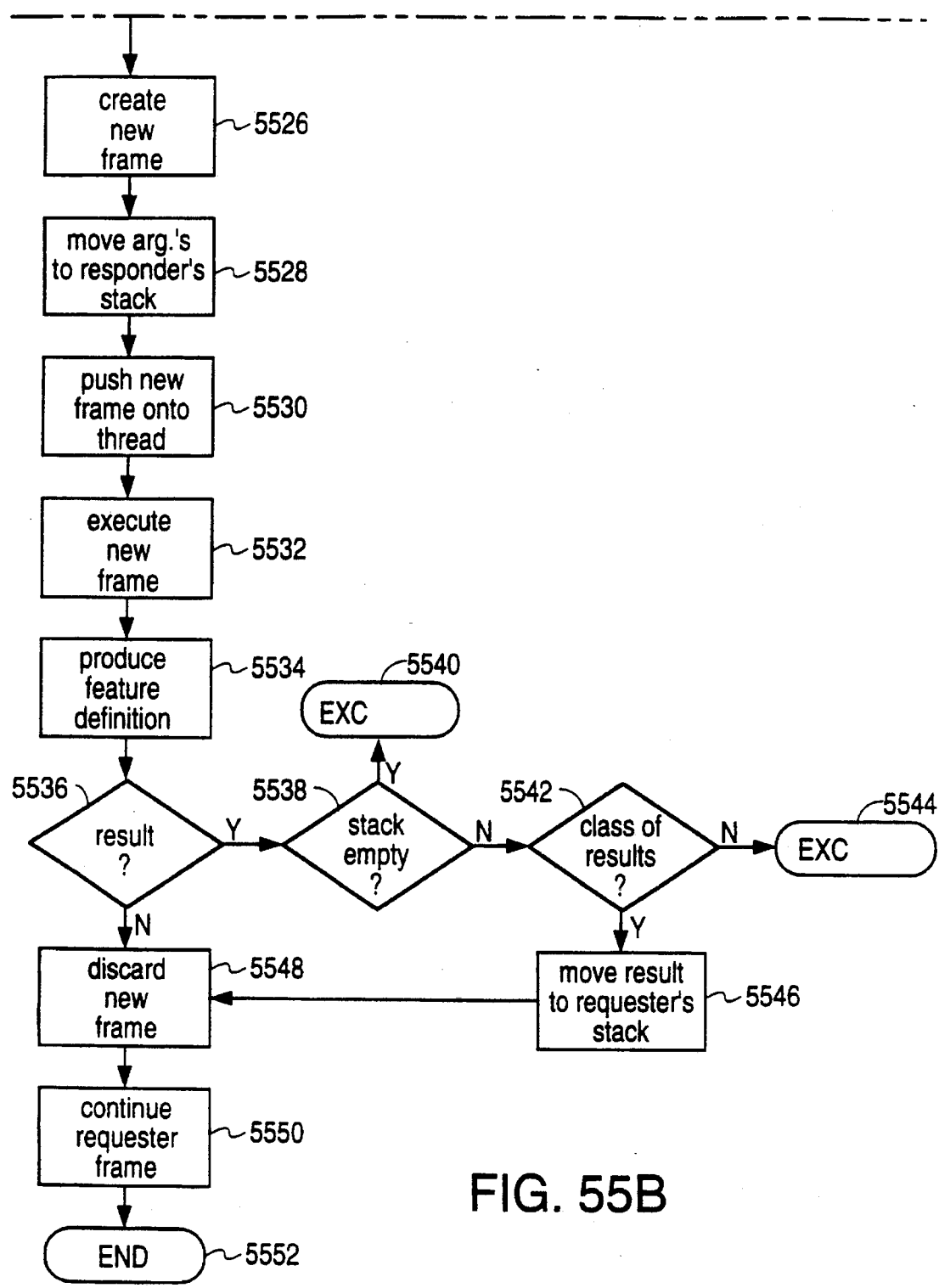
Figure 57:
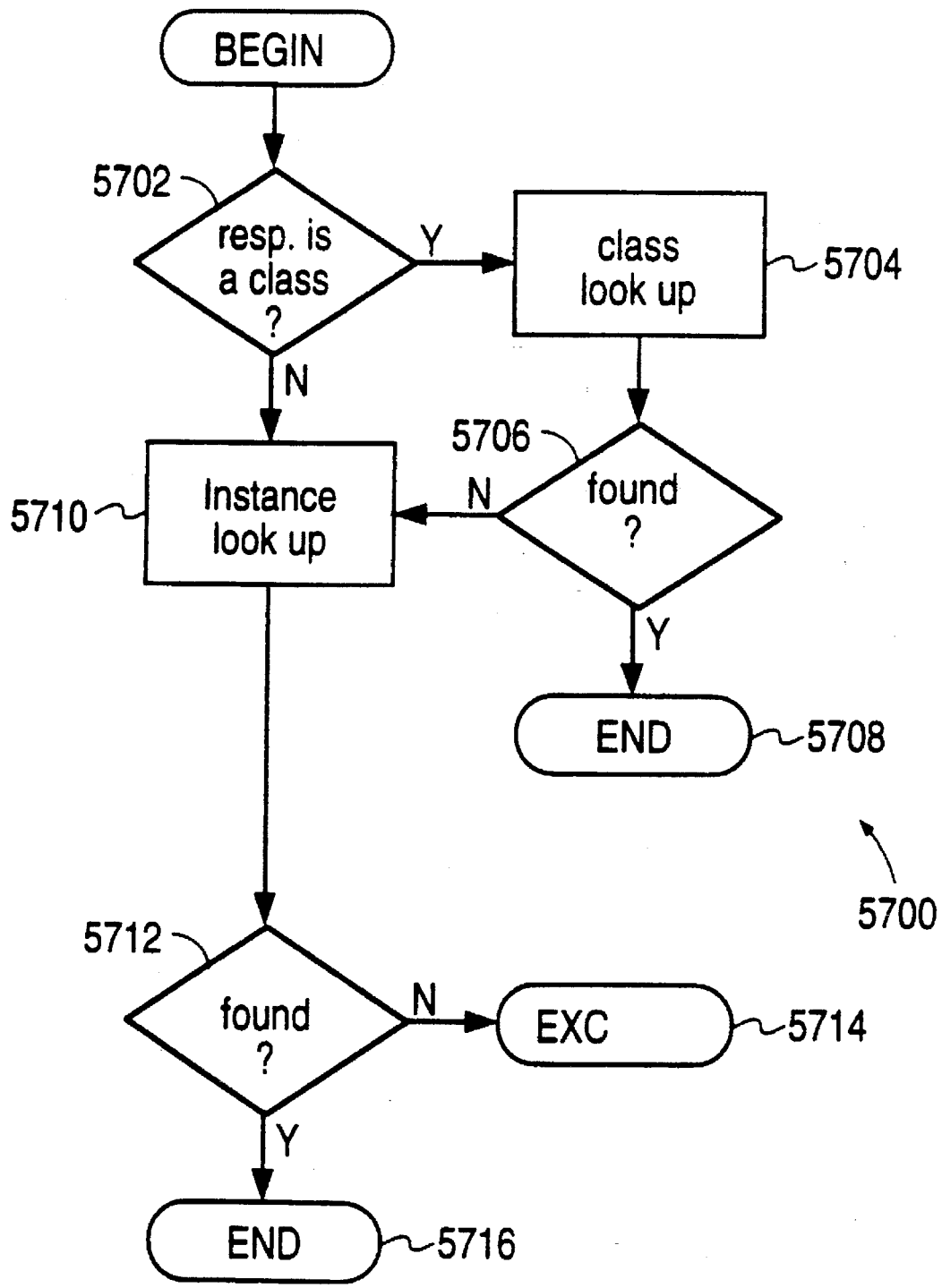
FIG. 57 is a logic flow diagram illustrating the steps taken in selecting a feature definition and a method from the class hierarchy in accordance with the present invention.

As discussed above, an operation definition and a method object, which together define the subject operation, are selected in steps 5510 and 5524, respectively (FIG. 55A). The selection of the operation definition and method are described in the context of the embodiment of the present invention described above with respect to FIG. 41B. In that embodiment, class object 4102 is formed by replicating properties "citation", "interface" and "implementation" of class definition 4100. The selected operation definition is selected from an interface object, and the selected method object is selected from an implementation object. The operation definition and method object are each selected according to logic flow diagram 5700 (FIG. 57).

The operation definition and method object, which are appropriate, depend on the class of which the responding object is an instance. The responding object is examined to determine whether the responding object is a class object, i.e., is a member of class "Class" in a class test step 5702. If the responding object is a class object, processing transfers from class test step 5702 to a class lookup step 5704. In class lookup step 5704, property "classFeatures" of the responding object and the interface superclasses of the responding object are searched as discussed below. The lexicon of class features, i.e., property "classFeatures", is searched for a key which matches the identifier of the subject operation, i.e., the executing identifier. Additionally, in class lookup step 5704, property "classMethods" of the responding object and the implementation superclasses of the responding object are searched, as discussed below, for a method object associated with the executing identifier.

Processing transfers from class lookup step 5704 to a test step 5706 in which the engine interpreting the current process, e.g., process 5300 (FIG. 56A), determines whether an operation definition and a method object are found in class lookup step 5704. If an operation definition and a method object defining the subject operation are found, processing transfers from test step 5706 to terminal step 5708 where the selection process terminates. Otherwise, processing transfers from test step 5706 to instance lookup step 5710. Additionally, if the responding object is not a class object, i.e., is not a member of class "Class", processing transfers directly from class test step 5702 to instance lookup step 5710.

In instance lookup step 5710, property "instanceFeatures" of the interface object of the class of which the responding object is an instance and of the interface objects of the interface superclasses of that class are searched for a feature definition associated with the executing identifier. Also in instance lookup step 5710, property "instanceMethods" of the implementation of the class of which the responding object is an instance and of the implementations of the implementation superclasses of that class are searched for a method object associated with the executing identifier. The order in which superclasses are searched is discussed below.

It should be noted that if the responding object is a class object, a class method can only implement a class feature and an instance method can only implement an instance feature.

Processing transfers from instance lookup step 5710 to a second test step 5712 in which the engine determines whether an operation definition and a method object are found in instance lookup step 5710. If an operation definition and method object identified by the executing identifier are found, processing transfers from second test step 5712 to terminal step 5716. In terminal step 5716, the selection process terminates successfully. Otherwise, processing transfers from second test step 5712 to terminal step 5714. In terminal step 5714, an exception of class "Feature Unavailable" is thrown.

Figure 58A:
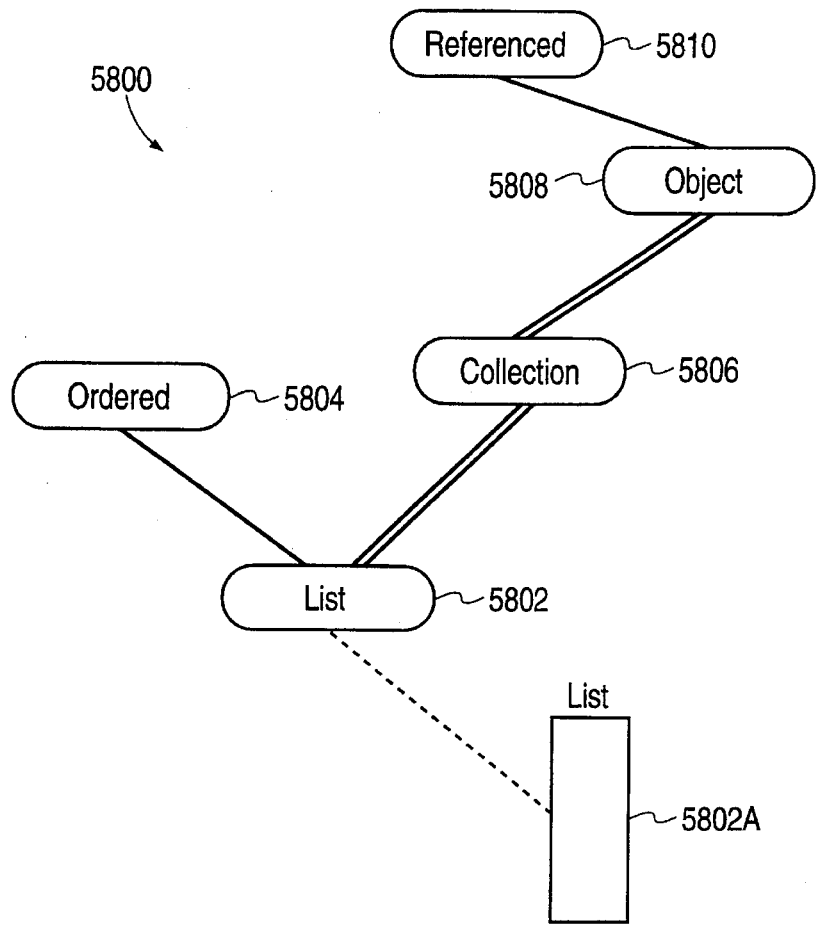
FIG. 58A is a diagram showing the hierarchy of the classes of which a list is a member.
Figure 58B:
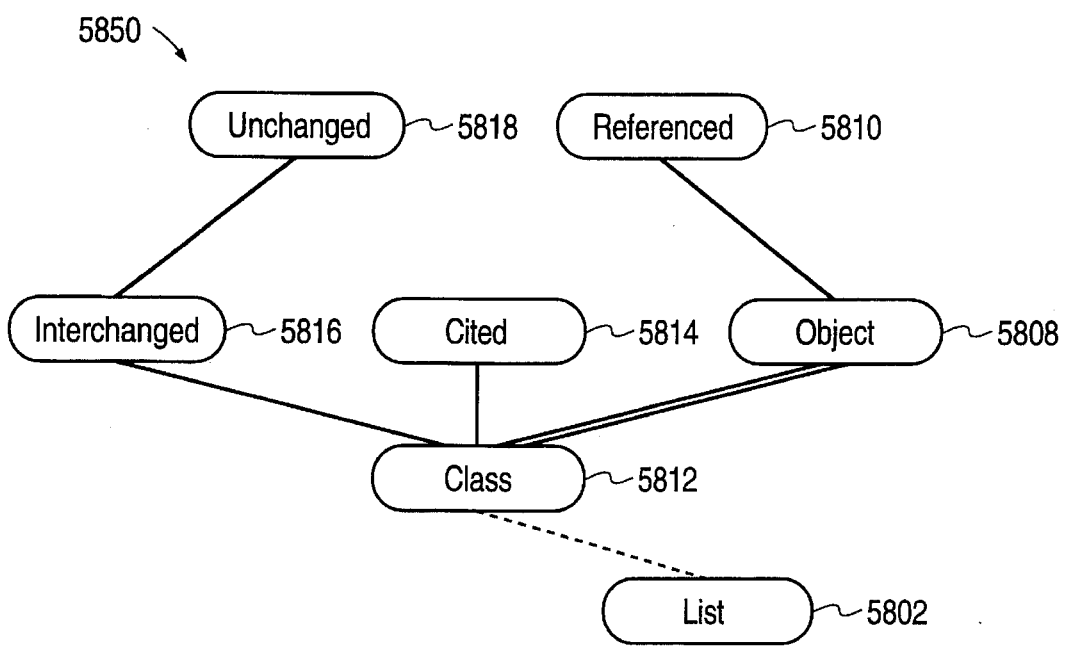
FIG. 58B is a diagram showing the hierarchy of the classes of which class "List" is a member.

Portions of the predefined hierarchy, which is disclosed in Appendix A which discussion is incorporated herein in its entirety by reference, are shown in FIGS. 58A and 58B to illustrate the order in which various classes are searched for appropriate operation definitions and method objects. While FIG. 58A and 58B show portions of the predefined interface hierarchy, the method by which the implementation hierarchy is searched is as described below with respect to the searching of the interface hierarchy.

Hierarchy graph 5800 (FIG. 58A) shows class object 5802 representing class "List". Class "List" inherits from mix-in superclass "Ordered" and flavor superclass "Collection" represented by class objects 5804 and 5806, respectively. Class "Collection" inherits from superclass "Object" represented by class object 5808. Class "Object" inherits from mix-in superclass "Referenced" represented by class object 5810. In FIGS. 58A and 58B, (i) double lines are drawn between flavor classes and subclasses of the flavor classes, (ii) single solid lines are drawn between mix-in classes and subclasses of the mix-in classes, and (iii) a dashed line is drawn between a class and an instance of the class. As discussed above, the last item of property "superclasses" of either an interface object or an implementation object must not identify a mix-in class. The reason for this is discussed below.

Suppose for illustration purposes that the responding object in the context of logic flow diagram 5700 (FIG. 57) is class object 5802 (FIG. 58A) representing class "List". In class lookup step 5704 (FIG. 57), property "classFeatures" of the interface object, which is property "interface" of class object 5802, is searched for an association whose key is the executing identifier. If such an association is found, the feature definition associated with the identifier is an operation definition which defines the interface of the subject operation and is selected and the search for an operation definition concludes.

If, however, no such association is found, the interface object of the first superclass of class "List", namely, class "Ordered" is searched in the same manner for an appropriate operation definition. If no appropriately identified operation definition is found, the superclasses of class "Ordered" are searched in a depth-first walk of the interface hierarchy. Since class "Ordered" has no superclasses, the next item of property "superclasses" of the interface object of class "List", i.e., class "Collection", is searched as described above. Since the last superclass searched is not a mix-in class, every mix-in superclass is searched before the flavor superclass is searched.

Thus, in the manner described above with respect to class "List", the remainder of the class objects of FIG. 58A are searched in the following order: class object 5808 representing class "Object" and class object 5810 representing class "Referenced".

The search for an appropriate method object defining the implementation of the subject operation is as described above for the search for an appropriate operation definition with two exceptions. First, property "classMethods" of the implementation object of a class is searched for an appropriately identified method object. Second, the implementation superclasses, rather than the interface superclasses, of class "List" are searched for an appropriately identified method object.

The importance of the single flavor superclass being the last superclass searched is apparent if one considers the following hypothetical example. Suppose, for example, that class object 5806, which represents flavor "Collection", and class objects representing superclasses of class "Collection" are searched before searching class object 5804, which represents mix-in class "Ordered". Suppose further than class object 5808, which represents class "Object", defines one or more features which are adapted by class "Ordered", i.e., whose methods are supplied by class object 5804. Since class object 5808, in this hypothetical example, will always be searched before class object 5804, the method for any feature defined by class object 5808 will always be found in class object 5808. It would therefore be impossible for class object 5804 to adapt any feature defined by class object 5808. Therefore, the flavor superclass of a flavor is always the last superclass of that flavor that is searched for an operation definition or method.

Continuing in the illustrative example in which the responding object in the context of logic flow diagram 5700 (FIG. 57) is class object 5802 (FIGS. 58A and 58B) representing class "List", hierarchy graph 5850 (FIG. 58B) shows the classes searched in instance lookup step 5710 (FIG. 57). The search for an operation definition and method object for an instance feature of class object 5802 (FIG. 58B) differs from the search for an operation definition and method object for a class feature as described above in two ways. First, property "instanceFeatures" of the interface object of a class is searched for an appropriately identified operation definition, and property "instanceMethods" of the implementation object of a class is searched for an appropriately identified method object. Second, the classes of which the responding object, i.e., class object 5802, is a member are searched.

The manner in which the classes are searched is equivalent to that described above and is not repeated here. The following classes are searched in the following order until an appropriate operation definition and method object are found or until all classes which follow have been searched: (i) class object 5812 representing class "Class" of which class object 5802 is an instance; (ii) class object 5816 representing class "Interchanged", a mix-in superclass of class "Class"; (iii) class object 5818 representing class "Unchanged", a mix-in superclass of mix-in class "Interchanged" and therefore of class "Class"; (iv) class object 5814 representing class "Cited", a mix-in superclass of class "Class"; (v) class object 5808 representing class "Object", a flavor superclass of class "Class"; and (vi) class object 5810 representing class "Referenced", a mix-in superclass of class "Object".

If no operation definition or no method object associated with the executing identifier is found in searching the classes of FIGS. 58A and 58B, the operation is not defined for the responding object and an exception of class "Feature Undefined" is thrown.

As described above, if the responding object is not a class, class lookup step 5704 (FIG. 57) is skipped. For example, if the responding object is list 5802A which is an instance of class "List", the classes shown in hierarchy graph 5800 (FIG. 58A) are searched in instance lookup step 5712 (FIG. 57) as described above.

In one embodiment of the present invention, the interface and implementation hierarchies are independent. In other words, an interface superclass of a class is not necessarily an implementation superclass of the class, and an implementation superclass of a class is not necessarily an interface superclass of the class. An engine ensures that no feature definition is without an implementation, in such an embodiment, during performance of operation "makeClasses". Operation "makeClasses" fails, throwing an exception of class "Class Exception", upon the following condition: the class defined is not abstract, and the class defined does not define, or inherit from implementation superclasses, a method which implements a defined feature. Thus, a feature defined in the interface hierarchy is always implemented by a method found in the implementation hierarchy.

Thus, an appropriate operation definition and method object for the subject operation are found by searching the class hierarchy as discussed above or an exception is thrown.

Escalation

As discussed above, a class which inherits a feature from a superclass can supersede the implementation of the feature by providing a new implementation for the feature. However, the new implementation may need to use the implementation provided by the superclass. An object is directed to perform a feature as implemented by a particular one or by any one of the immediate superclasses of the current class by escalating the feature. As described more completely in Appendix A, the current class is the class which provides the currently executing method.

A feature is escalated by executing a qualified identifier which references the feature to be escalated or by executing an "escalate" selector. A qualified identifier includes property "qualifier" which identifies the class which is to provide the implementation of the feature. If a feature is escalated by execution of an "escalate" selector, any immediate implementation superclass can provide the implementation of the feature.

It should be noted that no attribute is defined which provides access to property "qualifier" of a qualified identifier. Property "qualifier" of a qualified identifier is set when the qualified identifier is created and remains unaltered until the qualified identifier is destroyed. Escalation of a feature is discussed further in Appendix A.

Figure 59:
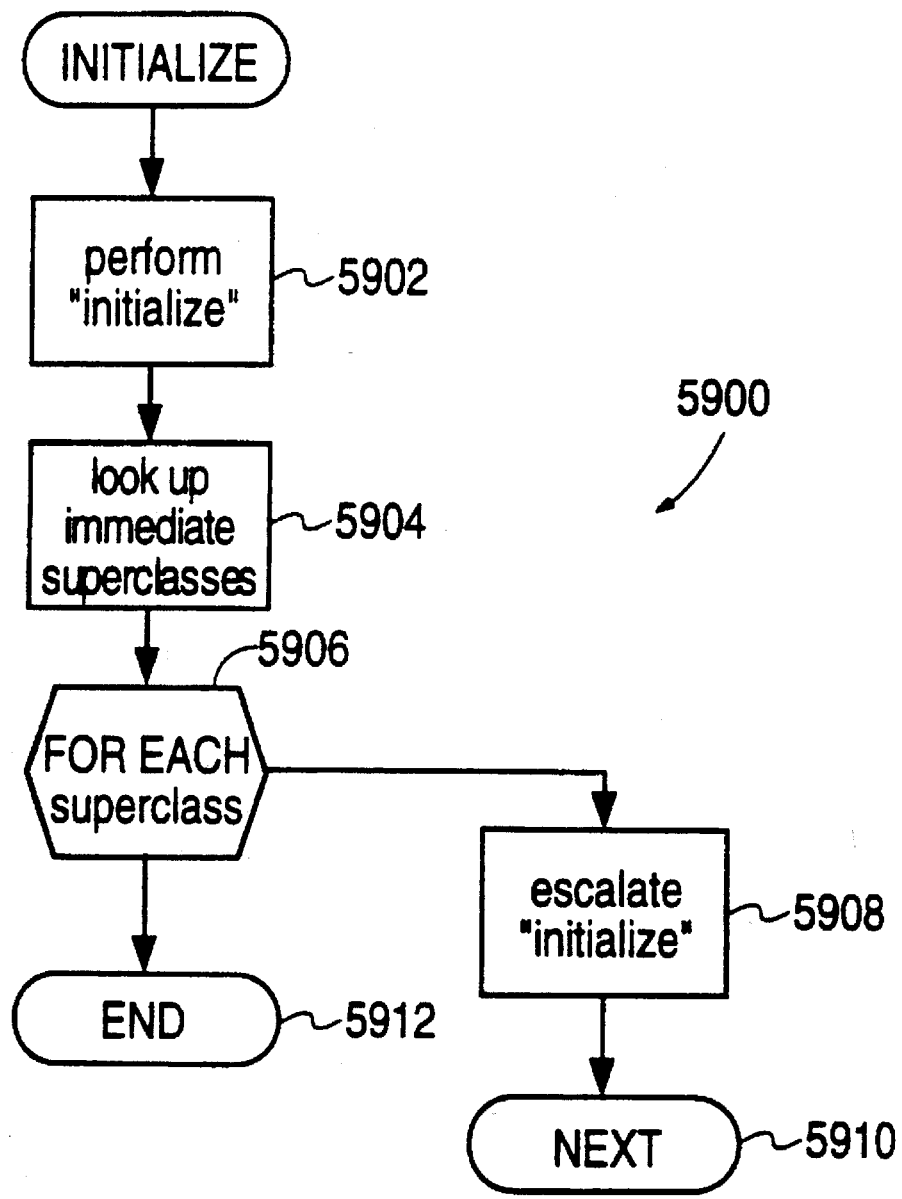
FIG. 59 is a logic flow diagram illustrating the steps taken in the initialization of an object.

Escalation plays a particularly important role in initializing objects. Appendix A includes a description of an initialization for each predefined class of the present invention. The initialization of an object is shown by logic flow diagram 5900 (FIG. 59) which is discussed in the illustrative context of the initialization of a list, i.e. an instance of class "List". Operation "initialize" is escalated for each immediate implementation superclass of class "List". As discussed above, hierarchy diagram 5800 (FIG. 58A) represents the interface superclasses of class "List". Hierarchy diagram 5800 also accurately represents the implementation superclasses of class "List".

Operation "initialize", as defined by the class of which the new list is an instance, i.e. class "List", is performed in step 5902. Performance of operation "initialize" consumes zero or more arguments from the current stack. Processing transfers from step 5902 to step 5904. In step 5904, property "superclasses" of the implementation object of class "List" is produced by querying attribute "superclasses" of the implementation object. As described above, property "superclasses" of an implementation object is a list of identifiers which reference classes. Processing transfers from step 5904 to for each superclass step 5906.

For each superclass step 5906 and next step 5910 define a loop in which each superclass of property "superclasses" produced above is processed in an escalate step 5908. Thus, for each superclass, processing transfers from for each superclass step 5906 to escalate step 5908. In escalate step 5908, the superclass is directed to perform operation "initialize". according to logic flow diagram 5900. Thus, logic flow diagram 5900 is performed recursively in a depth-first walk of the implementation hierarchy. For example, the first immediate superclass, to which "initialize" is escalated in escalate step 5908, (i) performs "initialize" in step 5902, (ii) produces immediate implementation superclasses of the superclass in step 5904 and (iii) escalates "initialize" to each superclass of the superclass in the loop defined by for each superclass step 5906 and next step 5910.

Processing transfers from escalate step 5908 through next step 5910 to for each superclass step 5906. Thus, initialization is escalated to each immediate implementation superclass in the order found in the list that is property "superclasses". Each performance of operation "initialize" by a superclass of class "List" consumes zero or more arguments from the current stack and escalates the initialization to the immediate implementation superclasses of the superclass.

Once each immediate implementation superclass of class "List" has performed operation "initialize" according to the loop of for each superclass step 5906 and next step 5910, processing transfers from for each superclass step 5906 to terminal step 5912. In terminal step 5912, performance of operation "initialize" as defined by class "List" completes successfully. Thus, each class of which the new list is a member performs operation "initialize" in the order in which classes are searched in instance lookup step 5710 (FIG. 57) described above.

Execution of Modifiers

The execution of an identifier is discussed at length above and in Appendix A. However, the presence of a modifier or the nature of the identifier can alter the execution of the identifier. For example, according to the modifier substitution rules discussed in Appendix A, if the identifier identifies an attribute, operation "getAttribute" is performed consuming as the sole argument the executing identifier. The various modifiers and the effects on the execution of an identifier are discussed in Appendix A and such discussion is hereby incorporated by reference.

Execution of Selectors

A selector is a primitive whose execution causes a special action. While each selector is discussed in Appendix A, several selectors are discussed herein. For example, selectors "break", "continue" and "succeed" are discussed below in the context of performing procedures. Execution of selector "self" pushes on to the current stack a reference to the current object, i.e. the responder of the current method. In the context of FIG. 56C, the current object is object 5604 which is property "responder" of frame 5602, the current stack is stack 5610 which is property "stack" of frame 5602, and the current method is the method object whose property "procedure" is procedure 5606. Execution of selector "process" pushes on to the current stack a reference to the current process. In FIG. 56C, the current process is process 5300. If the current process is an engine place, a nil is pushed on to the current stack.

Thus, an engine created according to the present invention executes procedures by sequential execution of the items of the procedures. Execution of an item of a procedure when that item is an identifier causes execution of the feature referenced by the identifier under the circumstances described above. The dynamic state of a procedure being performed is recorded in a frame. Dynamic states of methods implementing features which are user-defined are recorded in user-defined frames. A feature definition and a method object defining the interface and implementation, respectively, of the feature are selected from the classes of which the responding object is a member. Implementations provided by superclasses of the current class are performed by escalating the feature. For example, operation "initialize" is recursively escalated such that the method provided by each class of which the responder is a member is performed. Modifiers are used to alter the execution of an identifier. And selectors provide a simple means by which commonly performed complex actions are caused by execution of a single object. These features combine to provide a great degree of functionality and generality in the disclosed set of computer instructions.

Control Constructs

As discussed above, an agent can apply sophisticated logic to determine to which place or places to travel and with which agent or agents to meet. The disclosed instruction set provides a number of instructions which provide a large degree of generality enabling the realization of complex and sophisticated logic in procedures constructed of the disclosed instruction set. The following control constructs which provide such a large degree of generality are discussed: (i) resources and resource allocation features provide processes with the ability to obtain and maintain shared or exclusive control of a resource during performance of a procedure; (ii) decision handling features enable processes to conditionally perform procedures; (iii) exception handling features enable processes to detect and take action upon the throwing of an exception; and (iv) looping features enable a procedure to repeatedly perform a procedure to thereby efficiently perform repetitive tasks.

Resource and Resource Allocation Features

As discussed above and in Appendix A, an engine processing one or more processes does so concurrently. For example, engine 132B (FIG. 15E) concurrently processes agents 150A and 150B. At any point during performance of a first procedure by agent 150A carried out by engine 132B, engine 132B can temporarily suspend performance of the first procedure by agent 150A. Engine 132B is then free to carry out performance of a second procedure on behalf of agent 150B. At any point during performance of the second procedure, engine 132B can temporarily suspend performance of the second procedure on behalf of agent 150B and resume performance of the first procedure on behalf of agent 150A. In this manner, engine 132B concurrently processes agents 150A and 150B.

As discussed in Appendix A, an engine carries out performance of most of the predefined features atomically. A feature is performed atomically if the engine refuses to suspend performance of the feature for the purpose of processing another process until the feature has completed successfully or failed. When a feature is performed atomically, no process but the current process can alter or manipulate resources since no other process will be interpreted during performance of the feature. Those predefined features which are not performed atomically are discussed in Appendix A.

There is no mechanism for causing a user-defined feature to be performed atomically. Thus, a mechanism is needed to enable a process to obtain shared or exclusive use of a resource during performance of a user-defined feature or a predefined feature which is not performed atomically. A user is able to configure a process to obtain shared or exclusive use of a resource by use of operation "use" which is defined by class "Resource" and is described in detail in Appendix A. The dynamic state of a performance of operation "use" is recorded by a use frame of class "Use Frame". Use frames are discussed in Appendix B.

Conditional Execution of Executed Objects

An executed object is executed conditionally by performance of operation "if" or operation "either". Performance of operation "if" by a responding executed object consumes a boolean object and performs the executed object if the value of the boolean object is "true." It should be noted that procedures are executed objects, i.e., members of mix-in class "Executed", and that the performance of a procedure is discussed above with respect to FIGS. 52A and 52B.

Figure 60:
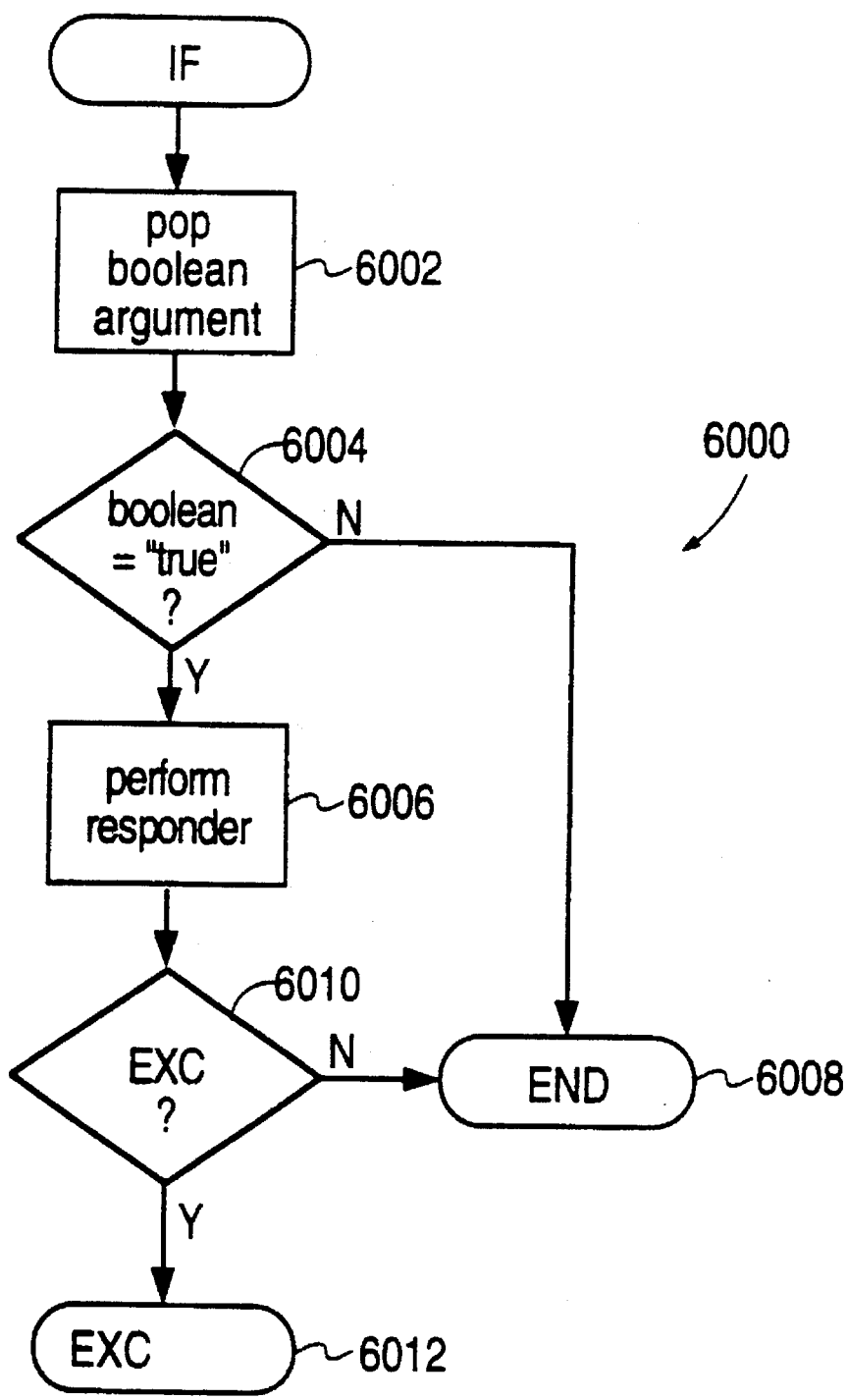
FIG. 60 is a logic flow diagram illustrating the steps taken in performance of operation "if".

Logic flow diagram 6000 (FIG. 60) shows the implementation of operation "if" as defined by mix-in class "Executed". In performing operation "if", the responding executed object pops a boolean object from the current stack in step 6002. Processing transfers from step 6002 to a boolean test step 6004, in which the boolean object popped in step 6002 is compared to "true". If the boolean object is "true", processing transfers from boolean test step 6004 to step 6006 in which the responding executed object is performed. Processing transfers from step 6006 to exception test step 6010 in which the engine carrying out performance of operation "if" determines whether execution of the responding executed object in step 6006 threw an exception.

If no exception is thrown in step 6006, processing transfers from exception test step 6010 to terminal step 6008. Additionally, processing transfers from boolean test step 6004 directly to terminal step 6008 if the boolean object is "false". In terminal step 6008, operation "if" completes successfully. If an exception is thrown in step 6006, processing transfers from exception test step 6010 to terminal step 6012 in which any exception thrown by performance of the responding executed object in step 6006 is thrown, causing operation "if" to fail. The dynamic state of a performance of operation "if" is recorded by a predefined frame, i.e. a member of class "Predefined Frame", which is discussed above and in Appendix B.

Figure 61:
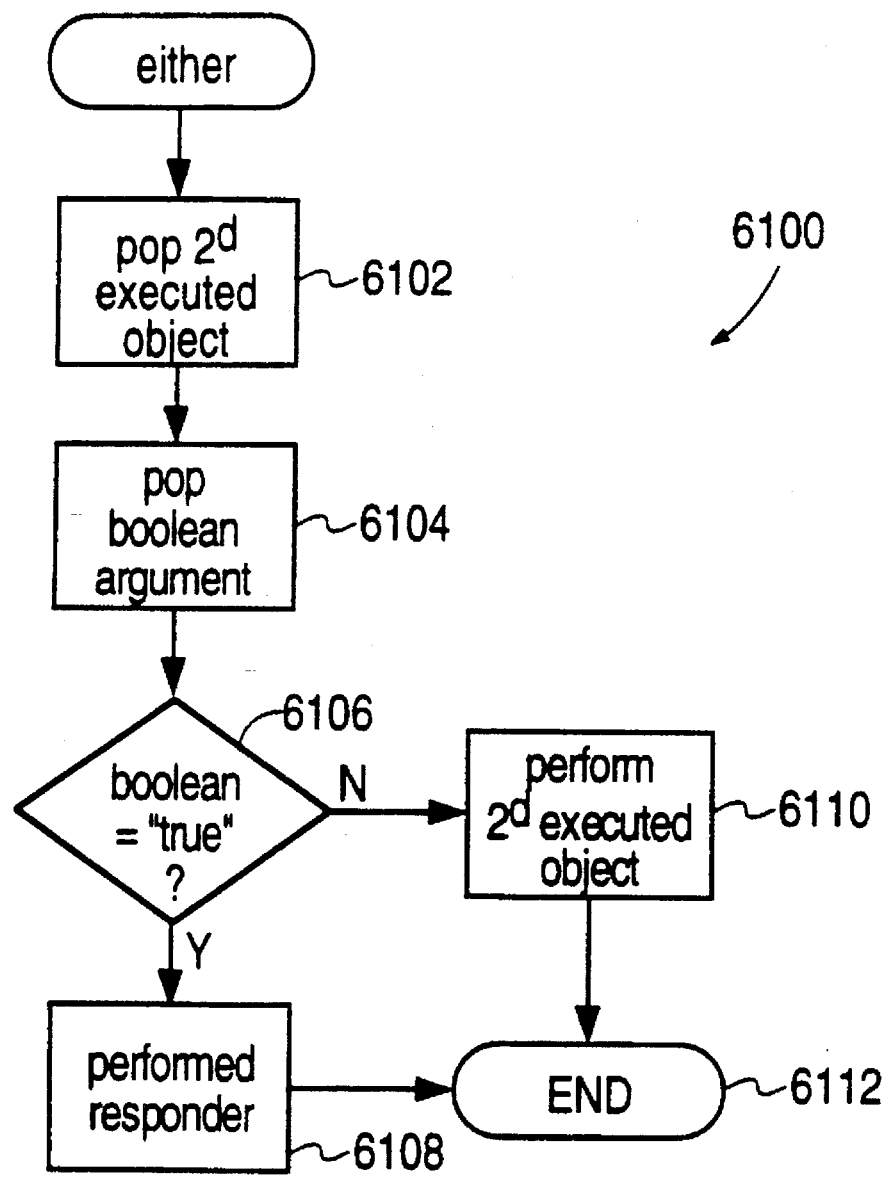
FIG. 61 is a logic flow diagram illustrating the steps taken in performance of operation "either".

One of two executed objects is selected and executed by use of operation "either". An executed object performs operation "either" by consuming a second executed object and a boolean object and causing execution of the responding executed object if the boolean object's value is "true" and, causing execution of the second executed object if the boolean object's value is "false." Logic flow diagram 6100 (FIG. 61) shows the implementation of operation "either" as defined by mix-in class "Executed".

The responding executed object pops from the current stack a second executed object in step 6102. Processing transfers from step 6102 to step 6104 in which the responding executed object pops from the current stack a boolean object. Processing transfers from step 6104 to boolean test step 6106 in which the boolean popped in step 6104 is compared to "true". If the boolean object is "true", processing transfers from boolean test step 6106 to step 6108 in which the responding executed object is performed. Conversely, if the value of the responding boolean object is "false", processing transfers from boolean step 6106 to step 6110 in which the second executed object is performed. Processing transfers from step 6108 or step 6110 to terminal step 6112. In terminal step 6112, operation "either" terminates, throwing any exception thrown in step 6108 or step 6110. The dynamic state of an executed object performing operation "either" is recorded by a predefined frame.

Figure 62A:
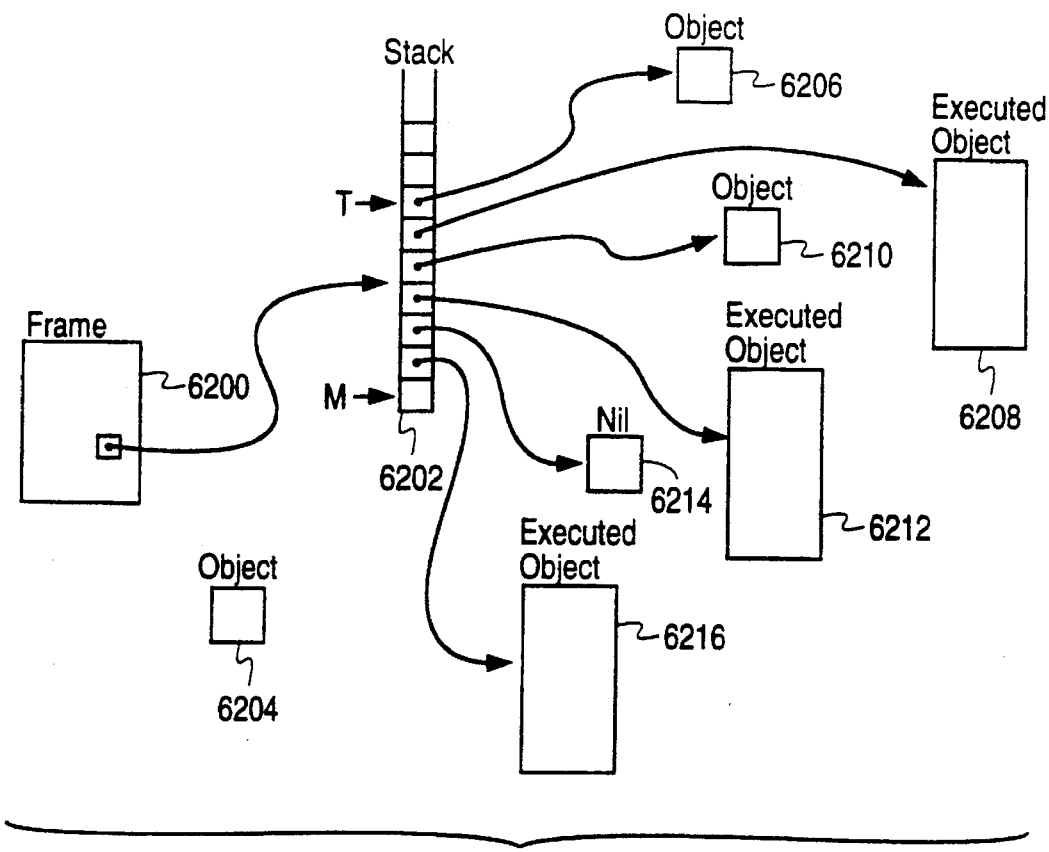
FIGS. 62A and 62B show a portion of the execution state of a process immediately preceding and following, respectively, performance of operation "select".
Figure 62B:
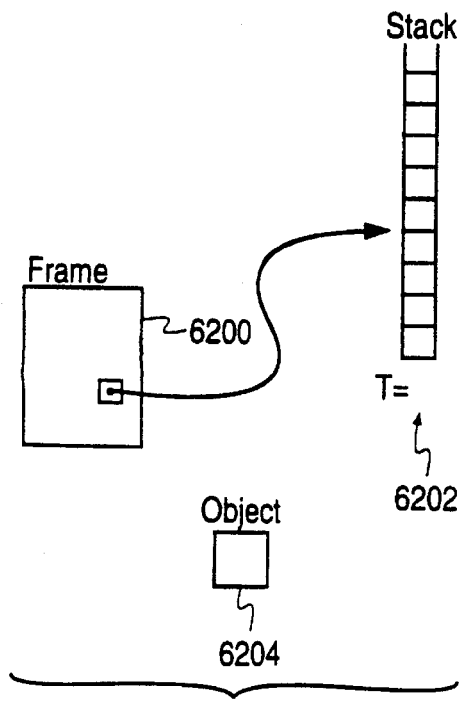

An executed object is selected from one or more executed objects and performed by performance of operation "select". Operation "select" is defined by class "Object" and is performed by an object identifying the particular executed object to be performed. FIGS. 62A and 62B show the interface of the operation "select". FIG. 62A shows the state of predefined frame 6200 which records the dynamic state of operation "select" as performed by object 6204. Predefined frame 6200 is part of the execution state of a process (not shown) and is shown immediately prior to performance of operation "select".

Object 6204 is the responder. Predefined frame 6200 has no property "responder" which identifies object 6204. Instead, object 6204 is identified as the responder by its position within property "procedure" of the frame (not shown) immediately below the current frame on the stack (not shown) that is property "frames" of the current process. Object 6204 is the item of that procedure (not shown) whose position is one less than property "position" of that frame. For example, the responder of user-defined frame 5602 (FIG. 56C) is the item of procedure 5406 whose position is one less than the value of integer 5408.

Stack 6202 (FIG. 62A) is the current stack. On stack 6202 are a mark, whose position is indicated by letter "M" and which delineates the arguments of the operation, and one or more pairs of objects and associated executed objects. For example, stack 6202 contains from top to immediately above the mark, object 6206, executed object 6208, object 6210, executed object 6212, nil 6214, and executed object 6216. Objects 6206, 6210 and nil 6214 are associated with respective executed objects 6208, 6212 and 6216.

Figure 63:
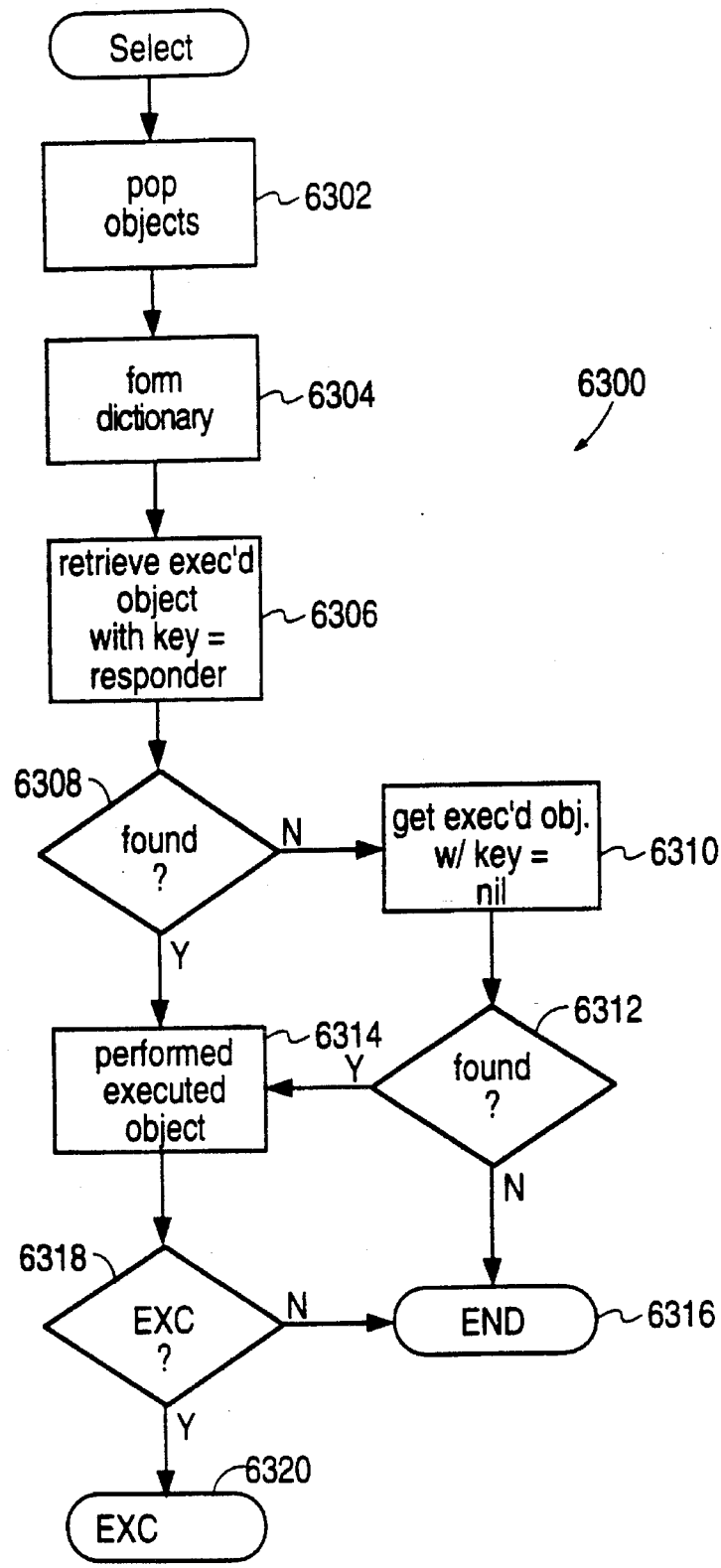
FIG. 63 is a logic flow diagram illustrating the steps taken in performance of operation "select".

The implementation of operation "select" is shown by logic flow diagram 6300 (FIG. 63). In step 6302, objects 6206–7616 (FIG. 62A) and the mark are popped from stack 6202. Processing transfers from step 6302 to step 6304 in which a dictionary is formed whose keys are objects 6206, 6210 and nil 6214 and whose associated values are respective executed objects 6208, 6212 and 6216. Processing transfers from step 6304 to step 6306. In step 6306, the executed object whose associated key is equal to responding object 6204 is retrieved from the dictionary formed in step 6304. The retrieval of a value of a dictionary given a key of the dictionary is described in detail in Appendix A.

Processing transfers from step 6306 to a test step 6308. In test step 6308, the engine carrying out performance of operation "select" determines whether an executed object is successfully retrieved from the dictionary. If an executed object associated with a key equal to responding object 6204 is found within the dictionary and retrieved, processing transfers to step 6314. In step 6314, the retrieved executed object is performed. Processing transfers from step 6314 to exception test step 6316 in which the engine determines whether the performance of the executed object completed successfully in step 6314.

If performance of the executed object in step 6314 fails and throws an exception, processing transfers from exception test step 6318 to terminal step 6320. In terminal step 6320, the exception is thrown, causing operation "select" to fail. If, on the other hand, the retrieved executed object is performed successfully in step 6314, processing transfers from exception test step 6318 to terminal step 6316. In terminal step 6316, operation "select" completes successfully.

In test step 6308, if no key equal to responding object 6204 is found in the dictionary formed in step 6304, processing transfers from test step 6308 to step 6310. In step 6310, the executed object contained within the dictionary whose associated key is a nil, e.g., executed object 6216 associated with nil 6214, is retrieved. Processing transfers from step 6310 to a second test step 6312 in which the engine determines whether an executed object is successfully retrieved in step 6310. If an executed object within the dictionary with an associated key that is a nil is found and successfully retrieved, processing transfers from second test step 6312 to step 6314 which performs the executed object as described above.

If, on the other hand, no executed object is retrieved in step 6310, no key equal to object 6204 and no key that is nil is found in the dictionary and processing transfers from second test step 6312 to terminal step 6316. As described above, in terminal step 6316, operation "select" completes successfully. Thus, if no executed object is associated with a key equal to the responding object or is associated with a nil, operation "select" completes successfully without performing any executed object in the dictionary.

FIG. 62B shows the state of select frame 6200 immediately following performance of operation "select" by responding object 6204. Performance of operation "select" produces no result as shown by empty stack 6202 of FIG. 62B.

Figure 64:
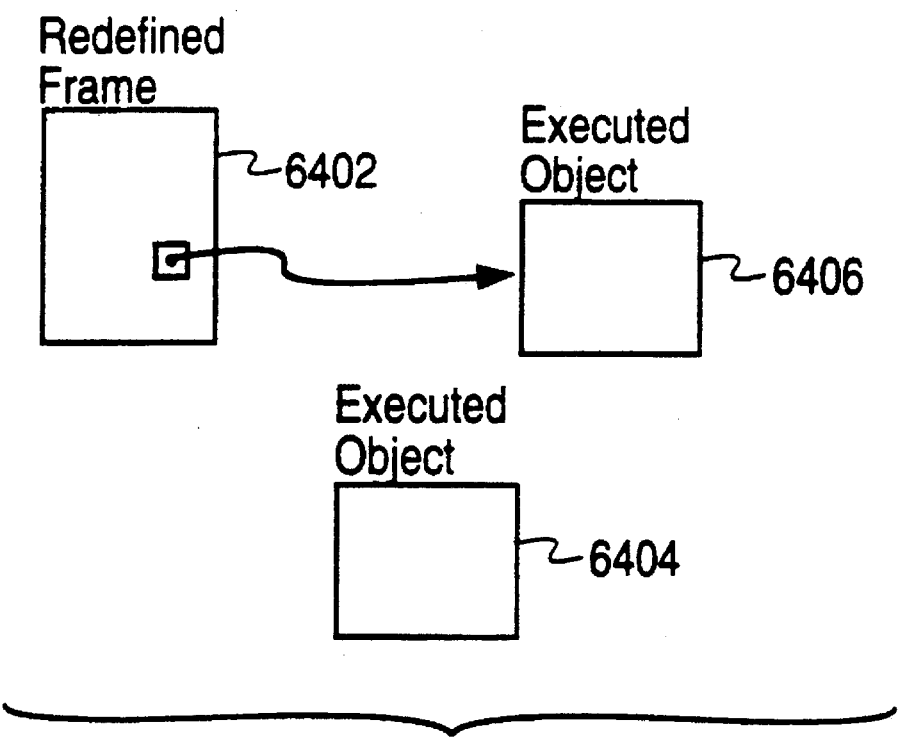
FIG. 64 shows the state of a predefined frame which represents the dynamic state of a performance of operation "select".

An executed object is executed repeatedly so long as a condition is met by performance of operation "while". The dynamic state of a performance of operation "while" is recorded in a predefined frame 6402 (FIG. 64). Executed object 6404 is the responder of operation "while" and is the responding executed object. Executed object 6404 is property "procedure" of predefined frame 6402. Executed object 6406 is property "precondition" of predefined frame 6402 and is the executed object consumed as an argument as discussed below.

Figure 65:
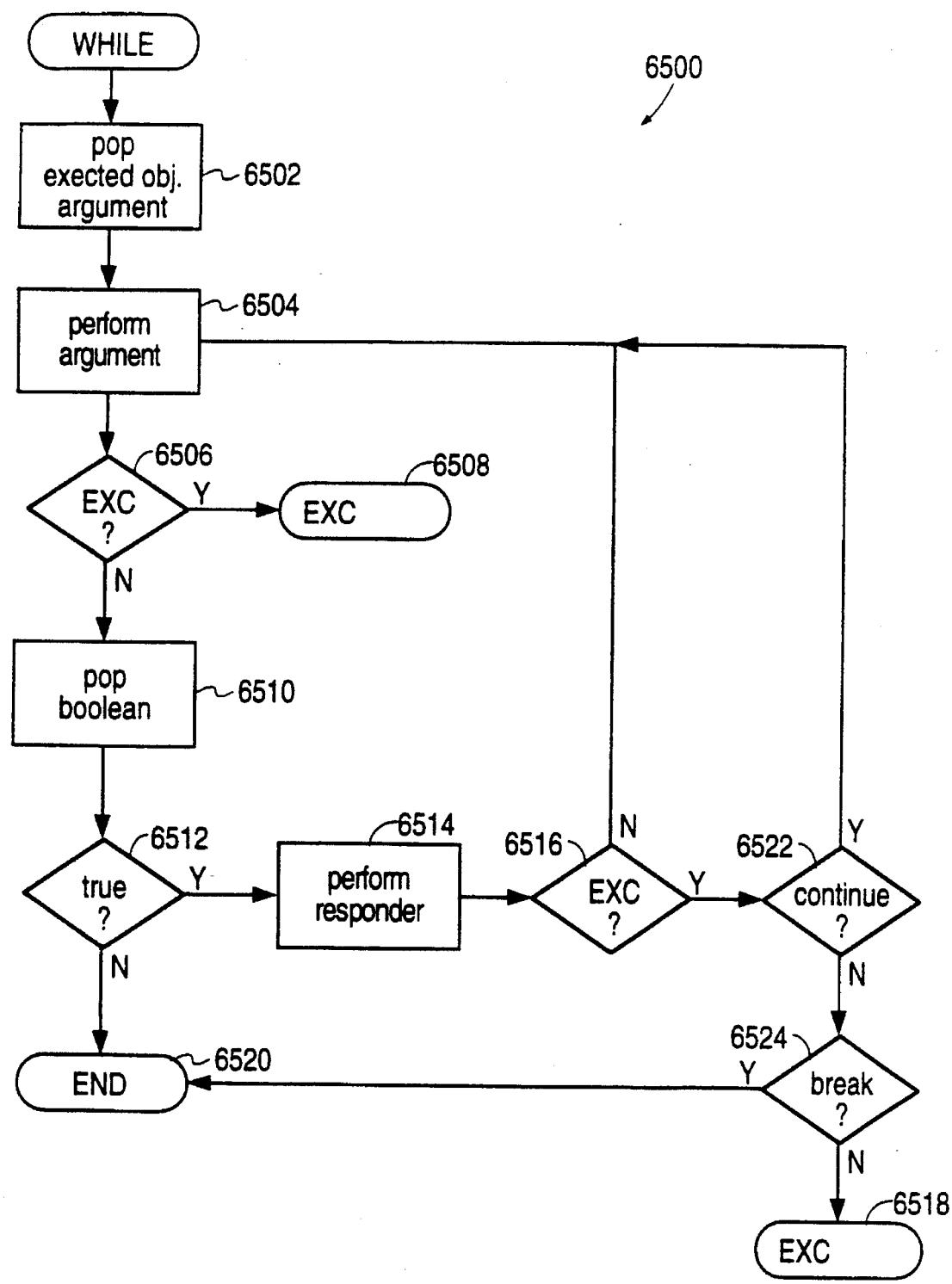
FIG. 65 is a logic flow diagram illustrating the steps taken in performance of operation "while".

Operation "while" is performed by responding executed object 6404 which consumes as an argument executed object 6406. Performance of operation "while" is illustrated by logic flow diagram 6500 (FIG. 65). In step 6502, executed object 6406 is popped from the current stack. Processing transfers from step 6502 to step 6504, in which executed object 6406 is performed. Performance of executed object 6406 in step 6504 pushes on to the current stack a boolean which indicates whether responding executed object 6404 is to be performed.

Processing transfers from step 6504 to exception test step 6506 in which the engine carrying out performance of operation "while" determines whether performance of executed object 6406 throws an exception. If performance of executed object 6406 throws an exception, processing transfers from exception test step 6506 to terminal step 6508 in which the exception is thrown by operation "while" causing operation "while" to fail. If, on the other hand, executed object 6406 is performed successfully, processing transfers from exception test step 6506 to step 6510.

In step 6510, a boolean is popped from the current stack. Processing transfers from step 6510 to true test step 6512. In true test step 6512, the boolean popped from the current stack is compared to "true". If the boolean is "true", processing transfers from true test step 6512 to step 6514 in which responding executed object 6406 is performed. Processing transfers from step 6514 to a second exception test 6516 in which the engine determines whether performance of executed object 6404 throws an exception.

If performance of executed object 6404 in step 6514 throws an exception, processing transfers from second exception test step 6516 to a continue test step 6522. In continue test step 6522, the thrown exception is compared to an internal exception "continue", which is thrown by execution of selector "continue" as described below and in Appendix A. As described below in greater detail, execution of selector "continue" terminates an iterative performance of a procedure and initiates a new iterative performance of the procedure. If the exception thrown in step 6514 is internal exception "continue", processing transfers from continue test step 6522 to step 6504, which is described above.

Conversely, if the exception thrown in step 6514 is not internal exception "continue", processing transfers from continue test step 6522 to a break test step 6524. In break test step 6524, the exception thrown in step 6514 is compared to an internal exception "break", which is thrown by execution of selector "break" as described below and in Appendix A. As described below in greater detail, execution of selector "break" terminates an iterative performance of a procedure without initiating a new iterative performance of the procedure. If the exception thrown in step 6514 is internal exception "break", processing transfers from continue test step 6522 to terminal step 6520, in which operation "while" completes successfully as described below.

Conversely, if the exception thrown in step 6514 is not internal exception "break", processing transfers from break test step 6524 to terminal step 6518. In terminal step 6518, the exception thrown in step 6514 is thrown causing operation "while" to fail.

If, on the other hand, performance of executed object 6404 succeeds and no exception is thrown in step 6514, processing transfers from second exception test step 6516 to step 6504 in which executed object 6406 is again performed.

Performance of steps 6504, 6506, 6510, 6512, 6514, 6516, and 6522 is repeated until performance of executed object 6406 produces a boolean whose value is "false" or until an exception is thrown in step 6508 or step 6518. If performance of executed object 6406 produces a boolean that is "false", processing transfers from true test step 6512 to terminal step 6520 in which operation "while" completes successfully. Thus, procedure 6406 is repeatedly performed while performance of executed object 6406 produces a "true" boolean.

Thus, operations "if", "either", "select" and "while" provide the disclosed set of computer instructions substantial decision making capabilities.

Exception Handling Features

As discussed in greater detail in Appendix A, an executed object which performs operation "do" is thereby performed, and if performance of the executed object throws an exception, the exception is thrown by operation "do", causing operation "do" to fail. The propagation of exceptions is illustrated in steps 5210 and 5212 of logic flow diagram 5200 (FIG. 52A) as discussed above. Failure of a performance of an executed object generally causes the failure of any executed object invoking, either directly or indirectly, the performance. Any exception which causes operation "live" of a process to fail causes destruction of the process. It is therefore preferred that instructions be provided which detect and prevent the propagation of exceptions.

A first executed object, e.g., a procedure, invoking the performance of a second executed object is capable of preventing failure of the first executed object due to an exception thrown by the second executed object by "catching" any exception thrown by the second executed object. To "catch" an exception is to detect the throwing of the exception and to direct that specific action be taken in such an event. An exception which is thrown by the second executed object and which is caught by the first executed object does not cause the first executed object to fail.

An exception thrown by performance of an executed object is caught by causing performance of the executed object by use of operation "catch" in the place of operation "do". An executed object, whose performance is caused by operation "catch", is performed as if the executed object were performing operation "do" except that certain exceptions thrown by performance of the executed object do not cause operation "catch" to fail. In such a case, the exception is pushed on to the current stack and returned as a result.

Figure 66A:
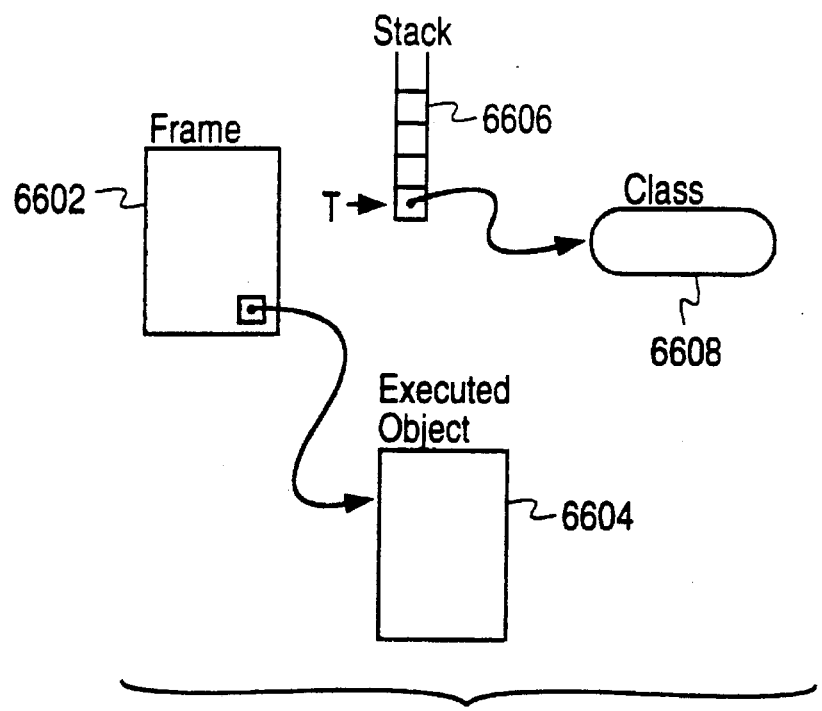
FIGS. 66A and 66B show a portion of the execution state of a process immediately prior to and immediately following, respectively, performance of operation "catch".
Figure 66B:
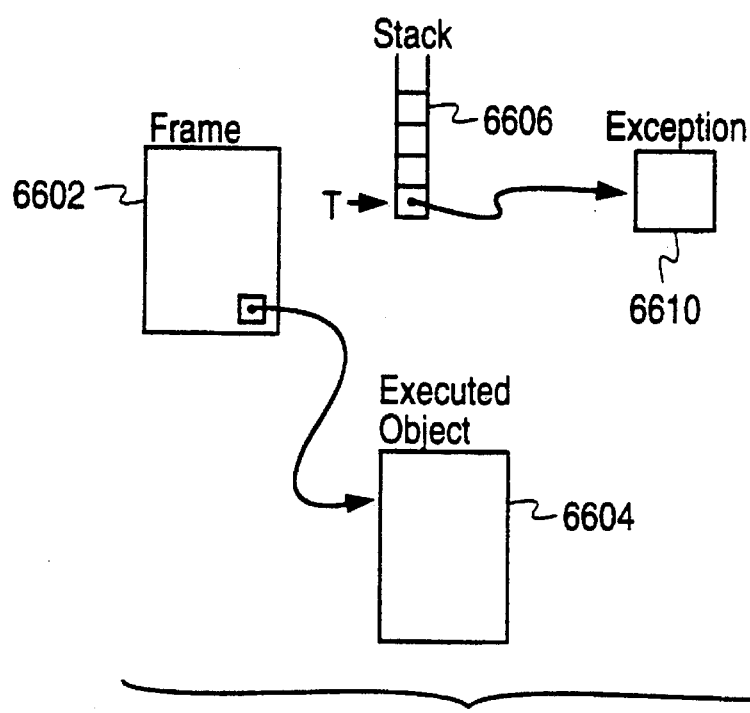

The interface of operation "catch" is shown by FIGS. 66A and 66B. FIG. 66A shows the state of catch frame 6602, which records the dynamic state of operation "catch" as defined by mix-in class "Executed", immediately prior to performance of operation "catch" by executed object 6604. Catch frame 6602 is part of the execution state of a process (not shown). Executed object 6604 is the responding executed object and is property "procedure" of catch frame 6602. Performance of operation "catch" consumes a single argument, class object 6608 which is at the top of stack 6606. Stack 6606 is the current stack. Stack 6606 is property "stack" of the topmost user-defined frame (not shown) below catch frame 6602 on the stack (not shown) that is property "frames" of the current process. Class object 6608 represents class "Exception" or a subclass thereof.

Figure 67:
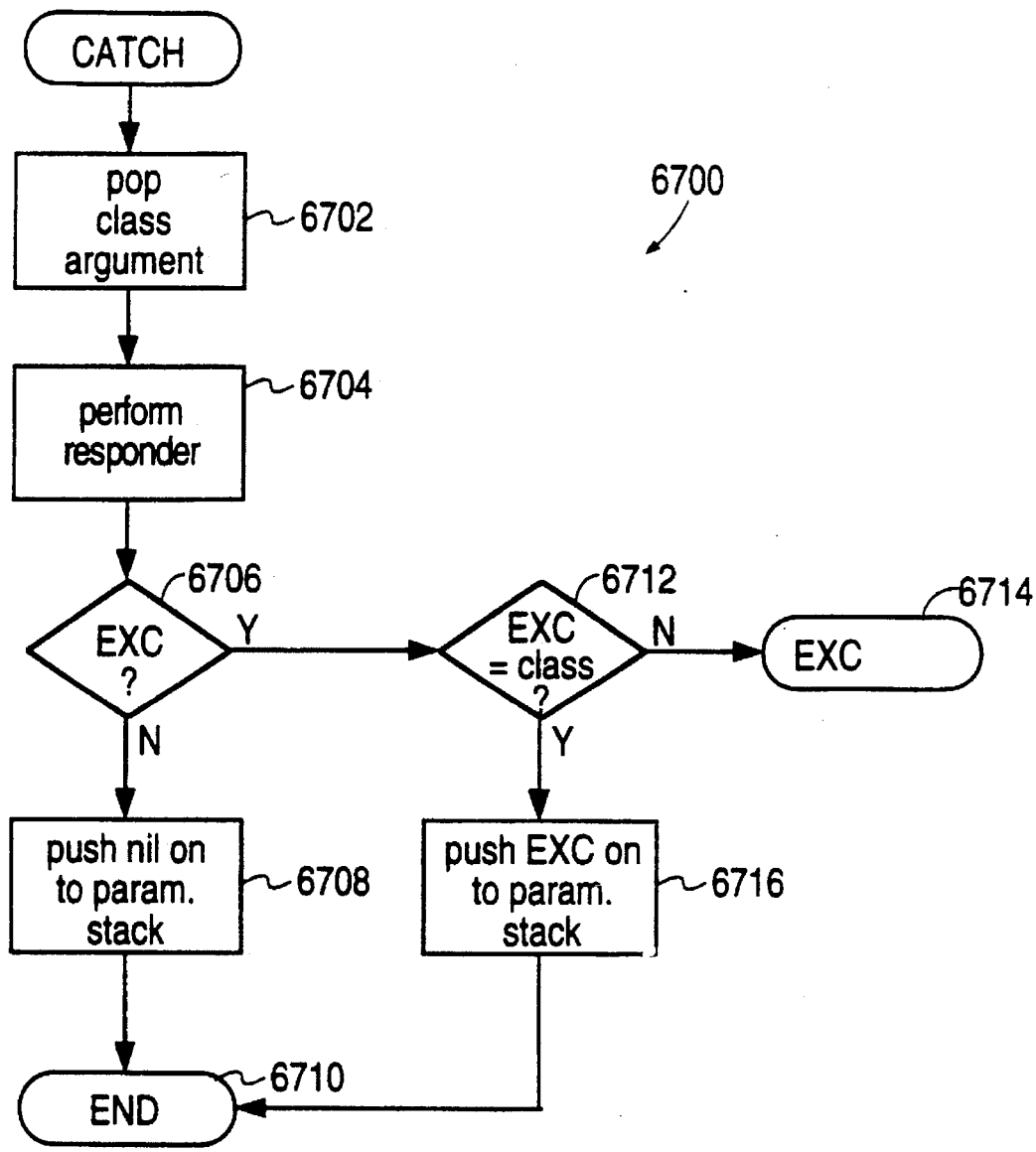
FIG. 67 is a logic flow diagram illustrating the steps taken in performance of operation "catch".

The implementation of the operation "catch" is shown by logic flow diagram 6700 (FIG. 67). Class object 6608 is popped from stack 6606 and thereby consumed in step 6702. Processing transfers from step 6702 to step 6704 in which executed object 6604 is performed. Processing transfers from step 6704 to exception test step 6706 in which the engine carrying out performance of operation "catch" determines whether performance of executed object 6604 throws an exception. If performance of executed object 6604 does not throw an exception, processing transfers from exception test step 6706 to step 6708. In step 6708, a nil is pushed on to stack 6606. Processing transfers from step 6708 to terminal step 6710 in which operation "catch" completes successfully.

If execution of executed object 6604 in step 6704 fails and throws an exception, processing transfers from exception test step 6706 to member test step 6712. In member test step 6712, the engine checks membership of the exception thrown in step 6704 in the class represented by class object 6608. If the thrown exception is not a member of the class represented by class object 6608, processing transfers from member test step 6712 to terminal step 6714. In terminal step 6714, the exception thrown in step 6704 is thrown by operation "catch" and operation "catch" fails.

If the thrown exception is a member of the class represented by class object 6608, processing transfers from member test step 6712 to step 6716. In step 6716, the exception thrown in step 6704 is pushed on to stack 6606 and processing transfers from step 6716 to terminal step 6710. As described above, in terminal step 6710, operation "catch" completes successfully. Thus, the thrown exception is caught, and operation "catch" succeeds and does not propagate the thrown exception.

FIG. 66B shows the state of catch frame 6602 immediately following performance of operation "catch" by procedure 6604. At the top Of stack 6606 is exception 6610 which is the exception thrown by performance of procedure 6604 if performance of procedure 6604 failed. In such a case, exception 6610 is a member of the class represented by class object 6608 (FIG. 66A). In place of exception 6610 (FIG. 66B) on stack 6606 is a nil (not shown) if performance of procedure 6604 succeeded. Thus, the disclosed set of computer instructions is provided with means for detecting and handling exceptions.

Looping Features

The disclosed computer instruction set provides means for repeatedly performing an executed object, e.g., a procedure, facilitating performance of repetitive tasks. Operation "while" discussed above is one example of a looping feature. Additionally, an executed object is performed repeatedly using operations "loop" and "repeat".

Operation "loop" performs an executed object indefinitely by repeatedly performing the responding executed object. Performance of Operation "loop" by an executed object consumes no arguments and produces no result. Performance of operation "repeat" by an executed object consumes an integer argument and produces no result, performing the responding executed object a number of times equal to the value of the integer argument consumed. Each performance of the responding executed object in the course of performing operation "loop" or operation "repeat" is herein called an "iterative performance" of the executed object.

Figure 68:
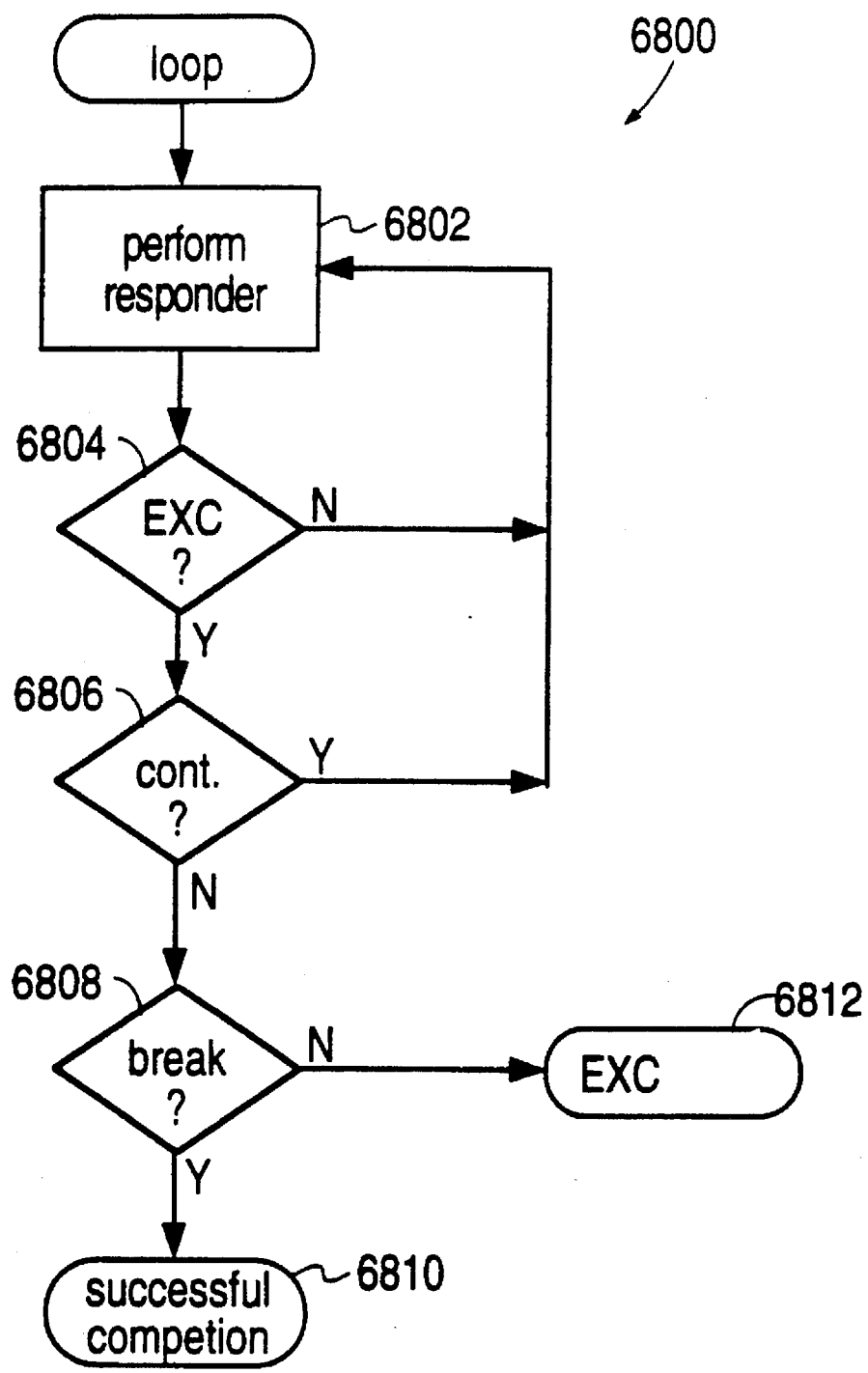
FIG. 68 is a logic flow diagram illustrating the steps taken in performance of operation "loop".

Logic flow diagram 6800 (FIG. 68) shows the implementation of operation "loop" as performed by the responding executed object. The responding executed object is performed in step 6802. Processing transfers from step 6802 to exception test step 6804 in which the engine carrying out performance of operation "loop" determines whether performance of the responding executed object throws an exception. If no exception is thrown, i.e., if the responding executed object is performed successfully, processing transfers from exception test step 6804 to step 6802 in which the responding executed object is performed again. Otherwise, if performance of the responding executed object throws an exception, processing transfers from exception test step 6804 to continue test step 6806. In continue test step 6806, the exception thrown by performance of the responding executed object in step 6802 is compared to internal exception "continue".

Internal exceptions "continue" and "break" are thrown by execution of selectors "continue" and "break", respectively, which are discussed more completely below and in Appendix A. These exceptions are called "internal" because internal exceptions "continue" and "break" are detected by an engine which takes action in response thereto. A third internal exception, i.e., internal exception "succeed" which is thrown as a result of executing selector "succeed", is discussed below. Internal exceptions are not caught by operation "catch" and do not cause operation "live" to fail, thereby causing destruction of a process, except as described below.

If the exception thrown by performing the executed object in step 6802 is internal exception "continue", processing transfers from continue test step 6806 to step 6802 in which the responding executed object is performed again. Otherwise, if the exception thrown in not internal exception "continue", processing transfers from continue test step 6806 to break test step 6808. In break test step 6808, the exception thrown by performing the responding executed object is compared to the internal exception "break". If the exception thrown by performance of the executed object in step 6802 is internal exception "break", processing transfers from break test step 6808 to terminal step 6810 in which operation "loop" completes successfully. Otherwise, if the exception thrown is not internal exception "break", processing transfers from break test step 6808 to terminal step 6812 in which operation "loop" fails and the exception thrown by performance of the responding executed object in step 6802 is thrown by operation "loop".

Figure 69:
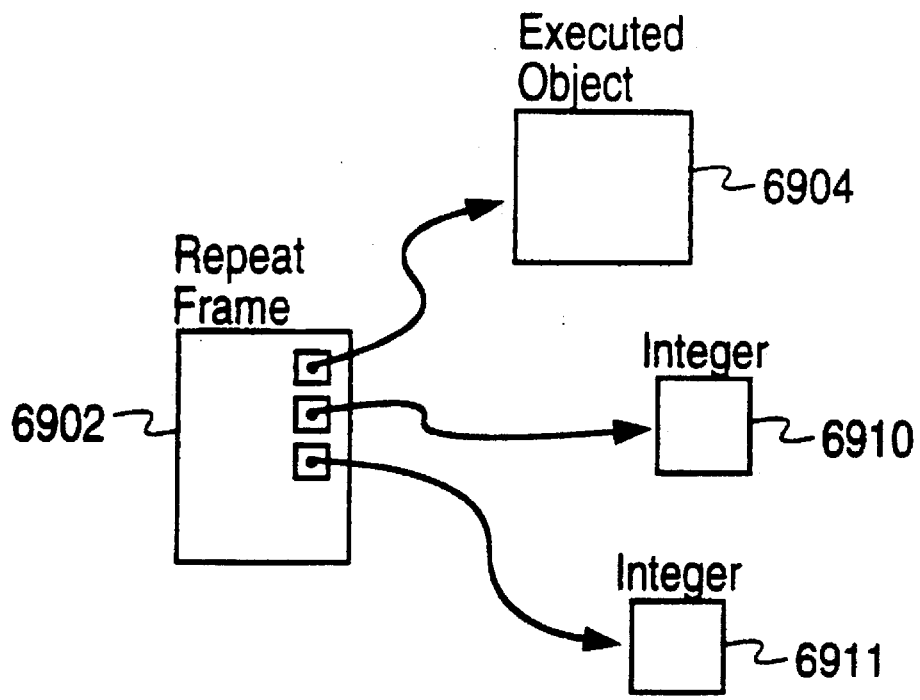
FIG. 69 shows the structure of a repeat frame which includes an executed object and two integers.

FIG. 69 shows a repeat frame 6902 which records the dynamic state of a performance of operation "repeat" by executed object 6904. Repeat frame 6902 is a part of the execution state of a process (not shown). Repeat frame 6902 includes properties "procedure", "repetitions", "repetitionsSoFar" and "position". Executed object 6904 is the responder of operation "repeat" and is property "procedure" of repeat frame 6902. Integers 6910 and 6911 are properties "repetitionsSoFar" and "repetitions", respectively, of repeat frame 6902. Integer 6910 represents the number of completed iterative performances of executed object 6906, and integer 6911 represents the total number of iterative performances specified by the consumed integer argument.

Logic flow diagram 7000 (FIG. 70) shows the implementation of operation "repeat" as performed by executed object 6904. In step 7002, integer 6910 is initialized to zero and integer 6911 is initialized to the value of the integer consumed as an argument. Processing transfers from step 7002 to test step 7004 in which integer 6910 is compared to integer 6911. If integer 6910 is greater than or equal to integer 6911, processing transfers from test step 7004 to terminal step 7018 in which operation "repeat" completes successfully. Therefore, if the integer consumed is non-positive, performance of the operation "repeat" has no effect. Otherwise, if integer 6910 is less than integer 6911, processing transfers from test step 7004 to step 7005 in which integer 6910 is incremented. Processing transfers from step 7005 to step 7006 in which an integer object whose value is that of integer 6910 is pushed on to the current stack. Processing transfers from step 7006 to step 7008 in which responding executed object 6904 is performed. It is up to executed object 6904 to pop the integer from the current stack. In other words, if performance of executed object 6904 does not pop the integer from the current stack, the integer remains on the current stack during performance of operation "repeat".

Processing transfers from step 7008 to an exception test step 7010 in which the engine carrying out performance of operation "repeat" determines whether performance of responding executed object 6904 throws an exception. If no exception is thrown, processing transfers from exception test step 7010 to test step 7004. Conversely, if an exception is thrown, processing transfers from exception test step 7010 to continue test step 7014 in which the exception is compared to internal exception "continue". If the exception thrown is internal exception "continue", processing transfers from continue test step 7014 to test step 7004. Thus, if no exception is thrown in step 7008 or if the exception thrown is internal exception "continue", processing transfers to test step 7004 in which integer 6910 is again compared to integer 6911. Thus, execution of selector "continue" prematurely terminates an iterative performance of responding executed object 6904 without affecting subsequent iterative performances in performance of operation "repeat".

If, in continue test step 7014, the engine determines that performance of responding executed object 6904 in step 7008 throws an exception other than internal exception "continue", processing transfers from continue test step 7014 to break test step 7016. In break test step 7016, the exception thrown is compared to internal exception "break". If the exception thrown is internal exception "break", processing transfers from break test step 7016 to terminal step 7018. In terminal step 7018, operation "repeat" completes successfully. Thus, execution of selector "break" terminates an iterative performance of responding executed object 6904 and successfully terminates performance of operation "repeat", aborting any remaining subsequent iterative performances in performance of operation "repeat".

If the exception thrown is not internal exception "break", processing transfers from break test step 7016 to terminal step 7020. In terminal step 7020, the exception thrown by performance of responding executed object 6904 is thrown by operation "repeat" causing operation "repeat" to fail and to propagate the exception. As discussed above, operation "catch" can be used to prevent the propagation of the exception.

Once integer 6910 is decremented in step 7005 to a value less than or equal to zero, processing transfers from test step 7004 to terminal step 7018 in which operation "repeat" completes successfully. Performance of operation "repeat" by an executed object produces no results other than those resulting from performance of the executed object in step 7008 of FIG. 70.

Figure 70:
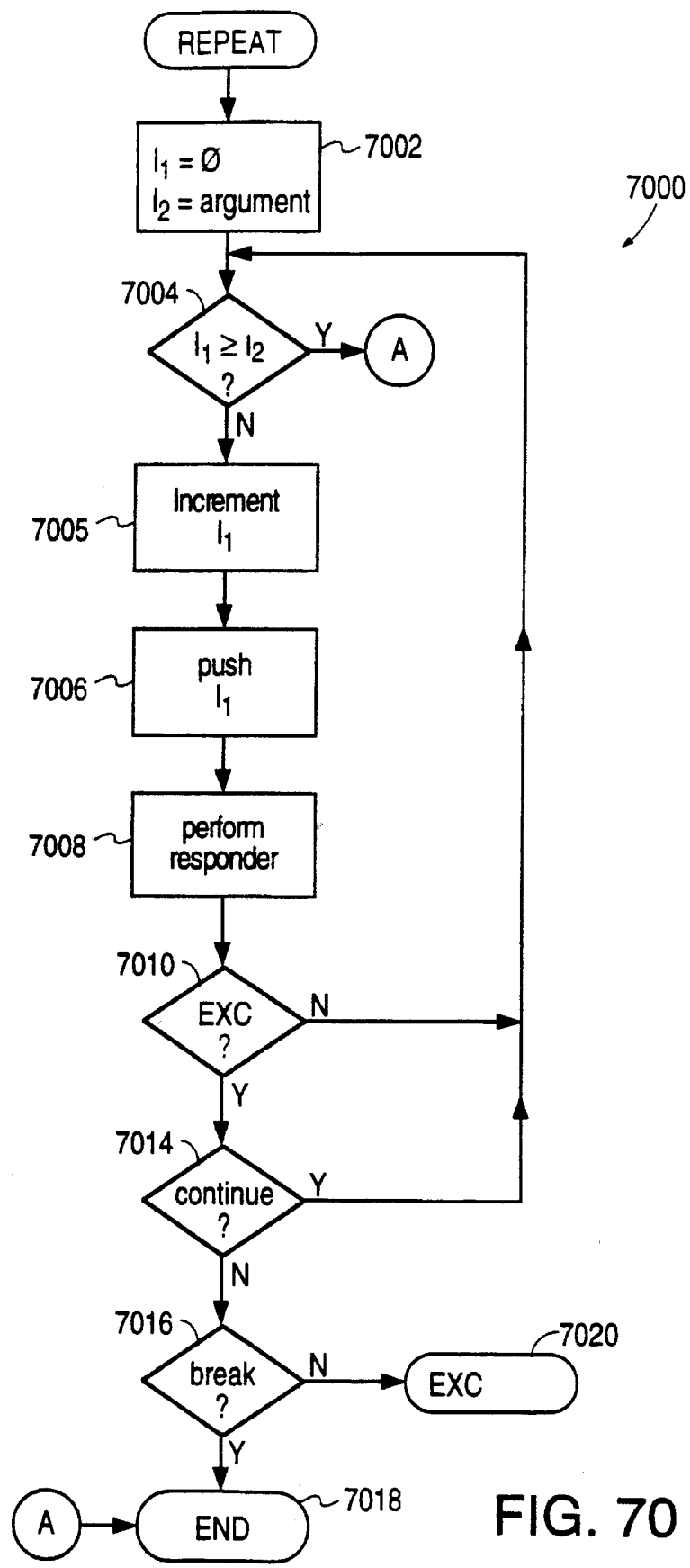
FIG. 70 is a logic flow diagram illustrating the steps taken in performance of operation "repeat".

Execution of selector "continue" throws internal exception "continue" which is caught by operations "while", e.g., in continue test step 6522 (FIG. 65); "loop", e.g., in continue test step 6806 (FIG. 68); and "repeat", e.g., in continue test step 7014 (FIG. 70). The throwing of internal exception "continue" by execution of selector "continue" terminates an iterative performance of an executed object performing operation "while", "loop" or "repeat". As described more completely above, detection of internal exception "continue" during performance of operation "while", "loop", or "repeat" causes a subsequent iterative performance of the responding procedure, e.g., in continue test steps 6522, 6806, and 7014 of FIGS. 65, 68, and 70, respectively.

Execution of selector "break" throws internal exception "break" which is caught by operations "while", e.g., in break test step 6524 (FIG. 65); "loop", e.g., in break test step 6808 (FIG. 68); and "repeat", e.g., in break test step 7016 (FIG. 70). As with the throwing of internal exception "continue" discussed above, the throwing of internal exception "break" terminates an iterative performance of an executed object in the course of performing operation "while", "loop", or "repeat". However, throwing internal exception "break" terminates performance of operation "while", "loop", or "repeat" rather than causing a subsequent iterative performance of the responding executed object.

Figure 71:
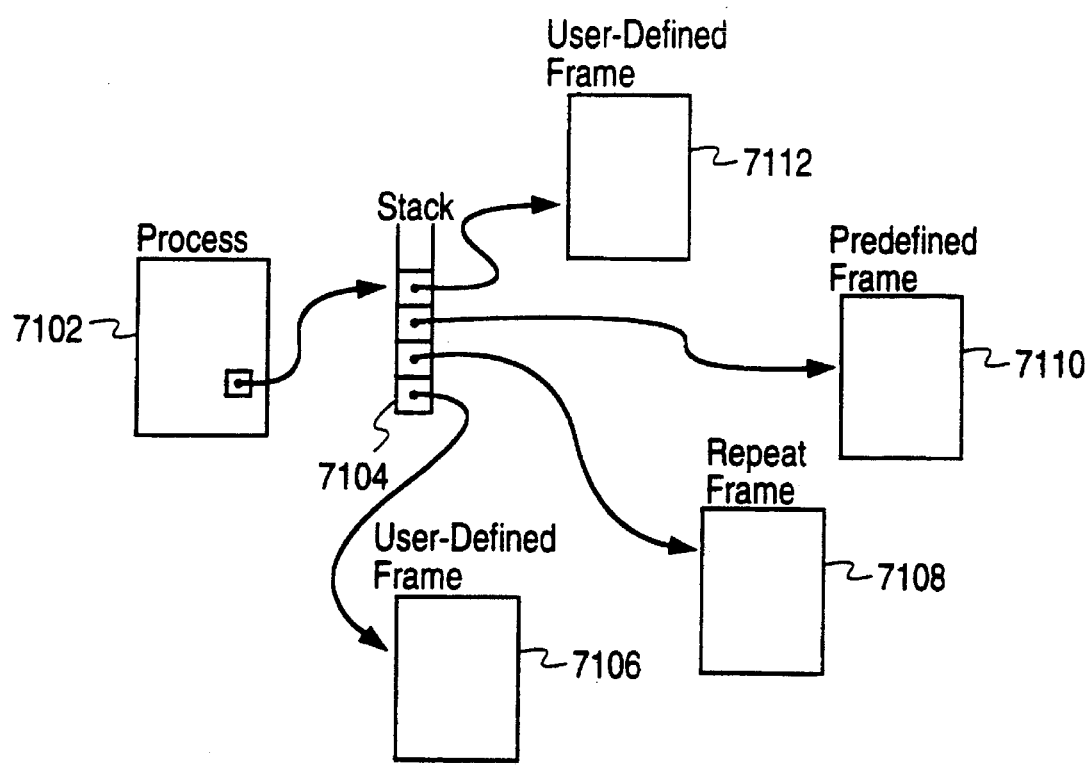
FIG. 71 shows the execution state of a process which includes a stack which in turn contains, from top to bottom, a user-defined frame, a predefined frame, a repeat frame, and a second user-defined frame.

Internal exceptions "continue" and "break" are distinguishable from other exceptions only in the context of operations "while", "loop", and "repeat". Therefore, in the context the following discussion of internal exceptions "continue" and "break", operations "while", "loop", and "repeat" are collectively referred to herein as "the relevant operations". As each of the relevant operations detects and takes action in response to internal exceptions "continue" and "break", internal exceptions "continue" and "break" are not thrown by either of the relevant operations as are other exceptions. FIG. 71 serves as an illustrative example.

Stack 7104 is a property of process 7102 and represents the thread of execution of process 7102. User-defined frame 7106 is at the bottom of stack 7104 and records the dynamic state of a performance of operation "live". The remaining contents of stack 7104 from bottom to top are repeat frame 7108, predefined frame 7110, which records the dynamic state of a performance of operation "loop", and user-defined frame 7112. Thus, operation "live" in FIG. 71 caused performance of operation "repeat" which caused performance of operation "loop" which caused performance of yet another feature.

Suppose that performance of the feature, whose dynamic state is recorded by user-defined frame 7112, executes selector "continue" or selector "break". As discussed above, execution of either selector "continue" or "break" throws a corresponding internal exception. Any operation which is not designed to catch these internal exceptions, i.e., any operation other than either of the relevant operations, behaves as if an ordinary exception has been thrown (see discussion above regarding exception test step 5210 and terminal step 5212 of FIG. 52A). In this situation, the internal exception is propagated by performance of the feature represented by user-defined frame 7112 and is caught by performance of operation "loop" represented by predefined frame 7110 in the manner discussed above. The internal exception is not propagated by operation "loop" represented by loop frame 7110 and therefore has no effect on the performance of operation "repeat" represented by repeat frame 7108.

If no relevant operation is currently being performed, i.e., is not present on stack 7104, execution of either selector "continue" or selector "break" produces an exception of class "Loop Missing". An exception of class "Loop Missing" is not an internal exception and is therefore propagated like any other exception.

If internal exception "succeed" is thrown, i.e., if selector "succeed" is executed, performance of the current method terminates successfully. It should be noted that, since predefined features are implemented directly, i.e., in the computer instructions which collectively form an engine, only user-defined features are implemented by method objects Therefore, if operation "loop", the dynamic state of a performance of which is recorded in predefined frame 7110 (FIG. 71), executes selector "succeed", an internal exception "succeed" is thrown, terminating performance of operation "loop". Since operation "loop" is predefined, operation "loop" does not catch internal exception "succeed" and therefore propagates internal exception "succeed", causing the termination of operation "repeat", the dynamic state of a performance of which is recorded in repeat frame 7108. Similarly, as operation "repeat" is predefined, operation "repeat" does not catch internal exception "succeed", causing the termination of operation "live", the dynamic state of a performance of which is recorded in user-defined frame 7106. However, since operation "live" has no predefined implementation, operation "live" terminates successfully, i.e., does not fail by throwing an exception. Similarly, if the feature whose method is the subject of user-defined frame 7112 throws internal exception "succeed", i.e., executes selector "succeed", the feature terminates successfully and internal exception "succeed" is caught. In such a case, internal exception "succeed" has no effect on predefined frame 7110, repeat frame 7108, and user-defined frame 7106.

The operations discussed above, i.e., operations "do", "if", "either", "while", "select", "catch", "loop", and "repeat" are performed in the context of the current method.

As discussed above, predefined operations are not implemented by method objects. The above-listed operations are all predefined and are therefore not implemented by method objects. The performance of the above-listed operations in the context of the current method is easily described by way of example.

Suppose, for example, that the feature whose method is the subject of frame 7112 (FIG. 71) requests performance of one of the above-listed predefined operations, the performance of which is recorded in a predefined frame (not shown) immediately above user-defined frame 7112 on stack 7104. During performance of the predefined operation, property "stack" of user-defined frame 7112 remains "the current stack." Thus, performance of the predefined operation pops arguments-from, and pushes results on to, property "stack" of user-defined frame 7112. Therefore, the predefined operations listed above are performed in the context of the current method.

The operations discussed above, i.e., operations "do", "if", "either", "while", "select", "catch", "loop", "repeat", "continue" and "break", provide the object-oriented instruction set of the present invention with a substantial degree of generality and versatility. Thus, agents are capable of employing sophisticated logic in traveling from one place to another, depositing and gathering information by interacting with agents found at various places.

Thus, a novel set of computer processes are provided which can direct their own movement through a computer network, can send multiple active copies of themselves throughout the network and can interact with other computer processes found at remote network nodes to thereby transfer information between processes. The disclosed set of computer instructions of which the novel set of computer processes are formed is portable and general. The set of computer instructions is implemented uniformly on each node of the computer network. Classes are made objects within the disclosed instruction set. The instructions of a process in the present invention are interpreted rather than compiled. Control constructs are provided for resource management, decision handling, exception handling, and loop constructs. Thus, a portable and general set of computer instructions is provided from which the novel set of computer processes are constructed.

It should be understood that, while a particular set of computer instructions is described herein and in the Appendices, the present invention is not limited to the functionality of the instructions described. Therefore, the scope of the present invention shall be limited only by the claims which follow.

APPENDIX A

Copyright© General Magic, Inc. 1991, 1992, 1993. All rights reserved.

The following table of contents is to assist the reader in understanding the organization of and locating information within this appendix.

Table of Contents

| | |
|---|---|
| 1 | Introduction |
| 1.1 | Telescript Instruction Set |
| 1.2 | Telescript Engine |
| 1.3 | Telescript Network |
| 1.4 | This Appendix |
| 1.4.1 | Scope |
| 1.4.2 | Conformance |
| 1.4.3 | Conventions |
| 1.4.4 | Organization |
| 1.4.5 | Road Map |
| 1.4.6 | References |
| 2 | Telescript Concepts |
| 2.1 | Models |
| 2.2 | Object Model |
| 2.2.1 | Objects |
| 2.2.2 | References |
| 2.2.3 | Classes |
| 2.2.4 | Inheritance |
| 2.2.5 | Features |
| 2.2.6 | Attributes |
| 2.2.7 | Operations |
| 2.2.8 | Exceptions |
| 2.2.9 | Constraints |
| 2.2.10 | Properties |
| 2.2.11 | Copying |
| 2.2.12 | Object Initialization |
| 2.2.13 | Object Finalization |
| 2.2.14 | Class Construction |
| 2.3 | Execution Model |
| 2.3.1 | Methods |
| 2.3.2 | Procedures |
| 2.3.3 | Executed Objects |
| 2.3.4 | Identifiers |
| 2.3.5 | Static Substitution Rules |
| 2.3.6 | Dynamic Substitution Rules |
| 2.3.7 | Selector Execution |
| 2.3.8 | Modifier Execution |
| 2.3.9 | Identifier Execution |
| 2.3.10 | Method Selection |
| 2.3.11 | Method Performance |
| 2.4 | Process Model |
| 2.4.1 | Processes |
| 2.4.2 | Phases |
| 2.4.3 | Threads |
| 2.4.4 | Resources |
| 2.4.5 | Permits |
| 2.4.6 | Ownership |
| 2.4.7 | Cloning |
| 2.4.8 | Branding |
| 2.4.9 | Contacts |
| 2.4.10 | Isolation |
| 2.4.11 | Termination |
| 2.5 | Network Model |
| 2.5.1 | Agents |
| 2.5.2 | Places |
| 2.5.3 | Trips |
| 2.5.4 | Tickets |
| 2.5.5 | Meetings |
| 2.5.6 | Petitions |
| 2.5.7 | Occupation |
| 2.5.8 | Contacts |
| 2.5.9 | Citations |
| 2.5.10 | Telenames |
| 2.5.11 | Teleaddresses |
| 2.5.12 | Interchange |
| 2.6 | Timekeeping Model |
| 2.6.1 | Time |
| 2.6.2 | Calendar Time |
| 2.7 | Pattern Matching Model |
| 2.7.1 | Patterns |
| 2.7.2 | Structure |
| 2.7.3 | Other Non-terminals |
| 2.7.4 | Metacharacters |
| 3 | Telescript Class Overviews |
| 3.1 | Groups |
| 3.2 | Kernel Group |
| 3.2.1 | Class |
| 3.2.2 | Constrained |
| 3.2.3 | Constraint |
| 3.2.4 | Exception |
| 3.2.5 | Executed |
| 3.2.6 | Execution Exception |
| 3.2.7 | Identifier |
| 3.2.8 | Kernel Exception |
| 3.2.9 | Mark |
| 3.2.10 | Modifier |

Table of Contents

| | | |
|---|---|---|
| 3.2.11 | Nil | |
| 3.2.12 | Object | |
| 3.2.13 | Package | |
| 3.2.14 | Procedure | |
| 3.2.15 | Programming Exception | |
| 3.2.16 | Qualified Identifier | |
| 3.2.17 | Referenced | |
| 3.2.18 | Selector | |
| 3.2.19 | Unchanged | |
| 3.2.20 | Unexpected Exception | |
| 3.2.21 | Verified | |
| 3.3 | Primitive Group | |
| 3.3.1 | Bit | |
| 3.3.2 | Boolean | |
| 3.3.3 | Cased | |
| 3.3.4 | Character | |
| 3.3.5 | Integer | |
| 3.3.6 | Number | |
| 3.3.7 | Octet | |
| 3.3.8 | Ordered | |
| 3.3.9 | Primitive | |
| 3.3.10 | Primitive Exception | |
| 3.3.11 | Telenumber | |
| 3.3.12 | Time | |
| 3.4 | Collection Group | |
| 3.4.1 | Association | |
| 3.4.2 | Bit String | |
| 3.4.3 | Collection | |
| 3.4.4 | Collection Exception | |
| 3.4.5 | Constrained Dictionary | |
| 3.4.6 | Constrained List | |
| 3.4.7 | Constrained Set | |
| 3.4.8 | Dictionary | |
| 3.4.9 | Hashed | |
| 3.4.10 | Lexicon | |
| 3.4.11 | List | |
| 3.4.12 | Octet String | |
| 3.4.13 | Set | |
| 3.4.14 | Stack | |
| 3.4.15 | Stream | |
| 3.4.16 | String | |
| 3.5 | Class Definition Group | |
| 3.5.1 | Attribute | |
| 3.5.2 | Class Definition | |
| 3.5.3 | Class Exception | |
| 3.5.4 | Feature | |
| 3.5.5 | Implementation | |
| 3.5.6 | Interface | |
| 3.5.7 | Method | |
| 3.5.8 | Operation | |
| 3.6 | Identification Group | |
| 3.6.1 | Citation | |
| 3.6.2 | Cited | |
| 3.6.3 | Named | |
| 3.6.4 | Teleaddress | |
| 3.6.5 | Telename | |
| 3.7 | Process Group | |
| 3.7.1 | Contact | |
| 3.7.2 | Contacted | |
| 3.7.3 | Permit | |
| 3.7.4 | Process Exception | |
| 3.7.5 | Process | |
| 3.7.6 | Resource | |
| 3.8 | Agent and Place Group | |
| 3.8.1 | Agent | |
| 3.8.2 | Authenticator | |
| 3.8.3 | Interchanged | |
| 3.8.4 | Means | |
| 3.8.5 | Place | |
| 3.8.6 | Ticket | |
| 3.8.7 | Ticket Stub | |
| 3.8.8 | Trip Exception | |
| 3.8.9 | Unmoved | |
| 3.8.10 | Way | |
| 3.9 | Meeting Group | |
| 3.9.1 | Meeting Exception | |
| 3.9.2 | Meeting Place | |
| 3.9.3 | Petition | |
| 3.9.4 | Petitioned | |
| 3.10 | Miscellaneous Group | |
| 3.10.1 | Calendar Time | |
| 3.10.2 | Miscellaneous Exception | |
| 3.10.3 | Pattern | |
| 3.10.4 | Random Stream | |
| 3.10.5 | Real | |
| 4 | Telescript Class Details | |
| 4.1 | Conventions | |
| 4.2 | Agent | |
| 4.3 | Association | |
| 4.4 | Attribute | |
| 4.5 | Authenticator | |
| 4.6 | Bit | |
| 4.7 | Bit String | |
| 4.8 | Boolean | |
| 4.9 | Calendar Time | |
| 4.10 | Cased | |
| 4.11 | Character | |
| 4.12 | Citation | |
| 4.13 | Cited | |
| 4.14 | Class | |
| 4.15 | Class Definition | |
| 4.16 | Class Exception | |
| 4.17 | Collection | |
| 4.18 | Collection Exception | |
| 4.19 | Constrained | |
| 4.20 | Constrained Dictionary | |
| 4.21 | Constrained List | |
| 4.22 | Constrained Set | |
| 4.23 | Constraint | |
| 4.24 | Contact | |
| 4.25 | Contacted | |
| 4.26 | Dictionary | |
| 4.27 | Exception | |
| 4.28 | Executed | |
| 4.29 | Execution Exception | |
| 4.30 | Feature | |
| 4.31 | Hashed | |
| 4.32 | Identifier | |
| 4.33 | Implementation | |
| 4.34 | Integer | |
| 4.35 | Interchanged | |
| 4.36 | Interface | |
| 4.37 | Kernel Exception | |
| 4.38 | Lexicon | |
| 4.39 | List | |
| 4.40 | Mark | |
| 4.41 | Means | |
| 4.42 | Meeting Exception | |
| 4.43 | Meeting Place | |
| 4.44 | Method | |
| 4.45 | Miscellaneous Exception | |
| 4.46 | Modifier | |
| 4.47 | Named | |
| 4.48 | Nil | |
| 4.49 | Number | |
| 4.50 | Object | |
| 4.51 | Octet | |
| 4.52 | Octet String | |
| 4.53 | Operation | |
| 4.54 | Ordered | |
| 4.55 | Package | |
| 4.56 | Pattern | |
| 4.57 | Permit | |
| 4.58 | Petition | |
| 4.59 | Petitioned | |
| 4.60 | Place | |
| 4.61 | Primitive | |
| 4.62 | Primitive Exception | |
| 4.63 | Procedure | |
| 4.64 | Process | |
| 4.65 | Process Exception | |
| 4.66 | Programming Exception | |
| 4.67 | Qualified Identifier | |
| 4.68 | Random Stream | |
| 4.69 | Real | |
| 4.70 | Referenced | |

-continued

| Table of Contents | |
|---|---|
| 4.71 | Resource |
| 4.72 | Selector |
| 4.73 | Set |
| 4.74 | Stack |
| 4.75 | Stream |
| 4.76 | String |
| 4.77 | Teleaddress |
| 4.78 | Telename |
| 4.79 | Telenumber |
| 4.80 | Ticket |
| 4.81 | Ticket Stub |
| 4.82 | Time |
| 4.83 | Trip Exception |
| 4.84 | Unchanged |
| 4.85 | Unexpected Exception |
| 4.86 | Unmoved |
| 4.87 | Verified |
| 4.88 | Way |
| 5 | Telescript Syntax |
| 5.1 | Telescript |
| 5.2 | Character Telescript |
| 5.2.1 | Preface and Comment |
| 5.2.2 | Executed Objects |
| 5.2.3 | Other Non-terminals |
| 5.3 | Binary Telescript |
| 5.3.1 | Preface and Comment |
| 5.3.2 | Executed Objects |
| 5.3.3 | Other Non-terminals |
| 5.4 | Numeric Codes |
| 5.4.1 | Predefined Classes |
| 5.4.2 | Predefined Features |
| 5.4.3 | Executed Object Encodings |
| 6 | Syntax of Module |
| 6.1 | General Structure |
| 6.2 | Detailed Structure |
| 6.2.1 | Module |
| 6.2.2 | Interface |
| 6.2.3 | Feature |
| 6.2.4 | Constraint |
| 6.2.5 | Other Non-terminals |
| 7 | Predefined Module |
| 8 | Predefined Class Graph |

1 INTRODUCTION

The three major elements of the Telescript technology are introduced in this section of this appendix: the Telescript Instruction Set, i.e. the subject of this appendix; the Telescript Engine, which implements the Instruction Set; and the Telescript Network, formed by interconnecting Engines.

1.1 Telescript Instruction Set

The Telescript Instruction Set, which is sometimes referred to herein as the "Instruction Set", is a set of computer instructions which collectively form a programming language whose intended field of application is distributed systems and applications. The Instruction Set is both object-oriented and interpreted. In Microfiche Appendices E and F, the Instruction Set is sometimes referred to as "the Language".

The most distinctive classes built into the Instruction Set are classes "Agent" and "Place". An agent, i.e. a computer process that is a member of class "Agent", is an active object that can examine and modify itself, transport itself from one place in a network to another, and interact with the other agents it finds there. This power is counterbalanced by permits, which enable either a programmer or an administrator to grant only particular capabilities to particular agents on particular occasions. A place, i.e. a computer process that is a member of class "Place", is an active object that can examine and modify itself and that serves as a venue for agents and a context in which they can interact.

An agent goes to a place and there interacts with the place and other occupants of the place. Agents and places cannot interact at a distance. Thus the Instruction Set implements remote programming (RP), not the more familiar remote procedure calling (RPC) paradigm. RP improves upon RPC by enabling system elements to interact without communicating, improving the performance of the interactions by reducing their latency. Equivalently, RP enables system elements to customize one another by stationing their own agents—and thus themselves—in one another's domain.

The Instruction Set strives to achieve these characteristics:

Safety

The Instruction Set prevents a process from exceeding its permit, interfering with another process without the latter's permission, or directly manipulating the computer on which the process runs. This helps to avoid viruses.

Portability

The Instruction Set makes no concessions to the hardware or software constraints or peculiarities of a particular computer system. This enables a process to be executed anywhere within or around a network.

Extendibility

The Instruction Set gives to types of information object defined by the programmer the same stature as those built into the Instruction Set. This enables extension of the Instruction Set for particular purposes.

Elevation

The Instruction Set draws no distinction between volatile and non-volatile storage. Every information object is inherently persistent. This increases a process level of abstraction and decreases the process' size.

1.2 Telescript Engine

A program written in the Instruction Set is brought to life by a Telescript Engine, which is sometimes referred to herein as an "Engine", which interprets the instructions the program contains. Such a program is called a telescript. One Engine can interpret many telescripts concurrently.

An Engine can implement the abstractions of the Instruction Set without directly relying upon the hardware or operating system of the computer on which the Engine runs. The Engine does this using standard interfaces to the communication, storage, and other subsystems the Engine requires of the platform. These form the Telescript Communication Application Programming Interface (API) which is attached as Appendix C and is a part of this disclosure and is incorporated herein in its entirety by reference.

An Engine can implement privileged escapes from the abstractions of the Instruction Set. Such escapes enable the construction, external to the Engine, of operational, administrative, and managerial (OAM) tools. Such tools are vital to the success of large-scale communication systems.

1.3 Telescript Network

Two or more Engines can be interconnected. The resulting Telescript Network, which is herein sometimes called the "Network" is the universe within which agents travel. The Network encompasses computer systems that would be considered clients of other networks, not parts of them.

A computer system is a part of the Network only if the system incorporates an Engine and thus provides places from and to which agents can go. This requirement makes the Network homogeneous with respect to the structure, as well as the transport, of information.

Engines are interconnected so that they can move agents among themselves. Agents are serialized, or encoded, for this purpose according to the Telescript Encoding Rules described in Appendix B. The resulting octet string is transported between Engines as prescribed by the Platform Interconnect Protocol which is attached as Appendix F as a part of this disclosure and is incorporated herein in its entirety by reference.

1.4 This Appendix

This appendix is described as follows.

1.4.1 Scope

This appendix defines Version 0.8 of the Instruction Set. The Telescript Encoding Rules, the Telescript Protocol, and the Telescript API are all beyond the scope of this appendix and are the subject of respective Appendices B, F, and C.

One may view the Instruction Set as an instruction set for a virtual machine. From this viewpoint, one can readily envision still higher-level languages, compilers for which produce telescripts. General Magic Inc. of Mountain View, Calif. is developing such a language which is called High Telescript. In the context of Appendices A–F of this disclosure, the Instruction Set itself is sometimes called Low Telescript.

1.4.2 Conformance

A manufacturer of an Engine has to satisfy certain requirements to properly claim conformance to this appendix.

1.4.3 Conventions

These conventions of prose are followed throughout this appendix:

"The α attribute" means "the attribute whose identifier equals α".

"Is a key" means "equals a key", and not "is the same as a key".

"An x" generally means "a member of X", and not "an instance of X".

"Throws x" generally means "throws a member of X".

"Whether statement" means "statement iff true".

Iff means "if and only if", as it does in mathematics.

MSB stands for "most significant bit".

LSB stands for "least significant bit".

Note: Throughout this appendix, notes (like this) are explanatory, not definitive.

1.4.4 Organization

This appendix is divided into eight sections. Section 1 is this introduction. Section 2 introduces the Instruction Set's major concepts. Section 3 overviews the Instruction Set's predefined classes. Section 4 defines them in detail. Section 5 defines the Instruction Set's syntax.

Section 6 defines the conventions followed by the formal definitions of the interfaces to the predefined classes. Section 7 comprises those formal definitions. Section 8 shows the part of the class graph that comprises the predefined classes and no user-defined classes.

1.4.5 Road Map

Parts of this appendix are definitive, while others are merely informative. The definitive sections are Sections 1, 2, 4, and 5. In contrast, Sections 3, 7 and 8, reorganize material in Section 4, while Section 6 duplicates aspects of High Telescript.

Different audiences require different parts of this appendix. Those interested only in the Instruction Set's scope and structure need read only Sections 1, 2, and 3. A Telescript programmer requires Section 4 as well. A Low Telescript programmer must master also the portion of Section 5 covering character telescripts, while the High Telescript programmer need not do so. A High Telescript Compiler or Engine implementor requires the portion of Section 5 covering binary telescripts.

For Telescript practitioners, Sections 7 and 8 are indispensable references.

1.4.6 References

This appendix relies upon these other documents:

[10646]

*Information technology—Universal Coded Character Set (UCS)*, ISO/IEC DIS 10646, International Organization for Standardization and International Electrotechnical Commission, 1990.

[Unicode]

*The Unicode Standard: Worldwide Character Encoding,* Volume 1, Version 1.0, The Unicode Consortium, Addison-Wesley, 1991.

2 TELESCRIPT CONCEPTS

The Instruction Set defines a variety of concepts, the most important of which are introduced in this section of this appendix. These concepts are divided into "models". A subsection is devoted to each model. Within each subsection, a lesser subsection is devoted to each concept in the model.

Being for remote programming, the Instruction Set includes concepts spanning the realms of languages, operating systems, and networks. Conventionally separate, these areas, in this instruction set are brought together.

2.1 Models

The Instruction Set's concepts are divided into models. This division serves pedagogic purposes alone and is not visible, in any sense, at run time.

The following models are defined:
Object
 The "Object" model provides object orientation, e.g., objects, references, classes, operations, and exceptions.
Execution
 The "Execution" model provides sequential execution, e.g. methods, procedures, and identifiers.
Process
 The "Process" model provides multi-tasking, e.g., processes, resources, permits, contacts, and ownership.
Network
 The "Network" model provides network architecture, e.g., agents, places, trips, meetings, and telenames.
Timekeeping
 The "Timekeeping" model provides means for keeping time, e.g., times and calendar times.
Pattern Matching
 The "Pattern Matching" model provides means for pattern matching, e.g., patterns.

The models are presented below in the order in which they are listed above. The concepts within each model are presented in a logical order.

2.2 Object Model

The Instruction Set realizes the "object model" this section defines.

2.2.1 Objects

An object is the Instruction Set's unit of both information and information processing. An object is an instance of a class.

Note: An object may be anything at all, either simple, e.g., a boolean, or complex, e.g., a dictionary, either passive, e.g., a string, or active, e.g., a process.

Note: In messaging, the application for which the Instruction Set was conceived, the objects can include the messaging system's component parts, e.g., its mailboxes and distribution lists; the information objects the system transfers, e.g., messages and delivery reports; and the elements of those information objects, e.g., the fields of envelopes.

Persistence

Every object is "persistent". If the Engine fails and subsequently recovers, the only effect upon the object is its temporary unavailability.

Size

Every object has a "size" which is the approximate amount of persistent storage the object occupies, measured in octets.

Note: An object's size may vary from place to place.

2.2.2 References

A "reference" is the means by which an object is denoted and accessed.

Protected vsUnprotected

A reference is either "unprotected" or "protected". An unprotected reference enables the object to be changed, while a protected reference does not. An unprotected reference can be made protected, but not conversely.

Creation

There exists one or more references to every object. Creating an object creates an initial reference to the object as well. The reference is protected iff the object is immutable. Additional references can be created as desired. Created references are protected iff the source reference is protected.

Note: Many predefined operations create new references to existing objects and return the references as results.

Comparison

All unprotected references to an object are equivalent. Changes made using an unprotected reference to an object are made to the object, and thus, in effect, to all other references to the object. All protected references to an object also are equivalent to one another.

An unprotected and a protected reference differ in two ways which come to light when a protected reference is used to request a feature of the object the reference denotes. First, if the feature would change the object, the feature fails, throwing "Reference Protected". Second, if the feature returns a reference to—not a copy of—one of the object's properties, that reference is protected.

One can determine whether two references denote the same object.

Discarding

A reference should be discarded when no longer needed. If no references to the same object remain, the object itself is destroyed.

Voiding

The Engine voids references under circumstances this appendix defines. A "voided" reference no longer provides access to an object. The Engine throws "Reference Void" rather than push a voided reference onto the stack.

2.2.3 Classes

A "class" defines a set of objects, the class' "instances", all having the same interface and the same implementation. The class itself has both an interface and an implementation, which are potentially unique to the class.

Predefined vs User-defined

A class is either predefined or user-defined. A "predefined" class, built into the Instruction Set and defined in this appendix, represents a kind of object available to every Telescript programmer. A "user-defined" class, defined by the programmer, extends the Instruction Set for specific purposes.

Concrete vs Abstract

A class is either concrete or abstract. A "concrete" class can have instances. An "abstract" class cannot, but its subclasses can and often do. A concrete class, or one of its implementation superclasses, shall implement each feature either native to or inherited by the class.

Sealing

A class, usually concrete, can be sealed. The Engine prevents a sealed class from having user-defined, but not predefined, immediate subclasses.

Creation

A concrete class can create a new instance given initialization parameters describing the new instance. Not every instance of every class, however, can be created in this way. The remaining ones can be created by first creating one instance in this way and then modifying the instance's attributes as necessary.

Conversion

A concrete class can convert an instance of one class to an instance of itself. Not every instance of every class, however, can be converted to an instance of every other class The definition of operation "convert" and the nature of the object conversion produces, depend upon the two classes involved.

Compatibility

A class is embodied as a cited object. One class is backward compatible with another iff the former's interface can be created from the latter's by making only changes of the following kinds. First, a feature can be added. Second, if in the latter's interface an attribute is read-only, that attribute's class can be narrowed to a subclass. Third, the class of an argument of an existing operation can be widened to a superclass. Fourth, the class of the result of an existing operation can be narrowed to a subclass.

2.2.4 Inheritance

Native vs Inherited

All classes, both predefined and user-defined, are related to one another by "inheritance". Every class has various characteristics. In general, some of a class' characteristics are "native" to the class, while others are "inherited" from other classes. Inheritance is a transitive relationship. A class inherits from a class the latter's inherited characteristics, as well as the latter's native characteristics. Extending the above terminology only slightly, an object's native characteristics are those native to the class of which the object is an instance.

The Instruction Set sufficiently constrains the inheritance relationships among classes that the classes and their relationships can be described by simple graphs. In such a graph, the nodes represent classes, the arcs between nodes the inheritance relationship between the classes the nodes represent.

Subclass vs Superclass

If one class inherits characteristics from another, either directly or indirectly, the former is a "subclass" of the latter, and the latter is a "superclass" of the former. If one class inherits characteristics from another directly, the former is an "immediate subclass" of the latter, and the latter is an "immediate superclass" of the former.

An instance of a class is a "member" of that class and of its superclasses.

Flavor

Some classes are flavors. The "flavors", each of which is either abstract or concrete, form a tree as follows. The tree's root represents class "Object". Each destination node reached by an arc emanating from any given source node represents an immediate subclass of the flavor that the source node represents. Thus the source node represents an immediate superclass of the flavor represented by each such destination node. Each destination node reached by way of one or more arcs in succession represents a subclass of the flavor that the source node represents. Thus the source node represents a superclass of the flavor represented by each such destination node.

Note: Flavors provide single inheritance.

Mix-in

All other classes are mix-ins. A "mix-in" and its zero or more superclasses—all mix-ins themselves—form a second tree as follows. The tree's root is the mix-in. The arcs represent the inverse inheritance relationship between the mix-ins that the tree's nodes represent. A mix-in is abstract.

Note: Mix-ins provide a limited form of multiple inheritance.

Class Graph

The flavors and mix-ins together form a directed graph. The graph is constructed in the following two steps. First, the arcs in each mix-in tree are reoriented to represent the inheritance relationship, rather than its inverse. Second, the thusly altered mix-in trees are superposed upon the flavors tree.

Note: There is one, global class graph, achieved by identifying classes globally. In any particular place, knowledge of the graph may be incomplete.

Canonical Order

A class, either a flavor or a mix-in, and its superclasses, both flavors and mix-ins, have a "canonical order" which is that of a walk of a third tree.

The tree is formed as follows. Its root is the class in question, its other nodes the class' superclasses. As in a mix-in tree, the arcs represent the inverse inheritance relationship among the classes that the tree's nodes represent.

The walk is a depth-first one in which a class' immediate superclasses are visited in their canonical order, which the class defines.

Interface vs Implementation

All of the above can be said about either of three sets of class characteristics: the classes' interfaces, their implementations, or both. This appendix explains, either explicitly or implicitly, which of the two sets of characteristics is being discussed at any particular point within this appendix.

Note: More often than not, the classes' interfaces are in view.

2.2.5 Features

A "feature" is an externally visible characteristic of an object. Features enable objects to interact. If one object possesses a reference to another, the former can request a feature of the latter. All instances of a class have the same features, defined by the interfaces native to or inherited by that class.

A feature "succeeds" when it is used correctly, and "fails", at other times. When the feature fails, an exception is thrown.

Attribute vs Operation

Features are of two kinds, attribute and operation.

Note: Whether a particular feature is made an attribute or an operation is, in part, a matter of taste.

Sealing

A class can seal a feature, either native or inherited, thereby preventing the feature's implementation by user-defined, but not predefined, subclasses.

Implementation

A class can implement any native feature or any inherited feature not sealed by a superclass. In the latter case, the class' implementation supersedes the superclasses' implementations, if there are any.

Access

The Engine controls access to a feature. A feature's "access" defines the objects that can use the feature, and is one of the following:

public
Any object can use the feature.
private
Only the object that has the feature can use it.
system
Only the Engine itself can use the feature, which is predefined.

2.2.6 Attributes

An "attribute", an object, is any characteristic that one object, the "requester", can ask another or the same object, the "responder", to get and perhaps set. An attribute that cannot be set is "read-only".

"αGet" vs "αSet"

An attribute is exactly equivalent to either one operation, if the attribute is read-only, or two, otherwise. The first operation, denoted symbolically as "αGet", gets the attribute. It has no arguments, and its result is the attribute. The second operation, denoted as "αSet" replaces the attribute with a particular object. The one argument of operation "αSet" is that object, and the operation has no result.

Manual vs Automatic

A class can implement an attribute either manually, automatically, or, iff the class is abstract, not at all. To "manually" implement an attribute is to provide methods for "αGet" and, if the attribute can be set, "αSet". To "automatically" implement an attribute is to let the Engine do so, which it does if the attribute is an instance attribute, the class is concrete, and neither the class nor its implementation superclasses implement the attribute. The Engine implements the attribute with a property of the same identifier.

The Instruction Set defines the getting and setting of attributes with the aid of "getAttribute" and "setAttribute", respectively, internal operations an argument of which is the attribute's identifier ("α"). These two operations get and set, respectively, the property associated with the attribute, if the latter is implemented automatically, or perform the user-defined methods for operations "αGet" and "αSet", otherwise, i.e., if the attribute is implemented manually. An attribute's manual or automatic implementation alike is located using the execution model's algorithm for locating the implementation of an operation.

Storage Location

An attribute that is not read-only behaves by default as a "storage location". That is, operation "αGet" returns the object most recently supplied successfully as an argument of operation "αSet". Exceptions to this default behavior shall be called out in the prose descriptions of particular attributes.

Note: Thus if an attribute exhibiting the default behavior is constrained to be a member of class "Dictionary", and an instance of a subclass of class "Dictionary" is supplied to operation "αSet", operation "αGet" returns that instance of that class, not an instance of class "Dictionary".

Note: All predefined attributes which are read-only exhibit the default behavior.

2.2.7 Operations

An operation is any task that one object, i.e. "the requester", may ask another or the same object, i.e. "the responder", to perform.

Arguments

The requester supplies the responder with zero or more objects, which are the operation's "arguments". An operation defines whether the operation's arguments are variable or fixed in number and, if the latter, how each is constrained.

Note: If the arguments are variable in number, none may be a mark.

Note: Of the predefined operations, operations "initialize", "makeClasses", "select" and "new", and no others require a variable number of arguments.

Result

The responder can optionally supply the requester with a single object, the operation's "result", if the operation succeeds. An operation defines whether there is a result and, if so, how it is constrained.

2.2.8 Exceptions

An "exception" is an object describing the failure of either the performance of a method for a feature or, more fundamentally, the execution of one of the executed objects that are the items in the method's procedure.

A feature fails when its responder "throws" an exception in lieu of any result the responder would have returned had the feature succeeded. The feature's requester "catches" the exception if the requester wishes to react to the exception. Otherwise, the Engine "propagates" the exception, i.e., causes the requester to throw the exception.

2.2.9 Constraints

A "constraint" defines restrictions that are placed upon other objects, which are the constraint's "subjects". The possible restrictions include the identifier of the class of which the subjects shall be members, that class itself, whether the subjects shall be instances of that class, whether the subjects are permitted to be nils, the class just mentioned notwithstanding, and the subjects' passage.

Passage

An object may be passed between a feature's requester and responder in any of several different ways, which determine how the source reference, which the object's source conveys to the Engine, determines the destination reference, which the Engine conveys to the object's destination.

An object's "passage" is one of these identifiers:

byRef

The destination reference is the source reference.

byUnprotectedRef

The destination reference is the source reference, but the Engine throws "Reference Protected" if the source reference is protected.

byProtectedRef

The destination reference is a protected reference to the object to which the source reference provides access.

byCopy

The destination reference is an unprotected reference to a copy of the object to which the source reference provides access. The Engine makes the copy for this purpose alone. The copy is owned by either the object's destination, if a process, or the object's destination's owner, otherwise.

2.2.10 Properties

An object has zero or more properties. Itself an object, a "property" is one element of the object's internal state, all of the object's properties, taken together, constituting the entire internal state. An object's properties are internal to it, and thus can be directly sensed, examined, and modified by that object alone.

An object's properties are partitioned by class. Zero or more are native to the object's class, and zero or more to each of the class' implementation superclasses.

A property can be directly sensed, examined, and modified by the methods of the class to which the property is native, but not by the methods native to other classes, not even the class' subclasses or superclasses.

2.2.11 Copying

Objects can be copied. A "copy" of one object is another object that is indistinguishable from the former object except, in general, by means of operation "isSame" and by the fact that the copy can be changed, even if a protected reference was used to create the copy.

A copy generally equals the original from which it was fashioned, at least initially. The meaning of "equal" depends upon the classes of which the original is a member. If the class, and thus the copy, are immutable, the copy and original remain equal indefinitely. Otherwise, they can diverge, as the copy and the original are independent.

A copy is created using operation "copy". The Engine creates the copy by requesting operation "copy" of each property of the original. However, if the Engine finds a property to be a reference to an object the Engine has copied for this purpose already, the Engine does not make a second copy of that object, but rather uses a reference to the first.

2.2.12 Object Initialization

An object's creation entails the object's initialization. A method for operation "initialize" can be native to any class of which the created object is a member. The method shall initialize the object's properties native to that class.

Before the Engine requests a method for operation "initialize", it sets to nils the properties that are native to the class to which that method is itself native.

Initialization Order

Each method for operation "initialize" shall escalate the operation after initializing the properties for which the method is responsible, thereby allowing other methods to do the same. If a method succeeds without escalating the operation, the Engine does so for the method. The process of escalation visits the class of the created object and that class' implementation superclasses in canonical order.

InitializationParameters

A class' "initialization parameters" are the objects that the method for operation "initialize" native to that class requires for the operation's performance. If the class is a mix-in, it speaks, by its choice of parameters, for itself alone. If the class is a flavor, it speaks for itself and its implementation superclasses alike. At escalation, a class' method for operation "initialize" shall have ensured that the parameters of the classes yet to follow in the canonical order are on the stack, above the topmost mark. After the methods for all classes have been performed, class "Object" throws an exception if any parameters remain.

Initialization Privileges

A method for operation "initialize" can use a feature of the created object after escalation but not before. Even then, the object responds as if it were an instance of the class to which the method is native, not the class of which the object is an instance. The method can use other objects' features at any time.

2.2.13 Object Finalization

An object's destruction entails the object's finalization. A method for operation "finalize" can be native to any class of which the destroyed object is a member. The method shall finalize the object's properties native to that class.

A method for operation "finalize" can optionally discard, and thus perhaps destroy, the properties the operation finalizes. If the method does not do so, the Engine does.

Finalization Order

A method for operation "finalize" does not escalate the operation. The Engine performs each method whether or not other methods succeed, visiting the class of the destroyed object and its implementation superclasses in canonical order.

2.2.14 Class Construction

The Instruction Set, unlike many computer languages, enables classes to be created at run time via operation "makeClasses". A class is created on the basis of a class definition which defines both the class' interface and the class' implementation.

Identifier Bindings

A class' interface or implementation typically depends upon other classes which the interface or implementation denotes by identifiers. A citation is bound to each such identifier with the aid of the interface's or implementation's "vocabulary" attribute.

If the identifier equals that of a predefined class, the citation is to that class. Otherwise, if the identifier equals a key in the "vocabulary" attribute, the citation equals the associated value. Otherwise, the citation equals that of the constructed class, except that the citation's "title" attribute equals the class' identifier.

Note: The Instruction Set does not define the predefined classes' assigned citations.

Citation Bindings

A class is bound to a citation with the aid of the "privateClasses" and "publicClasses" attributes of the current process and the current place, respectively.

If a cited class is predefined, the cited class is found in the Engine itself. If it is user-defined, the class is sought, and may or may not be found, in the "privateClasses" attribute of the current process, and, failing that, in the "publicClasses" attribute of the current place, the class being any that is backward compatible with the cited class.

A class is bound to the citation at one of two times. If the class' identifier is an item of a procedure, the class is sought whenever the identifier is executed. Otherwise, the class is sought when the class is constructed.

2.3 Execution Model

The Instruction Set realizes the "execution model" this section defines.

2.3.1 Methods

A "method" is a procedure which is able to separately maintain the dynamic state of each of its performances. That dynamic state takes the form of a frame. Methods are used to implement operations, conversions, and selected attributes.

Frame

A "frame" comprises a stack and zero or more variables. Itself an object, a "variable" is one element of the dynamic state of a particular performance of the frame's method, all of the frame's properties, taken together and with the stack, constituting the entire dynamic state. A frame's stack and variables are internal to the frame, and thus can be directly sensed, examined, and modified by the frame's method alone. The frame itself cannot be manipulated at all.

Performance

To "perform" a method is to create a frame, accept an offer of objects as the initial items of the frame's stack, set the frame's variables to nils, perform the method's procedure, discard the frame, and, if the procedure succeeded, offer the final items of the frame's stack, having popped them from that stack before discarding the frame. The method's performance succeeds or fails if the procedure succeeds or fails, respectively.

At any point in time, the "current method" is the method currently being performed, the "current frame" is the frame created for that performance, and the "current stack", i.e. "the stack", is that of the current frame.

Note: If the method implements an operation, the objects offered as the initial items of the stack are the arguments, the topmost of the objects offered as the final items the result, if there is one. In between these two events, the stack holds first the arguments and then the result, if there is one, of any operation the method requests. Items other than the topmost item of the stack at completion of the operation, if there are any, are objects used during performance of the operation to carry out intermediate steps of the operation.

2.3.2 Procedures

A "procedure" comprises zero or more executed objects, its "items", which are not among the procedure's properties, but rather are more fundamentally a part of the procedure. The items are numbered in the range [1, n], "n" being the procedure's "length". The procedure is "cleared" if its length is zero. An item's number is its "position" in the procedure. A "subprocedure" comprises zero or more items in adjacent positions within a procedure.

Performance

To "perform" a procedure is to execute its items sequentially, in order of increasing position, in the current frame. The procedure's performance either "succeeds", if each item is executed successfully, or "fails", otherwise If the execution of any item fails, no remaining item is executed.

2.3.3 Executed Objects

An "executed" object is permitted as an item of a procedure.

Performance

To "perform" an executed object other than a procedure is to execute it.

Execution

To "execute" an executed object is to do things that depend upon whether the executed object is an identifier, a modifier, a selector, or something else. Execution either "fails", if the Engine throws an exception, or "succeeds", otherwise.

Any executed object other than an identifier, a modifier, or a selector is executed by pushing onto the stack a protected reference to the executed object.

Note: The executed objects in question in the preceding paragraph are bits, bit strings, booleans, characters, integers, marks, octets, octet strings, procedures, reals, and strings.

2.3.4 Identifiers

A particular class, feature, property, or variable is denoted by an identifier, as are other constructs and objects in the Instruction Set.

Identifier

An "identifier" distinguishes one object from others within its scope by means of the identifier's "text", a string whose length is at least one.

Qualified Identifier

A "qualified identifier" distinguishes zero or more implementations of a feature from zero or more other implementations of the same feature. A qualified identifier denotes the feature by means of the text of its identifier. It denotes the implementations—those either native to or inherited by a class—by means of the text of the class' identifier, which is the qualified identifier's "qualifier".

Scope

No two identifiers having the same scope shall be equal.

Class

A class cited by an interface or an implementation is denoted by an identifier whose scope is all classes cited by that interface or implementation.

Feature

A feature of an object is denoted by an identifier whose scope is all features whether native to or inherited by the class of which the object is an instance.

Property

A property of an object is denoted by an identifier whose scope is all properties native to the class to which the property in question is itself native.

Variable

A variable of a frame is denoted by an identifier whose scope is all variables defined by the method to whose performance the frame pertains.

Syntax

A text or a qualifier shall exclude the characters in Table A.1.

TABLE A.1

| | Characters | Notes |
|---|---|---|
| Control Characters | | |
| | U+0000 -- U+001F | As in ASCII. |
| | U+007F -- U+009F | As above, but with Bit 7 one. |
| Spaces | Various | See [Unicode] §4.2. U+0020, U+00A0, etc. |
| Symbols and Punctuation | U+0021 -- U+002F | As in ASCII. |
| | U+003A -- U+0040 | As in ASCII. |
| | U+005B -- U+005E | As in ASCII. |
| | U+0060 | As in ASCII. |
| | U+007B -- U+007F | As in ASCII. |
| | U+00A1 -- U+00BF | In Latin1. |
| | U+00D7 & U+00F7 | Multiplication ("X") and division (÷) signs |
| | U+2000 -- U+2FFF | Assigned symbols. |
| Private Use Characters | U+E800 -- U+FDFF | |
| Special Characters | U+FFF0 -- U+FFFD | |

The first character of a text or a qualifier shall exclude the characters in Table A.2, as well as those in Table A.1.

TABLE A.2

| | Characters | Notes |
|---|---|---|
| Decimal Digits | Various | See [Unicode] §4.1. U+0030-- U+0039, etc. |
| Non-spacing Marks | Various | See [Unicode] §4.5. |

Note:
When one programs in High Telescript, the privilege of assigning identifiers the first character of whose text is an underscore ("_") (U+005F) is reserved for the High Telescript Compiler itself.

2.3.5 Static Substitution Rules

A procedure is performed as if the substitutions in Table A.3 below had been made. Wherever a subprocedure in the first column appears in the procedure, the subprocedure in the same row of the second column replaces it.

Table A.3 defines each subprocedure using the nonterminals used to define telescripts. In the table's first section, "Identifier" stands for either itself or "QIdentifier". In the second section, "Identifier" stands for itself alone.

TABLE A.3

| Subprocedure | Substituted Subprocedure |
|---|---|
| SetAttribute Identifier | Mention Identifier Swap "setAttribute" |
| UseStack Identifier | UseStack Identifier[1, 2] |
| GetClass Identifier | Mention Identifier Self "getClass" |
| GetProperty Identifier | Mention Identifier Self "getProperty" |
| GetVariable Identifier | Mention Identifier Self "getVariable" |
| SetProperty Identifier | Mention Identifier Self "setProperty" |

TABLE A.3-continued

| Subprocedure | Substituted Subprocedure |
|---|---|
| SetVariable Identifier | Mention Identifier Self "setVariable" |
| Mention ExecutedObject | Mention "ExecutedObject[2]" |

[1]This substitution applies iff the identifier is neither that of operation "protect" nor opeation "ref".
[2]This substitution is an identity.

If asked to create a procedure having modifiers arranged in subprocedures other than those in Table A.3 or Table A.4 below, the Engine throws an exception.

An internal operation, discussed in Section 3.2.12 of this appendix, succeeds only if requested as the result of one of the substitutions in Table A.3 or Table A.4. An internal operation is otherwise inaccessible.

2.3.6 Dynamic Substitution Rules

A procedure is performed as if the substitutions in Table A.4 had been made as well. In Table A.4, "Identifier" stands for either itself or "QIdentifier".

TABLE A.4

| Subprocedure | Substituted Subprocedure |
|---|---|
| Identifier | Mention Identifier Swap "getAttribute"[1] |
| Demarcate Identifier | Mention Identifier Swap Demarcate "getAttribute"[1] |
| Demarcate Identifier | Demarcate Identifier[2] |

[1]This substitution applies iff the identifier denotes an attribute.
[2]This substitution, an identity, applies iff that of Note 1 does not, i.e., if the identifier does not denote an attribute.

2.3.7 Selector Execution

A "selector" achieves a special execution effect. A selector is executed as follows:

break

Makes operation "loop", "repeat", or "while" succeed. "Loop Missing" is thrown if neither operation is being performed.

client

Pushes onto the stack an unprotected reference to the current client. The "current client" is either the object requesting the feature the current method implements, unless the requester is the Engine itself, e.g., if the feature's access is "system", or a nil, otherwise continue Makes operation "loop", "repeat", or "while" begin its next performance, if any. "Loop Missing" is thrown if neither operation is being performed.

escalate

Is the same as executing an identifier for the operation that the current method implements, with these exceptions. Before method selection, the Engine throws "Escalation Invalid" if the requester is not the responder. During method selection, the Engine bypasses the class to which the current method is native. The operation has been escalated.

here

Pushes onto the stack an unprotected reference to the current place. The "current place" is either the place the current process occupies, unless the process is an engine place, or a nil, otherwise.

process

Pushes onto the stack an unprotected reference to the current process. The "current process" is that of which the current method's performance is dynamically a part.

self

Pushes onto the stack a reference to the current object. The "current object" is that performing the current method.

The reference is protected if a protected reference was used to request the current method's performance.

succeed

Causes the current method to succeed without its remaining items having been executed. The attribute or the operation's result, if there is one, shall be on the stack.

2.3.8 Modifier Execution

A modifier alters the execution of the item that follows it in a procedure.

The execution of various modifiers is provided for by the substitution rules. A modifier that the substitution rules leave intact is executed as follows:

demarcate

Causes the following identifier, or qualified identifier, to be executed with these changes. If the stack does not include a mark, the Engine throws "Mark Missing". If the number of arguments required by the operation that the identifier denotes is fixed and less than the number of objects above the mark, the Engine throws "Argument Invalid". Otherwise, if the number of arguments is fixed and greater than the number of objects above the mark, the Engine inserts in the stack, between the mark and the objects supplied, as many nils are there are arguments missing. The Engine then excludes the mark from the stack and, if the operation succeeds but does not produce a result, returns a nil to the requester, in place of a result.

mention

Avoids executing the object following the "mention" modifier, pushing a protected reference to that object onto the stack instead.

useStack

Pushes onto the stack a reference to the stack itself before executing the following object.

2.3.9 Identifier Execution

The execution of an identifier for a class, an attribute, a property, or a variable is provided for by the substitution rules described above with respect to Tables A.3 and A.4.

Identifier

An identifier that the substitution rules leave intact—one for an operation—is executed as follows.

The Engine throws "Responder Missing" if the stack is cleared, since the responder was to have been on top of the stack. The Engine throws "Feature Unavailable" if either the responder lacks the operation the identifier denotes or the requester lacks access to the operation. Otherwise, the Engine selects and performs a method for the operation as described in the sections below.

Qualified Identifier

A qualified identifier for an operation is executed in the same way as is an identifier which is not a qualified identifier, for that operation, with these exceptions.

Before method selection, the Engine throws "Escalation Invalid" if the requester is not the responder. Otherwise, the Engine requests operation "getClass", its argument being an identifier whose text is the qualifier, and throws "Escalation Invalid" if the operation's result is neither the class to which the current method is native nor one of its immediate implementation superclasses.

During method selection, the Engine confines itself to the result of operation "getClass" and its implementation superclasses. The operation has been escalated.

2.3.10 Method Selection

The Engine selects for an operation the first method it finds by searching the following four locations in the order in which they are listed here:

If the responder is a class, its class methods.

If the responder is a class, the class methods of its implementation superclasses, which are investigated in canonical order.

The instance methods of the responder's class.

The instance methods of the implementation superclasses of the responder's class, which are investigated in canonical order.

If a method escalates the operation, the Engine attempts to select another, resuming its search after the class to which the method it selected previously is native. If it finds no method, the Engine throws "Escalation Invalid".

2.3.11 Method Performance

The Engine performs, as follows, the method it selects for an operation.

Arguments Fixed in Number

If the operation requires a fixed number of arguments, the Engine throws "Argument Missing" if the stack's length is less than one plus that number, and throws "Argument Invalid" if an argument violates the argument's constraint.

Arguments Variable in Number

If the operation requires a variable number of arguments, the Engine throws "Mark Missing" if the stack does not include a mark, and throws "Argument Invalid" if an argument violates the argument's constraint.

Performance

The Engine pops the responder from the stack, creates a frame for the method's performance, performs the method, and discards the frame.

The following actions surround the method's performance. The Engine offers the operation's arguments, moving them from the requester's stack to the responder's. If the number of arguments is variable, the mark is offered in this way as well. The Engine accepts the offer of the operation's result, if there is to be one, moving it from the responder's stack to the requester's.

Success

If the method succeeds and the operation was to produce a result, the Engine does the following. If no result was produced, the Engine throws "Result Missing". If the result does not satisfy the result's constraint, the Engine throws "Result Invalid". Either exception is handled as described below.

Failure

If the method fails and the operation was not to throw the exception it actually threw, the Engine substitutes "Unexpected Exception" for that exception.

2.4 Process Model

The Instruction Set realizes the "process model" this section defines.

2.4.1 Processes

A "process" is a named, autonomous computation. It constitutes the Instruction Set's provision for multi-tasking.

Note: A process often represents something in the real world, e.g., a person, whose objectives the process seeks to further in the Network.

Note: There are two kinds of process, agent and place.

Interaction

If one process has a reference to another, the two can interact in the same way as can any two objects: by means of their respective features. Each argument or result of such a feature enables one process to convey to the other either a reference to, or a copy of, an object.

2.4.2 Phases

A process goes through phases. The Engine requests and the then potential process successfully performs operation "initialize". The Engine requests and the process successfully performs operation "live", a nil being supplied as the operation's argument. The Engine requests and the process performs operation "finalize".

Exceptions

The normal progression of phases described above may be interrupted. If operation "initialize" throws an exception, the Engine terminates the process. If operation "live" throws an exception, the Engine either restarts the process by requesting operation "live" again, the exception being supplied as the operation's argument, if the permit the process holds allows this, or requests operation "finalize" otherwise. If operation "finalize" throws an exception, the Engine terminates the process.

If the process exhausts its native or local permit in any phase above, the situation is as if the process had thrown "Permit Exhausted".

2.4.3 Threads

Every process gives rise to an independent thread of execution which comprises, at any moment, the frames of the methods being performed on the process' initiative. The first such method is the one the process itself provides for operation "live" the second the one an object provides for a feature that the method for operation "live" requests of that object, and so on, recursively.

Scheduling

The Engine schedules all execution threads that are not blocked, e.g., waiting until a certain time, switching preemptively between them as necessitated by their priorities. All else being equal, the Engine favors neither the processes of one authority over those of another, the processes of one brand over those of another, nor one process over another of the same priority.

Interruption

When the Engine itself requests a feature of an object, i.e., a system feature, the feature's method is performed as part of the thread of the object's owner. The owner, in effect, is interrupted for that purpose.

2.4.4 Resources

A "resource" is something about which certain guarantees can be made to a process throughout its performance of a particular procedure. The Engine may delay the process until it can make the guarantees.

Note: Resources enable the definition of critical conditional regions.

Note: A resource is often a proxy for a physical resource (as exemplified below).

Note: In an electronic mail system, e.g., an agent serving as a mailbox might include among its properties a database of delivered messages and a resource representing the database. The agent would obtain exclusive use of the resource before beginning the task of adding a newly delivered message to the database, thereby ensuring the database's integrity in the face of concurrent deliveries.

Need

Because one process can convey a reference to an object to another process, every object must be prepared for the methods native to or inherited by its class to be performed concurrently by those processes. Resources enable objects to make such preparations.

Resources are used to ensure that sequences of operations are carried out atomically. For one operation, such precautions generally are not required because the Engine performs atomically all predefined operations except operations "wait", "meet" and any predefined operation that performs a procedure supplied as either the responder, e.g., operation "do", or an argument, e.g., operation "restrict".

Note: The Engine performs operations "go" and "send" atomically.

Exclusive vs Shared

A process can be guaranteed either shared or exclusive use of a resource. At any time, either no processes have use of the resource, one process has "exclusive" use of it, or one or more processes have "shared" use of it.

Condition

A process can be guaranteed that a resource is among one or more conditions identified when the request is made. At any time, a resource has a "condition" which is among one or more conditions defined when the resource was created. Denoted by an identifier, a resource's condition can be examined only by a process with use, shared or exclusive, of the resource, and can be modified only by a process with exclusive use of the resource.

2.4.5 Permits

A "permit" grants capabilities to a process, its "subject". The capabilities represented by the bulk of the Instruction Set, e.g., the Instruction Set's arithmetic operations, are implicitly granted to each process. Other capabilities are explicitly granted to particular processes by means of the permits assigned to those processes.

Note: The principal purpose of permits is, as far as possible, to prevent processes from consuming computer and communication resources in unintended amounts. This benefits users, who create the processes and may have to pay for them, but also providers, who must provide the resources that the processes consume.

Note: The resources mentioned above are not to be confused with members of class "Resource". There is no necessary connection between the two.

Capabilities

A permit grants capabilities in certain defined dimensions and amounts.

A permit can grant a process a certain age, size, charges, priority, or authenticity. The charges to which a permit entitles its subject is called the subject's "allowance". An amount in any of these dimensions is an integer. Age is measured in seconds, size in octets, and charges in "teleclicks". Priority increases with its integer value. Authenticity is region-specific.

A permit can grant a process the right to transport itself (attribute "canGo" of the permit), create and transport clones of itself (attribute "canSend"), create other peer processes (attribute "canCreate"), set the permits of selected processes so as to decrease (attribute "canDeny") or increase (attribute "canGrant") their capabilities, increase the actual charges of other processes (attribute "canCharge"), or be restarted if terminated (attribute "canRestart"). An amount in any of these dimensions is a boolean, where a boolean whose value is "true" grants the right in question.

Each dimension in which a permit can grant capabilities is represented by an attribute of the permit. If normally an integer, the attribute can be a nil instead, in which case the capability is granted in unlimited amount.

Note: The charge, in teleclicks, for a service rendered to a process, whether by an Engine or by another process, can vary from place to place, from time to time, or both. The charges for some services, e.g., space, can be assessed per unit time.

Status

A process' "status" identifies the process' exercised capabilities. The status of a process is the process' effective permit", which is described below, except that the permit's "age", "charges", "extent", and "priority" attributes are the process' actual age, charges, size, and priority, respectively.

Effective Permit

A process' "effective permit" identifies the process' allowed capabilities. At any time and place, this permit is the intersection of the process' native, regional, and local permits and any temporary permits in force. For this purpose, however, the native permit's "authenticity" attribute is considered a nil unless the process is in the region in which the process was created.

The "intersection" of two permits is itself a permit, each of whose native attributes, $A_0$, is the intersection of the like-named attributes, $A_1$ and $A_2$, of the two permits in question. More specifically, $A_0$ is either $A_1$, if $A_2$ is a nil; $A_2$, if $A_1$ is a nil; or the minimum of $A_1$ and $A_2$, otherwise. The Engine notifies a process, e.g., by use of operation "restricted" which is described below, if any of the process' permits, once set, is set again.

A process "violates" its permit by attempting to exercise a capability in an amount greater than is granted the process by the process' effective permit. Violating one's permit without also exhausting the permit provokes an exception.

A process "exhausts" its permit by allowing the process' actual age, charges, or size to reach the age, charges, or size, respectively, that the process' effective permit would grant the process if none of the process' temporary permits were in force. Exhausting one's permit initiates one's termination.

Native Permit

A process' "native permit" identifies the capabilities granted to the process by the creator of the process. One process, the parent, sets this permit when the parent creates another process, the child. A peer process can decrease but not increase capabilities, if so empowered by the peer's own effective permit (attribute "canDeny").

Capabilities are transferred between processes but not created. The parent or peer cannot grant the child a capability, "X", which the parent or peer does not have itself. Let "P" be the amount of "X" granted the parent or peer by its effective permit. Let "C" be the amount of "X" granted the child by the child's native permit. "C" shall not exceed "P".

The charges capability ("X") is conserved. Let "A" be the amount of the parent's or peer's actual charges beforehand. "C" shall not exceed "P–A". The amount of the parent's or peer's actual charges afterwards is "A+C".

Regional Permit

A process' "regional permit" identifies the capabilities granted to the process by the region that includes the place the process occupies. A place of the region's authority can set the permit when the process enters the region and at any time thereafter, if so empowered by the place's own effective permit (attributes "canDeny" and "canGrant"). If a child enters using operation "new", not operation "go" or "send", however, the child's initial regional permit is made the parent's current regional permit.

Local Permit

A process' "local permit" identifies the capabilities granted to the process by the place the process occupies. The place can set the permit when the process enters and at any time thereafter, if so empowered by the place's own effective permit (attributes "canDeny" and "canGrant").

When entering a place using a ticket, an agent requests certain capabilities of the place. The place, however, decides what capabilities the agent shall have. The place can allow the agent to enter with a local permit more or less capable than the one the agent requested. In the latter case, however, the trip fails, i.e., operation "go" or "send" throws an exception even though the agent has arrived.

When entering a place by being created there, a process receives as the process' initial local permit one created with no initialization parameters.

Temporary Permits

A process' zero or more "temporary permits" identify the capabilities the process grants itself temporarily. Each is put in force using operation "restrict" or "sponsor" for a specified procedure's performance. Such procedures can be nested.

Whenever the Engine requests a system feature, the responder's owner implicitly sponsors the operation's method using a temporary permit created with no initialization parameters. In this way, charges accrue to the owner.

Note: Using a temporary permit, a process can hold in reserve a portion of the process' allowed age, charges, or size. If the process exhausts the bulk of this commodity, the process can use the portion held in reserve to take emergency action.

2.4.6 Ownership

Every object that is not itself a process is "owned" by one. A process and the objects it owns are the "artifacts" of that process.

Note: Ownership is not to be confused with authority.

Object Creation

Every object, ultimately, is created by passing copy between methods either an argument of a feature or a feature's result. The new object—the copy that is passed—is owned by either the object to whose method the copy is conveyed, if that object is a process, or that object's owner, otherwise.

Object Destruction

When a process is destroyed, all of its artifacts are destroyed, and all remaining references to them voided.

Object Sharing

A place's artifacts can refer to its immediate superplace's artifacts, which constitutes a first realm and its own artifacts and those of its immediate subplaces, which collectively constitute a second realm, but the Engine voids a reference passed between the two realms.

Note: Thus fire walls are erected between places.

2.4.7 Cloning

A process can be given the capability to clone itself. A clone is one process that begins as a copy of another process, i.e., the "original", with these exceptions.

The clone's identity, but not its authority, differs from the original's.

The clone's native permit, which is also its local permit, is that given when the clone is created. Any temporary permits pending in the original, i.e., as a result of operation "restrict", are made more restrictive within the clone to the extent that the clone's native permit requires this.

Wherever the original refers to itself or an object the original owns, the clone refers to itself or its own copy of that object, respectively. Wherever the original refers to an artifact of a third process, the clone has a voided reference.

If the original, and thus the clone, are contacted objects, the clone's "contacts" attribute is cleared.

2.4.8 Branding

A region brands every process within it.

A "brand" is a distinguishing mark born by zero or more processes in a .region. When an agent enters a region, the region gives the agent a new brand. When one process within the region creates another, the latter bears the brand of the former. Thus a brand denotes a process, e.g., an agent, that entered the region and all of the processes created there by the former process.

Note: Brands enable tracking mechanisms, which are not themselves in the Instruction Set.

2.4.9 Contacts

A "contact" represents and documents for one process, the "observer", its interaction with a second process, the "subject". A "contacted" process receives help from the Engine in maintaining its set of contacts.

2.4.10 Isolation

A process is isolated under various circumstances, e.g., upon either parting from all its acquaintances using operation "partAll", initiating a trip, or terminating.

To "isolate" a process is to void each reference to an artifact of the process that is held by an artifact of any other process, and to void each reference that an artifact of the process holds to an artifact of any other process. There are two exceptions. First, the place that the process occupies retains its references to the process, but not to the objects the process owns. Second, the process can continue to refer to the place the process occupies.

2.4.11 Termination

A process is terminated in a way that enables the methods whose frames are involved in the process' thread of execution to conclude gracefully.

Let (i) $\underline{A}$, $\underline{B}$, and $\underline{C}$ be processes, (ii) an artifact of $\underline{A}$ request a feature of an artifact of $\underline{B}$, (iii) an artifact of $\underline{B}$ in turn request a feature of an artifact of $\underline{C}$, and (iv) $\underline{A}$ exhaust its native or local permit. The Engine then terminates $\underline{A}$ as follows.

Unless $\underline{A}$, $\underline{B}$, and $\underline{C}$ are one and the same, the Engine throws "Permit Exhausted", returning control to the method of A, B, or C that most recently prepared, using operation "catch" for that exception. The method is resumed, but with $\underline{A}$ holding the local permit of $\underline{A}$, $\underline{B}$, or $\underline{C}$, whichever is either the object with which the method is associated or that object's owner. When the method finishes, either succeeding or failing, the Engine reinstates the exhausted permit of A, re-initiating the above termination algorithm.

After doing the above, the Engine (i) halts $\underline{A}$, (ii) isolates $\underline{A}$, (iii) presents $\underline{A}$ for diagnostic examination if the OAM policy in force so requires, and (iv) destroys A.

2.5 Network Model

The Instruction Set realizes the "network model" this section defines.

2.5.1 Agents

An "agent" is a process that can move from place to place.

An agent can transport itself to a particular destination via operation "go" or commission one or more clones to travel several destinations concurrently via operation "send".

Note: The "go" and "send" operations of the Instruction Set are its most distinctive and powerful aspect. In most network architectures, all processes are stationary and communicate by exchanging messages. In this one, some processes are stationary, but others are mobile, the former communicating by means of the latter. This is a paradigm shift.

2.5.2 Places

A "place" is a process that is the locale for zero or more other processes, each of which can refer to and thus interact with the place.

Note: Places represent the Instruction Set's only example of action at a distance. Places interact by means of agents which travel between them.

Engine Place vs Virtual Places

There are two kinds of place. Every Engine sustains one "engine place", representing the Engine itself, and zero or more "virtual" places.

Subplace vs Superplace

Any place except an engine place can occupy another place. If one place occupies another, either directly or indirectly, the former is a "subplace" of the latter, and the latter is a "superplace" of the former. If one place occupies another directly, the former is an "immediate subplace" of the latter, and the latter is the "immediate superplace" of the former.

Place Hierarchy

The places an Engine sustains can be arranged as the nodes of a tree, the "place hierarchy", in which the nodes represent places, the arcs between nodes the occupation relationship between the places the nodes represent.

Note: The tree's root represents the engine place, the other nodes virtual places.

2.5.3 Trips

A "trip" is an agent's move from one place, the trip's "origin", to another or the same place, the trip's "destination". A trip can fail, leaving the agent either at its origin or in a "transit" place, neither its origin nor its destination.

Note: A trip may take a long time because sometimes the trip entails transporting the agent by means of physical, not just logical, communication media.

Operation "go" vs Operation "send"

An agent can travel to a single destination itself via operation "go" or commission one or more clones to travel to several destinations concurrently via operation "send".

Note: The "send" operation transports a single representation of the agent to any particular Engine, even if several clones are being sent to places that that Engine sustains. Further savings, e.g., of space in memory of a computer, can be achieved at that Engine.

Restrictions

The operation "go" or "send" shall be requested only by either the procedure of a method native to a subclass of class "Agent", or a procedure that is an item of such a procedure, recursively. The Engine throws "State Improper" otherwise.

2.5.4 Tickets

A "ticket" describes an intended trip from the viewpoint of the agent taking the trip. The ticket's main purpose is to identify the trip's destination.

Composition

A ticket comprises a telename and a teleaddress of the destination, a citation to a class of which the destination is a member, the local permit the agent requires at the destination, the time interval within which the trip should be accomplished ideally, and the time interval within which the trip shall succeed or fail under any circumstances.

Note: Defining the desired time interval helps the Network decide how to distribute its communication resources among traveling agents.

Note: The effect of defining the maximum time interval, which is permitted as a programming convenience, also can be achieved by means of operation "restrict".

Satisfaction

A ticket is satisfied by any place of the identified name, address, and class that agrees to the agent's arrival within the maximum time interval.

If no place satisfies the ticket, the Network rejects the ticket.

If a set of two or more places satisfy the ticket, the Network attempts a trip to successive members of the set until one agrees to the agent's arrival or all places that the Network approaches reject the agent's arrival. The order in which the Network approaches the set members, to what extent the Network's coverage of the set is complete, and whether the Network approaches places that join the set after the ticket is presented are undefined.

2.5.5 Meetings

A "meeting" is an opportunity for two occupants of the same place, which are both petitioned objects and thus agents, to interact with one another. The requesting agent is the "petitioner", the responding agent the "petitionee".

Meeting

One agent can ask to "meet" another via operation "meet". The Engine—not the petitioner—requests operation "meeting" of the petitionee, supplying as an argument a contact for the petitioner. Meeting hinges upon that operation's outcome.

The Engine gives the two agents references to one another iff the meeting is consummated by the success of operation "meeting". While they are meeting, the two agents are said to be "acquaintances" of one another.

The Engine does not serialize meetings with an agent. That the agent is performing operation "meeting" already does not deter the Engine from requesting performance of operation "meeting" again. The agent must provide, e.g., by means of a resource, any meeting serialization the agent requires.

Parting

Either of the two agents can "part" from one or all of its acquaintances, via operation "part" or "partAll", respectively. The Engine—not the agent—requests operation "parting" of the agent's acquaintance or acquaintances. The Engine supplies as an argument the contact the Engine before supplied as either an argument of operation "meeting" or the result of operation "meet". Unlike meeting, a successful parting does not hinge upon the outcome of operation "parting"; parting occurs immediately and unconditionally.

The Engine voids each agent's references to the artifacts of the other.

The Engine does not serialize partings from an agent. That the agent is performing operation "parting" already does not deter the Engine from requesting performance of operation "parting" again. The agent must provide, e.g., by means of a resource, any parting serialization the agent requires.

If both agents ask to part from one another, whether the Engine requests operation "parting" of either is undefined.

Restrictions

The operation "meet", "part", or "partAll" shall be requested only by either the procedure of a method native to a subclass of class "Agent", or a procedure that is an item of such a procedure, recursively. The Engine throws "State Improper" otherwise.

2.5.6 Petitions

A "petition" describes an intended meeting from the viewpoint of the petitioner. Its main purpose is to identify the petitionee.

Composition

A petition comprises a telename of the petitionee, a citation to a class of which the petitionee is a member, and the time interval within which the meeting attempt shall succeed or fail under any circumstances.

Note: The effect of defining the maximum time interval, which is permitted as a programming convenience, also can be achieved by means of operation "restrict".

Satisfaction

A petition is satisfied by any petitioned object of the identified name and class that agrees to the meeting within the maximum time interval. The petitionee must be an occupant of the same place as the petitioner at some point within the maximum time interval, but not necessarily at its start.

If no petitioned object satisfies the petition, the Engine rejects the petition.

If a set of two or more petitioned objects satisfy the petition, the Engine attempts a meeting with successive members of the set until one agrees to the meeting or all petitioned objects that the Engine approaches reject the meeting. The order in which the Engine approaches the set members, to what extent the Engine's coverage of the set is complete, and whether the Engine approaches agents that join the set after the petition is presented are undefined.

2.5.7 Occupation

The occupants of a place can change over time. Entry

A process can "enter", and thus occupy, a place in either of two ways. An agent can arrive at the place as a consequence of a trip, or one process at the place already can create another process of the place. In either case, the Engine—not the arriving agent or the creating process—requests operation "entering" of the place. A contact for the arriving agent or the created process is supplied as an argument of operation "entering". Successful entry hinges upon the operation's outcome.

The Engine gives the place and the process entering the place references to one another iff the entry is consummated, i.e., by the success of operation "entering". While occupying the place, the process is said to be an "occupant" of the place.

The Engine does not serialize entries to a place. That the place is performing operation "entering" already does not deter the Engine from requesting operation "entering" again. The place must provide any entry serialization the place requires.

Note: Operation "entering" is involved even if a trip's origin and destination are the same.

Exit

A process can "exit", and thus no longer occupy, a place in either of two ways. An agent can depart from the place as a consequence of a trip, or one process at the place can destroy itself or another process at the place. In either case, the Engine—not the departing agent or the destroying process—requests operation "exiting" of the place. The same contact supplied as an argument of operation "entering" is supplied as an argument of operation "exiting". Unlike entry, a successful exit does not hinge upon the latter operation's outcome; the exit already occurred.

The Engine voids the references of the place and the process exiting it to the artifacts of one another. The Engine, furthermore, isolates the process.

The Engine does not serialize exits from a place. That the place is performing operation "exiting" already does not deter the Engine from requesting operation "exiting" again. The place must provide any exit serialization the place requires.

Note: Operation "exiting" is involved even if a trip's origin and destination are the same.

2.5.8 Contacts

The Engine offers places and agents assistance in maintaining their contacts with their occupants and their acquaintances, respectively.

Occupants

If a place is also a contacted object, the Engine maintains the place's contacts attribute in such a way that the attribute always includes the place's current occupants and none of its previous ones.

The Engine includes in or excludes from the place's attribute a contact for a process at the moment the process enters or exits the place, respectively.

Acquaintances

If a petitioned object is also a contacted object, the Engine maintains its contacts attribute in such a way that the attribute always includes the object's current acquaintances and none of its previous ones.

The Engine includes in the petitioner's or petitionee's attribute a contact for the petitionee or the petitioner when operation "meet" or "meeting" succeeds, respectively.

The Engine excludes the contacts from the attributes of both the petitioner and the petitionee when either process requests operation "part" or "partAll".

2.5.9 Citations

Within the Network, objects of certain classes are denoted by citations.

Citations

A "citation" identifies zero or more cited objects by title and, optionally, author, edition, or both author and edition. A citation identifies the author by the author's authority and, optionally, the author's identity. If a citation leaves any of the three characteristics undefined, the citation denotes all cited objects with the characteristics citation does define.

Author

An "author" is the process that creates a cited object. Thus an author is identified by a telename. The authors of all editions of a title are peers.

Title

A "title" is a series of cited objects, one asserted to be backward or forward compatible with another. A title is denoted by an identifier, which is interpreted relative to the common authority of the title's authors.

Edition

An "edition" is any of the cited objects in a title. An edition is denoted by two integers. One, interpreted relative to the title, denotes a major edition. The other, interpreted relative to the first, denotes a minor edition.

Note: A title's first major or minor edition is usually assigned the number one or zero, respectively.

Assigned Citations

An "assigned citation" denotes one cited object by author, title, and edition, identifying the author by both its authority and its identity. The assigned citation thereby distinguishes the cited object from all other cited objects, and thus from the others in the assigned citation's own title. See discussion of telenames below.

Compatibility

One cited object, $O_2$, is "backward compatible" with another, $O_1$, if $O_2$ can be created by making to $O_1$ only changes of the kinds prescribed by a class of which both cited objects are members, the kinds of change chosen to ensure that a program written to process $O_1$ can process $O_2$ as well. Under the same conditions, $O_1$ is "forward compatible" with $O_2$.

2.5.10 Telenames

Within the Network, objects of certain classes are denoted by telenames.

Telenames

A "telename" identifies zero (if the telename is invalid) or more named objects by their authority and, optionally, their identity. If the telename leaves their identity undefined, the telename denotes all named objects of the identified authority.

Authority

A named object's "authority" is the entity, e.g., the person or the organization, responsible for the object. An authority is identified by an octet string, which distinguishes the authority from all others in the Network.

Two telenames are "peers" if they identify the same authority.

Note: Authorities are created administratively, not programmatically. Identities, however, are created in both ways.

Identity

A named object's "identity" is the named object itself. An identity, like an authority, is identified by an octet string, which, even by itself, distinguishes the identity from all others in the Network.

Note: The octet string denoting an authority or an identity may have no meaning to a human being. The Instruction Set does not define how the octet string is assigned.

Assigned Telenames

An "assigned telename" denotes exactly one named object by authority and identity.

2.5.11 Teleaddresses

Within the Network, places are located by teleaddresses.

The "Network" comprises all engine places and is divided into one or more regions. A "region" is one or more engine places operated, or provided, by a particular authority.

Teleaddresses

A "teleaddress" identifies zero (if the teleaddress is invalid) or more places by their region and, optionally, their location. If the teleaddress leaves their location undefined, the teleaddress denotes all places in the identified region.

Region

A place's "region" is the region that contains the place. A region is identified in the same manner as is an authority (see discussion of telenames above), and thus by an octet string, which distinguishes the region from all others in the Network.

Location

A place's "location" is any characteristic of the place selected for that purpose by the authority of the place's region. A location is identified by means of a string, which distinguishes the location from all others in the region.

Two places in a region can have the same location.

Note: The location of a place might be, e.g., the computer system sustaining it.

Note: The string denoting a location can, but need not, have meaning to a human being. The Instruction Set does not define how the string is assigned, and the manner of assignment varies, in general, from one region to another.

Routing Advice

A teleaddress can, but need not, offer advice on the routing of agents to the places the teleaddress denotes. The teleaddress does this by suggesting one or more regions through which such agents may be routed. In the absence of such "routing advice", the Network may be unable to transport agents to those places, e.g., if those places are far removed from an agent's source.

Assigned Teleaddresses

An "assigned teleaddress" identifies one or more places—because several places can have the same location—by their region and their location within the region.

2.5.12 Interchange

An "interchanged object" is an immutable object for which the Network can, but need not, substitute an equivalent object, which is found, e.g., at the destination, whenever the object's owner takes a trip, on which the object must accompany it, provided the interchanged object has a digest. Digests are described below.

Note: Interchanged objects improve the performance of operation "go" and "send" by sometimes allowing an Engine to avoid physically transporting the interchanged objects by substituting for them equivalent objects found, e.g., at the destination.

Note: Classes and packages are interchanged objects.

Digests

An interchanged object is deemed equivalent to any other instance of the object's class whose digest equals that of the interchanged object. A "digest" is any object, other than a nil, that is suited to this purpose. For example, a digest can be a mathematical hash of a canonical binary representation of the interchanged object.

Note: An interchanged object improves the performance of operations "go" and "send" only if the object is larger than its digest.

2.6 Timekeeping Model

The Instruction Set realizes the "timekeeping model" this section defines.

One can keep time in two ways. A time or a calendar time alike identifies a date and time, but the two differ in other respects.

Note: Times can be converted to calendar times, and conversely.

Note: The Engine can internally represent times more compactly than it does calendar times. Thus times are better, in general, for storing and transporting dates and times.

2.6.1 Time

A "time" identifies a date and time of day to the precision of one second using Coordinated Universal Time (UTC). A time also identifies the time zone in which the time was measured and to what extent, if any, Daylight Savings Time (DST) was in effect at that time in that place.

Note: UTC is effectively what was formerly known as Greenwich Mean Time (GMT).

2.6.2 Calendar Time

A "calendar time" has all the characteristics of a time, and others. In particular, a calendar time exposes to examination and modification the hour of the day, the minute of that hour, and the second of that minute. It exposes the year in the Gregorian calendar, the month of that year, and the day of that month. It exposes the days of the week and year. It also exposes the time zone's permanent offset in minutes from UTC and its seasonal offset in minutes from its permanent one. The time is DST if the latter offset is non-zero.

Normality

A calendar time makes each facet of the date and time of day accessible as an integer that is normally in a prescribed range. The hours are numbered in the range of [0, 24), the minutes in the range of [0, 60), and the seconds in the range of [0, 60]. seconds are numbered in the range of [0, 60], i.e., 61 possible values, to accommodate leap seconds. The year 1993, e.g., is denoted by the integer 1993, the months are numbered in the range [1, 12], and the days are numbered in the range [1, 31]. The days of the week are numbered 1, 2, 3, 4, 5, 6 or 7, which represent Sunday, Monday, Tuesday, Wednesday, Thursday, Friday, and Saturday, respectively. The days of the year are numbered in [1, 366]. The permanent and seasonal offsets are both numbered in [−720, 720].

Note: Positive numbers denote years A.D., and negative ones denote years B.C.

Abnormality

A calendar time may have facets whose integer values lie outside their normal ranges. It might identify the date, e.g., as September 32, by which October 2 is meant. Such abnormal values may result from manipulating a calendar time in useful ways, e.g., adding two to the day of the month, but must be eliminated before the calendar time can be considered correct. A calendar time is made correct in this sense by a process of normalization.

Normalization

A calendar time is "normalized" in the following steps, the first of which takes into account the fact that any facet of a calendar time can be a nil:

Defaults

The hour, minute, or second, if nil, is made zero.

The year, month, or day, if nil, is made one. The permanent or seasonal offset, if nil, is made that of a normalized calendar time denoting the current time.

Offsets

The permanent and seasonal offsets are replaced by the result of transposing into [−720, 720] the remainders left by dividing the offsets by 24,60, i.e., by the integer value 1440.

Time

The second is placed in normal range by repeatedly adding or subtracting 60, each time respectively subtracting or adding one to the minute. The minute is placed in normal range by repeatedly adding or subtracting 60, each time respectively subtracting or adding one to the hour. The hour is placed in normal range by repeatedly adding or subtracting 24, each time respectively subtracting or adding one to the day.

Date

The month is placed in normal range by repeatedly adding or subtracting 12, each time respectively subtracting or adding one to the year. The day is placed in [1, K] by adding or subtracting K, respectively subtracting or adding one to the month. K is the number of days in the subject month in the subject year. If one addition or subtraction does not place the day in the required interval, this entire step is taken again. In other words, the month is adjusted as described above before adjusting the day again.

Days

The days of the week and year are set correctly.

Localize vs Globalize

A calendar time can be modified to reflect another permanent or seasonal offset without altering the absolute point in time it identifies. A calendar time is "localized" if its offsets are made those of the current place. A calendar time is "globalized" if its offsets are made those of UTC.

2.7 Pattern Matching Model

The Instruction Set realizes the "pattern matching model" this section defines.

2.7.1 Patterns

A "pattern" is a means for lexically analyzing a string. The pattern's "text", itself a string, prescribes the criterion by which a string matches the pattern.

A pattern's text is a series of tokens obeying the syntactic, and accompanying semantic, rules below. Given in BNF (Backus-Naur or Backus Normal Form), the rules surround optional tokens by brackets ("[" and "]"). They surround vertical bar ("|"), left bracket ("["), and right bracket ("]") by quotation marks ("") to distinguish their use, in accord with BNF, in describing the text of any pattern, on the one hand, from their possible use as metacharacters in a particular text, on the other.

Each token in a pattern's text is zero or more characters. The text is obtained by concatenating the tokens, and thus the characters.

2.7.2 Structure

Pattern

A pattern, i.e., its text, obeys this rule:

Pattern ::= Alternative ["|"]Pattern

A string matches a pattern iff it matches any of its alternatives.

Alternative

An alternative obeys these rules:

Alternative  := [ ^ ] Components [$]

Components  := Component [Components]

A string matches an alternative iff successive substrings, with no gaps between them, match successive components of the alternative. If the alternative begins with a caret ("^") or ends with a dollar sign ("$"), the series of substrings must begin or end at the string's beginning or end, respectively.

Component
A component obeys this rule:

Component ::=Item [*|+|?]

A string matches a component iff it either comprises zero or more substrings, each matching the item, if an asterisk ("*") appears; comprises one or more such substrings, if a plus sign ("+") appears; either matches the item or is cleared, if a question mark ("?") appears; or matches the item, otherwise.
Item
An item obeys this rule:

Item   ::=   ( Pattern ) |
             "[" CharacterClass "]" |
             Character A string matches an item iff it matches either the pattern, the character class, or the character, whichever the item prescribes.
CharacterClass
A character class obeys this rule:

CharacterClass ::=[^] CharacterItems

A string matches a character class iff it matches the list of character items iff the caret (^) is not present.
CharacterItems
A list of character items obeys these rules:

CharacterItems   : :=   CharacterItem [CharacterItems]
CharacterItem    : :=   CharacterRange | Character A string matches a list of character items if successive substrings of the string, with no gaps between them, match successive character items in the list. The series of substrings must begin at the string's beginning and end at the string's end.
CharacterRange
A character range obeys this rule:

CharacterRange ::=Character–Character

A string matches a character range if the string comprises one character after or equal to the first character and before or equal to the second.
Character
A character obeys this rule:

Character ::=.\metacharacter|character

A string matches a character iff the string comprises either any one character, if a period (".") is present; the metacharacter, if a reverse slash ("\") is present; or the character, otherwise.
Note: Thus the special meaning of a metacharacter is avoided if a reverse slash ("\") immediately precedes the metacharacter.
2.7.3 Other Non-terminals
character
Any instance of class "Character" other than a metacharacter.
metacharacter
A metacharacter.
2.7.4 Metacharacters A pattern's text can include metacharacters. A metacharacter has a special meaning which is among the semantic rules that govern the text. The metacharacters are the characters in Table A.5 and those, e.g., backspace tabulated for a character telescript's "String" token.

TABLE A.5

| Metacharacter | Meaning |
| --- | --- |
| Vertical bar (\|) | Separates alternatives. |
| Caret (^) | Either anchors to the string's beginning, or inverts the matching rules. |
| Dollar sign ($) | Anchors to the string's end. |
| Left parenthesis ("(") | Begins a nested pattern. |
| Right parenthesis (")") | Ends a nested pattern. |
| Left bracket ([) | Begins a character class. |
| Right bracket (]) | Ends a character class. |
| Asterisk (*) | An item zero or more times. |
| Plus sign (+) | An item one or more times. |
| Question mark (?) | An item optionally. |
| Minus sign (−) | Separates the characters defining a range. |
| Period (.) | Matches any character. |
| Reverse slash (\) | Disarms the metacharacter that follows. |

3 TELESCRIPT CLASS OVERVIEWS

Being object-oriented, the Instruction Set comprises certain predefined classes which are overviewed in this section of this appendix. These classes are divided into groups as discussed below. A subsection is devoted to each group. Within each subsection, a subsection is devoted to each class in the group.

Being interpreted, the Instruction Set does not define statement forms—e.g., for control flow—but rather relies upon the operations of its classes. Thus the semantics of the Instruction Set are largely those of the predefined classes.
3.1 Groups The Instruction Set's predefined classes are divided into groups, one of which is called the kernel. This division serves pedagogic purposes alone, and is intended to suggest neither that the classes in groups other than the kernel can be implemented by means of the kernel, nor that an Engine need implement the classes in the kernel but not necessarily those in other groups.

The following groups are defined:
Kernel
This group provides basic language machinery, e.g., classes, objects, references, procedures, execution, and exceptions.
Primitives
This group provides basic forms of indivisible information, e.g., booleans, octets, numbers, characters, and times.
Collections
This group provides basic forms of composite information, e.g., sets, lists, stacks, strings, and dictionaries.
Class Definition
This group provides the component parts of class definitions, e.g., interfaces, attributes, operations, implementations, and methods.
Identification
This group provides for naming and addressing, e.g., telenames and teleaddresses.
Processes
This group provides for multi-tasking, e.g., processes, permits, resources, and contacts.
Agents and Places
This group provides for process movement within a network, e.g., places, agents, and tickets.

Meetings This group provides for process interaction within a network node, e.g., meeting places and petitions.

Miscellaneous This group provides a variety of things, e.g., a random number generator and a pattern matcher. The groups are presented below in the order in which they are listed above. The classes within each group are presented in alphabetical order.

3.2 Kernel Group

---

Object (Referenced)
● Class (Cited & Interchanged)
● Collection
● ● Set (Verified)
● ● ● Constrained Set (Constrained)
● ● ● ● Package (Cited & Interchanged)
● Constraint
● Exception (Unchanged)
● ● Programming Exception
● ● ● Kernel Exception
● ● ● ● Execution Exception
● ● ● ● ● Unexpected Exception
● Primitive (Executed & Unchanged)
● ● Identifier (Ordered)
● ● ● Qualified Identifier
● ● Mark
● ● Modifier
● ● Nil
● ● Procedure
● ● Selector
    Constrained
    Executed
    Referenced
    Unchanged
    Verified

---

3.2.1 Class
Operations
convert
isInstance
isMember
isSubclass
new

A "class" is an immutable object that defines a set of objects, the class' instances.

A class' native operations create a new instance via operation "new", convert an instance of another class to an instance of this one via operation "convert", indicate whether an object is an instance via operation "isInstance" or a member via operation "isMember" of the class, and indicate whether another class is a subclass of the present one via operation "isSubclass".

3.2.2 Constrained
Attributes
constraint

A "constrained object" enforces a constraint upon those of its properties identified by another class of which the object is a member.

A constrained object's native attribute is the constraint (attribute "constraint").

Note: Constrained dictionaries, lists, and sets are constrained objects.

3.2.3 Constraint
Attributes
classId
isInstance
isOptional
ofClass
passage

A "constraint" is an object defining restrictions placed upon other objects.

A constraint's native attributes are the identifier of the class of which the constraint's subjects shall be members (attribute "classId"), the class itself (attribute "ofClass"), whether the subjects shall be instances of that class (attribute "isInstance"), whether the subjects may be nils (attribute "isOptional"), and the subjects' passage (attribute "passage").

3.2.4 Exception
Operations
throw

An "exception" is an object describing a performance or execution failure.

An exception's native operation throws the exception (operation "throw").

3.2.5 Executed
Operations
catch
do
either
if
loop
repeat
while

An "executed object" is permitted as an item of a procedure.

An executed object's native operations perform the executed object (i) once via operation "do", (ii) once catching certain exceptions via operation "catch", (iii) once iff a precondition is satisfied via operation "if", (iv) a certain number of times via operation "repeat", (v) indefinitely many times via operation "loop", or (vi) as often as another executed object's performance dictates via operation "while". An additional operation decides which of two executed objects to perform (operation "either").

Note: Instances of the predefined concrete subclasses of class "Primitive", as well as the predefined subclasses of class "Constrained List", are executed objects.

3.2.6 Execution Exception

An "execution exception" is a kernel exception that indicates that the Engine is unable to execute an item of a procedure.

Among this class' predefined subclasses is "Internal Exception", a member of which indicates that the Engine fails to implement an aspect of the Instruction Set. The ideal Engine never throws such an exception, but an actual Engine does. The latter's documentation says when, e.g., when the sum of two integers is too large for the Engine to conveniently represent internally.

3.2.7 Identifier

An "identifier" is a primitive that distinguishes one object from others in a particular context.

3.2.8 Kernel Exception

A "kernel exception" is a programming exception thrown by members of the classes in this section.

3.2.9 Mark

A "mark" is a primitive with one possible value, "mark". A mark is used to demarcate a series of objects, usually the topmost items of a stack.

3.2.10 Modifier

A "modifier" is a primitive with these possible values: "demarcate", "getClass", "getProperty", "getVariable", "mention", "setAttribute", "setProperty", "setVariable", and "useStack". A modifier is used to alter the execution of the item that immediately follows the modifier in a procedure.

3.2.11 Nil

A "nil" is a primitive with one possible value, "nil". A nil is used to indicate the absence, e.g., on the stack, of a member of another class.

3.2.12 Object

Attributes
class
size
Operations
copy
finalize
initialize
isEqual
select
Internal Operations
getAttribute
getClass
getProperty
getVariable
setAttribute
setProperty
setVariable An "object" is the Instruction Set's unit of both information and information processing. An object is an instance of a class.

An object's native attributes are its class ("class") and its size ("size").

An object's native operations initialize (operation "initialize") and finalize (operation "finalize") the object; decide whether the object equals another object (operation "isEqual"); decide which, if any, of several objects the former object equals, and perform the executed object paired with that object (operation "select"); and create a separate but equal copy of itself (operation "copy").

An object has a number of internal features. An "internal" feature is a system feature that is sealed by class "Object" and, furthermore, that does not prevent a feature native to a user-defined subclass of class "Object" from having the same identifier. Thus an internal feature is fictitious. Its only purpose is to simplify the definition of the Instruction Set, especially its execution model.

An object's internal operations bind to objects at run time the identifiers used in the interface and implementation of the object's class. Thus an object can (i) get via operation "getAttribute", or set, via operation "setAttribute", the attribute of itself that a certain identifier denotes, (ii) get via operation "getProperty", or set via operation "setProperty", the property of itself that a certain identifier denotes, (iii) get, via operation "getVariable", or set, via opeation "setVariable", the variable that a certain identifier denotes, and, (iv) identify and locate the class that a certain identifier denotes via operation "getClass".

3.2.13 Package

A "package" is a constrained set of classes. A package, furthermore, is a cited object, a peer of each class the package comprises.

One package is backward compatible with another iff the former can be created from the latter by making only changes of the following kinds. First, a new class may be added. Second, an existing class may be replaced with one backward compatible with the existing class.

3.2.14 Procedure

A "procedure" is a primitive comprising an ordered set of executed objects.

3.2.15 Programming Exception

A "programming exception" is an exception that indicates that a programming mistake was made in the provision or use of a feature.

3.2.16 Qualified Identifier

A "qualified identifier" is an identifier that denotes a feature and a class to which an implementation of the feature is either native or inherited.

3.2.17 Referenced

Attributes
isProtected
Operations
discard
isSame
protect
ref

A "referenced" object is one to which references can be obtained. Its features manipulate the references used to request them, not the object itself.

A referenced object's native attribute reveals whether a reference is protected (attribute "isProtected").

A referenced object's native operations create new references to the object (operation "ref"), protected if desired (operation "protect"); discard an existing reference (operation "discard"); and say whether two references are to the same object (operation "isSame").

Note: All objects are referenced objects. The present class, then, is defined for purely pedagogic reasons.

3.2.18 Selector

A "selector" is a primitive with these possible values: "break", "client", "continue", "escalate", "here", "process", "self", and "succeed". A selector is used to achieve a special execution effect.

3.2.19 Unchanged

An "unchanged" object cannot be changed. The meaning of "change" depends upon the other classes of which the unchanged object is a member. An unchanged object often is described as "immutable".

Note: Members of classes "Class", "Exception", "Package", "Primitive", and "Time" are immutable.

3.2.20 Unexpected Exception

Attributes
exception

An "unexpected exception" is an execution exception that indicates that a feature threw an exception whose class the feature does not declare.

An unexpected exception's native attribute is the undeclared exception (attribute "exception").

3.2.21 Verified

Operations
verify

A "verified object" can become internally inconsistent in one or more ways which depend upon the other classes of which the object is a member.

A verified object's native operation indicates whether the object is internally consistent (operation "verify").

Note: Sets are verified objects.

3.3 Primitive Group

- Object (Referenced)
- ● Exception (Unchanged)
- ● ● Programming Exception
- ● ● ● Primitive Exception
- ● Primitive (Executed & Unchanged)
- ● ● Bit (Ordered)
- ● ● Boolean (Ordered)
- ● ● Character (Cased & Ordered)
- ● ● Number (Ordered)
- ● ● ● Integer
- ● ● ● Real
- ● ● Octet (Ordered)
- ● Telenumber
- ● Time (Ordered & Unchanged)

Cased
Ordered

3.3.1 Bit

A "bit" is a primitive with two possible values, "zero" and "one".

3.3.2 Boolean
Operations
and
not
or

A "boolean" is a primitive with two possible values, "false" and "true".

A boolean's native operations make it capable of logical conjunction (operation "and"), disjunction (operation "or"), and negation (operation "not").

3.3.3 Cased
Attributes
isLower
isUpper
Operations
makeLower
makeUpper

A "cased" object comprises character information. Such information, and thus the cased object itself, can be upper-case, lower-case, or a mix of the two.

A cased object's native attributes indicate whether any character information is lower-case (attribute "isLower") or upper-case (attribute "isUpper").

A cased object's native operations produce an all lower-case (operation "makeLower") or an all upper-case (operation "makeUpper") equivalent of the object.

Note: Two cased objects can be compared without regard for their cases by using operation "isEqual" in combination with either operation "makeLower" or operation "makeUpper".

Note: Characters and strings are cased objects.

3.3.4 Character

A "character" is a primitive whose possible values are the Unicode characters [Unicode].

3.3.5 Integer
Operations
modulus
quotient

An "integer" is a number that is also an integer.

An integer's native operations perform integer division and produce either the quotient (operation "quotient") or the remainder (operation "modulus") that results.

Note: Internally the Engine may represent integers with only finite precision. Not all integers, therefore, are necessarily instances of this class in practice.

3.3.6 Number
Operations
abs
add
ceiling
divide
floor
multiply
negate
round
subtract
truncate A "number" is a primitive that is capable of basic arithmetic operations.

A number's native operations perform addition (operation "add"), subtraction (operation "subtract"), multiplication (operation "multiply"), and division (operation "divide"); negation (operation "negate") and absolute value (operation "abs"); rounding (operation "round") and truncation (operation "truncate"); and the floor (operation "floor") and ceiling (operation "ceiling") functions.

3.3.7 Octet

An "octet" is a primitive comprising eight bits. For reference purposes, the bits are designated Bit 7 through Bit 0.

3.3.8 Ordered
Operations
isAfter
isBefore
max
min

An "ordered" object is a member of another class whose members can be ordered by placing any one either before, after, or coincident with any other. The meanings of "before" and "after" depend upon that class.

An ordered object's native operations indicate whether one such object is before (operation "isBefore") or after another (operation "isAfter"), and which of two is the minimum (operation "min") or the maximum (operation "max").

Note: Whether two ordered objects are coincident is indicated by operation "isEqual".

Note: Instances of many classes are ordered objects.

3.3.9 Primitive

A "primitive" is an object that is an Instruction Set primitive.

Note: Not every Instruction Set primitive is a member of this class.

3.3.10 Primitive Exception

A "primitive exception" is a programming exception thrown by members of the classes in this section.

3.3.11 Telenumber
Attributes
country
extension
telephone

A "telenumber" is an object giving the address of a telephone instrument in the international telephone network, i.e., a telephone number.

A telenumber's native attributes are the code for the country in which the instrument is located ("country"), the number the country assigns to the instrument ("telephone"), and its telephone extension, if any ("extension").

3.3.12 Time
Operations
adjust
interval

A "time" is an object that identifies a date and time of day to the precision of one second using UTC. A time also records the time zone in which it was measured and to what extent, if any, DST was in effect then and there.

A time's native operations adjust the time by any number of seconds (operation "adjust") and give the interval between the time and another time (operation "interval").

3.4 Collection Group

Object (Referenced)
● Association (Ordered)
● Collection
● ● List (Ordered)
● ● ● Constrained List (Constrained)
● ● ● ● Bit String (Executed)
● ● ● ● Octet String (Executed)
● ● ● ● String (Cased & Executed)
● ● ● Stack
● ● Set (Verified)
● ● ● Constrained Set (Constrained)
● ● ● Dictionary
● ● ● ● Constrained Dictionary (Constrained)

-continued

| | | | | | |
|---|---|---|---|---|---|
| ● | ● | ● | ● | ● | Lexicon |
| ● | | | | | Exception (Unchanged) |
| ● | | ● | | | Programming Exception |
| ● | | ● | ● | | Collection Exception |
| ● | | | | | Stream |
| | | | | | Hashed |

3.4.1 Association
Attributes
key
value

An "association" is one object that comprises two objects, which are the one object's "key" and "value".

An association's native attributes are its key (attribute "key") and its value (attribute "value").

Note: Associations are used to create dictionaries.

3.4.2 Bit String
A "bit string" is a constrained list whose items are instances of class "Bit".

3.4.3 Collection
Attributes
length
Operations
clear
examine
exclude
include
stream A "collection" is an object that comprises an unordered set of zero or more other objects, its "items", which are among its properties. A collection's "length" is the number of the collection's items. The collection is "cleared" if its length is zero. A subclass of class "Collection" can restrict its members' items.

A collection's native attribute is the collection's length (attribute "length").

A collection's native operations include an object as a new item (operation "include"), exclude an existing item (operation "exclude"), exclude all existing items (opeation "clear"), arrange for an item's inspection (operation "examine"), and produce a stream whose items are those of the collection (operation "stream").

Note: A collection's length is unbounded.

3.4.4 Collection Exception
A "collection exception" is a programming exception thrown by members of the classes in this section.

3.4.5 Constrained Dictionary
A "constrained dictionary" is a dictionary whose keys are restricted by means of a constraint, a single constraint governing the entire dictionary.

3.4.6 Constrained List
A "constrained list" is a list whose items are restricted by means of a constraint, a single constraint governing the entire list.

3.4.7 Constrained Set
A constrained set is a set whose items are restricted by means of a constraint, a single constraint governing the entire set.

3.4.8 Dictionary
Operations
add
drop
find
get
rekey
set
transpose

A "dictionary" is a set whose items are associations. A subclass of class "Dictionary" can restrict its members' keys, values, or both.

A dictionary's native operations include an association between a certain key and a certain value as a new item (operation "add"), exclude the association with a certain key (operation "drop"), determine a key's associated value (operation "get"), replace a key's associated value (operation "set"), determine a value's associated key (operation "find"), replace one key with another (operation "rekey"), and transpose two keys (operation "transpose").

3.4.9 Hashed
Attributes
hash

A "hashed" object is a member of another class for which a hash function is defined. Each member of that class computes its own hash, an integer, ensuring that if two members are equal, their hashes are equal.

A hashed object's native attribute is the hash function for that object (attribute "hash").

Note: If a dictionary's keys are hashed objects, the dictionary can, but need not, use attribute "hash" in the performance of some of the dictionary's operations.

Note: No instances of predefined classes are hashed objects.

3.4.10 Lexicon
A "lexicon" is a constrained dictionary whose keys are identifiers.

3.4.11 List
Operations
add
drop
find
get
reposition
set
transpose

A "list" is a collection whose items are numbered in [1, n], "n" being the collection's length An item's number is the item's "position" in the list.

A list's native operations include an object as a new item (operation "add"), exclude an existing item (operation "drop"), arrange for an item's inspection (operation "get"), replace an existing item (operation "set"), determine an existing item's position (operation "find"), reposition an existing item (operation "reposition"), and transpose two existing items (operation "transpose").

3.4.12 Octet String
An "octet string" is a constrained list whose items are instances of class "Octet".

3.4.13 Set
Operations
difference
intersection
union

A "set" is a collection no two of whose items are equal when included.

A set's native operations compute the union (operation "union") or intersection (operation "intersection") of two sets and exclude those items in one that equal items in the other (operation "difference").

Note: An item's modification in situ, may leave two items equal.

3.4.14 Stack
Operations
pop
push pushItems
roll
swap

A "stack" is a list whose items are usually dropped in the order that is the opposite of that in which they were added. The stack's "top" is position one, the stack's "bottom" the position that is the stack's length.

A stack's native operations add an object at the top (operation "push"), add the items of a list at the top (operation "pushItems"), drop the item at the top (operation "pop"), transpose the two items at the top (operation "swap"), and roll a certain number of the topmost items a certain number of positions (operation "roll").

3.4.15 Stream
Attributes
current
isDone
next

A "stream" is an object that provides sequential access to the objects in an associated series of objects, the stream's "items". A stream never "produces" the same item twice, and produces a nil after producing the last item.

A stream's native attributes enable it to produce its next item upon request (attribute "next"), reproduce the item it produced most recently (attribute "current"), and indicate whether or not it has yet produced its last item (attribute "isDone").

Note: If an item of the stream is itself a nil, this fact must be taken into account when interpreting the "next" or "current" attribute.

3.4.16 String
Operations
substring

A "string" is a constrained list whose items are instances of class "Character".

A string's native operation produces a copy of a substring (operation "substring"). A substring is a series of zero or more characters occupying successive positions in a string. A substring is defined by two positions, $P_1$ and $P_2$, the substring's items being those at positions $[P_1, P_2)$ of the string.

3.5 Class Definition Group

---

Object (Referenced)
● Class Definition
● Exception (Unchanged)
● ● Programming Exception
● ● ● Class Exception
● Feature
● ● Attribute
● ● Operation
● Implementation
● Interface
● Method

---

3.5.1 Attribute
Attributes
constraint
isSet

An "attribute definition", i.e, a member of class "Attribute", is a feature definition for an attribute.

An attribute definition's native attributes define how the attribute is constrained (attribute "constraint") and whether it can be set (attribute "isSet"). The former affects both the result of operation "αGet" and, if the attribute can be set, the argument of operation "αSet".

3.5.2 Class Definition
Attributes
implementation
interface
majorEdition
minorEdition
title
Operations
makeClasses A "class definition" is an object that defines a class.

A class definition's native attributes define the class' interface (attribute "interface"), implementation (attribute "implementation"), title (attribute "title"), major edition (attribute "majorEdition"), and minor edition (attribute "minorEdition").

A class definition's native operation creates the set of one or more classes that a set of as many class definitions define (operation "makeClasses"). Any required references among the classes are established as the classes are created. The process requesting the operation is the classes' author.

3.5.3 Class Exception

A "class exception" is a programming exception thrown by members of the classes in this section.

3.5.4 Feature
Attributes
exceptions
isPublic

A "feature definition", i.e., a member of class "Feature", is an object that defines a particular feature of every member of the class of whose interface the feature definition is a part.

A feature definition's native attributes define whether the feature is public, not private (attribute "isPublic"), and the classes of which the feature's exceptions are members (attribute "exceptions"). A system feature is not subject to a feature definition.

3.5.5 Implementation
Attributes
classMethods
fromMethods
instanceMethods
properties
setMethods
superclasses
toMethods
vocabulary An "implementation" is an object that implements selected features and conversions native to or inherited by the class of which the implementation is a part.

An implementation's native attributes identify the implementation's immediate implementation superclasses (attribute "superclasses"); provide methods for selected class features (attribute "classMethods"), instance features (attribute "instanceMethods" and attribute "setMethods"), and conversions from (attribute "fromMethods") and to (attribute "toMethods") other classes; define properties native to the class (attribute "properties"); and define the identifiers the implementation uses to denote user-defined classes (attribute "vocabulary").

3.5.6 Interface
Attributes
classFeatures
instanceFeatures
isAbstract
sealedClassFeatures
sealedInstanceFeatures
superclasses
vocabulary An "interface" is an object that defines the features native to the class of which the interface is a part.

An interface's native attributes define whether the class is abstract (attribute "isAbstract"), identify the class' immediate interface superclasses (attribute "superclasses"), define the class' native class features (attribute "classFeatures") and instance features (attribute "instanceFeatures"), identify the class features (attribute "sealedClassFeatures") and instance features (attribute "sealedInstanceFeatures") that the class seals, and define the identifiers the interface uses to denote user-defined classes (attribute "vocabulary").

3.5.7 Method
Attributes
procedure
variables

A "method" is an object that is used to implement a feature.

A method's native attributes are the method's procedure (attribute "procedure") and the identifiers of the method's variables (attribute "variables").

3.5.8 Operation
Attributes
arguments
result

An "operation definition", i.e., a member of class "Operation", is a feature definition for an operation.

An operation definition's native attributes define whether the operation's arguments are variable or fixed in number and, in the latter case, how each argument is constrained (attribute "arguments"). The attributes also define whether the operation has a result and, if so, how the result is constrained (attribute "result").

3.6 Identification Group

| Object (Referenced) |
| --- |
| ● Citation (Ordered) |
| ● Teleaddress |
| ● Telename |
| Cited |
| Named |

3.6.1 Citation
Attributes
author
majorEdition
minorEdition
title

A "citation" is an object that identifies zero or more editions, e.g., classes, in the Telescript Network.

A citation's native attributes define the title in which the editions appear (attribute "title"); optionally, the title's author (attribute "author"); and, optionally, the editions' major edition (attribute "majorEdition"), minor edition (attribute "minorEdition"), or both.

3.6.2 Cited
Attributes
citation

A "cited" object is one having an assigned citation. Two cited objects are peers iff the assigned telenames in their assigned citations are peers.

A cited object's native attribute is the object's assigned citation (attribute "citation").

Note: Classes and packages are cited objects.

3.6.3 Named
Attributes
name

A "named" object is one having an assigned telename. Two named objects are peers iff their assigned telenames are peers.

A named object's native attribute is the object's assigned telename (attribute "name").

Note: Processes are named objects.

3.6.4 Teleaddress
Attributes
location
provider
routingAdvice

A "teleaddress" is an object that locates zero or more places in the Telescript Network.

A teleaddress' native attributes give the places' region (attribute "provider"); optionally, the places' location (attribute "location"); and any routing advice (attribute "routingAdvice").

3.6.5 Telename
Attributes
authority
identity

A "telename" is an object that identifies zero or more named objects in the Network.

A telename's native attributes define the named objects' authority (attribute "authority") and, optionally, the single named object's identity (attribute "identity").

3.7 Process Group

| Object (Referenced) |
| --- |
| ● Contact |
| ● Exception (Unchanged) |
| ● ● Programming Exception |
| ● ● ● Process Exception |
| ● Permit (Ordered) |
| ● Process (Named) |
| ● Resource |
| Contacted |

3.7.1 Contact
Attributes
subject
subjectClass
subjectName
subjectNotes

A "contact" is an object that represents and documents for one process its interaction with another.

A contact's native attributes are the subject (attribute "subject"), the subject's assigned telename (attribute "subjectName"), the subject's class' assigned citation (attribute "subjectClass"), and an object the observer maintains (attribute "subjectNotes"). Even if the subject attribute is a nil, as it may be, the Engine guarantees the authenticity of the other attributes.

Note: Typically the "subjectNotes" attribute is the state of the interaction between the two processes from the observer's viewpoint.

3.7.2 Contacted
Attributes
contacts

A "contacted" object, necessarily a process, receives help from the Engine in maintaining the object's set of contacts.

A contacted object's native attribute is the object's contacts (attribute "contacts").

Note: Instances of no predefined classes are contacted objects.

3.7.3 Permit
A "permit" is an object that grants capabilities to a process.

Attributes age authenticity canCharge canCreate canDeny canGo canGrant canRestart canSend charges extent priority A permit's native attributes include integers that define the maximum age (attribute "age"), size (attribute "extent"), charges (attribute "charges"), priority (attribute "priority"), and authenticity (attribute "authenticity") of the permit's subject.

A permit's native attributes include booleans that can permit the subject to request operation "charge" (attribute "canCharge"), operation "go" (attribute "canGo"), operation "send" (attribute "canSend"), or operation "new" of a subclass of class "Process" (attribute "canCreate"); deny (attribute "canDeny") or grant (attribute "canGrant") capabilities via certain permits of certain processes; and be restarted (attribute "canRestart").

Operations intersection

A permit's native operation return the intersection of two permits (operation "intersection").

3.7.4 Process Exception

A "process exception" is a programming exception thrown by members of the classes in this section.

3.7.5 Process

Attributes
age
brand
charges
localPermit
permit
priority
privateClasses
regionalPermit
Operations
charge
live
restrict
restricted
sponsor
wait A "process" is a named object that constitutes an autonomous computation.

A process' native attributes are the process' age (attribute "age"), brand (attribute "brand"), charges (attribute "charges"), local permit (attibute "localPermit"), permit (attribute "permit"), priority (attribute "priority"), privately held and used classes (attribute "privateClasses"), and regional permit (attribute "regionalPermit").

A process' native operations carry out the process' autonomous computation (operation "live"), delay the computation for a period of time (operation "wait"), impose a temporary permit on the process itself (operation "restrict"), perform a procedure under a temporary permit and the resulting effective permit of the responder's owner (operation "sponsor"), and charge another process for services that the present process provides to the other process (operation "charge").

3.7.6 Resource

Attributes
condition
conditions
Operations
use

A "resource" is an object about which certain guarantees can be made to a process throughout the process' performance of a particular procedure.

A resource's native attributes are the resource's current condition (attribute "condition") and the identifiers of the resource's possible conditions (attribute "conditions").

A resource's native operation performs a certain procedure once the resource has made the guarantees requested of the resource (operation "use").

3.8 Agent and Place Group

Object (Referenced)
● Authenticator
● Exception (Unchanged)
● ● Trip Exception
● Means
● Process (Named)
● ● Agent
● ● Place (Unmoved)
● Ticket Stub
● ● Ticket
● Way
Unchanged
● Interchanged
Unmoved

3.8.1 Agent
Operations
go
send

An "agent" is a process that can move from place to place.

An agent's native operations transport the agent to one destination (operation "go") or one or more clones to as many destinations concurrently (operation "send").

3.8.2 Authenticator

An "authenticator" is an object with which the Network can authenticate an agent that initiated a trip, e.g., as the agent passes between regions.

Note: Concrete subclasses of class "Authenticator" are region-specific and thus user-defined.

3.8.3 Interchanged
Attributes
digest

An "interchanged" object is an unchanged object for which the Network may substitute an equivalent object whenever the object's owner takes a trip.

An interchanged object's native attribute is the object's digest (attribute "digest").

3.8.4 Means

A "means" is an object that identifies a means, e.g., a particular wireless communication medium, by which the Network can transport an agent that initiated a trip from the trip's source, to the trip's destination, or both.

Note: Concrete subclasses of class "Means" are region-specific and thus user-defined.

3.8.5 Place
Attributes
address
publicClasses
Operations
entering
exiting
terminate A "place" is a process that is the locale for zero or more other processes.

A place's native attributes are the place's address (attribute "address") and the place's publicly held and used classes (attribute publicClasses").

A place's native operations pass judgment upon a process' proposed entry of the place (operation "entering"), take note of the process' exit from the place (operation "exiting"), and forcibly terminate an occupant (operation "terminate"), provided the requester is sufficiently capable (attribute "canTerminate" of the requester's permit) and the occupant's peer.

3.8.6 Ticket
Attributes
desiredWait destinationAddress
destinationClass
destinationName
destinationPermit
maximumWait A "ticket" is a ticket stub that describes an intended trip from the viewpoint of the agent taking the trip. The ticket's main purpose is to identify the trip's destination.

A ticket's native attributes are a telename (attribute "destinationName") and a teleaddress (attribute "destinationAddressa") of the destination, a citation to a class of which the destination is a member (attribute "destinationClass"), the local permit the agent needs at the destination (attribute "destinationPermit"), the time interval within which, ideally, the trip should be made (attribute "desiredWait"), and the time interval within which, under any circumstances, the trip shall succeed or fail (attribute "maximumWait").

3.8.7 Ticket Stub

Attributes
travelNotes
way

A "ticket stub" is an object that describes the results of a trip.

A ticket stub's native attributes are the way back to the trip's origin (attribute "way") and information, present originally on the ticket, for the exclusive use of the agent that initiated the trip (attribute "travelNotes").

3.8.8 Trip Exception

Attributes
ticketStub

A "trip exception" is an exception that signifies the Network's failure to provide the trip that a ticket describes.

A trip exception's native attribute is the ticket stub (attribute "ticketStub").

3.8.9 Unmoved

An "unmoved" object cannot be moved from one place to another. An unmoved object often is described as immovable.

A reference to an unmoved object is voided if movement of the object is attempted.

Note: Places are immovable.

3.8.10 Way

Attributes
authenticator
means
name

A "way" is an object that identifies a route along which the Network can transport an agent that initiated a trip.

A way's native attributes are the name of the region through which the trip is to proceed (attribute "name") and the means (attribute "means") and the authenticator (attribute "authenticator") to be used to enter that region.

3.9 Meeting Group

Object (Referenced)
● Exception (Unchanged)
● ● Meeting Exception
● Petition
● Process (Named)
● ● Place (Unmoved)
● ● ● Meeting Place
Petitioned

3.9.1 Meeting Exception

A "meeting exception" is an exception that signifies a meeting place's failure to arrange the meeting that a petition describes.

3.9.2 Meeting Place

Operations
meet
part
partAll

A "meeting place" is a place that will arrange meetings between any two petitioned objects that are among its occupants.

A meeting place's native operations begin a meeting (operation "meet"), end one (operation "part"), and end all meetings involving the requester (operation "partAll").

3.9.3 Petition

Attributes
agentClass
agentName
maximumWait

A "petition" is an object that describes an intended meeting from the viewpoint of the petitioner. The petition's main purpose is to identify the petitionee.

A petition's native attributes are a telename of the petitionee (attribute "agentName"), a citation to a class of which the petitionee is a member (attribute "agentClass"), and the time interval within which the meeting attempt shall succeed or fail under any circumstances (attribute "maximumWait").

3.9.4 Petitioned

Operations
meeting
parting

A "petitioned" object, necessarily an agent, can play the role of either petitioner or petitionee in the establishment of a meeting.

A petitioned object's native operations pass judgment upon a request for a meeting (operation "meeting") and take note of a parting (operation "parting").

Note: Instances of no predefined classes are petitioned objects.

3.10 Miscellaneous Group

Object (Referenced)
● Calendar Time
● Exception (Unchanged)
● ● Programming Exception
● ● ● Miscellaneous Exception
● Pattern (Ordered)
● Primitive (Executed & Unchanged)
● ● Number (Ordered)
● ● ● Real
● Stream
● ● Random Stream

3.10.1 Calendar Time

Attributes
day
dayOfWeek
dayOfYear
dst
hour
minute
month
second
year
zone
Operations
globalize
localize
normalize A "calendar time" is an object that identifies a local date and time of day to the precision of one second using UTC. A calendar time also records the local time zone and to what extent, if any, DST was in effect then and there.

A calendar time's native attributes give the time's hour (attribute "hour"), minute (attribute "minute"), and second (attribute "second"); the date's year (attribute "year"), month (attribute "month"), and day (attribute "day"); the days of the week (attribute "dayOfWeek") and year (attribute "dayOfYear"); and, finally, the time zone (attribute "zone") and to what extent DST is in effect there (attribute "dst").

A calendar time's native operations localize (operation "localize"), globalize (operation "globalize"), or normalize (operation "normalize") the calendar time.

3.10.2 Miscellaneous Exception

A "miscellaneous exception" is a programming exception thrown by members of the classes in this section.

3.10.3 Pattern

Operations
find
substitute

A "pattern" is an object for lexically analyzing strings. The pattern's text, itself a string, dictates the exact nature of the analysis.

A pattern's native operations search a string for the first matching substring (operation "find") or modify all matching substrings (operation "substitute").

3.10.4 Random Stream

A "random stream" is a stream whose items are pseudo-randomly chosen integers in [0, M]. The items are determined by an integer—the seed—in the same interval. A random stream never produces its last item. In one embodiment of the present invention, "M" is chosen by the creator of the random stream and is specified as an initialization parameter.

3.10.5 Real

A real is a number that constitutes a real number in mathematics.

Note: Internally the Engine may represent reals—and perform arithmetic operations involving them—with only finite precision. Not all real numbers, therefore, are necessarily instances of this class in practice, and the results of the arithmetic operations, when performed by reals, may be only approximate.

4 TELESCRIPT CLASS DETAILS

Telescript's predefined classes are defined, in alphabetical order, in this section of this appendix. A subsection is devoted to each class.

4.1 Conventions

A class' definition begins with a diagram of the portion of the class graph that encompasses that class. The class itself is underlined.

The following sections follow as necessary in the discussion of each predefined class.

Class

This section describes the class apart from the class' features. The class is formally defined following the conventions of Section 6, but an ellipsis ( . . . ) appears in place of the formal definitions of the class' features. Described in prose is how, if at all, the class' interface's encoding is parameterized (see Section 6 below).

Construction

This section describes operation "initialize" as it pertains to members of the class. If this section is omitted, a particular description is implied as described below in Section 6.

Subclasses

This section comprises the definitions of the class' predefined immediate subclasses. This section is omitted iff the class is not a subclass of class "Exception" or is a subclass of class "Exception" but has no predefined subclasses.

Attributes

These sections define the attributes native to the class. Separate sections are devoted to public, private, internal, and other system attributes of the class itself and instances of the class. A section is omitted if it would be empty.

An attribute is formally defined following the conventions of Section 6. The attribute's semantics and exceptions are informally defined in prose.

Operations

These sections define the operations native to the class in the same way that other sections, described, define the attributes native to the class.

If an operation modifies the stack that holds its arguments and result, the operation's effect upon the stack is described assuming the arguments have been popped from the stack and any result has yet to be pushed onto the stack.

Adaptations

This section describes how the class implements features that the class inherits. This section is omitted iff the class implements no such features.

Conversions

This section describes the conversions that produce instances of the class. This section is omitted if there are no such conversions.

The definition of an individual conversion identifies a source class and states how the source class' members are converted to the subject class. If not all members can be so converted, which can be converted are indicated. If the source class of one conversion is a subclass of the source class of another, the former conversion takes precedence over the latter. Conversions are not chained.

Note: Conversion is done, i.e., in a single step. Thus the conversion of a telenumber to an octet string, e.g., is undefined, even though the conversion of a telenumber to a string and the conversion of a string to an octet string are defined.

4.2 Agent

Object (Referenced)
● Process (Named)
● ● Agent

Class
Agent:
abstract interface (Process)=( . . . );
Private Instance Operations go:
  unprotected op (ticket: copied Ticket) TicketStub
  throws PermitViolated, StateImproper, TripException;

Transports the responder to the destination identified by the ticket (argument "ticket") subject to the ticket's other terms. The operation returns the ticket stub.

An exception is thrown if the responder holds a permit that forbids operation "go" ("PermitViolated"), the responder's state precludes operation "go" ("StateImproper"), or the trip failed ("TripException").

send:
  unprotected op (tickets: copied List [Ticket])
    TicketStub|Nil
    throws PermitViolated, StateImproper,
TripException;

Transports a clone of the responder to the destination identified by each and every listed ticket (argument "tickets") subject to the ticket's other terms. The responder's allowance is reduced by the amounts the tickets assign to the clones. The operation returns a nil for the responder, a ticket stub for each clone.

If a member of either class "Permit Violated" or class "State Improper" causes the operation to fail, the responder experiences the failure, no clones having been created. Otherwise, the responder experiences the operation's success, and each clone, separately and independently, experiences either the operation's success or its failure because of a member of class "Trip Exception".

An exception is thrown if the responder holds a permit that forbids operation "send" or whose allowance is less than the sum of those of the permits on the listed tickets ("PermitViolated"), the responder's state precludes operation "send" ("StateImproper"), or the trip failed ("TripException").

4.3 Association

| Object (Referenced) |
| --- |
| ● Association (Ordered) |

| Class |
| --- |

| Association: |
| --- |
| sealed interface [keyClass, valueClass: Class] (Object, Ordered) = ( . . . ); |

Parameterized by the classes of which the key (argument "keyClass") and the value (argument "valueClass") of each member of the subject class are themselves members.
Construction
initialize:
unprotected op (key: keyClass; value: valueClass);
Makes the responder's native attributes the like-named arguments (argument "key" and argument "value").
Public Instance Attributes
key:
keyClass;
The responder's key.
value:
valueClass;
The responder's value.
Adaptations
isAfter
One association is after another according to their keys.
isBefore
One association is before another according to their keys.
isEqual
Two associations are equal according to their keys.

4.4 Attribute

| Object (Referenced) |
| --- |
| ϵ Feature |
| ϵ ϵ Attribute |

Class
Attribute:
sealed interface (Feature)=( . . . );
Construction

| initialize: |
| --- |
| unprotected op ( constraint: Constraint\|Nil; | isSet, isPublic: Boolean\|Nil;
exceptions: Set [Identifier!]\|Nil);

Makes the responder's attributes the like-named arguments ("constraint", "exceptions", "isPublic", and "isSet") If an argument is a nil, however, the corresponding attribute is made a constraint with nils as initialization parameters, a cleared set, "false" or "false", respectively
Public Instance Attributes
constraint:
Constraint;
The constraint upon the attribute that the responder defines.
isSet:
Boolean;
Whether the attribute that the responder defines is not read-only.
Adaptations
isEqual
Two attribute definitions are equal according to their attributes native to feature definitions and attribute definitions.

4.5 Authenticator

| Object (Referenced) |
| --- |
| ϵ Authenticator |

Class
Authenticator:
abstract interface=( );

4.6 Bit

| Object (Referenced) |
| --- |
| ϵ Primitive (Executed & Unchanged) |
| ϵ ϵ Bit (Ordered) |

Class
Bit:
sealed interface (Primitive, Ordered)=( );
Adaptations
isAfter
One bit is after another if the first is one, the second zero.
isBefore
One bit is before another if the first is zero, the second one.
isEqual
Two bits are equal iff both are zero or one.
Conversions
BitString
A bit string having one item produces a bit that equals that item.
Boolean
The booleans false and true produce zero and one, respectively.
Character
The numerals zero (0) and one (1) produce zero and one, respectively.
Integer
The integers zero and one produce zero and one, respectively.
Octet
An octet all of whose bits except Bit 0 are zero produces that bit.
OctetString An octet string that can be converted to an octet that can be converted to a bit produces that bit.
String
A string that can be converted to a character that can be converted to a bit produces that bit.

4.7 Bit String

| Object (Referenced) |
| --- |
| ¢ Collection |
| ¢ ¢ List (Ordered) |
| ¢ ¢ ¢ Constrained List (Constrained) |
| ¢ ¢ ¢ ¢ Bit String (Executed) |

Class
BitString:
sealed interface (ConstrainedList [Bit], Executed)=( ... );
Construction

| initialize: |
| --- |
| unprotected op (segments: Object ... |
| /* Bit\|protected BitString! */); |

Makes the responder a concatenation of the segments (argument "segments") whose positions in the responder increase from left to right.
Adaptations
constraint
The attribute is sealed. Its "ofClass", "classId", "isInstance", "isOptional", and "passage" attributes are class "Bit", the identifier of class "Bit", "true", "false", and "byCopy", respectively.
isAfter
One bit string is after another as if enough "zero" bits were first prepended to the shorter bit string to make the shorter bit string equal in length to the longer bit string.
isBefore
One bit string is before another as if enough "zero" bits were first prepended to the shorter bit string to make the shorter bit string equal in length to the longer bit string.
Conversions
Bit
A bit produces a bit string whose only item equals that bit.
Boolean
A boolean produces the result of first converting the boolean to a bit, and then converting the bit to a bit string.
Character
A character produces the result of first converting the character to an octet string, and then converting the octet string to a bit string.
Integer
An integer in the range of $[-2^n, 2^n)$, for some integer "n" and none smaller, produces a bit string of length "n". A twos' complement representation is used. The bit at position one represents $-2^n$. The bit in each position "i" in the range of (1, n] represents $2^{n-i}$.
Octet
An octet produces the result of first converting the octet to an octet string, and then converting the octet string to a bit string.
OctetString
An octet string whose length is "n" produces a bit string whose length is "8n". The bit whose position in the bit string is (8i+j) is Bit (8−j) of the octet whose position in the octet string is "i". In the above, "i" and "j" are integers, "i" is in the range [0, n), and "j" is in the range [1, 8].
String
A string produces the result of first converting the string to an octet string, and then converting the octet string to a bit string.

4.8 Boolean

| Object (Referenced) |
| --- |
| ¢ Primitive (Executed & Unchanged) |
| ¢ ¢ Boolean (Ordered) |

Class
Boolean:
sealed interface (Primitive, Ordered)=( ... );
Public Instance Operations
and:
op (boolean: Boolean) Boolean;
Returns the logical conjunction of the boolean (argument "boolean") and the responder.
not:
op ( ) Boolean;
Returns the logical negation of the responder.
or:
op (boolean: Boolean) Boolean;
Returns the logical disjunction of the boolean (argument "boolean") and the responder.
Adaptations
isAfter
One boolean is after another if the first is "true", and the second is "false".
isBefore
One boolean is before another iff the first is "false", and the second is "true".
isEqual
Two booleans are equal if both are "false" or both are "true".
Conversions
Bit
A bit produces an indication of whether the bit is one.
Character
A character produces an indication of whether the character's Unicode code is non-zero.
Collection
A collection produces an indication of whether the collection's length is non-zero.
Exception
An exception produces "true".
Nil
A nil produces "false".
Number
A number produces an indication of whether the number is non-zero.
Octet
An octet produces an indication of whether any of the octet's bits is one.

4.9 Calendar Time

| Object (Referenced) |
| --- |
| ¢ Calendar Time |

Class
CalendarTime:
interface=( ... );
Construction
initialize
Makes the responder's native attributes nils.
Public Instance Attributes
day:
Integer|Nil;
Either the day of the month the responder identifies or a nil.
dayOfWeek:

readonly Integer|Nil;
Either the day of the week the responder identifies or a nil.
dayOfYear:
readonly Integer|Nil;
Either the day of the year the responder identifies or a nil.
dst:
Integer|Nil;
Either the seasonal offset in minutes, from the permanent offset, of the time zone the responder identifies or a nil.
hour:
Integer|Nil;
Either the hour of the day the responder identifies or a nil.
minute:
Integer|Nil;
Either the minute of the hour the responder identifies or a nil.
month:
Integer|Nil;
Either the month of the year the responder identifies or a nil.
second:
Integer|Nil;
Either the second of the minute the responder identifies or a nil.
year:
Integer|Nil;
Either the year in the Gregorian calendar the responder identifies or a nil.
zone:
Integer|Nil;
Either the permanent offset in minutes, from UTC, of the time zone the responder identifies or a nil.
Public Instance Operations
globalize:
unprotected op ( );
Sets the responder's permanent and seasonal offsets to those of UTC so that the absolute point in time identified is unchanged.
localize:
unprotected op ( );
Sets the responder's permanent and seasonal offsets to those of the current place so that the absolute point in time identified is unchanged.
normalize:
unprotected op ( ) Boolean;
Normalizes the responder and returns an indication of whether any of the responder's attributes were altered in the process.
Adaptations
isEqual
Two calendar times are equal according to their native attributes.
conversions
Time
A time produces a normalized calendar time that identifies the same absolute point in time and the same permanent and seasonal offsets.

4.10 Cased
Cased
Class
Cased:
abstract interface ( )=( . . . );
Public Instance Attributes
isLower:
abstract readonly Boolean;
Whether any item of the responder is lower-case.
isUpper:
abstract readonly Boolean;
Whether any item of the responder is upper-case.
Public Instance Operations
makeLower:
abstract op ( ) copied Cased;
Returns a copy of the responder in which every upper-case item has been replaced with the item's lower-case equivalent.
makeUpper:
abstract op ( ) copied Cased;
Returns a copy of the responder in which every lower-case item has been replaced with the item's upper-case equivalent.

4.11 Character

Object (Referenced)
 ℓ Primitive (Executed & Unchanged)
  ℓ ℓ Character (Cased & Ordered)

Class
Character:
sealed interface (Primitive, Cased, Ordered)=( );
Adaptations
isAfter
One character is after another according to their Unicode codes.
isBefore
One character is before another according to their Unicode codes.
isEqual
Two characters are equal according to their Unicode codes.
Conversions
Bit
The bit "zero" produces the numeral zero (0), and the bit one produces the numeral one (1).
Integer
An integer in the range of [0, 65535] produces the character with that Unicode code.
Octet
An octet produces the result of first converting the octet to an integer, and then converting the integer to a character.
OctetString
An octet string produces the result of first converting the octet string to an integer, and then converting the integer to a character.
String
A string having one item produces a character that equals that item.

4.12 Citation

Object (Referenced)
 ℓ Citation (Ordered)

Class
Citation:
interface (Object, Ordered)=( . . . );
Construction
initialize:

initialize:
unprotected op (

```
title: Identifier!; author: Telename|Nil;
majorEdition, minorEdition: Integer|Nil);
```

Makes the responder's native attributes the like-named arguments (arguments "author", "majorEdition", "minorEdition", and "title").
Public Instance Attributes
author:
Telename|Nil;
Either the telename of the author identified by the responder, if the latter is assigned or such a constraint is imposed, or a nil, otherwise.
majorEdition:
Integer|Nil;
Either the number of the major edition identified by the responder, if the latter is assigned or such a constraint is imposed, or a nil, otherwise.
minorEdition:
Integer|Nil;
Either the number of the minor edition identified by the responder, if the latter is assigned or such a constraint is imposed, or a nil, otherwise.
title:
Identifier!;
The identifier of the title the responder identifies.
Adaptations
isAfter
One citation is after another if their "author" attributes are peers, their "title" attributes equal, and the first citation's "majorEdition" attribute is after the second citation's "majorEdition" attribute or the "majorEdition" attributes of both citations are equal and the first citation's "minorEdition" attribute is after the second citation's.
isBefore
One citation is before another if their "author" attributes are peers, their "title" attributes equal, and the first citation's "majorEdition" attribute is before the second citation's "majorEdition" attribute or the "majorEdition" attributes of both citations are equal and the first citation's "minorEdition" attribute is before the second citation's.
isEqual
Two citations are equal iff their "author" attributes are peers and their other native attributes are equal.

4.13 Cited

Cited
Class
Cited:
abstract interface ( )=( . . . );
Construction

```
initialize:
unprotected op (title: Identifier!;
majorEdition, minorEdition: Integer);
```

Makes the responder's native attribute a citation whose "author" attribute is the current process' assigned telename and whose other attributes are the like-named arguments (arguments "majorEdition", "minorEdition", and "title").
Public Instance Attributes
citation:
readonly protected Citation;
The responder's assigned citation.

4.14 Class

```
Object (Referenced)
  ₑ Class (Cited & Interchanged)
```

Class
Class:
sealed interface (Object, Cited, Interchanged)=( . . . );
Construction

```
initialize:
unprotected op ( )
throws FeatureUnavailable;
```

Throws an exception ("FeatureUnavailable").
Note: A class is created using operation "makeClasses", not operation "new".
Public Instance Operations

```
convert:
sealed op (source: protected Object) copied Object
throws ConversionUnavailable;
```

Returns either the instance of the responder produced by converting the object (argument "source") to that class, if the object is not already an instance of that class, or a copy of the object, otherwise.
The operation looks for a conversion method first in the source class and then, failing that, in the destination class. An exception is thrown if the object cannot be converted as requested ("ConversionUnavailable").
Note: The two steps permit either the source or the destination class, whichever was defined later, to implement the method for a particular conversion.
isInstance:
sealed op (instance: protected Object) Boolean;
Returns an indication of whether the object (argument "instance") is an instance of the responder.
isMember:
sealed op (member: protected Object) Boolean;
Returns an indication of whether the object (argument "member") is an interface, but not necessarily an implementation, member of the responder.
isSubclass:
sealed op (subclass: Class) Boolean;
Returns an indication of whether the class (argument "subclass") is a subclass of the responder.

```
new:
sealed op (parameters: Object . . . ) Object
throws ClassAbstract, Exception, ObjectUninitialized;
```

Returns the new instance of the responder determined by the initialization parameters (argument "parameters"). The signature above notwithstanding, the operation's signature is that of operation "initialize" as defined by the responder.
An exception is thrown if the responder is abstract ("ClassAbstract"), a class-specific problem is encountered ("Exception"), or the potential object uses its own features ("ObjectUninitialized").

4.15 Class Definition

```
Object (Referenced)
  ₡ Class Definition
```

Class
ClassDefinition:
sealed interface=( . . . );
Construction

```
initialize:
  unprotected op (
    title: Identifier!;
    majorEdition, minorEdition: Integer;
    interface: Interface;
    implementation: Implementation¦Nil);
```

Makes the responder's native attributes the like-named arguments (arguments "implementation", "interface", "majorEdition", "minorEdition", and "title").
Public Instance Attributes
implementation:
Implementation¦Nil;
Either the implementation of the class the responder defines, if there is an implementation, or a nil, otherwise.
interface:
Interface;
The interface of the class the responder defines.
majorEdition:
Integer;
The "majorEdition" attribute of the assigned citation of the class the responder defines.
minorEdition:
Integer;
The "minorEdition" attribute of the assigned citation of the class the responder defines.
title:
Identifier!;
The "title" attribute of the assigned citation of the class the responder defines.
Public Instance Operations

```
makeClasses:
  op (definitions: protected ClassDefinition . . . )
    Lexicon [Class]
  throws ClassException;
```

Returns a lexicon of the classes the responder and the other class definitions (argument "definitions") define collectively. Each value is the class whose title equals the associated key.

A citation is assigned to each class as follows. The assigned citation's "author" attribute is the current process' assigned telename. The assigned citation's other attributes are as defined by the class' class definition.

An exception is thrown if the classes cannot be created ("ClassException").
Adaptations
isEqual
Two class definitions are equal according to their native attributes.

4.16 Class Exception

```
Object (Referenced)
  ₡ Exception (Unchanged)
  ₡ ₡ Programming Exception
  ₡ ₡ ₡ Class Exception
```

Class
ClassException:
abstract interface (ProgrammingException)=( );
Subclasses
ClassSealed:
interface (ClassException)=( );
A proposed new class has an immediate superclass that is sealed.
ClassUndefined:
interface (ClassException)=( );
A proposed new class uses an undefined class identifier.
FeatureRedefined:
interface (ClassException)=( );
A proposed new class and one of its interface superclasses have native features denoted by the same identifier.
FeatureSealed:
interface (ClassException)=( );
A proposed new class implements a feature sealed by one of the class' interface superclasses.
FeatureUndefined:
interface (ClassException)=( );
A proposed new class uses an undefined feature identifier.
MixinDisallowed:
interface (ClassException)=( );
A proposed new class uses a mix-in where a flavor is required.
SuperclassesInvalid:
interface (ClassException)=( );
A proposed new class has immediate superclasses that are inconsistent.

4.17 Collection

```
Object (Referenced)
  ₡ Collection
```

Class
Collection:
interface [itemClass: Class]=( . . . );
Parameterized by the class (argument "itemClass") of which each item of each member of the subject class is itself a member.
Construction
initialize:
unprotected op (items: itemClass . . . )throws ItemInvalid;
Makes the responder's items the objects (argument "items").
An exception is thrown if a proposed item is invalid ("ItemInvalid").
Public Instance Attributes
length:
readonly Integer;
The responder's length.
Public Instance Operations
clear:
unprotected op ( );

Removes from the responder and discards all of its items.
Note: The operation reduces the responder's length to zero.
  examine:
  op (item: protected itemClass) itemClass¦Nil;
  Either leaves in the responder and returns an item that equals the object (argument "item"), if there is at least one such item, or returns a nil, otherwise. If there are several such items, the one selected is undefined.
  exclude:
  unprotected op (item: protected itemClass) itemClass¦Nil;
  Either excludes from the responder and returns an item that equals the object (argument "item"), if there is at least one such item, or returns a nil, otherwise. If there are several such items, the one selected is undefined.
  include:
  unprotected op (item: itemClass)throws ItemInvalid;
  Includes the object (argument "item") in the responder as a new item.
  An exception is thrown if the proposed item is invalid as such ("ItemInvalid").
  stream:
  op ( ) copied Stream [itemClass];
  Returns a stream whose items are those of the responder. A subclass of class "Collection" can define the order in which the stream produces the responder's items, but class "Collection" leaves the order undefined.
  If the responder is changed after the stream is created, the stream produces newly included items iff the stream would not have produced them earlier and does not produce newly excluded items unless the stream did so earlier.
Note: The subclass of class "Stream" of which the stream is an instance is undefined.
  Adaptations
  isEqual
  Two collections are equal if their lengths are equal and their items can be paired so as to make the items in each pair equal. A subclass of Collection can narrow, but not broaden, this definition of equality.

4.18 Collection Exception

| Object (Referenced) |
| --- |
| ¢ Exception (Unchanged) |
| ¢ ¢ Programming Exception |
| ¢ ¢ ¢ Collection Exception |

Class
CollectionException:
abstract interface (ProgrammingException)=( );
Subclasses
ItemDuplicated:
interface (CollectionException)=( );
One proposed item of a set equals another.
ItemInvalid:
interface (CollectionException)=( );
A collection's proposed item does not satisfy the collection's constraint.
KeyDuplicated:
interface (CollectionException)=( );
One proposed key of a dictionary equals another.
KeyInvalid:
interface (CollectionException)=( );
A dictionary's proposed key does not meet the dictionary's constraint, or an object purporting to equal a key in a dictionary does not.

ObjectsUnpaired:
interface (CollectionException)=( );
Supposedly paired keys and values of a dictionary are odd in number.
Position Invalid:
interface (CollectionException)=( );
An integer purporting to equal a position in a list or a procedure does not.
StackDepleted:
interface (CollectionException)=( );
The length of a stack prevents the stack's manipulation as requested.

4.19 Constrained
Constrained
Class
Constrained:
abstract interface ( )=( . . . );
Construction
initialize:
unprotected op (constraint: copied Constraint¦Nil);
Makes the responder's native attribute either the constraint (argument "constraint"), if not a nil, or one with nil initialization parameters, otherwise.
Public Instance Attributes
constraint:
readonly protected Constraint;
The constraint upon nominated properties of the responder.

4.20 Constrained Dictionary

| Object (Referenced) |
| --- |
| ¢ Collection |
| ¢ ¢ Set |
| ¢ ¢ ¢ Dictionary |
| ¢ ¢ ¢ ¢ Constrained Dictionary (Constrained) |

Class

| ConstrainedDictionary: |
| --- |
| interface [keyClass, valueClass: Class] |
|    (Dictionary [keyClass, valueClass], Constrained) |
|    = ( . . . ); |

Parameterized by the classes of which the key (argument "keyClass") and the value (argument "valueClass") of each item of each member of the subject class are themselves members.
Construction

| initialize: |
| --- |
| unprotected op (constraint: copied Constraint; |
|    keysAndValues: Object . . . |
|    /* key: keyClass; value: valueClass */) |
|    throws KeyDuplicated, KeyInvalid, |
| ObjectsUnpaired; |

Makes the responder's items associations between the key-value pairs (argument "keysAndValues") and the responder's "constraint" attribute the constraint (argument "constraint").
An exception is thrown if two proposed keys are equal ("KeyDuplicated"), a proposed key is invalid as such ("KeyInvalid"), or the number of objects is odd ("ObjectsUnpaired").
  Adaptations
  add Only a key satisfying the constraint will be included.

constraint

The constraint is upon the keys.

include

Only a key satisfying the constraint will be included.

rekey

Only a key satisfying the constraint will be included.

set

Only a key satisfying the constraint will be included.

4.21 Constrained List

```
Object (Referenced)
  ⋲ Collection
    ⋲ ⋲ List (Ordered)
      ⋲ ⋲ ⋲ Constrained List (Constrained)
```

Class

```
ConstrainedList:
  interface [itemClass: Class]
    (List [itemClass], Constrained) = ( ... );
```

Parameterized by the class (argument "itemClass") of which each item of each member of the subject class is itself a member.

Construction

```
initialize:
  unprotected op (constraint: copied Constraint;
    items: itemClass ... )
    throws ItemInvalid;
```

Makes the responder's items the objects (argument "items"), their positions increasing from left to right, and the responder's "constraint" attribute the constraint (argument "constraint").

An exception is thrown if a proposed item is invalid ("ItemInvalid").

Adaptations add

Only an object satisfying the constraint will be included.

constraint

The constraint is upon the items.

include

Only an object satisfying the constraint will be included.

4.22 Constrained Set

```
Object (Referenced)
  ⋲ Collection
    ⋲ ⋲ Set (Verified)
      ⋲ ⋲ ⋲ Constrained Set (Constrained)
```

Class

```
ConstrainedSet:
  interface [itemClass: Class]
    (Set [itemClass], Constrained) = ( ... );
```

Parameterized by the class (argument "itemClass") of which each item of each member of the subject class is itself a member.

Construction

```
initialize:
  unprotected op (constraint: copied Constraint;
    items: itemClass ... )
    throws ItemDuplicated, ItemInvalid;
```

Makes the responder's items the objects (argument "items") and the responder's constraint attribute the constraint (argument "constraint").

An exception is thrown if two proposed items are equal ("ItemDuplicated") or a proposed item is invalid as such ("ItemInvalid").

Adaptations constraint

The constraint is upon the items.

include

Only an object satisfying the constraint will be included.

4.23 Constraint

```
Object (Referenced)
  ⋲ Constraint
```

Class

Constraint:

interface=( ... );

Construction

```
initialize:
  unprotected op
    (classId, passage: Identifier!|Nil;
    isOptional, isInstance: Boolean|Nil)
    throws PassageInvalid;
```

Makes the responder's "ofClass" attribute a nil and the responder's other native attributes the like-named arguments (arguments "classId", "isInstance", "isOptional", and "passage"). If an argument is a nil, however, the corresponding attribute is made the identifier of class "Object", "false", "false", or "byRef", respectively.

An exception is thrown if the proposed passage is invalid as such ("PassageInvalid").

Public Instance Attributes classId:

Identifier!;

The identifier of the class of which the responder's subject shall be a member. The identifier is interpreted according to the "vocabulary" attribute of the interface or implementation that provides the responder's context.

isInstance:

Boolean;

Whether the responder's subject shall be an instance, not just a member, of the class that the "classId" attribute denotes.

isOptional:

Boolean;

Whether the responder's subject is permitted to be a nil, the "classId" attribute notwithstanding.

ofClass:

readonly Class|Nil;

If not a nil, the class of which the responder's subject shall be a member.

```
         passage:
             Identifier!
                 throws PassageInvalid;
```

The identifier denoting how the responder's subject shall be passed.

An exception is thrown if the proposed passage is invalid as such ("PassageInvalid").

Adaptations isEqual

Two constraints are equal according to their native attributes.

4.24 Contact

```
                 Object (Referenced)
                     ҫ  Contact
```

Class

Contact:

interface=( ... );

Construction

```
         initialize:
             unprotected op (subject: Process!Nil;
                 subjectNotes: Object!Nil);
```

Makes the responder's "subject" and "subjectNotes" attributes the like-named arguments (arguments "subject" and "subjectNotes", respectively) and the responder's other native attributes either descriptive of the subject, if the "subject" attribute is a process, or a nil, otherwise.

Public Instance Attributes subject:

Process!Nil;

The responder's subject or a nil.

subjectClass:

readonly protected Citation!Nil;

Either the assigned citation of the class, which is a subclass of class "Agent" or class "Place", of which the responder's subject is an instance, if the "subject" attribute is a process, or either that class or a nil, if the "subject" attribute is a nil.

subjectName:

readonly protected Telename!Nil;

Either the assigned telename of the responder's subject, if the "subject" attribute is a process, [or that telename] or a nil, otherwise.

subjectNotes:

Object!Nil;

An object maintained by the responder's observer.

Adaptations isEqual

Two contacts are equal according to their "subjectName" attributes.

4.25 Contacted

Contacted

Class

Contacted:

abstract interface ( )=( ... );

Construction initialize

Clears the responder's "contacts" attribute.

Private Instance Attributes contacts:

readonly Set [Contact];

The set of contacts that the responder maintains.

4.26 Dictionary

```
                 Object (Referenced)
                     ҫ  Collection
                     ҫ  ҫ  Set
                     ҫ  ҫ  ҫ  Dictionary
```

Class

```
         Dictionary:
             interface [keyClass, valueClass: Class]
                 (Set [Association [keyClass, valueClass]]) =
             ( ... );
```

Parameterized by the classes of which the key (argument "keyClass") and the value (argument "valueClass") of each item of each member of the subject class are themselves members.

Construction

```
         initialize:
             unprotected op (keysAndValues: Object ...
                 /* key: keyClass; value: valueClass */)
                 throws KeyDuplicated, KeyInvalid,
             ObjectsUnpaired;
```

Makes the responder's items associations between the key-value pairs (argument "keysAndValues").

An exception is thrown if two proposed keys are equal ("KeyDuplicated"), a proposed key is invalid as such ("KeyInvalid"), or the number of objects is odd ("ObjectsUnpaired").

Public Instance Operations

```
         add:
             unprotected op (key: keyClass; value: valueClass)
                 throws KeyInvalid;
```

Includes in the responder a new association, one that involves the first object (argument "key") as the associations' key and the second (argument "value") as the association's value.

An exception is thrown if the proposed key is invalid as such or equals the key in an association that the responder already includes ("KeyInvalid").

```
         drop:
             unprotected op (key: protected keyClass) valueClass
                 throws KeyInvalid;
```

Excludes from the responder and discards the association whose key equals the object (argument "key"), and returns the association's value. An exception is thrown if the asserted key is invalid as such ("KeyInvalid").

find:

op (value: protected valueClass) keyClass!Nil;

Leaves in the responder the association whose value equals the object (argument "value"), and returns the association's key. If the responder includes several such associations, the one selected is undefined. If the responder includes none, a nil is returned.

```
get:
    op (key: protected keyClass) valueClass
        throws KeyInvalid;
```

Leaves in the responder the association whose key equals the object (argument "key"), and returns the association's value.

An exception is thrown if the asserted key is invalid as such ("KeyInvalid").

```
rekey:
    unprotected op (currentKey: protected keyClass;
        newKey: keyClass)
        throws KeyInvalid;
```

Leaves in the responder the association whose key equals the first object (argument "currentKey"), discards that association's key, and substitutes for that key the second object (argument "newKey"). The operation achieves this as if by means of operations "drop" and "add".

An exception is thrown if the asserted or proposed key is invalid as such or the latter equals the key in an association that the responder already includes ("KeyInvalid").

```
set:
    unprotected op (key: protected keyClass; value:
    valueClass)
        throws KeyInvalid;
```

If the responder includes an association whose key equals the first object (argument "key"), substitutes for that association's value the second object (argument "value"). Otherwise, includes in the responder a new association, one that involves the first object (argument "key") as the association's key and the second (argument "value") as the association's value.

An exception is thrown if the proposed key is invalid as such ("KeyInvalid").

```
transpose:
    unprotected op (key1, key2: protected keyClass)
        throws KeyInvalid;
```

Transposes the responder's values for the two keys (arguments "key1" and "key2").

An exception is thrown if an asserted key is invalid as such ("KeyInvalid").

Adaptations
include

Only an association is included. An association is included as a new item after excluding and discarding any existing item equal to the association.
isEqual Two dictionaries are equal only if their like-keyed values are equal.

4.27 Exception

```
Object (Referenced)
    Exception (Unchanged)
```

Class
Exception:
abstract interface (Object, Unchanged)=( ... );
Public Instance Operations
throw:
```
sealed op ( );
```

Finishes the current method's performance by causing the method to fail because of the responder.

Adaptations isEqual

Two exceptions are equal iff they are instances of the same class.

4.28 Executed

Executed

Class

Executed:

abstract interface ( )=( );

This class is sealed.

Public Instance Operations

```
catch:
    sealed op (exception: Class) Exception|Nil
        throws Exception;
```

Performs the responder, returning either a nil, if the responder succeeds, or the exception causing the responder to fail, if the exception is a member of the supplied class (argument "exception"). The responder gets access to the requester's frame and properties, rather than the responder's.

An exception is thrown if the responder throws an exception that is not a member of the supplied class ("Exception"). Note: The class should be Exception or a subclass thereof.

```
do:
    sealed op ( )
        throws Exception;
```

Performs the responder. The responder gets access to the requester's frame and properties, rather than the responder's.

An exception is thrown if the responder does so ("Exception").

```
either:
    sealed op (false: Executed; precondition: Boolean)
        throws Exception;
```

Performs either the responder, if the precondition (argument "precondition") is true, or the executed object (argument "false"), otherwise. The selected executed object gets access to the requester's frame and properties, not the responder's.

An exception is thrown if the selected executed object does so ("Exception").

```
if:
    sealed op (precondition: Boolean)
        throws Exception;
```

Performs the responder if the precondition (argument "precondition") is "true". The responder gets access to the requester's frame and properties, not its own.

An exception is thrown if the responder does so ("Exception").

```
loop:
    sealed op ( )
        throws Exception;
```

Performs the responder an indefinite number of times, throwing the exception, rather than proceeding, if the responder ever fails. The responder gets access to the requester's frame and properties, rather than the responder's.

An exception is thrown if the responder does so ("Exception").

> repeat:
> sealed op (repetitions: Integer)
> throws Exception;

Performs the responder the requested number of times (argument "repetitions"), throwing the exception, rather than proceeding, if the responder ever fails. If the integer is negative, the operation has no effect. The responder gets access to the requester's frame and properties, rather than the responder's.

Before each performance of the responder, the operation pushes onto the stack an integer that is one plus the number of prior performances.

An exception is thrown if the responder does so ("Exception").

Note: The operation pops none of the integers the operation pushes onto the stack.

> while:
> sealed op (precondition: Executed)
> throws Exception, ResultInvalid, ResultMissing;

Repeatedly performs the executed object (argument "precondition"), pops a boolean from the stack, and, iff the boolean is true, performs the responder. If the boolean is ever false, the operation succeeds. If either executed object ever fails, the operation throws the exception, rather than proceed. The executed objects are given access to the requester's frame and properties, rather than the responder's.

An exception is thrown if either executed object does so ("Exception"), the object that would have been popped is not a boolean ("ResultInvalid"), or there is no object on the stack to be popped then ("ResultMissing").

4.29 Execution Exception

```
Object (Referenced)
  ¢ Exception (Unchanged)
  ¢ ¢ Programming Exception
  ¢ ¢ ¢ Kernel Exception
  ¢ ¢ ¢ ¢ Execution Exception
```

Class

ExecutionException:

abstract interface (KernelException)=( );

Subclasses

ArgumentInvalid:

interface (ExecutionException)=( );

An argument does not satisfy the argument's constraint.

ArgumentMissing:

interface (ExecutionException)=( );

An argument is not on the stack.

AttributeReadOnly:

interface (ExecutionException)=( );

An attribute is read-only, and thus cannot be set.

ClassUnavailable:

interface (ExecutionException)=( );

A class is in neither attribute "privateClasses" of the current process nor attribute "publicClasses" of the current place.

EscalationInvalid:

interface (ExecutionException)=( );

A feature is escalated improperly.

FeatureUnavailable:

interface (ExecutionException)=( );

An identifier does not denote an accessible feature of the responder.

InternalException:

interface (ExecutionException)=( );

An Engine fails to fully implement the Instruction Set.

PropertyUndefined:

interface (ExecutionException)=( );

An identifier does not denote a property accessible to the current method.

ReferenceProtected:

interface (ExecutionException)=( );

A reference to an object prevents the object's modification.

ReferenceVoid:

interface (ExecutionException)=( );

A reference is void.

ResponderMissing:

interface (ExecutionException)=( );

A feature is requested when the stack is cleared.

ResultInvalid:

interface (ExecutionException)=( );

A result does not satisfy the result's constraint.

ResultMissing:

interface (ExecutionException)=( );

A result is not on the stack.

VariableUndefined:

interface (ExecutionException)=( );

An identifier does not denote a variable.

4.30 Feature

```
Object (Referenced)
  • Feature
```

Class

Feature:

abstract interface=( ... );

This class is sealed.

Construction

> initialize:
> unprotected op (
>   isPublic: Boolean|Nil;
>   exceptions: Set [Identifier!]|Nil);

Makes the responder's native attributes the like-named arguments (arguments "exceptions" and "isPublic"). If an argument is a nil, however, the corresponding attribute is cleared or made "false", respectively.

Public Instance Attributes exceptions:

Set [Identifier!];

The identifiers denoting the classes of which the exceptions thrown by the feature the responder defines are members. The identifiers are interpreted according to the "vocabulary" attribute of the interface that includes the responder.

isPublic:

Boolean;

Whether the feature that the responder defines is public, i.e., not private.

4.31 Hashed

Hashed

Class

Hashed:

abstract interface ( )=( ... );

Public Instance Attributes
hash:
abstract readonly Integer;
The responder's hash.
4.32 Identifier > Object (Referenced)
> • Primitive (Executed & Unchanged)
> • • Identifier (Ordered)

Class
Identifier:
sealed interface (Primitive, Ordered)=( );
Adaptations
isAfter
One identifier is after another according to their texts.
isBefore
One identifier is before another according to their texts.
isEqual
Two identifiers are equal according to their texts.
Conversions
String
A string that is valid as an identifier's text produces that identifier.
4.33 Implementation
Object (Referenced)
Implementation
Class
Implementation:
sealed interface=( . . . );
Construction > initialize:
> unprotected op (superclasses: List [Identifier!]|Nil;
> vocabulary: Lexicon [Citation]|Nil;
> properties: List [Identifier!]|Nil;
> instanceMethods, setMethods, classMethods,
> fromMethods, toMethods: Lexicon [Method]|Nil);

Makes the responder's native attributes the like-named arguments (arguments "classMethods", "fromMethods", "instanceMethods", "properties", "setMethods", "superclasses", "toMethods", and "vocabulary"). If an argument is a nil but the corresponding attribute is not permitted to be a nil, however, the corresponding attribute is cleared.

Public Instance Attributes
classMethods:
Lexicon [Method];
Methods—for class operations, including operation "αGet", other than operation "αSet" which is disallowed—native to a class incorporating the responder. Each value is a method for performing the operation the associated key denotes.
fromMethods:
Lexicon [Method];
Methods—for converting from other classes—native to a class incorporating the responder. Each value is a method for converting from the class the associated key denotes.
Note: In an implementation of class "Dictionary", if the class identified is class "List", the conversion is that whose responder is class "Dictionary" and whose signature is "List: op (list: protected List) Dictionary".
instanceMethods:
Lexicon [Method];
Methods—for instance operations, including operation "αGet", other than operation "αSet" (see attribute "setMethods")—native to a class incorporating the responder. Each value is a method for performing the operation the associated key denotes.
properties:
List [Identifier!];
The identifiers of properties native to a class incorporating the responder. Their order has no significance in the interpretation of the disclosed instruction set. However, the order of the properties is significant in the Encoding Rules disclosed in Appendix B of this disclosure.
setMethods:
Lexicon [Method];
Methods—for "αSet" instance operations—native to a class incorporating the responder. Each value is a method for performing the operation the associated key denotes.
superclasses:
List [Identifier!]|Nil;
Either the identifiers of the implementation immediate superclasses of a class incorporating the responder, if they differ from the class' interface immediate superclasses, or a nil, otherwise. The classes' canonical order is that of their identifiers; the last class shall be a flavor.
toMethods:
Lexicon [Method];
Methods—for converting to other classes—native to a class incorporating the responder. Each value is a method for converting to the class the associated key denotes.
Note: In an implementation of class "Dictionary", if the class identified is class "List", the conversion is that whose responder is a dictionary and whose signature is "List: op ( ) List".
vocabulary:
Lexicon [Citation]|Nil;
Either the user-defined classes to which the responder refers, if they are not those to which the class' interface refers, or a nil, otherwise. Each value is a citation to the class the associated key denotes. The attribute guides the interpretation of the responder's "fromMethods", "superclasses", and "toMethods" attributes (and no others).
Adaptations
isEqual
Two implementations are equal according to their native attributes.
4.34 Integer > Object (Referenced)
> • Primitive (Executed & Unchanged)
> • • Number (Ordered)
> • • • Integer Class
Integer:
sealed interface (Number)=( . . . );
Public Instance Operations > modulus:
> op (divisor: Integer) Integer
> throws DivisionByZero;

Returns the arithmetic remainder of the responder, the dividend, and the integer (argument "divisor"), the divisor. The former's sign determines the result's.

An exception is thrown if the divisor is zero ("DivisionByZero").

> quotient:
> op (divisor: Integer) Integer
> throws DivisionByZero;

Returns the arithmetic quotient of the responder, the dividend, and the integer (argument "divisor"), the divisor.

An exception is thrown if the divisor is zero ("Division-ByZero").

Adaptations abs

The result is an integer.

add

The result is a real if the argument is a real, an integer if an integer.

divide

The result is a real if the argument is a real, an integer if the argument is an integer and the result would be exact, and a real, otherwise.

multiply

Same as described above for operation "add".

negate

The result is an integer.

subtract

Same as described above for operation "add".

Conversions

Bit

The bits "zero" and "one" produce zero and one, respectively.

BitString

A bit string that can be produced by converting some integer produces the integer.

Boolean

The booleans "false" and "true" produce zero and one, respectively.

Character

A character produces the integer in [0, 65535] that is the character's Unicode code.

Octet

An octet produces the result of first converting the octet to an octet string, and then converting the octet string to an integer.

OctetString

An octet string that can be produced by converting some integer produces the integer.

Real

A real produces the integer that results from performing operation "truncate".

String

A string that obeys the syntactic rules for the "Integer" token in Character Telescript produces the corresponding integer.

4.35 Interchanged

Unchanged

Interchanged

Class

Interchanged:

abstract interface (Unchanged)=( . . . );

Public Instance Attributes digest:

abstract readonly protected Object!Nil;

Either the digest of the responder, if the responder, i.e., this particular instance of the class, is interchangeable, or a nil, otherwise.

4.36 Interface

Object (Referenced)
• Interface

Class

Interface:

sealed interface=( . . . );

Construction initialize:
unprotected op (superclasses: List [Identifier!]|Nil;
    vocabulary: Lexicon [Citation]|Nil;
    instanceFeatures: Lexicon [Feature]|Nil;
    sealedInstanceFeatures: Set [Identifier!]|Nil;
    classFeatures: Lexicon [Feature]|Nil;
    sealedClassFeatures: Set [Identifier!]|Nil;
    isAbstract: Boolean|Nil);

Makes the responder's native attributes the like-named arguments (arguments "classFeatures", "instanceFeatures", "isAbstract", "sealedClassFeatures", "sealedInstanceFeatures", "superclasses", and "vocabulary"). If the corresponding argument is a nil, however, attribute "isAbstract" is made "false", attribute "superclasses" is made a list of the identifier of class "Object" alone, or the attribute is cleared if the attribute is other than attribrutes "isAbstract" and "superclasses".

Public Instance Attributes classFeatures:

Lexicon [Feature];

The class features native to a class incorporating the responder. Each value is the feature definition of the feature the associated key denotes.

instanceFeatures:

Lexicon [Feature];

The instance features native to a class incorporating the responder. Each value is the feature definition of the feature the associated key denotes.

isAbstract:

Boolean;

Whether a class incorporating the responder is abstract.

sealedClassFeatures:

Set [Identifier!];

The identifiers of the class features that are either native to or inherited by a class incorporating the responder, and that are sealed by that class.

sealedInstanceFeatures:

Set [Identifier!];

The identifiers of the instance features that are either native to or inherited by a class incorporating the responder, and that are sealed by that class.

superclasses:

List [Identifier!];

The identifiers of the interface immediate superclasses of a class incorporating the responder. The classes' canonical order is that of their identifiers; the last class shall be a flavor.

vocabulary:

Lexicon [Citation];

The user-defined classes to which the responder refers. Each value is a citation to the class the associated key denotes. The attribute guides the interpretation of the responder's "superclasses" attribute and no others.

Adaptations isEqual

Two interfaces are equal according to their native attributes.

4.37 Kernel Exception

Object (Referenced)
•   Exception (Unchanged)
•   •   Programming Exception
•   •   •   Kernel Exception Class KernelException:

abstract interface (ProgrammingException)=( );
Subclasses
ClassAbstract:
interface (KernelException)=( );
An object's proposed class is abstract.
ConversionUnavailable:
interface (KernelException)=( );
An object's proposed conversion is undefined.
CopyUnavailable:
interface (KernelException)=( );
An object's property cannot be copied.
LoopMissing:
interface (KernelException)=( );
A loop is broken or continued where no loop exists.
MarkMissing:
interface (KernelException)=( );
A stack's items do not include a mark.
ObjectUninitialized:
interface (KernelException)=( );
An object attempts to use one of its features before escalating operation "initialize".
PassageInvalid:
interface (KernelException)=( );
An object's proposed passage is invalid.
SelectorDuplicated:
interface (KernelException)=( );
Two selectors are equal.

4.38 Lexicon

Object (Referenced)
- Collection
  - Set
    - Dictionary
      - Constrained Dictionary (Constrained)
        - Lexicon Class Lexicon:
interface [valueClass: Class]
    (ConstrainedDictionary [Identifier, valueClass])
    = (...);

Parameterized by the class (argument "valueClass") of which the value of each item of each member of the subject class is itself a member.

Construction initialize:
unprotected op (keysAndValues: Object ...
    /•key: Identifier!; value: valueClass */)
    throws KeyDuplicated, KeyInvalid,
ObjectsUnpaired;

Makes the responder's items associations between the key-value pairs (argument "keysAndValues").

An exception is thrown if two proposed keys are equal ("KeyDuplicated"), a proposed key is invalid as such ("KeyInvalid"), or the number of objects is odd ("ObjectsUnpaired").

Adaptations constraint

The attribute is sealed. The attributes "ofClass", "classId", "isInstance", "isOptional", and "passage" attributes are class "Identifier", the identifier of class "Identifier", "true", "false", and "byCopy", respectively.

Conversions

Dictionary

A dictionary whose keys satisfy the constraints of a lexicon produces the lexicon.

4.39 List

Object (Referenced)
- Collection
  - List (Ordered)

Class

List:
interface [itemClass: Class]
    (Collection [itemClass], Ordered) = (...);

Parameterized by the class (argument "itemClass") of which each item of each member of the subject class is itself a member.

Construction initialize:
unprotected op (items: itemClass ... );
Makes the responder's items the objects (argument "items"), whose positions increase from left to right.

Public Instance Operations add:
unprotected op (position: Integer; item: itemClass)
    throws ItemInvalid, PositionInvalid;

Includes the object (argument "item") in the responder as a new item, one whose position equals the integer (argument "position"), increasing by one the position of each item whose position is equal to or after that of the included item.

An exception is thrown if the proposed item is invalid as such ("ItemInvalid") or the proposed position is invalid as such ("PositionInvalid").

drop:
unprotected op (position: Integer) itemClass
    throws PositionInvalid;

Excludes from the responder and returns the item whose position equals the integer (argument "position"), decreasing by one the position of each item whose position is after that of the excluded item.

An exception is thrown if the asserted position is invalid as such ("PositionInvalid").

find:
op (initialPosition: Integer; item: protected
itemClass)
    Integer!Nil
    throws PositionInvalid;

Leaves in the responder and returns the position of the item that equals the object ("item") and whose position is not before the integer ("initialPosition"). If the responder has several such items, the one whose position is least is selected. If it has none, a nil is returned.

An exception is thrown if the asserted position is invalid as such ("PositionInvalid").

get:
op (position: Integer) itemClass
    throws PositionInvalid;

Leaves in the responder and returns the item whose position equals the integer (argument "position").

An exception is thrown if the asserted position is invalid as such ("PositionInvalid").

reposition:
unprotected op (currentPosition, newPosition:
Integer)
    throws PositionInvalid;

Changes to the second integer (argument "newPosition") the position of the responder's item whose position equals the first integer (argument "currentPosition"). The operation achieves this as if by means of operations "drop" and "add", except that the second integer is interpreted before, rather than after, operation "drop" is requested.

An exception is thrown if an asserted position is invalid as such ("PositionInvalid").

>set:
>unprotected op (position: Integer; item: itemClass)
>throws ItemInvalid, PositionInvalid;

Excludes from the responder the item, if there is one, i.e., if the new item is not being appended, whose position equals the integer (argument "position"), and includes the object (argument "item") as a new item at the same position.

An exception is thrown if the proposed item is invalid as such ("ItemInvalid") or the proposed position is invalid as such ("PositionInvalid").

>transpose:
>unprotected op (position1, position2; Integer)
>throws PositionInvalid;

Transposes the responder's items that occupy the two positions (arguments "position1" and "position2").

An exception is thrown if an asserted position is invalid as such ("PositionInvalid").

Adaptations exclude

The operation decreases by one the position of each object whose position is after that of the excluded item.

include

The position of the newly included item is the list's new length.

isEqual

Two lists are equal only if their like-positioned items are equal.

stream

The stream produces the list's items in order of increasing position.

Conversions

Procedure

A procedure produces a list of the same length, each of whose items is a copy of the item at the same position in the procedure.

4.40 Mark

>Object (Referenced)
>• Primitive (Executed & Unchanged)
>• • Mark

Class

Mark:

sealed interface (Primitive)=( );

Adaptations isEqual

Any two marks are equal.

4.41 Means

>Object (Referenced)
>• Means

Class

Means:

abstract interface=( );

4.42 Meeting Exception

>Object (Referenced)
>• Exception (Unchanged)
>• • Meeting Exception

Class

MeetingException:

abstract interface (Exception)=( );

Subclasses

MeetingDenied:

interface (MeetingException)=( );

The petitionee denies the petitioner the meeting.

MeetingDuplicated:

interface (MeetingException)=( );

The petitioner and petitionee are the same or meeting already.

MeetingInvalid:

interface (MeetingException)=( );

A contact does not represent a meeting.

PetitionExpired:

interface (MeetingException)=( );

The petitionee cannot be met in the time allowed.

4.43 Meeting Place

>Object (Referenced)
>• Process (Named)
>• • Place (Unmoved)
>• • • Meeting Place Class MeetingPlace:

abstract interface (Place)=( ... );

Public Instance Operations

>meet:
>unprotected op (petition: copied Petition) Contact
>throws MeetingException, ProcessNotCurrent, StateImproper;

Begins a meeting between the agent requesting the operation and the one the petition (argument "petition") identifies, returning a contact whose "subject" attribute is the latter. The latter agent must also occupy the responder.

An exception is thrown if the meeting failed ("MeetingException"), the responder is not the current place ("ProcessNotCurrent"), or the requester's state precludes "meet" ("StateImproper").

>part:
>unprotected op (contact: Contact)
>throws MeetingInvalid, ProcessNotCurrent, StateImproper;

Ends the meeting between the agent requesting the operation and the subject of the contact (argument "contact"), making the contact's "subject" attribute a nil, if the attribute is not a nil already. The subject must also occupy the responder.

An exception is thrown if the contact is not a meeting's ("MeetingInvalid"), the responder is not the current place ("ProcessNotCurrent"), or the requester's state precludes operation "part" ("StateImproper").

>partAll:
>unprotected op ( )
>throws ProcessNotCurrent, StateImproper;

Ends all meetings that involve the requesting agent, and then isolates the agent.

An exception is thrown if the responder is not the current place ("ProcessNotCurrent") or the requester's state precludes operation "partAll" ("StateImproper").

4.44 Method

>Object (Referenced)
>• Method

Class

Method:

sealed interface=( ... );

Construction

> initialize:
> unprotected op (procedure: Procedure!Nil;
>     variables: List [Identifier!]!Nil);

Makes the responder's native attributes the like-named arguments (arguments "procedure" and "variables"). If an argument is a nil, however, the corresponding attribute is cleared.

Public Instance Attributes procedure:

Procedure;

The responder's procedure.

variables:

List [Identifier!];

The identifiers of the responder's variables, their order having no significance with respect to the interpretation of the disclosed instruction set. However, the order of the variables is significant in the Encoding Rules described in Appendix B of this disclosure.

Adaptations isEqual

Two methods are equal according to their native attributes.

4.45 Miscellaneous Exception

> Object (Referenced)
> •   Exception (Unchanged)
> •   •   Programming Exception
> •   •   •   Miscellaneous Exception Class MiscellaneousException:

abstract interface (ProgrammingException)=( );

Subclasses

PatternInvalid:

interface (MiscellaneousException)=( );

A pattern's proposed text is syntactically in error.

SeedInvalid:

interface (MiscellaneousException)=( );

A random stream's proposed seed is not in the required range.

4.46 Modifier

> Object (Referenced)
> •   Primitive (Executed & Unchanged)
> •   •   Modifier

Class

Modifier:

sealed interface (Primitive)=( );

Adaptations isEqual

Two modifiers are equal iff their values are the same.

4.47 Named

Named

Class

Named:

abstract interface ( )=( . . . );

Construction initialize

Makes the responder's "name" attribute a newly assigned telename, a peer of the current process'.

Public Instance Attributes name:

sealed readonly protected Telename;

The responder's assigned telename.

4.48 Nil

> Object (Referenced)
> •   Primitive (Executed & Unchanged)
> •   •   Nil

Class

Nil:

sealed interface (Primitive)=( );

Adaptations isEqual

Any two nils are equal.

4.49 Number

> Object (Referenced)
> •   Primitive (Executed & Unchanged)
> •   •   Number (Ordered)

Class

Number:

abstract interface (Primitive, Ordered)=( . . . );

This class is sealed.

Public Instance Operations abs:

abstract op ( ) Number;

Returns the absolute value of the responder.

add:

abstract op (number: Number) Number;

Returns the arithmetic sum of the number ("number") and the responder.

ceiling:

abstract op ( ) Integer;

Returns the smallest integer that is arithmetically greater than or equal to the responder.

> divide:
> abstract op (divisor: Number) Number
>     throws DivisionByZero;

Returns the arithmetic quotient of the responder, the dividend, and the number (argument "divisor"), the divisor. An exception is thrown if the divisor is zero ("DivisionByZero").

floor:

abstract op ( ) Integer;

Returns the largest integer that is arithmetically less than or equal to the responder.

multiply:

abstract op (number: Number) Number;

Returns the arithmetic product of the number ("number") and the responder.

negate:

abstract op ( ) Number;

Returns the arithmetic negative of the responder.

round:

abstract op ( ) Integer;

Returns the single integer that is, or one of the two integers that are, arithmetically nearest to the responder.

subtract:

abstract op (subtrahend: Number) Number;

Returns the arithmetic difference between the responder, the minuend, and the number (argument "subtrahend"), the subtrahend.

truncate:

abstract op ( ) Integer;

Returns the integer formed by discarding the responder's fractional part so as to arithmetically truncate the responder toward zero.

Adaptations isAfter

One number is after another if the first is greater than the second.

isBefore

One number is before another if the first is less than the second.

isEqual

Two numbers are equal iff they are equal mathematically.

4.50 Object

Object (Referenced)

Class

Object:

abstract interface (Referenced)=( ... );

Construction initialize:

unprotected op ( );

Initializes the responder, a potential object, and makes the responder an object.

finalize:

unprotected op ( );

Requested as the responder is destroyed by operation "discard". A method for this operation finalizes the object with respect to the method's class.

Public Instance Attributes class:

sealed readonly Class;

Either the class of which the responder is an instance, if the responder is not class "Class", or class "Class", if the responder is indeed class "Class".

size:

sealed readonly Integer;

The responder's size in octets, i.e., the approximate amount of storage that destroying the responder would reclaim.

Public Instance Operations copy:

sealed op ( ) copied Object throws CopyUnavailable;

Returns either the responder, if the operation is requested using the only reference to the responder, or a copy of the responder, otherwise.

An exception is thrown if a copy if unavailable ("CopyUnavailable").

isEqual:

op (object: protected Object) Boolean;

Returns an indication of whether the object (argument "object") equals the responder.

A method shall escalate this operation if either the responder or the object is not a member of the class to which the method is native. The method native to class "Object" deems the two equal iff they are the same object.

select:
sealed op (associations: Object ...
/* protected Object; Executed */)
throws Exception, SelectorDulpicated;

From the pairs of objects and executed objects (arguments "associations"), selects and performs at most one executed object. The one selected gets access to the requester's frame and properties, not the responder's.

If an object equals the responder, the executed object paired with that object is selected. Otherwise, if any object is a nil, the executed object paired with that object is selected. Otherwise, no executed object is selected.

An exception is thrown if the selected executed object does so ("Exception") or two objects paired with executed objects are equal ("SelectorDuplicated").

Internal Instance Operations getAttribute:
sealed op (identifier: Identifier) Object
throws ClassUnavailable, FeatureUnavailable;

Returns the responder's attribute denoted by the identifier (argument "identifier"). The attribute follows the passage prescribed for the attribute.

An exception is thrown if the class the identifier's qualifier denotes is absent ("ClassUnavailable") or the identifier denotes no attribute of the responder that is accessible to the requester ("FeatureUnavailable").

getClass:
sealed private op (identifier: Identifier!) Class
throws ClassUnavailable;

Returns the class the identifier (argument "identifier") denotes to the current method.

An exception is thrown if the class is absent ("ClassUnavailable").

getProperty:
sealed private op (identifier: Identifier!) Object
throws PropertyUndefined;

Returns the responder's property that is both denoted by the identifier (argument "identifier") and native to the class to which the current method is native. The returned reference is protected iff the responder is protected.

An exception is thrown if the identifier is invalid ("PropertyUndefined").

getVariable:
sealed private op (identifier: Identifier!) Object
throws VariableUndefined;

Returns the current method's variable the identifier (argument "identifier") denotes.

An exception is thrown if the identifier is invalid ("VariableUndefined").

setAttribute:
sealed unprotected op (identifier: Identifier;
attribute: Object)
throws ArgumentInvalid, AttributeReadOnly,
ClassUnavailable, FeatureUnavailable;

Makes the object (argument "attribute") the responder's attribute denoted by the identifier (argument "identifier"). The operation first discards the attribute if it exists. The object follows the passage prescribed for the attribute.

An exception is thrown if the object violates the attribute's constraint ("ArgumentInvalid"), the attribute is read-only ("AttributeReadOnly"), the class the identifier's qualifier denotes is absent ("ClassUnavailable"), or the identifier denotes no attribute of the responder that is accessible to the requester ("FeatureUnavailable").

setProperty:
sealed private unprotected op (identifier:
Identifier!;
property: Object)
throws PropertyUndefined;

Makes the object (argument "property") the responder's property that is both denoted by the identifier (argument "identifier") and native to the class to which the current method is native. The operation first discards the property if the property exists.

An exception is thrown if the identifier is invalid ("PropertyUndefined").

setVariable:
    sealed private unprotected op (identifier:
Identifier!;
        variable: Object)
    throws VariableUndefined;

Makes the object (argument "variable") the current method's variable the identifier (argument "identifier") denotes. The operation first discards the variable if the variable exists.

An exception is thrown if the identifier is invalid ("VariableUndefined").

4.51 Octet

Object (Referenced)
•   Primitive (Executed & Unchanged)
• •   Octet (Ordered)

Class

Octet:

sealed interface (Primitive, Ordered)=( );
Adaptations isAfter

One octet is after another iff two of their like-numbered bits are unequal and the first octet's highest-numbered such bit is after the second's.

isBefore

One octet is before another if two of their like-numbered bits are unequal and the first octet's highest-numbered such bit is before the second's.

isEqual

Two octets are equal iff neither is before the other.
Conversions

Bit

A bit produces an octet whose Bit 0 equals the bit and whose Bits 1–7 are zero.

Character

A character whose Unicode code is an integer in [0, 127] produces the octet that converting that integer produces.

Integer

An integer in the range of [−128, 127] produces the octet that forms the integer's twos' complement representation. Bit 7 represents −128, while Bit "n" represents $2^n$, for each "n" in the range of [0, 6].

OctetString

An octet string with one item produces an octet equal to that item.

4.52 Octet String

Object (Referenced)
•   Collection
• •   List (Ordered)
• • •   Constrained List (Constrained)
• • • •   Octet String (Executed)

Class

OctetString:
  sealed interface (ConstrainedList [Octet], Executed)
    = (...);

Construction initialize:
  unprotected op (segments: Object ...
    /* Octet!protected OctetString! */);

Makes the responder a concatenation of the segments (argument "segments") whose positions in the responder increase from left to right.

Adaptations constraint

The attribute is sealed. The attribute's "ofClass", "classId", "isInstance", "isOptional", and "passage" attributes are class "Octet", the identifier of class "Octet", "true", "false", and "byCopy", respectively.

isAfter

One octet string is after another as if all-zero octets were first prepended to the shorter octet string to make the shorter octet string equal in length to the longer octet string.

isBefore

One octet string is before another as if all-zero octets were first prepended to the shorter octet string to make the shorter octet string equal in length to the longer octet string.

Conversions

Bit

A bit produces the octet string that results from first converting the bit to an octet, and then converting the octet to an octet string.

BitString

A bit string whose length is "n" produces an octet string whose length is "i". "n" is in the range [8i, 8i+7]. Bit "j" of the octet at position "k" of the octet string either equals the bit at position (8k−j) of the bit string, if (8k−j)≤n, or is zero, otherwise.

Character

A character that can be produced by converting some octet string whose length is two produces that octet string.

Integer

An integer in the range $[-2^{8n-1}, 2^{8n-1})$, for an integer "n" and none smaller, produces an octet string whose length is "n". A twos' complement representation is used, wherein Bit 7 of the octet whose position is one represents $-2^{8n-1}$, while every other Bit "j" of the octet at position "i" in the octet string represents $2^{8(n-i)+j}$.

Octet

An octet produces an octet string whose only item equals that octet.

String

A string produces a "characters" token for encoding the string in a binary telescript.

4.53 Operation

Object (Referenced)
•   Feature
• •   Operation

Class

Operation:

sealed interface (Feature)=( . . . );
Construction initialize:
  unprotected op (arguments: List [Constraint]!Nil;
    result: Constraint!Nil;
    isPublic: Boolean!Nil;
    exceptions: Set [Identifier!]!Nil);

Makes the responder's attributes the like-named arguments (arguments "arguments", "exceptions", "isPublic", and "result") If argument "exceptions" or argument "isPublic" is a nil, however, the corresponding attribute is cleared or made "false", respectively.

Public Instance Attributes arguments:

List [Constraint]!Nil;

Either the constraints upon the zero or more arguments of the operation that the responder defines, if they do not vary in number, or a nil, otherwise, in which case each is passed by reference and can be any object but a mark. The list's first item constrains the argument on top of the stack.

result:

Constraint|Nil;

Either the constraint upon the result of the operation that the responder defines, if the operation has a result, or a nil, otherwise.

Adaptations isEqual

Two operation definitions are equal according to their attributes native to feature and operation definitions.

4.54 Ordered

Ordered

Class

Ordered:

abstract interface ( )=( . . . );

Public Instance Operations isAfter:

abstract op (object: protected Ordered) Boolean;

Returns an indication of whether the responder is after the object (argument "object").

A method shall escalate this operation if either the responder or the object is not a member of the class to which the method is native.

isBefore:

abstract op (object: protected Ordered) Boolean;

Returns an indication of whether the responder is before the object (argument "object").

A method shall escalate this operation if either the responder or the object is not a member of the class to which the method is native.

max:

op (object: Ordered) Ordered;

Returns either the responder, if the responder is after the object (argument "object"), or the object, otherwise.

min:

op (object: Ordered) Ordered;

Returns either the responder, if the responder is before the object (argument "object"), or the object, otherwise.

4.55 Package

Object (Referenced)
    •    Collection
    •    •    Set (Verified)
    •    •    •    Constrained Set (Constrained)
    •    •    •    •    Package (Cited & Interchanged)

Class

Package:
    interface (ConstrainedSet [Class], Cited, Interchanged)
        = (...);

Construction initialize:
    unprotected op (title: Identifier!;
        majorEdition, minorEdition:
        Integer;items: Class ...)
    throws ItemDuplicated, ProcessNotPeer;

Makes the responder's items the classes (argument "items") and the responder's "citation" attribute a citation whose "author" attribute is the current process' assigned telename and whose other attributes are the like-named arguments (arguments "majorEdition", "minorEdition", and "title").

An exception is thrown if two classes are equal ("ItemDuplicated") or the current process is not a class' peer ("ProcessNotPeer").

Adaptations constraint

The attribute is sealed. The attribute's "ofClass", "classId", "isInstance", "isOptional", and "passage" attributes are class "Class", the identifier of class "Class", "true", "false", and "byCopy", respectively.

4.56 Pattern

Object (Referenced)
    •    Pattern (Ordered)

Class

Pattern:

interface (Object, Ordered)=( . . . );

Construction initialize:
    unprotected op (text: copied String!)
    throws PatternInvalid;

Makes the responder's text the string (argument "text").

An exception is thrown if the proposed text is invalid ("PatternInvalid").

Public Instance Operations find:
    op (string: protected String!; position: Integer|Nil)
        List [Integer]|Nil
    throws PositionInvalid;

Searches the string (argument "string") for the first and longest possible substring that matches the responder. The search begins either at the prescribed position (argument "position"), if an integer is supplied, or at position one, otherwise.

The operation returns either a nil, if the operation finds no match, or a list of two integers, otherwise. In the latter case, the first integer is the position in the string of the first character in the match. The second integer is one greater than the position in the string of the last character in the match.

An exception is thrown if the proposed position is invalid as such, more specifically, less than or equal to zero ("PositionInvalid").

Note: The two integers in the list are suitable as the arguments of operation "substring".

substitute:
    op ( repetitions: Integer;
        string: unprotected String!;
        replacement: protected String!)
        Integer;

Searches the first string (argument "string"), beginning at position one, for the longest possible substrings that match the responder, and modifies the string by replacing each match with a copy of the second string (argument "replacement").

The operation finds either all matches, if the integer (argument "repetitions") is zero, or at most that many, otherwise. Successive matches are non-overlapping. If one match is of zero length, the search for the next begins at the following position. The operation returns the number of matches actually found.

The replacement string can be tailored for each individual replacement. Wherever an ampersand ("&") appears in the replacement string without being immediately preceded by a reverse slash ("\"), a copy of the substring to be replaced is itself substituted for the ampersand, and the modified replacement string then is substituted for the substring.

Adaptations isEqual

Two patterns are equal according to their texts.

Conversions
String
A string that is valid as the text of a pattern produces that pattern.

4.57 Permit

Object (Referenced)
• Permit (Ordered)

Class
Permit:
interface (Object, Ordered)=( ... );
Construction
initialize:
unprotected op (age, charges, extent: Integer¦Nil);
Makes the responder's attributes the like-named arguments (arguments "age", "charges", and "extent"). Makes every other native attribute of the responder either "true", if the attribute is a boolean, or a nil, otherwise.
Public Instance Attributes
age:
Integer¦Nil;
Either the maximum permitted age, measured in seconds, of the responder's subject, if a maximum is imposed, or a nil, otherwise.
authenticity:
Integer¦Nil;
Either the maximum permitted authenticity of the responder's subject, if a maximum is imposed, or a nil, otherwise.
charges:
Integer¦Nil;
Either the maximum permitted charges, measured in teleclicks, of the responder's subject, if a maximum is imposed, or a nil, otherwise.
extent:
Integer¦Nil;
Either the maximum permitted size measured in octets of the responder's subject, if a maximum is imposed, or a nil, otherwise.
priority:
Integer¦Nil;
Either the maximum permitted priority of the responder's subject, if a maximum is imposed, or a nil, otherwise.
canCharge:
Boolean;
Whether the responder's subject is permitted to request operation "charge".
canCreate:
Boolean;
Whether the responder's subject is permitted to request operation "new" of a subclass of class "Process".
canDeny:
Boolean;
Whether the responder's subject is permitted to set the "nativePermit" attribute of a peer process so as to decrease the peer process' capabilities.
Whether, coincidentally, the responder's subject, if otherwise entitled to do so, is permitted to so set a process' "regionalPermit" or "localPermit" attribute.
canGo:
Boolean;
Whether the responder's subject is permitted to request operation "go".

canGrant:
Boolean;
Whether the responder's subject is permitted to set the "nativePermit" attribute of a peer process so as to increase the peer process' capabilities.
Whether, coincidentally, the responder's subject, if otherwise entitled to do so, is permitted to so set a process' "regionalPermit" or "localPermit" attribute.
canRestart:
Boolean;
Whether the responder's subject is permitted to be restarted.
canSend:
Boolean;
Whether the responder's subject is permitted to request operation "send".
Public Instance Operations
intersection:
op (permit: Permit) Permit;
Returns the intersection of the argument (argument "permit") and the responder.
Adaptations
isAfter
One permit is after another iff they are not equal, no native attribute of the first is before that of the second, and at least one native attribute of the first is after that of the second.
isBefore
One permit is before another if they are not equal, no native attribute of the first is after that of the second, and at least one native attribute of the first is before that of the second.
isEqual
Two permits are equal according to their native attributes.

4.58 Petition

Object (Referenced)
Petition
Class
Petition:
interface=( ... );
Construction initialize:
unprotected op (agentName: Telename¦Nil;
    agentClass: Citation¦Nil;
    maximumWait: Integer¦Nil);

Makes the responder's native attributes the like-named arguments (arguments "agentClass", "agentName", and "maximumWait").
Public Instance Attributes
agentClass:
Citation¦Nil;
Either a citation to the class, a subclass of class "Agent", of which the petitionee of the meeting the responder defines is a member, if such a constraint is imposed, or a nil, otherwise.
agentName:
Telename¦Nil;
Either a telename of the petitionee of the meeting the responder defines, if such a constraint is imposed, or a nil, otherwise.
maximumWait:
Integer¦Nil;
Either the maximum permitted difference in seconds between the time at which the meeting the responder defines shall be arranged and the time at which the meeting is requested, if such a constraint is imposed, or a nil, otherwise. The integer, if supplied, is non-negative.

Adaptations isEqual

Two petitions are equal according to their native attributes.

4.59 Petitioned

Petitioned

Class

Petitioned:

abstract interface ( )=( . . . );

System Instance Operations

> meeting:
> unprotected op (contact: Contact;
>     petition: protected Petition)
>     throws MeetingDenied;

Successfully performed before the subject of the contact (argument "contact") meets the responder using the petition (argument "petition"). The contact's subject attribute is a nil while the operation is being performed, and is made the "subject" if the operation succeeds.

An exception is thrown if the meeting is denied ("MeetingDenied"). The method for this operation native to the class throws an exception.

parting:

unprotected op (contact: Contact);

Requested after the subject of the contact (argument "contact") has met with the responder. Before the operation is requested, the Engine makes the contact's "subject" attribute a nil. The method native to class "Petitioned" has no effect.

4.60 Place

Object (Referenced)
- Process (Named)
  - Place (Unmoved)

Class

Place:

abstract interface (Process, Unmoved)=( . . . );

Construction initialize

Makes the responder's "address" attribute a newly assigned telename, which is a peer of the current process', and clears the responder's "publicClasses" attribute.

Public Instance Attributes address:

sealed readonly protected Teleaddress;

The responder's assigned teleaddress.

publicClasses:

sealed readonly Set [Cited];

The set of classes, packages, or both that the responder hereby makes accessible to its occupants. The attribute is either an unprotected reference, if the requester is the place, or a protected reference, otherwise.

Public Instance Operations

> terminate:
> sealed unprotected op
>     (occupant: protected Telename) Boolean
>     throws ProcessNotCurrent, ProcessNotPeer, StateImproper;

Terminates any occupant of the responder having the assigned telename (argument "occupant") and returns an indication of whether there was such a process. The process is terminated by forcibly exhausting the process' native permit.

An exception is thrown if the responder is not the current place ("ProcessNotCurrent"), the current process is not the occupant's peer ("ProcessNotPeer"), or the requester's state precludes operation "terminate" ("StateImproper").

System Instance Operations

> entering:
> unprotected op (contact: Contact;
>     permit: protected Permit;
>     ticket: protected Ticket|Nil)
>     throws OccupancyDenied;

Successfully performed before the subject of the contact (argument "contact") occupies the responder. The contact's "subject" attribute is a nil when the operation is requested, but is made the subject if the operation succeeds.

The subject is either an agent arriving with the ticket (argument "ticket"), if one is supplied, or a process being created in the responder, if a nil is supplied. The permit (argument "permit") is the subject's proposed initial local permit.

After this operation succeeds, if the responder is a contacted object, the Engine includes the contact in the responder's "contacted" attribute.

An exception is thrown if the contact's subject is denied occupancy ("OccupancyDenied"). The method for this operation native to the class throws an exception.

Note: If a ticket is supplied, the permit equals and, therefore, duplicates the ticket's "destinationPermit" attribute.

> exiting:
> unprotected op (contact: Contact;
>     permit: protected Permit;
>     ticket: protected Ticket|Nil);

Requested once the subject of the contact (argument "contact") no longer occupies the responder. The contact's "subject" attribute is a nil when the operation is requested. The method for this operation native to the class has no effect.

The subject is either an agent leaving the responder with the ticket (argument "ticket"), if one is supplied, or a process being destroyed within the responder, if a nil is supplied. The permit (argument "permit") is the subject's current local permit.

After this operation is performed, if the responder is a contacted object, the Engine excludes the contact from the responder's "contacted" attribute.

4.61 Primitive

Object (Referenced)
- Primitive (Executed & Unchanged)

Class

Primitive:

abstract interface (Object, Executed, Unchanged)=( . . . );

This class is sealed.

Construction

> initialize:
> unprotected op ( )
>     throws FeatureUnavailable;

Throws an exception ("FeatureUnavailable").

4.62 Primitive Exception

Object (Referenced)
- Exception (Unchanged)
  - Programming Exception
    - Primitive Exception Class PrimitiveException:

abstract interface (ProgrammingException)=( );

195

Subclasses

DivisionByZero:

interface (PrimitiveException)=( );
A divisor is zero.

4.63 Procedure

Object (Referenced)
    •       Primitive (Executed & Unchanged)
    •   •       Procedure Class Procedure:

sealed interface (Primitive)=( . . . );
Adaptations isEqual

Two procedures are equal if they are equal in length and their like-positioned items are equal.

Conversions

List

A list whose items are executed objects produces a procedure of the same length, each of whose items is a copy of that in the same position.

OctetString

An octet string that is a binary telescript produces a procedure whose items are the objects the binary telescript encodes.

String

A string that is a character telescript produces a procedure whose items are the objects the character telescript encodes.

4.64 Process

Object (Referenced)
    •       Process (Named)

Class

Process:

abstract interface (Object, Named, Uncopied)=( . . . );
This class is sealed.

Construction initialize:
    op ( nativePermit: copied Permit;
            privateClasses: Set(Cited)|Nil)
    throws PermitViolated;

Makes the responder's "name" attribute a newly assigned telename, a peer of the current process'; the responder's attribute the like-named argument (argument "nativePermit"); the responder's "privateClasses" attribute either the like-named argument (argument "privateClasses"), if the argument is not a nil, or the like-identified attribute of the current process, otherwise; and the responder's contacts attribute a cleared set.

An exception is thrown if the current process' effective permit forbids operation "new", that permit is otherwise inadequate, or operation "entering" fails ("PermitViolated"). Note: The method for this operation native to a subclass of class "Process" sees the creating process, not the created one, as the current process.

Public Instance Attributes brand:
    sealed readonly protected Object
    throws ProcessNotPeer;

The responder's brand.

196

An exception is thrown if the current process is not the responder's peer ("ProcessNotPeer").

localPermit:
    sealed copied Permit
    throws FeatureUnavailable, PermitViolated;

The responder's local permit.

An exception is thrown if either the requester is neither the responder nor the place the responder occupies ("FeatureUnavailable") or an attempt is made to set the attribute in a way which is inconsistent with the Process Model ("PermitViolated").

nativePermit:
    sealed copied Permit
    throws FeatureUnavailable, PermitViolated;

The responder's native permit.

An exception is thrown if either the requester is neither the responder nor a peer thereof ("FeatureUnavailable") or an attempt is made to set the attribute in a way which is inconsistent with the Process Model ("PermitViolated").

permit:

sealed readonly copied Permit;
The responder's effective permit.

regionalPermit:
    sealed copied Permit
    throws FeatureUnavailable, PermitViolated;

The responder's regional permit.

An exception is thrown if either the requester is neither the responder nor an engine place ("FeatureUnavailable") or an attempt is made to set the attribute in a way inconsistent with the Process Model ("PermitViolated").

privateClasses:
    sealed readonly Set [Cited]
    throws ProcessNotPeer;

The set of classes, packages, or both the responder holds.

An exception is thrown if the current process is not the responder's peer ("ProcessNotPeer").

Public Instance Operations charge:
    sealed op (charges: Integer)
    throws PermitInadequate, PermitViolated;

Increases the responder's actual charges by the integer amount (argument "charges").

An exception is thrown if the responder's effective permit would be exhausted ("PermitInadequate") or the current permit forbids operation "charge" ("PermitViolated").

restrict:
    sealed op (procedure: Procedure; permit: protected Permit)
    throws Exception, PermitViolated, ProcessNotCurrent;

Performs the procedure (argument "procedure") under the temporary permit (argument "permit") and the resulting effective permit of the current process, to which the procedure's charges accrue.

An exception is thrown if the procedure does so ("Exception"), the procedure's performance violates the effective permit designated above ("PermitViolated"), or the requester is not the current process ("ProcessNotCurrent").

sponsor:
    sealed op (procedure: Procedure; permit: protected Permit)
    throws Exception, PermitViolated, ProcessNotCurrent;

Performs the procedure (argument "procedure") under the temporary permit ("permit") and the resulting effective permit of the responder's owner, to which the procedure's charges accrue. The procedure gets access to the requester's frame and properties, not the responder's.

An exception is thrown if the procedure does so ("Exception"), the procedure's performance violates the effective permit designated above ("PermitViolated"), or the requester is not the current process ("ProcessNotCurrent").

Private Instance Attributes age:

sealed readonly Integer;
The responder's actual age in seconds.

charges:

sealed readonly Integer;
The responder's actual charges in teleclicks.

priority:

sealed Integer¦Nil;
The responder's actual priority, i.e., the responder's chosen priority.

Private Instance Operations wait:

unprotected op (seconds: Integer);
Blocks the responder until the requested number of seconds (argument "seconds") have elapsed. If the integer is negative, the operation has no effect.

System Instance Operations live:
abstract unprotected op (cause: Exception¦Nil)
throws Exception;

Requested with a nil (argument "cause") to start the responder after its creation. If the "canRestart" attribute of the permit the responder holds is "true", the operation is requested with an exception (argument "cause") to restart the responder if the responder fails due to that exception.

An exception is thrown if the responder fails to catch the exception ("Exception").

restricted:
op (permit: Identifier; isRelocated: Boolean)
PermitReduced¦Nil;

Requested if the responder's attribute "nativePermit", "regionalPermit", or "localPermit", once set, is set again so as to reduce the responder's capabilities. The identifier (argument "permit") is that of whichever of these three attributes was set. The Engine throws the operation's result in the responder's thread if the result is not a nil. The method native to this class simply returns a nil.

The boolean (argument "isRelocated") indicates whether the event leading the Engine to request the operation also led the Engine to transport the responder to a place, e.g., a purgatory, other than either the one the responder occupied or, if the operation is requested during the performance of operation "go" or "send", the responder's destination. In the latter case, operation "go" or "send" throws the present operation's result if not a nil.

Note: The responder's ability to perform this operation, when the responder's newly set permit is severely restrictive, is limited by the rules of process termination.

Adaptations copy

A member of "Copy Unavailable" is thrown.

4.65 Process Exception

Object (Referenced)
• Exception (Unchanged)
• • Programming Exception
• • • Process Exception Class ProcessException:

abstract interface (ProgrammingException)=( );

Subclasses

PermitInadequate:

interface (ProcessException)=( );

One process tries to charge another so as to exhaust the latter's effective permit.

ConditionUnavailable:

interface (ProcessException)=( );

A process manipulates the condition of a resource without exclusive use of the resource.

ConditionUndefined:

interface (ProcessException)=( );

An identifier purporting to denote a resource's condition does not.

PermitExhausted:

interface (ProcessException)=( );

A process exhausts the permit that the process holds.

PermitViolated:

interface (ProcessException)=( );

A process violates the permit that the process holds.

ProcessNotCurrent:

interface (ProcessException)=( );

A process requests a feature of other than the current member of a class.

ProcessNotPeer:

interface (ProcessException)=( );

An object manipulates a process that is not the object's peer.

ResourceUnavailable:

interface (ProcessException)=( );

A resource's use cannot be obtained in the number of seconds requested.

StateImproper:

interface (ProcessException)=( );

A process requests a feature while in a state that precludes the request.

4.66 Programming Exception

Object (Referenced)
• Exception (Unchanged)
• • Programming Exception

Class

ProgrammingException:

abstract interface (Exception)=( );

4.67 Qualified Identifier

Object (Referenced)
• Primitive (Executed & Unchanged)
• • Identifier (Ordered)
• • • Qualified Identifier Class QualifiedIdentifier:

sealed interface (Identifier)=( );

4.68 Random Stream

Object (Referenced)
- Stream
  - Random Stream

Class

RandomStream:

interface (Stream [Integer])=( . . . );
Construction

> initialize:
> unprotected op (seed: Integer)
> throws SeedInvalid;

Makes the responder's seed the integer (argument "seed"), makes the responder's "current" attribute a nil, and leaves the responder's "next" attribute undefined.

An exception is thrown if the proposed seed is invalid as such ("SeedInvalid").

Adaptations current

This attribute is an integer.

next

This attribute is an integer, and not a nil.

4.69 Real

Object (Referenced)
- Primitive (Executed & Unchanged)
  - Number (Ordered)
    - Real Class Real:

sealed interface (Number)=( );
Adaptations abs

The result is a real.

add

The result is a real.

divide

The result is a real.

multiply.

The result is a real.

negate

The result is a real.

subtract

The result is a real.

Conversions

Bit

A bit produces the result of first converting the bit to an integer, and then converting the integer to a real.

BitString

A bit string produces the result of first converting the bit string to an integer, and then converting the integer to a real.

Boolean

A boolean produces the result of first converting the boolean to an integer, and then converting the integer to a real.

Character

A character produces the result of first converting the character to an integer, and then converting the integer to a real.

Integer

An integer produces the real that is equal to the integer arithmetically.

Octet

An octet produces the result of first converting the octet to an integer, and then converting the integer to a real.

OctetString

An octet string produces the result of first converting the octet string to an integer, and then converting the integer to a real.

String

A string that obeys the syntactic rules for the Real token in Character Telescript produces the corresponding real.

4.70 Referenced

Referenced

Class

Referenced:

abstract interface ( )=( . . . );
This class is sealed.

Public Instance Attributes isProtected:

sealed readonly Boolean;
Whether the reference to the responder is protected.

Public Instance Operations discard:

sealed op ( );
Destroys the responder if no references to the responder remain.

isSame:

sealed op (reference: protected Referenced) Boolean;
Returns an indication of whether the referenced object (argument "reference") is the responder.

protect:

sealed op ( ) protected Referenced;
Returns a protected reference to the responder.

ref:

sealed unprotected op ( );
Pushes onto the stack two references to the responder, both protected if the reference used to request the operation is itself protected.

4.71 Resource

Object (Referenced)
- Resource

Class

Resource:

interface=( . . . );
Construction

> initialize:
> unprotected op (condition: Identifier!|Nil;
>     conditions: copied Set [Identifier!]|Nil)
> throws ConditionUndefined;

Makes the responder's native attributes the like-named arguments (arguments "condition" and "conditions"). If either argument is a nil, both must be nils, and in that eventuality, the "conditions" attribute comprises one identifier which equals the "condition" attribute. The identifier in question is undefined.

An exception is thrown if the individual condition, i.e. the "condition" attribute, is not in the set, i.e. not in the "conditions" attribute ("ConditionUndefined").

Public Instance Attributes

> condition:
> Identifier!
> throws ConditionUnavailable;

The identifier for the responder's condition.

An exception is thrown if the current process attempts to set the attribute and lacks exclusive use of the responder ("ConditionUnavailable").

conditions:
readonly protected Set [Identifier!];
The identifiers for the responder's possible conditions.
Public Instance Operations use:
    sealed unprotected op (procedure: Procedure;
        exclusive: Boolean|Nil;
        maximumWait: Integer|Nil;
        conditions: copied Set [Identifier!]|Nil)
Boolean
    throws ConditionUndefined, Exception,
ResourceUnavailable;

Obtains use of the responder, performs the procedure (argument "procedure"), and then relinquishes the responder, even if the procedure fails. The procedure gets access to the requester's frame and properties, not the responder's.

The use is exclusive if the boolean (argument "exclusive") is both present and "true". If a set of identifiers (argument "conditions"), not a nil, is supplied, the use is granted only when the responder is in one of the conditions the identifiers denote.

If an integer (argument "maximumWait") is supplied, the operation waits for use of the responder no more than that many seconds. If a nil is supplied instead, the operation waits as long as required, possibly forever. The operation's result indicates whether, in the former case, the responder remained unavailable after the indicated number of seconds.

An exception is thrown if the set of conditions is cleared or does not equal a subset of the responder's "conditions" attribute ("ConditionUndefined"), the procedure throws an exception ("Exception"), or the responder's use cannot be obtained in the number of seconds requested ("ResourceUnavailable").

4.72 Selector

Object (Referenced)
•    Primitive (Executed & Unchanged)
•   •   Selector

Class
Selector:
sealed interface (Primitive)=( );
Adaptations
isEqual
Two selectors are equal if their values are the same.

4.73 Set

Object (Referenced)
•    Collection
•   •   Set (Verified)

Class

Set:
interface [itemClass: Class]
    (Collection [itemClass], Verified) = (...);

Parameterized by the class (argument "itemClass") of which each item of each member of the subject class is itself a member.
Construction initialize:
    unprotected op (items: itemClass ...)
    throws ItemDuplicated, ItemInvalid;

Makes the responder's items the objects (argument "items").

An exception is thrown if two proposed items are equal ("ItemDuplicated") or a proposed item is invalid as such ("ItemInvalid").

Public Instance Operations
difference:
    unprotected op (set: protected Set [itemClass]);
Excludes from the responder and discards every item that equals an item of the set (argument "set").
intersection:
    unprotected op (set: protected Set [itemClass]);
Excludes from the responder and discards every item that does not equal an item of the set (argument "set").
union:
    unprotected op (set: protected Set [itemClass]);
Includes in the responder a reference to each item of the set (argument "set") that does not equal an existing item of the responder.
Adaptations
include
An object is included in a set as a new item by first excluding and discarding any existing item equal to the object.
verify
A set is consistent if no two of the set's items are equal.

4.74 Stack

Object (Referenced)
•    Collection
•   •   List (Ordered)
•   •   •   Stack

Class
Stack:
interface [itemClass: Class] (List [itemClass])=( . . . );
Parameterized by the class (argument "itemClass") of which each item of each member of the subject class is itself a member.
Public Instance Operations pop:
    unprotected op ( ) itemClass
    throws StackDepleted;

Removes from the responder and returns its top item.
An exception is thrown if the responder is cleared ("StackDepleted").
push:
    unprotected op (item: itemClass);
Adds the object (argument "item") to the responder as a new item at its top.
pushItems:
    unprotected op (items: protected List [itemClass]);
Pushes onto the responder references to the items of the list (argument "items"). A reference to the item at position one of the list is placed on top of the responder.

roll:
    unprotected op (shifts, items: Integer)
    throws ArgumentInvalid, StackDepleted;

Shifts the topmost items of the responder.
The number of items, "I", participating in the shift is given by one integer (argument "items") which shall be non-negative. The number of positions, "P", that each participating item is to be shifted is given by another integer (argument "shifts") which may be either positive or negative, "P" being its absolute value. The participating items are shifted toward either the responder's top, if this second integer is positive, or the responder's bottom, otherwise.

To shift the participating items one position toward the responder's top is to change the position of the topmost item to "I" and to decrease by one the position of each of the other participating items.

To shift the participating items one position toward the responder's bottom is to make topmost the item whose position is "I" and to increase by one the position of each of the other participating items.

An exception is thrown if the integer giving "I" is negative ("ArgumentInvalid") or the responder's length is less than "I" ("StackDepleted").

> swap:
> unprotected op ( )
> throws StackDepleted;

Transposes the items at positions one and two of the responder.

An exception is thrown if the responder's length is less than two ("StackDepleted").

4.75 Stream

> Object (Referenced)
> •   Stream

Class

Stream:

abstract interface [itemClass: Class]=( . . . );

Parameterized by the class (argument "itemClass") of which each item of each member of the subject class is itself a member.

Public Instance Attributes current:

abstract readonly itemClass!Nil;

Either the item the responder produced last, if attribute "next" of the responder has been queried but has not returned a nil having produced all of the responder's items, or a nil, otherwise.

isDone:

abstract Boolean;

Whether the responder has produced all of its items.

> next:
> abstract readonly itemClass!Nil
> throws ReferenceProtected;

Either the next item of the responder, if the responder has not produced all of its items already, or a nil, otherwise. The responder produces another item each time this operation is requested.

An exception is thrown if the responder is protected ("ReferenceProtected").

4.76 String

> Object (Referenced)
>   Collection
>   •   List (Ordered)
>   •   •   Constrained List (Constrained)
>   •   •   •   String (Cased & Executed)

Class

String:
sealed interface
    (ConstrainedList [Character], Cased, Executed) =
(...);

Construction

> initialize:
> unprotected op (segments: Object ...
> /* Character!protected String!]*/);

Makes the responder a concatenation of the segments (argument "segments") whose positions in the responder increase from left to right.

Public Instance Operations

> substring:
> op (initialPosition, beyondFinalPosition: Integer)
> copied String
> throws PositionInvalid;

Returns a copy of the substring of the responder that comprises the characters at the positions in the range ["initialPosition", "beyondFinalPosition").

An exception is thrown if an asserted position is invalid as such ("PositionInvalid").

Adaptations constraint

The attribute is sealed. The "constraint" attribute's "ofClass", "classId", "isInstance", "isOptional", and "passage" attributes are class "Character", the identifier of class "Character", "true", "false", and "byCopy", respectively.

isAfter

One string is after another as if enough characters were first appended to the shorter string to make the shorter string equal in length to the longer string, each appended character being that whose Unicode code is the integer zero.

isBefore

One string is before another as if enough characters were first appended to the shorter string to make the shorter string equal in length to the longer string, each appended character being that whose Unicode code is the integer zero.

Conversions

Bit

A bit that can be converted to a character that can be converted to a string produces that string.

CalendarTime

A calendar time produces a string describing the time represented by the calendar time.

Character

A character produces a string whose only item equals the character.

Identifier

An identifier produces a string that equals the identifier's text.

Integer

An integer produces a string that obeys the syntactic rules for the "Integer" token in a character telescript.

Pattern

A pattern produces a string that equals the pattern's text.

Real

A real produces a string that obeys the syntactic rules for the "Real" token in a character telescript.

Telenumber

A telenumber produces the concatenation of a plus sign ("+"), the telenumber's country attribute, a space (" "), and the telenumber's "telephone" attribute.

Time

A time produces the result of first converting the time to a calendar time, and then converting the calendar time to a string.

4.77 Teleaddress

> Object (Referenced)
> •   Teleaddress

Class

Teleaddress:

interface=( . . . );

Construction initialize:
unprotected op (provider: OctetString!!Nil;
   location: String!!Nil);

Clears the responder's "routingAdvice" attribute and makes its other native attributes the like-named arguments (arguments "location" and "provider"). If the latter argument is a nil, however, the "provider" attribute is made that of the current place's assigned teleaddress.

Public Instance Attributes location:

String!!Nil;

Either the string denoting the location of the places denoted by the responder, if the latter is assigned or such a constraint is imposed, or a nil, otherwise.

provider:

OctetString!;

The octet string denoting, as does a telename's "authority" attribute, the provider of the region containing the places the responder denotes.

routingAdvice:

List [OctetString!];

Octet strings denoting, as does the "provider" attribute, and in order of decreasing preference, the providers of transit regions.

Adaptations isEqual

Two teleaddresses are equal according to their native attributes.

4.78 Telename

Object (Referenced)
- Telename

Class

Telename:

interface=( . . . );

Construction initialize:

unprotected op (authority, identity: OctetString!!Nil);

Makes the responder's native attributes the like-named arguments (arguments "authority" and "identity"). If the former argument is a nil, however, the "authority" attribute is made that of the current process' assigned telename.

Public Instance Attributes authority:

OctetString!;

The octet string denoting the authority of the named objects the responder denotes.

identity:

OctetString!!Nil;

Either the octet string denoting the identity of the named object denoted by the responder, if the latter is assigned or such a constraint is imposed, or a nil, otherwise.

Adaptations isEqual

Two telenames are equal according to their native attributes.

4.79 Telenumber

Object (Referenced)
- Telenumber

Class

Telenumber:

interface=( . . . );

Construction initialize:
unprotected op (countryAndTelephone: String!;
   extension: String!!Nil);

Makes the responder's "extension" attribute the like-named argument (argument "extension") and the responder's other native attributes those of a telenumber that can be converted to the "countryAndTelephone" argument.

Public Instance Attributes country:

String!;

The code that CCITT assigns to the country or other geographical area in which the instrument the responder denotes is located [CCITT]. Each character of the string is a numeral ("0"–"9").

extension:

String!!Nil;

Either the telephone extension that unambiguously identifies the instrument the responder denotes, if the responder's "country" and "telephone" attributes do not do that themselves, or a nil, otherwise. Each character of the string is a numeral ("0"–"9"), a hyphen ("-"), or a space (" ").

telephone:

String!;

The number assigned to the instrument the responder denotes by the country or other geographical area the "country" attribute denotes. Each character of the string is a numeral ("0"–"9"), a hyphen ("-"), or a space (" ").

Adaptations isEqual

Two telenumbers are equal according to their native attributes, which are equal as if all hyphens ("-") and spaces (" ") were first dropped from them.

Conversions

String

A string that can be produced by converting some telenumber produces that telenumber, whose "extension" attribute is a nil.

4.80 Ticket

Object (Referenced)
- Ticket Stub
  - Ticket

Class

Ticket:

interface (TicketStub)=( . . . );

Construction initialize:
unprotected op (destinationName: Telename!Nil;
   destinationAddress: Teleaddress!Nil;
   destinationclass: Citation!Nil;
   maximumWait: Integer!Nil;
   way: Way!Nil;
   travelNotes: Object!Nil);

Makes the responder's "desiredWait" and "destinationPermit" attributes nils, the responder's other attributes the like-named arguments (arguments "destinationAddress", "destinationClass", "destinationName", "maximumWait", "travelNotes", and "way", respectively).

Public Instance Attributes desiredWait:

Integer!Nil;

Either the maximum desired difference in seconds—nonnegative—between the time the trip the responder defines should be completed and the time the trip is requested, if such a constraint is imposed, or a nil, otherwise.

destinationAddress:

Teleaddress|Nil;

Either a teleaddress of the destination of the trip the responder defines, if such a constraint is imposed, or a nil, otherwise.

destinationClass:

Citation|Nil;

Either a citation to the subclass of class "Place" of which the destination of the trip the responder defines is a member, if such a constraint is imposed, or a nil, otherwise.

destinationName:

Telename|Nil;

Either a telename of the destination of the trip the responder defines, if such a constraint is imposed, or a nil, otherwise.

destinationPermit:

Permit|Nil;

Either the local permit an agent using the responder shall have at the agent's destination, if that permit differs from the agent's current temporary permit or, if the agent has none, the agent's native permit; or a nil, otherwise.

maximumWait:

Integer|Nil;

Either the maximum permitted difference in seconds between the time at which the trip the responder defines shall be completed and the time at which the trip is requested, if such a constraint is imposed, or a nil, otherwise. The integer, if supplied, shall be non-negative.

Adaptations isEqual

Two tickets are equal according to their attributes native to tickets and ticket stubs.

4.81 Ticket Stub

> Object (Referenced)
> • Ticket Stub

Class

TicketStub:

interface=( . . . );

Construction initialize:
unprotected op (way: Way|Nil; travelnotes: Object|Nil);

Makes the responder's native attributes the like-named arguments (arguments "travelNotes" and "way").

Public Instance Attributes travelNotes:

Object|Nil;

An object for the exclusive use of the agent holding the responder.

way:

Way|Nil;

In a ticket, either the way to be taken to the trip's destination, if such a constraint is imposed, or a nil. In a ticket stub, a way back to the trip's origin.

Adaptations isEqual

Two ticket stubs are equal according to their native attributes.

4.82 Time

> Object (Referenced)
> • Time (Ordered & Unchanged)

Class

Time:

interface (Object, Ordered, Unchanged)=( . . . );

Construction initialize

Makes the responder the current time, namely, that at the current place.

Public Instance Operations adjust:

op (seconds: Integer) Time;

Returns a time that is the requested number of seconds (argument "seconds") after the responder and that identifies the same permanent and seasonal offsets.

Note: If the integer is negative, the time returned precedes the responder.

interval:

op (subtrahend: Time) Integer;

Returns the arithmetic difference in seconds between the responder, which is the minuend, and the time (argument "subtrahend"), which is the subtrahend.

Note: The result measures the distance between two absolute points in time.

Adaptations isAfter

One time is after another iff the absolute point in time that the first identifies follows the absolute point in time that the second identifies.

isBefore

One time is before another iff the absolute point in time that the first identifies precedes the absolute point in time that the second identifies.

isEqual

Two times are equal iff neither is before the other.

Conversions

CalendarTime

A calendar time produces a time denoting the same point in time and the same permanent and seasonal offsets.

4.83 Trip Exception

> Object (Referenced)
> • Exception (Unchanged)
> • • "Trip Exception"

Class

TripException:

abstract interface (Exception)=( . . . );

Construction initialize:

unprotected op (ticketStub: TicketStub);

Makes the responder's native attribute the like-named argument (argument "ticketStub").

Subclasses

DestinationUnavailable:

interface (TripException)=( );

A trip's destination is unreachable because the Network is partitioned. Thus the destination may be reachable in the future.

DestinationUnknown:

interface (TripException)=( );

A trip's destination cannot be identified and thus is unreachable.

OccupancyDenied:

interface (TripException)=( );

A trip's destination denies the agent occupancy and therefore arrival.

TicketExpired:

interface (TripException)=( );

A trip's destination cannot be reached in the number of seconds requested by the "maximumWait" attribute of the ticket for the trip.

WayUnavailable:

interface (TripException)=( );

A trip's origin lacks the way required for the trip.

Public Instance Attributes ticketStub:

sealed TicketStub;

The ticket stub resulting from the unsuccessful trip.

Adaptations isEqual

Two trip exceptions are equal according to their native attributes.

4.84 Unchanged

Unchanged

Class

Unchanged:

abstract interface ( )=( );

Adaptations copy

A copy of an unchanged object is the original.

4.85 Unexpected Exception

Object (Referenced)
- Exception (Unchanged)
- - Programming Exception
- - - Kernel Exception
- - - - Execution Exception
- - - - - "Unexpected Exception"

Class

UnexpectedException:

interface (ExecutionException)=( . . . );

Construction initialize:

unprotected op (exception: Exception);

Makes the responder's native attribute the like-named argument (argument "exception").

Public Instance Attributes exception:

readonly Exception;

The exception, which a feature did not declare but nevertheless threw, that is the cause of the responder.

4.86 Unmoved

Unmoved

Class

Unmoved:

abstract interface ( )=( );

4.87 Verified

Verified

Class

Verified:

abstract interface ( )=( . . . );

Public Instance Operations verify:

abstract op ( ) Boolean;

Returns an indication of whether the responder is consistent.

4.88 Way

Object (Referenced)
- Way

Class

Way:

interface=( . . . );

Construction initialize:
unprotected op (
name: Telename¦Nil;
    means: Means¦Nil;
    authenticator: Authenticator¦Nil);

Makes the responder's native attributes the like-named arguments (arguments "authenticator", "means", and "name").

Public Instance Attributes authenticator:

Authenticator¦Nil;

Either the authenticator to be used to enter the region through which the way passes, if such a constraint is imposed, or a nil, otherwise.

means:

Means¦Nil;

Either the means by which the region through which the way passes is to be accessed, if such a constraint is imposed, or a nil, otherwise.

name:

Telename¦Nil;

Either the telename of the region through which the way passes, if such a constraint is imposed, or a nil, otherwise.

Adaptations isEqual

Two ways are equal according to their native attributes.

5 TELESCRIPT SYNTAX

A "telescript" is an encoding of a procedure. The abstract syntax of telescripts in general, and the concrete syntax of character and binary telescripts in particular, are defined in this section of this appendix.

Note: Character telescripts are used by people, binary telescripts by machines, e.g., when transporting objects between them. A binary telescript is almost always considerably fewer octets in length than the functionally equivalent character telescript.

5.1 Telescript

A telescript is a series of tokens comprising, first, a preface and, second, the procedure that the telescript encodes. The preface identifies the major and minor versions of the Instruction Set to which the telescript conforms.

A telescript obeys the syntactic, and accompanying semantic, rules below. Given in BNF, the rules surround optional tokens by brackets ("[" and "]"):

```
Telescript ::= Preface Procedure
      Body ::= [ExecutedObject Body]
ExecutedObject ::= Bit ¦ BitString ¦ Boolean ¦
Character ¦ Identifier ¦ Integer ¦
          Octet ¦ Octetstring ¦ Mark ¦
Modifier ¦   Nil ¦ Procedure ¦ QIdentifier ¦
          Real ¦ Selector ¦ String ¦
       Bit ::= BitZero ¦ BitOne
   Boolean ::= BooleanFalse ¦ BooleanTrue
  Modifier ::= ModifierDemarcate ¦
          ModifierGetClass ¦
          ModifierGetProperty ¦
          ModifierGetVariable ¦
          ModifierMention ¦
```

-continued

```
                ModifierSetAttribute: |
                ModifierGetProperty  |
                ModifierSetVariable  |
                ModifierUseStack
Selector ::= SelectorBreak  |
             SelectorClient |
             SelectorContinue |
             SelectorEscalate |
             SelectorPlace  |
             SelectorProcess |
             SelectorSelf   |
             SelectorSucceed
```

A telescript can include comments, the provision for which is considered among the syntactic rules. A "comment" is a string that does not affect the procedure the telescript encodes. One or more comments can appear before the script's first token, after its last, and between any two adjacent tokens.

Note: A comment usually describes an aspect of a telescript to a human being.

Note: The major and minor versions of the Instruction Set as defined in this appendix are identified by zero ("0") and eight ("8"), respectively.

5.2 Character Telescript

A "character telescript" is a procedure encoded as a string. The abstract syntactic rules for telescripts in general are made concrete for character telescripts in particular in this section.

Each token in a character telescript is one or more characters. The character telescript is obtained by concatenating the tokens, and thus the characters, and by inserting break characters between tokens.

A break character is a space (" "), a horizontal tab, or a line feed. One or more such characters can appear before the first token, after the last, or between any two adjacent tokens. In the last case, at least one must appear if the two adjacent tokens comprise only numerals ("0"–"9") and letters, except when both tokens are either "BinDigit" or "hexDigitPair".

Terminals beginning with number sign ("#") and the keyword "telescript" are case-insensitive. While upper-case characters appear in this appendix, lower-case characters, or a mix of the two, can be used in programming.

5.2.1 Preface and Comment

Preface

A preface obeys these rules:

```
Preface ::= telescript Version
Version ::= numerals : numerals
```

The first "numerals" identifies the major version of the Instruction Set to which a character telescript conforms, the second "numerals" identifies the minor version.

Comment

A comment obeys this rule:

```
Comment ::=/* comment1 */ | // comment2
```

Note: The syntax rules for comments are those of the C++ programming language.

5.2.2 Executed Objects

Bit

A bit obeys these rules, which individually encode the bit's values:

```
BitZero ::= #b ' 0 '
BitOne  ::= #b ' 1 '
```

BitString

A bit string obeys these rules:

```
BitString ::= #b " BinDigits "
BinDigits ::= [BinDigit BinDigits]
```

The $i^{th}$ "BinDigit" represents the bit at position "i" of the bit string.

Boolean

A boolean obeys these rules, which individually encode the boolean's values:

```
BooleanFalse  ::= #false
BooleanTrue   ::= #true
```

Character

A character obeys this rule:

```
Character ::=#c 'characters'
```

"characters" shall stand for one character. Each character stands for itself, with exceptions as defined for class "String".

Identifier

An identifier obeys this rule:

```
Identifier ::=identifier | ]
```

"identifier" is the identifier's text. The right square bracket ["]"] denotes operation "new".

Integer

An integer obeys this rule:

```
Integer ::=[-] numerals
```

Mark

A mark obeys this rule:

```
Mark ::=#mark | [
```

Note: Left square bracket ["["] is provided for possible use, by convention, with right square bracket ["]"] (see token "Identifier" above).

Modifier

A modifier obeys these rules, which individually encode the modifier's values.

```
ModifierDemarcate   ::= @
ModifierGetClass    ::= :
ModifierGetProperty ::= %
ModifierGetVariable ::= $
ModifierMention     ::= '
ModifierSetAttribute::= =
ModifierSetProperty ::= =%
ModifierSetVariable ::= =$
ModifierUseStack    ::= -
```

Nil

A nil obeys this rule:

```
Nil ::=#nil
```

Octet

An octet obeys this rule:

```
Octet ::=#o 'hexDigitPair'
```

The MSB of "hexDigitPair" represents Bit 7 of the octet, the LSB represents Bit 0.

OctetString
An octet string obeys these rules:

```
OctetString  ::=  # " HexDigitPairs "
HexDigitPairs::=
            [hex-
            Digit-
            Pair
            Hex-
            Digit-
            Pairs]
```

The first "hexDigitPair" represents the octet at position one of the octet string, the second that at position two, etc. The MSB of each "hexDigitPair" represents Bit 7 of that octet, the LSB represents Bit 0.

Procedure
A procedure obeys this rule:

```
Procedure ::={Body}
```

QualifiedIdentifier
A qualified identifier obeys this rule:

```
QIdentifier ::=identifier :: identifier
```

The first "identifier" represents the text; the second represents the qualifier.

Real
A real obeys these rules:

```
Real     ::=  Number [Exponent]
Number   ::=  Integer . numerals
              Integer . |
              . numerals
Exponent ::=  E Integer
```

The real's integral part is either the "Integer" in "Number", if present, or zero, otherwise. The real's fractional part is either "numerals", if present, or zero, otherwise. The "Integer" in "Exponent", if present, is a power of ten.

Selector
A selector obeys these rules, which individually encode the selector's values:

```
SelectorBreak    ::=  #break
SelectorClient   ::=  #client
SelectorContinue ::=  #continue
SelectorEscalate ::=  #escalate | ^
SelectorPlace    ::=  #here
SelectorProcess  ::=  #Process
SelectorSelf     ::=  #self | *
SelectorSucceed  ::=  #succeed
```

String
A string obeys this rule:

```
String ::=[#c] "characters"
```

"characters" stands for zero or more characters. Each character stands for itself, except that a reverse slash ("\") and four hexadecimal digits ("0"–"9", "A"–"F") stand for the character whose Unicode code is the unsigned integer the digits represent, a character pair in Table A.6 for the indicated character.

TABLE A.6

| Character Sequence | Single Character |
|---|---|
| \b | Backspace |
| \f | Form feed |
| \n | Line feed (newline) |
| \r | Carriage return |
| \t | Horizontal tab |
| \v | Vertical tab |

TABLE A.6-continued

| Character Sequence | Single Character |
|---|---|
| \" | Quotation mark (""") |
| \\ | Reverse slash ("\") |

5.2.3 Other Non-terminals characters
Zero or more characters, each a printing character or a space (" "). A quotation mark (") shall be preceded by a reverse slash ("\"). A reverse slash either shall be a part of a character sequence in the table found under token "String" above, or shall precede four hexadecimal digits.

comment1
Zero or more characters, not including an asterisk immediately followed by a slash ("*/").
Note: "comment1" can encompass "/*" or "//" without special meaning, and thus can encompass a "comment2".

comment2
Zero or more characters, not including a line feed.
Note: "comment2" can encompass "/*", "*/", or "//" without special meaning, and thus can encompass a "comment1". "comment2" cannot be followed on the same line by other tokens, since it would be considered to encompass them.

hexDigitPair
A pair of hexadecimal digits ("0"–"9", "A"–"F").

identifier
Characters constrained as is the text of an identifier.

numerals
One or more numerals ("0"–"9").

5.3 Binary Telescript
A "binary telescript" is a procedure encoded as an octet string. The abstract syntactic rules for telescripts in general are made concrete for binary telescripts in particular in this section.

Each token in a binary telescript is one or more octets. The binary telescript is obtained by concatenating the tokens and thus the octets.

5.3.1 Preface and Comment
Preface
A preface obeys these rules:

```
Preface ::=  Version
Version ::=  unsignedNumber unsignedNumber
```

The first and second "unsignedNumber" identify the major and minor versions, respectively, of the Instruction Set to which a character telescript conforms.

Comment
A comment obeys this rule:

```
Comment ::=tag unsignedNumber characters
```

The "unsignedNumber" is the number of octets to be recognized as characters.

5.3.2 Executed Objects
Bit
A bit obeys these rules, which individually encode the bit's values:

```
BitZero  ::= tag
BitOne   ::= tag
```

BitString
A bit string obeys these rules:

> BitString ::= tag unsignedNumber unsignedNumber Octets
> Octets ::= [octets Octets]

The first "unsignedNumber" is the number—in the range [1, 8]—of bits of the bit string in the last octet; the other bits in that octet have no significance and are undefined. The second "unsignedNumber" is the number, "n", of occurrences of the token "octet" in the token "Octets". If the octets are numbered in [1, n], the bit whose position in the bit string is "i" is Bit (7−((i−1) mod 8)) of the octet numbered (1+(i−1)/8).

Boolean
A boolean obeys these rules, which individually encode the boolean's values:

> BooleanFalse ::= tag
> BooleanTrue ::= tag

Character
A character obeys these rules. A general and a special encoding are defined. The latter shall be used for eight-bit characters:

> Character ::= GeneralCharacter | SpecialCharacter
> GeneralCharacter ::= tag octet octet
> SpecialCharacter ::= tag octet The one or two octets encode unsigned the integer that is the character's Unicode code. In the special encoding, the MSB and LSB of the integer are those of the octet. In the general encoding, the MSB and LSB of the integer are the MSB of the first octet and the LSB of the second, respectively.

Identifier
An identifier obeys these rules. One general and two special encodings are defined. One of the latter shall be used iff the text of the identifier equals that of the identifier of a predefined class or feature:

> Identifier ::= GeneralID | PredefinedClassID | PredefinedFeatureID
> GeneralID ::= tag unsignedNumber characters
> PredefinedClassID ::= tag unsignedNumber
> PredefinedFeatureID ::= tag unsignedNumber In the general encoding, "unsignedNumber" and "characters" represent the text directly. The former is the number of octets to be recognized as the latter. In a special encoding, "unsignedNumber" represents the identifier's text indirectly, by a code drawn from one of the tables in section 5.4.

Integer
An integer obeys these rules. One general and several special encodings are defined. The latter shall be used for −1, 0, and +1:

> Integer ::= GeneralInteger | SpecialInteger
> GeneralInteger ::= tag signedNumber
> SpecialInteger ::= IntegerMinusOne | IntegerZero | IntegerPlusOne
> IntegerMinusOne ::= tag
> IntegerZero ::= tag
> IntegerPlusOne ::= tag The signedNumber is the integer.

Mark
A mark obeys this rule:

> Mark ::=tag

Modifier
A modifier obeys these rules, which individually encode the modifier's values:

> ModifierDemarcate ::= tag
> ModifierGetClass ::= tag
> ModifierGetProperty ::= tag
> ModifierGetVariable ::= tag
> ModifierMention ::= tag
> ModifierSetAttribute ::= tag
> ModifierSetProperty ::= tag
> ModifierSetVariable ::= tag
> ModifierUseStack ::= tag

Nil
A nil obeys this rule:

> Nil ::=tag

Octet
An octet obeys this rule:

> Octet ::=tag octet

The MSB of "octet" represents Bit 7 of the octet, the LSB Bit 0.

OctetString
An octet string obeys these rules:

> OctetString ::= tag unsignedNumber Octets
> Octets ::= [octet Octets]

The "unsignedNumber" is the number of occurrences of "octet" in "Octets". The first "octet" in "Octets" represents the octet at position one of the octet string, the second "octet" that at position two, etc. The MSB of each "octet" represents Bit 7 of that octet, the LSB represents Bit 0.

Procedure
A procedure obeys this rule:

> Procedure ::=tag unsignedNumber Body

The "unsignedNumber" encodes the number of occurrences of "ExecutedObject" in "Body", each of which encodes an item of the procedure. The items are given in order of increasing position within the procedure.

QualifiedIdentifier
A qualified identifier obeys this rule:

> QIdentifier ::=tag Identifier Identifier

The first "Identifier" represents the text, the second represents the qualifier.

Real
A real obeys this rule:

> Real ::=tag signedNumber signedNumber

The first "signedNumber" is a mantissa, "m", the second an exponent, "e". The real is $m \times 10^e$.

Selector
A selector obeys these rules, which individually encode the selector's values:

> SelectorBreak ::= tag
> Selector Client ::= tag
> Selector Continue ::= tag
> Selector Escalate ::= tag
> Selector Place ::= tag
> Selector Process ::= tag
> Selector Self ::= tag
> Selector Succeed ::= tag String A string obeys this rule:

String ::=tag unsignedNumber characters

The "unsignedNumber" is the number of octets to be recognized as characters. The syntax and semantics of the octets shall conform to ISO/IEC 10646 [10646] compaction method 5, except that the characters thereby represented shall be limited to those of Unicode.

Note: If the string comprises only ASCII characters, "characters" comprises their ASCII representations, one character per octet, Bit 7 of each octet being zero.

5.3.3 Other Non-terminals characters

Zero or more octets.

number

From one to five, "N", octets encoding an integer, "I". The encoding, "E", of "I" is either unsigned, if the use of number insists that "I" be non-negative, or twos complement, otherwise. Given "I", "N" shall be as small as possible.

"E" is determined as follows.

If the value of the first octet is in the range of $[0, BF_{16}]$, "N" is one and the MSB and LSB of "E" are Bit 7 and Bit 0 of that sole octet.

If the first octet is $E0_{16}$, $E2_{16}$, $E4_{16}$, or $E6_{16}$, "N" is 2, 3, 4, or 5 and the MSB and LSB of "E" would be Bit 7 of the first octet and Bit 0 of the last octet if the first octet were made $00_{16}$.

If the first octet is $E1_{16}$, $E3_{16}$, $E5_{16}$, or $E7_{16}$, N is 2, 3, 4, or 5 and the MSB and LSB of "E" would be Bit 7 of the first octet and Bit 0 of the last octet if the first octet were made $FF_{16}$.

Note: The first octet's values in the ranges of $[C0_{16}, DF_{16}]$ and $[E8_{16}, FF_{16}]$ are reserved.

octet

One octet.

signedNumber

"number", where "I" can be positive or negative, and thus where "E" is signed (see above).

Note: If "N" is one, "I" is in the range [−64, 127]. If "N" is two, "I" is in the range [−128, 127]. If "N" is three, "I" is in the range [−32768, 32767]. If "N" is four, "I" is in the range [−8388608, 8388607]. If "N" is five, "I" is in the range [−2147483648, 2147483647].

tag

"signedNumber", where the tag's meanings are given in the next section.

unsignedNumber

"number", where "I" is non-negative, and thus "E" is unsigned (see above).

Note: If "N" is one, "I" is in the range [0, 191]. If "N" is two, "I" is in the range [0, 255]. If "N" is three, "I" is in the range [0, 65535]. If "N" is four, "I" is in the range [0, 16777215]. If "N" is five, "I" is in the range [0, 4294967295].

5.4 Numeric Codes

Binary telescripts make use of the following numeric codes.

5.4.1 Predefined Classes

Table A.7 assigns identifier codes to the predefined subclasses of class "Executed".

TABLE A.7

| | |
|---|---|
| 1 | Bit |
| 2 | BitString |
| 3 | Boolean |
| 4 | Character |
| 5 | Identifier |
| 6 | Integer |
| 7 | Mark |
| 8 | Modifier |
| 9 | Nil |
| 10 | Octet |
| 11 | OctetString |
| 12 | Procedure |
| 13 | QIdentifier |
| 14 | Real |
| 15 | Selector |
| 16 | String |

Table A.8 assigns identifier codes to the other major predefined classes.

TABLE A.8

| | |
|---|---|
| 20 | Agent |
| 21 | Association |
| 22 | Attribute |
| 23 | Authenticator |
| 24 | CalendarTime |
| 25 | Cased |
| 26 | Citation |
| 27 | Cited |
| 28 | Class |
| 29 | ClassDefinition |
| 30 | ClassException |
| 31 | Collection |
| 32 | CollectionException |
| 33 | Constrained |
| 34 | ConstrainedDictionary |
| 35 | ConstrainedList |
| 36 | ConstrainedSet |
| 37 | Constraint |
| 38 | Contact |
| 39 | Contacted |
| 40 | Dictionary |
| 41 | Exception |
| 42 | Executed |
| 43 | ExecutionException |
| 44 | — |
| 45 | Feature |
| 46 | Hashed |
| 47 | Implementation |
| 48 | Interchanged |
| 49 | Interface |
| 50 | KernelException |
| 51 | Lexicon |
| 52 | List |
| 53 | Means |
| 54 | MeetingException |
| 55 | MeetingPlace |
| 56 | Method |
| 57 | MiscellaneousException |
| 58 | Named |
| 59 | Number |
| 60 | Object |
| 61 | Operation |
| 62 | Ordered |
| 63 | Package |
| 64 | Pattern |
| 65 | Permit |
| 66 | Petition |
| 67 | Petitioned |
| 68 | Place |
| 69 | Primitive |
| 70 | PrimitiveException |
| 71 | Process |
| 72 | ProcessException |

TABLE A.8-continued

| | |
|---|---|
| 73 | ProgrammingException |
| 74 | RandomStream |
| 75 | — |
| 76 | Referenced |
| 77 | — |
| 78 | — |
| 79 | Resource |
| 80 | Set |
| 81 | Stack |
| 82 | Stream |
| 83 | Teleaddress |
| 84 | Telename |
| 85 | Telenumber |
| 86 | Ticket |
| 87 | TicketStub |
| 88 | Time |
| 89 | TripException |
| 90 | Unchanged |
| 91 | UnexpectedException |
| 92 | Unmoved |
| 93 | Verified |
| 94 | Way |

Table A.9 assigns identifier codes to the minor predefined classes.

TABLE A.9

| | |
|---|---|
| 100 | PermitInadequate |
| 101 | ArgumentInvalid |
| 102 | ArgumentMissing |
| 103 | AttributeReadOnly |
| 104 | ClassAbstract |
| 105 | ClassUnavailable |
| 106 | ClassUndefined |
| 107 | ClassSealed |
| 108 | ConditionUnavailable |
| 109 | ConditionUndefined |
| 110 | ConversionUnavailable |
| 111 | CopyUnavailable |
| 112 | DestinationUnavailable |
| 113 | DestinationUnknown |
| 114 | DivisionByZero |
| 115 | — |
| 116 | EscalationInvalid |
| 117 | FeatureRedefined |
| 118 | FeatureSealed |
| 119 | FeatureUnavailable |
| 120 | FeatureUndefined |
| 121 | InternalException |
| 122 | ItemDuplicated |
| 123 | ItemInvalid |
| 124 | KeyDuplicated |
| 125 | KeyInvalid |
| 126 | LoopMissing |
| 127 | MarkMissing |
| 128 | MeetingDenied |
| 129 | MeetingDuplicated |
| 130 | MeetingInvalid |
| 131 | MixinDisallowed |
| 132 | ObjectsUnpaired |
| 133 | ObjectUninitialized |
| 134 | OccupanyDenied |
| 135 | PassageInvalid |
| 136 | PatternInvalid |
| 137 | PermitExhausted |
| 138 | PermitViolated |
| 139 | PetitionExpired |
| 140 | PositionInvalid |
| 141 | ProcessNotCurrent |
| 142 | ProcessNotPeer |
| 143 | PropertyUndefined |
| 144 | ReferenceProtected |
| 145 | ReferenceVoid |
| 146 | ResponderMissing |
| 147 | ResultInvalid |
| 148 | ResultMissing |
| 149 | SelectorDuplicated |

TABLE A.9-continued

| | |
|---|---|
| 150 | StackDepleted |
| 151 | StateImproper |
| 152 | SuperclassesInvalid |
| 153 | TicketExpired |
| 154 | VariableUndefined |
| 155 | WayUnavailable |
| 179 | ResourceUnavailable |
| 180 | SeedInvalid |

5.4.2 Predefined Features

Table A.10 assigns identifier codes to the predefined operations.

TABLE A.10

| | |
|---|---|
| 1 | abs |
| 2 | add |
| 3 | adjust |
| 4 | and |
| 5 | catch |
| 6 | ceiling |
| 7 | charge |
| 8 | clear |
| 9 | convert |
| 10 | copy |
| 11 | difference |
| 12 | discard |
| 13 | divide |
| 14 | do |
| 15 | drop |
| 16 | either |
| 17 | entering |
| 18 | examine |
| 19 | exclude |
| 20 | exiting |
| 21 | finalize |
| 22 | find |
| 23 | floor |
| 24 | get |
| 25 | globalize |
| 26 | go |
| 27 | if |
| 28 | include |
| 29 | initialize |
| 30 | intersection |
| 31 | interval |
| 32 | isAfter |
| 33 | isBefore |
| 34 | isEqual |
| 35 | isInstance |
| 36 | isMember |
| 37 | isSame |
| 38 | isSubclass |
| 39 | live |
| 40 | localize |
| 41 | loop |
| 42 | makeClasses |
| 43 | makeLower |
| 44 | makeUpper |
| 45 | meet |
| 46 | meeting |
| 47 | modulus |
| 48 | multiply |
| 49 | negate |
| 50 | new |
| 51 | normalize |
| 52 | not |
| 53 | or |
| 54 | part |
| 55 | partAll |
| 56 | parting |
| 57 | pop |
| 58 | protect |
| 59 | push |
| 60 | pushItems |
| 61 | quotient |
| 62 | ref |
| 63 | rekey |

TABLE A.10-continued

| | |
|---|---|
| 64 | repeat |
| 65 | reposition |
| 66 | restrict |
| 67 | roll |
| 68 | round |
| 69 | select |
| 70 | send |
| 71 | set |
| 72 | stream |
| 73 | substitute |
| 74 | substring |
| 75 | subtract |
| 76 | swap |
| 77 | terminate |
| 78 | throw |
| 79 | transpose |
| 80 | truncate |
| 81 | union |
| 82 | use |
| 83 | verify |
| 84 | wait |
| 85 | while |
| 86 | max |
| 87 | min |

Table A.11 assigns identifier codes to the predefined attributes.

TABLE A.11

| | |
|---|---|
| 89 | address |
| 90 | agentClass |
| 91 | agentName |
| 92 | allowance |
| 93 | arguments |
| 94 | authenticator |
| 95 | author |
| 96 | authority |
| 97 | brand |
| 98 | canCharge |
| 99 | canGo |
| 100 | canProcreate |
| 101 | canRestart |
| 102 | canSend |
| 103 | canTerminate |
| 104 | citation |
| 105 | class |
| 106 | classFeatures |
| 107 | classId |
| 108 | classMethods |
| 109 | condition |
| 110 | conditions |
| 111 | constraint |
| 112 | contacts |
| 113 | country |
| 114 | current |
| 115 | day |
| 116 | dayOfWeek |
| 117 | dayOfYear |
| 118 | deadline |
| 119 | desiredWait |
| 120 | destinationAddress |
| 121 | destinationClass |
| 122 | destinationName |
| 123 | destinationPermit |
| 124 | digest |
| 125 | dst |
| 126 | exception |
| 127 | exceptions |
| 128 | extension |
| 129 | fromMethods |
| 130 | hash |
| 131 | hour |
| 132 | identity |
| 133 | iimplementation |
| 134 | instanceFeatures |
| 135 | instanceMethods |
| 136 | interface |

TABLE A.11-continued

| | |
|---|---|
| 137 | isAbstract |
| 138 | isDone |
| 139 | isLower |
| 140 | isOptional |
| 141 | isProtected |
| 142 | isPublic |
| 143 | isSet |
| 144 | isUpper |
| 145 | key |
| 146 | length |
| 147 | location |
| 148 | majorEdition |
| 149 | maximumWait |
| 150 | means |
| 151 | minorEdition |
| 152 | minute |
| 153 | month |
| 154 | name |
| 155 | next |
| 156 | ofClass |
| 157 | passage |
| 158 | permit |
| 159 | priority |
| 160 | privateClasses |
| 161 | procedure |
| 162 | properties |
| 163 | provider |
| 164 | publicClasses |
| 165 | result |
| 166 | routingAdvice |
| 167 | sealedClassFeatures |
| 168 | sealedInstanceFeatures |
| 169 | setMethods |
| 170 | second |
| 171 | size |
| 172 | subject |
| 173 | subjectClass |
| 174 | subjectName |
| 175 | subjectNotes |
| 176 | superclasses |
| 177 | telephone |
| 178 | ticketStub |
| 179 | title |
| 180 | toMethods |
| 181 | travelNotes |
| 182 | value |
| 183 | variables |
| 184 | vocabulary |
| 185 | way |
| 186 | year |
| 187 | zone |

Note: "isInstance" is not listed as an attribute because it is also an operation.

Table A.12 assigns codes to the forms of passage.

TABLE A.12

| | |
|---|---|
| 191 | byCopy |
| 192 | byProtectedRef |
| 193 | byRef |
| 194 | byUnprotectedRef |

5.4.3 Executed Object Encodings

Table A.13 assigns codes to general-purpose encodings.

TABLE A.13

| | |
|---|---|
| 1 | — |
| 2 | BitString |
| 3 | — |
| 4 | GeneralCharacter |
| 5 | Identifier |
| 6 | GeneralInteger |
| 7 | Mark |
| 8 | — |
| 9 | Nil |

TABLE A.13-continued

| 10 | Octet |
|---|---|
| 11 | OctetString |
| 12 | Procedure |
| 13 | QualifiedIdentifier |
| 14 | Real |
| 15 | — |
| 16 | String |

Note: These tags are the codes for the corresponding predefined classes.

Table A.14 assigns codes to special-purpose encodings of a basic nature.

TABLE A.14

| 0 | Comment |
|---|---|
| −1 | BitZero |
| −2 | BitOne |
| −3 | BooleanFalse |
| −4 | BooleanTrue |
| −5 | SpecialCharacter |
| −6 | PredefinedClassIdentifier |
| −7 | PredefinedFeatureIdentifier |
| −8 | IntegerMinusOne |
| −9 | IntegerZero |
| −10 | IntegerPlusOne |

Table A.15 assigns codes to special-purpose encodings of modifiers.

TABLE A.15

| −12 | ModifierDemarcate |
|---|---|
| −13 | ModifierGetClass |
| −14 | ModifierGetProperty |
| −15 | ModifierGetVariable |
| −16 | ModifierMention |
| −17 | ModifierSetAttribute |
| −18 | ModifierSetProperty |
| −19 | ModifierSetVariable |
| −20 | ModifierUseStack |

Table A.16 assigns codes to special-purpose encodings of selectors.

TABLE A.16

| −21 | SelectorBreak |
|---|---|
| −22 | SelectorClient |
| −23 | SelectorContinue |
| −24 | SelectorEscalate |
| −25 | SelectorPlace |
| −26 | SelectorProcess |
| −27 | SelectorSelf |
| −28 | SelectorSucceed |

6 Syntax of Module

A "module", as the term is used here, is a string that encodes one or more interfaces, the identifiers of the classes of which those interfaces are parts, and, finally, an identifier for the module itself.

Throughout Section 6, the term "identifier" implicitly refers to the text of an instance of class "Identifier", rather than to the instance as a whole.

Note: A module constructed as described below is a High Telescript module as well. Any rule below that makes this statement false is a documentation error.

6.1 General Structure

A module is a series of tokens obeying the syntactic, and accompanying semantic, rules below. Given in BNF, the rules surround optional tokens by brackets ("[" and "]"). In addition, a module can include comments of the sort permitted in a character telescript. The provision for such comments is considered among the syntactic rules governing the module.

Each token is one or more characters. The module is obtained by concatenating the tokens, and thus the characters, and by inserting between tokens break characters of the sort permitted in a character telescript.

Keywords, e.g., "module", are case-sensitive. While upper-case characters are used below to describe modules in general, lower-case characters are used in Section 7 and throughout this appendix to construct a module.

6.2 Detailed Structure

A module exhibits the following detailed structure.

6.2.1 Module

Module

A module obeys these rules:

```
Module      ::=  identifier : MODULE =
                 (Interfaces)
Interfaces  ::=  identifier : Interface;
                 [Interfaces]
```

The module is denoted by the identifier that begins the module, and encodes the interfaces, each that of the class whose identifier immediately precedes the identifier.

Any interface can define operation "initialize" as it pertains to members of the interface's particular class. A definition is implied, furthermore, if none is stated: either "initialize: op ( );", if the class in question is a mix-in, or the definition for the flavor among the class' interface superclasses, otherwise.

6.2.2 Interface

Interface

An interface obeys these rules:

```
Interface        ::=  [SEALED | ABSTRACT]
                      INTERFACE
                      "[" FormalParameters "]"
                      [Superclasses] = ( [Definitions] )
FormalParameters ::=  ParameterGroup[;
FormalParameterGroup ::= Identifiers : CLASS
Superclasses     ::=  ( [ClassSpecifiers] )
Definitions      ::=  DefinitionGroup ; [Definitions]
DefinitionGroup  ::=  [Access] [Responder]
                      Identifiers : Definition
Access           ::=  PUBLIC | PRIVATE |
                      SYSTEM
Responder        ::=  INSTANCE | CLASS
Identifiers      ::=  identifier [, Identifiers]
Definition       ::=  SEALED | [SEALED |
                      ABSTRACT]
```

Feature

An interface's encoding can be parameterized. In such an encoding, one or more "formal class parameters", each an identifier, are introduced, and can be used in most places the interface requires class identifiers (see token "ClassSpecifier" below). The interface is as if the identifier of class "Object" were used instead. Formal class parameters defined alike are grouped at their introduction.

Zero or more features, each denoted by an identifier, are sealed or defined. The identifiers of features sealed or defined alike are grouped. If "Access" or "Responder" is absent from the first such group, "PRIVATE" or "INSTANCE", respectively, shall be considered present there. If "Access" or "Responder" is absent from any subsequent group, the keyword present in the previous group shall be considered present in the subsequent group.

The interface is this. The "classFeatures" or "instanceFeatures" attribute comprises the features defined in groups with "CLASS" or "INSTANCE", respectively. The "isAbstract" attribute is "true" if "ABSTRACT" is present. The "sealedClassFeatures" or "sealedInstanceFeatures" attribute comprises the identifiers in groups with both "SEALED" and "CLASS" or "INSTANCE", respectively. The "superclasses" attribute comprises either the identifiers token "Superclasses" determines, if the latter is present, or the identifier of Class "Object" only, otherwise. The positions in the attribute of the classes decrease as their specifiers move from left to right. The "vocabulary" attribute is cleared.

The interface is sealed if "SEALED" is present.

6.2.3 Feature

Feature

A feature definition obeys this rule:

Feature ::=Attribute | Operation

Attribute

An attribute definition obeys this rule:

Attribute ::= [READONLY] Constraint
[THROWS Identifiers]

The attribute definition is this. The "constraint" attribute is the constraint given. The "exceptions" attribute comprises either the identifiers present, if "THROWS" is present, or no identifiers, otherwise. The "isPublic" attribute is "true" if the key for the definition group that includes the attribute definition is "PUBLIC" or "CLASS". The "isSet" attribute is true iff "READONLY" is absent.

A module's encoding, as defined above, of an attribute definition is sometimes called the signature of the attribute it defines.

Operation

An operation definition obeys this rule:

Operation ::= [UNPROTECTED] op (
ArgumentsAttribute)
[Constraint] [THROWS Identifiers]

The operation definition is this. The "arguments" attribute is as given. The "exceptions" attribute comprises either the identifiers present, if "THROWS" is present, or no identifiers, otherwise. However, iff "UNPROTECTED" is present, the attribute comprises, additionally, the identifier for class "Reference Protected", which is thrown if the operation, which modifies the responder, is requested using a protected reference to the responder. The "isPublic" attribute is "true" if the key for the definition group that includes the operation definition is "PUBLIC" or "CLASS" (see token "Interface" above). The "result" attribute is either the constraint, if one is present, or a nil, otherwise.

A module's encoding, as defined above, of an operation definition is sometimes called the signature of the operation the operation definition defines.

ArgumentsAttribute

An "arguments" attribute obeys these rules:

ArgumentsAttribute ::= [Arguments] [. . .]
Arguments ::= ArgumentGroup [; Arguments]
ArgumentGroup ::= Identifiers : Constraint Zero or more arguments are described by their constraints. Each such argument is denoted by an identifier. The identifiers of arguments constrained alike are grouped. If both one or more argument groups and the ellipsis ( . . . ) are present, the last group shall comprise just one argument, but shall be considered to comprise zero or more arguments.

The "arguments" attribute is either a list of the constraints upon the zero or more described arguments, if the ellipsis ( . . . ) is absent, or a nil, otherwise. The positions, in the list, of the constraints upon the described arguments increase as their identifiers move from left to right.

6.2.4 Constraint

Constraint

A constraint obeys these rules:

Constraint ::= [COPIED | PROTECTED |
UNPROTECTED] ClassSpecifier ["|"
NIL]

The constraint is this. The "classId" attribute is the identifier that token "ClassSpecifier" determines. The "isInstance" attribute is "true" if the exclamation mark ("!") is present within token "ClassSpecifier" (see below). The "isOptional" attribute is "true" if "NIL" is present. The "ofClass" attribute is a nil. The "passage" attribute is "byCopy", "byProtectedRef", "byUnprotectedRef", or "byRef" if "COPIED", "PROTECTED", "UNPROTECTED", or none of these, respectively, is present.

ClassSpecifier

A class specifier obeys these rules:

ClassSpecifier ::= identifier [!]
["[" ClassSpecifiers "]"]
ClassSpecifiers ::= ClassSpecifier [,
ClassSpecifiers]

The identifier is that of either a formal class parameter or a class, "C". In the latter case, if the encoding, "E", of the interface of "C" is parameterized, there follow, between square brackets ("[" and "]"), as many actual class parameters, each a class specifier, as "C" has formal class parameters. This particular use of "C" is as if each use of a formal class parameter within "E" were a use of the correspondingly positioned actual class parameter.

6.2.5 Other Non-terminals identifier

Characters constrained as is the text of an instance of class "Identifier".

7 PREDEFINED MODULE

The interfaces to the predefined classes are defined by a module which appears in full below and in fragments throughout this appendix. The Instruction Set's internal features do not appear in the module.

This Section, i.e. Section 7, provided for reference purposes, duplicates material found elsewhere in this appendix. Note: The predefined interface definitions form a High Telescript module. To make this possible, certain Low Telescript identifiers are postfixed with "_x" to avoid identifiers that are reserved words in High Telescript.

- 487 -

7 PREDEFINED MODULE

The interfaces to the predefined classes are defined by a module which appears in full below and in fragments throughout this appendix. The Instruction Set's internal features do not appear in the module.

This Section, i.e. Section 7, provided for reference purposes, duplicates material found elsewhere in this appendix.

Note: The predefined interface definitions form a High Telescript module. To make this possible, certain Low Telescript identifiers are postfixed with "_x" to avoid identifiers that are reserved words in High Telescript.

```
Telescript:    module = (
    Agent:     abstract interface (Process) = (
                   private
                       go: unprotected op (ticket: copied
                           Ticket) TicketStub
                       throws PermitViolated,
                           StateImproper, TripException;

send:unprotected op (tickets:
                           copied List [Ticket])
                           TicketStub|Nil
                       throws PermitViolated,
                           StateImproper, TripException;
                   );

Association: sealed interface [keyClass, valueClass:
                     Class]   (Object, Ordered) = (
                 public
                     key: keyClass;

value: valueClass;
```

```
                             - 488 -
                  system
                      initialize: unprotected op (
                          key: keyClass;
                          value: valueClass);
 5                );

Attribute:   sealed interface (Feature) = (
                      public
                          constraint: Constraint;

isSet: Boolean;
10                    system
                          initialize: unprotected op (
                              constraint: Constraint|Nil;
                              isSet, isPublic: Boolean|Nil;
                              exceptions: Set
15 [Identifier!]|Nil);
                  );

Authenticator: abstract interface = ();

Bit: sealed interface (Primitive, Ordered) =
    ();

20     BitString: sealed interface (ConstrainedList
                      [Bit],Executed) = (
                      public
                          constraint: sealed;

system 25                        initialize: unprotected op
                              (segments: Object ...
                              /* Bit|protected BitString! */);
                  );
```

F:\WORK\USERS\JIM\M1984\EIGHT\APPLICA.JD1
930701 (JD1:mw)

```
                              - 489 -
        Boolean:    sealed interface (Primitive, Ordered) =
                        ( public
                            and, or: op (boolean: Boolean)
    Boolean;

5                          not: op () Boolean;
                        );

CalendarTime:  interface = (
                        public
                            day, dst, hour, minute, month,
10                              second, year, zone:
                                Integer|Nil;

dayOfWeek, dayOfYear: readonly
                                Integer|Nil;

globalize, localize:unprotected op
15 ();

normalize: unprotected op ()
    Boolean;
                        );

Cased:    abstract interface () = (
20                      public
                            isLower, isUpper: abstract
                                readonly Boolean;

makeLower, makeUpper: abstract op
                                () copied Cased;
25                      );

Character:   sealed interface (Primitive, Cased,
                        Ordered) = ();
```

```
                              - 490 -
       Citation:  interface (Object, Ordered) = (
                      public
                          author: Telename|Nil;

majorEdition, minorEdition:
 5  Integer|Nil;

title: Identifier!;
                      system
                          initialize: unprotected op (
                              title: Identifier!;
10                            author: Telename|Nil;
                              majorEdition, minorEdition:
                                  Integer|Nil);
                      );

Cited:   abstract interface () = (
15                     public
                          citation: readonly protected
    Citation;
                      system
                          initialize: unprotected op (
20                            title: Identifier!;
                              majorEdition, minorEdition:
                              Integer);
                      );

Class:   sealed interface (Object,
25                     Cited,Interchanged) = (
                      public
                          convert: sealed op (source:
                              protected Object)
                              copied Object
30                            throws ConversionUnavailable;
```

- 491 -

```
                        isInstance: sealed op (instance_x:
                            protected Object) Boolean;

isMember: sealed op (member:
                            protected Object) Boolean;

5                      isSubclass: sealed op (subclass:
                            Class) Boolean;

new: sealed op (parameters: Object
                            ...) Object throws ClassAbstract, Exception,
10                              ObjectUninitialized;
                    system
                        initialize: unprotected op ()
                            throws FeatureUnavailable;
                    );

15 ClassDefinition:   sealed interface = (
                    public
                        implementation:
   Implementation|Nil;

interface_x: Interface;

20                      majorEdition, minorEdition:
   Integer;

makeClasses: op (definitions:
                            protected ClassDefinition ...)
                            Lexicon [Class]
25                          throws ClassException;

title: Identifier!;
                    system
```

```
                                - 492 -
                        initialize: unprotected op (title:
                           Identifier!;
                           majorEdition,
     minorEdition:Integer;
 5                      interface_x:Interface;
                           implementation:
     Implementation|Nil);
                           );

ClassException:    abstract interface
10   (ProgrammingException) = ();

ClassSealed: interface (ClassException)
     = ();
                        ClassUndefined: interface
     (ClassException) =();
15                      FeatureRedefined:
                           interface (ClassException) = ();
                        FeatureSealed: interface
                           (ClassException) = ();
                        FeatureUndefined:
20                         interface (ClassException) = ();
                        MixinDisallowed:
                           interface (ClassException) = ();
                        SuperclassesInvalid:
                           interface (ClassException) = ();

25   Collection:    interface [itemClass: Class] =(
                        public
                           clear: unprotected op ();

examine: op (item: protected
                              itemClass) itemClass|Nil;

30                         exclude: unprotected op (item:
                              protected itemClass)
```

- 493 -

```
                      itemClass|Nil;

include: unprotected op (item:
    itemClass)
                  throws ItemInvalid;
                  length: readonly Integer;

stream: op () copied Stream
                      [itemClass];
              system
                  initialize: unprotected op (items:
                      itemClass ...)
                  throws ItemInvalid;
              );

Collection     abstract interface
  (ProgrammingException) = ();
     Exception:  ItemDuplicated:
                    interface (CollectionException) =();
                 ItemInvalid:
                    interface (CollectionException) =();
                 KeyDuplicated:
                    interface (CollectionException) =();
                 KeyInvalid:
                    interface (CollectionException) =():
                 ObjectsUnpaired:
                    interface (CollectionException) =():
                 PositionInvalid:
                    interface (CollectionException) =():
                 StackDepleted:
                    interface (CollectionException) =();

Constrained: abstract interface () = (
                    public
                       constraint:
                          readonly protected Constraint;
```

- 494 -

```
                                  system
                                      initialize: unprotected op (
                                          constraint: copied
        Constraint|Nil);
  5                               );

Constrained       interface [keyClass, valueClass: Class]
        Dictioncary:      (Dictionary [keyClass, valueClass],
                          Constrained)= (
                          system
 10                           initialize: unprotected op (
                                  constraint: copied Constraint;
                                  keysAndValues: Object ...
                                      /* key: keyClass; value:
                                          valueClass */)
 15                               throws KeyDuplicated, KeyInvalid,
                                      ObjectsUnpaired;
                          );

ConstrainedList:  interface [itemClass: Class] (List
                          [itemClass], Constrained) = (
 20                       system
                              initialize: unprotected op (
                              constraint: copied Constraint;
                              items: itemClass ...)
                              throws ItemInvalid;
 25                       );

ConstrainedSet:   interface [itemClass: Class]
                          (Set [itemClass], Constrained) = (
                          system
                              initialize: unprotected op (
 30                               constraint: copied Constraint;
                                  items: itemClass ...)
                                  throws ItemDuplicated,
                          ItemInvalid;
```

```
                           - 495 -
                    );

Constraint:    interface = (
                        public
                            classId: Identifier!;
5                           isInstance, isOptional: Boolean;
                            ofClass: readonly Class|Nil;
                            passage: Identifier!
                            throws PassageInvalid;
                        system
10                          initialize: unprotected op (
                                classId, passage:
   Identifier!|Nil;
                                isOptional, isInstance:
   Boolean|Nil)
15                          throws PassageInvalid;
                    );

Contact:       interface = (
                        public
                            subject: Process|Nil;
20                          subjectClass: readonly protected
                                Citation|Nil;
                            subjectName: readonly protected
                                Telename|Nil;
                            subjectNotes: Object|Nil;
25                      system
                            initialize: unprotected op (
                                subject: Process|Nil;
                                subjectNotes: Object|Nil);
                    );

30   Contacted:     abstract interface () = (
                        private
                            contacts: readonly Set [Contact];
```

- 496 -
```
               );

Dictionary:    interface [keyClass, valueClass: Class]
                   (Set [Association [keyClass,
                       valueClass]]) = (
5                  public
                   add: unprotected op (key: keyClass;
                       value: valueClass)
                   throws KeyInvalid;

drop: unprotected op (key: protected
10                     keyClass) valueClass
                   throws KeyInvalid;

find: op (value: protected
                       valueClass) keyClass|Nil;

get: op (key: protected keyClass)
15                     valueClass
                   throws KeyInvalid;

rekey: unprotected op (
                       currentKey: protected keyClass;
                       newKey: keyClass)
20                 throws KeyInvalid;

set: unprotected op (
                       key: protected keyClass;
                       value: valueClass)
                   throws KeyInvalid;

25                 transpose: unprotected op (key1,
                       key2: protected keyClass)
                   throws keyInvalid;
               system
```

- 497 -

```
               initialize: unprotected op
                   (keysAndValues: Object ...
              /* key: keyClass; value: valueClass */)
              throws KeyDuplicated, KeyInvalid,
 5                ObjectsUnpaired;
              );

Exception: abstract interface (Object, Unchanged) =
              (public
                   throw_x: sealed op ();
10            );

Executed:  abstract interface () = (
              public
                   catch_x: sealed op (exception:
                       Class) Exception|Nil
15                 throws Exception;

do_x, loop_x: sealed op ()
                   throws Exception;

either: sealed op (false_x:
                   Executed; precondition: Boolean)
20                 throws Exception;

if_x: sealed op (precondition:
                   Boolean)
                   throws Exception;

repeat_x: sealed op (repetitions:
25                 Integer)
                   throws Exception;

while_x: sealed op (precondition:
                   Executed)
```

- 498 -

```
                    throws Exception, ResultInvalid,
                        ResultMissing;
                );

Execution   abstract interface (KernelException) =
5   ();
        Exception:
                    ArgumentInvalid:
                        interface (ExecutionException) =();
                    ArgumentMissing:
10                      interface (ExecutionException) = ();
                    AttributeReadOnly: interface
                        (ExecutionException) = ();
                    ClassUnavailable:
                        interface (ExecutionException) = ();
15                  EscalationInvalid:
                        interface (ExecutionException) = ();
                    FeatureUnavailable:
                        interface (ExecutionException) = ();
                    InternalException:
20                      interface (ExecutionException) = ();
                    Property Undefined:
                        interface (ExecutionException) = ();
                    ReferenceProtected:
                        interface (ExecutionException) = ();
25                  ReferenceVoid:
                        interface (ExecutionException) = ();
                    ResponderMissing:
                        interface (ExecutionException) = ();
                    ResultInvalid:
30                      interface (ExecutionException) = ();
                    ResultMissing:
                        interface (ExecutionException) = ();
                    VariableUndefined:
                        interface (ExecutionException) = ();
```

- 499 -

```
     Feature:        abstract interface = (
                         public
                             exceptions: Set [Identifier!];

isPublic: Boolean;
5                        system
                             initialize: unprotected op (
                                 isPublic: Boolean|Nil;
                                 exceptions: Set
     [Identifier!]|Nil);
10                       );

Hashed:          abstract interface () = (
                         public
                             hash: abstract readonly Integer;
                         );

15   Identifier:      sealed interface (Primitive, Ordered) =
     ();

Implementation:  sealed interface = (
                         public
                             classMethods, fromMethods,
20                           instanceMethods,setMethods,
                             toMethods: Lexicon [Method];

properties: List [Identifier!];

superclasses: List
                             [Identifier!]|Nil;

25                           vocabulary: Lexicon
                             [Citation]|Nil;
                         system
                             initialize: unprotected op (
```

```
                            - 500 -
                                superclasses: List
                                    [Identifier!]|Nil;
                                vocabulary: Lexicon
                                    [Citation]|Nil;
                                properties: List
                                    [Identifier!]|Nil;
                                instanceMethods, setMethods,
                                    classMethods,
                                fromMethods, toMethods: Lexicon
                                    [Method]|Nil);
                        );

Integer:    sealed interface (Number) = (
                        public
                            modulus, quotient: op (divisor:
                                Integer) Integer
                            throws DivisionByZero;
                    );

Interchanged: abstract interface (Unchanged) = (
                        public
                            digest: abstract readonly
                                protected Object|Nil;
                    );

Interface:  sealed interface = (
                        public
                            classFeatures, instanceFeatures:
                                Lexicon [Feature];

isAbstract: Boolean;

sealedClassFeatures,
                                sealedInstanceFeatures:
                                Set [Identifier!];
```

```
                           - 501 -
                    superclasses: List [Identifier!];

vocabulary: Lexicon [Citation];
               system
                    initialize: unprotected op (
                         superclasses: List
                         [Identifier!]|Nil;
                         vocabulary: Lexicon
                         [Citation]|Nil;
                         instanceFeatures:
                              Lexicon [Feature]|Nil;
                         sealedInstanceFeatures:
                              Set [Identifier!]|Nil;
                         classFeatures: Lexicon
                         [Feature]|Nil;
                         sealedClassFeatures:
                              Set [Identifier!]|Nil;
                         isAbstract: Boolean|Nil);
               );

Kernel
     Exception:     abstract interface
                    (ProgrammingException) = ();

ClassAbstract:interface
                    (KernelException) = ();

ConversionUnavailable:
                         interface (KernelException) = ();

CopyUnavailable:
                         interface (KernelException) = ();

LoopMissing:interface (KernelException)
                         = ();
```

```
                            - 502 -

MarkMissing:interface (KernelException)
                    = ();

ObjectUninitialized:
                    interface (KernelException) = ();

5            PassageInvalid:
                    interface (KernelException) = ();

SelectorDuplicated:
                    interface (KernelException) = ();

Lexicon: interface [valueClass: Class]
 10                 (ConstrainedDictionary [Identifier,
                        valueClass]) = (
                    public
                        constraint: sealed;
                    system
 15                     initialize: unprotected op
                            (keysAndValues: Object ...
                        /* key: Identifier!; value:
                            valueClass */)
                        throws KeyDuplicated, KeyInvalid,
 20                         ObjectsUnpaired;
                    );

List:    interface [itemClass: Class]
                    (Collection [itemClass], Ordered)
                    = (
 25                 public
                        add: unprotected op (position:
                        Integer; item: itemClass) throws
                        ItemInvalid, PositionInvalid;

drop: unprotected op (position:
 30                     Integer) itemClass
```

```
                        - 503 -
                    throws PositionInvalid;

find: op (
                        initialPosition: Integer;
                        item: protected itemClass)
 5                      Integer|Nil
                    throws PositionInvalid;

get: op (position: Integer)
                    itemClass
                    throws PositionInvalid;

10                  reposition: unprotected op
                        (currentPosition, newPosition:
                        Integer)
                    throws PositionInvalid;

set: unprotected op (position:
15                  Integer; item: itemClass) throws
                    ItemInvalid, PositionInvalid;

transpose: unprotected op
                    (position1, position2: Integer)
                    throws PositionInvalid;
20                system
                        initialize: unprotected op (items:
                            itemClass ...);
                );

Mark:   sealed interface (Primitive) = ();

25          Means:  abstract interface = ();

MeetingException:   abstract interface (Exception) = ();

MeetingDenied:
```

- 504 -

```
                           interface (MeetingException) =();
                   MeetingDuplicated:
                           interface (MeetingException) = ();
                   MeetingInvalid:
 5                         interface (MeetingException) = ();
                   PetitionExpired:
                           interface (MeetingException) = ();

MeetingPlace:   abstract interface (Place) = (
                       public 10                         meet: unprotected op (petition:
                               copied Petition) Contact
                           throws MeetingException,
                               ProcessNotCurrent,
                               StateImproper;

15                         part: unprotected op (contact:
                               Contact)

throws MeetingInvalid,
                               ProcessNotCurrent,
                               StateImproper;

20                         partAll: unprotected op ()
                           throws ProcessNotCurrent,
                               StateImproper;
                   );

Method:    sealed interface = (
25                     public
                           procedure: Procedure;

variables: List [Identifier!];
                       system
                           initialize: unprotected op (
```

```
                                    - 505 -
                                    procedure: Procedure|Nil;
                                    variables: List
    [Identifier!]|Nil);
                                );

5  Miscellaneous    abstract interface
                        (ProgrammingException) = ();
        Exception:
                     PatternInvalid: interface
                        (MiscellaneousException) = ();

10                   SeedInvalid:
                        interface (MiscellaneousException) =
    ();

Modifier:    sealed interface (Primitive) = ();

Named:   abstract interface () = (
15                      public
                            name: sealed readonly protected
    Telename;
                     );

Nil:   sealed interface (Primitive) = ();

20      Number:      abstract interface (Primitive, Ordered)
    = (
                        public
                            abs, negate: abstract op ()
    Number;

25                          add, multiply: abstract op
                                (number: Number) Number;

ceiling, floor, round, truncate:
                                abstract op () Integer;
```

```
                        - 506 -
              divide: abstract op (divisor:
                  Number) Number
              throws DivisionByZero;

subtract: abstract op (subtrahend:
 5                Number) Number;
           );

Object:  abstract interface (Referenced) = (
               public
                  class: sealed readonly Class;
10                copy: sealed op () copied Object throws CopyUnavailable;

isEqual: op (object: protected
                  Object) Boolean;

select: sealed op (associations:
15                Object ...

/* protected Object; Executed
                  */)

throws Exception,
                  SelectorDuplicated;

20            size: sealed readonly Integer;
               system
                  finalize, initialize: unprotected
                  op ();
           );

25    Octet:  sealed interface (Primitive, Ordered) =
      ();
```

```
                              - 507 -
         OctetString:   sealed interface (ConstrainedList
                           [Octet], Executed) = (
                           public
                              constraint: sealed;
 5                         system
                              initialize: unprotected op
                                 (segments: Object ...
                                 /* Octet¦protected OctetString!
                                 */);
10                         );

Operation:    sealed interface (Feature) = (
                           public
                              arguments: List [Constraint] ¦Nil;

result: Constraint¦Nil;
15                         system
                              initialize: unprotected op (
                                 arguments: List
    [Constraint]¦Nil;
                                 result: Constraint¦Nil;
20                               isPublic: Boolean¦Nil;
                                 exceptions: Set
    [Identifier!]¦Nil);
                           );

Ordered:      abstract interface () = (
25                         public
                              isAfter, isBefore: abstract op
                                 (object: protected Ordered)
                                 Boolean;
                              max, min: op (object: Ordered)
30                               Ordered;
                           );
```

- 508 -

```
     Package:   interface (ConstrainedSet [Class],
                    Cited, Interchanged) = (
                    public
                        constraint: sealed;
 5                  system
                        initialize: unprotected op (
                            title: Identifier!;
                            majorEdition, minorEdition:
                            Integer;
10                          items: Class ...)
                        throws ItemDuplicated,
                        ProcessNotPeer;
                );

Pattern:   interface (Object, Ordered) = (
15                  public
                        find: op (string: protected
                            String!; position: Integer|Nil)
                            List [Integer]|Nil
                        throws PositionInvalid;
20                      substitute: op (
                            repetitions: Integer;
                            string: unprotected String!;
                            replacement: protected String!)
                            Integer;
25                  system
                        initialize: unprotected op (text:
                            copied String!)
                        throws PatternInvalid;
                );

30   Permit:    interface (Object, Ordered) = (
                    public
                        age, authenticity, charges,
                            extent, priority: Integer|Nil;
```

- 509 -

```
                    canCharge, canCreate, canDeny,
                        canGo, canGrant, canRestart,
                        canSend: Boolean;

intersect: op (permit: Permit)
5                       Permit;

system
                    initialize: unprotected op (age,
                    charges, extent: Integer|Nil);

Petition:  interface = (
10              public
                    agentClass: Citation|Nil;

agentName: Telename|Nil;

maximumWait: Integer|Nil;
                system
15                  initialize: unprotected op (
                        agentName: Telename|Nil;
                        agentClass: Citation|Nil;
                        maximumWait: Integer|Nil);
                );

20   Petitioned: abstract interface () = (
                system
                    meeting: unprotected op (
                        contact: Contact; petition:
                            protected Petition)
25                      throws MeetingDenied;

parting: unprotected op (contact:
                        Contact);
                );
```

```
                              - 510 -
        Place:    abstract interface (Process, Unmoved) =
    (
                     public
                         address: sealed readonly protected
5                            Teleaddress;

publicClasses: sealed readonly Set
                             [Cited];

terminate: sealed unprotected op (
                             occupant: protected Telename)
10                           Boolean
                         throws ProcessNotCurrent,
                             ProcessNotPeer, StateImproper;
                     system
                         entering: unprotected op (
15                           contact: Contact;
                             permit: protected Permit;
                             ticket: protected Ticket|Nil)
                         throws OccupancyDenied;

exiting: unprotected op (
20                           contact: Contact;
                             permit: protected Permit;
                             ticket: protected Ticket|Nil);
                     );

Primitive: abstract interface (Object, Executed,
25                   Unchanged) = (
                     system
                         initialize: unprotected op ()
                         throws FeatureUnavailable;
                     );

30      Primitive   abstract interface
    (ProgrammingException) = ();
```

```
                            - 511 -
        Exception:
                        DivisionByZero: interface
                            (PrimitiveException) = ();

Procedure:      sealed interface (Primitive) = ();

5      Process:        abstract interface (Object, Named,
                        Uncopied) =(
                            public
                                brand: sealed readonly protected
                                Object
10                              throws ProcessNotPeer;

localPermit: sealed copied Permit
                                throws FeatureUnavailable,
                                    PermitViolated;

nativePermit: sealed copied Permit
15                              throws FeatureUnavailable,
                                    PermitViolated;

permit: sealed readonly copied
    Permit;
                                throws ProcessNotPeer;

20                              regionalPermit: sealed copied
    Permit
                                throws FeatureUnavailable,
                                    PermitViolated;

private
25                              age: sealed readonly Integer;

charges: sealed readonly Integer;
```

```
                                    - 512 -
                                contacts: sealed readonly
        Set[Process];

priority: sealed Integer|Nil;

privateClasses: sealed readonly
5                                   Set[Cited];

public
                                charge: sealed op (charges:
                                    Integer)
                                throws PermitInadequate,
10                                  PermitViolated;

restrict_x: sealed op (
                                    procedure: Procedure;
                                    permit: protected Permit)
                                throws Exception, PermitViolated,
15                                  ProcessNotCurrent;

sponsor_x: sealed op (
                                    procedure: Procedure;
                                    permit: protected Permit)
                                throws Exception, PermitViolated,
20                                  ProcessNotCurrent;

wait: unprotected op (seconds:
                                Integer);

system
                                initialize: op (
25                                  nativePermit: copied Permit;
                                    privateClasses: Set
                                    [Cited]|Nil)
                                throws PermitViolated;
```

- 513 -

```
                live: abstract unprotected op
                    (cause: Exception|Nil)
                throws Exception;

restricted: op (permit:
 5                  Identifier; isRelocated:
                    Boolean) PermitReduced|Nil;
            );

Process- abstract interface
                    (ProgrammingException) = ();
10      Exception:
            PermitInadequate:interface
                (ProcessException) = ();

ConditionUnavailable:
                interface (ProcessException) = ();

15          ConditionUndefined:
                interface (ProcessException) = ();

PermitExhausted:
                interface (ProcessException) = ();

PermitViolated:
20              interface (ProcessException) = ();

ProcessNotCurrent:
                interface (ProcessException) = ();

ProcessNotPeer:
                interface (ProcessException) = ();

25          ResourceUnavailable:
                interface (ProcessException) = ();
```

```
                              - 514 -
                    StateImproper:
                        interface (ProcessException) = ()

Programming     abstract interface (Exception) = ();
      Exception:

5     Qualified       sealed interface (Identifier) = ();
      Identifier:

RandomStream:   interface (Stream [Integer]) = (
                         system
                             initialize: unprotected op (seed:
10                              Integer)
                             throws SeedInvalid;
                      );

Real:           sealed interface (Number) = ();

Referenced:     abstract interface () = (
15                       public
                             discard: sealed op ();

isProtected: sealed readonly
                             Boolean;

isSame: sealed op (reference:
20                              protected Referenced) Boolean;

protect: sealed op () protected
                                Referenced;

ref_x: sealed unprotected op ();
                      );

25    Resource:       interface = (
                         public
```

- 515 -

```
                    condition: Identifier!
                    throws ConditionUnavailable;

conditions: readonly protected Set
                        [Identifier!];

5                  use: sealed unprotected op (
                        procedure: Procedure;
                        exclusive: Boolean|Nil;
                        maximumWait: Integer|Nil;
                        conditions: copied Set
10                      [Identifier!]|Nil) Boolean throws ConditionUndefined,
                        Exception, ResourceUnavailable;
                  system
                    initialize: unprotected op (
15                      condition: Identifier!|Nil;
                        conditions: copied Set
                            [Identifier!] |Nil) throws
                            ConditionUndefined;
                  );

20      Selector: sealed interface (Primitive) = ();

Set:    interface [itemClass: Class]
                    (Collection [itemClass], Verified) =
                    (
                  public
25                  difference, intersection, union:
                        unprotected op (set: protected Set
                            [itemClass]);
                  system
                    initialize: unprotected op (items:
30                      itemClass ...)
                        throws ItemDuplicated, ItemInvalid;
```

- 516 -

```
                );

Stack:   interface [itemClass: Class] (List
             [itemClass]) = (
             public
                 pop: unprotected op () itemClass
                 throws StackDepleted;

push: unprotected op (item:
                 itemClass);

pushItems: unprotected op (
                     items: protected List
                     [itemClass]);

roll: unprotected op (shifts,
                     items: Integer)
                 throws ArgumentInvalid,
                 StackDepleted;

swap: unprotected op ()
                 throws StackDepleted;
             );

Stream:  abstract interface [itemClass: Class] =
         (
             public
                 current: abstract readonly
                 itemClass|Nil;

isDone: abstract Boolean;

next: abstract readonly
                 itemClass|Nil
                 throws ReferenceProtected;
             );
```

- 517 -

```
       String:    sealed interface
                       (ConstrainedList [Character], Cased,
                          Executed) = (
                       public
 5                        constraint: sealed;

substring: op (initialPosition,
                              beyondFinalPosition: Integer)
                              copied String
                              throws PositionInvalid;
10                     system
                          initialize: unprotected op
                              (segments: Object ...
                              /* Character|protected String!
                              */);
15                 );

Teleaddress: interface = (
                       public
                          location: String!|Nil;

provider: OctetString!;

20                        routingAdvice: List
                              [OctetString!];
                       system
                          initialize: unprotected op (
                          provider: OctetString!|Nil;
25                        location: String!|Nil);
                   );

Telename:   interface = (
                       public
                          authority: OctetString!;

30                        identity: OctetString!|Nil;
```

- 518 -

```
              system
                  initialize: unprotected op (
                      authority, identity:
                          OctetString!|Nil);
5             );

Telenumber: interface = (
                  public
                      country, telephone: String!;

extension: String!|Nil;
10                system
                      initialize: unprotected op (
                      countryAndTelephone: String!;
                      extension: String!|Nil);
                  );

15  Ticket:    interface (TicketStub) = (
                  public
                      desiredWait, maximumWait:
                      Integer|Nil;

destinationAddress:
20                    Teleaddress|Nil;

destinationClass: Citation|Nil;

destinationName: Telename|Nil;

destinationPermit: Permit|Nil;
                  system
25                    initialize: unprotected op (
                          destinationName: Telename|Nil;
                          destinationAddress:
                          Teleaddress|Nil;
                          destinationClass: Citation|Nil;
```

```
                                    - 519 -
                                        maximumWait: Integer|Nil;
                                        way: Way|Nil;
                                        travelNotes: Object|Nil);
                                );

5       TicketStub:     interface = (
                            public
                                travelNotes: Object|Nil;

way: Way|Nil;
                            system
10                              initialize: unprotected op (
                                    way: Way|Nil;
                                    travelNotes: Object|Nil);
                        );

Time:           interface (Object, Ordered, Unchanged) =
15                      (
                            public
                            adjust: op (seconds: Integer) Time;
                            interval: op (subtrahend: Time) Integer;
                        );

20      TripException:  abstract interface (Exception) = (
                            public
                                ticketStub: sealed TicketStub;
                            system
                                initialize: unprotected op
25                                  (ticketStub: TicketStub);
                        );

DestinationUnavailable:
                            interface (TripException) = ();

DestinationUnknown:
30                          interface (TripException) = ();
```

- 520 -

```
                    OccupancyDenied:
                        interface (TripException) = ();

TicketExpired: interface (TripException)
                        = ();

5                  WayUnavailable: interface
                        (TripException) = ();

Unchanged:  abstract interface () = ();

Unexpected: interface (ExecutionException) = (
        Exception:      public
10                          exception: readonly Exception;
                        system
                            initialize: unprotected op (
                                exception: Exception);
                    );

15      Unmoved:    abstract interface () = ();

Verified:   abstract interface () = (
                        public
                            verify: abstract op () Boolean;
                    );

20      Way:        interface = (
                        public
                            authenticator: Authenticator|Nil;

means: Means|Nil;

name: Telename|Nil;
25                      system
                            initialize: unprotected op (
                                name: Telename|Nil;
```

```
                            - 521 -
                    means: Means|Nil;
                    authenticator:
                        Authenticator|Nil);
                );
5           ) /* Telescript */
```

8     PREDEFINED CLASS GRAPH

The diagram below shows the part of the class graph involving the predefined classes. The immediate subclasses of a class lie indented just below it. Classes
10 which are underlined are abstract. Parentheses ("(" and ")") enclose mix-ins.

Object (Referenced)
- Association (Ordered)
- Authenticator
15 • Calendar Time
- Citation (Ordered)
- Class (Cited & Interchanged)
- Class Definition
- Collection
20 • • List (Ordered)
- • • Constrained List (Constrained)
- • • • Bit String (Executed)
- • • • Octet String (Executed)
- • • • String (Cased & Executed)
25 • • Stack
- • Set (Verified)
- • • Constrained Set (Constrained)
- • • • Package (Cited & Interchanged)
- • • Dictionary
30 • • • Constrained Dictionary (Constrained)
- • • • • Lexicon
- Constraint
- Contact
- Exception (Unchanged)

8 PREDEFINED CLASS GRAPH

The diagram below shows the part of the class graph involving the predefined classes. The immediate subclasses of a class lie indented just below it. Classes which are underlined are abstract. Parentheses ("(" and ")") enclose mix-ins.

```
Object (Referenced)
•       Association (Ordered)
•       Authenticator
•       Calendar Time
•       Citation (Ordered)
•       Class (Cited & Interchanged)
•       Class Definition
•       Collection
•       •       List    (Ordered)
•       •       •       Constrained List (Constrained)
•       •       •       •       Bit String (Executed)
•       •       •       •       Octet String (Executed)
•       •       •       •       String (Cased & Executed)
•       •       •       Stack
•       •       Set     (Verified)
•       •       •       Constrained Set (Constrained)
•       •       •       •       Package (Cited & Interchanged)
•       •       •       Dictrionary
•       •       •       •       Constrained Dictionary (Constrained)
•       •       •       •       •       Lexicon
•       Constraint
•       Contact
•       Exception (Unchanged)
•       •       Meeting Exception
•       •       Programming Exception
•       •       •       Class Exception
•       •       •       Collection Exception
•       •       •       Kernel Exception
•       •       •       •       Execution Exception
•       •       •       •       •       Unexpected Exception
•       •       •       Miscellaneous Exception
•       •       •       Primitive Exception
•       •       •       Process Exception
•       •       Trip Exception
•       Feature
•       •       Attribute
•       •       Operation
•       Implementation
•       Interface
•       Means
•       Method
•       Pattern (Ordered)
•       Permit (Ordered)
•       Petition
•       Primitive (Executed & Unchanged)
•       •       Bit (Ordered)
•       •       Boolean (Ordered)
•       •       Character (Cased & Ordered)
•       •       Identifier (Ordered)
•       •       •       Qualified Identifier
•       •       Mark
•       •       Modifier
•       •       Nil
•       •       Number (Ordered)
•       •       •       Integer
•       •       •       Real
•       •       Octet (Ordered)
•       •       Procedure
•       •       Selector
•       Process (Named)
•       •       Agent
•       •       Place (Unmoved)
•       •       •       Meeting Place
•       Resource
•       Stream
•       •       Random Stream
•       Teleaddress
•       Telename
•       Telenumber
•       Ticket Stub
•       •       Ticket
•       Time (Ordered & Unchanged)
•       Way
        Cased
        Cited
        Constrained
        Contracted
        Executed
        Hashed
        Named
        Ordered
        Petitioned
        Referenced
        Unchanged
•          Interchanged
Unmoved
Verified
```

APPENDIX B

Copyright © General Magic, Inc. 1991, 1992, 1993. All Rights Reserved

The following Table of Contents is to assist the reader in understanding the organization of and locating information within this appendix.

| Table of Contents | |
|---|---|
| 1 | INTRODUCTION |
| 1.1 | Organization |
| 1.2 | References |
| 2 | ENCODING CONCEPTS |
| 2.1 | Teleparcel |
| 2.2 | Object Encoding |
| 2.2.1 | Forms |
| 2.2.2 | Rules |
| 2.2.3 | Palettes |
| 2.2.4 | Encoding Classes |
| 2.2.5 | Encoding Attributes |
| 2.3 | Attribute Encoding |
| 2.3.1 | Forms |
| 2.3.2 | Rules |
| 2.4 | Reference Encoding |
| 2.4.1 | Forms |
| 2.4.2 | Rules |
| 3 | ENCODING SPECIFICATIONS |
| 3.1 | Conventions |
| 3.2 | Teleparcel |
| 3.3 | Object Encoding |
| 3.3.1 | Executed Object |
| 3.3.2 | Predefined Object |
| 3.3.3 | User-defined Object |
| 3.3.4 | Protected Object |
| 3.3.5 | Palette |
| 3.4 | Attribute Encoding |
| 3.4.1 | Boolean |
| 3.4.2 | Dial String |
| 3.4.3 | Integer |
| 3.4.4 | Item |
| 3.4.5 | List |
| 3.4.6 | Octet String |
| 3.4.7 | Stack |
| 3.4.8 | String |
| 3.5 | Reference Encoding |
| 3.5.1 | General Reference |
| 3.5.2 | Voided Reference |
| 3.5.3 | Interchange Reference |
| 3.5.4 | Class Reference |
| 3.5.5 | Procedure Reference |
| 4 | ENCODING CLASSES AND ATTRIBUTES |
| 4.1 | Conventions |
| 4.2 | Encoding Group |
| 4.2.1 | Catch Frame |
| 4.2.2 | Collection Stream |
| 4.2.3 | Dial String |
| 4.2.4 | Frame |
| 4.2.5 | Go Frame |
| 4.2.6 | Predefined Frame |
| 4.2.7 | Procedure Frame |
| 4.2.8 | Repeat Frame |

Table of Contents
-continued

| | |
|---|---|
| 4.2.9 | Restrict Frame |
| 4.2.10 | Send Frame |
| 4.2.11 | Use Frame |
| 4.2.12 | User-defined Frame |
| 4.2.13 | While Frame |
| 4.3 | Encoding Attributes |
| 4.3.1 | Agent |
| 4.3.2 | Catch Frame |
| 4.3.3 | Collection |
| 4.3.4 | Collection Stream |
| 4.3.5 | Dictionary |
| 4.3.6 | List |
| 4.3.7 | Pattern |
| 4.3.8 | Procedure Frame |
| 4.3.9 | Random Stream |
| 4.3.10 | Repeat Frame |
| 4.3.11 | Restrict Frame |
| 4.3.12 | Send Frame |
| 4.3.13 | Stack |
| 4.3.14 | Time |
| 4.3.15 | Use Frame |
| 4.3.16 | User-defined Frame |
| 4.3.17 | While Frame |
| 5 | ENCODING PALETTES |
| 5.1 | Conventions |
| 5.2 | Language Classes |
| 5.2.1 | Agent |
| 5.2.2 | Association |
| 5.2.3 | Attribute |
| 5.2.4 | Calendar Time |
| 5.2.5 | Citation |
| 5.2.6 | Class |
| 5.2.7 | Class Definition |
| 5.2.8 | Collection |
| 5.2.9 | Constrained Dictionary |
| 5.2.10 | Constrained List |
| 5.2.11 | Constrained Set |
| 5.2.12 | Constraint |
| 5.2.13 | Contact |
| 5.2.14 | Dictionary |
| 5.2.15 | Implementation |
| 5.2.16 | Interface |
| 5.2.17 | Lexicon |
| 5.2.18 | List |
| 5.2.19 | Method |
| 5.2.20 | Mix-in |
| 5.2.21 | Operation |
| 5.2.22 | Package |
| 5.2.23 | Pattern |
| 5.2.24 | Permit |
| 5.2.25 | Petition |
| 5.2.26 | Random Stream |
| 5.2.27 | Resource |
| 5.2.28 | Set |
| 5.2.29 | Stack |
| 5.2.30 | Teleaddress |
| 5.2.31 | Telename |
| 5.2.32 | Telenumber |
| 5.2.33 | Ticket |
| 5.2.34 | Ticket Stub |
| 5.2.35 | Time |
| 5.2.36 | Trip Exception |
| 5.2.37 | Unexpected Exception |
| 5.2.38 | Way |
| 5.3 | Encoding Classes |
| 5.3.1 | Catch Frame |
| 5.3.2 | Collection Stream |
| 5.3.3 | Predefined Frame |
| 5.3.4 | Repeat Frame |
| 5.3.5 | Restrict Frame |
| 5.3.6 | Send Frame |
| 5.3.7 | Use Frame |
| 5.3.8 | User-defined Frame |
| 5.3.9 | While Frame |

1. INTRODUCTION

Section 1 of Appendix A of this disclosure introduces the major elements of the present invention and that discussion is incorporated herein by reference. The conventions described in Section 1.4.3 of Appendix A are followed in this appendix as well.

1.1 Organization

This appendix is divided into three sections. Section 1 is this introduction. Section 2 introduces the Encoding Rules' major concepts. Section 3 defines the predefined classes and attributes—beyond those in the Instruction Set—that are used in encoding.

1.2 References

This appendix relies upon these other documents:

[10646]

*Information technology—Universal Coded Character Set* (UCS), ISO/IEC DIS 10646, International Organization for Standardization and International Electrotechnical Commission, 1990.

[Telescript]

Appendix A of this disclosure.

[Unicode]

*The Unicode Standard: Worldwide Character Encoding*, Volume 1, Version 1.0, The Unicode Consortium, Addison-Wesley, 1991.

2 ENCODING CONCEPTS

Teleparcels are conceived in this section of this appendix. Subsections are devoted to teleparcels and to object, attribute, and reference encodings.

2.1 Teleparcel

A "teleparcel" encodes an object, which is the teleparcel's "subject", the subject's components, and all of their components, recursively. The class of the subject or any component can be either predefined or user-defined.

Note: A teleparcel is a Telescript object in its canonical form.

Note: A teleparcel is the means by which an object is transported between two Engines. A source Engine transforms an object into a teleparcel and transports it to a destination Engine. The latter transforms the teleparcel into an object, thereby producing at the destination the same object consumed at the source.

Note: A teleparcel's subject is typically, although not exclusively, an agent. In such cases, the teleparcel encompasses the agent and all the objects the agent owns, including those that make up the agent's current execution state.

2.2 Object Encoding

An "object encoding" encodes an object and a reference to the object.

2.2.1 Forms

An object encoding assumes one of these forms:

Executed

An "executed object encoding" encodes an executed object.

Predefined

A "predefined object encoding" encodes an unexecuted object whose class is predefined.

User-defined

A "user-defined object encoding" encodes an object whose class is user-defined.

Protected

A "protected object encoding" encodes an arbitrary object.

Encoding an object also encodes a reference to the object. The reference is protected iff either the object is unchanged or the object encoding's form is protected.

2.2.2 Rules

The form of the object encoding for an object, and a reference, shall be selected in accordance with the following rules, applied in the order given:

1. A protected object encoding shall be selected if the reference is protected and the object is not unchanged.
2. An executed object encoding shall be selected if the object is executed.
3. A predefined object encoding shall be selected if the class of the object is predefined.
4. A user-defined object encoding shall be selected (otherwise).

2.2.3 Palettes

An object encoding can draw upon an "encoding palette", which is a set of predefined attributes and rules governing their inclusion in an object encoding.

A predefined or user-defined object encoding draws upon a "primary" palette determined by the predefined class of which the encoded object, "O", is an example. An object is an "example" of a predefined class iff the object is an implementation member of that class but of no predefined subclass thereof.

A user-defined object encoding also draws upon a "secondary" palette, which is defined in section 5.2.20 of this appendix, iff "O" is cited, constrained, or named while an instance of the predefined class of which "O" is an example is not cited, constrained, or named.

Each predefined attribute in a palette is designated either mandatory or optional. A "mandatory" attribute shall be represented in an encoding that draws upon the palette, while an "optional" attribute may, but need not, be represented. A number is assigned, for encoding purposes, to each optional attribute.

Note: No object is an example of a mix-in.

2.2.4 Encoding Classes

The encoding palettes admit encoding classes as described in Section 4.2 of this appendix. An "encoding class" is a predefined class—beyond the "language classes" which are classes described in Appendix A of this disclosure—that supports the Instruction Set for encoding purposes but is not part of the Instruction Set.

Note: An encoding class' only purpose is to define encoding attributes. Such a class has no initialization parameters, operations, adaptations, or conversions.

2.2.5 Encoding Attributes

The encoding palettes admit encoding attributes as described in Section 4.3 of this appendix. An "encoding attribute" is a predefined attribute—beyond the "language attributes" which are described in Appendix A of this disclosure—that supports the Instruction Set for encoding purposes but is not part of the Instruction Set. Every encoding attribute is a system instance attribute.

Note: An encoding attribute does not preclude the interface of a user-defined class from providing an attribute with the same identifier.

2.3 Attribute Encoding

An "attribute encoding" encodes a predefined attribute and a reference to the attribute.

2.3.1 Forms

An attribute encoding assumes one of these forms:

Boolean

A "boolean attribute encoding" encodes an instance of class "Boolean".

Dial String

A "dial string attribute encoding" encodes an instance of class "Dial String".

Integer

An "integer attribute encoding" encodes an instance of class "Integer".

Item

An "item attribute encoding" encodes an object or a reference to the object.

List

A "list attribute encoding" encodes an instance of class "List".

Octet String

An "octet string attribute encoding" encodes an instance of class "Octet String".

Stack

A "stack attribute encoding" encodes an instance of class "Stack".

String

A "string attribute encoding" encodes an instance of class "String".

2.3.2 Rules

The form of the attribute encoding for an attribute shall be selected in accordance with the following rules, applied in the order given:

1. An attribute encoding other than an item attribute encoding shall be selected if the attribute is an instance of the required class.
2. An item attribute encoding shall be selected (otherwise).

2.4 Reference Encoding

A "reference encoding" encodes a reference to an object that is encoded by an object encoding.

2.4.1 Forms

A reference encoding assumes one of these forms:

General

A "general reference encoding" encodes a (protected or unprotected) reference that denotes an object by means of the "offset" in octets from the start of the reference encoding to the start of the object encoding. The offset is positive or negative if the object's encoding follows or precedes the reference's, respectively. Offsets shall be negative; positive offsets are reserved.

Voided

A "voided reference encoding" encodes a reference that is voided.

Interchange

An "interchange reference encoding" encodes a reference that denotes an interchanged object by means of both the object's digest and a citation to the class of which the object is an instance.

Class

A "class reference encoding" encodes a reference that denotes a class by means of either the class' numeric code, if the class is predefined, or a citation to the class, if the class is user-defined.

Procedure

A "procedure reference encoding" encodes a reference to a procedure that is in the implementation of a user-defined class. A procedure reference encoding shall be used to encode only the "procedure" attribute of a predefined frame, F. A procedure reference encoding expresses, by means of an integer, the procedure's position in the "procedure" attribute of the procedure frame, "B", just below "F" in the "frames" attribute of which "F" is an item. The integer is either the position itself, if the integer is greater than or equal to one, or one plus the arithmetic difference between the position, the minuend, and the "position" attribute of F, the subtrahend, otherwise.

2.4.2 Rules

The form of the reference encoding of a reference to an object shall be selected in accordance with the following rules, applied in the order given:

1. A voided reference encoding shall be selected if the reference has been voided.
2. A class reference encoding shall be selected if the object is a predefined class.
3. A general reference encoding shall be selected if the object is encoded as part of the teleparcel, rather than presumed present at the teleparcel's destination.
4. A class or procedure reference encoding shall be selected if the object is a user-defined class or a procedure in a user-defined class implementation, respectively.
5. An interchange reference encoding shall be selected (otherwise).

Note: Thus Rule 3 applies iff the object is encoded as part of the teleparcel, rather than presumed present at the teleparcel's destination.

3 ENCODING SPECIFICATIONS

Teleparcels are defined in this section of this appendix. Subsections are devoted to teleparcels and to object, attribute, and reference encodings.

3.1 Conventions

A teleparcel is a series of tokens, each of which is zero or more octets. The teleparcel is the octet string obtained by concatenating the tokens.

A teleparcel obeys the syntactic, and accompanying semantic, rules below. Given in BNF (Backus-Naur or Backus normal form), the rules surround optional tokens by brackets ("[" and "]").

Table B.1 assigns codes to the forms of object and reference encoding. These codes are used as tags in the sections below.

TABLE B.1

| | |
|---|---|
| -50 | ProcedureReference |
| -51 | InterchangeReference |
| -52 | UnprotectedReference |
| -53 | PredefinedClassReference |
| -54 | ProtectedReference |
| -55 | ProtectObject |
| -56 | — |
| -57 | — |
| -58 | UserDefinedClassReference |
| -59 | VoidedReference |
| -60 | Mixins |

Note: The sections below follow the conventions of Sections 5.1 and 5.3 of Appendix A of this disclosure.

3.2 Teleparcel

A teleparcel obeys this rule:

Teleparcel ::=unsignedNumber unsignedNumber Object

The first and second "unsignedNumber" encode the number of the major and minor versions of the Encoding Rules to which the teleparcel conforms, respectively. "Object" encodes the teleparcel's subject and the subject's components.

Note: The numbers of the major and minor versions of the Encoding Rules that this appendix defines are 0 and 5, respectively.

3.3 Object Encoding

An objects encoding obeys this rule, which reflects the defined forms:

Object ::= ExecutedObject | PredefinedObject
         | userDefinedObject | ProtectedObject

3.3.1 Executed Object

An executed object encoding obeys the rule set out in Sectins 5.1 and 5.3 of Appendix A of this disclosure.

The tag that is the first token in "ExecutedObject" identifies the object as executed and reveals the object's class by encoding twice the class' code.

Note: An executed object is encoded as in a binary telescript.

3.3.2 Predefined Object

A predefined object encoding obeys this rule:

PredefinedObject ::=tag Palette

The tag identifies the object as predefined and reveals the object's class by encoding twice the class' code. The "Palette" draws upon the primary encoding palette for the class of which the object is an example.

3.3.3 User-defined Object

A user-defined object encoding obeys this rule:

| UserDefinedObject | ::= | [Palette Mixins) tag Item Item |
|---|---|---|
| Palette Mixins | ::= | tag |

The first "tag" identifies the object as user-defined and reveals the class of which the object is an example by encoding one plus twice the class' code.

The first "Item" encodes the object's class, the second a list whose items correspond to the user-defined implementation superclasses of that class in their canonical order. Each item is itself a list, a list of the properties of the instance native to the class to which the item corresponds, in the order of their identifiers in the "properties" attribute of the class' implementation. The final one or more properties can be omitted, in which case nils are implied.

The first "Palette" draws upon the secondary encoding palette and is present iff "Mixins" is present. The second "Palette" draws upon the primary palette for the class of which the object is an example.

3.3.4 Protected Object

A protected object encoding obeys these rules:

| ProtectedObject | ::= | tag ProtectedObjectItself |
|---|---|---|
| ProtectedObjectItself | ::= | ExecutedObject | |
| | | PredefinedObject | |
| | | UserDefinedObject |

The "tag" identifies the reference as protected. The "ExecutedObject", the "PredefinedObject", or the "UserDefinedObject" encodes the object.

3.3.5 Palette

An encoding palette's encoding obeys these rules:

| Palette | ::= | Attributes [Mask Attributes] |
|---|---|---|
| Mask | ::= | unsignedNumber |
| Attributes | ::= | [Attribute Attributes] |

The first "Attributes" encodes the zero or more attributes that the palette declares mandatory, in the order in which they are listed in the table that defines the palette. The table fixes the number of occurrences of "Attribute".

The "Mask" and the second "Attributes" are present iff the palette declares any attributes optional. The second "Attributes" encodes zero or more of the optional attributes. The "Mask" fixes the number of occurrences of "Attribute".

The "Mask" encodes an integer indicating which optional attributes the second "Attributes" encodes. The palette's table numbers the optional attributes in the range of [1, n].

The second "Attributes" includes an encoding of the attribute numbered "i" iff the bit in the integer's representation weighted $2^{i-1}$ is one. The attributes actually encoded appear in the second "Attributes" in order of increasing "i". Bits logically required by "n" but physically absent from "Mask" shall be considered zero. Bits physically present but logically not required shall be ignored.

3.4 Attribute Encoding

An attribute encoding obeys this rule, which reflects the defined forms:

```
Attribute    ::=    Boolean | DialString | Integer
                    Item | List | OctetString | String
```

3.4.1 Boolean

A boolean attribute encoding obeys this rule:

```
Boolean ::=empty
```

The boolean attribute encoding is present iff the boolean is "true".

Note: The encoding's presence is indicated by the mask that encompasses the encoding.

Note: Thus a palette's boolean attributes are necessarily optional.

3.4.2 Dial String

A dial string attribute encoding obeys this rule:

```
DialString ::=OctetString
```

The "OctetString" encodes the octet string, "O", determined by the list, "L", of nibbles determined in turn by the dial string, "D", and having the same length.

A nibble of "L" encodes unsigned the integer in the range [0, 14] determined by the character of "D" at the same position. The numerals ("0"–"9") determine 0–9, a dash ("-") determines 13, and a space (" ") determines 14. The nibble of "L" at position 2i−1 or 2i, "i" being at least one, occupies Bits 7-4 or 3-0, respectively, of the octet of "O" at position "i". Bit 7 or 3, respectively, is the MSB, Bit 4 or 0, respectively, the LSB. If the length of "D" and thus "L" is odd, Bits 3-0 of the last octet of "O" encode 15 in the same way.

Note: Thus a dial string is encoded in a form of Binary Coded Decimal (BCD).

3.4.3 Integer

An integer attribute encoding obeys this rule:

```
Integer ::=signedNumber
```

The "signedNumber" encodes the integer.

Note: This is a binary telescript encoding of an integer, except that the initial token, identifying the encoding as an integer's general encoding, is absent.

3.4.4 Item

An item attribute encoding obeys this rule:

```
Item ::=Object | Reference
```

The "Object" or "Reference" encodes the object or a reference to the object, respectively.

3.4.5 List

A list attribute encoding obeys these rules:

```
List     ::=    unsignedNumber Items
Items    ::=    [Item Items]
```

The "unsignedNumber" and "Items" together encode the list. The former encodes the number of occurrences of "Item" in the latter, which in turn encode the items of the list in order of increasing position.

3.4.6 Octet String

An octet string attribute encoding obeys this rule:

```
OctetString ::=unsignedNumber Octets
```

The "unsignedNumber" and "Octets" together encode the octet string as specified in Section 5.3.2 of Appencix A of this disclosure.

Note: This is a binary telescript encoding of an octet string, except that the initial token, identifying the encoding as an octet string's, is absent.

3.4.7 Stack

A stack attribute encoding obeys the same rules as a list attribute encoding, except that the items of the stack are encoded in order of decreasing position.

3.4.8 String

A string attribute encoding obeys this rule:

```
String ::=unsignedNumber characters
```

The "unsignedNumber" and "characters" together encode the string as specified in section 5.3.2 of Appendix A of this disclosure.

Note: This is a binary telescript encoding of a string, except that the initial token, identifying the encoding as a string's, is absent.

3.5 Reference Encoding

A reference encoding obeys this rule, which reflects the defined forms:

```
Reference    ::=    GeneralReference |
                    VoidedReference |
                    InterchangeReference |
                    ClassReference |
                    ProcedureReference
```

3.5.1 General Reference

A general reference encoding obeys these rules. One encoding is defined for unprotected references, another for protected references:

```
GeneralReference       ::=    UnprotectedReference
                              ProtectedReference
UnprotectedReference   ::=    tag signedNumber
ProtectedReference     ::=    tag signedNumber
```

The "tag" identifies the general reference as such and as either unprotected or protected. The "signedNumber" encodes the offset from the reference encoding to the object encoding of the referenced object.

3.5.2 Voided Reference

A voided reference encoding obeys this rule:

```
VoidedReference ::=tag
```

The "tag" identifies the voided reference as such.

3.5.3 Interchange Reference

An interchange reference encoding obeys this rule:

```
InterchangeReference ::=tag Item Item
```

The "tag" identifies the interchange reference as such. The first "Item" encodes a citation to the interchanged object's class. The second "Item" encodes the interchanged object's digest.

3.5.4 Class Reference

A class reference encoding obeys these rules. One encoding is defined for predefined classes, another for user-defined classes:

```
ClassReference    ::=    PredefinedClassReference |
```

```
                                    UserDefinedClassReference
PredefinedClassReference    ::=   tag unsignedNumber
UserDefinedClassReference   ::=   tag Item
```

The "tag" identifies the class reference as such and the class as either predefined or user-defined. If the class is predefined, the "unsignedNumber" encodes the code assigned to the class either in Section 5.4.1 of Appendix A of this disclosure or in Table B.2, below, of this appendix. If the class is user-defined, the "Item" encodes the class' citation.

3.5.5 Procedure Reference

A procedure reference encoding obeys this rule:

```
ProcedureReference ::=tag signedNumber
```

The "tag" identifies the procedure reference as such. The "signedNumber" identifies the procedure's position as previously described.

4 ENCODING CLASSES AND ATTRIBUTES

Telescript's encoding classes and attributes are defined in this section of this appendix. A subsection is devoted to first the encoding of classes and then the encoding of attributes.

4.1 Conventions

Encoding Classes

The encoding classes form a group. The section below that defines this group follows the conventions, e.g., of Section 3.2 of Appendix A of this disclosure.

Table B.2 assigns identifier codes to the encoding classes.

TABLE B.2

| | |
|---|---|
| 144 | CatchFrame |
| 145 | CollectionStream |
| 146 | — |
| 147 | PredefinedFrame |
| 148 | GoFrame |
| 149 | RepeatFrame |
| 150 | RestrictFrame |
| 151 | SendFrame |
| 152 | UseFrame |
| 153 | UserDefinedFrame |
| 171 | WhileFrame |

Note: Classes "Frame" and "Procedure Frame" require no codes because they are abstract. Class "Dial String" requires no code because its instances have their own encodings.

Note: Because an encoding class' only purpose is to define encoding attributes, this appendix does not devote a major section to each encoding class, even though Appendix A devotes such a section, e.g., Section 4.2 to every language class.

Encoding Attributes

The encoding attributes are native to certain language and encoding classes. The section below that defines the encoding attributes devotes a subsection to each predefined class to which such attributes are native. The classes are considered in alphabetical order. An encoding attribute's definition follows the conventions established in Section 4.1 of Appendix A of this disclosure.

Note: Identifier codes need not be assigned to the encoding attributes.

4.2 Encoding Group

```
Object (Referenced)
 •   Collection
 •    •   List (Ordered)
 •    •    •   Constrained List (Constrained)
 •    •    •    •   String (Cased & Executed)
 •    •    •    •    •   Dial String
 •   Frame
 •    •   Procedure Frame
 •    •    •   Predefined Frame
 •    •    •    •   Catch Frame
 •    •    •    •   Repeat Frame
 •    •    •    •   Restrict Frame
 •    •    •    •   Use Frame
 •    •    •    •   While Frame
 •    •    •   User-defined Frame
 •    •   Go Frame
 •    •    •   Send Frame
 •   Stream
 •    •   Collection Stream
```

4.2.1 Catch Frame

Attributes exception

A "catch frame" is a predefined frame whose subject method is the method for "catch" and whose "procedure" attribute is the operation's responder.

A catch frame's native attribute is the class that is the operation's argument (attribute "exception").

4.2.2 Collection Stream

Attributes position source

A "collection stream" is a stream whose items are those of a collection.

A collection stream's native attributes are the stream's source (attribute "source") and the stream's current position (attribute "position"). The "source" is the collection whose items the collection stream produces. The "current position" is a position in the "items" attribute encoding the collection stream's source. The collection stream last produced the item at the stream's current position, previously produced any items at positions before the current position, and has yet to produce any items at positions after the current position.

Note: A collection stream is the result of the "stream" operation when the latter is performed by a collection.

4.2.3 Dial String

A "dial string" is a string each item of which is either a numeral ("0"–"9"), a hyphen ("-"), or a space (" ").

Note: Dial strings are used in telenumbers.

4.2.4 Frame

A "frame" is an object recording the current state of a performance of a predefined or user-defined method, the frame's "subject method".

4.2.5 Go Frame

A "go frame" is a frame entailing the taking of a trip. The method is the predefined method for either operations "go" or "send", the former in the case of an instance of this class, the latter in the case of an instance of this class' subclass.

4.2.6 Predefined Frame

A "predefined frame" is a procedure frame whose subject method is predefined, and thus whose procedure is not that method. The subject method of an instance of this class is the method for operations "do", "either", "if", "loop", or "select".

Note: Which of the above operations applies is determined by examining the identifier by means of whose execution the operation was requested.

4.2.7 Procedure Frame

Attributes position procedure

A "procedure frame" is a frame entailing a procedure's performance.

A procedure frame's native attributes are the procedure being performed (attribute "procedure") and the procedure's current position (attribute "position"). A procedure's "current position" is that of the item the Engine is currently executing.

Note: The procedure is either the "procedure" attribute of the subject method, the responder of the feature the method implements, or an argument of the feature.

4.2.8 Repeat Frame

Attributes repetitions repetitionsSoFar

A "repeat frame" is a predefined frame whose subject method is the method for operations "repeat" and whose "procedure" attribute is that operation's responder.

A repeat frame's native attributes are the number of performances of the frame's "procedure" attribute, including the current performance, that have been initiated (attribute "repetitionsSoFar"), and the number requested at the outset (attribute "repetitions").

4.2.9 Restrict Frame

Attributes permit

A "restrict frame" is a predefined frame whose subject method is the method for operations "restrict" and whose "procedure" attribute is that operation's argument.

A restrict frame's native attribute is the permit the subject held at the start of the Engine's performance of the subject method (attribute "permit").

4.2.10 Send Frame

Attributes tickets

A "send frame" is a go frame whose subject method is the predefined method for operations "send".

A send frame's native attribute comprises one or more of the tickets originally in the operation's argument (attribute "tickets").

4.2.11 Use Frame

Attributes resource

A "use frame" is a predefined frame whose subject method is the method for operations "use" and whose "procedure" attribute is one of the operation's arguments.

A use frame's native attribute is the operation's responder (attribute "resource").

4.2.12 User-defined Frame

Attributes responder stack variables

A "user-defined frame" is a procedure frame whose procedure is that of the frame's subject method. The subject method is user-defined and is necessarily a value of an implementation's "instanceMethods" or "setMethods" attribute.

A user-defined frame's native attributes are the method's responder (attribute "responder"), stack (attribute "stack"), and variables (attribute "variables"), the latter in the order of their identifiers in the method's "variables" attribute. The responder is the agent of whose "frames" attribute the user-defined frame is an item.

Note: Let "I", if any be an item in the "procedure" attribute of the frame, "B", if any below the user-defined frame in the agent's "frames" attribute. In particular, let "I" be the item whose position in the "procedure" attribute is the "position" attribute of "B". "I" is either (a) non-existent: the subject method is for operations "live"; (b) an identifier preceded by a "setAttribute" modifier: the subject method is a value in an implementation's "setMethods" attribute; (c) an identifier not so preceded: the subject method is a value in an implementation's "instanceMethods" attribute; or (d) an "escalate" selector: the subject method is as described in either (b) or (c) above.

4.2.13 While Frame

Attributes isPrecondition precondition

A "while frame" is a predefined frame whose subject method is the method for operations "while" and whose "procedure" attribute is that operation's responder.

A while frame's native attributes reveal the executed object that is the operation's argument (attribute "precondition") and whether the argument, rather than the responder, is being performed (attribute "isPrecondition"). The while frame's "position" attribute pertains to whichever of the two procedures is being performed.

4.3 Encoding Attributes

The encoding attributes are defined below.

4.3.1 Agent

Native to this class are the following encoding attributes.

frames:

sealed Stack[Frame]!;

The responder's pending frames. The bottom frame's subject method is a user-defined method for operations "live". The top frame's subject method is the built-in method for operations "go" or "send". There are zero or more other frames.

nativePermit:

sealed copied Permit|Nil;

Either the responder's native permit, if it differs from the permit the responder holds, or a nil, otherwise.

4.3.2 Catch Frame

Native to this class is the following encoding attribute.

exception:

sealed Class;

The class—either class "Exception" or a subclass thereof—that is performing the responder's subject method.

4.3.3 Collection

Native to this class is the following encoding attribute.

items:

sealed List[Object]!;

The responder's items. The position of any particular item is undefined.

4.3.4 Collection Stream

Native to this class are the following encoding attributes.

position:

sealed Integer3Nil;

Either the current position in the responder, if the responder has produced neither none nor all of its items, or a nil, otherwise.

source:

sealed Collection[Object]|Nil;

Either the responder's source, if the responder has not produced all of its items, or a nil, otherwise.

4.3.5 Dictionary

Native to this class is the following encoding attribute.

associations:

sealed List[Object]!;

The keys and values that form the responder's items. The items at positions 2i−1 and 2i of the list are a key and its associated value, respectively. The position of any particular key-value pair is undefined.

4.3.6 List
Native to this class is the following encoding attribute.
items:
sealed List[Object]!;
The responder's items.
4.3.7 Pattern
Native to this class is the following encoding attribute.
text:
sealed copied String;
The responder's text.
4.3.8 Procedure Frame
Native to this class are the following encoding attributes.
position:
sealed Integer;
The current position in the responder's "procedure" attribute.
procedure:
sealed Procedure;
The procedure whose performance the responder entails.
4.3.9 Random Stream
Native to this class is the following encoding attribute.
seed:
sealed Integer;
Either the responder's seed, if the responder has not produced an item, or the item the responder produced last, otherwise.
4.3.10 Repeat Frame
Native to this class are the following encoding attributes.
repetitions:
sealed Integer;
The number of performances of the responder's "procedure" attribute requested of the responder's subject method via the argument of operations "repeat".
repetitionsSoFar:
sealed Integer;
The number of performances of the responder's "procedure" attribute, including the current performance, initiated so far.
4.3.11 Restrict Frame
Native to this class is the following encoding attribute.
permit:
sealed copied Permit;
The permit the subject held at the start of the performance of the responder's subject method.
4.3.12 Send Frame
Native to this class is the following encoding attribute.
tickets:
sealed List[Ticket]!;
One or more of the tickets in the list supplied as the argument of the responder's subject method. The position of any particular ticket is undefined.
4.3.13 Stack
Native to this class is the following encoding attribute.
items:
sealed Stack[Object]!;
The responder's items.
4.3.14 Time
Native to this class are the following encoding attributes.
dst:
sealed Integer;
The "dst" attribute of the calendar time that would have been produced, when and where the responder was produced, by requesting "new" of class "Time" and converting its result to a calendar time.
second:
sealed Integer;
The "second" attribute of the unnormalized calendar time that denotes the same absolute point in time, "T", as does the responder, but that would denote time "$T_0$" if its "second" attribute alone were set to zero.
Note: $T_0$ is the time relative to which all times are measured. It coincides with the start of a minute in the Gregorian calendar. This attribute, then, is the number of seconds that separate T from $T_0$. The attribute is strictly positive or negative if the time follows or precedes $T_0$, respectively.
zone:
sealed Integer;
The "zone" attribute of the calendar time that would have been produced, when and where the responder was produced, by requesting "new" of class "Time" and converting its result to a calendar time.
4.3.15 Use Frame
Native to this class is the following encoding attribute.
resource:
sealed Resource;
The resource performing the responder's subject method.
4.3.16 User-defined Frame
Native to this class are the following encoding attributes.
responder:
sealed Object;
The responder of the responder's subject method.
stack:
sealed Stack[Object]!;
The stack of the responder's subject method.
variables:
sealed List[Object]!;
The variables of the responder's subject method.
4.3.17 While Frame
Native to this class are the following encoding attributes.
isPrecondition:
sealed Boolean;
Whether the responder's "precondition" attribute, rather than its "procedure" attribute, is being performed.
precondition:
sealed Executed;
The argument of operations "repeat".
5 ENCODING PALLETTES
Telescript's encoding palettes are defined in this section of the appendix. One section is devoted to language classes, another to encoding classes. All Engines of a network must agree on the following: (i) the method by which an assigned teleaddress' "provider" attribute is selected, and (ii) the method by which an assigned telename's "authority" attribute is selected. One embodiment of each of these methods is implemented in the computer software included as Microfiche Appendix G of this disclosure.
5.1 Conventions
A subsection is devoted below to each predefined flavor whose examples are encoded using a non-empty primary palette. First the language flavors and then the encoding flavors are considered in alphabetical order. One additional subsection, entitled Mix-in, is devoted to the one secondary palette.
Most every palette is defined using a table whose columns are labeled, and whose rows define predefined attributes, as follows.

. Either "M", if the attribute is mandatory, or the number assigned to the attribute, if the attribute is optional.

Attribute. The attribute's identifier.

Sender. The attribute's type, defined using the notation of Section A.2.4 of Appendix A. If the type is "Boolean" and just one of its two instances is permitted, "true" or "false" appears in lieu of "Boolean".

Receiver. Either a dash ("-"), if a sending Engine shall not omit the attribute from an encoding, or the instance of the type that the receiving Engine shall supply if the sending Engine does omit the attribute, otherwise.

5.2 Language Classes

The encoding palettes for the language classes are defined below.

Note: The absence from this section of certain language classes is explained as follows. An object's class and isProtected attributes figure in its encoding, but not as attributes. An object computes its size attribute. A place is immovable and thus not encoded. A process' class is not user-defined unless the process is an agent or a place. A stream computes its "current", "isDone", and "next" attributes.

5.2.1 Agent

An example of this class is encoded using the primary palette in Table B.3.

TABLE B.3

| # | Attribute | Sender | Receiver |
|---|---|---|---|
| M | name | Telename | — |
| M | permit | Permit | — |
| M | frames | Stack[Frame]! | — |
| 1 | brand | Object[1] | Assigned[1] |
| 2 | privateClasses | Set[Cited] | Cleared |
| 3 | nativePermit | Permit | Nil |
| 4 | priority | Integer | Permit[2] |
| 5 | contacts | Set[Contact] | Absent |

[1]This attribute shall be supplied by either the sending Engine, if the agent is transferred within a domain, or the receiving Engine, otherwise.
[2]The "priority" attribute of the agent's "permit"

5.2.2 Association

An example of this class is encoded using the primary palette in Table B.4.

TABLE B.4

| # | Attribute | Sender | Receiver |
|---|---|---|---|
| M | "key" | Object | — |
| M | "value" | Object | — |

5.2.3 Attribute

An example of this class is encoded using the primary palette in Table B.5.

TABLE B.5

| # | Attribute | Sender | Receiver |
|---|---|---|---|
| 1 | "exceptions" | Set[Identifier!][1] | Cleared |
| 2 | "isPublic" | true | false |
| 3 | "constraints" | Constraint | See Constraint |
| 4 | "isSet" | true | false |

[1]In a class, this is "Set[Class]". Each class is class "Exception"[ or a subclass thereof.

5.2.4 Calendar Time

An example of this class is encoded using the primary palette in Table B.6.

TABLE B.6

| # | Attribute | Sender | Receiver |
|---|---|---|---|
| 1 | "day" | Integer | Nil |
| 2 | "dayOfWeek" | Integer | Nil |
| 3 | "dayOfYear" | Integer | Nil |
| 4 | "dst" | Integer | Nil |

TABLE B.6

| 5 | "hour" | Integer | Nil |
|---|---|---|---|
| 6 | "minute" | Integer | Nil |
| 7 | "month" | Integer | Nil |
| 8 | "second" | Integer | Nil |
| 9 | "year" | Integer | Nil |
| 10 | "zone" | Integer | Nil |

5.2.5 Citation

An example of this class is encoded using the primary palette in Table B.7.

TABLE B.7

| # | Attribute | Sender | Receiver |
|---|---|---|---|
| M | "title" | Identifier! | — |
| 1 | "author" | Telename | Nil |
| 2 | "majorEdition" | Integer | Nil |
| 3 | "minorEdition" | Integer | Nil |

5.2.6 Class

An example of this class is encoded using the primary palette in Table B.8.

TABLE B.8

| # | Attribute | Sender | Receiver |
|---|---|---|---|
| M | "citation" | Citation | — |
| M | "interface" | Interface | — |
| 1 | "implementation" | Implementation | Nil |

5.2.7 Class Definition

An example of this class is encoded using the primary palette in Table B.9.

TABLE B.9

| # | Attribute | Sender | Receiver |
|---|---|---|---|
| M | "interface" | Interface | — |
| M | "title" | Identifier! | — |
| 1 | "implementation" | Implementation | Nil |
| 2 | "majoredition" | Integer | 1 |
| 3 | "minorEdition" | Integer | 1 |

5.2.8 Collection

An example of this class is encoded using the primary palette in Table B.10.

TABLE B.10

| # | Attribute | Sender | Receiver |
|---|---|---|---|
| 1 | "item" | List[Object]! | Cleared |

5.2.9 Constrained Dictionary

An example of this class is encoded using the primary palette in Table B.11.

TABLE B.11

| # | Attribute | Sender | Receiver |
|---|---|---|---|
| M | "constraint" | Constraint | — |
| M | "associations" | List[Object] | — |

5.2.10 Constrained List

An example of this class is encoded using the primary palette in Table B.12.

TABLE B.12

| # | Attribute | Sender | Receiver |
|---|---|---|---|
| M | "constraint" | Constraint | — |
| M | "items" | List[Object] | — |

5.2.11 Constrained Set

An example of this class is encoded using the primary palette in Table B.13.

TABLE B.13

| # | Attribute | Sender | Receiver |
|---|---|---|---|
| M | "constraint" | Constraint | — |
| M | "items" | List[Object] | — |

5.2.12 Constraint

An example of this class is encoded using the primary palette in Table B.14.

TABLE B.14

| # | Attribute | Sender | Receiver |
|---|---|---|---|
| 1 | "isInstance" | true | false |
| 2 | "isOptional" | true | false |
| 3[1] | "classId" | Identifier! | 'Object |
| 3[1] | "ofClass" | Class | Object |
| 4 | "passage" | Identifier! | 'byRef |

[1]In a class, the "classId" and "ofClass" attributes are present implicitly and explicitly, respectively, the former being the "title" attribute of the latter's "citation" attribute. In a class definition and elsewhere, the "classId" and "ofClass" attributes are present explicitly and implicitly, respectively, the latter being a nil. In either a class or class definition, the constraint is the "constraint" attribute of an attribute definition, the "result" attribute of an operation definition, or an item of the "arguments" attribute of an operation definition. In any of these cases, that feature definition is a value in the "classFeatures" or "instanceFeatures" attribute of an interface. Finally, that interface is the "interface" attribute of the class or class definition.

5.2.13 Contact

An example of this class is encoded using the primary palette in Table B.15.

TABLE B.15

| # | Attribute | Sender | Receiver |
|---|---|---|---|
| 1 | "subject" | Process | Nil |
| 2 | "subjectClass" | Citation | Nil |
| 3 | "subjectName" | Telename | Nil |
| 4 | "subjectNotes" | Object | Nil |

5.2.14 Dictionary

An example of this class is encoded using the primary palette in Table B.16.

TABLE B.16

| # | Attribute | Sender | Receiver |
|---|---|---|---|
| M | "associations" | List[Object]! | — |

5.2.15 Implementation

An example of this class is encoded using the primary palette in Table B.17.

TABLE B.17

| # | Attribute | Sender | Receiver |
|---|---|---|---|
| 1 | "classMethods" | Lexicon[Method] | Cleared |
| 2 | "fromMethods" | Lexicon[Method][1] | Cleared |
| 3 | "instanceMethods" | Lexicon[Method][1] | Cleared |
| 4 | "properties" | List[Identifier!] | Cleared |
| 5 | "setMethods" | Lexicon[Method] | Cleared |
| 6 | "superclasses" | List[Identifier!][2] | Nil |
| 7 | "toMethods" | Lexicon[Method][1] | Cleared |
| 8 | "vocubulary" | Lexicon[Citation] | Nil |

5.2.16 Interface

An example of this class is encoded using the primary palette in Table B.18.

TABLE B.18

| # | Attribute | Sender | Receiver |
|---|---|---|---|
| 1 | "classFeatures" | Lexicon[Method] | Cleared |
| 2 | "instanceFeatures" | Lexicon[Feature] | Cleared |
| 3 | "isAbstract" | true | false |
| 4 | "sealedClassFeatures" | Set[Identifier!] | Cleared |
| 5 | "sealedInstanceFeatures" | Set[Identifier!] | Cleared |
| 6 | "superClasses" | List[Identifier!] | 'Object |
| 7 | "vocabulary" | Lexicon[Citation] | Cleared |

[1]The receiver supplies a list of one identifier, that of class "Object". In a class, this is "List[Class]", and the receiver supplies a list of one class, class "Object".

5.2.17 Lexicon

An example of this class is encoded using the primary palette with which an example of class "Dictionary" is encoded.

Note: The "constraint" attribute of a lexicon is fixed by the Instruction Set.

5.2.18 List

An example of this class is encoded using the primary palette in Table B.19.

TABLE B.19

| # | Attribute | Sender | Receiver |
|---|---|---|---|
| M | "items" | List[Object]! | — |

5.2.19 Method

An example of this class is encoded using the primary palette in Table B.20.

TABLE B.20

| # | Attribute | Sender | Receiver |
|---|---|---|---|
| 1 | "procedure" | Procedure | Cleared |
| 2 | "variables" | List[Identifier!] | Cleared |

5.2.20 Mix-in

The secondary palette is that in Table B.21.

TABLE B.21

| # | Attribute | Sender | Receiver |
|---|---|---|---|
| 1 | "citation" | Citation | Absent |
| 2 | "constraint" | Constraint | Absent |
| 3 | name | Telename | Absent |

Note: A hashed object's "hash" attribute and an interchanged object's "digest" attribute are computed by the object.

5.2.21 Operation

An example of this class is encoded using the primary palette in Table B.22.

TABLE B.22

| # | Attribute | Sender | Receiver |
|---|---|---|---|
| 1 | exceptions | Set[Identifier!][1] | Cleared |
| 2 | isPublic | true | false |
| 3 | arguments | List[Constraint] | Nil |
| 4 | result | Constraint | Nil |

5.2.22 Package

An example of this class is encoded using the primary palette in Table B.23.

TABLE B.23

| # | Attribute | Sender | Receiver |
|---|---|---|---|
| M | "citation" | Citation- | |
| M | "items" | List[Class]- | |

Note: The "constraint" attribute of a package is fixed by the Instructor Set.

5.2.23 Pattern

An example of this class is encoded using the primary palette in Table B.24.

TABLE B.24

| # | Attribute | Sender | Receiver |
|---|---|---|---|
| M | "text" | String | — |

5.2.24 Permit

An example of this class is encoded using the primary palette in the table.

TABLE B.25

| # | Attribute | Sender | Receiver |
|---|---|---|---|
| 1 | allowance | Integer | Of subject |
| 2 | canCharge | true | false |
| 3 | canGo | true | false |
| 4 | canProcreate | true | false |
| 5 | canRestart | true | false |
| 6 | canSend | true | false |
| 7 | canTerminate | true | false |
| 8 | deadline | Time | Of subject |
| 9 | priority | Integer | Of subject |

5.2.25 Petition

An example of this class is encoded using the primary palette in the table.

TABLE B.26

| # | Attribute | Sender | Receiver |
|---|---|---|---|
| 1 | "agentClass" | Citation | Nil |
| 2 | "agentName" | Telename | Nil |
| 3 | "maximumWait" | Integer | Nil |

5.2.26 Random Stream

An example of this class is encoded using the primary palette in Table B.27.

TABLE B.27

| # | Attribute | Sender | Receiver |
|---|---|---|---|
| M | "seed" | Integer | — |

5.2.27 Resource

An example of this class is encoded using the primary palette in Table B.28.

TABLE B.28

| # | Attribute | Sender | Receiver |
|---|---|---|---|
| 1 | "condition" | Indentifier! | Undefined[1] |
| 2 | "conditions" | Set[Identifier!] | Undefined[1] |

[1]The "conditions" attribute comprises one identifier which equals the "condition" attribute. This identifier is undefined.

Note: Any processes other than the subject awaiting use of the resource when the subject began its trip await the resource no longer, having been left behind.

5.2.28 Set

An example of this class is encoded using the primary palette with which an example of class "Collection" is encoded.

5.2.29 Stack

An example of this class is encoded using the primary palette in Table B.29.

TABLE B.29

| # | Attribute | Sender | Receiver |
|---|---|---|---|
| M | "items" | IStack[Object]! | — |

5.2.30 Teleaddress

An example of this class is encoded using the primary palette in Table B.30.

TABLE B.30

| # | Attribute | Sender | Receiver |
|---|---|---|---|
| M | "provider" | OctetString | — |
| 1 | "location" | String | Nil |
| 2 | "routingAdvice" | List[OctetString] | Cleared |

5.2.31 Telename
An example of this class is encoded using the primary palette in Table B.31.

TABLE B.31

| # | Attribute | Sender | Receiver |
|---|---|---|---|
| M | "authority" | OctetString | — |
| 1 | "identity" | OctetString | Nil |

5.2.32 Telenumber
An example of this class is encoded using the primary palette in Table B.32.

TABLE B.32

| # | Attribute | Sender | Receiver |
|---|---|---|---|
| M | "country" | DialString | — |
| M | "telephone" | DialString | — |
| 1 | "extension" | DialString | Nil |

5.2.33 Ticket
An example of this class is encoded using the primary palette in Table B.33.

TABLE B.33

| # | Attribute | Sender | Receiver |
|---|---|---|---|
| 1 | "travelNotes" | Object | Nil |
| 2 | "way" | Way | Nil |
| 3 | "desiredWait" | Integer | Nil |
| 4 | "destinationAddress" | Teleaddress | Nil |
| 5 | "destinationClass" | Citation | Nil |
| 6 | "destinationName" | Telename | Nil |
| 7 | "destinationPermit" | Permit | Nil |
| 8 | "maximumWait" | Integer | Nil |

5.2.34 Ticket Stub
An example of this class is encoded using the primary palette in Table B.34.

TABLE B.34

| # | Attribute | Sender | Receiver |
|---|---|---|---|
| 1 | "travelNotes" | Object | Nil |
| 2 | "way" | Way | Nil |

5.2.35 Time
An example of this class is encoded using the primary palette in Table B.35.

TABLE B.35

| # | Attribute | Sender | Receiver |
|---|---|---|---|
| 1 | "dst" | Integer | 0 |
| 2 | "sender" | Integer | 0 |
| 3 | "zone" | Integer | 0 |

5.2.36 Trip Exception
An example of this class is encoded using the primary palette in Table B.36.

TABLE B.36

| # | Attribute | Sender | Receiver |
|---|---|---|---|
| M | "ticketStub" | TicketStub | Nil |

5.2.37 Unexpected Exception
An example of this class is encoded using the primary palette in Table B.37.

TABLE B.37

| # | Attribute | Sender | Receiver |
|---|---|---|---|
| M | "exception" | Exception | — |

5.2.38 Way
An example of this class is encoded using the primary palette in Table B.38.

TABLE B.38

| # | Attribute | Sender | Receiver |
|---|---|---|---|
| 1 | "authenticator" | Authenticator | Nil |
| 2 | "means" | Means | Nil |
| 3 | "name" | Telename | Nil |

5.3 Encoding Classes
The encoding palettes for the encoding classes are defined below.

5.3.1 Catch Frame
An example of this class is encoded using the primary palette in Table B.39.

TABLE B.39

| # | Attribute | Sender | Receiver |
|---|---|---|---|
| M | "position" | Integer | — |
| M | "procedure" | Procedure | — |
| M | "exception" | Class | — |

5.3.2 Collection Stream
An example of this class is encoded using the primary palette in Table B.40.

TABLE B.40

| # | Attribute | Sender | Receiver |
|---|---|---|---|
| 1 | "position" | Integer | Nil |
| 2 | "source" | Collection[Object] | Nil |

5.3.3 Predefined Frame
An example of this class is encoded using the primary palette in Table B.41.

TABLE B.41

| # | Attribute | Sender | Receiver |
|---|---|---|---|
| M | "position" | Integer | — |
| M | "procedure" | Proceudre | — |

5.3.4 Repeat Frame
An example of this class is encoded using the primary palette in Table B.42.

TABLE B.42

| # | Attribute | Sender | Receiver |
|---|---|---|---|
| M | "position" | Integer | — |
| M | "procedure" | Procedure | — |
| 1 | "repetitionsSoFar" | Integer | 1 |
| 2 | "repetitions" | Integer | 1 |

5.3.5 Restrict Frame

An example of this class is encoded using the primary palette in Table B.43.

TABLE B.43

| # | Attribute | Sender | Receiver |
|---|---|---|---|
| M | "position" | Integer | — |
| M | "procedure" | Procedure | — |
| M | "permit" | Permit | — |

5.3.6 Send Frame

An example of this class is encoded using the primary palette in Table B.44.

TABLE B.44

| # | Attribute | Sender | Receiver |
|---|---|---|---|
| M | "tickets" | List[Ticket]! | — |

5.3.7 Use Frame

An example of this class is encoded using the primary palette in Table B.45.

TABLE B.45

| # | Attribute | Sender | Receiver |
|---|---|---|---|
| M | "position" | Integer | — |
| M | "procedure" | Procedure | — |
| M | "resource" | Resource | — |

5.3.8 User-defined Frame

An example of this class is encoded using the primary palette in Table B.46.

TABLE B.46

| # | Attribute | Sender | Receiver |
|---|---|---|---|
| M | "position" | Integer | — |
| 1 | "responder" | Object | Agent[1] |
| 2 | "stack" | Stack[Object]! | Cleared |
| 3 | "variables" | List[Object]! | Cleared |

5.3.9 While Frame

An example of this class is encoded using the primary palette in Table B.47.

TABLE B.47

| # | Attribute | Sender | Receiver |
|---|---|---|---|
| M | "position" | Integer | — |
| M | "procedure" | Procedure | — |
| M | "precondition" | Executed | — |
| 1 | "isPrecondition" | true | false |

APPENDIX C

Copyright © General Magic, Inc. 1992, 1993. All Rights Reserved

The following table of contents is to assist the reader in understanding the organization of and locating information within this appendix.

Table of Contents

| | |
|---|---|
| 1. | INTRODUCTION |
| | Overview |
| | Organization |
| | References |
| 2. | INTERFACE CONCEPTS |
| 2.1 | Telename |
| 2.2 | Network |
| 2.3 | Engine |
| 2.4 | Platform |
| 2.5 | Region |
| 2.6 | Outpost |
| 2.7 | Domain |
| 2.8 | Transfer |
| 2.9 | Transfer Unit |
| 2.10 | Destination |
| 2.11 | Transfer Group |
| 2.12 | Way |
| 2.13 | Means |
| 2.14 | Reservation |
| 2.15 | Rank |
| 3. | COMMUNICATION CLASSES |
| 3.1 | Reservation |
| 3.2 | Reservable Means |
| 3.3 | PSTN Means |
| 3.4 | Existing Connection Means |
| 4. | INTERFACE IN TELESCRIPT |
| 4.1 | Engine |
| 4.2 | Platform |
| 4.3 | Destination |
| 4.4 | Failure |
| 5. | ROUTING |
| | Routing Algorithm |
| 6. | INTERFACE IN C++ |
| | Interface description |
| | Tasks |
| | CI Class |
| 7. | TELESCRIPT INTERFACE OBJECTS |
| 7.1 | Interface Conventions |
| 7.2 | TsCharacter |
| 7.3 | TsDestination |
| 7.4 | TsDestinationList |
| 7.5 | TsExistingConnectionMeans |
| 7.6 | TsInteger |
| 7.7 | TsIntegerList |
| 7.8 | TsMeans |
| 7.9 | TsObjSpecifier |
| 7.10 | TsOctet |
| 7.11 | TsOctets |
| 7.12 | TsPSTNMeans |
| 7.13 | TsReservableMeans |
| 7.14 | TsReservation |
| 7.15 | TsString |
| 7.16 | TsTeleaddress |
| 7.17 | TsTelename |
| 7.18 | TsTelenumber |
| 7.19 | TsWay |

1. INTRODUCTION

Overview

This appendix defines the "communication services" that a Telescript engine can obtain from the platform on which it runs. Two engines employ these services to transfer the representation of an "agent" from a place in one engine to a place in the other, as required by Telescript's "go" and "send" operations.

This appendix has two main parts. First, this appendix describes the communication services that a Telescript engine requires in an abstract way, using Telescript to describe the interface between engine and platform. Second, this appendix documents a C++ "application programming interface" (API) which provides those services.

Organization

This appendix is divided into seven sections. Section 1 is this introduction. Section 2 describes the basic concepts of the interface. Section 3 describes some additional Telescript classes. Section 4 specifies the interface in Telescript. Section 5 describes a transfer in more detail. Section 6 describes a C++ API which implements the interface. Section 7 describes C++ representations of Telescript classes which are used in the API.

References

This appendix relies upon Appendix A of this disclosure.

2. INTERFACE CONCEPTS

This section of this appendix describes the basic concepts of Telescript communication and communication interfaces. Many of the objects described here have direct representations in the Telescript instruction set or in the communication interface of the engine.

2.1 Telename

Telescript supports the movement of objects between places and specifically between engines. Every place in the Telescript universe is assigned a distinct "telename". Telenames have two attributes, an "authority" and an "identity".

Telescript supports telenames, whether assigned or otherwise. An "assigned telename", associated with an object by a Telescript engine, always contains both an authority and an identity. A telename which is not "assigned" purports to identify one or more Telescript objects. A telename which is not "assigned" can have its identity attribute omitted, in which case the telename can actually identify several objects.

2.2 Network

A Telescript "network" comprises one or more regions. The network may not fully interconnect all of its regions and "point-to-point" transfer of information may not be possible between any two of them. Regions are interconnected, however, to the extent that the network can provide "store-and-forward" transfer of information between any two of them.

2.3 Engine

An "engine" is a computer process that implements the abstractions of the Telescript instruction set. An engine does this, in part, by communicating with other engines. An engine is denoted by an assigned telename.

2.4 Platform

A "platform" is a collection of hardware and software that supports one or more engines. A platform enables engines to communicate with other engines on the same platform and on other platforms to which the platform is connected.

2.5 Region

A "region" comprises the engines and supporting platforms operated by an individual or organization.

A region fully interconnects the platforms the region contains. Thus the region enables the point-to-point transfer of information between any two of these platforms. Each region contains one or more platforms that provide access to and egress from the region. It is by means of these platforms that regions are interconnected to form a network. A region is denoted by a telename in which the identity attribute is omitted.

2.6 Outpost

A region can have an outpost in another region. An "outpost" is a place in a region which routes traffic from that region to the outpost's region.

2.7 Domain

A "domain" is a region, together with all of its outposts in other regions.

2.8 Transfer

A "transfer" is the conveyance of a transfer unit from one engine, the "source engine", to another, the "destination engine".

A transfer unit specifies a "destination" which can be used to route the transfer. Additionally, a way can be provided which can influence the route and "transport" used for the transfer.

2.9 Transfer Unit

A "transfer unit" is conveyed between engines in a transfer. A transfer unit consists of an octet string, and a destination. These are the only data items that are delivered end to end between engines. Additional data is involved in specifying the transfer to the "originating platform" and in receiving a transfer at the destination.

2.10 Destination

A "destination" describes the ultimate destination of a transfer unit.

2.11 Transfer Group

The Telescript "send" operation, which is described in Appendix A, can result in the same octet string being delivered to several destinations. A "transfer group" is a collection of transfer units and their associated destinations, together with one copy of the octet string being conveyed.

A transfer group logically represents its component transfer units. A platform can break up a single transfer group into multiple smaller transfer groups and/or single transfer units.

2.12 Way

A "way" specifies a region or engine, a means of communicating with the region or engine, and "authentication information" used to do so.

A transfer out of an engine can specify a way, i.e, the "way out", which defines communication requirements for the transfer. Incoming transfers provide engines with a way, i.e., the "way back", which can be used as the way out in subsequent transfers towards the original source.

2.13 Means

A "means" specifies a type of transport to be used for a transfer, e.g., wireline or wireless network. A means contains transport specific data such as a "quality of service" parameter or the telephone number for a "PSTN" connection.

A "reservable means" specifies a type of transport for which a reservation is honored.

2.14 Reservation

A "reservation" is a request that a connection established by a platform as the result of a transfer be maintained for some period of time. Reservations are hints to allow a connection to be used for multiple transfers.

A reservation has meaning only when a transfer specifies a way with a reservable means.

2.15 Rank

Some transfers may be considered "privileged". A "rank" is an indication of privilege. It is an integer, the value zero meaning unprivileged. The meaning of non-zero values is source region specific. In inter-region transfers, a rank can be regarded as a hint which can be changed or ignored.

3. Communication Classes

This section defines additional Telescript classes which are not present in Appendix A of this disclosure.

3.1 Reservation

Object
 • Reservation

Class

Reservation:

interface ( )=( . . . );

Public Instance Attributes id:

Integer;

An identifier for a reservation created by a platform.

3.2 Reservable Means

Object
- Means
  - Reservable Means

Class

ReservableMeans:

abstract interface (Means)=( . . . );
Public Instance Attributes
reservation:

Reservation;
An identifier for a reservation created by a platform.

3.3 PSTN Means

Object
- Means
  - Reservable Means
    - PSTN Means

Class

PSTNMeans:

interface (ReservableMeans)=( . . . );
Public Instance Attributes
telephoneNumber:

Telenumber;
The telephone number to be used for this trip.

3.4 Existing Connection Means
Object

Object
- Means
  - Reservable Means
    - Existing Connection Means

Class

ExistingConnectionMeans:

interface (ReservableMeans)=( . . . );
Public Instance Attributes
connectionID:

Octets;
A identifier which a platform can use to identify a connection.

4. INTERFACE IN TELESCRIPT

In this section, the interface between an engine and its platform is specified as if both were Telescript objects, which they are not. It is intended that this definition be considered generic, i.e. independent of specific programming languages used to implement engines and platforms.

The following Telescript class definitions are used in this interface. See Appendix A and Section 3 of this Appendix for their definitions:

Integer
List
OctetString
Telename
Teleaddress
Way
Reservation

4.1 Engine

Object
- Engine

Class

Engine:

interface ( )=( . . . );

Public Instance Operations transferIn:
op (
    octets: OctetString;
    destinations: List [Destination];
    rank: Integer;
    way: Way;
    timeAdjust: Integer)
throws TransferInFailed;

Delivers one or more transfer units associated with a single transfer group to the engine. The transfer units are represented by the octets, destinations and rank. The way back (argument "way") contains the telename of the engine which performed operation "transferOut". The way back can provide an existing connection means which can be used to make a return trip.

Argument "timeAdjust" is the number of seconds by which the clock of the source platform trails the clock of the destination platform. The responder can use this information to adjust certain times that were generated relative to the source engine's clock.

The "TransferInFailed" exception is thrown if the engine is unable to receive the transfer units.

transferFailed:
op (
    failure: Failure;
    octets: OctetString;
    destinations: List [Destination];
    rank: Integer;
    way: Way;
    timeAdjust: Integer)
throws TransferFailedFailed;

Delivers one or more failed transfer units associated with a single transfer group to the engine. The parameters for this operation are identical to those of operation "transferIn" with the addition of the reason for the failure (argument "failure").

It is possible that a "transferFailed" operation can happen before a "transferOutComplete" has been received at the source engine for the transfer group.

If failure is "invalidMeans", the responder will be the source engine if possible.

An exception is thrown if the responder is unable to receive the failed transfer units ("TransferFailedFailed").

transferOutFailed:
op (
    reason: Failure;
    groupID: Integer;
    failures: List [Integer]¦ Nil)
throws UnknownTransferGroup, UnknownTransferUnit;

One or more transfer units in the transfer group (argument "groupID") has failed. The cause of the failure is given in argument "reason". The particular units that have failed are identified by a list (argument "failures") of integer indices into the original list of destinations given at performance of operation transferOut. List indices begin at one, which identifies the first unit in the transfer group.

If a list is not provided, i.e, if the value of argument "failures", is nil, every transfer in the group has failed. This is identical to a list which enumerates all the units in the original group.

An exception is thrown if the responder did not previously perform a "transferOut" operation denoted by argument "groupID" ("UnknownTransferGroup"), or one of the items of argument "failures" is not a valid index into the destination list for this transfer group ("UnknownTransferUnit").

op (groupID: Integer; serialNumber: Integer)
throws UnknownTransferGroup;

Indicates that the "transferOut" operation associated with a particular transfer group (argument "groupID") has been completed. In particular there can be no further "transferOutFailed" operations for this group. Any resources associated with the transfer units in this group may be released.

An exception is thrown if the responder did not previously perform a transferOut operation denoted by argument "groupID" ("UnknownTransferGroup").

4.2 Platform

Object
* Platform

Class
Platform:
interface ( )=( . . . );
Construction
initialize:
op (engine: Telename);
Initializes the responder for use by the named engine (argument "engine").
Public Instance Operations transferOut:
op (octets: OctetString;
    destinations: List [Destination];
    rank: Integer;
    way: Way | Nil;
    desiredDuration: Integer;
    maximumDuration: Integer;
    groupID: Integer)
throws InvalidDestination, InvalidWay;

Requests delivery of a transfer group, which is defined by arguments "octets", "destinations", and "rank", to one or more destination engines. The group is identified by the group id (argument "groupID"). This operation results in one of operations "transferIn", "transferOutFailed" or "transferFailed" subsequently referencing each of the transfer units that make up this group.

The rank (argument "rank") specifies whether this transfer is privileged.

If argument "way" is non-not a nil, it will be used to route the transfer.

The desired duration of the transfer is specified in seconds (argument "desiredDuration"). This is the maximum elapsed time desired for the transfer. A value of zero for the desired duration indicates that no desired duration is associated with this transfer.

The maximum allowed duration for the transfer is specified in seconds (argument "maximumDuration"). This is the maximum time allowed for the transfer. If operation "transferOutComplete" has not happened this many seconds after the "transferOut" operation, then the effect is the same as though a "failTransfer" operation is performed for this group. A value of zero for the maximum duration indicates that no maximum duration is associated with this transfer.

An exception is thrown if the destination list is invalid ("invalidDestination") or if argument "way" is supplied but has no non-nil attributes ("invalidWay").

failTransfer:
op (groupID: Integer)
throws UnknownTransferGroup;

Requests that all pending transfer units in the transfer group identified by the group id (argument "groupID") be failed.

It is possible that not all transfer units in a transfer group can be failed. Transfer units failed as a result of this operation will cause one or more "transferOutFailed" operations followed by a "transferComplete".

An exception is thrown if the group id was not used in a previous "transferOut" (operation "UnknownTransferGroup").

makeReservation:
op (duration: Integer) Reservation
throws CannotReserve;

Returns a new reservation of duration (argument "duration") seconds. The reservation becomes active when the reservation is used in a reservable means for a subsequent "transferOut" operation.

Once a reservation expires, the reservation is no longer valid and transfers will fail if they attempt to use the reservation.

Reservations should be canceled with the "resetReservation" operation when they are no longer required. Platforms can impose maximum lifetimes on unused reservations.

The "CannotReserve" exception is thrown if the responder is unable to provide a reservation.

resetReservation:
op (reservation: Reservation, duration: Integer)
throws UnknownReservation, InvalidReservation;

The duration of an existing reservation (argument "reservation") is changed to duration seconds. If the reservation is active when this operation is invoked, the effect is the same as if a "transferOut" operation had just been done with a reservation of the new duration.

Setting the duration to zero cancels a reservation. A canceled reservation is no longer valid.

An exception is thrown if reservation was not obtained with a prior "makeReservation" operation ("unknownReservation"), or if the reservation is no longer valid ("invalidReservation").

4.3 Destination

Object
* Destination

Class
Destination:
interface ( )=( . . . );
Construction initialize:
op (
    name: Telename | Nil;
    address: Teleaddress | Nil;
    data: OctetString | Nil);

Sets the responder's native attributes to the like-named arguments (arguments "name", "address", and "data").

If all the attributes of a destination are nils, the destination is invalid.
Private Instance Attributes
address:
Teleaddress|Nil;
The address of the destination.
data:
OctetString|Nil;
Engine specific data associated with a transfer unit.
name:
Telename|Nil;
The name of the destination.

4.4 Failure
Object
Failure
Class
Failure:

interface ( )=( . . . );
Private Instance Attributes
reason:
Integer;

The reason for the failure of a transfer. The reason is represented as an integer enumeration shown in table C.1.

TABLE C.1

| 1  | invalidDestination       | An invalid destination was provided. |
|----|--------------------------|--------------------------------------|
| 2  | invalidWay               | An invalid way was provided.         |
| 3  | invalidMeans             | An invalid means was provided.       |
| 4  | invalidReservation       | An invalid reservation was provided. |
| 5  | noDestinations           | No destinations were specified.      |
| 6  | maximumDurationExceeded  | The maximum duration has passed.     |
| 7  | transfersFailed          | failTransfers was called.            |
| 8  | noLocalResources         | The platform failed to get some resource. |
| 9  | destinationUnreachable   | A transfer unit was undeliverable.   |
| 10 | transferInFailed         | transferIn failed at the remote engine. |
| 11 | securityViolation        | There was an authentication failure. |
| 12 | possibleDuplicate        | May have been delivered.             |

A platform can provide additional failure types.

5. ROUTING

The "transferOut" operation of a transfer unit typically results in the "transferIn" operation of the same unit at a different engine. If the transfer fails at the source platform, the transfer unit is failed with a "transferOutFailed" operation at the source engine. If the transfer unit is successfully transferred from the source platform but does not participate in a successful "transferIn" op"=operation at the destination engine, it is failed to an engine with "transferFailed" op".

The "transferOut" op" of a transfer group is logically equivalent to N "transferOut" op"s of the component transfer units. The value of rank, desired and maximum durations and the way are identical for all the transfers. The list of destinations can imply op" "transferIn" occurs at more than one destination engine.

Typically, a platform will examine the list of destinations in a group and attempt to deliver the units with the minimum number of "transferIn" op"s at destination engines. This implies that transfer units destined for the same engine will be transported and delivered as a group.

Routing Algorithm

If a way is provided in a performance of "transferOut" op", the platform uses it to route the transfer. If a way is not provided, the platform must determine the destination engine. The steps for determining the destination engine based on the name and address associated with a transfer unit are:

```
<start>
    if the name is present but the address is not
            <use the name>
    if the address is present but the name is not
            if the provider is the current region
                    find the corresponding name or <fail>
                    set the name attribute of destination to
name
                    <start>
            else
                    <use the address>
    if both the name and address are present
            if the provider is the current region
```
-continued
```
                    <use the name>
            else
                    <use the address>
<use the name>:
    if the authority is the current region
            if the identity is present
                    determine the destination engine
                            from the identity or <fail>
            else
                    determine the destination engine
                            from the location or <fail>
    else
            route to the engine that contains the
                    outpost of authority or <fail>
<use the address>:
    if the provider is known
            route to the engine containing
                    the outpost of the provider
    else
            for each of the providers in the routing advice
                    if it is the current region
                            remove it from the routing advice
                    else
                            if the provider is known
                                    route to the engine containing
                                            the outpost of provider
            if there is still no route then <fail>
<fail>:
    if the provider is the current region
            fail the transfer
    else
            if there is a default engine
                    route to it
            else
                    fail the transfer
```

6. INTERFACE IN C++

This section describes a C++ implementation of the engine-platform interface. This interface is derived from the Telescript specification of the interface in Section 4.

By necessity, the interface presented here reflects aspects of the current Telescript engine's implementation. In particular the C++ API includes operations on the engine which do not appear in the generic interface.

Interface description

The engine object is represented by the C++ class "CI". Operations on the engine object are provided as member functions of CI.

The platform object is represented by a subclass of CI. The provider of a platform subclasses of CI and implements virtual functions of CI which represent the platform operations.

The Telescript objects which appear as parameters to the operations on both engine and platform are represented by a number of C++ classes which implement limited representations of Telescript objects. For example there is a "TsInteger" class which represents a Telescript "Integer" wherever "TsInteger" appears in the API. A complete description of these Telescript Interface Objects appears in the next section of this appendix.

Exceptions, which are specified in the Telescript representation of the interface, are implemented in the API as an enumerated type which is returned from all operations on both engine and platform.

The storage for the data elements passed between engine and platform is owned by the caller of an operation. The storage can be reclaimed when an operation is complete. The only exception to this is the "transferOut" operation. The engine does not reclaim the elements of a transfer out until the corresponding "transferOutComplete" operation has been performed.

Tasks

The engine is implemented as multiple co-operating tasks running as separate threads with a non-preemptive scheduler. An instance of the CI class is run as a thread in the engine. A subclass of the CI class provides a function, "main( )", which is called once and should only return when additional operations on the platform are no longer supported.

"main( )" is expected to yield to the engine scheduler when there are no pending "transferIn" operations. "main( )" does this by calling "wait( )". "wait( )" takes an argument which is the number of milliseconds that the CI is willing to yield for. Typically the engine will not reschedule the CI's task until at least that amount of time has passed. An argument of zero to "wait( )" implies that the CI is yielding but would like to be rescheduled as soon as possible by the engine scheduler.

An argument of −1 to "wait( )" has the meaning that the CI wishes to block indefinitely. In this case, the CI is expected to call "satisfy( )" on the engine when the CI wishes to be rescheduled. "satisfy( )" will cause a thread blocked in wait to resume execution as soon as the engine schedules the thread. This latter scheme would be appropriate for a CI implementation which was delivered an asynchronous event when there were new communications requests.

On some operating systems, a CI implementation may wish to yield to the engine scheduler and be rescheduled when a file descriptor becomes ready. The "waitfd" operation specifies a file descriptor to wait on and may be used in conjunction with "wait( )" to select on multiple file descriptors with a timeout.

Performances of op$^n$ "transferOut" are executed in the thread of the calling Telescript processes and not in the thread of the CI task.

Operations on both engine and platform must execute relatively quickly, if necessary by queuing work to be scheduled later. Both engine and platform should not block for extended periods of time.

In extreme situations, the volume of "transferOut" operations may overwhelm the buffering provided by a CI. In this situation, the CI can call "stop( )" which will have the effect of preventing all further calls to op$^n$ "transferOut". A subsequent call to "start( )" will resume output, possibly rescheduling engine tasks that had to be halted as a result of the blockage.

CI Class
Construction
CI:
CI (TsTelename *name); Constructs a new CI object. "name" is the telename of the engine which will use this CI.
CI:
virtual CI ( )
Shuts down and destroys this CI.
main:
virtual long main ( )=0;
The main loop of a CI. This is called some time after construction. The CI should yield to the engine, e.g. with "wait( )" during the execution of this function
Engine Operations transferIn:
TsStatus transferIn (TsOctets *bagOfBits,
                    TsDestinationList *destList,
                    unsigned int rank,
                    TsWay *wayBack,
                    int timeAdjust);

transferFailed:
TsStatus transferFailed (TsFailure failure,
                    TsOctets *bagOfBits,
                    TsDestinationList *destList,
                    unsigned int rank,
                    TsWay *wayBack, int timeAdjust);

Transfers one or more failed transfer units into the engine.

transferOutFailed:
TsStatus transferOutFailed    (TsFailure failure,
                               unsigned int groupId,
                               TsIntegerList *list);

Identifies one or more transfer units which have failed a previous performance of op$^n$ "transferOut" from this engine.

transferOutComplete:
TsStatus transferOutComplete    (unsigned int groupId,
                                 unsigned int transferSN);

Indicates that the transfer of a transfer group (argument "groupId") has completed. The storage associated with all the transfer units in this group can be reclaimed.

Platform Operations transferOut:
virtual TsStatus transferOut (TsOctets *bagOfBits,
TsDestinationList *destList,
unsigned int rank,
TsWay *wayOut,
unsigned int desiredDuration,
           unsigned int maximumDuration,
               unsigned int groupId) = 0;

Transfer the transfer units in this transfer group to their respective destinations (argument "destList").
failTransfer:
virtual TsStatus failTransfer (unsigned int groupId)=0;
Fail all the transfer units associated with the transfer group (argument "groupId").

makeReservation:
virtual TsStatus makeReservation (unsigned int duration,
                                  TsReservation *reservation) = 0;

Request a new reservation (argument "reservation") with the specified duration (argument "duration").

resetReservation:
virtual TsStatus resetReservation (TsReservation reservation, unsigned int duration) = 0;

Reset the duration of reservation to the new duration (argument "duration"). A duration of zero has the effect of canceling the reservation.

Task Operations
wait:
void wait (long msec);
Yields the current engine thread for "msec" milliseconds. The function will return when this thread is rescheduled. If argument "msec" is zero, the thread will be rescheduled as soon as the engine scheduling policy allows. If argument "msec" is −1 this call to "wait( )" will not return until "satisfy( )" (see below) is called or a file descriptor specified with "waitfd( )" becomes ready.
satisfy:
void satisfy ( );
Causes the CI thread to be rescheduled if the CI thread is blocked in a "wait( )" call.

waitfd:

void waitfd (int fd, short mask);

Specifies that subsequent "wait( )" calls will return if the file descriptor "fd" becomes ready for either reading or writing as specified by "mask". "mask" is a bitmask constructed by OR-ing the values "POLLIN" and "POLLOUT" which select for the file descriptor being readable and writable respectively. A "mask" of zero has the meaning that this file descriptor should no longer affect the operation of "wait( )".

waitresult:

short waitresult (int fd);

Returns a bitmask which can be used to test whether the file descriptor "fd" may have become ready during the previous "wait( )" call. The result is a bitmask with the bits "POLLIN" and "POLLOUT" set if they were specified in "waitfd( )" and the file descriptor became ready for read or write respectively.

stop:

void stop ( );

Causes the engine to throttle all "transferOut" op"s for this CI. No further transfers will be requested of this CI, which may cause Telescript agents executing op" "go" or "send" to block. The CI should only invoke this operation if the CI would loose data by queuing further transfers.

start:

void start ( );

Informs the engine that it should no longer throttle op"s.

7. TELESCRIPT INTERFACE OBJECTS

To enable communication with external systems, e.g. other Telescript engines or non-Telescript-based communicating systems, a Telescript engine must rely on communications services provided by a platform or operating system underlying the Telescript engine itself. To gain access to these services, the Telescript engine must support a mechanism to allow information to flow into and out of the Telescript abstraction. Specifically, to allow conversion between key Telescript objects and corresponding representations of these objects that are palatable to the underlying communication services.

The Telescript Engine Interface Classes provide an abstract definition for a set of C++ classes that fulfill this need. The definition provided is abstract in that the C++ classes are not fully defined, but rather are described in terms of the Telescript engine's minimum requirements on their functionality. Complete freedom is left to the implementor of these classes as to their internal mechanisms and their relationship with the underlying communication services.

7.1 Interface Conventions

An implementation of the Telescript Engine Interface Classes must adhere to a set of conventions regarding the use of data items which pass across the class interfaces. These conventions are expressed in terms of rules of ownership, wherein ownership is defined as the right to modify and the responsibility to destroy a given piece of data.

Unless otherwise stated, an implementation of the Telescript Engine Interface Classes must adhere to the following interface conventions:

For all functions that accept reference or pointer arguments, ownership of the referenced or pointed to data passes from the caller to the object called, such that the object has the right to modify the data and the responsibility to destroy the data at the appropriate time.

For all functions that return reference or pointer values, ownership of the referenced or pointed to data is retained by the called object. However, the object guarantees that, until the next call to a function that can modify the object, the data referenced/pointed at will not change.

When destroyed, an object will destroy all data for which is has ownership.

7.2 TsCharacter

The "TsCharacter" type definition provides a limited C++ representation of the Telescript Character class, as defined in Appendix A of this disclosure.

An implementation of the "TsCharacter" type is required to be able to contain all ASCII characters. This is a minimum requirement. Preferably, an implementation of the "TsCharacter" type can contain all Unicode characters.

7.3 TsDestination The "TsDestination" class provides a C++ representation of the Telescript Destination class, as defined in Section 4 of this Appendix. An implementation of the "TsDestination" class shall provide, at a minimum, the following functionality.

```
class TsDestination
{
public:
    TsDestination (TsTeleaddress * teleaddress,
                   TsTelename * telename,
                   TsOctets * data);

~TsTeleaddress ( );

const TsTeleaddress * getTeleaddress ( ) const;
    const TsTelename * getTelename ( ) const;
    const TsOctets * getData ( ) const;
};
```

Construction

TsDestination:
TsDestination          (TsTeleaddress * teleaddress,
                        TsTelename * telename,
                        TsOctets * data)

teleaddress

Either a pointer to a "TsTeleaddress" object that is to form the teleaddress value of the new "TsDestination" object, or the NULL pointer if the destination object is to contain no teleaddress value.

telename

Either a pointer to a "TsTelename" object that is to form the telename value of the new "TsDestination" object, or the NULL pointer if the destination object is to contain no telename value.

data

Either a pointer to a "TsOctets" object that is to form the destination data value of the new "TsDestination" object, or the NULL pointer if the destination object is to contain no destination data value.

Destruction

TsDestination:

TsDestination ( )

Destroys the "TsDestination" object. The "TsDestination" object and all data for which the object has ownership responsibility are destroyed.

Data Access getTeleaddress:

const TsTeleaddress * getTeleaddress ( ) const

Returns either a pointer to the teleaddress value of the "TsDestination" object, or the NULL pointer if the destination object contains no teleaddress value.

getTelename:

const TsTelename * getTelename ( ) const

Returns either a pointer to the telename value of the "TsDestination" object, or the NULL pointer if the destination object contains no telename value.

getData:

const TsOctets * getData ( ) const

Returns either a pointer to the destination data value of the "TsDestination" object, or the NULL pointer if the destination object contains no destination data value.

7.4 TsDestinationList

The "TsDestinationList" class provides a C++ representation of a Telescript class "List" as defined in Appendix A of this disclosure, constrained to contain objects of the class "Destination". An implementation of the "TsDestinationList" class shall provide, at a minimum, the following functionality.

```
class TsDestinationList
{
public:
        TsDestinationList ( );
        ~TsDestinationList ( );
        const TsDestination * nextDestination ( );
        void reset ( );
        size_t destinationCount ( ) const;

void appendDestination (TsDestination *
destination);
};
```

Construction

TsDestinationList:

TsDestinationList ( )

Constructs an empty "TsDestinationList" object.

Destruction

TsDestination-List:

TsDestinationList ( )

Destroys a "TsDestinationList" object. The "TsDestinationList" object and all data for which the object has ownership responsibility are destroyed.

Data Access appendDestination:

void appendDestination (TsDestination * destination)

Appends a single destination, in the form of a "TsDestination" object to the list of destinations contained within the "TsDestinationList" object.

destination

A pointer to a "TsDestination" object conveying the destination to be appended to the list of destinations within the TsDestinationList object.

nextDestination:

const TsDestination * nextDestination ( )

Returns either a pointer to a destination, in the form of a "TsDestination" object, or the NULL pointer. Over multiple invocations, the "nextDestination( )" function returns the set of destinations contained within the "TsDestinationList" object in the order of their containment. Subsequent to return of the last destination and until the next invocation of the reset function, the "nextDestination( )" function returns the NULL pointer.

reset:

void reset ( )

Causes the next invocation of the "nextDestination( )" function to return the first destination contained within the "TsDestinationList" object.

destinationCount:

size_t destinationCount ( ) const

Returns the number of destinations currently contained within the "TsDestinationList" object.

7.5 TsExistingConnectionMeans

The "TsExistingConnectionMeans" class provides a C++ representation of the Telescript "ExistingConnectionMeans" class, as defined in Section 3 of this appendix. An implementation of the "TsExistingConnectionMeans" class shall provide, at a minimum, the following functionality.

```
class TsExistingConnectionMeans : public
TsReservableMeans
{
public:
        TsExistingConnectionMeans
                (const TsReservation & reservation,
                TsOctets * connectionId);

~TsExistingConnectionMeans ( );

const TsOctets * getConnectionId ( ) const;
};
```

Construction

TsExisting-ConnectionMeans:

TsExistingConnectionMeans (const TsReservation &
    reservation,
    TsOctets * connectionId)

Constructs a new "TsExistingConnectionMeans" object.

reservation

A reference to a "TsReservation" object that is to form the reservation value of the "TsReservableMeans" super-class component of the new "TsExistingConnectionMeans" object.

connectionId

A pointer to a "TsOctets" object that is to form the connection identifier value of the new "TsExistingConnectionMeans" object.

Destruction

TsExisting-ConnectionMeans:

TsExistingConnectionMeans ( )

Destroys the "TsExistingConnectionMeans" object. The "TsExistingConnectionMeans" object and all data for which the object has ownership responsibility are destroyed.

Data Access getConnectionId:

const TsOctets * getConnectionId ( ) const

Returns a pointer to the connection identifier value contained within the "TsExistingConnectionMeans" object.

7.6 TsInteger

The "TsInteger" type definition provides a limited C++ representation of the Telescript class "Integer".

An implementation of the "TsInteger" type shall be capable of holding values in the range −2147483648 to +2147483647 inclusive.

7.7 TsIntegerList

The "TsIntegerList" class provides a C++ representation of a Telescript class "List" as defined in Appendix A of this disclosure, constrained to contain objects of the class "Integer". An implementation of the "TsIntegerList" class shall provide, at a minimum, the following functionality.

```
class TsIntegerList
{
public:
        TsIntegerList ( );
        ~TsIntegerList ( );
        const TsInteger nextinteger ( );
        void reset ( );
        size_t integerCount ( ) const;

void appendInteger (TsInteger integer);
};
```

Construction

TsIntegerList:

TsIntegerList ( )

Constructs a new "TsIntegerList" object.

Subsequent to construction and until the first invocation of the "appendInteger( )" function, the newly created integer list object will be empty.

Destruction
TsIntegerList:
TsIntegerList ( )
Destroys a "TsIntegerList" object. The "TsIntegerList" object and all data for which the object has ownership responsibility are destroyed.
appendInteger:
void appendInteger (TsInteger integer)
Appends a single integer, in the form of a "TsInteger" object, to the list of integers contained within the TsIntegerList object.
integer
An integer value to be appended to the list of integers within the "TsIntegerList" object.
nextInteger:
const TsInteger * nextInteger ( )
Returns either a pointer to an integer, in the form of a TsInteger object, or the NULL pointer. Over multiple invocations, the "nextInteger( )" function returns the set of integers contained within the "TsIntegerList" object in the order of their containment. Subsequent to return of the last integer and until the next invocation of the reset function, the "nextInteger( )" function returns the NULL pointer.
reset:
void reset ( )
Causes the next invocation of the "nextInteger( )" function to return the first integer contained within the "TsIntegerList" object.
integerCount:
size_t integerCount ( ) const
Returns the number of integers currently contained within the "TsIntegerList" object.

7.8 TsMeans

The "TsMeans" class provides a C++ representation of the Telescript class "Means" as defined in Appendix A of this disclosure. An implementation of the "TsMeans" shall provide, at a minimum, the following functionality.

```
class TsMeans
{
public:
    typedef enum
    {
        TsMeansType_PSTN = 0,
        TsMeansType_ExistingConnection = 1
    } Type;
    virtual ~TsMeans ( ) = 0;
    Type type ( ) const;
protected:
    TsMeans (Type type);
};
```

Construction
TsMeans:
TsMeans (Type meansType)
Constructs a new "TsMeans" object.
meansType
An enumeration specifying the means type value of the new "TsMeans" object.
Destruction
TsMeans:
virtual TsMeans ( )
Destroys the "TsDestination" object. The "TsDestination" object and all data for which the object has ownership responsibility are destroyed.
Data Access
type:
Type type ( ) const
Returns the means type value of the "TsMeans" object.

7.9 TsObjSpecifier

The "TsObjSpecifier" provides a C++ representation of a class of objects each of which denotes a protocol and distinguishes that protocol from other protocols. For example, a member of the class represented by "TsObjSpecifier" can be used to denote a specific way of providing security. An implementation of the "TsObjSpecifier" class shall provide, at a minimum, the following functionality.

```
class TsObjSpecifier
{
public:
    TsObjSpecifier (TsInteger objId,
        TsOctets * namingAuthority);
    ~TsObjSpecifier ( );
    TsInteger getObjId ( ) const;
    const TsOctets * getNamingAuthority ( ) const;
};
```

Construction
TsObjSpecifier:
TsObjSpecifier (TsInteger objId, TsOctets * namingAuthority)
Constructs a new TsObjSpecifier object.
objId
An integer value that is to form the object identifier value of the new "TsObjSpecifier" object.
namingAuthority
Either a pointer to a "TsOctets" object that is to form the naming authority value of the new "TsObjSpecifier" object; or the NULL pointer, if the new "TsobjSpecifier" object is to contain no naming authority value.
Destruction
TsObjSpecifier:
TsObjSpecifier ( )
Destroys the "TsObjSpecifier" object. The "TsObjSpecifier" object and all data for which the object has ownership responsibility are destroyed.
Data Access
getObjId:
TsInteger getObjId ( ) const
Returns the object identifier value contained within the "TsObjSpecifier" object.
getNaming-Authority:
const TsOctets * getNamingAuthority ( ) const
Returns either a pointer to a "TsOctets" object conveying the naming authority value contained within the "TsObjSpecifier" object; or the NULL pointer, if the "TsObjSpecifier" object contains no naming authority value.

7.10 TsOctet

The TsOctet type provides a C++ representation of the Telescript class "Octet" as defined in Appendix A of this disclosure.

The "TsOctet" type shall be defined as a C++ unsigned char.

7.11 TsOctets

The "TsOctets" class provides a C++ representation of the Telescript class "Octets" as defined in Appendix A of this disclosure. An implementation of the "TsOctets" class shall provide, at a minimum, the following functionality.

```
class TsOctets
{
public:
    enum CopyOwnership { makeCopy, ownCopy,
        borrowCopy };      TsOctets (size_t size);
        TsOctets (size_t size, const TsOctet * data,
            CopyOwnership ownership = makecopy);
        ~TsOctets ( );const TsOctet * nextSeg (int &
segSize);              void reset ( );
        size_t size ( ) const;

void appendseg (size_t size, const TsOctet *
data);
```

Construction

TsOctets:
TsOctets "size_t size,TsOctet * data,CopyOwnership ownership)

Constructs a "TsOctets" object from a single array of "TsOctet" objects.

size

The number of octets to be contained within the new "TsOctets" object.

data

A pointer to an array of octets, i.e., "TsOctet" objects, to be contained within the new "TsOctets" object. The number of elements in the array must be greater than or equal to the value of "size".

Note: For the case where "size" is zero, a zero length array must be provided by the caller.

ownership

An enumeration specifying the method by which the array of octets is to be incorporated into the new "TsOctets" object. The possible values are:

"makeCopy": the data within the octet array must be incorporated into the new "TsOctets" object by the construction of a separate physical copy. Subsequent to the construction, the caller retains complete ownership of the original octet array.

When the ownership argument specified is "makeCopy", the octet array provided by the caller may be either statically, dynamically or automatically allocated.

"ownCopy": The data within the octet array can, at the implementation's discretion, be incorporated into the new "TsOctets" object directly, via the incorporation of the provided octet array itself. Subsequent to the construction, the caller relinquishes ownership of the provided octet array to the new "TsOctets" object.

When the ownership argument specified is "ownCopy", the octet array provided by the caller must be dynamically allocated.

"borrowCopy": The data within the octet array can, at the implementation's discretion, be incorporated into the new "TsOctets" object directly, via the incorporation of the provided octet array itself. Subsequent to the construction of the "TsOctets" object and until its destruction, the caller loans the caller's ownership of the provided octet array to the new "TsOctets" object. For this duration, neither the caller nor the "TsOctets" object may modify or destroy the octet array. Upon destruction of the "TsOctets" object, complete ownership of the octet array passes back to the caller.

When the ownership argument specified is "borrowCopy", the octet array provided by the caller can be either statically, dynamically or automatically allocated.

TsOctets:
TsOctets (size_t eventualSize)

Constructs an empty "TsOctets" object in preparation for the addition of data using the "appendSeg( )" function, which is described below.

eventualSize

The maximum number of octets to eventually be contained with the new "TsOctets" object.

Destruction

TsOctets:
TsOctets ( )

Destroys the "TsOctets" object. The "TsOctets" object and all data for which the object has ownership responsibility are destroyed.

Data Access appendSeg:
void appendseg (size_t size,
TsOctet * data,
CopyOwnership ownership)

Appends an array of octets, i.e., "TsOctet" objects to the set of octets already existing within the "TsOctets" object.

Note: The effect of invoking this function upon a "TsOctets" object created by means of a constructor other than the "TsOctets", i.e., by means of argument "eventualSize" of the constructor function above, size "eventualSize" constructor is implementation defined. Additionally, the effect of appending more data than that declared in the "eventualSize" parameter of the constructor is also implementation defined.

size

The number of octets to be appended to the "TsOctets" object.

data

A pointer to an array of octets, i.e. "TsOctet" objects, to be appended to the "TsOctets" object. The number of elements in the array must be greater than or equal to the value of "size".

Note: For the case where "size" is zero, a zero length array must be provided by the caller.

ownership

An enumeration specifying the method by which the array of octets is to be incorporated into the "TsOctets" object. The possible values and their corresponding meanings are the same as those described for the "TsOctets (size_t size, TsOctet * data, CopyOwnership ownership)" function.

nextSeg:
const TsOctet * nextSeg (size_t & segSize)

Returns either an array of octets and a size value or the NULL pointer. Over multiple invocations, the "nextSeg" function returns a collection of octet array segments which together, in order of appearance, convey the array of octets contained within the "TsOctets" object. Subsequent to the return of the last such segment and until the next invocation of the "reset" function, the "nextSeg" function returns the NULL pointer and leaves the value of the "segSize" parameter unchanged.

Note: The total number of segments returned and size of each individual segment are implementation dependent.

segSize

A reference to an unsigned integer value to be updated with the size of the segment being returned.

reset:
void reset ( )

Causes the next invocation the "nextSeg" function to return the first segment of octets contained within the "TsOctets" object.

size:
size_t size ( ) const

Returns the total number of octets currently contained within the "TsOctets" object.

7.12 TsPSTNMeans

The "TsPSTNMeans" class provides a C++ representation of the Telescript class "PSTNMeans", as defined in Section 3 of this appendix. An implementation of the "TsPSTNMeans" class shall provide, at a minimum, the following functionality.

```
class TsPSTNMeans : public TsReservableMeans{
public:
    TsPSTNMeans(const TsReservation & reservation,
```

-continued
```
        TsTelenumber * telenumber);
    ~TsPSTNMeans ( );
        TsTelenumber * getTelenumber ( ) const;
};
```
Construction

```
TsPSTNMeans:
TsPSTNMeans (const TsReservation & reservation,
        TsTelenumber * telenumber)
```

Constructs a new "TsPSTNMeans" object.
reservation
A reference to a "TsReservation" object that is to form the reservation value of the "TsReservableMeans" super-class component of the new "TsPSTNMeans" object.
telenumber
A pointer to a "TsTelenumber" object that is to form the telenumber value of the new "TsPSTNMeans" object.
Destruction
TsPSTNMeans:
TsPSTNMeans ( )
Destroys the "TsPSTNMeans" object. The "TsPSTNMeans" object and all data for which the object has ownership responsibility are destroyed.
Data Access
getTelenumber:
const TsTelenumber * getTelenumber ( ) const
Returns a pointer to the telenumber value contained within the "TsPSTNMeans" object.

7.13 TsReservableMeans

The "TsReservableMeans" class provides a C++ representation of the Telescript class "ReservableMeans", as defined in Section 3 of this appendix. An implementation of the "TsReservableMeans" class shall provide, at a minimum, the following functionality.

```
class TsReservableMeans : public TsMeans
{
protected:
            TsReservableMeans(TsMeans::Type type,
                    const TsReservation & reservation);
            virtual ~TsReservableMeans ( );
public:
            TsReservation & getReservation ( ) const;
};
```

Construction

```
TsReservableMeans:
TsReservableMeans (TsMeans::Type type,
        const TsReservation & reservation)
```

Constructs a new "TsReservableMeans" object.
type
An enumeration specifying the means type value of the "TsMeans" super-class component of the new "TsReservableMeans" object.
reservation
A reference to a "TsReservation" object conveying the reservation value to be contained within the new "TsReservableMeans" object.
Destruction
TsReservable-Means:
virtual TsReservableMeans ( )
Destroys the "TsReservableMeans" object. The "TsReservableMeans" object and all data for which the object has ownership responsibility are destroyed.
Data Access
getReservation:
const TsReservation & getReservation ( ) const
Returns a reference to the reservation value contained within the "TsReservableMeans" object.

7.14 TsReservation

The "TsReservation" class provides a C++ representation of the Telescript class "Reservation", as defined in Section 3 of this appendix. An implementation of the "TsReservation" class shall provide, at a minimum, the following functionality.

```
class TsReservation
{
public:
        TsReservation (TsInteger id = 0);
        ~TsReservation ( );
        TsInteger id ( ) const;
};
```

Construction
TsReservation:
TsReservation (TsInteger id=0)
Constructs a new "TsReservation" object.
id
A "TsInteger" that is to form the reservation identifier value of the new "TsReservation" object.
Destruction
TsReservation:
TsReservation ( )
Destroys the "TsReservation" object. The "TsReservation" object and all data for which the object has ownership responsibility are destroyed.
Data Access
id:
TsInteger id ( ) const
Returns the reservation identifier value of the "TsReservation" object.

7.15 TsString

The TsString class provides a C++ representation of the Telescript class "String", as defined in Appendix A of this disclosure. An implementation of the "TsString" class shall provide, at a minimum, the following functionality.
Issue: This needs to be extended to support non-ASCII character sets.

```
class TsString
{
public:
        TsString (const TsCharacter * string);
        ~TsString ( )
        const TsCharacter * getString ( ) const;
        size_t size ( ) const;
};
```

Construction
TsString:
TsString (const TsCharacter * string)
Constructs a new "TsString" object.
string
A pointer to a "TsCharacter" array, terminated by a null character, conveying the string of characters to be contained within the new "TsString" object.
Destruction
TsString:
TsString ( )
Destroys the "TsString" object. The "TsString" object and all data for which the object has ownership responsibility are destroyed.
Data Access
getString:
const TsCharacter * getString ( ) const
Returns a pointer to the string of characters contained within the "TsString" object.
size:
size_t size ( ) const
Returns the number of characters currently contained within the "TsString" object.

7.16 TsTeleaddress

The "TsTeleaddress" class provides a C++ representation of the Telescript class "Teleaddress" as defined in Appendix A of this disclosure. An implementation of the "TsTeleaddress" class shall provide, at a minimum, the following functionality.

```
class TsTeleaddress
{
public:
        TsTeleaddress (TsOctets * provider,
                TsString * location);
        -TsTeleaddress ( );
        const TsOctets * getProvider ( ) const;
        const TsString * getLocation ( ) const;
        const TsOctets * nextRoutingAdvice ( );
        void reset ( );
        int routingAdviceCount ( ) const;

void appendRoutingAdvice (TsOctets * advice);
};
```

Construction
TsTeleaddress:
TsTeleaddress (TsOctets * provider, TsString * location)
Constructs a new "TsTeleaddress" object.

Subsequent to construction, the list of routing advice elements contained within the newly created teleaddress object will be empty.

provider

Either a pointer to a "TsOctets" object that is to form the provider value of the new "TsTeleaddress" object, or the NULL pointer if the new teleaddress object is to contain no provider value.

location

Either a pointer to a "TsString" object that is to form the location value of the new "TsTeleaddress" object, or the NULL pointer if the new teleaddress object is to contain no location value.

Destruction
TsTeleaddress:
TsTeleaddress ( )
Destroys the "TsTeleaddress" object. The "TsTeleaddress" object and all data for which the object has ownership responsibility are destroyed.

Data Access
appendRouting-Advice:
void appendRoutingAdvice (TsOctets * advice)

Appends a single element of routing advice, in the form of a "TsOctets" object, to the list of routing advice contained within the "TsTeleaddress" object.

advice

A pointer to a "TsOctets" object conveying the routing advice element to be appended to the "TsTeleaddress" object's routing advice list.

getProvider:
const TsOctets * getProvider ( ) const

Returns either a pointer to the provider value of the "TsTeleaddress" object, or the NULL pointer if the "TsTeleaddress" object contains no provider value.

getLocation:
const TsString * getLocation ( ) const

Returns either a pointer to the location value of the "TsTeleaddress" object, or the NULL pointer if the "TsTeleaddress" object contains no location value.

nextRoutingAdvice:
const TsOctets * nextRoutingAdvice ( )

Returns either a pointer to an element of routing advice, in the form of a "TsOctets" object, or the NULL pointer. Over multiple invocations, the "nextRoutingAdvice( )" function returns the set of routing advice elements contained within the "TsTeleaddress" object in the order of their containment.

Subsequent to return of the last routing advice element and until the next invocation of the reset function, the "nextRoutingAdvice( )" function returns the NULL pointer.

reset:
void reset ( )

Causes the next invocation of the "nextRoutingAdvice( )" function to return the first element of routing advice contained within the "TsTeleaddress" object.

routingAdvice-Count:
size_t routingAdviceCount ( ) const

Returns the number of elements of routing advice currently contained within the "TsTeleaddress" object.

7.17 TsTelename

The "TsTelename" class provides a C++ representation of the Telescript class "Telename", as defined in Appendix A of this disclosure. An implementation of the "TsTelename" class shall provide, at a minimum, the following functionality.

```
class TsTelename
{
public:
        TsTelename (TsOctets * authority, TsOctets *
identity);          -TsTelename ( );
        const TsOctets * getAuthority ( ) const;
        const TsOctets * getIdentity ( ) const;
};
```

Construction
TsTelename:
TsTelename (TsOctets * authority, TsOctets * identity)
Constructs a new "TsTelename" object.

authority

A pointer to an octet string that is to form the authority value of the new "TsTelename" object.

identity

Either a pointer to an octet string that is to form the identity value of the new "TsTelename" object, or the NULL pointer if the "TsTelename" object is to contain no identity value.

Destruction
TsTelename:
TsTelename ( )

Destroys the "TsTelename" object. The "TsTelename" object and all data for which the object has ownership responsibility are destroyed.

Data Access
getAuthority:
const TsOctets * getAuthority ( ) const

Returns a pointer to the authority value contained within the "TsTelename" object.

getIdentity:
const TsOctets * getIdentity ( ) const

Returns either a pointer to the identity value contained within the "TsTelename" object, or NULL if the "TsTelename" object contains no identity value.

7.18 TsTelenumber

The "TsTelenumber" class provides a C++ representation of the Telescript class "Telenumber", as defined in Appendix A of this disclosure. An implementation of the "TsTelenumber" class shall provide, at a minimum, the following functionality.

```
class TsTelenumber
{
public:
        TsTelenumber (TsString * country, TsString *
```

```
telephone,            TsString * extension);
           ~TsTelenumber ( );
           const TsString * getCountry ( ) const;
           const TsString * getTelephone ( ) const;
           const TsString * getExtension const;
};
```

Construction
TsTelenumber:

```
TsTelenumber:
    TsTelenumber (TsString * country, TsString *
telephone,           TsString * extension)
```

Constructs a new "TsTelenumber" object.
country

Either a pointer to a "TsString" object that is to form the country code value of new "TsTelenumber" object, or the NULL pointer if the "TsTelenumber" object is to contain no country code value.

Note: The value contained within the provided "TsString" object is restricted to the set of numerical codes that CCITT assigns to countries or other geographical areas.

telephone

Either a pointer to a "TsString" object that is to form the telephone number value of the new "TsTelenumber" object, or the NULL pointer if the "TsTelenumber" object is to contain no telephone number value.

Note: The characters that form the value contained within the provided "TsString" object are restricted to the numerals ("0"–"9"), the hyphen character ("–") and the space character (" ").

extension

Either a pointer to a "TsString" object that is to form the extension number value of the new "TsTelenumber" object, or the NULL pointer if the "TsTelenumber" object is to contain no extension number value.

Note: The characters that form the value contained within the provided "TsString" object are restricted to the numerals ("0"–"9"), the hyphen character ("–") and the space character (" ").

Destruction
TsTelenumber:
TsTelenumber ( )

Destroys the "TsTelenumber" object. The "TsTelenumber" object and all data for which the object has ownership responsibility are destroyed.

Data Access
getCountry:
const TsString * getCountry ( ) const

Returns either a pointer to the country code value of the "TsTeleaddress" object, or the NULL pointer if the "TsTeleaddress" object contains no country code value.

getTelephone:
const TsString * getTelephone ( ) const

Returns either a pointer to the telephone number value of the "TsTeleaddress" object, or the NULL pointer if the "TsTeleaddress" object contains no telephone number value.

getExtension:
const TsString * getExtension ( ) const

Returns either a pointer to the extension number value of the "TsTeleaddress" object, or the NULL pointer if the "TsTeleaddress" object contains no extension number value.

7.19 TsWay

The "TsWay" class provides a C++ representation of the Telescript class "Way", as defined in Appendix A of this disclosure. An implementation of the "TsWay" class shall provide, at a minimum, the following functionality.

```
class TsWay
{
public:
    TsWay (TsTelename * name,
        TsMeans * means,
        TsObjSpecifier * secRegimeId);
    -TsWay ( );

const TsTelename * getName ( ) const;
    const TsMeans * getMeans ( ) const;
    const TsObjSpecifier * getSecRegimeId ( ) const;
};
```

Construction TsWay:

```
TsWay:
    TsWay (TsTelename * name,
        TsMeans * means,
        TsObjSpecifier * secRegimeId)
```

Constructs a new "TsWay" object.
name

Either a pointer to a "TsTelename" object that is to form the engine/region telename value of the new "TsWay" object, or the NULL pointer if the new "TsWay" object is to contain no engine/region telename.

means

Either a pointer to a "TsMeans" object that is to form the means value of the new "TsWay" object, or the NULL pointer if the new "TsWay" object is to contain no means value.

secRegimeId

Either a pointer to a "TsObjSpecifier" object that is to form the security regime identifier value of the new "TsWay" object, or the NULL pointer if the new "TsWay" object is to contain no security regime identifier value.

Destruction
TsWay:
TsWay ( )

Destroys the "TsWay" object. The "TsWay" object and all data for which the object has ownership responsibility are destroyed.

Data Access
getName:
const TsTelename * getName ( ) const

Returns either a pointer to the engine/region telename value contained within the "TsWay" object, or the NULL pointer if the "TsWay" object contains no engine/region telename.

getMeans:
const TsMeans * getMeans ( ) const

Returns either a pointer to the means value contained within the TsWay object, or the NULL pointer if the "TsWay" object contains no means value.

getSecRegimeId:
const TsObjSpecifier * getSecRegimeId ( ) const

Returns either a pointer to the security regime identifier value contained within the "TsWay" object or the NULL pointer if the "TsWay" contains no security regime identifier value.

APPENDIX D

Copyright © General Magic, Inc. 1993. All Rights Reserved.

The following table of contents is to assist the reader in understanding the organization of and locating information within this appendix.

Table of Contents

| | |
|---|---|
| 1 | INTRODUCTION |
| 1.1 | Permit Changes |
| 1.2 | Other Changes |
| 2 | TELESCRIPT CONCEPTS |
| 2.1 | Place-to-place Transfer Model |
| 2.1.1 | Traveled Places |
| 2.1.2 | Shipping Boxes |
| 2.1.3 | Opened Objects |
| 2.1.4 | Opened Shipping Boxes |
| 2.1.5 | Parts Boxes |
| 2.1.6 | The Use of Tickets |
| 2.1.7 | The Engine's Role |
| 2.1.8 | The Engine's Role in Routing |
| 2.1.9 | Implementing Go |
| 2.1.10 | Implementing Send |
| 3 | TELESCRIPT CLASS OVERVIEWS |
| 3.1 | Place-to-place Transfer Group |
| 3.1.1 | Opened |
| 3.1.2 | Opened Shipping Box |
| 3.1.3 | Parts Box |
| 3.1.4 | Shipping Box |
| 3.1.5 | Traveled |
| 4 | TELESCRIPT CLASS DETAILS |
| 4.1 | Opened |
| 4.2 | Opened Shipping Box |
| 4.3 | Parts Box |
| 4.4 | Shipping Box |
| 4.5 | Traveled |

1 INTRODUCTION

This appendix describes a mechanism for place-to-place transfer, broadly construed to include object interchange and purgatory.

This appendix is organized in the manner of Appendix A of this disclosure.

The place-to-place transfer mechanism necessitates several other changes and additions to the Instruction Set of Appendix A, which are described in the subsections below.

1.1 Permit Changes

Whether "go" or operation "send" succeeds or fails, allow operation "entering" to grant an agent an initial local permit more permissive than the one the agent requested.

Provided operation "go" or operation "send" fails, allow operation "entering" to admit an agent while granting it an initial local permit less permissive than the one the agent requested.

Add to class "Process" a read-only public instance attribute, "regionalPermit", which is the permit the current region grants a process.

Replace the "terminate" operation of a place with a new, "changePermit" operation which replaces a process' local permit. The operation is performed at the request of either the place itself or a peer of the process in question.

Add to class "Process" a system instance operation, "permitChanged", which the Engine requests whenever a place changes an occupant's local permit, e.g., as operation "entering" does above, or to eject the occupant with or without a grace period.

permitChanged:
op ( ) PermitChanged!Nil;

Requested whenever the responder's local permit is changed e.g., by the place the responder is entering or occupies already, either to add capabilities or to remove them. If the operation's result is an exception, rather than a nil, the Engine throws the exception in the responder's thread of execution.

The method for this operation that is native to class "Process" simply returns a nil.

Add to class "Execution Exception" a subclass, "PermitChanged", the throwing of which signifies that the current process' local permit has been changed.

PermitChanged:
interface (ExecutionException)=( );

Note: A process' ability to .catch and recover from this exception, when the process' new local permit is severely restrictive, are limited by the rules of process termination.

1.2 Other Changes

Provided operation "go" or operation "send" fails, allow an agent to find one or more of its interchanged objects missing, as described in the place-to-place transfer model.

Allow the "go" or "send" operation to take an agent to its destination even if the operation fails, e.g., because the destination will not grant the agent the permit the agent requested. Furthermore, operation "entering" is involved even in this case.

Let the Engine request any feature, predefined or user-defined, not just a system feature. A user-defined method for a feature requested by the Engine finds client and process to be nils, as if the feature were a system feature.

Add to class "Process" a read-only public instance attribute, "authenticity", which documents the degree of confidence the current region has in a process' purported authority. This attribute is defined in §4.57 of Appendix A.

To class "Process" add a read-only public instance attribute, "creationTime", which is the time at which a process was created.

Discard the "brand" attribute of a process.

Note: Instead a region can define a subclass of class "Permit" and supply an instance thereof as a process' "regionalPermit" attribute.

2 TELESCRIPT CONCEPTS

2.1 Place-to-place Transfer Model

The Instruction Set realizes the "place-to-place transfer model" this section defines.

2.1.1 Traveled Places

A "traveled" place is one through which shipping boxes are transferred.

Transfer

The traveled places to which the Network entrusts a certain shipping box cooperate to "transfer" the box's contents from one place, the "origin" of the shipping box, to one or more places, "destinations" of the shipping box. A traveled place creates new shipping boxes whenever it must transfer the contents of a shipping box in different directions.

The transfer of the contents of a shipping box from its origin to any one of its destinations proceeds in four steps, the last two of which, i.e. transfer in and transfer out, can be repeated within a single transfer.

Submission

A transfer begins with a shipping box's "submission". The traveled place to which the shipping box is first transferred in as a consequence is its "source".

Delivery

A transfer ends with a shipping box's "delivery". The places to which a submitted shipping box is to be delivered are its "destinations".

A shipping box's delivery is either "normal" or "abnormal". In the first case, the shipping box's destinations are as specified at submission, and all critical parts of the shipping box's contents are present. In the second case, the Network may have prescribed alternative destinations for the shipping box, and some critical parts of the shipping box's contents may be absent. An exception explains the abnormality.

Transfer In

A shipping box is "transferred in" to a traveled place. The transfer in is a consequence of either the shipping box's submission from a place, traveled or otherwise, or the shipping box's transfer out from a traveled place, different from or the same as the traveled place to which the shipping box is transferred in. The place from which the shipping box comes is the shipping box's "previous hop".

Transfer Out

A shipping box is "transferred out" from a traveled place. The transfer out has as its consequence either the shipping box's transfer in to a traveled place, different from or the same as the traveled place from which the shipping box is transferred out, or the shipping box's delivery to places, traveled or otherwise. The place or places to which the shipping box goes is the shipping box's "next hop".

2.1.2 Shipping Boxes

A "shipping box" is one object that holds another, its "contents", and that can be used to transfer that object from place to place.

Peek

A traveled place can "peek" at the object that is a shipping box's contents, i.e., can get the object's attributes, subject to the limitation below.

A shipping box gets an attribute of the shipping box's contents using a protected reference to the contents. If a user-defined method is involved, the method finds "client", "here", and "process" to be nils, as if the attribute were a system attribute. Additionally, peeking at an attribute disregards its prescribed passage, in every case returning a copy of the attribute, rather than the original.

Poke

A traveled place can "poke" at the object that is a shipping box's contents, i.e., can set the object's attributes, subject to the limitation below. A traveled place can do this, however, only if the traveled place is suitably privileged.

A shipping box sets an attribute of the shipping box's contents using an unprotected reference to the contents. If a user-defined method is involved, the method finds "client", "here", and "process" to be nils, as if the attribute were a system attribute. Additionally, poking at an attribute disregards its prescribed passage, in every case using a copy of the proposed attribute, rather than the original.

The privileges alluded to above are assigned as follows. An engine place can set the "authenticationState" or "regionalPermit" attribute, even though the Instruction Set defines these attributes as read-only. Preemptive settings of the "regionalPermit" attribute can dictate the shipping box's abnormal delivery.

Note: A traveled place cannot request operations of a shipping box's contents.

Rebox

A traveled place can "rebox" a shipping box, which the traveled place does if the shipping box must be transferred in different directions. The Engine removes specified destination tickets from the shipping box, replaces them with nils, and reaffixes them to a new shipping box identical in content to the existing one.

Redirect

A traveled place can "redirect" a shipping box, which the traveled place does if an exception arises during its transfer. The Engine affixes the exception to the shipping box, removes any nils among the shipping box's destination tickets, and can substitute for each remaining destination ticket a single specified ticket.

2.1.3 Opened Objects

An "opened" object is one whose zero or more parts can be manipulated.

Parts

Each "part" of an object, opened or not, is an interchanged object whose digest is not a nil. A part of an opened object can be replaced with another object of the part's class and digest without materially affecting the opened object.

Presence

Each part of an object, opened or not is either "present" or absent. The "absence" of a part, in general, limits the object's use, but makes the object's place-to-place transfer more efficient. If an object attempts to use a reference to a part of itself that is absent at the time, the Engine throws "Reference Void".

Note: In typical practice, a part of the contents of a shipping box is present at the shipping box's submission and again at the shipping box's delivery, but is absent at some or all of the other steps in the shipping box's transfer, as a performance optimization.

Criticality

Each part of an object, opened or not, is either critical or non-critical. An object is designed to be used even in the absence of one or more of the object's "non-critical" parts, but not in the absence of any of the object's "critical" ones.

Note: The absence of a critical part of an object prevents normal delivery of a shipping box containing that object, while the absence of a non-critical part does not.

Note: In typical practice, all parts of an object are critical everywhere. Occasionally, a part of an object is critical only while the object is in a certain place.

2.1.4 Opened Shipping Boxes

An "opened shipping box" is one whose parts can be manipulated. The parts of an opened shipping box are those of the shipping box's contents.

2.1.5 Parts Boxes

A "parts box" is an opened object whose parts can be specified explicitly and arbitrarily. Parts boxes serve the following four purposes.

Manipulating Parts

The parts of an opened object are manipulated by means of parts boxes. This ensures that the parts are not directly accessible to the object doing the manipulation. The parts in a parts box, e.g., can be included in an opened object, and specified parts of an opened object can be copied or moved into a parts box. The parts themselves cannot be examined, even while in the parts box.

Note: This protects the intellectual property represented by interchanged objects.

Storing Parts

A traveled place entrusted with opened shipping boxes can use a parts box as a repository for parts to be included in such shipping boxes. The parts box, a small database, serves as a resource in place-to-place transfer.

Note: This simplifies the implementation of traveled places.

Taking Parts

If a shipping box's contents include a parts box, the parts box's critical parts are specifically excluded from the shipping box's parts. Thus the traveled places involved in the shipping box's transfer can neither examine nor exclude those parts. The optimization that such exclusion would represent is not attempted.

Note: This enables agents that support place-to-place transfer to move interchanged objects between traveled places without the system as a whole attempting to avoid that movement by the system's (in this case misguided) optimization efforts.

Leaving Parts

If a shipping box's contents include a parts box, the part box's non-critical parts are specifically included in the shipping box's. In this way, an agent can declare an interchanged object non-critical and thereafter take trips without that part of necessity accompanying the agent. By later removing the part from the parts box, the agent declares the part critical. Then, if the part is absent, either the Engine finds the part locally, or the Engine throws "Reference Void" when the agent uses the part.

Note: This enables agents to visit places at which certain of their interchanged objects will not be used without insisting that those objects nevertheless be present there.

2.1.6 The Use of Tickets

Tickets define, as detailed below, the places through which a shipping box is transferred. Throughout this section, the "place attributes" are the "destinationName", "destinationAddress", and "destinationClass" attributes Other ticket attributes that are not mentioned specifically below are disregarded.

Source

A ticket is used to define a shipping box's source. The ticket's place attributes, which identify the source, are an assigned telename, an assigned teleaddress, and an assigned citation, respectively. The ticket's "way" attribute, if not a nil, dictates the way in which the source shall be reached if need be.

Destination

A ticket is used to define each of a shipping box's destinations. The ticket's place attributes identify the destination in question. The ticket's "way" attribute, if not a nil, dictates the way in which that destination shall be reached. The "desiredWait" and "maximumWait" attributes give the quality of service to be provided the shipping box as it is transferred to that destination.

Previous Hop

A ticket is used to define a shipping box's previous hop. The ticket's attributes "destinationName", "destinationAddress" and "destinationClass", which identify the previous hop, are an assigned telename, an assigned teleaddress, and an assigned citation, respectively. The ticket's "way" attribute, if not a nil, defines the way in which the shipping box was transferred in from the previous hop.

Next Hop

A ticket is used to define a shipping box's next hop. The ticket's place attributes identify the next hop. The ticket's "way" attribute, if not a nil, dictates the way in which the next hop shall be reached.

2.1.7 The Engine's Role

Traveled places are properly viewed as facilitating, rather than controlling, the transfer of shipping boxes and their eventual delivery to their destinations. The Engine itself is instrumental in this process as follows.

Transfer In

Whenever a traveled place transfers in a shipping box, the Engine has already determined whether that shipping box is an opened one or not. In typical practice, the Engine makes this determination consistently, not on a box-by-box basis. Thus some traveled places, in general, are entrusted with the interchange of parts of the contents of shipping boxes, while others are not.

Transfer Out

Whenever a traveled place transfers out a shipping box, "A", the Engine does the following. First, the Engine reboxes "A", moving to a new shipping box, "B", the tickets to any destinations to which the Engine can deliver shipping boxes. The Engine moves tickets to "B", however, only if the transfer out is one allowing delivery. Second, the Engine reboxes "A" again, moving all remaining tickets to another new shipping box, "C". Third, the Engine asynchronously transfers "C" and attempts to deliver "B".

Expiration

Whenever a traveled place allows any destination tickets of a shipping box, "A", to expire, the Engine does the following. Such a ticket "expires" when its maximum duration is reached. First, the Engine reboxes "A", moving the expired tickets to a new shipping box, "B". Second, the Engine redirects "B" to a place chosen by the Engine, recording "Ticket Expired" as the cause of the abnormality. Third, the Engine transfers out "B" to a place chosen by the Engine, as if the traveled place had done so.

Discard

Whenever a traveled place discards a shipping box, "A", to which any destination tickets remain affixed, and so as to provoke the finalization of "A", the Engine does the following. First the Engine reboxes "A", moving all destination tickets to a new shipping box, "B". Second, the Engine destroys "A". Third, the Engine asynchronously transfers out "B" to a place of the Engine's own choosing, as if the traveled place had done so.

2.1.8 The Engine's Role in Routing

The Engine limits the routes along which a shipping box is transferred by selecting the shipping box's second hop, constraining the shipping box's second-to-last hop, and, furthermore, restricting the shipping box's first hop in any sequence of hops within a region.

First Regional Hop

The Engines of a region cooperate to ensure that a shipping box entering the region is transferred in at an engine place before the shipping box is either transferred in at another traveled place in the region or delivered within the region.

Second Hop

The Engine selects as follows a shipping box's second hop, i.e., the traveled place at which the shipping box is first transferred in—from the shipping box's source.

The second hop is either the shipping box's submission place, if that is a traveled place, or a superplace of the submission place, otherwise. If several superplaces are traveled places, the one enclosing none of the others is selected.

Note: Thus "submission" can be visualized as causing a shipping box to fall through its origin and successive superplaces until the shipping box reaches a traveled place.

Second-to-last Hop

The Engine constrains as follows a shipping box's second-to-last hop, i.e., the traveled place from which the shipping box is last transferred out—to all of the shipping box's destinations.

The second-to-last hop is either a destination itself or one of its superplaces, this being so for each of the shipping box's destinations individually.

Note: Thus "delivery" can be visualized as causing a shipping box to rise through successive subplaces until the shipping box reaches one qualifying as each destination of the shipping box.

Given the second-to-last hop, if several places qualify as one of the shipping box's destinations, the Engine tries to deliver the shipping box to one of them, approaching them in the order defined by section 2.5.4 of Appendix A.

Given the second-to-last hop, if either no places qualify as one of the shipping box's destinations or none of them accepts delivery of the shipping box, the Engine transfers out the shipping box to a place of the Engine's own choosing.

Non-delivery

An Engine treats the ultimate undeliverability of a shipping box as a system error, which the Engine handles in accordance with the OAM policy in force.

Note: An Engine can provide a place of last resort, "Purgatory", for otherwise undeliverable shipping boxes. Such a place can severely limit an occupant's local permit.

2.1.9 Implementing Go

The method for "go" native to class "Agent" implements the operation as follows using a shipping box whose contents are the agent and the objects the agent owns.

Submission

The Engine creates and submits a shipping box containing the agent after validating the agent's request for the operation. Thus the shipping box's first hop, i.e., its origin, is the place the agent occupies when the agent requests the operation.

Delivery

The Engine delivers a shipping box by completing the operation. Thus the shipping box's last hop, i.e., its sole destination, is the place the agent occupies when the agent completes the operation.

The operation either succeeds, if both the shipping box does not record an exception and only non-critical parts of the shipping box's contents are absent, or fails, otherwise. If the operation fails, the operation throws either the exception the shipping box records, if the shipping box records one, or an exception of the Engine's choosing, otherwise.

2.1.10 Implementing Send

The method for operation "send" native to class "Agent" implements that operation in the same way as operation "go" is implemented, with two differences. First, the shipping box has as many destinations as there are clones to be transferred. Second, the contents of the shipping box are a representative clone of the agent requesting the operation. The "identity" attribute of the clone's assigned telename is a nil at submission, but is set distinctively as each clone is delivered.

3 TELESCRIPT CLASS OVERVIEWS

3.1 Place-to-place Transfer Group

Object (Referenced)
- Parts Box (Opened)
- Shipping Box (Unmoved)
  - Opened Shipping Box (opened)

Opened
Traveled

3.1.1 Opened

Operations
clearParts
examineParts
excludeParts
getClasses
getDigests
getNumber
includeParts An "opened" object is one whose parts can be manipulated.

An opened object's native operations reveal the number (operation "getNumber"), classes (operation "getClasses"), and digests (operation "getDigests") of parts satisfying specified criteria; include new parts (operation "includeParts"); exclude existing parts (operation "excludeParts"); exclude all existing parts satisfying a specified criterion (operation "clearParts"); and arrange for the inspection of specified parts (operation "examineParts").

3.1.2 Opened Shipping Box

An "opened shipping box" is one whose parts can be manipulated.

3.1.3 Parts Box

Operations
includeParts

A "parts box" is an object whose parts can be both specified and manipulated.

A parts box's native operation includes new parts (operation "includeParts").

3.1.4 Shipping Box

Attributes
destinations
exception
source
time
Operations
peek
poke
rebox
redirect A "shipping box" is an object that can be transferred between places.

A shipping box's native attributes are the time the shipping box was submitted (attribute "time"), a ticket to the shipping box's source (attribute "source"), tickets to the shipping box's destinations (attribute "destinations"), and any exception encountered in transferring the shipping box (attribute "exception").

A shipping box's native operations get (operation "peek") or set (operation "poke") a specified attribute of the shipping box's contents, redirect the shipping box in case of an exception (operation "redirect"), and rebox the shipping box to permit several next hops (operation "rebox").

3.1.5 Traveled

Operations
transferout
transferredIn

A "traveled" object is a place that can transfer shipping boxes.

A traveled place's native operations transfer out a shipping box (operation "transferOut") and act upon a shipping box's transfer in (operation "transferredIn").

4 TELESCRIPT CLASS DETAILS

4.1 Opened

Opened
Class
Opened:
sealed abstract interface ( )=( . . . );
Public Instance Operations
clearParts:
unprotected op (isCritical: Boolean,¦Nil);

Removes from the responder and discards all of the responder's present parts that satisfy the criterion that the boolean (argument "isCritical") prescribes. See operation "getClasses" below.

examineParts:
op ( ofClass: Class;
    digests: protected Set [Object])
PartsBox¦Nil;

Leaves in the responder and returns the present parts whose class (argument "ofClass") and digests (argument "digests") are specified. The operation returns either a parts box comprising the parts, if there are any, or a nil, otherwise.

excludeParts:
unprotected op (ofClass : Class;
    digests: protected Set [Object])
PartsBox¦Nil;

Excludes from the responder and returns the present parts whose class (argument "ofClass") and digests (argument "digests") are specified. The operation returns either a parts box comprising the parts, if there are any, or a nil, otherwise.

getClasses:
op (isPresent, isCritical: Boolean¦Nil)

-continued
```
    protected Set [Class];
```

Returns the classes of the parts of the responder that satisfy the criteria—defined below—that the booleans (arguments "isPresent" and "isCritical") prescribe.

The first criterion, defined by the first boolean, is that the part is either present, if the boolean is true; absent, if it is false; or either, if the argument is a nil. The second criterion, defined by the second boolean, is that the part is either critical, if the boolean is true; non-critical, if it is false; or either, if the argument is a nil.

```
getDigests:
    op (ofClass: Class; isPresent, isCritical:
Boolean¦Nil)
        protected Set [object];
```

Returns the digests of the parts of the responder that are of the specified class (argument "ofClass") and that satisfy the criteria—see operation "getClasses" above—that the booleans (argument "isPresent" and "isCritical") prescribe.
getNumber:
op (isPresent isCritical: Boolean¦Nil) Integer;
Returns the number of parts of the responder that satisfy the criteria—see operation "getClasses" above—that the booleans ("isPresent" and "isCritical") prescribe.
includeParts:
unprotected op (parts: protected PartsBox);
Includes in the responder the parts of the parts box (argument "parts") that match, in class and digest, parts of the responder. The operation first excludes from the responder and discards any matching parts that are present there already.

4.2 Opened Shipping Box

```
Object (Referenced)
    •   Shipping Box (Unmoved)
        •   Opened Shipping Box (Opened)
```

Class
OpenedShippingBox:
sealed interface (ShippingBox, Opened)=( );
4.3 Parts Box

```
Object (Referenced)
    •   Parts Box (Opened)
```

Class
PartsBox:
sealed interface (Object, Opened)=( . . . );
Construction

```
initialize:
unprotected op (
    criticalParts, noncriticalParts: Set
    [Interchanged]¦Nil);
```

Makes the two sets of interchanged objects the responder's critical (argument "criticalParts") and non-critical (argument "noncriticalParts") parts, all present initially. If a nil is present instead of a set, however, the set is presumed cleared.
Public Instance Operations
"includeParts":
unprotected op (parts: protected PartsBox);
Includes in the responder the parts of the parts box (argument "parts"). Each part is considered present in the responder; each part is considered critical in the responder if the part is so considered in the parts box. The operation first excludes from the responder and discards any matching parts that are present there already.

4.4 Shipping Box

```
Object (Referenced)
    •   Shipping Box(Unmoved)
```

Class
ShippingBox:
sealed interface (Object, Unmoved)=( . . . );
Construction

```
initialize:
unprotected op ( )
    throws FeatureUnavailable;
```

Throws an exception ("FeatureUnavailable").

Note: A shipping box is created by means of operation "go" or "send", not using operation "new".
Public Instance Attributes
destinations:
readonly protected List [Ticket¦Nil];
The tickets that define the responder's destinations, and zero or more nils, which replace tickets moved to other shipping boxes using operation "rebox".
exception:
readonly TripException¦Nil;
Either the trip exception encountered in the course of transferring the responder, if indeed a trip exception was encountered, or a nil, otherwise.
source:
readonly protected Ticket;
The ticket that defines the responder's source.
time:
readonly Time;
The time at which the responder was submitted.
Public Instance Operations

```
peek:
op (identifier: Identifier!) copied Object
    throws CopyUnavailable, FeatureUnavailable;
```

Returns the attribute of the responder's contents that the identifier (argument "identifier") denotes.

An exception is thrown if the identifier denotes no attribute of the responder's contents that is accessible to the requester ("FeatureUnavailable") or a copy of the attribute is unavailable ("CopyUnavailable").

```
poke:
unprotected op (identifier: Identifier!;
        attribute: copied object)
    throws ArgumentInvalid, AttributeReadOnly,
        FeatureUnavailable;
```

Makes the object (argument "attribute") the attribute of the responder's contents that the identifier (argument "identifier") denotes. The operation first discards the attribute if it exists.

An exception is thrown if the object violates the attribute's constraint ("ArgumentInvalid"), the attribute is read-only ("AttributeReadOnly"), or the identifier denotes no attribute of the responder's contents that is accessible to the requester ("FeatureUnavailable").

```
rebox:
unprotected op (tickets: protected Set [Integer])
    ShippingBox
    throws PositionInvalid;
```

Creates and returns a new shipping box whose contents are the same as the responder's, and moves to the new shipping box the tickets at the specified positions ("tickets") in the responder's "destinations" attribute, replacing them with nils.

An exception is thrown if an asserted position is invalid as such ("PositionInvalid").

```
redirect:
unprotected op (exception: TripException;
        newDestination: copied Ticket|Nil);
```

Excludes from the responder's "destinations" attribute each nil item, replaces each item that remains with the ticket (argument "newDestination") if there is one, and makes the exception (argument "exception") the responder's "exception" attribute.

Adaptations
copy
Throws Copy Unavailable.
finalize
Reboxes the responder as defined by the Model.
4.5 Traveled
Traveled
Class
Traveled:
abstract interface ( )=( . . . );
Private Instance Operations

```
transferOut:
unprotected op (shippingbox: unprotected ShippingBox;
        suggestedNextHop: protected
            Ticket|Nil;
        canDeliver: Boolean);
```

Transfers out the shipping box (argument "shippingBox") to the place either defined by the ticket (argument "suggestedNextHop"), if not a nil, or selected by the Engine, otherwise. Even if the ticket is present, the ticket suggests, rather than demands, that the next hop be the place that the ticket defines. The boolean (argument "canDeliver") indicates whether the Engine is free to deliver the shipping box if the Engine is able to do so.

System Instance Operations

```
transferredIn:
abstract unprotected op (shippingbox: unprotected
        ShippingBox;
        previousHop: protected Ticket);
```

Requested as the shipping box (argument "shippingBox") is transferred in from the place defined by the ticket (argument "previousHop").

The computer program in Microfiche Appendix G was compiled and linked, in one embodiment, using the UNIX operating system IRIX 4.0.5, the compiler, and the linker that are provided with a workstation such as the Iris Indigo® computer system available from Silicon Graphics of Mountain View, Calif. In a second embodiment, the computer program in Microfiche Appendix G was compiled using the MPW C++ compiler, and was linked using the MPW linker, both of which are available from Apple Computer, Inc. of Cupertino, Calif. and which can be used on an Apple Macintosh® computer, which is also available from Apple Computer, Inc. The particular computer language and the computer system used are not an essential aspect of this invention. In view of this disclosure, those skilled in the art can implement the invention using a different computer language and/or a different computer system.

What is claimed is:

1. A method for implementing remote programming in a computer network comprising:

defining a plurality of object-oriented classes including an agent class and a place class;

forming instructions for a computer process, said instructions including said object-oriented classes, subclasses of said object-oriented classes, and a go operation; and interpreting said instructions on a processor in said computer network wherein, in response to said go operation, an agent process is transported to a place process and further wherein said agent process is a member of said agent class and said place process is a member of said place class.

2. The method for implementing remote programming in a computer network as in claim 1 further comprising forming said go operation within said agent process.

3. The method for implementing remote programming in a computer network as in claim 1 further comprising forming a subplace of said place process wherein said subplace is a member of said place class and said place process is a superplace of said subplace.

4. The method for implementing remote programming in a computer network as in claim 1 further comprising designating said agent process as an owner of an object.

5. The method for implementing remote programming in a computer network as in claim 4 further comprising forming within said object a digest.

6. The method for implementing remote programming in a computer network as in claim 5 further comprising interchanging for said first-mentioned object a second object at said place process wherein said second object has a second digest equivalent to said first-mentioned digest and further wherein said first object is not transported to said place process.

7. The method for implementing remote programming in a computer network as in claim 1 further comprising specifying said place process by a ticket means.

8. The method for implementing remote programming in a computer network as in claim 7 further comprising forming said ticket means within said agent process.

9. The method for implementing remote programming in a computer network as in claim 7 further comprising forming within said ticket means an address of said place process.

10. The method for implementing remote programming in a computer network as in claim 9 wherein said address is a teleaddress.

11. The method for implementing remote programming in a computer network as in claim 7 further comprising forming within said ticket means a name of said place process.

12. The method for implementing remote programming in a computer network as in claim 11 wherein said name is a telename.

13. The method for implementing remote programming in a computer network as in claim 1 further comprising:

defining a class of class objects;

forming a class object, wherein said class object (i) is a member of said class of class objects, and (ii) defines a first class which is a subclass of a selected one of said object-oriented classes; and forming an object, said object being a member of said first class;

wherein said agent process owns said object; and transportation of said agent process to said place process comprises transporting said object and said class object to said place process.

14. A method for implementing remote programming in a computer network comprising:

defining a plurality of object-oriented classes including an agent class and a place class;

forming instructions for a computer process including said object-oriented classes, subclasses of said object-oriented classes, and a send operation; and interpreting said instructions on a processor in said computer network wherein, in response to said send operation, a clone Of an agent process is transported to a place process and further wherein said clone and said agent process are each a member of said agent class and said place process is a member of said place class.

15. The method for implementing remote programming in a computer network as in claim 14 further comprising forming said send operation within said agent process.

16. The method for implementing remote programming in a computer network as in claim 14 further comprising forming a subplace of said place process wherein said subplace is a member of said place class and said place process is a superplace of said subplace.

17. The method for implementing remote programming in a computer network as in claim 14 further comprising designating said agent process as an owner of an object.

18. The method for implementing remote programming in a computer network as in claim 17 wherein transportation of said clone comprises transporting a copy of said object to said place process.

19. The method for implementing remote programming in a computer network as in claim 18 further comprising forming within said object a digest.

20. The method for implementing remote programming in a computer network as in claim 19 further comprising interchanging for said copy a second object, which is different from said first-mentioned object, at said place process wherein said second object has a second digest equivalent to said first-mentioned digest and further wherein said copy is not transported to said place process.

21. The method for implementing remote programming in a computer network as in claim 14 further comprising specifying said place process by a ticket means.

22. The method for implementing remote programming in a computer network as in claim 21 further comprising forming said ticket means within said agent process.

23. The method for implementing remote programming in a computer network as in claim 21 further comprising forming within said ticket means an address of said place process.

24. The method for implementing remote programming in a computer network as in claim 23 wherein said address is a teleaddress.

25. The method for implementing remote programming in a computer network as in claim 21 further comprising forming within said ticket means a name of said place process.

26. The method for implementing remote programming in a computer network as in claim 25 wherein said name is a telename.

27. The method for implementing remote programming in a computer network as in claim 14 further wherein, in response to said send operation, a second clone of said agent process is transported to a second place process wherein said second clone is a member of said agent class and is distinct from said first-mentioned clone and further wherein said second place process is a member of said place class.

28. The method for implementing remote programming in a computer network as in claim 27 further comprising:
determining that transportation of said first clone to said first place process and of said second clone to said second place process requires transportation of said first and second clones to a single computer of a plurality of computers of said computer network;
transporting said first clone to said single computer; and
forming, in said single computer, said second clone from said first clone.

29. The method for implementing remote programming in a computer network as in claim 28 further comprising:
transporting said first clone from said single computer to said first-mentioned place process; and
transporting said second clone from said single computer to said second place process.

30. A method for interprocess communication in a computer comprising:
defining a plurality of object-oriented classes including an agent class;
forming instructions for a computer process including said object-oriented classes, subclasses of said object-oriented classes, and a meet operation; and
interpreting said instructions on a processor in said computer network wherein, in response to said meet operation, a meeting place process provides a first agent process access to a second agent process and provides said second agent process access to said first agent process and further wherein said first and second agent processes are members of said agent class.

31. The method for interprocess communication in a computer as in claim 30 wherein said meeting place process is a member of a place class in said plurality of object-oriented classes and further wherein said first and second agent processes occupy said meeting place process.

32. The method for interprocess communication in a computer as in claim 31 further comprising forming a second place process wherein:
said second place process is a member of said place class;
said second place process is a subplace of said meeting place process; and
said meeting place is a superplace of said second place.

33. A method for controlling movement of processes in a computer network, said method comprising:
defining a plurality of object-oriented classes including an agent class, a place class, and a ticket class;
forming a plurality of place processes in said computer network wherein each of said plurality of place process is a member of said place class;
forming an agent process wherein said agent process is a member of said agent class and occupies a first place process in said plurality of place processes; and
forming a ticket wherein said ticket is a member of said ticket class and defines a trip involving the movement of said agent process from said first place process to a second place process in said plurality of place processes.

34. A method for limiting capabilities of processes in a computer network, said method comprising:
defining a plurality of object-oriented classes including a process class and a permit class;
forming a process wherein said process is a member of said process class; and
forming a permit wherein said permit is a member of said permit class and specifies one or more capabilities of said process.

35. The method as in claim 34 further comprising:
defining within said process class a go operation; and
specifying within said permit whether said process is capable of performing said go operation.

36. The method as in claim 34 further comprising:
defining within said process class a send operation; and
specifying within said permit whether said process is capable of performing said send operation.

37. The method as in claim 34 further comprising:
defining within said process class a charge operation; and specifying within said permit whether said process is capable of performing said charge operation.

38. The method as in claim 34 further comprising:

defining within said process class a terminate operation; and specifying within said permit whether said process is capable of performing said terminate operation.

39. The method as in claim 34 further comprising specifying within said permit whether said process is capable of creating a second process, different from said first-mentioned process, wherein said second process is a member of said process class.

40. The method as in claim 34 further comprising:

defining an object-oriented place class; and specifying within said permit whether said process is capable of creating members of said place class.

41. The method as in claim 34 further comprising specifying within said permit whether said process is restarted upon failure of said process.

42. The method as in claim 34 further comprising specifying within said permit an amount of processing that is allotted to said process.

43. The method as in claim 34 further comprising specifying within said permit a time at which said process is terminated.

44. The method as in claim 34 further comprising:

defining within said process class a restrict operation;

forming instructions for a computer process, said instructions including said classes, subclasses of said classes, and said restrict operation;

interpreting said instructions on a processor in said computer network wherein, in response to said restrict operation, a second permit, which is different from said first-mentioned permit, is formed and further wherein said second permit is a member of said permit class and specifies a group of one or more capabilities of said one or more capabilities of said process; and restricting said process to said group of one or more capabilities specified by said second permit.

45. In a computer, a method of interpreting processes of various versions of an instruction set, said method comprising:

defining a plurality of object-oriented classes including a class of classes and a class of citations;

forming one or more class objects wherein said class objects are members of said class of classes;

forming within a first of said class objects a citation wherein said citation specifies said first class object and specifies which of said class objects are backward compatible with said first class object.

46. In a computer network having a plurality of computers, a communication process comprising:

providing a plurality of place processes within said computer network wherein each place process is a locale in one of said computers for zero or more agent processes;

specifying, by a ticket means, a trip for an agent process to a destination place process in said plurality of place processes; and transporting, in response to a send operation within said agent process, a clone of said agent process to said destination place process.

47. In a computer network having a plurality of computers, the communication process as in claim 46 further comprising specifying, by a second ticket means, a second trip, which is different from said first-mentioned trip, for said agent process to a second destination place process in said plurality of place processes.

48. In a computer network having a plurality of computers, the communication process as in claim 47 further comprising:

determining that said first-mentioned clone, in taking said first trip, and a second clone, in taking said second trip, are both to be transported to a single computer of said computers;

moving to said single computer said first clone; and forming within said single computer said second clone from said first clone.

49. In a computer network having a plurality of computers, the communication process as in claim 48 further comprising transporting said first clone to said first-mentioned destination place process.

50. In a computer network having a plurality of computers, the communication process as in claim 48 further comprising transporting said second clone to said second destination place process.

51. In a computer network having a plurality of computers, the communication process as in claim 46 further comprising transporting, in response to a go operation within said agent process, said agent process to said destination place process specified by said ticket means.

52. In a computer network having a plurality of computers, the communication process as in claim 46 further comprising specifying said destination place process by a name within said ticket means.

53. In a computer network having a plurality of computers, the communication process as in claim 52 wherein said name is a telename.

54. In a computer network having a plurality of computers, the communication process as in claim 46 further comprising specifying said destination place process by an address within said ticket means.

55. In a computer network having a plurality of computers, the communication process as in claim 54 wherein said address is a teleaddress.

56. In a computer network having a plurality of computers, the communication process as in claim 46 further comprising specifying, within said ticket means, said destination place process by a Citation of a class of which said destination place process is a member.

57. In a computer network having a plurality of computers, the communication process as in claim 46 further comprising specifying, within said ticket means, said destination place process by any combination of an address of said destination place process, a name of said destination place process, and a citation of a class of which said destination place process is a member.

58. In a computer network having a plurality of computers, the communication process as in claim 46 further comprising specifying, within said ticket means, a maximum time period for said trip.

59. In a computer network having a plurality of computers, the communication process as in claim 46 further comprising specifying, within said ticket means, a desired time period for said trip.

60. In a computer network having a plurality of computers, the communication process as in claim 46 further comprising specifying, within said ticket means, a transportation means wherein said transportation means specifies a type of intercomputer communications means by which said clone is transported.

61. In a computer network having a plurality of computers, the communication process as in claim 46 further comprising controlling, with a destination permit contained in said ticket means, a deadline for said agent process at said destination place process.

62. In a computer network having a plurality of computers, the communication process as in claim 46 further comprising controlling, with a destination permit contained in said ticket means, operations that said agent process is allowed to perform at said destination place process.

63. In a computer network having a plurality of computers, the communication process as in claim 46 further comprising controlling, with a destination permit contained in said ticket means, resources that said agent process is allowed to consume at said destination place process.

64. In a computer network having a plurality of computers, the communication process as in claim 46 further comprising specifying, with a destination permit contained in said ticket means, a priority for said agent process at said destination place process relative to other processes at said destination place process.

65. In a computer network having a plurality of computers, the communication process as in claim 46 further comprising controlling, via a permit means, a capability that a process is allowed to have.

66. In a computer network having a plurality of computers, the communication process as in claim 65 wherein said permit means is a native permit.

67. In a computer network having a plurality of computers, the communication process as in claim 65 wherein said permit means is a local permit.

68. In a computer network having a plurality of computers, the communication process as in claim 65 wherein said permit means is a temporary permit.

69. In a computer network having a plurality of computers, the communication process as in claim 65 wherein said capability comprises resources that said process can consume.

70. In a computer network having a plurality of computers, the communication process as in claim 65 wherein said capability comprises a deadline after which the process can not proceed.

71. In a computer network having a plurality of computers, the communication process as in claim 65 wherein said capability comprises a priority for said process relative to other processes.

72. In a computer network having a plurality of computers, the communication process as in claim 65 wherein said capability comprises permission for said process to perform selected operations.

73. In a computer network having a plurality of computers, the communication process as in claim 46 wherein said agent process owns an object.

74. In a computer network having a plurality of computers, the communication process as is claim 73 wherein said object has a digest.

75. In a computer network having a plurality of computers, the communication process as is claim 74 wherein said transporting a clone of said agent process comprises transporting a copy of said object.

76. In a computer network having a plurality of computers, the communication process as is claim 75 further comprising interchanging for said copy a second object at said destination place process wherein said second object has a digest equivalent to said first-mentioned digest and further wherein said copy is not transported to said destination place process.

77. In a computer network having a plurality of computers, the communication process as in claim 73 further comprising using an interchanged object for said object at said destination place process thereby eliminating the need to transport said object to said destination place process.

78. In a computer network having a plurality of computers, the communication process as in claim 46 wherein said transporting a clone of said agent process further comprises entering said destination place process.

79. In a computer network having a plurality of computers, the communication process as in claim 46 wherein said transporting a clone of said agent process further comprises exiting a source place process.

80. In a computer network having a plurality of computers, the communication process as in claim 46 wherein said destination place process is a meeting place process and said meeting place process arranges a meeting between a requestor agent process and a petitioned agent process.

81. In a computer, a communication process comprising:

providing a first agent process and a second agent process;

specifying a meeting between said first and second agent processes by a petition means; and arranging said meeting between said first and second agent processes as defined by said petition means.

82. In a computer, the communication process as in claim 81 further comprising forming said petition means within said first agent process.

83. In a computer, the communication process as in claim 81 wherein said specifying a meeting comprises specifying, within said petition means, said second agent process.

84. In a computer, the communication process as in claim 83 wherein said specifying said second agent process comprises specifying, within said petition means, said second agent by a name.

85. In a computer, the communication process as in claim 84 wherein said name is a telename.

86. In a computer, the communication process as in claim 83 wherein said specifying said second agent process comprises specifying, within said petition means, a class of which said second agent process is a member.

87. In a computer, the communication process as in claim 83 wherein said specifying said second agent process comprises specifying, within said petition means, a citation of a class of which said second agent process is a member.

88. In a computer, the communication process as in claim 81 wherein said specifying a meeting comprises specifying, within said petition means, a maximum time period for arranging said meeting.

89. In a computer, the communication process as in claim 81 wherein said arranging said meeting comprises providing to said first agent process a reference to said second agent process.

90. In a computer, the communication process as in claim 89 wherein said arranging said meeting further comprises providing to said second agent process a reference to said first agent process.

91. In a computer, the communication process as in claim 81 further comprising causing, in response to an instruction within said first agent process, performance of an operation within said second agent process.

92. In a computer, the communication process as in claim 91 wherein said first agent process owns an object.

93. In a computer, the communication process as in claim 92 further comprising providing to said second agent process a reference to said object.

94. In a computer, the communication process as in claim 93 wherein said reference is a protected reference.

95. In a computer, the communication process as in claim 92 further comprising providing to said second agent process a reference to a copy of said object.

96. In a computer, the communication process as in claim 91 wherein said second agent process owns an object.

97. In a computer, the communication process as in claim 96 further comprising providing to said first agent process a reference to said object.

98. In a computer, the communication process as in claim 97 wherein said reference is a protected reference.

99. In a computer, the communication process as in claim 96 further comprising providing to said first agent process a reference to a copy of said object.

100. In a computer network having a plurality of computers, a communication system comprising:

an agent means having a ticket means and a send operation; and a plurality of place means wherein each place means is operative in one of said plurality of computers;
wherein said agent means is at a first place means in said plurality of place means;
said ticket means specifies a trip for said agent means to a destination place means in said plurality of place means; and
said send operation transports a clone of said agent means to said destination place means.

101. In a computer network having a plurality of computers, the communication system as in claim 100 wherein said agent means further comprises a second ticket means, different from said first-mentioned ticket means, that specifies a second trip to a second destination place means for said agent means.

102. In a computer network having a plurality of computers, the communication system as in claim 101 wherein performance of said send operation transports a second clone of said agent means to said second destination place means.

103. In a computer network having a plurality of computers, the communication system as in claim 102 wherein:

said first-mentioned trip and said second trip both include transportation to a single computer in said plurality of computers; and further wherein, in transporting said first mentioned clone to said first-mentioned destination place means and said second clone to said second destination place means, performance of said send operation:
(a) transports said first clone to said single computer and
(b) forms said second clone from said first clone within said single computer.

104. In a computer network having a plurality of computers, the communication system as in claim 100 wherein said agent means further comprises a go operation wherein said go operation transports said agent means to a third destination place means specified by a third ticket means.

105. In a computer network having a plurality of computers, the communication system as in claim 100 wherein said ticket means further comprises a name which identifies said destination place means.

106. In a computer network having a plurality of computers, the communication system as in claim 105 wherein said name is a telename.

107. In a computer network having a plurality of computers, the communication system as in claim 100 wherein said ticket means further comprises an address for said destination place means.

108. In a computer network having a plurality of computers, the communication system as in claim 107 wherein said address is a teleaddress.

109. In a computer network having a plurality of computers, the communication system as in claim 100 wherein said ticket means further comprises a citation means which specifies a class of which said destination place means is a member.

110. In a computer network having a plurality of computers, the communication system as in claim 100 wherein said ticket means further comprises any combination selecting from the group consisting of an address of said destination place means, a name of said destination place means, and a citation means which specifies a class of which said destination place means is a member.

111. In a computer network having a plurality of computers, the communication system as in claim 100 wherein said ticket means further comprises means for specifying a maximum time period for said trip.

112. In a computer network having a plurality of computers, the communication system as in claim 100 wherein said ticket means further comprises means for specifying a desired time period for said trip.

113. In a computer network having a plurality of computers, the communication system as in claim 100 wherein said ticket means further comprises a way means for specifying a type of intercomputer communications means by which said trip is to be accomplished.

114. In a computer network having a plurality of computers, the communication system as in claim 100 wherein said ticket means further comprises a permit means for controlling a deadline for said agent means at said destination place means.

115. In a computer network having a plurality of computers, the communication system as in claim 100 wherein said ticket means further comprises a permit means for controlling operations that said agent means is allowed to perform at said destination place means.

116. In a computer network having a plurality of computers, the communication system as in claim 100 wherein said ticket means further comprises a permit means for controlling resources that said agent means is allowed to consume at said destination place means.

117. In a computer network having a plurality of computers, the communication system as in claim 100 wherein said ticket means further comprises a permit means for specifying a priority for said agent means at said destination place means relative to other agent means at said destination place means.

118. In a computer network having a plurality of computers, the communication system as in claim 100 further comprising a permit means for controlling a capability that an agent means is allowed to have.

119. In a computer network having a plurality of computers, the communication system as in claim 118 wherein said permit means is a native permit.

120. In a computer network having a plurality of computers, the communication system as in claim 118 wherein said permit means is a local permit.

121. In a computer network having a plurality of computers, the communication system as in claim 118 wherein said permit means is a temporary permit.

122. In a computer network having a plurality of computers, the communication system as in claim 118 wherein said capability comprises resources that said agent means can consume.

123. In a computer network having a plurality of computers, the communication system as in claim 118 wherein said capability comprises a deadline after which the agent means can not proceed.

124. In a computer network having a plurality of computers, the communication system as in claim 118 further comprising other agent means wherein said capability comprises a priority for said agent means relative to said other agent means.

125. In a computer network having a plurality of computers, the communication system as in claim 118 wherein said capability comprises permission for said agent means to perform selected operations.

126. In a computer network having a plurality of computers, the communication system as in claim 100 wherein said agent means owns an object.

127. In a computer network having a plurality of computers, the communication system as is claim 126 wherein said object has a digest.

128. In a computer network having a plurality of computers, the communication system as is claim 127 wherein a copy of said object is transported with said clone by performance of said send operation.

129. In a computer network having a plurality of computers, the communication system as is claim 128 wherein a second object at said destination place means is interchanged for said copy; and further wherein said second object has a digest equivalent to said first-mentioned digest, thereby obviating transportation of said copy to said destination place means.

130. In a computer network having a plurality of computers, the communication system as in claim 128 wherein said send operation uses an interchanged object for said copy at said destination place means thereby eliminating the need to transport said copy of said object to said destination place means.

131. In a computer network having a plurality of computers, the communication system as in claim 100 wherein said place means further comprises means for entering said place means.

132. In a computer network having a plurality of computers, the communication system as in claim 100 wherein said place means further comprises means for exiting said place means.

133. In a computer network having a plurality of computers, the communication system as in claim 100 wherein said place means further comprises meeting place means wherein said meeting place means arranges a meeting between a requestor agent means and a responder agent means.

134. In a computer, a communication system comprising:

meeting place means having a meet operation wherein said meeting place means is a locale for a plurality of agent means;

a petition means;

a first agent means in said plurality of agent means; and a second agent means in said plurality agent means wherein;

said first and second agent means can meet with any of said plurality of agent means;

said petition means specifies a meeting between said first and second agent means; and in response to said meet operation, said meeting place means arranges said meeting.

135. In a computer, the communication system as in claim 134 wherein said first agent means contains said petition means.

136. In a computer, the communication system as in claim 135 wherein said petition means specifies said meeting by specifying said second agent process.

137. In a computer, the communication system as in claim 136 wherein said petition means comprises a name which specifies said second agent.

138. In a computer, the communication system as in claim 137 wherein said name is a telename.

139. In a computer, the communication system as in claim 136 wherein said petition means specifies said second agent by specifying a class of which said second agent process is a member.

140. In a computer, the communication system as in claim 136 wherein said petition means comprises a citation, said citation specifying a class of which said second agent process is a member.

141. In a computer, the communication system as in claim 134 wherein said petition means defines a maximum time period for arranging said meeting.

142. In a computer, the communication system as in claim 134 further wherein said meet operation provides to said first agent means a reference to said second agent means.

143. In a computer, the communication system as in claim 142 further wherein said meet operation provides to said second agent means a reference to said first agent means.

144. In a computer, the communication system as in claim 134 further wherein said first agent means can cause performance of an operation within said second agent means.

145. In a computer, the communication system as in claim 144 wherein said first agent means owns an object.

146. In a computer, the communication system as in claim 145 further wherein said first agent means can provide to said second agent means a reference to said object.

147. In a computer, the communication system as in claim 146 wherein said reference is a protected reference.

148. In a computer, the communication means as in claim 145 further wherein said first agent means can provide to said second agent means a reference to a copy of said object.

149. In a computer, the communication system as in claim 144 wherein said second agent means owns an object.

150. In a computer, the communication system as in claim 149 further wherein said second agent means can provide to said first agent means a reference to said object.

151. In a computer, the communication system as in claim 150 wherein said reference is a protected reference.

152. In a computer, the communication system as in claim 149 further wherein said second agent means can provide to said first agent means a reference to a copy of said object.

153. In a computer network having one or more computers, a method for transferring data from a first engine process to a second engine process, said method comprising the steps of:

(a) providing means for executing one or more agent processes wherein said executing means comprises said first and second engine processes and further wherein each said agent process comprises instructions from a computer instruction set and has an execution state;

(b) providing within said computer instruction set a go instruction wherein said go instruction is contained within a first agent process executing within said first engine process and further wherein performance of said go instruction causes:

(i) suspension of execution of said first agent process by said first engine process;

(ii) representation of said first agent process such that said execution state of said first agent process is preserved;

(iii) transfer of said representation of said first agent process from said first engine process to said second engine process; and (iv) resumption of execution of said first agent process by said second engine process;

(c) causing execution of said agent process by said first engine process, thereby causing performance of said go instruction.

154. The method of claim 153 wherein said computer instruction set is object-oriented.

155. The method of claim 154 wherein said plurality of agent processes are objects of said object-oriented computer instruction set.

156. The method of claim 153 further comprising adding data to said first agent process prior to causing performance of said go instruction;

wherein said representation of said first agent process includes said data; and further wherein transfer of said representation of said first agent process to said second engine process includes transfer of said data.

157. The method of claim 153 wherein said first agent process comprises data representing a message to be transported from said first engine process to said second engine process; and further wherein transfer of said first agent process resulting from execution of said go instruction causes transfer of said data from said first engine process to said second engine process.

158. The method of claim 153 wherein said first engine process executes on a first computer and said second engine process executes on a second computer wherein said first and second computers are part of said computer network.

159. A method for transferring data from a first engine process to one or more engine processes, said method comprising:

(a) providing means for executing a plurality of agent processes which comprise instructions from a computer instruction set wherein said agent process execution means comprises said first and one or more engine processes and further wherein each said agent process has an execution state;

(b) providing within said computer instruction set a send instruction wherein said send instruction is contained within a first agent process in said plurality of agent processes and further wherein, execution of said send instruction, includes:

(i) forming one or more copies of said first agent process wherein said copies preserve and include said execution state of said first agent process;

(ii) transferring each of said copies of said first agent process from said first engine process to a respective one of said one or more engine processes; and (iii) effectuating execution of each of said copies of said first agent process by said respective one of said one or more engine processes so as to simulate the resumed execution of said first agent process.

160. The method of claim 159 wherein, upon a condition wherein two or more of said copies of said first agent process are to be transferred from said first engine process to a single second engine process, the transfer of said two or more copies of said first agent process comprises:

transferring to said second engine process a single copy of said first agent process; and forming within said second engine process from said single copy said two or more copies of said first agent process.

161. A method of transferring data from a first agent process which is executing within a computer system to a second agent process which is executing within said computer system wherein said first and second agent processes are occupants of a place process, said method comprising:

causing, in response to a meet instruction issued by said first agent process, execution of a procedure by said second agent process wherein said procedure is a portion of said second agent process and comprises a collection of computer instructions contained within said second agent process; and providing to said first agent process, in response to a second instruction which is issued by said second agent process and which is part of said procedure, means for accessing said second agent process.

162. The method of claim 161 wherein said causing execution of a procedure by said second agent process comprises:

causing, in response to said meet instruction issued by said first agent process, execution of a second procedure by said place process wherein execution of said second procedure by said place process issues an instruction which causes said second agent process to execute said first-mentioned procedure.

163. The method of claim 161 wherein said means for accessing said second agent process is provided to said first agent process by said place process.

164. The method of claim 163 wherein, at approximately the time said place process provides to said first agent process said means for accessing said second agent process, said place process provides to said second agent process means for accessing said first agent process.

165. A method for transferring a first computer process from a first computer system to a second computer system, said first computer system comprising a first CPU and a first memory and said second computer system comprising a second CPU and a second memory, said method comprising:

initiating execution of said first computer process within said first CPU wherein said computer process has an execution state;

suspending execution of said first computer process within said first CPU;

representing said first computer process as data in said first memory wherein said data includes said execution state of said first computer process at the time execution of said first computer process is suspended;

transferring said data from said first memory to said second memory;

forming a second computer process on said second computer system from said data wherein said second computer process has said state of execution represented in said data; and causing execution of said second computer process, thereby effectively simulating resumption of execution of said first computer process, within said second CPU.

* * * * *